US012693551B2

(12) United States Patent
Valentine et al.

(10) Patent No.: US 12,693,551 B2
(45) Date of Patent: Jul. 28, 2026

(54) OPTICAL DEVICE WITH TRANSMISSION INHIBITION PLATEAU IN BLUE SPECTRAL RANGE

(71) Applicant: COLORBOOST, INC., Austin, TX (US)

(72) Inventors: Keenan Valentine, Vienna, VA (US); Timothy Mack, Reston, VA (US)

( * ) Notice: Subject to any disclaimer, the term of this patent is extended or adjusted under 35 U.S.C. 154(b) by 670 days.

(21) Appl. No.: 17/433,891

(22) PCT Filed: Feb. 25, 2020

(86) PCT No.: PCT/US2020/019599
§ 371 (c)(1),
(2) Date: Aug. 25, 2021

(87) PCT Pub. No.: WO2020/176444
PCT Pub. Date: Sep. 3, 2020

(65) Prior Publication Data

US 2022/0187628 A1 Jun. 16, 2022

Related U.S. Application Data

(60) Provisional application No. 62/939,620, filed on Nov. 23, 2019, provisional application No. 62/894,690, (Continued)

(51) Int. Cl.
*G02C 7/10* (2006.01)
*C09B 5/00* (2006.01)
(Continued)

(52) U.S. Cl.
CPC ................ *G02C 7/104* (2013.01); *C09B 5/00* (2013.01); *C09B 25/00* (2013.01); *C09B 47/00* (2013.01); *C09B 67/0063* (2013.01); *G02C 7/04* (2013.01)

(58) Field of Classification Search
CPC .......... G02C 7/104; G02C 7/04; G02C 7/022; G02C 7/105; G02C 7/108; C09B 5/00;
(Continued)

(56) References Cited

U.S. PATENT DOCUMENTS

2011/0249234 A1* 10/2011 Duis ...................... G02C 7/102 351/159.61
2014/0334006 A1* 11/2014 Adib ..................... C03C 17/006 359/580
(Continued)

OTHER PUBLICATIONS

Abhik Ghosh, et. al.; Electronic Distinction Between Porphyrins and Tetraazaporphyrins . . . ; Inorg. Chem. 1994, 33, 6057-6060, Ameircan Chemical Society.

*Primary Examiner* — Travis S Fissel

(57) ABSTRACT

A system, method for creating an optical device, and a device to inhibit short- and medium-visible wavelengths and to color neutralize such device are disclosed. The system, method for creating the optical device, and device include a substrate, a plurality of thin film layers provided on the substrate, the plurality of thin film layers including materials creating thin film-specific transmission spectra based on selected pluralities of materials each having their on respective refractive index, and/or a plurality of colorant layers applied to the plurality of thin film layers, the plurality of colorant layers including at least one colorant, the colorant created based on colorant-specific attenuation spectra as defined by selected concentrations.

20 Claims, 127 Drawing Sheets

Related U.S. Application Data filed on Aug. 31, 2019, provisional application No. 62/882,458, filed on Aug. 2, 2019, provisional application No. 62/811,976, filed on Feb. 28, 2019.

(51) Int. Cl.
*C09B 25/00* (2006.01)
*C09B 47/00* (2006.01)
*C09B 67/20* (2006.01)
*G02C 7/04* (2006.01)

(58) Field of Classification Search
CPC ......... C09B 5/002; C09B 25/00; C09B 47/00; C09B 47/04; C09B 47/06; C09B 47/065; C09B 47/067; C09B 47/0671; C09B 47/0673; C09B 47/0675; C09B 47/0676; C09B 47/0678; C09B 47/08; C09B 47/26; C09B 47/28; C09B 47/12; C09B 47/10; C09B 67/0063; C09B 26/06; C09B 27/00; C09B 62/095; C09B 62/10; G02B 1/043
USPC ........................................ 351/159.24, 159.32
See application file for complete search history.

(56) References Cited

U.S. PATENT DOCUMENTS

2015/0316688 A1* 11/2015 Cefalo .................... G02B 1/14
252/586
2017/0235034 A1* 8/2017 Cefalo .................... G02B 1/14
252/586

* cited by examiner

Human Eye Cross-Sectional View

| Photometric Indices | SMVF 1 | SMVF 2 | SMVF 3 |
|---|---|---|---|
| 1st PIP | 60 | 37 | 98 |
| 1st PIP @ nm | 430 | 420 | 380 |
| FWHM of 1st PIP (nm) | 10 | 7 | 130 |
| 2nd PIP | NA | 44 | NA |
| 2nd PIP @ nm | NA | 380 | NA |
| FWHM of 2nd PIP (nm) | NA | 5 | NA |
| $TTIP_{380-450}$ | 24.3 | 18.6 | 92 |
| $TTIP_{450-500}$ | 3.2 | 1.8 | 68 |
| $TTIP_{520}$ | 14.2 | 10.3 | 77.6 |
| $TTIP_{780}$ | 9.5 | 6.5 | 41.1 |
| TTP | 90.5 | 93.5 | 58.9 |

Table 1

FIG. 32

| Reference Perceptual Environment (RPE) | Reference White (RW) Tristimulus Values | CIE Illuminant | | | | | LED Illuminant | | |
|---|---|---|---|---|---|---|---|---|---|
| | | D65 | F2 | F7 | F11 | A | 3000K | 4000K | 5000K |
| Ambient, for Single- & Double-Pass Cosmetic Tints of Any OD | $X_{RW,tint}$ | 85.3 | 57.4 | 39.3 | 26.1 | 45.3 | 78.6 | 87.3 | 52.9 |
| | $Y_{RW,tint}$ | 89.7 | 58.5 | 41.8 | 24.9 | 41.2 | 72.8 | 87.4 | 54.5 |
| | $Z_{RW,tint}$ | 97.6 | 36.2 | 43.3 | 17.0 | 14.7 | 22.5 | 46.3 | 43.9 |

| Colorimetric Index | RPE or Filter | CIE Illuminant | | | | | LED Illuminant | | |
|---|---|---|---|---|---|---|---|---|---|
| | | D65 | F2 | F7 | F11 | A | 3000K | 4000K | 5000K |
| Photopic Luminous Transmittance | Ambient (No Filter) | 100.0% | 100.0% | 100.0% | 100.0% | 100.0% | 100.0% | 100.0% | 100.0% |
| | OD A | 50.9% | 41.8% | 49.4% | 52.6% | 48.9% | 44.7% | 45.8% | 45.1% |
| Scotopic Luminous Transmittance | Ambient (No Filter) | 100.0% | 100.0% | 100.0% | 100.0% | 100.0% | 100.0% | 100.0% | 100.0% |
| | OD A | 60.7% | 57.2% | 60.7% | 58.6% | 61.2% | 56.3% | 56.2% | 53.0% |

Table 2

FIG. 33

| White Point of Illuminants (Normalized to $X_{wp,D65}$) | Tristimulus Values of Illuminant | CIE Illuminant | | | | | LED Illuminant | | |
|---|---|---|---|---|---|---|---|---|---|
| | | D65 | F2 | F7 | F11 | A | 3000K | 4000K | 5000K |
| | $X_{wp,illuminant}$ | 85.3 | 85.3 | 85.3 | 85.3 | 85.3 | 85.3 | 85.3 | 85.3 |
| | $Y_{wp,illuminant}$ | 89.7 | 86.9 | 90.6 | 81.2 | 77.6 | 79.0 | 85.4 | 87.7 |
| | $Z_{wp,illuminant}$ | 97.6 | 53.7 | 93.9 | 55.4 | 27.6 | 24.4 | 45.2 | 70.6 |

Table 3

| Metric | | MBDS | OS |
|---|---|---|---|
| 1st PIP | | 98.5% | 98.5% |
| 1st PIP @ nm | | 420 | 420 |
| FWHM of 1st PIP (nm) | | 54 | 54 |
| FW80M of 1st PIP (nm) | | 22 | 22 |
| $TTIP_{380-450}$ | | 63.9% | 63.9% |
| $TTIP_{460-500}$ | | 1.5% | 1.5% |
| $TTIP_{520}$ | | 32.8% | 35.2% |
| $TTIP_{780}$ | | 12.2% | 18.3% |
| TTP | | 87.8% | 81.7% |
| Photopic Luminous Transmittance *(V)*, CIE D65 | | 98.4% | 85.1% |
| Scotopic Luminous Transmittance *(V')*, CIE D65 | | 95.7% | 88.5% |
| $RG_{LI}$ Color Difference Percent, CIE D65 | | -0.9 | 2.8 |
| $BY_{LI}$ Color Difference Percent, CIE D65 | | -5.7 | -2.9 |
| Single-Pass Tint | <Yellowness Index (YI), $E_{V,YI}$, $E_{V',YI}$> | <17.9, NA, NA> | <5.6, 0.92, 1.71> |
| | CIE D65: <a, b, WPS, $E_{V,WPS}$, $E_{V',WPS}$> | <-7.1, 13.3, 15.1, NA, NA> | <-2.8, 4.1, 4.9, 0.76, 1.41> |
| | CIE F11: <a, b, WPS, $E_{V,WPS}$, $E_{V',WPS}$> | <-4.6, 15.6, 16.2, NA, NA> | <2.8, 2.5, 3.7, 0.69, 1.09> |
| | CIE F7: <a, b, WPS, $E_{V,WPS}$, $E_{V',WPS}$> | <-7.4, 14.4, 16.2, NA, NA> | <-1.9, 4, 4.5, 0.79, 1.44> |
| | CIE F2: <a, b, WPS, $E_{V,WPS}$, $E_{V',WPS}$> | <-4.4, 15.4, 16, NA, NA> | <-0.1, 4.1, 4.1, 0.74, 1.2> |
| | CIE A: <a, b, WPS, $E_{V,WPS}$, $E_{V',WPS}$> | <-1.5, 10.1, 10.2, NA, NA> | <2.4, 1, 2.6, 0.55, 0.78> |
| | LED-3000K: <a, b, WPS, $E_{V,WPS}$, $E_{V',WPS}$> | <-1, 7.5, 7.6, NA, NA> | <2.6, -2.2, 3.4, 0.29, 0.38> |
| | LED-4000K: <a, b, WPS, $E_{V,WPS}$, $E_{V',WPS}$> | <-1.7, 6.9, 7.1, NA, NA> | <2.2, -3, 3.7, 0.23, 0.35> |
| | LED-5000K: <a, b, WPS, $E_{V,WPS}$, $E_{V',WPS}$> | <-3.2, 8.4, 8.9, NA, NA> | <1.3, -1.9, 2.3, 0.45, 0.73> |
| | <avg(a), avg(b), avg(WPS), avg(\|a\|), avg(\|b\|)> | <-3.9, 11.5, 12.2, 3.9, 11.5> | <0.8, 1.1, 3.7, 2, 2.8> |
| | <std(a), std(b), std(WPS), std(\|a\|), std(\|b\|)> | <2.3, 3.4, 3.8, 2.3, 3.4> | <2, 2.9, 0.8, 0.9, 1.1> |
| Double-Pass Tint | <Yellowness Index (YI), $E_{V,YI}$, $E_{V',YI}$> | <23.2, NA, NA> | <-0.4, 1.77, 3.29> |
| | CIE D65: <a, b, WPS, $E_{V,WPS}$, $E_{V',WPS}$> | <-9.2, 17.5, 19.8, NA, NA> | <-1.5, 0.4, 1.6, 1.37, 2.53> |
| | CIE F11: <a, b, WPS, $E_{V,WPS}$, $E_{V',WPS}$> | <-6.7, 23.9, 24.8, NA, NA> | <5.9, -0.4, 5.9, 1.04, 1.64> |
| | CIE F7: <a, b, WPS, $E_{V,WPS}$, $E_{V',WPS}$> | <-10.2, 20.8, 23.1, NA, NA> | <-0.7, 1.5, 1.7, 1.45, 2.62> |
| | CIE F2: <a, b, WPS, $E_{V,WPS}$, $E_{V',WPS}$> | <-6.2, 22.6, 23.4, NA, NA> | <1.3, 1.6, 2, 1.32, 2.15> |
| | CIE A: <a, b, WPS, $E_{V,WPS}$, $E_{V',WPS}$> | <-2, 13.4, 13.6, NA, NA> | <5, -3.4, 6, 0.55, 0.78> |
| | LED-3000K: <a, b, WPS, $E_{V,WPS}$, $E_{V',WPS}$> | <-1.4, 11.4, 11.5, NA, NA> | <5, -6.7, 8.3, 0.22, 0.29> |
| | LED-4000K: <a, b, WPS, $E_{V,WPS}$, $E_{V',WPS}$> | <-2.6, 10.8, 11.1, NA, NA> | <4.4, -7.7, 8.8, 0.16, 0.24> |
| | LED-5000K: <a, b, WPS, $E_{V,WPS}$, $E_{V',WPS}$> | <-4.9, 13.2, 14, NA, NA> | <3.1, -5.9, 6.6, 0.5, 0.81> |
| | <avg(a), avg(b), avg(WPS), avg(\|a\|), avg(\|b\|)> | <-5.4, 16.7, 17.7, 5.4, 16.7> | <2.8, -2.6, 5.1, 3.4, 3.5> |
| | <std(a), std(b), std(WPS), std(\|a\|), std(\|b\|)> | <3.1, 4.9, 5.3, 3.1, 4.9> | <2.6, 3.6, 2.8, 1.9, 2.7> |

Table 4

FIG. 35B

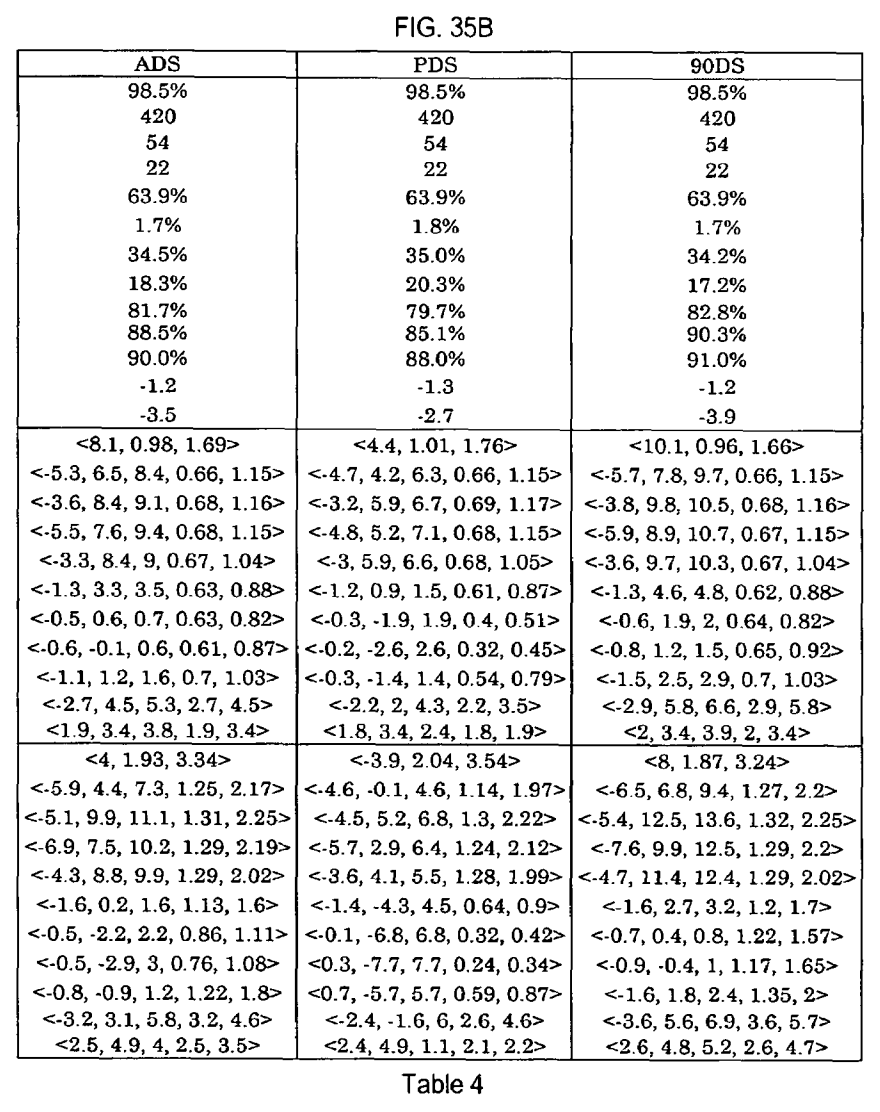

| ADS | PDS | 90DS |
|---|---|---|
| 98.5% | 98.5% | 98.5% |
| 420 | 420 | 420 |
| 54 | 54 | 54 |
| 22 | 22 | 22 |
| 63.9% | 63.9% | 63.9% |
| 1.7% | 1.8% | 1.7% |
| 34.5% | 35.0% | 34.2% |
| 18.3% | 20.3% | 17.2% |
| 81.7% | 79.7% | 82.8% |
| 88.5% | 85.1% | 90.3% |
| 90.0% | 88.0% | 91.0% |
| -1.2 | -1.3 | -1.2 |
| -3.5 | -2.7 | -3.9 |
| <8.1, 0.98, 1.69> | <4.4, 1.01, 1.76> | <10.1, 0.96, 1.66> |
| <-5.3, 6.5, 8.4, 0.66, 1.15> | <-4.7, 4.2, 6.3, 0.66, 1.15> | <-5.7, 7.8, 9.7, 0.66, 1.15> |
| <-3.6, 8.4, 9.1, 0.68, 1.16> | <-3.2, 5.9, 6.7, 0.69, 1.17> | <-3.8, 9.8, 10.5, 0.68, 1.16> |
| <-5.5, 7.6, 9.4, 0.68, 1.15> | <-4.8, 5.2, 7.1, 0.68, 1.15> | <-5.9, 8.9, 10.7, 0.67, 1.15> |
| <-3.3, 8.4, 9, 0.67, 1.04> | <-3, 5.9, 6.6, 0.68, 1.05> | <-3.6, 9.7, 10.3, 0.67, 1.04> |
| <-1.3, 3.3, 3.5, 0.63, 0.88> | <-1.2, 0.9, 1.5, 0.61, 0.87> | <-1.3, 4.6, 4.8, 0.62, 0.88> |
| <-0.5, 0.6, 0.7, 0.63, 0.82> | <-0.3, -1.9, 1.9, 0.4, 0.51> | <-0.6, 1.9, 2, 0.64, 0.82> |
| <-0.6, -0.1, 0.6, 0.61, 0.87> | <-0.2, -2.6, 2.6, 0.32, 0.45> | <-0.8, 1.2, 1.5, 0.65, 0.92> |
| <-1.1, 1.2, 1.6, 0.7, 1.03> | <-0.3, -1.4, 1.4, 0.54, 0.79> | <-1.5, 2.5, 2.9, 0.7, 1.03> |
| <-2.7, 4.5, 5.3, 2.7, 4.5> | <-2.2, 2, 4.3, 2.2, 3.5> | <-2.9, 5.8, 6.6, 2.9, 5.8> |
| <1.9, 3.4, 3.8, 1.9, 3.4> | <1.8, 3.4, 2.4, 1.8, 1.9> | <2, 3.4, 3.9, 2, 3.4> |
| <4, 1.93, 3.34> | <-3.9, 2.04, 3.54> | <8, 1.87, 3.24> |
| <-5.9, 4.4, 7.3, 1.25, 2.17> | <-4.6, -0.1, 4.6, 1.14, 1.97> | <-6.5, 6.8, 9.4, 1.27, 2.2> |
| <-5.1, 9.9, 11.1, 1.31, 2.25> | <-4.5, 5.2, 6.8, 1.3, 2.22> | <-5.4, 12.5, 13.6, 1.32, 2.25> |
| <-6.9, 7.5, 10.2, 1.29, 2.19> | <-5.7, 2.9, 6.4, 1.24, 2.12> | <-7.6, 9.9, 12.5, 1.29, 2.2> |
| <-4.3, 8.8, 9.9, 1.29, 2.02> | <-3.6, 4.1, 5.5, 1.28, 1.99> | <-4.7, 11.4, 12.4, 1.29, 2.02> |
| <-1.6, 0.2, 1.6, 1.13, 1.6> | <-1.4, -4.3, 4.5, 0.64, 0.9> | <-1.6, 2.7, 3.2, 1.2, 1.7> |
| <-0.5, -2.2, 2.2, 0.86, 1.11> | <-0.1, -6.8, 6.8, 0.32, 0.42> | <-0.7, 0.4, 0.8, 1.22, 1.57> |
| <-0.5, -2.9, 3, 0.76, 1.08> | <0.3, -7.7, 7.7, 0.24, 0.34> | <-0.9, -0.4, 1, 1.17, 1.65> |
| <-0.8, -0.9, 1.2, 1.22, 1.8> | <0.7, -5.7, 5.7, 0.59, 0.87> | <-1.6, 1.8, 2.4, 1.35, 2> |
| <-3.2, 3.1, 5.8, 3.2, 4.6> | <-2.4, -1.6, 6, 2.6, 4.6> | <-3.6, 5.6, 6.9, 3.6, 5.7> |
| <2.5, 4.9, 4, 2.5, 3.5> | <2.4, 4.9, 1.1, 2.1, 2.2> | <2.6, 4.8, 5.2, 2.6, 4.7> |

Table 4

FIG. 36A

| Metric | | MBDS | OS |
|---|---|---|---|
| 1st PIP | | 65.3% | 65.3% |
| 1st PIP @ nm | | 420 | 420 |
| FWHM of 1st PIP (nm) | | 29 | 29 |
| FW80M of 1st PIP (nm) | | 12 | 12 |
| $TTIP_{380-450}$ | | 33.8% | 33.7% |
| $TTIP_{450-500}$ | | 1.2% | 1.4% |
| $TTIP_{520}$ | | 17.6% | 19.2% |
| $TTIP_{780}$ | | 6.8% | 11.7% |
| TTP | | 93.2% | 88.3% |
| Photopic Luminous Transmittance *(V)*, CIE D65 | | 98.7% | 92.6% |
| Scotopic Luminous Transmittance *(V')*, CIE D65 | | 97.4% | 93.3% |
| $RG_{LI}$ Color Difference Percent, CIE D65 | | -0.5 | -0.6 |
| $BY_{LI}$ Color Difference Percent, CIE D65 | | -2.8 | -1.0 |
| Single-Pass Tint | <Yellowness Index (YI), $E_{V,YI}$, $E_{V',YI}$> | <8.7, NA, NA> | <2.9, 0.93, 1.37> |
| | CIE D65: <a, b, WPS, $E_{V,WPS}$, $E_{V',WPS}$> | <-3.5, 6.2, 7.1, NA, NA> | <-1.6, 2.2, 2.7, 0.72, 1.05> |
| | CIE F11: <a, b, WPS, $E_{V,WPS}$, $E_{V',WPS}$> | <-1.8, 6, 6.3, NA, NA> | <0.3, 1.6, 1.6, 0.72, 1.16> |
| | CIE F7: <a, b, WPS, $E_{V,WPS}$, $E_{V',WPS}$> | <-3.2, 6.1, 6.9, NA, NA> | <-1, 1.7, 2, 0.74, 1.1> |
| | CIE F2: <a, b, WPS, $E_{V,WPS}$, $E_{V',WPS}$> | <-1.9, 6.3, 6.6, NA, NA> | <-0.4, 2, 2, 0.69, 0.97> |
| | CIE A: <a, b, WPS, $E_{V,WPS}$, $E_{V',WPS}$> | <-0.7, 4.7, 4.7, NA, NA> | <-0.2, 0.8, 0.8, 0.61, 0.75> |
| | LED-3000K: <a, b, WPS, $E_{V,WPS}$, $E_{V',WPS}$> | <-0.4, 3.2, 3.2, NA, NA> | <0.6, -0.7, 0.9, 0.37, 0.41> |
| | LED-4000K: <a, b, WPS, $E_{V,WPS}$, $E_{V',WPS}$> | <-0.7, 2.9, 3, NA, NA> | <0.5, -1.1, 1.3, 0.27, 0.34> |
| | LED-5000K: <a, b, WPS, $E_{V,WPS}$, $E_{V',WPS}$> | <-1.3, 3.4, 3.7, NA, NA> | <0.5, -0.7, 0.8, 0.46, 0.6> |
| | <avg(a), avg(b), avg(WPS), avg(\|a\|), avg(\|b\|)> | <-1.7, 4.9, 5.2, 1.7, 4.9> | <-0.2, 0.7, 1.5, 0.6, 1.3> |
| | <std(a), std(b), std(WPS), std(\|a\|), std(\|b\|)> | <1.1, 1.4, 1.6, 1.1, 1.4> | <0.7, 1.3, 0.6, 0.4, 0.6> |
| Double-Pass Tint | <Yellowness Index (YI), $E_{V,YI}$, $E_{V',YI}$> | <13.8, NA, NA> | <2.9, 1.78, 2.62> |
| | CIE D65: <a, b, WPS, $E_{V,WPS}$, $E_{V',WPS}$> | <-5.5, 10.1, 11.5, NA, NA> | <-2, 2.3, 3, 1.37, 2.01> |
| | CIE F11: <a, b, WPS, $E_{V,WPS}$, $E_{V',WPS}$> | <-3.2, 10.7, 11.2, NA, NA> | <0.8, 2.1, 2.3, 1.37, 2.21> |
| | CIE F7: <a, b, WPS, $E_{V,WPS}$, $E_{V',WPS}$> | <-5.4, 10.4, 11.7, NA, NA> | <-1.2, 2, 2.3, 1.43, 2.11> |
| | CIE F2: <a, b, WPS, $E_{V,WPS}$, $E_{V',WPS}$> | <-3.2, 10.9, 11.4, NA, NA> | <-0.4, 2.5, 2.5, 1.34, 1.87> |
| | CIE A: <a, b, WPS, $E_{V,WPS}$, $E_{V',WPS}$> | <-1.2, 7.6, 7.7, NA, NA> | <-0.2, 0.1, 0.2, 1.17, 1.43> |
| | LED-3000K: <a, b, WPS, $E_{V,WPS}$, $E_{V',WPS}$> | <-0.7, 5.5, 5.6, NA, NA> | <1.1, -2, 2.3, 0.53, 0.59> |
| | LED-4000K: <a, b, WPS, $E_{V,WPS}$, $E_{V',WPS}$> | <-1.3, 5.1, 5.2, NA, NA> | <1.1, -2.7, 2.9, 0.38, 0.46> |
| | LED-5000K: <a, b, WPS, $E_{V,WPS}$, $E_{V',WPS}$> | <-2.3, 6.1, 6.5, NA, NA> | <1.1, -1.9, 2.2, 0.7, 0.92> |
| | <avg(a), avg(b), avg(WPS), avg(\|a\|), avg(\|b\|)> | <-2.9, 8.3, 8.9, 2.9, 8.3> | <0, 0.3, 2.2, 1, 2> |
| | <std(a), std(b), std(WPS), std(\|a\|), std(\|b\|)> | <1.7, 2.3, 2.7, 1.7, 2.3> | <1.1, 2.1, 0.8, 0.5, 0.7> |

Table 5

FIG. 36B

| ADS | PDS | 90DS |
|---|---|---|
| 65.3% | 65.3% | 65.3% |
| 420 | 420 | 420 |
| 29 | 29 | 29 |
| 12 | 12 | 12 |
| 33.7% | 33.7% | 33.7% |
| 3.1% | 2.7% | 3.2% |
| 19.4% | 19.0% | 19.5% |
| 11.8% | 10.6% | 12.0% |
| 88.2% | 89.4% | 88.0% |
| 90.7% | 92.6% | 90.3% |
| 92.1% | 93.4% | 91.8% |
| -0.7 | -0.7 | -0.8 |
| -0.7 | -1.2 | -0.6 |
| <0.9, 0.97, 1.47> | <2.8, 0.95, 1.44> | <0.4, 0.98, 1.47> |
| <-1.5, 1.1, 1.8, 0.66, 0.99> | <-2, 2.3, 3, 0.67, 1> | <-1.4, 0.8, 1.6, 0.65, 0.98> |
| <-0.7, 0.6, 1, 0.65, 0.95> | <-1, 1.9, 2.2, 0.66, 0.96> | <-0.6, 0.4, 0.7, 0.64, 0.94> |
| <-1.3, 0.9, 1.5, 0.67, 0.99> | <-1.7, 2.1, 2.7, 0.67, 1> | <-1.2, 0.6, 1.3, 0.66, 0.98> |
| <-0.8, 1, 1.2, 0.65, 0.91> | <-1, 2.3, 2.5, 0.65, 0.91> | <-0.7, 0.7, 1, 0.65, 0.91> |
| <-0.3, -0.3, 0.4, 0.51, 0.65> | <-0.4, 0.9, 1, 0.59, 0.74> | <-0.3, -0.6, 0.6, 0.47, 0.59> |
| <0.1, -2.1, 2.1, 0.13, 0.16> | <0, -0.8, 0.8, 0.37, 0.45> | <0.1, -2.3, 2.3, 0.09, 0.12> |
| <0.3, -2.5, 2.5, 0.06, 0.08> | <0.1, -1.2, 1.2, 0.28, 0.37> | <0.4, -2.7, 2.8, 0.02, 0.03> |
| <0.5, -2.1, 2.1, 0.18, 0.26> | <0, -0.8, 0.8, 0.46, 0.65> | <0.6, -2.4, 2.4, 0.14, 0.2> |
| <-0.5, -0.4, 1.6, 0.7, 1.3> | <-0.8, 0.8, 1.8, 0.8, 1.5> | <-0.4, -0.7, 1.6, 0.7, 1.3> |
| <0.7, 1.5, 0.6, 0.5, 0.7> | <0.8, 1.4, 0.9, 0.7, 0.6> | <0.7, 1.4, 0.8, 0.4, 0.9> |
| <-1.5, 1.91, 2.88> | <2.4, 1.85, 2.79> | <-2.4, 1.92, 2.89> |
| <-1.8, -0.1, 1.8, 1.21, 1.81> | <-2.7, 2.3, 3.6, 1.29, 1.93> | <-1.6, -0.6, 1.7, 1.16, 1.75> |
| <-1.1, 0.2, 1.1, 1.23, 1.8> | <-1.6, 2.7, 3.1, 1.28, 1.88> | <-0.9, -0.4, 1, 1.18, 1.72> |
| <-1.6, 0.1, 1.6, 1.24, 1.85> | <-2.6, 2.5, 3.6, 1.31, 1.94> | <-1.4, -0.4, 1.5, 1.2, 1.79> |
| <-1, 0.4, 1.1, 1.24, 1.74> | <-1.6, 2.9, 3.3, 1.27, 1.78> | <-0.9, -0.1, 0.9, 1.2, 1.69> |
| <-0.4, -2.2, 2.2, 0.65, 0.83> | <-0.6, 0.1, 0.6, 1.11, 1.41> | <-0.3, -2.7, 2.7, 0.57, 0.72> |
| <0.3, -4.8, 4.8, 0.1, 0.12> | <0, -2.3, 2.3, 0.5, 0.61> | <0.3, -5.3, 5.3, 0.03, 0.04> |
| <0.8, -5.4, 5.4, -0.02, -0.03> | <0.3, -2.9, 2.9, 0.36, 0.48> | <0.9, -5.9, 6, -0.08, -0.11> |
| <1.2, -4.7, 4.9, 0.2, 0.28> | <0.3, -2.2, 2.2, 0.68, 0.97> | <1.4, -5.3, 5.5, 0.12, 0.18> |
| <-0.5, -2.1, 2.9, 1, 2.2> | <-1.1, 0.4, 2.7, 1.2, 2.2> | <-0.3, -2.6, 3.1, 1, 2.6> |
| <1, 2.4, 1.7, 0.5, 2.2> | <1.2, 2.4, 0.9, 1, 0.8> | <1, 2.4, 2, 0.5, 2.4> |

Table 5

FIG. 37A

| Metric | | MBDS | OS |
|---|---|---|---|
| 1st PIP | | 59.1% | 59.1% |
| 1st PIP @ nm | | 430 | 430 |
| FWHM of 1st PIP (nm) | | 20 | 20 |
| FW80M of 1st PIP (nm) | | 11 | 11 |
| $TTIP_{380-450}$ | | 23.3% | 23.3% |
| $TTIP_{450-500}$ | | 1.6% | 1.6% |
| $TTIP_{520}$ | | 12.5% | 12.7% |
| $TTIP_{780}$ | | 5.2% | 10.5% |
| TTP | | 94.8% | 89.5% |
| Photopic Luminous Transmittance *(V)*, CIE D65 | | 98.5% | 88.0% |
| Scotopic Luminous Transmittance *(V')*, CIE D65 | | 96.4% | 91.8% |
| $RG_{LI}$ Color Difference Percent, CIE D65 | | -0.5 | 1.3 |
| $BY_{LI}$ Color Difference Percent, CIE D65 | | -4.1 | -2.1 |
| Single-Pass Tint | <Yellowness Index (YI), $E_{V,YI}$, $E_{V',YI}$> | <12.7, NA, NA> | <2.1, 1.02, 2.28> |
| | CIE D65: <a, b, WPS, $E_{V,WPS}$, $E_{V',WPS}$> | <-4.9, 9.2, 10.4, NA, NA> | <-1.7, 1.8, 2.5, 0.76, 1.71> |
| | CIE F11: <a, b, WPS, $E_{V,WPS}$, $E_{V',WPS}$> | <-4.4, 15.2, 15.9, NA, NA> | <1.2, 7.1, 7.2, 0.76, 1.14> |
| | CIE F7: <a, b, WPS, $E_{V,WPS}$, $E_{V',WPS}$> | <-6.3, 12.3, 13.8, NA, NA> | <-2.8, 4.6, 5.3, 0.78, 1.66> |
| | CIE F2: <a, b, WPS, $E_{V,WPS}$, $E_{V',WPS}$> | <-3.9, 13.6, 14.2, NA, NA> | <-0.5, 5.3, 5.3, 0.75, 1.31> |
| | CIE A: <a, b, WPS, $E_{V,WPS}$, $E_{V',WPS}$> | <-1.1, 7.4, 7.5, NA, NA> | <1.5, -0.2, 1.5, 0.55, 0.88> |
| | LED-3000K: <a, b, WPS, $E_{V,WPS}$, $E_{V',WPS}$> | <-0.9, 7.2, 7.3, NA, NA> | <2.3, -0.6, 2.4, 0.43, 0.6> |
| | LED-4000K: <a, b, WPS, $E_{V,WPS}$, $E_{V',WPS}$> | <-1.7, 6.9, 7.1, NA, NA> | <1.8, -1.1, 2.1, 0.43, 0.69> |
| | LED-5000K: <a, b, WPS, $E_{V,WPS}$, $E_{V',WPS}$> | <-3.2, 8.4, 9, NA, NA> | <1.2, 0.1, 1.2, 0.66, 1.09> |
| | <avg(a), avg(b), avg(WPS), avg(\|a\|), avg(\|b\|)> | <-3.3, 10, 10.6, 3.3, 10> | <0.4, 2.1, 3.4, 1.6, 2.6> |
| | <std(a), std(b), std(WPS), std(\|a\|), std(\|b\|)> | <1.8, 3, 3.3, 1.8, 3> | <1.7, 2.9, 2, 0.7, 2.5> |
| Double-Pass Tint | <Yellowness Index (YI), $E_{V,YI}$, $E_{V',YI}$> | <20.2, NA, NA> | <-0.1, 1.95, 4.37> |
| | CIE D65: <a, b, WPS, $E_{V,WPS}$, $E_{V',WPS}$> | <-7.9, 15, 17, NA, NA> | <-2.1, 0.8, 2.3, 1.41, 3.16> |
| | CIE F11: <a, b, WPS, $E_{V,WPS}$, $E_{V',WPS}$> | <-6.9, 25, 25.9, NA, NA> | <3.5, 9.2, 9.9, 1.39, 2.09> |
| | CIE F7: <a, b, WPS, $E_{V,WPS}$, $E_{V',WPS}$> | <-9.9, 20.1, 22.3, NA, NA> | <-3.7, 5.2, 6.4, 1.47, 3.13> |
| | CIE F2: <a, b, WPS, $E_{V,WPS}$, $E_{V',WPS}$> | <-6.1, 22.3, 23.1, NA, NA> | <0, 6.2, 6.2, 1.43, 2.5> |
| | CIE A: <a, b, WPS, $E_{V,WPS}$, $E_{V',WPS}$> | <-1.7, 12, 12.1, NA, NA> | <3, -2.6, 3.9, 0.74, 1.2> |
| | LED-3000K: <a, b, WPS, $E_{V,WPS}$, $E_{V',WPS}$> | <-1.5, 12, 12.1, NA, NA> | <4.5, -3.1, 5.5, 0.58, 0.8> |
| | LED-4000K: <a, b, WPS, $E_{V,WPS}$, $E_{V',WPS}$> | <-2.7, 11.6, 11.9, NA, NA> | <3.7, -3.9, 5.4, 0.57, 0.91> |
| | LED-5000K: <a, b, WPS, $E_{V,WPS}$, $E_{V',WPS}$> | <-5.2, 14.3, 15.2, NA, NA> | <3, -1.7, 3.5, 0.99, 1.65> |
| | <avg(a), avg(b), avg(WPS), avg(\|a\|), avg(\|b\|)> | <-5.2, 16.5, 17.5, 5.2, 16.5> | <1.5, 1.3, 5.4, 2.9, 4.1> |
| | <std(a), std(b), std(WPS), std(\|a\|), std(\|b\|)> | <2.9, 4.9, 5.2, 2.9, 4.9> | <2.8, 4.6, 2.2, 1.3, 2.5> |

Table 6

FIG. 37B

| ADS | PDS | 90DS |
|---|---|---|
| 59.1% | 59.1% | 59.1% |
| 430 | 430 | 430 |
| 20 | 20 | 20 |
| 11 | 11 | 11 |
| 23.3% | 23.3% | 23.3% |
| 1.6% | 1.6% | 1.6% |
| 13.4% | 13.4% | 13.1% |
| 10.5% | 10.7% | 9.2% |
| 89.5% | 89.3% | 90.8% |
| 88.3% | 88.0% | 90.8% |
| 91.5% | 91.4% | 92.7% |
| -0.4 | -0.4 | -0.4 |
| -2.0 | -2.0 | -2.6 |
| <1.2, 1.13, 2.32> | <0.9, 1.13, 2.33> | <4.3, 1.09, 2.26> |
| <-3.7, 2.1, 4.2, 0.61, 1.25> | <-3.6, 1.9, 4.1, 0.6, 1.24> | <-4, 3.9, 5.6, 0.63, 1.3> |
| <-3.5, 7.5, 8.3, 0.68, 1.23> | <-3.5, 7.4, 8.2, 0.68, 1.23> | <-3.8, 9.5, 10.3, 0.68, 1.22> |
| <-4.9, 5.1, 7.1, 0.65, 1.29> | <-4.9, 4.9, 6.9, 0.65, 1.29> | <-5.3, 6.9, 8.7, 0.65, 1.3> |
| <-3.1, 6, 6.8, 0.67, 1.17> | <-3.1, 5.8, 6.6, 0.67, 1.17> | <-3.3, 8, 8.6, 0.67, 1.17> |
| <-1.3, 0, 1.3, 0.56, 0.91> | <-1.3, -0.2, 1.3, 0.55, 0.88> | <-1.2, 1.9, 2.2, 0.63, 1.01> |
| <-0.7, -0.4, 0.8, 0.57, 0.81> | <-0.7, -0.5, 0.9, 0.55, 0.78> | <-0.8, 1.6, 1.8, 0.65, 0.92> |
| <-0.9, -0.7, 1.2, 0.53, 0.84> | <-0.9, -0.9, 1.3, 0.51, 0.8> | <-1.1, 1.3, 1.7, 0.65, 1.01> |
| <-1.2, 0.7, 1.4, 0.68, 1.09> | <-1.2, 0.6, 1.3, 0.67, 1.08> | <-1.8, 2.7, 3.2, 0.69, 1.11> |
| <-2.4, 2.5, 3.9, 2.4, 2.8> | <-2.4, 2.4, 3.8, 2.4, 2.8> | <-2.7, 4.5, 5.3, 2.7, 4.5> |
| <1.5, 3, 2.9, 1.5, 2.8> | <1.5, 3, 2.8, 1.5, 2.6> | <1.6, 3, 3.3, 1.6, 3> |
| <-2.1, 2.18, 4.51> | <-2.7, 2.19, 4.52> | <4.2, 2.09, 4.32> |
| <-5.8, 1.2, 5.9, 1.08, 2.23> | <-5.7, 0.9, 5.8, 1.07, 2.2> | <-6.3, 4.7, 7.9, 1.18, 2.44> |
| <-5.6, 10, 11.4, 1.31, 2.36> | <-5.5, 9.7, 11.1, 1.31, 2.36> | <-5.9, 13.8, 15, 1.32, 2.37> |
| <-7.7, 6, 9.8, 1.21, 2.41> | <-7.7, 5.7, 9.6, 1.2, 2.4> | <-8.3, 9.6, 12.7, 1.24, 2.48> |
| <-4.9, 7.5, 9, 1.28, 2.24> | <-4.9, 7.2, 8.7, 1.28, 2.24> | <-5.2, 11.3, 12.4, 1.29, 2.26> |
| <-2.2, -2.4, 3.2, 0.8, 1.29> | <-2.2, -2.7, 3.5, 0.76, 1.23> | <-2, 1.2, 2.4, 1.17, 1.89> |
| <-1.1, -2.7, 3, 0.8, 1.14> | <-1.1, -3.1, 3.3, 0.76, 1.08> | <-1.2, 1, 1.6, 1.23, 1.75> |
| <-1.4, -3.1, 3.4, 0.76, 1.19> | <-1.4, -3.5, 3.7, 0.72, 1.13> | <-1.8, 0.6, 1.9, 1.2, 1.89> |
| <-1.7, -0.7, 1.8, 1.21, 1.94> | <-1.6, -1, 1.9, 1.17, 1.89> | <-2.6, 3.1, 4.1, 1.33, 2.14> |
| <-3.8, 2, 5.9, 3.8, 4.2> | <-3.8, 1.7, 6, 3.8, 4.2> | <-4.2, 5.7, 7.2, 4.2, 5.7> |
| <2.3, 4.8, 3.4, 2.3, 3.1> | <2.3, 4.8, 3.2, 2.3, 2.9> | <2.4, 4.9, 5.1, 2.4, 4.9> |

Table 6

FIG. 38

| | Metric | MBDS | OS |
|---|---|---|---|
| | 1st PIP | 92.0% | 92.0% |
| | 1st PIP @ nm | 430 | 430 |
| | FWHM of 1st PIP (nm) | 31 | 31 |
| | FW80M of 1st PIP (nm) | 14 | 14 |
| | $TTIP_{380-450}$ | 45.8% | 45.8% |
| | $TTIP_{450-500}$ | 2.5% | 2.5% |
| | $TTIP_{520}$ | 24.0% | 24.4% |
| | $TTIP_{780}$ | 9.4% | 18.6% |
| | TTP | 90.6% | 81.4% |
| | Photopic Luminous Transmittance (*V*), CIE D65 | 98.0% | 80.1% |
| | Scotopic Luminous Transmittance (*V'*), CIE D65 | 94.0% | 86.1% |
| | $RG_{LI}$ Color Difference Percent, CIE D65 | -0.8 | 2.5 |
| | $BY_{LI}$ Color Difference Percent, CIE D65 | -7.8 | -4.3 |
| Single-Pass Tint | <Yellowness Index (YI), $E_{V,YI}$, $E_{V',YI}$> | <24.1, NA, NA> | <6.6, 0.98, 2.2> |
| | CIE D65: <a, b, WPS, $E_{V,WPS}$, $E_{V',WPS}$> | <-9.4, 18.3, 20.5, NA, NA> | <-4.4, 5.2, 6.8, 0.77, 1.73> |
| | CIE F11: <a, b, WPS, $E_{V,WPS}$, $E_{V',WPS}$> | <-8.2, 30.3, 31.4, NA, NA> | <1.1, 15.8, 15.9, 0.78, 1.19> |
| | CIE F7: <a, b, WPS, $E_{V,WPS}$, $E_{V',WPS}$> | <-11.7, 24.3, 26.9, NA, NA> | <-6.3, 10.6, 12.4, 0.78, 1.67> |
| | CIE F2: <a, b, WPS, $E_{V,WPS}$, $E_{V',WPS}$> | <-7.2, 27, 27.9, NA, NA> | <-1.8, 12.2, 12.4, 0.77, 1.35> |
| | CIE A: <a, b, WPS, $E_{V,WPS}$, $E_{V',WPS}$> | <-2.1, 14.5, 14.6, NA, NA> | <2.2, 1.1, 2.5, 0.65, 1.04> |
| | LED-3000K: <a, b, WPS, $E_{V,WPS}$, $E_{V',WPS}$> | <-1.8, 14.9, 15, NA, NA> | <3.6, 1, 3.8, 0.57, 0.79> |
| | LED-4000K: <a, b, WPS, $E_{V,WPS}$, $E_{V',WPS}$> | <-3.3, 14.5, 14.9, NA, NA> | <2.4, 0.3, 2.5, 0.63, 1.01> |
| | LED-5000K: <a, b, WPS, $E_{V,WPS}$, $E_{V',WPS}$> | <-6.4, 17.9, 19.1, NA, NA> | <0.9, 3.2, 3.3, 0.78, 1.29> |
| | <avg(a), avg(b), avg(WPS), avg(\|a\|), avg(\|b\|)> | <-6.3, 20.2, 21.3, 6.3, 20.2> | <-0.3, 6.2, 7.4, 2.8, 6.2> |
| | <std(a), std(b), std(WPS), std(\|a\|), std(\|b\|)> | <3.4, 5.8, 6.2, 3.4, 5.8> | <3.3, 5.5, 5, 1.7, 5.5> |
| Double-Pass Tint | <Yellowness Index (YI), $E_{V,YI}$, $E_{V',YI}$> | <32, NA, NA> | <-2.1, 1.91, 4.29> |
| | CIE D65: <a, b, WPS, $E_{V,WPS}$, $E_{V',WPS}$> | <-12.4, 25, 27.9, NA, NA> | <-4, 0.6, 4, 1.33, 2.99> |
| | CIE F11: <a, b, WPS, $E_{V,WPS}$, $E_{V',WPS}$> | <-10.2, 39.8, 41.1, NA, NA> | <6.4, 12.6, 14.2, 1.36, 2.06> |
| | CIE F7: <a, b, WPS, $E_{V,WPS}$, $E_{V',WPS}$> | <-14.9, 32.2, 35.4, NA, NA> | <-5.9, 6.7, 8.9, 1.42, 3.04> |
| | CIE F2: <a, b, WPS, $E_{V,WPS}$, $E_{V',WPS}$> | <-9.1, 35.7, 36.8, NA, NA> | <0.2, 8, 8, 1.42, 2.5> |
| | CIE A: <a, b, WPS, $E_{V,WPS}$, $E_{V',WPS}$> | <-2.7, 19.6, 19.8, NA, NA> | <4.8, -5.4, 7.2, 0.67, 1.08> |
| | LED-3000K: <a, b, WPS, $E_{V,WPS}$, $E_{V',WPS}$> | <-2.5, 21.3, 21.5, NA, NA> | <7.3, -4.7, 8.7, 0.65, 0.9> |
| | LED-4000K: <a, b, WPS, $E_{V,WPS}$, $E_{V',WPS}$> | <-4.7, 21.3, 21.9, NA, NA> | <5.6, -5.3, 7.7, 0.72, 1.15> |
| | LED-5000K: <a, b, WPS, $E_{V,WPS}$, $E_{V',WPS}$> | <-9.1, 26.6, 28.1, NA, NA> | <4.1, -1, 4.2, 1.18, 1.97> |
| | <avg(a), avg(b), avg(WPS), avg(\|a\|), avg(\|b\|)> | <-8.2, 27.7, 29.1, 8.2, 27.7> | <2.3, 1.4, 7.9, 4.8, 5.5> |
| | <std(a), std(b), std(WPS), std(\|a\|), std(\|b\|)> | <4.2, 7, 7.4, 4.2, 7> | <4.7, 6.4, 3, 2, 3.6> |

Table 7

FIG. 38B

| ADS | PDS | 90DS |
|---|---|---|
| 92.0% | 92.0% | 92.0% |
| 430 | 430 | 430 |
| 31 | 31 | 31 |
| 14 | 14 | 14 |
| 45.8% | 45.8% | 45.8% |
| 2.5% | 2.5% | 2.5% |
| 25.6% | 25.7% | 24.7% |
| 18.6% | 19.1% | 13.5% |
| 81.4% | 80.9% | 86.5% |
| 81.0% | 80.1% | 90.5% |
| 85.8% | 85.3% | 90.4% |
| -0.9 | -0.9 | -0.8 |
| -4.5 | -4.4 | -6.4 |
| <5.6, 1.08, 2.24> | <4.5, 1.1, 2.26> | <16.8, 0.97, 2> |
| <-7.8, 6.1, 9.9, 0.62, 1.29> | <-7.7, 5.4, 9.4, 0.62, 1.28> | <-8.7, 13.1, 15.7, 0.64, 1.32> |
| <-7.2, 17.1, 18.5, 0.7, 1.26> | <-7.1, 16.4, 17.9, 0.7, 1.26> | <-7.8, 24.7, 25.9, 0.68, 1.22> |
| <-10.1, 11.9, 15.6, 0.65, 1.3> | <-10, 11.2, 15, 0.65, 1.3> | <-11, 19, 21.9, 0.65, 1.29> |
| <-6.3, 14, 15.3, 0.69, 1.2> | <-6.3, 13.3, 14.7, 0.69, 1.2> | <-6.8, 21.4, 22.5, 0.67, 1.16> |
| <-2.5, 1.8, 3.1, 0.62, 1.01> | <-2.6, 1.1, 2.8, 0.61, 0.99> | <-2.3, 9.1, 9.4, 0.64, 1.04> |
| <-1.6, 1.9, 2.4, 0.66, 0.94> | <-1.6, 1.2, 1.9, 0.65, 0.93> | <-1.7, 9.3, 9.5, 0.65, 0.92> |
| <-2.3, 1.5, 2.7, 0.65, 1.03> | <-2.2, 0.8, 2.4, 0.64, 1.01> | <-2.9, 9, 9.4, 0.66, 1.04> |
| <-3.5, 4.7, 5.9, 0.71, 1.14> | <-3.3, 4, 5.2, 0.71, 1.14> | <-5.2, 12.3, 13.4, 0.69, 1.11> |
| <-5.2, 7.4, 9.2, 5.2, 7.4> | <-5.1, 6.7, 8.7, 5.1, 6.7> | <-5.8, 14.7, 16, 5.8, 14.7> |
| <2.9, 5.7, 6.1, 2.9, 5.7> | <2.9, 5.7, 6.1, 2.9, 5.7> | <3.1, 5.8, 6.2, 3.1, 5.8> |
| <-4.5, 2.14, 4.42> | <-6.9, 2.18, 4.49> | <18.2, 1.82, 3.76> |
| <-10.1, 1.8, 10.2, 1.03, 2.13> | <-10, 0.7, 10, 1, 2.06> | <-11.4, 14.8, 18.7, 1.21, 2.5> |
| <-8.8, 14.5, 17, 1.31, 2.35> | <-8.8, 13.3, 15.9, 1.3, 2.34> | <-9.6, 28.8, 30.3, 1.31, 2.36> |
| <-12.6, 8.6, 15.3, 1.16, 2.32> | <-12.5, 7.4, 14.6, 1.15, 2.29> | <-13.9, 21.8, 25.9, 1.24, 2.47> |
| <-7.9, 10.8, 13.4, 1.27, 2.23> | <-7.9, 9.6, 12.4, 1.27, 2.22> | <-8.6, 24.9, 26.3, 1.29, 2.26> |
| <-3.9, -4.6, 6, 0.74, 1.2> | <-3.9, -5.9, 7.1, 0.66, 1.06> | <-3.2, 9.1, 9.6, 1.24, 2.01> |
| <-2.2, -3.6, 4.2, 0.91, 1.29> | <-2.2, -4.9, 5.3, 0.81, 1.15> | <-2.4, 10.5, 10.8, 1.27, 1.8> |
| <-3, -3.5, 4.6, 0.92, 1.45> | <-2.9, -4.8, 5.6, 0.83, 1.31> | <-4, 10.5, 11.2, 1.28, 2.02> |
| <-3.9, 1.4, 4.1, 1.29, 2.08> | <-3.6, 0.1, 3.6, 1.26, 2.02> | <-6.9, 15.6, 17.1, 1.34, 2.15> |
| <-6.6, 3.2, 9.3, 6.6, 6.1> | <-6.5, 1.9, 9.3, 6.5, 5.8> | <-7.5, 17, 18.7, 7.5, 17> |
| <3.6, 6.8, 5, 3.6, 4.4> | <3.6, 6.9, 4.3, 3.6, 4.1> | <3.9, 6.9, 7.5, 3.9, 6.9> |

Table 7

FIG. 39A

| Metric | | MBDS | OS |
|---|---|---|---|
| 1st PIP | | 59.3% | 59.3% |
| 1st PIP @ nm | | 430 | 430 |
| FWHM of 1st PIP (nm) | | 20 | 20 |
| FW80M of 1st PIP (nm) | | 11 | 11 |
| $TTIP_{380-450}$ | | 23.6% | 23.6% |
| $TTIP_{450-500}$ | | 1.6% | 2.4% |
| $TTIP_{520}$ | | 12.6% | 13.6% |
| $TTIP_{780}$ | | 5.3% | 9.1% |
| TTP | | 94.7% | 90.9% |
| Photopic Luminous Transmittance *(V)*, CIE D65 | | 98.4% | 88.7% |
| Scotopic Luminous Transmittance *(V')*, CIE D65 | | 96.4% | 91.2% |
| $RG_{LI}$ Color Difference Percent, CIE D65 | | -0.5 | 0.9 |
| $BY_{LI}$ Color Difference Percent, CIE D65 | | -4.1 | -1.9 |
| Single-Pass Tint | <Yellowness Index (YI), $E_{V,YI}$, $E_{V',YI}$> | <12.4, NA, NA> | <3.7, 0.9, 1.69> |
| | CIE D65: <a, b, WPS, $E_{V,WPS}$, $E_{V',WPS}$> | <-4.8, 9, 10.2, NA, NA> | <-0.9, 2.3, 2.5, 0.8, 1.5> |
| | CIE F11: <a, b, WPS, $E_{V,WPS}$, $E_{V',WPS}$> | <-4.4, 15, 15.7, NA, NA> | <2.5, 6.9, 7.3, 0.71, 0.96> |
| | CIE F7: <a, b, WPS, $E_{V,WPS}$, $E_{V',WPS}$> | <-6.2, 12.1, 13.6, NA, NA> | <-1.9, 5, 5.3, 0.8, 1.45> |
| | CIE F2: <a, b, WPS, $E_{V,WPS}$, $E_{V',WPS}$> | <-3.8, 13.4, 13.9, NA, NA> | <0, 5.9, 5.9, 0.74, 1.13> |
| | CIE A: <a, b, WPS, $E_{V,WPS}$, $E_{V',WPS}$> | <-1.1, 7.2, 7.3, NA, NA> | <2.2, 0.7, 2.3, 0.51, 0.71> |
| | LED-3000K: <a, b, WPS, $E_{V,WPS}$, $E_{V',WPS}$> | <-0.9, 7, 7, NA, NA> | <2.4, 0.1, 2.4, 0.45, 0.57> |
| | LED-4000K: <a, b, WPS, $E_{V,WPS}$, $E_{V',WPS}$> | <-1.6, 6.6, 6.8, NA, NA> | <2.1, -0.5, 2.2, 0.44, 0.64> |
| | LED-5000K: <a, b, WPS, $E_{V,WPS}$, $E_{V',WPS}$> | <-3.1, 8.1, 8.7, NA, NA> | <1.4, 0.6, 1.6, 0.66, 1.02> |
| | <avg(a), avg(b), avg(WPS), avg($\lvert a \rvert$), avg($\lvert b \rvert$)> | <-3.2, 9.8, 10.4, 3.2, 9.8> | <1, 2.6, 3.7, 1.7, 2.8> |
| | <std(a), std(b), std(WPS), std($\lvert a \rvert$), std($\lvert b \rvert$)> | <1.8, 3, 3.3, 1.8, 3> | <1.6, 2.7, 2, 0.8, 2.6> |
| Double-Pass Tint | <Yellowness Index (YI), $E_{V,YI}$, $E_{V',YI}$> | <19.8, NA, NA> | <3.3, 1.7, 3.2> |
| | CIE D65: <a, b, WPS, $E_{V,WPS}$, $E_{V',WPS}$> | <-7.7, 14.7, 16.5, NA, NA> | <-0.5, 1.8, 1.9, 1.51, 2.84> |
| | CIE F11: <a, b, WPS, $E_{V,WPS}$, $E_{V',WPS}$> | <-6.8, 24.5, 25.5, NA, NA> | <6, 9, 10.8, 1.25, 1.68> |
| | CIE F7: <a, b, WPS, $E_{V,WPS}$, $E_{V',WPS}$> | <-9.7, 19.7, 21.9, NA, NA> | <-1.9, 6.1, 6.3, 1.52, 2.74> |
| | CIE F2: <a, b, WPS, $E_{V,WPS}$, $E_{V',WPS}$> | <-6, 21.9, 22.7, NA, NA> | <1.1, 7.5, 7.6, 1.39, 2.12> |
| | CIE A: <a, b, WPS, $E_{V,WPS}$, $E_{V',WPS}$> | <-1.7, 11.7, 11.8, NA, NA> | <4.3, -0.8, 4.4, 0.75, 1.04> |
| | LED-3000K: <a, b, WPS, $E_{V,WPS}$, $E_{V',WPS}$> | <-1.5, 11.6, 11.7, NA, NA> | <4.7, -1.6, 5, 0.64, 0.81> |
| | LED-4000K: <a, b, WPS, $E_{V,WPS}$, $E_{V',WPS}$> | <-2.6, 11.1, 11.4, NA, NA> | <4.3, -2.6, 5.1, 0.61, 0.87> |
| | LED-5000K: <a, b, WPS, $E_{V,WPS}$, $E_{V',WPS}$> | <-5.1, 13.7, 14.6, NA, NA> | <3.4, -0.7, 3.5, 1.04, 1.6> |
| | <avg(a), avg(b), avg(WPS), avg($\lvert a \rvert$), avg($\lvert b \rvert$)> | <-5.1, 16.1, 17, 5.1, 16.1> | <2.7, 2.3, 5.6, 3.3, 3.8> |
| | <std(a), std(b), std(WPS), std($\lvert a \rvert$), std($\lvert b \rvert$)> | <2.8, 4.9, 5.3, 2.8, 4.9> | <2.6, 4.2, 2.5, 1.8, 3.1> |

Table 8

FIG. 39B

| ADS | PDS | 90DS |
|---|---|---|
| 59.3% | 59.3% | 59.3% |
| 430 | 430 | 430 |
| 20 | 20 | 20 |
| 11 | 11 | 11 |
| 23.6% | 23.6% | 23.6% |
| 4.7% | 5.8% | 5.2% |
| 14.8% | 15.6% | 15.2% |
| 9.1% | 10.4% | 9.7% |
| 90.9% | 89.6% | 90.3% |
| 91.2% | 88.7% | 90.1% |
| 91.0% | 89.2% | 90.2% |
| -0.6 | -0.7 | -0.7 |
| -2.4 | -1.7 | -2.1 |
| <6.5, 0.82, 1.1> | <4.2, 0.84, 1.13> | <5.5, 0.83, 1.11> |
| <-3, 4.7, 5.6, 0.64, 0.86> | <-2.4, 3.2, 4, 0.64, 0.86> | <-2.7, 4, 4.9, 0.64, 0.86> |
| <-3.4, 10.7, 11.2, 0.6, 0.76> | <-3, 9.2, 9.6, 0.61, 0.77> | <-3.2, 10, 10.5, 0.6, 0.77> |
| <-4.4, 7.8, 8.9, 0.64, 0.85> | <-3.8, 6.2, 7.3, 0.65, 0.86> | <-4.1, 7.1, 8.2, 0.64, 0.85> |
| <-2.9, 9, 9.4, 0.61, 0.79> | <-2.5, 7.4, 7.8, 0.62, 0.79> | <-2.7, 8.3, 8.7, 0.61, 0.79> |
| <-0.6, 3.3, 3.3, 0.53, 0.62> | <-0.4, 1.9, 1.9, 0.54, 0.63> | <-0.5, 2.6, 2.7, 0.54, 0.63> |
| <-0.4, 2.6, 2.6, 0.59, 0.7> | <-0.3, 1, 1, 0.6, 0.7> | <-0.4, 1.9, 1.9, 0.59, 0.7> |
| <-0.7, 2.1, 2.2, 0.62, 0.78> | <-0.4, 0.5, 0.6, 0.62, 0.78> | <-0.5, 1.4, 1.5, 0.62, 0.78> |
| <-1.5, 3.3, 3.7, 0.68, 0.94> | <-1, 1.6, 1.9, 0.69, 0.95> | <-1.3, 2.6, 2.9, 0.69, 0.94> |
| <-2.1, 5.4, 5.9, 2.1, 5.4> | <-1.7, 3.9, 4.3, 1.7, 3.9> | <-1.9, 4.7, 5.2, 1.9, 4.7> |
| <1.4, 3.1, 3.3, 1.4, 3.1> | <1.3, 3.1, 3.3, 1.3, 3.1> | <1.3, 3.1, 3.3, 1.3, 3.1> |
| <8.7, 1.54, 2.06> | <4.3, 1.6, 2.14> | <6.7, 1.56, 2.09> |
| <-4.3, 6.3, 7.6, 1.23, 1.65> | <-3.1, 3.4, 4.6, 1.24, 1.66> | <-3.7, 5, 6.2, 1.24, 1.66> |
| <-5, 16.2, 17, 1.15, 1.46> | <-4.4, 13.2, 13.9, 1.16, 1.47> | <-4.7, 14.9, 15.6, 1.16, 1.47> |
| <-6.5, 11.3, 13, 1.23, 1.63> | <-5.4, 8.3, 9.9, 1.24, 1.64> | <-6, 9.9, 11.6, 1.23, 1.64> |
| <-4.2, 13.3, 14, 1.18, 1.52> | <-3.6, 10.3, 10.9, 1.19, 1.53> | <-3.9, 11.9, 12.6, 1.18, 1.52> |
| <-0.8, 4, 4.1, 1.04, 1.21> | <-0.4, 1.3, 1.4, 1.05, 1.22> | <-0.6, 2.8, 2.8, 1.04, 1.22> |
| <-0.6, 3, 3, 1.16, 1.36> | <-0.3, -0.1, 0.3, 1.13, 1.34> | <-0.4, 1.6, 1.6, 1.16, 1.37> |
| <-0.9, 2.3, 2.4, 1.21, 1.52> | <-0.3, -0.9, 0.9, 1.06, 1.33> | <-0.6, 0.9, 1.1, 1.21, 1.52> |
| <-2.1, 4.4, 4.9, 1.33, 1.83> | <-1, 1.1, 1.5, 1.33, 1.83> | <-1.6, 2.9, 3.3, 1.34, 1.83> |
| <-3.1, 7.6, 8.3, 3.1, 7.6> | <-2.3, 4.6, 5.4, 2.3, 4.8> | <-2.7, 6.2, 6.9, 2.7, 6.2> |
| <2.1, 4.9, 5.3, 2.1, 4.9> | <1.9,'5, 5, 1.9, 4.7> | <2, 4.9, 5.3, 2, 4.9> |

Table 8

FIG. 40A

| | Metric | MBDS | OS |
|---|---|---|---|
| | 1st PIP | 59.3% | 59.3% |
| | 1st PIP @ nm | 430 | 430 |
| | FWHM of 1st PIP (nm) | 20 | 20 |
| | FW80M of 1st PIP (nm) | 11 | 11 |
| | TTIP$_{380\text{-}450}$ | 23.1% | 23.1% |
| | TTIP$_{450\text{-}500}$ | 0.9% | 1.2% |
| | TTIP$_{520}$ | 12.0% | 12.5% |
| | TTIP$_{780}$ | 4.7% | 7.4% |
| | TTP | 95.3% | 92.6% |
| | Photopic Luminous Transmittance (*V*), CIE D65 | 99.1% | 90.5% |
| | Scotopic Luminous Transmittance (*V'*), CIE D65 | 97.1% | 93.4% |
| | RG$_{LI}$ Color Difference Percent, CIE D65 | -0.5 | 5.0 |
| | BY$_{LI}$ Color Difference Percent, CIE D65 | -4.1 | -2.8 |
| Single-Pass Tint | <Yellowness Index (YI), $E_{V,YI}$, $E_{V',YI}$> | <12.5, NA, NA> | <5, 0.88, 2.08> |
| | CIE D65: <a, b, WPS, $E_{V,WPS}$, $E_{V',WPS}$> | <-5, 9.1, 10.4, NA, NA> | <-1.3, 3.1, 3.4, 0.82, 1.94> |
| | CIE F11: <a, b, WPS, $E_{V,WPS}$, $E_{V',WPS}$> | <-4.6, 15.2, 15.9, NA, NA> | <-0.5, 10.9, 10.9, 0.79, 1.19> |
| | CIE F7: <a, b, WPS, $E_{V,WPS}$, $E_{V',WPS}$> | <-6.4, 12.3, 13.8, NA, NA> | <-2.8, 5.9, 6.6, 0.8, 1.86> |
| | CIE F2: <a, b, WPS, $E_{V,WPS}$, $E_{V',WPS}$> | <-4, 13.6, 14.2, NA, NA> | <-0.3, 5.9, 5.9, 0.75, 1.5> |
| | CIE A: <a, b, WPS, $E_{V,WPS}$, $E_{V',WPS}$> | <-1.2, 7.3, 7.4, NA, NA> | <3.5, 1.4, 3.7, 0.42, 0.69> |
| | LED-3000K: <a, b, WPS, $E_{V,WPS}$, $E_{V',WPS}$> | <-1, 7.2, 7.3, NA, NA> | <3.6, 0.6, 3.7, 0.37, 0.55> |
| | LED-4000K: <a, b, WPS, $E_{V,WPS}$, $E_{V',WPS}$> | <-1.8, 6.8, 7.1, NA, NA> | <2.5, 0.1, 2.5, 0.47, 0.83> |
| | LED-5000K: <a, b, WPS, $E_{V,WPS}$, $E_{V',WPS}$> | <-3.3, 8.4, 9, NA, NA> | <0.9, 1.3, 1.6, 0.73, 1.39> |
| | <avg(a), avg(b), avg(WPS), avg(\|a\|), avg(\|b\|)> | <-3.4, 10, 10.6, 3.4, 10> | <0.7, 3.7, 4.8, 1.9, 3.7> |
| | <std(a), std(b), std(WPS), std(\|a\|), std(\|b\|)> | <1.8, 3, 3.3, 1.8, 3> | <2.2, 3.5, 2.8, 1.2, 3.5> |
| Double-Pass Tint | <Yellowness Index (YI), $E_{V,YI}$, $E_{V',YI}$> | <19.9, NA, NA> | <6.7, 1.54, 3.63> |
| | CIE D65: <a, b, WPS, $E_{V,WPS}$, $E_{V',WPS}$> | <-8.1, 15, 17, NA, NA> | <-0.9, 3.8, 4, 1.52, 3.59> |
| | CIE F11: <a, b, WPS, $E_{V,WPS}$, $E_{V',WPS}$> | <-7.2, 24.9, 25.9, NA, NA> | <0.7, 16.6, 16.7, 1.47, 2.2> |
| | CIE F7: <a, b, WPS, $E_{V,WPS}$, $E_{V',WPS}$> | <-10, 20, 22.4, NA, NA> | <-3.4, 8.3, 8.9, 1.49, 3.45> |
| | CIE F2: <a, b, WPS, $E_{V,WPS}$, $E_{V',WPS}$> | <-6.2, 22.2, 23.1, NA, NA> | <0.7, 8, 8, 1.37, 2.73> |
| | CIE A: <a, b, WPS, $E_{V,WPS}$, $E_{V',WPS}$> | <-2, 11.9, 12, NA, NA> | <7, 0.9, 7, 0.57, 0.93> |
| | LED-3000K: <a, b, WPS, $E_{V,WPS}$, $E_{V',WPS}$> | <-1.7, 11.9, 12.1, NA, NA> | <7.2, -0.2, 7.2, 0.51, 0.75> |
| | LED-4000K: <a, b, WPS, $E_{V,WPS}$, $E_{V',WPS}$> | <-2.9, 11.5, 11.9, NA, NA> | <5.2, -1, 5.3, 0.67, 1.19> |
| | LED-5000K: <a, b, WPS, $E_{V,WPS}$, $E_{V',WPS}$> | <-5.4, 14.3, 15.2, NA, NA> | <2.7, 1.1, 2.9, 1.22, 2.33> |
| | <avg(a), avg(b), avg(WPS), avg(\|a\|), avg(\|b\|)> | <-5.4, 16.5, 17.5, 5.4, 16.5> | <2.4, 4.7, 7.5, 3.5, 5> |
| | <std(a), std(b), std(WPS), std(\|a\|), std(\|b\|)> | <2.8, 4.9, 5.3, 2.8, 4.9> | <3.6, 5.6, 4, 2.5, 5.3> |

Table 9

FIG. 40B

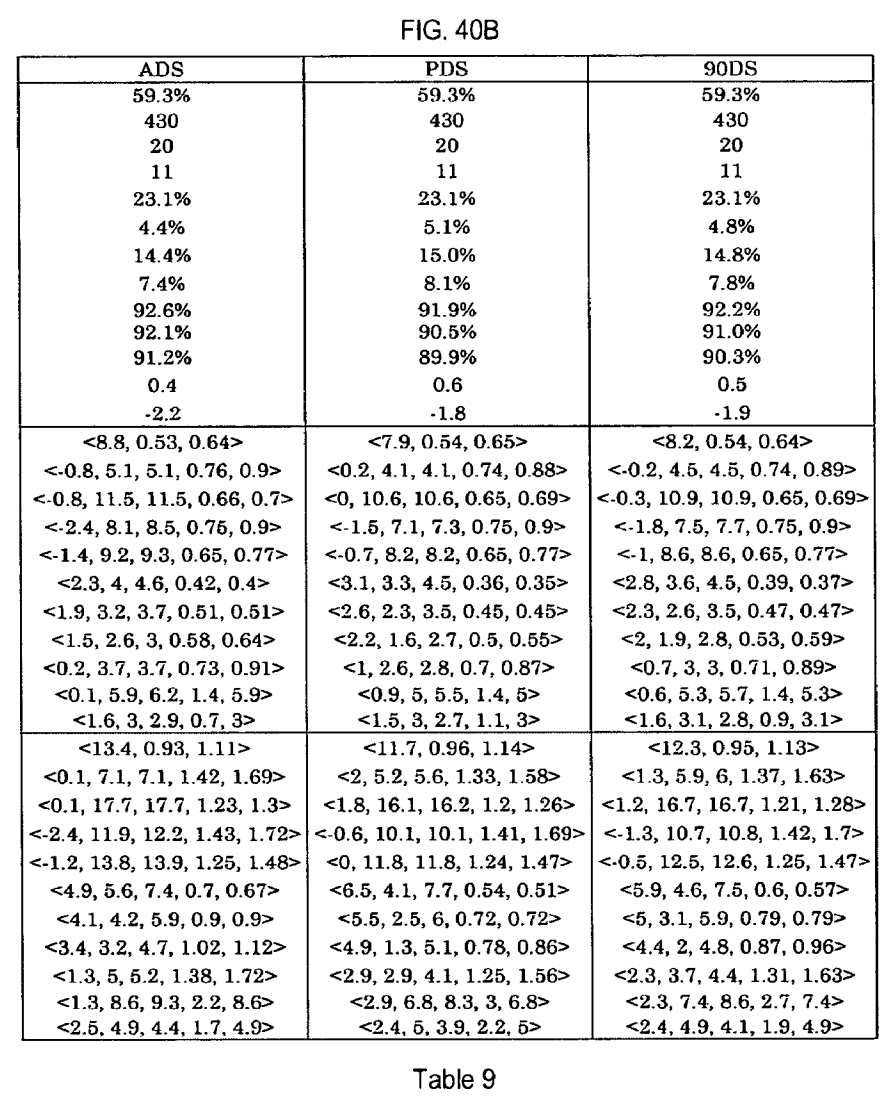

| ADS | PDS | 90DS |
|---|---|---|
| 59.3% | 59.3% | 59.3% |
| 430 | 430 | 430 |
| 20 | 20 | 20 |
| 11 | 11 | 11 |
| 23.1% | 23.1% | 23.1% |
| 4.4% | 5.1% | 4.8% |
| 14.4% | 15.0% | 14.8% |
| 7.4% | 8.1% | 7.8% |
| 92.6% | 91.9% | 92.2% |
| 92.1% | 90.5% | 91.0% |
| 91.2% | 89.9% | 90.3% |
| 0.4 | 0.6 | 0.5 |
| -2.2 | -1.8 | -1.9 |
| <8.8, 0.53, 0.64> | <7.9, 0.54, 0.65> | <8.2, 0.54, 0.64> |
| <-0.8, 5.1, 5.1, 0.76, 0.9> | <0.2, 4.1, 4.1, 0.74, 0.88> | <-0.2, 4.5, 4.5, 0.74, 0.89> |
| <-0.8, 11.5, 11.5, 0.66, 0.7> | <0, 10.6, 10.6, 0.65, 0.69> | <-0.3, 10.9, 10.9, 0.65, 0.69> |
| <-2.4, 8.1, 8.5, 0.75, 0.9> | <-1.5, 7.1, 7.3, 0.75, 0.9> | <-1.8, 7.5, 7.7, 0.75, 0.9> |
| <-1.4, 9.2, 9.3, 0.65, 0.77> | <-0.7, 8.2, 8.2, 0.65, 0.77> | <-1, 8.6, 8.6, 0.65, 0.77> |
| <2.3, 4, 4.6, 0.42, 0.4> | <3.1, 3.3, 4.5, 0.36, 0.35> | <2.8, 3.6, 4.5, 0.39, 0.37> |
| <1.9, 3.2, 3.7, 0.51, 0.51> | <2.6, 2.3, 3.5, 0.45, 0.45> | <2.3, 2.6, 3.5, 0.47, 0.47> |
| <1.5, 2.6, 3, 0.58, 0.64> | <2.2, 1.6, 2.7, 0.5, 0.55> | <2, 1.9, 2.8, 0.53, 0.59> |
| <0.2, 3.7, 3.7, 0.73, 0.91> | <1, 2.6, 2.8, 0.7, 0.87> | <0.7, 3, 3, 0.71, 0.89> |
| <0.1, 5.9, 6.2, 1.4, 5.9> | <0.9, 5, 5.5, 1.4, 5> | <0.6, 5.3, 5.7, 1.4, 5.3> |
| <1.6, 3, 2.9, 0.7, 3> | <1.5, 3, 2.7, 1.1, 3> | <1.6, 3.1, 2.8, 0.9, 3.1> |
| <13.4, 0.93, 1.11> | <11.7, 0.96, 1.14> | <12.3, 0.95, 1.13> |
| <0.1, 7.1, 7.1, 1.42, 1.69> | <2, 5.2, 5.6, 1.33, 1.58> | <1.3, 5.9, 6, 1.37, 1.63> |
| <0.1, 17.7, 17.7, 1.23, 1.3> | <1.8, 16.1, 16.2, 1.2, 1.26> | <1.2, 16.7, 16.7, 1.21, 1.28> |
| <-2.4, 11.9, 12.2, 1.43, 1.72> | <-0.6, 10.1, 10.1, 1.41, 1.69> | <-1.3, 10.7, 10.8, 1.42, 1.7> |
| <-1.2, 13.8, 13.9, 1.25, 1.48> | <0, 11.8, 11.8, 1.24, 1.47> | <-0.5, 12.5, 12.6, 1.25, 1.47> |
| <4.9, 5.6, 7.4, 0.7, 0.67> | <6.5, 4.1, 7.7, 0.54, 0.51> | <5.9, 4.6, 7.5, 0.6, 0.57> |
| <4.1, 4.2, 5.9, 0.9, 0.9> | <5.5, 2.5, 6, 0.72, 0.72> | <5, 3.1, 5.9, 0.79, 0.79> |
| <3.4, 3.2, 4.7, 1.02, 1.12> | <4.9, 1.3, 5.1, 0.78, 0.86> | <4.4, 2, 4.8, 0.87, 0.96> |
| <1.3, 5, 5.2, 1.38, 1.72> | <2.9, 2.9, 4.1, 1.25, 1.56> | <2.3, 3.7, 4.4, 1.31, 1.63> |
| <1.3, 8.6, 9.3, 2.2, 8.6> | <2.9, 6.8, 8.3, 3, 6.8> | <2.3, 7.4, 8.6, 2.7, 7.4> |
| <2.5, 4.9, 4.4, 1.7, 4.9> | <2.4, 5, 3.9, 2.2, 5> | <2.4, 4.9, 4.1, 1.9, 4.9> |

Table 9

FIG. 41A

| Metric | | MBDS | OS |
|---|---|---|---|
| 1st PIP | | 100.0% | 100.0% |
| 1st PIP @ nm | | 400 | 400 |
| FWHM of 1st PIP, from 380 nm (nm) | | 75 | 75 |
| FW80M of 1st PIP, from 380 nm (nm) | | 39 | 39 |
| $TTIP_{380\text{-}430}$ | | 83.8% | 83.8% |
| $TTIP_{450\text{-}500}$ | | 34.5% | 34.5% |
| $TTIP_{520}$ | | 58.1% | 58.4% |
| $TTIP_{780}$ | | 30.0% | 35.0% |
| TTP | | 70.0% | 65.0% |
| Photopic Luminous Transmittance ($V$), CIE D65 | | 73.2% | 57.1% |
| Scotopic Luminous Transmittance ($V'$), CIE D65 | | 67.3% | 62.3% |
| $RG_{LI}$ Color Difference Percent, CIE D65 | | 1.7 | 22.0 |
| $BY_{LI}$ Color Difference Percent, CIE D65 | | -9.9 | -7.3 |
| Single-Pass Tint | <Yellowness Index (YI), $E_{V,YI}$, $E_{V',YI}$> | <35.3, NA, NA> | <14.3, 1.3, 4.15> |
| | CIE D65: <a, b, WPS, $E_{V,WPS}$, $E_{V',WPS}$> | <-7, 22.7, 23.8, NA, NA> | <-3.4, 8.1, 8.8, 0.93, 2.96> |
| | CIE F11: <a, b, WPS, $E_{V,WPS}$, $E_{V',WPS}$> | <-5.8, 26.4, 27, NA, NA> | <2.2, 13.7, 13.9, 0.92, 1.72> |
| | CIE F7: <a, b, WPS, $E_{V,WPS}$, $E_{V',WPS}$> | <-7.9, 24.3, 25.6, NA, NA> | <-4.7, 8.9, 10.1, 0.91, 2.76> |
| | CIE F2: <a, b, WPS, $E_{V,WPS}$, $E_{V',WPS}$> | <-4.9, 25.4, 25.9, NA, NA> | <-2.3, 5.1, 5.7, 0.92, 2.29> |
| | CIE A: <a, b, WPS, $E_{V,WPS}$, $E_{V',WPS}$> | <2.5, 19.4, 19.5, NA, NA> | <10.8, 3.9, 11.5, 0.46, 0.98> |
| | LED-3000K: <a, b, WPS, $E_{V,WPS}$, $E_{V',WPS}$> | <0.6, 22.2, 22.2, NA, NA> | <7.8, 4.5, 9, 0.66, 1.28> |
| | LED-4000K: <a, b, WPS, $E_{V,WPS}$, $E_{V',WPS}$> | <-1.8, 23, 23.1, NA, NA> | <3.5, 5.6, 6.5, 0.85, 1.94> |
| | LED-5000K: <a, b, WPS, $E_{V,WPS}$, $E_{V',WPS}$> | <-6.4, 26.5, 27.2, NA, NA> | <-2.5, 8.5, 8.8, 0.93, 2.28> |
| | <avg(a), avg(b), avg(WPS), avg(\|a\|), avg(\|b\|)> | <-3.8, 23.7, 24.3, 4.6, 23.7> | <1.4, 7.3, 9.3, 4.7, 7.3> |
| | <std(a), std(b), std(WPS), std(\|a\|), std(\|b\|)> | <3.6, 2.3, 2.5, 2.5, 2.3> | <5.3, 3, 2.5, 2.9, 3> |
| Double-Pass Tint | <Yellowness Index (YI), $E_{V,YI}$, $E_{V',YI}$> | <55.3, NA, NA> | <31.2, 1.49, 4.76> |
| | CIE D65: <a, b, WPS, $E_{V,WPS}$, $E_{V',WPS}$> | <-6.9, 33.5, 34.2, NA, NA> | <1.8, 12.2, 12.4, 1.35, 4.31> |
| | CIE F11: <a, b, WPS, $E_{V,WPS}$, $E_{V',WPS}$> | <-7, 39.1, 39.7, NA, NA> | <8.6, 20.2, 22, 1.26, 2.34> |
| | CIE F7: <a, b, WPS, $E_{V,WPS}$, $E_{V',WPS}$> | <-8.3, 35.9, 36.9, NA, NA> | <-0.4, 13.3, 13.3, 1.39, 4.2> |
| | CIE F2: <a, b, WPS, $E_{V,WPS}$, $E_{V',WPS}$> | <-5.4, 37.4, 37.8, NA, NA> | <1.6, 7.3, 7.5, 1.38, 3.43> |
| | CIE A: <a, b, WPS, $E_{V,WPS}$, $E_{V',WPS}$> | <6.5, 29, 29.8, NA, NA> | <22.9, 7.4, 24.1, 0.32, 0.69> |
| | LED-3000K: <a, b, WPS, $E_{V,WPS}$, $E_{V',WPS}$> | <2.7, 34.2, 34.4, NA, NA> | <17.7, 9, 19.9, 0.73, 1.41> |
| | LED-4000K: <a, b, WPS, $E_{V,WPS}$, $E_{V',WPS}$> | <-0.6, 35.7, 35.7, NA, NA> | <11.3, 10.4, 15.3, 1.05, 2.39> |
| | LED-5000K: <a, b, WPS, $E_{V,WPS}$, $E_{V',WPS}$> | <-7.5, 41.3, 42, NA, NA> | <1.5, 14.7, 14.8, 1.38, 3.37> |
| | <avg(a), avg(b), avg(WPS), avg(\|a\|), avg(\|b\|)> | <-3.3, 35.8, 36.3, 5.6, 35.8> | <8.1, 11.8, 16.2, 8.2, 11.8> |
| | <std(a), std(b), std(WPS), std(\|a\|), std(\|b\|)> | <5.2, 3.5, 3.5, 2.5, 3.5> | <8.1, 4, 5.1, 8, 4> |

Table 10

FIG. 41B

| ADS | PDS | 90DS |
|---|---|---|
| 100.0% | 100.0% | 100.0% |
| 400 | 400 | 400 |
| 75 | 75 | 75 |
| 39 | 39 | 39 |
| 83.8% | 83.8% | 83.8% |
| 34.8% | 34.9% | 34.2% |
| 60.3% | 60.8% | 55.6% |
| 35.0% | 36.1% | 24.6% |
| 65.0% | 63.9% | 75.4% |
| 60.0% | 57.1% | 87.7% |
| 59.3% | 57.6% | 76.1% |
| 3.3 | 3.8 | 0.4 |
| -5.9 | -4.9 | -13.2 |
| <22.5, 0.97, 1.6> | <18.9, 1.02, 1.68> | <44.8, 0.66, 1.09> |
| <-1.3, 11.5, 11.6, 0.92, 1.52> | <0.1, 8.9, 8.9, 0.92, 1.53> | <-12, 33.4, 35.4, 0.81, 1.33> |
| <-3.5, 14, 14.5, 0.88, 1.48> | <-2.9, 11.1, 11.4, 0.9, 1.51> | <-7.8, 38.1, 38.8, 0.76, 1.28> |
| <-2.5, 12.9, 13.1, 0.92, 1.51> | <-1.1, 10.2, 10.2, 0.93, 1.53> | <-12.6, 35.2, 37.4, 0.8, 1.31> |
| <-1.9, 13.4, 13.5, 0.87, 1.32> | <-1.2, 10.4, 10.5, 0.88, 1.35> | <-7.4, 36.8, 37.6, 0.75, 1.14> |
| <7.1, 8.9, 11.4, 0.6, 0.78> | <8.3, 6.3, 10.5, 0.55, 0.71> | <-1.6, 29.3, 29.4, 0.67, 0.86> |
| <4.1, 10.9, 11.6, 0.74, 0.91> | <5, 8.1, 9.5, 0.73, 0.89> | <-2.3, 32.8, 32.9, 0.69, 0.84> |
| <2.4, 11.4, 11.6, 0.81, 1.09> | <3.5, 8.6, 9.2, 0.8, 1.08> | <-5.3, 34, 34.4, 0.73, 0.99> |
| <-1.5, 14.3, 14.4, 0.9, 1.29> | <-0.2, 11.4, 11.4, 0.91, 1.31> | <-10.6, 38, 39.4, 0.78, 1.12> |
| <0.4, 12.2, 12.7, 3, 12.2> | <1.4, 9.4, 10.2, 2.8, 9.4> | <-7.4, 34.7, 35.7, 7.4, 34.7> |
| <3.5, 1.7, 1.2, 1.8, 1.7> | <3.5, 1.6, 0.9, 2.6, 1.6> | <3.9, 2.8, 3.1, 3.9, 2.8> |
| <37.5, 1.34, 2.22> | <32.1, 1.44, 2.38> | <66.5, 0.78, 1.29> |
| <3.2, 14.7, 15, 1.45, 2.4> | <5.7, 10.5, 11.9, 1.38, 2.28> | <-15.7, 53, 55.3, 1.45, 2.41> |
| <-3.3, 18, 18.3, 1.51, 2.53> | <-2.4, 13.2, 13.4, 1.52, 2.55> | <-10.1, 60.7, 61.6, 1.41, 2.37> |
| <1.1, 16.7, 16.7, 1.5, 2.45> | <3.5, 12.3, 12.8, 1.47, 2.4> | <-16.5, 55.8, 58.2, 1.45, 2.36> |
| <-0.3, 16.9, 16.9, 1.46, 2.23> | <1.1, 12.2, 12.2, 1.47, 2.24> | <-9.7, 58.2, 59, 1.36, 2.07> |
| <15.8, 11.7, 19.6, 0.75, 0.97> | <18.1, 7.8, 19.7, 0.61, 0.79> | <-1.4, 46.9, 46.9, 1.16, 1.5> |
| <9.6, 15.4, 18.2, 1.14, 1.4> | <11.4, 11.1, 15.9, 1.06, 1.3> | <-2.9, 53.3, 53.4, 1.22, 1.5> |
| <7.2, 16.2, 17.7, 1.27, 1.72> | <9.3, 11.7, 14.9, 1.21, 1.63> | <-7, 55.6, 56, 1.31, 1.78> |
| <1, 20.7, 20.7, 1.49, 2.14> | <3.2, 16, 16.3, 1.47, 2.12> | <-14.7, 62.3, 64, 1.41, 2.02> |
| <4.3, 16.3, 17.9, 5.2, 16.3> | <6.2, 11.9, 14.6, 6.8, 11.9> | <-9.8, 55.7, 56.8, 9.8, 55.7> |
| <5.8, 2.4, 1.7, 5, 2.4> | <6.1, 2.2, 2.5, 5.4, 2.2> | <5.4, 4.5, 4.9, 5.4, 4.5> |

Table 10

FIG. 42A

| | Metric | MBDS | OS |
|---|---|---|---|
| | 1st PIP | 99.9% | 99.9% |
| | 1st PIP @ nm | 386 | 386 |
| | FWHM of 1st PIP, from 380 nm (nm) | 41 | 41 |
| | FW80M of 1st PIP, from 380 nm (nm) | 33 | 33 |
| | $TTIP_{380-450}$ | 65.5% | 65.5% |
| | $TTIP_{450-500}$ | 17.6% | 17.6% |
| | $TTIP_{520}$ | 41.4% | 41.5% |
| | $TTIP_{780}$ | 23.8% | 25.2% |
| | TTP | 76.2% | 74.8% |
| | Photopic Luminous Transmittance (*V*), CIE D65 | 83.8% | 78.8% |
| | Scotopic Luminous Transmittance (*V'*), CIE D65 | 82.3% | 80.6% |
| | $RG_{LI}$ Color Difference Percent, CIE D65 | -0.4 | 5.2 |
| | $BY_{LI}$ Color Difference Percent, CIE D65 | -3.0 | -2.4 |
| Single-Pass Tint | <Yellowness Index (YI), $E_{V,YI}$, $E_{V',YI}$> | <9.7, NA, NA> | <4.4, 1.07, 3.24> |
| | CIE D65: <a, b, WPS, $E_{V,WPS}$, $E_{V',WPS}$> | <-3.4, 6.5, 7.4, NA, NA> | <-1, 2.6, 2.8, 0.92, 2.79> |
| | CIE F11: <a, b, WPS, $E_{V,WPS}$, $E_{V',WPS}$> | <-1.8, 6.2, 6.5, NA, NA> | <1.2, 4.1, 4.3, 0.82, 1.28> |
| | CIE F7: <a, b, WPS, $E_{V,WPS}$, $E_{V',WPS}$> | <-3.2, 6.4, 7.1, NA, NA> | <-1, 2.2, 2.4, 0.89, 2.66> |
| | CIE F2: <a, b, WPS, $E_{V,WPS}$, $E_{V',WPS}$> | <-1.9, 6.7, 6.9, NA, NA> | <0.6, 1.1, 1.3, 0.8, 1.94> |
| | CIE A: <a, b, WPS, $E_{V,WPS}$, $E_{V',WPS}$> | <-0.7, 5, 5.1, NA, NA> | <3, 1, 3.2, 0.37, 0.71> |
| | LED-3000K: <a, b, WPS, $E_{V,WPS}$, $E_{V',WPS}$> | <-0.5, 4.2, 4.2, NA, NA> | <3.2, -0.3, 3.2, 0.18, 0.31> |
| | LED-4000K: <a, b, WPS, $E_{V,WPS}$, $E_{V',WPS}$> | <-1, 4.2, 4.3, NA, NA> | <2.1, -0.4, 2.1, 0.37, 0.79> |
| | LED-5000K: <a, b, WPS, $E_{V,WPS}$, $E_{V',WPS}$> | <-1.8, 4.8, 5.1, NA, NA> | <1, 0, 1, 0.67, 1.55> |
| | <avg(a), avg(b), avg(WPS), avg(\|a\|), avg(\|b\|)> | <-1.8, 5.5, 5.8, 1.8, 5.5> | <1.1, 1.3, 2.5, 1.6, 1.5> |
| | <std(a), std(b), std(WPS), std(\|a\|), std(\|b\|)> | <1, 1, 1.2, 1, 1> | <1.5, 1.5, 1, 0.9, 1.3> |
| Double-Pass Tint | <Yellowness Index (YI), $E_{V,YI}$, $E_{V',YI}$> | <16.1, NA, NA> | <7.2, 1.79, 5.4> |
| | CIE D65: <a, b, WPS, $E_{V,WPS}$, $E_{V',WPS}$> | <-5.3, 10.4, 11.7, NA, NA> | <-0.7, 3.7, 3.8, 1.6, 4.83> |
| | CIE F11: <a, b, WPS, $E_{V,WPS}$, $E_{V',WPS}$> | <-3, 10.7, 11.1, NA, NA> | <2.7, 7.1, 7.6, 1.32, 2.07> |
| | CIE F7: <a, b, WPS, $E_{V,WPS}$, $E_{V',WPS}$> | <-5.1, 10.5, 11.7, NA, NA> | <-0.9, 3.3, 3.4, 1.55, 4.62> |
| | CIE F2: <a, b, WPS, $E_{V,WPS}$, $E_{V',WPS}$> | <-3, 11, 11.4, NA, NA> | <1.6, 1.5, 2.2, 1.31, 3.16> |
| | CIE A: <a, b, WPS, $E_{V,WPS}$, $E_{V',WPS}$> | <-1.1, 8.2, 8.3, NA, NA> | <5.7, 1.5, 5.9, 0.47, 0.9> |
| | LED-3000K: <a, b, WPS, $E_{V,WPS}$, $E_{V',WPS}$> | <-0.9, 7.6, 7.6, NA, NA> | <5.9, 0, 5.9, 0.3, 0.52> |
| | LED-4000K: <a, b, WPS, $E_{V,WPS}$, $E_{V',WPS}$> | <-1.7, 7.7, 7.8, NA, NA> | <4, -0.2, 4, 0.65, 1.37> |
| | LED-5000K: <a, b, WPS, $E_{V,WPS}$, $E_{V',WPS}$> | <-3.1, 8.8, 9.3, NA, NA> | <2.1, 0.5, 2.1, 1.17, 2.7> |
| | <avg(a), avg(b), avg(WPS), avg(\|a\|), avg(\|b\|)> | <-2.9, 9.4, 9.9, 2.9, 9.4> | <2.6, 2.2, 4.4, 3, 2.2> |
| | <std(a), std(b), std(WPS), std(\|a\|), std(\|b\|)> | <1.6, 1.3, 1.7, 1.6, 1.3> | <2.4, 2.3, 1.8, 1.9, 2.2> |

Table 11

FIG. 42B

| ADS | PDS | 90DS |
|---|---|---|
| 99.9% | 99.9% | 99.9% |
| 386 | 386 | 386 |
| 41 | 41 | 41 |
| 33 | 33 | 33 |
| 65.5% | 65.5% | 65.5% |
| 17.6% | 17.6% | 17.6% |
| 41.7% | 41.9% | 41.0% |
| 25.2% | 26.5% | 21.0% |
| 74.8% | 73.5% | 79.0% |
| 81.2% | 78.8% | 88.9% |
| 81.0% | 79.9% | 84.7% |
| -0.4 | -0.4 | -0.4 |
| -2.4 | -1.8 | -4.1 |
| <6.4, 1.26, 2.6> | <3.3, 1.3, 2.68> | <15.6, 1.15, 2.37> |
| <-3.1, 4.6, 5.5, 0.72, 1.48> | <-2.7, 2.8, 3.9, 0.71, 1.46> | <-4.1, 10.2, 11, 0.72, 1.48> |
| <-1.5, 4.1, 4.4, 0.75, 1.35> | <-1.3, 2.1, 2.5, 0.75, 1.35> | <-2.4, 10.2, 10.5, 0.73, 1.32> |
| <-2.8, 4.4, 5.2, 0.73, 1.46> | <-2.4, 2.5, 3.5, 0.72, 1.44> | <-4, 10.1, 10.9, 0.73, 1.45> |
| <-1.7, 4.6, 4.9, 0.74, 1.29> | <-1.4, 2.6, 3, 0.74, 1.29> | <-2.4, 10.6, 10.9, 0.72, 1.26> |
| <-0.7, 3, 3.1, 0.71, 1.15> | <-0.8, 1.1, 1.3, 0.69, 1.12> | <-0.6, 8.9, 8.9, 0.69, 1.12> |
| <-0.4, 2.1, 2.2, 0.72, 1.02> | <-0.4, 0.2, 0.4, 0.69, 0.98> | <-0.6, 8.1, 8.2, 0.69, 0.99> |
| <-0.7, 2.1, 2.3, 0.73, 1.15> | <-0.5, 0.2, 0.6, 0.69, 1.09> | <-1.3, 8.2, 8.3, 0.71, 1.12> |
| <-1.2, 2.7, 3, 0.77, 1.23> | <-0.7, 0.8, 1, 0.76, 1.23> | <-2.8, 8.8, 9.3, 0.74, 1.19> |
| <-1.5, 3.5, 3.8, 1.5, 3.5> | <-1.3, 1.5, 2, 1.3, 1.5> | <-2.3, 9.4, 9.7, 2.3, 9.4> |
| <0.9, 1, 1.2, 0.9, 1> | <0.8, 1, 1.3, 0.8, 1> | <1.3, 0.9, 1.1, 1.3, 0.9> |
| <9.9, 2.4, 4.95> | <3.7, 2.5, 5.17> | <26.8, 2.1, 4.34> |
| <-4.7, 6.8, 8.2, 1.33, 2.75> | <-4.1, 3.4, 5.4, 1.28, 2.64> | <-6.4, 17.5, 18.7, 1.37, 2.83> |
| <-2.5, 6.7, 7.2, 1.4, 2.52> | <-2.1, 3, 3.7, 1.38, 2.49> | <-3.9, 18.3, 18.7, 1.39, 2.51> |
| <-4.4, 6.7, 8.1, 1.36, 2.71> | <-3.8, 3.3, 5.1, 1.32, 2.63> | <-6.4, 17.7, 18.8, 1.38, 2.76> |
| <-2.6, 7.1, 7.5, 1.38, 2.41> | <-2.2, 3.5, 4.1, 1.36, 2.38> | <-3.8, 18.5, 18.9, 1.37, 2.4> |
| <-1.2, 4.4, 4.5, 1.32, 2.14> | <-1.3, 0.9, 1.6, 1.25, 2.02> | <-0.9, 15.5, 15.6, 1.32, 2.14> |
| <-0.8, 3.7, 3.8, 1.34, 1.9> | <-0.7, 0.1, 0.7, 1.26, 1.79> | <-1.1, 15.1, 15.1, 1.32, 1.88> |
| <-1.3, 3.8, 4, 1.36, 2.14> | <-1, 0.2, 1, 1.27, 1.99> | <-2.4, 15.2, 15.4, 1.36, 2.13> |
| <-2.1, 4.8, 5.3, 1.43, 2.3> | <-1.2, 1.2, 1.7, 1.41, 2.27> | <-4.9, 16.4, 17.1, 1.41, 2.27> |
| <-2.5, 5.5, 6.1, 2.5, 5.5> | <-2.1, 1.9, 2.9, 2.1, 1.9> | <-3.7, 16.8, 17.3, 3.7, 16.8> |
| <1.4, 1.4, 1.7, 1.4, 1.4> | <1.2, 1.4, 1.8, 1.2, 1.4> | <2, 1.3, 1.6, 2, 1.3> |

Table 11

FIG. 43A

| Metric | | MBDS | OS |
|---|---|---|---|
| Select PIP | | 44.0% | 44.0% |
| Select PIP @ nm | | 446 | 446 |
| FWHM of Select PIP (nm) | | 31 | 31 |
| FW80M of Select PIP (nm) | | 16 | 16 |
| $TTIP_{380-450}$ | | 49.7% | 49.7% |
| $TTIP_{450-500}$ | | 14.8% | 14.9% |
| $TTIP_{520}$ | | 31.2% | 33.0% |
| $TTIP_{780}$ | | 15.8% | 24.4% |
| TTP | | 84.2% | 75.6% |
| Photopic Luminous Transmittance *(V)*, CIE D65 | | 91.3% | 78.2% |
| Scotopic Luminous Transmittance *(V')*, CIE D65 | | 87.6% | 80.1% |
| $RG_{LI}$ Color Difference Percent, CIE D65 | | -0.1 | -1.7 |
| $BY_{LI}$ Color Difference Percent, CIE D65 | | -5.5 | -1.8 |
| Single-Pass Tint | <Yellowness Index (YI), $E_{V,YI}$, $E_{V',YI}$> | <17.4, NA, NA> | <3.7, 1.05, 1.84> |
| | CIE D65: <a, b, WPS, $E_{V,WPS}$, $E_{V',WPS}$> | <-5.8, 12.2, 13.5, NA, NA> | <-1.6, 2.5, 2.9, 0.81, 1.42> |
| | CIE F11: <a, b, WPS, $E_{V,WPS}$, $E_{V',WPS}$> | <-4, 14.5, 15, NA, NA> | <0.5, 4.9, 5, 0.79, 1.24> |
| | CIE F7: <a, b, WPS, $E_{V,WPS}$, $E_{V',WPS}$> | <-6.1, 13, 14.4, NA, NA> | <-1.5, 3.4, 3.7, 0.82, 1.38> |
| | CIE F2: <a, b, WPS, $E_{V,WPS}$, $E_{V',WPS}$> | <-3.6, 13.7, 14.1, NA, NA> | <1.1, 4.2, 4.4, 0.76, 1.06> |
| | CIE A: <a, b, WPS, $E_{V,WPS}$, $E_{V',WPS}$> | <-1.3, 10.4, 10.5, NA, NA> | <-0.2, 0.8, 0.8, 0.71, 0.96> |
| | LED-3000K: <a, b, WPS, $E_{V,WPS}$, $E_{V',WPS}$> | <-1.6, 14.5, 14.6, NA, NA> | <1.3, 5.2, 5.4, 0.69, 0.8> |
| | LED-4000K: <a, b, WPS, $E_{V,WPS}$, $E_{V',WPS}$> | <-3.3, 15.6, 16, NA, NA> | <0.6, 5.9, 5.9, 0.74, 0.97> |
| | LED-5000K: <a, b, WPS, $E_{V,WPS}$, $E_{V',WPS}$> | <-6, 18, 19, NA, NA> | <-0.3, 8, 8, 0.81, 1.1> |
| | <avg(a), avg(b), avg(WPS), avg(\|a\|), avg(\|b\|)> | <-4, 14, 14.6, 4, 14> | <0, 4.4, 4.5, 0.9, 4.4> |
| | <std(a), std(b), std(WPS), std(\|a\|), std(\|b\|)> | <1.8, 2.1, 2.2, 1.8, 2.1> | <1, 2.1, 2, 0.5, 2.1> |
| Double-Pass Tint | <Yellowness Index (YI), $E_{V,YI}$, $E_{V',YI}$> | <29.7, NA, NA> | <6.1, 1.8, 3.16> |
| | CIE D65: <a, b, WPS, $E_{V,WPS}$, $E_{V',WPS}$> | <-9.7, 21.3, 23.4, NA, NA> | <-2.5, 3.9, 4.6, 1.43, 2.51> |
| | CIE F11: <a, b, WPS, $E_{V,WPS}$, $E_{V',WPS}$> | <-6.6, 25.6, 26.4, NA, NA> | <0.7, 8.3, 8.3, 1.42, 2.25> |
| | CIE F7: <a, b, WPS, $E_{V,WPS}$, $E_{V',WPS}$> | <-10.2, 22.9, 25.1, NA, NA> | <-2.4, 5.6, 6.1, 1.46, 2.45> |
| | CIE F2: <a, b, WPS, $E_{V,WPS}$, $E_{V',WPS}$> | <-6, 24.1, 24.8, NA, NA> | <1.7, 7.1, 7.3, 1.35, 1.9> |
| | CIE A: <a, b, WPS, $E_{V,WPS}$, $E_{V',WPS}$> | <-2.2, 18.1, 18.2, NA, NA> | <-0.1, 0.9, 1, 1.26, 1.71> |
| | LED-3000K: <a, b, WPS, $E_{V,WPS}$, $E_{V',WPS}$> | <-2.7, 25.5, 25.7, NA, NA> | <2.1, 8.9, 9.2, 1.24, 1.43> |
| | LED-4000K: <a, b, WPS, $E_{V,WPS}$, $E_{V',WPS}$> | <-5.4, 27.5, 28.1, NA, NA> | <1, 10.1, 10.1, 1.32, 1.73> |
| | LED-5000K: <a, b, WPS, $E_{V,WPS}$, $E_{V',WPS}$> | <-9.9, 32, 33.5, NA, NA> | <-0.4, 13.9, 13.9, 1.42, 1.95> |
| | <avg(a), avg(b), avg(WPS), avg(\|a\|), avg(\|b\|)> | <-6.6, 24.6, 25.7, 6.6, 24.6> | <0, 7.3, 7.6, 1.4, 7.3> |
| | <std(a), std(b), std(WPS), std(\|a\|), std(\|b\|)> | <3, 3.9, 4, 3, 3.9> | <1.6, 3.7, 3.6, 0.9, 3.7> |

Table 12

FIG. 43B

| ADS | PDS | 90DS |
|---|---|---|
| 44.0% | 44.0% | 44.0% |
| 446 | 446 | 446 |
| 31 | 31 | 31 |
| 16 | 16 | 16 |
| 49.7% | 49.7% | 49.7% |
| 18.3% | 17.9% | 15.2% |
| 34.8% | 34.3% | 31.7% |
| 24.5% | 23.4% | 16.9% |
| 75.5% | 76.6% | 83.1% |
| 76.3% | 78.2% | 89.5% |
| 77.6% | 78.9% | 86.4% |
| -0.5 | -0.5 | -0.1 |
| -1.4 | -2.0 | -5.1 |
| <1.8, 1.04, 1.57> | <4.1, 1.02, 1.53> | <15.8, 0.89, 1.33> |
| <-2.1, 1.7, 2.7, 0.72, 1.09> | <-2.6, 3.1, 4, 0.72, 1.09> | <-5.4, 11, 12.3, 0.69, 1.04> |
| <-1.8, 3.6, 4.1, 0.71, 1.04> | <-2.1, 5, 5.5, 0.71, 1.04> | <-3.7, 13.2, 13.8, 0.68, 0.99> |
| <-2.3, 2.5, 3.4, 0.73, 1.08> | <-2.8, 3.8, 4.8, 0.73, 1.08> | <-5.7, 11.8, 13.1, 0.7, 1.03> |
| <-1.4, 2.9, 3.2, 0.71, 0.99> | <-1.7, 4.3, 4.6, 0.7, 0.99> | <-3.4, 12.4, 12.9, 0.67, 0.94> |
| <-0.5, 0.3, 0.6, 0.63, 0.8> | <-0.6, 1.6, 1.8, 0.64, 0.81> | <-1.2, 9.2, 9.3, 0.61, 0.77> |
| <-0.7, 4, 4.1, 0.67, 0.82> | <-0.8, 5.4, 5.5, 0.66, 0.81> | <-1.5, 13.4, 13.4, 0.63, 0.77> |
| <-1.5, 4.9, 5.1, 0.7, 0.92> | <-1.7, 6.3, 6.5, 0.69, 0.91> | <-3.1, 14.4, 14.8, 0.66, 0.86> |
| <-2.8, 6.9, 7.4, 0.75, 1.06> | <-3.2, 8.4, 9, 0.74, 1.05> | <-5.7, 16.8, 17.7, 0.7, 1> |
| <-1.6, 3.3, 3.8, 1.6, 3.3> | <-1.9, 4.7, 5.2, 1.9, 4.7> | <-3.7, 12.8, 13.4, 3.7, 12.8> |
| <0.7, 1.9, 1.8, 0.7, 1.9> | <0.9, 1.9, 1.9, 0.9, 1.9> | <1.7, 2.1, 2.2, 1.7, 2.1> |
| <1, 1.92, 2.89> | <5.4, 1.85, 2.79> | <27, 1.51, 2.27> |
| <-3.2, 1.7, 3.7, 1.32, 1.99> | <-4.1, 4.2, 5.9, 1.34, 2.01> | <-9, 19, 21, 1.31, 1.97> |
| <-3.1, 5.3, 6.1, 1.32, 1.94> | <-3.6, 7.9, 8.6, 1.32, 1.93> | <-6.2, 23.3, 24.1, 1.29, 1.89> |
| <-3.7, 3.2, 4.9, 1.34, 1.99> | <-4.6, 5.7, 7.3, 1.35, 2> | <-9.5, 20.6, 22.7, 1.32, 1.95> |
| <-2.3, 3.8, 4.5, 1.31, 1.84> | <-2.8, 6.4, 7, 1.31, 1.84> | <-5.6, 21.7, 22.4, 1.28, 1.79> |
| <-0.8, -0.7, 1.1, 1.09, 1.39> | <-1, 1.7, 2, 1.18, 1.5> | <-2.1, 15.9, 16, 1.15, 1.46> |
| <-1.2, 6, 6.1, 1.24, 1.52> | <-1.4, 8.5, 8.6, 1.24, 1.51> | <-2.5, 23.3, 23.4, 1.19, 1.46> |
| <-2.4, 7.5, 7.9, 1.29, 1.7> | <-2.8, 10.1, 10.5, 1.29, 1.69> | <-5.1, 25.2, 25.7, 1.25, 1.64> |
| <-4.5, 11.2, 12, 1.39, 1.97> | <-5.2, 13.8, 14.8, 1.38, 1.96> | <-9.4, 29.6, 31, 1.34, 1.9> |
| <-2.7, 4.8, 5.8, 2.7, 4.9> | <-3.2, 7.3, 8.1, 3.2, 7.3> | <-6.2, 22.3, 23.3, 6.2, 22.3> |
| <1.2, 3.4, 3, 1.2, 3.2> | <1.4, 3.5, 3.4, 1.4, 3.5> | <2.8, 3.9, 4, 2.8, 3.9> |

Table 12

FIG. 44A

| Metric | | MBDS | OS |
|---|---|---|---|
| Select PIP | | 86.1% | 86.1% |
| Select PIP @ nm | | 424 | 424 |
| FWHM of Select PIP (nm) | | 21 | 21 |
| FW80M of Select PIP (nm) | | 11 | 11 |
| $TTIP_{380-450}$ | | 38.9% | 38.9% |
| $TTIP_{450-500}$ | | 4.5% | 4.5% |
| $TTIP_{520}$ | | 21.7% | 22.1% |
| $TTIP_{780}$ | | 9.8% | 13.8% |
| TTP | | 90.2% | 86.2% |
| Photopic Luminous Transmittance *(V)*, CIE D65 | | 95.8% | 85.9% |
| Scotopic Luminous Transmittance *(V')*, CIE D65 | | 93.6% | 89.4% |
| $RG_{LI}$ Color Difference Percent, CIE D65 | | -0.6 | 2.2 |
| $BY_{LI}$ Color Difference Percent, CIE D65 | | -4.7 | -2.9 |
| Single-Pass Tint | <Yellowness Index (YI), $E_{V,YI}$, $E_{V',YI}$> | <14.8, NA, NA> | <4.5, 1.04, 2.45> |
| | CIE D65: <a, b, WPS, $E_{V,WPS}$, $E_{V',WPS}$> | <-5.7, 10.7, 12.1, NA, NA> | <-3.1, 3.6, 4.8, 0.75, 1.76> |
| | CIE F11: <a, b, WPS, $E_{V,WPS}$, $E_{V',WPS}$> | <-4, 13.5, 14.1, NA, NA> | <1.2, 3.5, 3.6, 0.75, 1.2> |
| | CIE F7: <a, b, WPS, $E_{V,WPS}$, $E_{V',WPS}$> | <-6.2, 12.1, 13.6, NA, NA> | <-3, 4.4, 5.3, 0.78, 1.71> |
| | CIE F2: <a, b, WPS, $E_{V,WPS}$, $E_{V',WPS}$> | <-3.7, 12.9, 13.5, NA, NA> | <-1.2, 4.4, 4.5, 0.74, 1.37> |
| | CIE A: <a, b, WPS, $E_{V,WPS}$, $E_{V',WPS}$> | <-1.2, 8.4, 8.5, NA, NA> | <1.5, 1.1, 1.9, 0.63, 1.06> |
| | LED-3000K: <a, b, WPS, $E_{V,WPS}$, $E_{V',WPS}$> | <-0.9, 6.9, 7, NA, NA> | <1.6, -0.9, 1.8, 0.46, 0.68> |
| | LED-4000K: <a, b, WPS, $E_{V,WPS}$, $E_{V',WPS}$> | <-1.5, 6.4, 6.6, NA, NA> | <1.1, -1.5, 1.9, 0.42, 0.72> |
| | LED-5000K: <a, b, WPS, $E_{V,WPS}$, $E_{V',WPS}$> | <-2.9, 7.6, 8.2, NA, NA> | <0.4, -0.5, 0.6, 0.66, 1.19> |
| | <avg(a), avg(b), avg(WPS), avg(\|a\|), avg(\|b\|)> | <-3.3, 9.8, 10.5, 3.3, 9.8> | <-0.2, 1.8, 3.1, 1.6, 2.5> |
| | <std(a), std(b), std(WPS), std(\|a\|), std(\|b\|)> | <1.9, 2.6, 3, 1.9, 2.6> | <1.9, 2.3, 1.6, 0.9, 1.5> |
| Double-Pass Tint | <Yellowness Index (YI), $E_{V,YI}$, $E_{V',YI}$> | <21.3, NA, NA> | <1.6, 1.99, 4.7> |
| | CIE D65: <a, b, WPS, $E_{V,WPS}$, $E_{V',WPS}$> | <-8.1, 15.6, 17.6, NA, NA> | <-3.4, 2.1, 4, 1.37, 3.24> |
| | CIE F11: <a, b, WPS, $E_{V,WPS}$, $E_{V',WPS}$> | <-6.1, 21.6, 22.4, NA, NA> | <3.3, 2.5, 4.1, 1.32, 2.1> |
| | CIE F7: <a, b, WPS, $E_{V,WPS}$, $E_{V',WPS}$> | <-9.2, 18.6, 20.8, NA, NA> | <-3.4, 4, 5.3, 1.45, 3.2> |
| | CIE F2: <a, b, WPS, $E_{V,WPS}$, $E_{V',WPS}$> | <-5.6, 20.2, 20.9, NA, NA> | <-1.1, 3.8, 4, 1.41, 2.6> |
| | CIE A: <a, b, WPS, $E_{V,WPS}$, $E_{V',WPS}$> | <-1.8, 12.3, 12.4, NA, NA> | <3.5, -1.5, 3.8, 0.83, 1.39> |
| | LED-3000K: <a, b, WPS, $E_{V,WPS}$, $E_{V',WPS}$> | <-1.4, 10.9, 11, NA, NA> | <3.3, -4, 5.2, 0.51, 0.77> |
| | LED-4000K: <a, b, WPS, $E_{V,WPS}$, $E_{V',WPS}$> | <-2.4, 10.3, 10.6, NA, NA> | <2.6, -4.7, 5.4, 0.47, 0.8> |
| | LED-5000K: <a, b, WPS, $E_{V,WPS}$, $E_{V',WPS}$> | <-4.6, 12.4, 13.2, NA, NA> | <1.5, -3.1, 3.5, 0.86, 1.54> |
| | <avg(a), avg(b), avg(WPS), avg(\|a\|), avg(\|b\|)> | <-4.9, 15.2, 16.1, 4.9, 15.2> | <0.8, -0.1, 4.4, 2.8, 3.2> |
| | <std(a), std(b), std(WPS), std(\|a\|), std(\|b\|)> | <2.7, 4.1, 4.5, 2.7, 4.1> | <2.8, 3.4, 0.7, 0.9, 1> |

Table 13

FIG. 44B

| ADS | PDS | 90DS |
|---|---|---|
| 86.1% | 86.1% | 86.1% |
| 424 | 424 | 424 |
| 21 | 21 | 21 |
| 11 | 11 | 11 |
| 38.9% | 38.9% | 38.9% |
| 4.7% | 4.8% | 4.7% |
| 22.8% | 23.3% | 22.7% |
| 13.8% | 15.8% | 13.2% |
| 86.2% | 84.2% | 86.8% |
| 89.1% | 85.9% | 90.2% |
| 89.7% | 87.9% | 90.3% |
| -0.8 | -0.9 | -0.8 |
| -3.2 | -2.4 | -3.5 |
| <8, 1, 1.74> | <4.4, 1.04, 1.81> | <9.1, 0.99, 1.72> |
| <-4.5, 6.1, 7.6, 0.68, 1.18> | <-3.8, 3.9, 5.4, 0.68, 1.17> | <-4.7, 6.8, 8.3, 0.68, 1.18> |
| <-3.3, 8.7, 9.3, 0.69, 1.18> | <-2.9, 6.3, 6.9, 0.69, 1.19> | <-3.4, 9.4, 10, 0.69, 1.17> |
| <-4.9, 7.5, 8.9, 0.69, 1.17> | <-4.2, 5.2, 6.7, 0.69, 1.17> | <-5.1, 8.2, 9.7, 0.69, 1.17> |
| <-3, 8.2, 8.7, 0.68, 1.06> | <-2.6, 5.8, 6.3, 0.68, 1.07> | <-3.1, 8.9, 9.4, 0.68, 1.05> |
| <-1.1, 3.8, 4, 0.63, 0.9> | <-1, 1.5, 1.8, 0.63, 0.89> | <-1.1, 4.5, 4.7, 0.63, 0.89> |
| <-0.6, 2.2, 2.3, 0.65, 0.84> | <-0.4, -0.1, 0.4, 0.61, 0.79> | <-0.6, 2.9, 3, 0.64, 0.83> |
| <-0.8, 1.6, 1.8, 0.67, 0.94> | <-0.4, -0.7, 0.9, 0.54, 0.76> | <-0.9, 2.4, 2.5, 0.66, 0.94> |
| <-1.5, 2.8, 3.1, 0.71, 1.05> | <-0.7, 0.4, 0.8, 0.7, 1.04> | <-1.7, 3.5, 3.9, 0.71, 1.04> |
| <-2.5, 5.1, 5.7, 2.5, 5.1> | <-2, 2.8, 3.7, 2, 3> | <-2.6, 5.8, 6.4, 2.6, 5.8> |
| <1.6, 2.7, 3, 1.6, 2.7> | <1.5, 2.7, 2.7, 1.5, 2.4> | <1.6, 2.7, 3, 1.6, 2.7> |
| <8.5, 1.92, 3.34> | <1.2, 2.03, 3.53> | <10.6, 1.89, 3.28> |
| <-5.9, 6.8, 9, 1.29, 2.24> | <-4.7, 2.5, 5.3, 1.24, 2.16> | <-6.2, 8.1, 10.2, 1.3, 2.26> |
| <-4.9, 12.2, 13.2, 1.33, 2.27> | <-4.4, 7.6, 8.8, 1.33, 2.26> | <-5.1, 13.7, 14.6, 1.33, 2.27> |
| <-6.9, 9.7, 11.9, 1.31, 2.24> | <-5.7, 5.3, 7.8, 1.3, 2.2> | <-7.3, 11, 13.2, 1.32, 2.24> |
| <-4.3, 10.9, 11.7, 1.31, 2.04> | <-3.6, 6.4, 7.3, 1.31, 2.03> | <-4.5, 12.3, 13.1, 1.31, 2.04> |
| <-1.5, 3.4, 3.7, 1.22, 1.73> | <-1.3, -0.9, 1.6, 1.02, 1.45> | <-1.5, 4.8, 5, 1.23, 1.73> |
| <-0.7, 1.8, 1.9, 1.25, 1.62> | <-0.4, -2.7, 2.7, 0.77, 1> | <-0.8, 3.2, 3.3, 1.25, 1.62> |
| <-1.1, 1.1, 1.5, 1.28, 1.8> | <-0.3, -3.4, 3.5, 0.68, 0.96> | <-1.3, 2.5, 2.8, 1.29, 1.82> |
| <-1.9, 3, 3.5, 1.37, 2.03> | <-0.5, -1.6, 1.7, 1.1, 1.63> | <-2.3, 4.4, 5, 1.37, 2.03> |
| <-3.4, 6.1, 7.1, 3.4, 6.1> | <-2.6, 1.7, 4.8, 2.6, 3.8> | <-3.6, 7.5, 8.4, 3.6, 7.5> |
| <2.2, 4.1, 4.6, 2.2, 4.1> | <2.1, 4.1, 2.7, 2.1, 2.2> | <2.3, 4.1, 4.6, 2.3, 4.1> |

Table 13

FIG. 45A

| Metric | | MBDS | OS |
|---|---|---|---|
| Select PIP | | 75.9% | 75.9% |
| Select PIP @ nm | | 424 | 424 |
| FWHM of Select PIP (nm) | | 19 | 19 |
| FW80M of Select PIP (nm) | | 11 | 11 |
| $TTIP_{380\text{-}450}$ | | 42.4% | 42.4% |
| $TTIP_{430\text{-}500}$ | | 5.4% | 5.7% |
| $TTIP_{520}$ | | 24.0% | 24.7% |
| $TTIP_{780}$ | | 10.8% | 14.2% |
| TTP | | 89.2% | 85.8% |
| Photopic Luminous Transmittance *(V)*, CIE D65 | | 94.6% | 86.3% |
| Scotopic Luminous Transmittance *(V')*, CIE D65 | | 92.9% | 88.2% |
| $RG_{LI}$ Color Difference Percent, CIE D65 | | -0.5 | -1.5 |
| $BY_{LI}$ Color Difference Percent, CIE D65 | | -3.8 | -1.6 |
| Single-Pass Tint | <Yellowness Index (YI), $E_{V,YI}$, $E_{V',YI}$> | <11.8, NaN, NaN> | <3.4, 1, 1.77> |
| | CIE D65: <a, b, WPS, $E_{V,WPS}$, $E_{V',WPS}$> | <-4.6, 8.4, 9.6, NaN, NaN> | <-1.9, 2.6, 3.2, 0.77, 1.35> |
| | CIE F11: <a, b, WPS, $E_{V,WPS}$, $E_{V',WPS}$> | <-3.1, 10.2, 10.6, NaN, NaN> | <-0.3, 3.1, 3.1, 0.75, 1.16> |
| | CIE F7: <a, b, WPS, $E_{V,WPS}$, $E_{V',WPS}$> | <-4.8, 9.3, 10.5, NaN, NaN> | <-2.1, 3.3, 3.9, 0.77, 1.32> |
| | CIE F2: <a, b, WPS, $E_{V,WPS}$, $E_{V',WPS}$> | <-2.9, 9.9, 10.3, NaN, NaN> | <-1.3, 3.9, 4.1, 0.72, 1.08> |
| | CIE A: <a, b, WPS, $E_{V,WPS}$, $E_{V',WPS}$> | <-1, 6.6, 6.6, NaN, NaN> | <0.5, 0.8, 1, 0.66, 0.9> |
| | LED-3000K: <a, b, WPS, $E_{V,WPS}$, $E_{V',WPS}$> | <-0.7, 5.2, 5.2, NaN, NaN> | <0.6, -0.8, 1, 0.47, 0.58> |
| | LED-4000K: <a, b, WPS, $E_{V,WPS}$, $E_{V',WPS}$> | <-1.2, 4.7, 4.9, NaN, NaN> | <0.8, -1.4, 1.6, 0.37, 0.5> |
| | LED-5000K: <a, b, WPS, $E_{V,WPS}$, $E_{V',WPS}$> | <-2.2, 5.7, 6.1, NaN, NaN> | <0.8, -0.7, 1, 0.56, 0.78> |
| | <avg(a), avg(b), avg(WPS), avg(\|a\|), avg(\|b\|)> | <-2.6, 7.5, 8, 2.6, 7.5> | <-0.4, 1.4, 2.4, 1, 2.1> |
| | <std(a), std(b), std(WPS), std(\|a\|), std(\|b\|)> | <1.5, 2.1, 2.3, 1.5, 2.1> | <1.2, 2, 1.3, 0.6, 1.2> |
| Double-Pass Tint | <Yellowness Index (YI), $E_{V,YI}$, $E_{V',YI}$> | <17.9, NaN, NaN> | <1.7, 1.94, 3.42> |
| | CIE D65: <a, b, WPS, $E_{V,WPS}$, $E_{V',WPS}$> | <-6.8, 12.8, 14.5, NaN, NaN> | <-2, 1.6, 2.6, 1.43, 2.52> |
| | CIE F11: <a, b, WPS, $E_{V,WPS}$, $E_{V',WPS}$> | <-4.9, 16.9, 17.6, NaN, NaN> | <0, 3.3, 3.3, 1.43, 2.19> |
| | CIE F7: <a, b, WPS, $E_{V,WPS}$, $E_{V',WPS}$> | <-7.5, 14.9, 16.6, NaN, NaN> | <-2.7, 3.4, 4.3, 1.45, 2.49> |
| | CIE F2: <a, b, WPS, $E_{V,WPS}$, $E_{V',WPS}$> | <-4.5, 16, 16.6, NaN, NaN> | <-1.8, 4.5, 4.8, 1.36, 2.06> |
| | CIE A: <a, b, WPS, $E_{V,WPS}$, $E_{V',WPS}$> | <-1.4, 10, 10.1, NaN, NaN> | <1.2, -1, 1.5, 1, 1.35> |
| | LED-3000K: <a, b, WPS, $E_{V,WPS}$, $E_{V',WPS}$> | <-1.1, 8.4, 8.4, NaN, NaN> | <1.3, -3.1, 3.4, 0.57, 0.7> |
| | LED-4000K: <a, b, WPS, $E_{V,WPS}$, $E_{V',WPS}$> | <-1.9, 7.8, 8, NaN, NaN> | <1.6, -3.9, 4.2, 0.42, 0.58> |
| | LED-5000K: <a, b, WPS, $E_{V,WPS}$, $E_{V',WPS}$> | <-3.5, 9.4, 10, NaN, NaN> | <1.9, -2.8, 3.4, 0.74, 1.04> |
| | <avg(a), avg(b), avg(WPS), avg(\|a\|), avg(\|b\|)> | <-3.9, 12, 12.7, 3.9, 12> | <-0.1, 0.3, 3.4, 1.6, 3> |
| | <std(a), std(b), std(WPS), std(\|a\|), std(\|b\|)> | <2.3, 3.4, 3.7, 2.3, 3.4> | <1.7, 3.1, 1, 0.7, 1.1> |

Table 14

FIG. 45B

| ADS | PDS | 90DS |
|---|---|---|
| 75.9% | 75.9% | 75.9% |
| 424 | 424 | 424 |
| 19 | 19 | 19 |
| 11 | 11 | 11 |
| 42.4% | 42.4% | 42.4% |
| 9.0% | 9.8% | 7.9% |
| 26.3% | 26.8% | 25.6% |
| 14.2% | 15.0% | 13.2% |
| 85.8% | 85.0% | 86.8% |
| 87.8% | 86.3% | 89.9% |
| 87.5% | 86.3% | 89.2% |
| -0.6 | -0.6 | -0.6 |
| -2.2 | -1.8 | -2.7 |
| <6.5, 0.78, 0.99> | <5.2, 0.79, 1.01> | <8.2, 0.76, 0.97> |
| <-2.7, 4.5, 5.3, 0.63, 0.8> | <-2.3, 3.6, 4.3, 0.63, 0.8> | <-3.3, 5.7, 6.6, 0.62, 0.79> |
| <-2, 6.1, 6.4, 0.6, 0.75> | <-1.7, 5.2, 5.4, 0.61, 0.75> | <-2.3, 7.4, 7.7, 0.6, 0.74> |
| <-3, 5.3, 6.1, 0.63, 0.8> | <-2.6, 4.4, 5.1, 0.64, 0.81> | <-3.6, 6.6, 7.5, 0.63, 0.8> |
| <-1.9, 5.8, 6.1, 0.6, 0.75> | <-1.6, 4.9, 5.1, 0.61, 0.75> | <-2.2, 7.1, 7.4, 0.6, 0.74> |
| <-0.3, 3.1, 3.1, 0.51, 0.57> | <-0.2, 2.3, 2.3, 0.51, 0.57> | <-0.5, 4.2, 4.2, 0.5, 0.56> |
| <-0.2, 1, 1.1, 0.59, 0.68> | <-0.1, 0.1, 0.1, 0.59, 0.69> | <-0.3, 2.3, 2.4, 0.58, 0.68> |
| <-0.2, 0.5, 0.5, 0.62, 0.77> | <0, -0.5, 0.5, 0.51, 0.63> | <-0.5, 1.8, 1.9, 0.62, 0.76> |
| <-0.6, 1.1, 1.2, 0.69, 0.94> | <-0.2, 0.1, 0.2, 0.69, 0.93> | <-1.1, 2.5, 2.7, 0.69, 0.93> |
| <-1.4, 3.4, 3.7, 1.4, 3.4> | <-1.1, 2.5, 2.9, 1.1, 2.6> | <-1.7, 4.7, 5.1, 1.7, 4.7> |
| <1.1, 2.2, 2.4, 1.1, 2.2> | <1, 2.2, 2.2, 1, 2> | <1.2, 2.1, 2.3, 1.2, 2.1> |
| <7.8, 1.48, 1.88> | <5.2, 1.52, 1.93> | <11.1, 1.42, 1.81> |
| <-3.4, 5.3, 6.3, 1.2, 1.53> | <-2.5, 3.6, 4.4, 1.21, 1.54> | <-4.4, 7.7, 8.9, 1.19, 1.52> |
| <-3, 9.1, 9.5, 1.15, 1.43> | <-2.5, 7.3, 7.7, 1.16, 1.43> | <-3.6, 11.5, 12, 1.14, 1.41> |
| <-4.2, 7.2, 8.4, 1.21, 1.53> | <-3.4, 5.5, 6.5, 1.21, 1.54> | <-5.2, 9.6, 10.9, 1.2, 1.52> |
| <-2.7, 8.2, 8.6, 1.15, 1.42> | <-2.3, 6.4, 6.8, 1.16, 1.43> | <-3.3, 10.6, 11.1, 1.14, 1.41> |
| <-0.2, 3.3, 3.3, 0.97, 1.09> | <0.1, 1.8, 1.8, 0.98, 1.1> | <-0.6, 5.4, 5.4, 0.96, 1.09> |
| <-0.1, 0.4, 0.4, 1.14, 1.32> | <0.1, -1.4, 1.4, 0.82, 0.95> | <-0.4, 2.9, 2.9, 1.13, 1.31> |
| <0, -0.4, 0.5, 1.08, 1.33> | <0.4, -2.3, 2.3, 0.67, 0.82> | <-0.6, 2.1, 2.2, 1.2, 1.47> |
| <-0.5, 0.6, 0.8, 1.34, 1.8> | <0.2, -1.4, 1.4, 1.02, 1.38> | <-1.5, 3.3, 3.6, 1.33, 1.8> |
| <-1.8, 4.2, 4.7, 1.8, 4.3> | <-1.2, 2.4, 4, 1.4, 3.7> | <-2.5, 6.6, 7.1, 2.5, 6.6> |
| <1.6, 3.5, 3.7, 1.6, 3.4> | <1.5, 3.6, 2.5, 1.3, 2.2> | <1.8, 3.5, 3.8, 1.8, 3.5> |

Table 14

| Figure # of OS | Spectral Variability Determination | Max Value | Sum Total Value | Starting Wavelength (nm) | Ending Wavelength (nm) |
|---|---|---|---|---|---|
| 7 | HVS | 6.5 | 26.4 | 500 | 713 |
| 9 | HVS | 3.3 | 17.3 | 499 | 716 |
| 11 | LVS | 2.3 | 14.4 | 516 | 689 |
| 13 | HVS | 3.9 | 23.5 | 514 | 691 |
| 15 | LVS | 1.7 | 5.0 | 497 | 652 |
| 17 | HVS | 6.9 | 13.5 | 514 | 597 |
| 19 | HVS | 7.8 | 36.0 | 510 | 627 |
| 21 | HVS | 3.2 | 18.5 | 523 | 692 |
| 23 | HVS | 9.7 | 39.5 | 503 | 702 |
| 25 | LVS | 3.2 | 12.6 | 512 | 717 |
| 27 | LVS | 2.4 | 7.1 | 506 | 661 |

Table 15

FIG. 46

| | BluTech Lens | Essilor Lens A | Essilor Lens B |
|---|---|---|---|
| Peak Inhibition Percentage (PIP) | 100% | 53% | 36.5% |
| PIP @ Wavelength (nm) | 400 | 380 | 422 |
| FWHM of PIP (nm) | 46 | 48 | 17 |
| FW80M of PIP (nm) | 35 | 9 | 8 |
| Photopic Luminous Transmittance (*V*), CIE D65 | 85.1% | 92.3% | 97.8% |
| Scotopic Luminous Transmittance (*V'*), CIE D65 | 79.7% | 88.4% | 97.1% |
| Single-Pass Yellowness Index (YI) | 34.6 | 13.4 | 4.3 |
| Double-Pass YI | 20.1 | 25.0 | 7.6 |
| Single-Pass <a,b>, D65 | <-2.5, 12.0> | <-2.3, 8.3> | <-0.7, 2.6> |
| Double-Pass <a,b>, D65 | <-2.7, 20.0> | <-3.8, 15.6> | <-1.1, 4.6> |

*Prior Art*

Figure 48

Prior Art

5200

| | | |
|---|---|---|
| Photopic (V) and Scotopic (V') Luminous Transmittance | CIE D65: <V ,V' > | <94 , 88 > |
| | CIE F11: <V ,V' > | <94 , 88 > |
| | CIE F7 <V , V'> | <94 , 88> |
| | CIE F2 <V , V'> | <95 , 88> |
| | CIE A <V , V'> | <95 , 91> |
| | LED 3000K <V , V'> | <95 , 90> |
| | LED 4000K <V , V'> | <95 , 88> |
| | LED 5000K <V , V'> | <94 , 88.5> |
| | <avg (V), avg(V')> | <95, 88> |
| | <std(V), std(V')> | <0.5 , 1.6> |

*FIG. 53B*

| Metric | | OS |
|---|---|---|
| Spectral Plateau Avg. Transmittance | | 48% |
| Spectral Plateau Center @nm | | 423 |
| Width of Spectral Plateau (nm) | | 52 |
| Thickness of Spectral Plateau (%) | | 9 |
| $TTIP_{380-450}$ | | 56.3% |
| $TTIP_{450-500}$ | | 14.2% |
| $TTIP_{520}$ | | 34.0% |
| $TTIP_{780}$ | | 13.9% |
| TTP | | 86.1% |
| Photopic Luminous Transmittance *(V)*, CIE D65 | | 94% |
| Scotopic Luminous Transmittance *(V')*, CIE D65 | | 88% |
| Single-Pass Tint | <Yellowness Index (YI)> | <27.8> |
| | CIE D65: <a, b, WPS> | <-7.2, 19.4, 20.7> |
| | CIE F11: <a, b, WPS> | <-4.4, 23.5, 23.9> |
| | CIE F7: <a, b, WPS> | <-7.8, 21.1, 22.5> |
| | CIE F2: <a, b, WPS> | <-4.2, 22.4, 22.8> |
| | CIE A: <a, b, WPS> | <-0.2, 16.6, 16.6> |
| | LED-3000K: <a, b, WPS> | <-0.6, 20.8, 20.8> |
| | LED-4000K: <a, b, WPS> | <-2.7, 21.7, 21.9> |
| | LED-5000K: <a, b, WPS> | <-6.5, 25, 25.9> |
| | <avg(a), avg(b), avg(WPS), avg(\|a\|), avg(\|b\|)> | <-4.2, 21.3, 21.9, 4.2, 21.3> |
| | <std(a), std(b), std(WPS), std(\|a\|), std(\|b\|)> | <2.7, 2.4, 2.5, 2.7, 2.4> |
| Double-Pass Tint | <Yellowness Index (YI)> | <45.2> |
| | CIE D65: <a, b, WPS> | <-10.5, 32.9, 34.6> |
| | CIE F11: <a, b, WPS> | <-6, 39.9, 40.4> |
| | CIE F7: <a, b, WPS> | <-11.4, 35.6, 37.4> |
| | CIE F2: <a, b, WPS> | <-5.9, 38, 38.4> |
| | CIE A: <a, b, WPS> | <0.5, 28, 28> |
| | LED-3000K: <a, b, WPS> | <-0.2, 35.7, 35.7> |
| | LED-4000K: <a, b, WPS> | <-3.4, 37.4, 37.5> |
| | LED-5000K: <a, b, WPS> | <-9.4, 43.5, 44.5> |
| | <avg(a), avg(b), avg(WPS), avg(\|a\|), avg(\|b\|)> | <-5.8, 36.4, 37.1, 5.9, 36.4> |
| | <std(a), std(b), std(WPS), std(\|a\|), std(\|b\|)> | <4.2, 4.3, 4.5, 4.1, 4.3> |

| | | |
|---|---|---|
| Photopic (V) and Scotopic (V') Luminous Transmittances | CIE D65: <V ,V' > | <96 , 92> |
| | CIE F11: <V .V' > | <92 . 92> |
| | CIE F7 <V , V'> | <96 , 92 > |
| | CIE F2 <V , V'> | <97 , 93> |
| | CIE A <V , V'> | <97 , 94> |
| | LED 3000K <V , V'> | <97 , 94> |
| | LED 4000K <V , V'> | <97 , 93> |
| | LED 5000K <V , V'> | <96 , 91> |
| | <avg (V). avg(V')> | <96, 93> |
| | <std(V). std(V')> | <0.3. 1.1> |

*FIG. 54B*

<table>
<tr><th colspan="2">Metric</th><th>OS</th></tr>
<tr><td colspan="2">Spectral Plateau Avg. Transmittance</td><td>65%</td></tr>
<tr><td colspan="2">Spectral Plateau Center @nm</td><td>428</td></tr>
<tr><td colspan="2">Width of Spectral Plateau (nm)</td><td>45</td></tr>
<tr><td colspan="2">Thickness of Spectral Plateau (%)</td><td>8</td></tr>
<tr><td colspan="2">$TTIP_{380-450}$</td><td>44.0%</td></tr>
<tr><td colspan="2">$TTIP_{450-500}$</td><td>9.1%</td></tr>
<tr><td colspan="2">$TTIP_{520}$</td><td>25.7%</td></tr>
<tr><td colspan="2">$TTIP_{780}$</td><td>10.4%</td></tr>
<tr><td colspan="2">TTP</td><td>89.6%</td></tr>
<tr><td colspan="2">Photopic Luminous Transmittance (V), CIE D65</td><td>96%</td></tr>
<tr><td colspan="2">Scotopic Luminous Transmittance (V'), CIE D65</td><td>92%</td></tr>
<tr><td rowspan="11">Single-Pass Tint</td><td><Yellowness Index (YI)></td><td><17.9></td></tr>
<tr><td>CIE D65: <a, b, WPS></td><td><-5.3, 12.4, 13.5></td></tr>
<tr><td>CIE F11: <a, b, WPS></td><td><-3.5, 14.8, 15.2></td></tr>
<tr><td>CIE F7: <a, b, WPS></td><td><-5.6, 13.3, 14.5></td></tr>
<tr><td>CIE F2: <a, b, WPS></td><td><-3.2, 14.1, 14.5></td></tr>
<tr><td>CIE A: <a, b, WPS></td><td><-0.6, 10.5, 10.5></td></tr>
<tr><td>LED-3000K: <a, b, WPS></td><td><-0.8, 13.1, 13.1></td></tr>
<tr><td>LED-4000K: <a, b, WPS></td><td><-2.2, 13.7, 13.9></td></tr>
<tr><td>LED-5000K: <a, b, WPS></td><td><-4.7, 15.7, 16.4></td></tr>
<tr><td><avg(a), avg(b), avg(WPS), avg(| a| ), avg(| b| )></td><td><-3.2, 13.5, 14, 3.2, 13.5></td></tr>
<tr><td><std(a), std(b), std(WPS), std(| a| ), std(| b| )></td><td><1.8, 1.5, 1.6, 1.8, 1.5></td></tr>
<tr><td rowspan="11">Double-Pass Tint</td><td><Yellowness Index (YI)></td><td><31.2></td></tr>
<tr><td>CIE D65: <a, b, WPS></td><td><-8.8, 22.4, 24></td></tr>
<tr><td>CIE F11: <a, b, WPS></td><td><-5.7, 26.8, 27.4></td></tr>
<tr><td>CIE F7: <a, b, WPS></td><td><-9.4, 24.1, 25.9></td></tr>
<tr><td>CIE F2: <a, b, WPS></td><td><-5.2, 25.5, 26.1></td></tr>
<tr><td>CIE A: <a, b, WPS></td><td><-0.7, 18.9, 18.9></td></tr>
<tr><td>LED-3000K: <a, b, WPS></td><td><-1.1, 23.9, 23.9></td></tr>
<tr><td>LED-4000K: <a, b, WPS></td><td><-3.6, 25, 25.3></td></tr>
<tr><td>LED-5000K: <a, b, WPS></td><td><-7.8, 29, 30></td></tr>
<tr><td><avg(a), avg(b), avg(WPS), avg(| a| ), avg(| b| )></td><td><-5.3, 24.5, 25.2 ,5.3 24.5></td></tr>
<tr><td><std(a), std(b), std(WPS), std(| a| ), std(| b| )></td><td><3.1, 2.8, 3, 3.1, 2.8></td></tr>
</table>

| | | |
|---|---|---|
| Photopic (V) and Scotopic (V') Luminous Transmittances | CIE D65: <V ,V' > | <92 , 85> |
| | CIE F11: <V ,V' > | <93 , 95> |
| | CIE F7 <V , V'> | <92 , 85 > |
| | CIE F2 <V , V'> | <93 , 85> |
| | CIE A <V , V'> | <94 , 89> |
| | LED 3000K <V , V'> | <94 , 88> |
| | LED 4000K <V , V'> | <93 , 86> |
| | LED 5000K <V , V'> | <93 , 86> |
| | <avg (V), avg(V')> | <93 , 86 > |
| | <std(V), std(V')> | <0.9 , 1.9 > |

FIG. 55B

| Metric | | OS |
|---|---|---|
| Spectral Plateau Avg. Transmittance | | 40% |
| Spectral Plateau Center @nm | | 418 |
| Width of Spectral Plateau (nm) | | 42 |
| Thickness of Spectral Plateau (%) | | 7 |
| $TTIP_{380\text{-}450}$ | | 64.5% |
| $TTIP_{450\text{-}500}$ | | 18.4% |
| $TTIP_{520}$ | | 39.9% |
| $TTIP_{780}$ | | 16.7% |
| TTP | | 83.3% |
| Photopic Luminous Transmittance *(V)*, CIE D65 | | 92% |
| Scotopic Luminous Transmittance *(V')*, CIE D65 | | 85% |
| Single-Pass Tint | <Yellowness Index (YI)> | <33.5> |
| | CIE D65: <a, b, WPS> | <-9.1, 24.1, 25.7> |
| | CIE F11: <a, b, WPS> | <-5.8, 29.3, 29.9> |
| | CIE F7: <a, b, WPS> | <-9.8, 26.2, 28> |
| | CIE F2: <a, b, WPS> | <-5.4, 27.9, 28.4> |
| | CIE A: <a, b, WPS> | <-0.7, 20.5, 20.5> |
| | LED-3000K: <a, b, WPS> | <-1.1, 25.1, 25.2> |
| | LED-4000K: <a, b, WPS> | <-3.5, 26.1, 26.3> |
| | LED-5000K: <a, b, WPS> | <-7.9, 30, 31.1> |
| | <avg(a), avg(b), avg(WPS), avg(\| a\| ), avg(\| b\| )> | <-5.4, 26.2, 26.9, 5.4, 26.2> |
| | <std(a), std(b), std(WPS), std(\| a\| ), std(\| b\| )> | <3.2, 2.9, 3.1, 3.2, 2.9> |
| Double-Pass Tint | <Yellowness Index (YI)> | <52.2> |
| | CIE D65: <a, b, WPS> | <-12.6, 39.3, 41.2> |
| | CIE F11: <a, b, WPS> | <-7.5, 47.7, 48.2> |
| | CIE F7: <a, b, WPS> | <-13.5, 42.5, 44.6> |
| | CIE F2: <a, b, WPS> | <-7.2, 45.3, 45.8> |
| | CIE A: <a, b, WPS> | <-0.2, 33.4, 33.4> |
| | LED-3000K: <a, b, WPS> | <-0.9, 41.8, 41.8> |
| | LED-4000K: <a, b, WPS> | <-4.5, 43.7, 43.9> |
| | LED-5000K: <a, b, WPS> | <-11.1, 50.7, 51.9> |
| | <avg(a), avg(b), avg(WPS), avg(\| a\| ), avg(\| b\| )> | <-7.2, 43.1, 43.8, 7.2, 43.1> |
| | <std(a), std(b), std(WPS), std(\| a\| ), std(\| b\| )> | <4.7, 4.9, 5.1, 4.7, 4.9> |

| | | |
|---|---|---|
| Photopic (V) and Scotopic (V') Luminous Transmittances | CIE D65: <V ,V' > | <92 , 85> |
| | CIE F11: <V ,V' > | <93 , 95> |
| | CIE F7 <V , V'> | <92 , 85 > |
| | CIE F2 <V , V'> | <93 , 85> |
| | CIE A <V , V'> | <94 , 89> |
| | LED 3000K <V , V'> | <94 , 88> |
| | LED 4000K <V , V'> | <93 , 86> |
| | LED 5000K <V , V'> | <93 , 86> |
| | <avg (V), avg(V')> | <93 , 86 > |
| | <std(V), std(V')> | <0.9 , 1.9 > |

*FIG. 56B*

| | Metric | OS |
|---|---|---|
| | Spectral Plateau Avg. Transmittance | 40% |
| | Spectral Plateau Center @nm | 413 |
| | Width of Spectral Plateau (nm) | 31 |
| | Thickness of Spectral Plateau (%) | 5 |
| | $TTIP_{380-450}$ | 64.6% |
| | $TTIP_{450-500}$ | 18.4% |
| | $TTIP_{520}$ | 40.0% |
| | $TTIP_{780}$ | 16.7% |
| | TTP | 83.3% |
| | Photopic Luminous Transmittance *(V)*, CIE D65 | 92% |
| | Scotopic Luminous Transmittance *(V')*, CIE D65 | 85% |
| Single-Pass Tint | <Yellowness Index (YI)> | <33.5> |
| | CIE D65: <a, b, WPS> | <-9.2, 24.1, 25.8> |
| | CIE F11: <a, b, WPS> | <-5.8, 29.4, 30, 0.58> |
| | CIE F7: <a, b, WPS> | <-9.9, 26.3, 28.1> |
| | CIE F2: <a, b, WPS> | <-5.5, 27.9, 28.5> |
| | CIE A: <a, b, WPS> | <-0.7, 20.6, 20.6> |
| | LED-3000K: <a, b, WPS> | <-1.1, 25.2, 25.2> |
| | LED-4000K: <a, b, WPS> | <-3.5, 26.2, 26.4> |
| | LED-5000K: <a, b, WPS> | <-7.9, 30.1, 31.1> |
| | <avg(a), avg(b), avg(WPS), avg(\| a\| ), avg(\| b\| )> | <-5.4, 26.2, 27, 5.4, 26.2> |
| | <std(a), std(b), std(WPS), std(\| a\| ), std(\| b\| )> | <3.3, 2.9, 3.1, 3.3, 2.9> |
| Double-Pass Tint | <Yellowness Index (YI)> | <52.2> |
| | CIE D65: <a, b, WPS> | <-12.6, 39.3, 41.3> |
| | CIE F11: <a, b, WPS> | <-7.5, 47.7, 48.3 |
| | CIE F7: <a, b, WPS> | <-13.5, 42.6, 44.7> |
| | CIE F2: <a, b, WPS> | <-7.2, 45.3, 45.9> |
| | CIE A: <a, b, WPS> | <-0.2, 33.4, 33.4> |
| | LED-3000K: <a, b, $WPS_S$> | <-0.9, 41.9, 41.9> |
| | LED-4000K: <a, b, WPS> | <-4.5, 43.7, 44> |
| | LED-5000K: <a, b, WPS> | <-11.1, 50.8, 52> |
| | <avg(a), avg(b), avg(WPS), avg(\| a\| ), avg(\| b\| )> | <-7.2, 43.1, 43.9, 7.2, 43.1> |
| | <std(a), std(b), std(WPS), std(\| a\| ), std(\| b\| )> | <4.7, 4.9, 5.1, 4.7, 4.9> |

*FIG. 57B*

| Metric | | MBDS | OS |
|---|---|---|---|
| Spectral Plateau Avg. Transmittance | | 65% | 65% |
| Spectral Plateau Center @ nm | | 428 | 428 |
| Width of Spectral Plateau (nm) | | 45 | 45 |
| Thickness of Spectral Plateau (%) | | 8 | 8 |
| $TTIP_{380-450}$ | | 46.2% | 46.2% |
| $TTIP_{450-500}$ | | 12.7% | 13.1% |
| $TTIP_{520}$ | | 28.8% | 29.6% |
| $TTIP_{750}$ | | 14.2% | 17.1% |
| TTP | | 85.8% | 82.9% |
| Photopic Luminous Transmittance *(V)*, CIE D65 | | 91% | 85% |
| Scotopic Luminous Transmittance *(V')*, CIE D65 | | 88% | 84% |
| Single-Pass Tint | <Yellowness Index (YI), $E_{V',YI}$, $E_{V'',YI}$> | <15.7, NaN, NaN> | <9.2, 0.96, 1.57> |
| | CIE D65: <a, b, WPS, $E_{V',WPS}$, $E_{V'',WPS}$> | <-5.5, 11, 12.3, NaN, NaN> | <-3.4, 6.3, 7.1, 0.78, 1.27> |
| | CIE F11: <a, b, WPS, $E_{V',WPS}$, $E_{V'',WPS}$> | <-3.7, 13.3, 13.8, NaN, NaN> | <-1.9, 7.5, 7.7, 0.75, 1.12> |
| | CIE F7: <a, b, WPS, $E_{V',WPS}$, $E_{V'',WPS}$> | <-5.8, 11.9, 13.3, NaN, NaN> | <-3.6, 7.1, 8, 0.78, 1.24> |
| | CIE F2: <a, b, WPS, $E_{V',WPS}$, $E_{V'',WPS}$> | <-3.4, 12.6, 13.1, NaN, NaN> | <-2.2, 8, 8.3, 0.72, 1> |
| | CIE A: <a, b, WPS, $E_{V',WPS}$, $E_{V'',WPS}$> | <-1.2, 9.2, 9.2, NaN, NaN> | <-0.5, 4.5, 4.6, 0.67, 0.86> |
| | LED-3000K: <a, b, WPS, $E_{V',WPS}$, $E_{V'',WPS}$> | <-1.3, 11.5, 11.6, NaN, NaN> | <-0.6, 6.8, 6.9, 0.67, 0.78> |
| | LED-4000K: <a, b, WPS, $E_{V',WPS}$, $E_{V'',WPS}$> | <-2.7, 12.2, 12.4, NaN, NaN> | <-1.3, 7.3, 7.4, 0.71, 0.9> |
| | LED-5000K: <a, b, WPS, $E_{V',WPS}$, $E_{V'',WPS}$> | <-4.9, 14.1, 15, NaN, NaN> | <-2.6, 9.1, 9.5, 0.77, 1.01> |
| | <avg(a), avg(b), avg(WPS), avg(\|a\|), avg(\|b\|)> | <-3.6, 12, 12.6, 3.6, 12> | <-2, 7.1, 7.4, 2, 7.1> |
| | <std(a), std(b), std(WPS), std(\|a\|), std(\|b\|)> | <1.7, 1.4, 1.6, 1.7, 1.4> | <1.1, 1.2, 1.3, 1.1, 1.2> |
| Double-Pass Tint | <Yellowness Index (YI), $E_{V',YI}$, $E_{V'',YI}$> | <27.5, NaN, NaN> | <16, 1.7, 2.78> |
| | CIE D65: <a, b, WPS, $E_{V',WPS}$, $E_{V'',WPS}$> | <-9.3, 19.6, 21.7, NaN, NaN> | <-5.7, 10.6, 12, 1.44, 2.35> |
| | CIE F11: <a, b, WPS, $E_{V',WPS}$, $E_{V'',WPS}$> | <-6.3, 23.8, 24.7, NaN, NaN> | <-3.2, 12.8, 13.2, 1.41, 2.11> |
| | CIE F7: <a, b, WPS, $E_{V',WPS}$, $E_{V'',WPS}$> | <-9.8, 21.3, 23.4, NaN, NaN> | <-6.2, 12.2, 13.6, 1.44, 2.3> |
| | CIE F2: <a, b, WPS, $E_{V',WPS}$, $E_{V'',WPS}$> | <-5.8, 22.5, 23.2, NaN, NaN> | <-3.8, 13.8, 14.3, 1.36, 1.89> |
| | CIE A: <a, b, WPS, $E_{V',WPS}$, $E_{V'',WPS}$> | <-2, 16.2, 16.3, NaN, NaN> | <-0.8, 7.5, 7.5, 1.27, 1.62> |
| | LED-3000K: <a, b, WPS, $E_{V',WPS}$, $E_{V'',WPS}$> | <-2.3, 20.7, 20.8, NaN, NaN> | <-1.1, 11.8, 11.9, 1.27, 1.46> |
| | LED-4000K: <a, b, WPS, $E_{V',WPS}$, $E_{V'',WPS}$> | <-4.5, 21.9, 22.3, NaN, NaN> | <-2.2, 12.7, 12.9, 1.34, 1.7> |
| | LED-5000K: <a, b, WPS, $E_{V',WPS}$, $E_{V'',WPS}$> | <-8.3, 25.6, 26.9, NaN, NaN> | <-4.3, 16.1, 16.7, 1.44, 1.89> |
| | <avg(a), avg(b), avg(WPS), avg(\|a\|), avg(\|b\|)> | <-6, 21.5, 22.4, 6, 21.5> | <-3.4, 12.2, 12.8, 3.4, 12.2> |
| | <std(a), std(b), std(WPS), std(\|a\|), std(\|b\|)> | <2.8, 2.6, 2.9, 2.8, 2.6> | <1.9, 2.3, 2.4, 1.9, 2.3> |

*FIG. 58B*

| Metric | | MBDS | OS |
|---|---|---|---|
| Spectral Plateau Avg. Transmittance | | 48% | 48% |
| Spectral Plateau Center @ nm | | 423 | 423 |
| Width of Spectral Plateau (nm) | | 53 | 53 |
| Thickness of Spectral Plateau (%) | | 10 | 10 |
| $TTIP_{380\text{-}450}$ | | 59.3% | 59.3% |
| $TTIP_{450\text{-}500}$ | | 20.3% | 20.9% |
| $TTIP_{520}$ | | 38.9% | 40.1% |
| $TTIP_{760}$ | | 21.0% | 24.8% |
| TTP | | 79.0% | 75.2% |
| Photopic Luminous Transmittance *(V)*, CIE D65 | | 85% | 75% |
| Scotopic Luminous Transmittance *(V')*, CIE D65 | | 81% | 75% |
| Single-Pass Tint | <Yellowness Index (YI), $E_{V,YI}$, $E_{V',YI}$> | <23.6, NaN, NaN> | <13.7, 0.95, 1.52> |
| | CIE D65: <a, b, WPS, $E_{V,WPS}$, $E_{V',WPS}$> | <-8.2, 16.8, 18.6, NaN, NaN> | <-4.4, 8.9, 9.9, 0.83, 1.34> |
| | CIE F11: <a, b, WPS, $E_{V,WPS}$, $E_{V',WPS}$> | <-5.6, 20.6, 21.4, NaN, NaN> | <-2.1, 11, 11.2, 0.81, 1.19> |
| | CIE F7: <a, b, WPS, $E_{V,WPS}$, $E_{V',WPS}$> | <-8.6, 18.3, 20.2, NaN, NaN> | <-4.9, 10.3, 11.4, 0.83, 1.31> |
| | CIE F2: <a, b, WPS, $E_{V,WPS}$, $E_{V',WPS}$> | <-5.1, 19.4, 20, NaN, NaN> | <-2.9, 11.8, 12.2, 0.77, 1.05> |
| | CIE A: <a, b, WPS, $E_{V,WPS}$, $E_{V',WPS}$> | <-1.8, 13.8, 13.9, NaN, NaN> | <-0.2, 6.3, 6.3, 0.71, 0.89> |
| | LED-3000K: <a, b, WPS, $E_{V,WPS}$, $E_{V',WPS}$> | <-2, 17.6, 17.7, NaN, NaN> | <-0.5, 10, 10, 0.71, 0.8> |
| | LED-4000K: <a, b, WPS, $E_{V,WPS}$, $E_{V',WPS}$> | <-3.9, 18.6, 19, NaN, NaN> | <-1.4, 10.7, 10.8, 0.76, 0.94> |
| | LED-5000K: <a, b, WPS, $E_{V,WPS}$, $E_{V',WPS}$> | <-7.3, 21.8, 23, NaN, NaN> | <-3.2, 13.5, 13.9, 0.82, 1.06> |
| | <avg(a), avg(b), avg(WPS), avg(\|a\|), avg(\|b\|)> | <-5.3, 18.4, 19.2, 5.3, 18.4> | <-2.4, 10.3, 10.7, 2.4, 10.3> |
| | <std(a), std(b), std(WPS), std(\|a\|), std(\|b\|)> | <2.5, 2.3, 2.5, 2.5, 2.3> | <1.6, 2, 2.1, 1.6, 2> |
| Double-Pass Tint | <Yellowness Index (YI), $E_{V,YI}$, $E_{V',YI}$> | <38.3, NaN, NaN> | <21.6, 1.6, 2.57> |
| | CIE D65: <a, b, WPS, $E_{V,WPS}$, $E_{V',WPS}$> | <-12.6, 27.5, 30.2, NaN, NaN> | <-6.6, 13.2, 14.8, 1.47, 2.36> |
| | CIE F11: <a, b, WPS, $E_{V,WPS}$, $E_{V',WPS}$> | <-8.5, 34, 35.1, NaN, NaN> | <-3.1, 16.5, 16.7, 1.45, 2.14> |
| | CIE F7: <a, b, WPS, $E_{V,WPS}$, $E_{V',WPS}$> | <-13.2, 30, 32.8, NaN, NaN> | <-7.3, 15.6, 17.3, 1.47, 2.31> |
| | CIE F2: <a, b, WPS, $E_{V,WPS}$, $E_{V',WPS}$> | <-7.8, 31.8, 32.8, NaN, NaN> | <-4.5, 18.1, 18.7, 1.38, 1.89> |
| | CIE A: <a, b, WPS, $E_{V,WPS}$, $E_{V',WPS}$> | <-2.8, 22.5, 22.6, NaN, NaN> | <-0.2, 8.9, 8.9, 1.29, 1.61> |
| | LED-3000K: <a, b, WPS, $E_{V,WPS}$, $E_{V',WPS}$> | <-3.1, 29.3, 29.4, NaN, NaN> | <-0.8, 15.5, 15.5, 1.29, 1.45> |
| | LED-4000K: <a, b, WPS, $E_{V,WPS}$, $E_{V',WPS}$> | <-6.1, 31.1, 31.7, NaN, NaN> | <-2.2, 16.7, 16.9, 1.36, 1.69> |
| | LED-5000K: <a, b, WPS, $E_{V,WPS}$, $E_{V',WPS}$> | <-11.2, 36.8, 38.5, NaN, NaN> | <-4.8, 21.8, 22.3, 1.46, 1.88> |
| | <avg(a), avg(b), avg(WPS), avg(\|a\|), avg(\|b\|)> | <-8.2, 30.4, 31.6, 8.2, 30.4> | <-3.7, 15.8, 16.4, 3.7, 15.8> |
| | <std(a), std(b), std(WPS), std(\|a\|), std(\|b\|)> | <3.8, 4, 4.3, 3.8, 4> | <2.4, 3.5, 3.6, 2.4, 3.5> |

*FIG. 59B*

<table>
<tr><th colspan="2">Metric</th><th>OS</th></tr>
<tr><td colspan="2">Spectral Plateau Avg. Transmittance</td><td>66%</td></tr>
<tr><td colspan="2">Spectral Plateau Center @nm</td><td>435</td></tr>
<tr><td colspan="2">Width of Spectral Plateau (nm)</td><td>30</td></tr>
<tr><td colspan="2">Thickness of Spectral Plateau (%)</td><td>7</td></tr>
<tr><td colspan="2">$TTIP_{380-450}$</td><td>57.0%</td></tr>
<tr><td colspan="2">$TTIP_{450-500}$</td><td>10.1%</td></tr>
<tr><td colspan="2">$TTIP_{520}$</td><td>32.8%</td></tr>
<tr><td colspan="2">$TTIP_{780}$</td><td>13.5%</td></tr>
<tr><td colspan="2">TTP</td><td>86.5%</td></tr>
<tr><td colspan="2">Photopic Luminous Transmittance *(V)*, CIE D65</td><td>95%</td></tr>
<tr><td colspan="2">Scotopic Luminous Transmittance *(V')*, CIE D65</td><td>91%</td></tr>
<tr><td rowspan="11">Single-Pass Tint</td><td><Yellowness Index (YI)></td><td><18.8></td></tr>
<tr><td>CIE D65: <a, b, WPS></td><td><-5.6, 13.1, 14.2></td></tr>
<tr><td>CIE F11: <a, b, WPS></td><td><-3.6, 15.2, 15.6></td></tr>
<tr><td>CIE F7: <a, b, WPS></td><td><-5.9, 13.9, 15.1></td></tr>
<tr><td>CIE F2: <a, b, WPS></td><td><-3.3, 14.7, 15.1></td></tr>
<tr><td>CIE A: <a, b, WPS></td><td><-0.6, 11, 11></td></tr>
<tr><td>LED-3000K: <a, b, WPS></td><td><-0.8, 13.2, 13.3></td></tr>
<tr><td>LED-4000K: <a, b, WPS></td><td><-2.2, 13.8, 14></td></tr>
<tr><td>LED-5000K: <a, b, WPS></td><td><-4.7, 15.9, 16.6></td></tr>
<tr><td><avg(a), avg(b), avg(WPS), avg(| a| ), avg(| b| )></td><td><-3.3, 13.9, 14.4, 3.3, 13.9></td></tr>
<tr><td><std(a), std(b), std(WPS), std(| a| ), std(| b| )></td><td><1.9, 1.4, 1.6, 1.9, 1.4></td></tr>
<tr><td rowspan="11">Double-Pass Tint</td><td><Yellowness Index (YI)></td><td><32.3></td></tr>
<tr><td>CIE D65: <a, b, WPS></td><td><-9.2, 23.2, 24.9></td></tr>
<tr><td>CIE F11: <a, b, WPS></td><td><-5.8, 27.3, 27.9></td></tr>
<tr><td>CIE F7: <a, b, WPS></td><td><-9.6, 24.8, 26.6></td></tr>
<tr><td>CIE F2: <a, b, WPS></td><td><-5.4, 26.2, 26.8></td></tr>
<tr><td>CIE A: <a, b, WPS></td><td><-0.8, 19.4, 19.5></td></tr>
<tr><td>LED-3000K: <a, b, WPS></td><td><-1.2, 24, 24></td></tr>
<tr><td>LED-4000K: <a, b, WPS></td><td><-3.6, 25.1, 25.4></td></tr>
<tr><td>LED-5000K: <a, b, WPS></td><td><-7.9, 29.1, 30.1></td></tr>
<tr><td><avg(a), avg(b), avg(WPS), avg(| a| ), avg(| b| )></td><td><-5.4, 24.9, 25.7, 5.4, 24.9></td></tr>
<tr><td><std(a), std(b), std(WPS), std(| a| ), std(| b| )></td><td><3.2, 2.7, 2.9, 3.2, 2.7></td></tr>
<tr><td rowspan="10">Photopic (V) and Scotopic (V') Luminous Transmittances</td><td>CIE D65: <V ,V' ></td><td><95 , 91></td></tr>
<tr><td>CIE F11: <V ,V' ></td><td><95 , 91></td></tr>
<tr><td>CIE F7 <V , V'></td><td><95 , 91 ></td></tr>
<tr><td>CIE F2 <V , V'></td><td><96 , 92></td></tr>
<tr><td>CIE A <V , V'></td><td><96 , 93></td></tr>
<tr><td>LED 3000K <V , V'></td><td><96 , 93></td></tr>
<tr><td>LED 4000K <V , V'></td><td><96 , 92></td></tr>
<tr><td>LED 5000K <V , V'></td><td><95 , 90></td></tr>
<tr><td><avg (V), avg(V')></td><td><96, 92></td></tr>
<tr><td><std(V), std(V')></td><td><0.3, 1.1></td></tr>
</table>

*FIG. 60B*

| Metric | | MBDS | OS |
|---|---|---|---|
| Spectral Plateau Avg. Transmittance | | 64% | 64% |
| Spectral Plateau Center @nm | | 435 | 435 |
| Width of Spectral Plateau (nm) | | 30 | 30 |
| Thickness of Spectral Plateau (%) | | 7 | 7 |
| $TTIP_{380-450}$ | | 58.3% | 58.3% |
| $TTIP_{450-500}$ | | 13.5% | 13.9% |
| $TTIP_{520}$ | | 35.3% | 36.0% |
| $TTIP_{780}$ | | 17.0% | 19.7% |
| TTP | | 83.0% | 80.3% |
| Single-Pass Tint | <Yellowness Index (YI), $E_{V,YI}$, $E_{V',YI}$> | <16.6, NaN, NaN> | <10.7, 0.95, 1.55> |
| | CIE D65: <a, b, WPS, $E_{V,WPS}$, $E_{V',WPS}$> | <-5.8, 11.7, 13.1, NaN, NaN> | <-3.8, 7.3, 8.2, 0.78, 1.28> |
| | CIE F11: <a, b, WPS, $E_{V,WPS}$, $E_{V',WPS}$> | <-3.8, 13.7, 14.3, NaN, NaN> | <-2.1, 8.3, 8.6, 0.76, 1.13> |
| | CIE F7: <a, b, WPS, $E_{V,WPS}$, $E_{V',WPS}$> | <-6.1, 12.5, 13.9, NaN, NaN> | <-4, 8, 9, 0.78, 1.25> |
| | CIE F2: <a, b, WPS, $E_{V,WPS}$, $E_{V',WPS}$> | <-3.6, 13.2, 13.7, NaN, NaN> | <-2.5, 8.9, 9.3, 0.73, 1.01> |
| | CIE A: <a, b, WPS, $E_{V,WPS}$, $E_{V',WPS}$> | <-1.3, 9.6, 9.7, NaN, NaN> | <-0.5, 5.3, 5.3, 0.68, 0.86> |
| | LED-3000K: <a, b, WPS, $E_{V,WPS}$, $E_{V',WPS}$> | <-1.4, 11.7, 11.7, NaN, NaN> | <-0.7, 7.3, 7.3, 0.68, 0.78> |
| | LED-4000K: <a, b, WPS, $E_{V,WPS}$, $E_{V',WPS}$> | <-2.7, 12.3, 12.6, NaN, NaN> | <-1.4, 7.8, 7.9, 0.72, 0.91> |
| | LED-5000K: <a, b, WPS, $E_{V,WPS}$, $E_{V',WPS}$> | <-4.9, 14.3, 15.1, NaN, NaN> | <-2.7, 9.6, 10, 0.78, 1.01> |
| | <avg(a), avg(b), avg(WPS), avg(\|a\|), avg(\|b\|)> | <-3.7, 12.4, 13, 3.7, 12.4> | <-2.2, 7.8, 8.2, 2.2, 7.8> |
| | <std(a), std(b), std(WPS), std(\|a\|), std(\|b\|)> | <1.7, 1.4, 1.6, 1.7, 1.4> | <1.2, 1.2, 1.3, 1.2, 1.2> |
| Double-Pass Tint | <Yellowness Index (YI), $E_{V,YI}$, $E_{V',YI}$> | <28.6, NaN, NaN> | <18.2, 1.67, 2.72> |
| | CIE D65: <a, b, WPS, $E_{V,WPS}$, $E_{V',WPS}$> | <-9.7, 20.4, 22.6, NaN, NaN> | <-6.3, 12, 13.6, 1.45, 2.36> |
| | CIE F11: <a, b, WPS, $E_{V,WPS}$, $E_{V',WPS}$> | <-6.4, 24.3, 25.2, NaN, NaN> | <-3.5, 14, 14.4, 1.42, 2.11> |
| | CIE F7: <a, b, WPS, $E_{V,WPS}$, $E_{V',WPS}$> | <-10.1, 21.9, 24.1, NaN, NaN> | <-6.7, 13.5, 15, 1.45, 2.31> |
| | CIE F2: <a, b, WPS, $E_{V,WPS}$, $E_{V',WPS}$> | <-6, 23.1, 23.9, NaN, NaN> | <-4.1, 15.1, 15.6, 1.36, 1.88> |
| | CIE A: <a, b, WPS, $E_{V,WPS}$, $E_{V',WPS}$> | <-2.1, 16.7, 16.8, NaN, NaN> | <-0.9, 8.6, 8.7, 1.27, 1.62> |
| | LED-3000K: <a, b, WPS, $E_{V,WPS}$, $E_{V',WPS}$> | <-2.3, 20.8, 20.9, NaN, NaN> | <-1.1, 12.6, 12.7, 1.27, 1.46> |
| | LED-4000K: <a, b, WPS, $E_{V,WPS}$, $E_{V',WPS}$> | <-4.5, 22, 22.4, NaN, NaN> | <-2.3, 13.5, 13.7, 1.34, 1.7> |
| | LED-5000K: <a, b, WPS, $E_{V,WPS}$, $E_{V',WPS}$> | <-8.4, 25.7, 27.1, NaN, NaN> | <-4.6, 16.9, 17.5, 1.45, 1.89> |
| | <avg(a), avg(b), avg(WPS), avg(\|a\|), avg(\|b\|)> | <-6.2, 21.9, 22.9, 6.2, 21.9> | <-3.7, 13.3, 13.9, 3.7, 13.3> |
| | <std(a), std(b), std(WPS), std(\|a\|), std(\|b\|)> | <2.9, 2.6, 2.9, 2.9, 2.6> | <2, 2.3, 2.4, 2, 2.3> |
| Photopic (V) and Scotopic (V') Luminous Transmittances | CIE D65: <V, V'> | <90, 87> | <84, 84> |
| | CIE F11: <V, V'> | <91, 87> | <83, 82> |
| | CIE F7 <V, V'> | <91, 87> | <84, 83> |
| | CIE F2 <V, V'> | <91, 88> | <85, 83> |
| | CIE A <V, V'> | <91, 89> | <85, 84> |
| | LED 3000K <V, V'> | <91, 89> | <84, 83> |
| | LED 4000K <V, V'> | <91, 88> | <84, 83> |
| | LED 5000K <V, V'> | <91, 86> | <84, 81> |
| | <avg (V), avg(V')> | <91, 88> | <84, 83> |
| | <std(V), std(V')> | <0.2, 1> | <0.5, 1> |

PTAP 1

PTAP 2

PTAP 3A

PTAP 3B

PTAP 3C

X=O, S, N

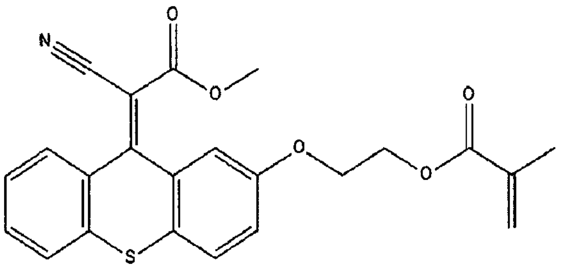
PX 1
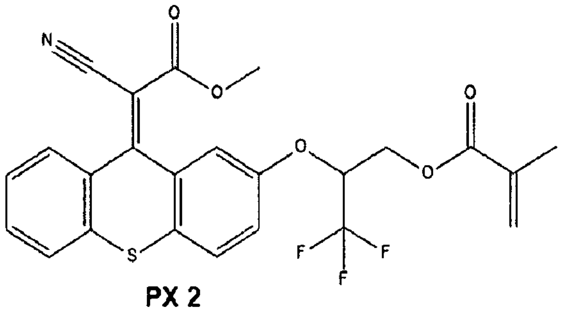
PX 2
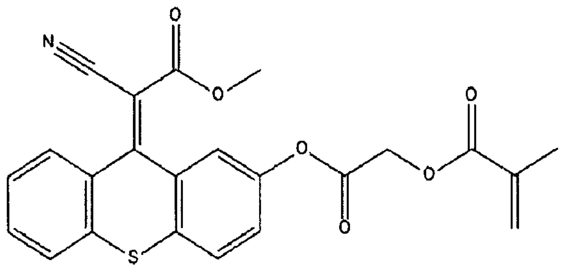
PX 3
FIG. 68

Disperse Yellow 54

PD1

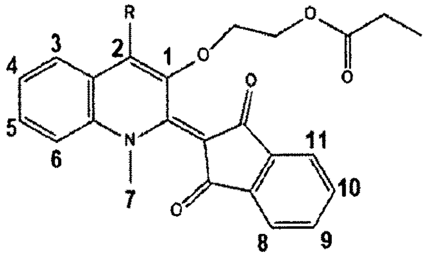
PD 2A
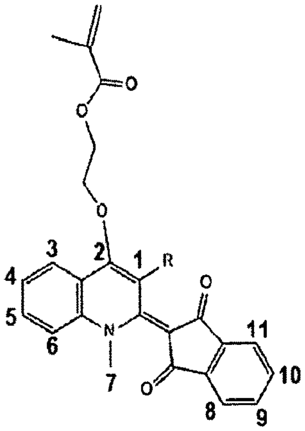
PD 2B
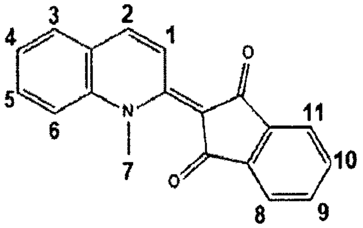
Quinoline
FIG. 72
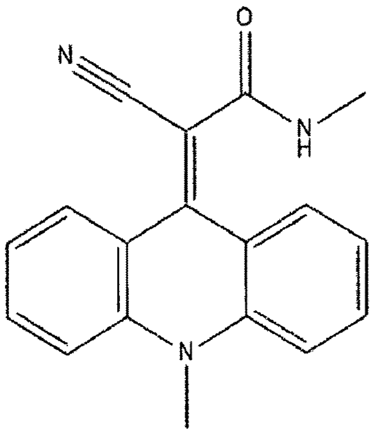
Acridine 1
FIG. 73

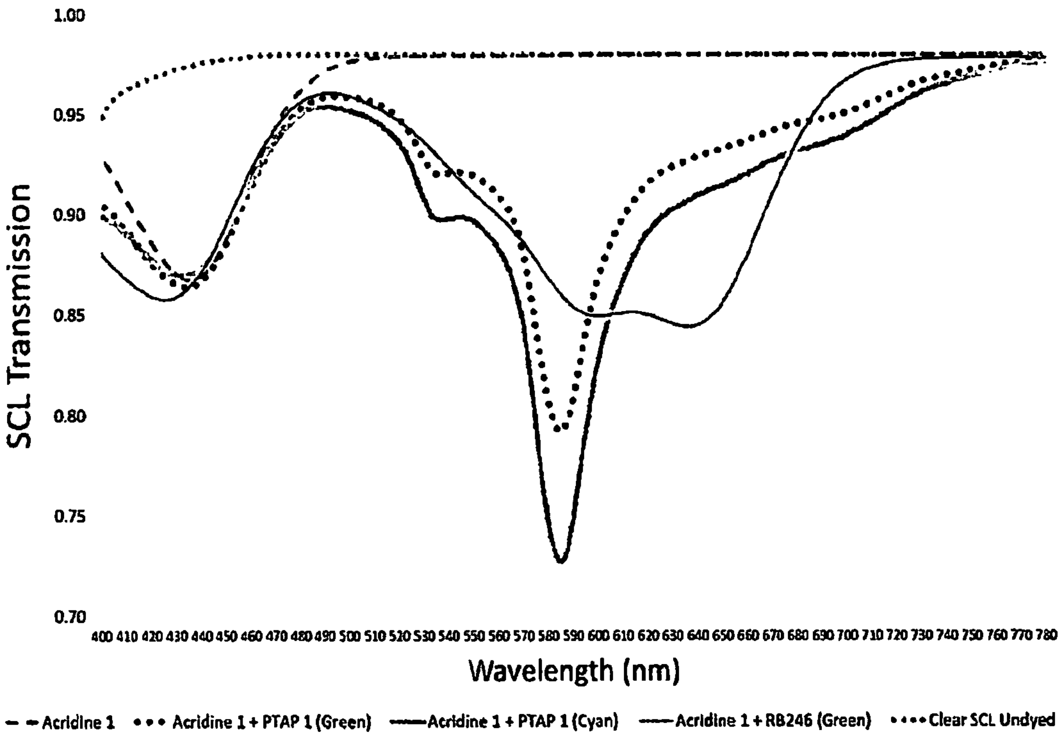

FIG. 74

| Transmittances of SCL with Acridine 1 | | | |
|---|---|---|---|
| Illuminant | Photopic % | Scotopic % | Simple Avg % |
| D65 | 97.6 | 95.9 | 96.2% |
| F11 | 97.8 | 96.0 | |
| F7 | 97.7 | 95.9 | |
| F2 | 97.8 | 96.1 | |
| A | 97.9 | 96.8 | |
| LED-3000K | 97.9 | 96.7 | |
| LED-4000K | 97.8 | 96.2 | |
| LED-5000K | 97.7 | 95.6 | |

| Transmittances of SCL with Acridine 1 + RB246 (Green) | | | |
|---|---|---|---|
| Illuminant | Photopic % | Scotopic % | Simple Avg % |
| D65 | 90.1 | 93.3 | 91.5% |
| F11 | 89.1 | 92.3 | |
| F7 | 90.0 | 93.1 | |
| F2 | 89.0 | 92.4 | |
| A | 88.9 | 93.1 | |
| LED-3000K | 88.6 | 92.4 | |
| LED-4000K | 89.1 | 92.6 | |
| LED-5000K | 89.4 | 92.1 | |

| Transmittances of SCL with Acridine 1 + PTAP 1 (Green) | | | |
|---|---|---|---|
| Illuminant | Photopic % | Scotopic % | Simple Avg % |
| D65 | 90.3 | 93.0 | 92.3% |
| F11 | 90.0 | 92.2 | |
| F7 | 90.0 | 92.8 | |
| F2 | 88.7 | 92.1 | |
| A | 89.5 | 92.8 | |
| LED-3000K | 88.9 | 92.1 | |
| LED-4000K | 89.3 | 92.2 | |
| LED-5000K | 89.3 | 91.8 | |

| Transmittances of SCL with Acridine 1 + PTAP 1 (Cyan) | | | |
|---|---|---|---|
| Illuminant | Photopic % | Scotopic % | Simple Avg % |
| D65 | 87.6 | 92.1 | 90.9% |
| F11 | 87.1 | 90.9 | |
| F7 | 87.3 | 91.8 | |
| F2 | 85.4 | 90.8 | |
| A | 86.4 | 91.4 | |
| LED-3000K | 85.6 | 90.4 | |
| LED-4000K | 86.2 | 90.9 | |
| LED-5000K | 86.3 | 90.5 | |

FIG. 75

| | | SCL with Acridine 1 | SCL with Acridine 1 + PTAP 1 (Green) | SCL with Acridine 1 + PTAP 1 (Cyan) | SCL with Acridine 1 + RB 246 (Green) |
|---|---|---|---|---|---|
| Single-Pass | <Yellowness Index (YI)> | <6.9> | <-2.4> | <-6.6> | <-4.3> |
| | CIE D65: <a, b, WPS> | <-2.2, 4.6, 5.1> | <-3, -0.1, 3> | <-3.1, -2.2, 3.8> | <-4.8, -0.4, 4.8> |
| | CIE F11: <a, b, WPS> | <-1.5, 5.5, 5.7> | <-2.1, 0.5, 2.2> | <-2.2, -1.8, 2.9> | <-4.3, -0.3, 4.3> |
| | CIE F7: <a, b, WPS> | <-2.3, 5, 5.5> | <-3.1, 0.1, 3.1> | <-3.2, -2.1, 3.8> | <-4.7, -0.1, 4.7> |
| | CIE F2: <a, b, WPS> | <-1.4, 5.2, 5.4> | <-2.5, -0.7, 2.6> | <-2.8, -3.3, 4.3> | <-3.6, -0.6, 3.7> |
| | CIE A: <a, b, WPS> | <-0.5, 4.1, 4.1> | <-1.3, -1.2, 1.7> | <-1.6, -3.4, 3.8> | <-4, -1.8, 4.4> |
| | LED-3000K: <a, b, WPS> | <-0.5, 4.9, 5> | <-1.5, -0.9, 1.7> | <-1.8, -3.4, 3.9> | <-3.8, -1.4, 4> |
| | LED-4000K: <a, b, WPS> | <-1.1, 5.1, 5.2> | <-2.1, -0.4, 2.2> | <-2.5, -2.9, 3.8> | <-4, -0.9, 4.1> |
| | LED-5000K: <a, b, WPS> | <-2, 5.7, 6> | <-2.6, 0.1, 2.6> | <-2.7, -2.4, 3.6> | <-4, -0.2, 4> |
| | <avg(a), avg(b), avg(WPS), avg(\|a\|), avg(\|b\|)> | <-1.4, 5, 5.3, 1.4, 5> | <-2.3, -0.3, 2.4, 2.3, 0.5> | <-2.5, -2.7, 3.7, 2.5, 2.7> | <-4.2, -0.7, 4.3, 4.2, 0.7> |
| | <std(a), std(b), std(WPS), std(\|a\|), std(\|b\|)> | <0.7, 0.5, 0.5, 0.7, 0.5> | <0.6, 0.5, 0.5, 0.6, 0.4> | <0.5, 0.6, 0.4, 0.5, 0.6> | <0.4, 0.6, 0.4, 0.4, 0.6> |

| | | SCL with Acridine 1 | SCL with Acridine 1 + PTAP 1 (Green) | SCL with Acridine 1 + PTAP 1 (Cyan) | SCL with Acridine 1 + RB 246 (Green) |
|---|---|---|---|---|---|
| Double-Pass | <Yellowness Index (YI)> | <13.1> | <-4.6> | <-12.9> | <-8.6> |
| | CIE D65: <a, b, WPS> | <-4.1, 9, 9.9> | <-5.8, 0, 5.8> | <-6, -3.9, 7.2> | <-9.3, -0.7, 9.3> |
| | CIE F11: <a, b, WPS> | <-2.8, 10.6, 11> | <-4.1, 0.9, 4.2> | <-4.2, -3.4, 5.4> | <-8.3, -0.6, 8.4> |
| | CIE F7: <a, b, WPS> | <-4.3, 9.7, 10.6> | <-6, 0.2, 6> | <-6.2, -3.8, 7.3> | <-9.1, -0.2, 9.1> |
| | CIE F2: <a, b, WPS> | <-2.6, 10.1, 10.5> | <-4.9, -1.2, 5> | <-5.4, -6, 8.1> | <-7, -1.2, 7.1> |
| | CIE A: <a, b, WPS> | <-0.9, 8, 8> | <-2.5, -2.2, 3.3> | <-3.1, -6.4, 7.1> | <-7.8, -3.5, 8.5> |
| | LED-3000K: <a, b, WPS> | <-1, 9.6, 9.6> | <-2.9, -1.6, 3.3> | <-3.5, -6.3, 7.2> | <-7.3, -2.8, 7.8> |
| | LED-4000K: <a, b, WPS> | <-2, 9.9, 10.1> | <-4.2, -0.8, 4.2> | <-4.7, -5.3, 7.1> | <-7.8, -1.7, 8> |
| | LED-5000K: <a, b, WPS> | <-3.7, 11, 11.6> | <-5.1, 0.4, 5.1> | <-5.2, -4.3, 6.7> | <-7.7, -0.4, 7.7> |
| | <avg(a), avg(b), avg(WPS), avg(\|a\|), avg(\|b\|)> | <-2.7, 9.7, 10.2, 2.7, 9.7> | <-4.4, -0.5, 4.6, 4.4, 0.9> | <-4.8, -4.9, 7, 4.8, 4.9> | <-8, -1.4, 8.2, 8, 1.4> |
| | <std(a), std(b), std(WPS), std(\|a\|), std(\|b\|)> | <1.2, 0.9, 1, 1.2, 0.9> | <1.2, 1, 1, 1.2, 0.7> | <1.1, 1.1, 0.7, 1.1, 1.1> | <0.8, 1.1, 0.7, 0.8, 1.1> |

FIG. 76

<table>
<tr><th></th><th></th><th>FIG. 77 Transmission</th></tr>
<tr><td>Single-Pass</td><td><Yellowness Index (YI)></td><td><0.5></td></tr>
<tr><td></td><td>CIE D65: <a, b, WPS></td><td><-0.6, 0.5, 0.7></td></tr>
<tr><td></td><td>CIE F11: <a, b, WPS></td><td><-0.1, 0.5, 0.5></td></tr>
<tr><td></td><td>CIE F7: <a, b, WPS></td><td><-0.6, 0.5, 0.7></td></tr>
<tr><td></td><td>CIE F2: <a, b, WPS></td><td><-0.3, 0.2, 0.4></td></tr>
<tr><td></td><td>CIE A: <a, b, WPS></td><td><0.6, 0.1, 0.6></td></tr>
<tr><td></td><td>LED-3000K: <a, b, WPS></td><td><0.3, 0.5, 0.6></td></tr>
<tr><td></td><td>LED-4000K: <a, b, WPS></td><td><0, 0.6, 0.6></td></tr>
<tr><td></td><td>LED-5000K: <a, b, WPS></td><td><-0.4, 0.9, 1></td></tr>
<tr><td></td><td><avg(a), avg(b), avg(WPS), avg(|a|), avg(|b|)></td><td><-0.1, 0.5, 0.6, 0.4, 0.5></td></tr>
<tr><td></td><td><std(a), std(b), std(WPS), std(|a|), std(|b|)></td><td><0.4, 0.2, 0.2, 0.2, 0.2></td></tr>
<tr><td></td><td></td><td>FIG. 77 Transmission</td></tr>
<tr><td>Double-Pass</td><td><Yellowness Index (YI)></td><td><1.0></td></tr>
<tr><td></td><td>CIE D65: <a, b, WPS></td><td><-1, 0.9, 1.4></td></tr>
<tr><td></td><td>CIE F11: <a, b, WPS></td><td><-0.2, 1, 1></td></tr>
<tr><td></td><td>CIE F7: <a, b, WPS></td><td><-1.1, 0.9, 1.4></td></tr>
<tr><td></td><td>CIE F2: <a, b, WPS></td><td><-0.6, 0.4, 0.7></td></tr>
<tr><td></td><td>CIE A: <a, b, WPS></td><td><1.2, 0.1, 1.2></td></tr>
<tr><td></td><td>LED-3000K: <a, b, WPS></td><td><0.6, 0.9, 1.1></td></tr>
<tr><td></td><td>LED-4000K: <a, b, WPS></td><td><-0.1, 1.2, 1.2></td></tr>
<tr><td></td><td>LED-5000K: <a, b, WPS></td><td><-0.9, 1.8, 2></td></tr>
<tr><td></td><td><avg(a), avg(b), avg(WPS), avg(|a|), avg(|b|)></td><td><-0.3, 0.9, 1.3, 0.7, 0.9></td></tr>
<tr><td></td><td><std(a), std(b), std(WPS), std(|a|), std(|b|)></td><td><0.8, 0.5, 0.4, 0.4, 0.5></td></tr>
</table>

FIG. 77 Transmission

| Illuminant | Photopic % | Scotopic % |
|---|---|---|
| D65 | 91.7 | 92.6 |
| F11 | 91.3 | 92.0 |
| F7 | 91.5 | 92.5 |
| F2 | 91.0 | 92.1 |
| A | 91.6 | 92.5 |
| LED-3000K | 91.2 | 92.0 |
| LED-4000K | 91.3 | 92.0 |
| LED-5000K | 91.2 | 91.6 |

FIG. 78

OPTICAL DEVICE WITH TRANSMISSION INHIBITION PLATEAU IN BLUE SPECTRAL RANGE

FIELD OF INVENTION

The present invention relates to transmissive optical devices with spectral filtering that enhances retinal health, performance and aesthetic appeal.

BACKGROUND

Optical devices (ODs) such as prescription glasses that filter wavelengths from 380 nm to 520 nm, known as high-energy visible light (HEVL), may have a number of health, visual, cosmetic and other benefits, such: as decreasing retinal cell damage from phototoxicity; regulating melatonin response by blocking visible light to which melanopsin is particularly sensitive; improving distance discernment; and improving color contrasts and decreasing visible haze or halo. However, existing HEVL filtering devices suffer from a number of drawbacks, including: (1) a tint of objects viewed through the device due to incident light absorbance that is not neutral, but rather having various chroma of yellow, brown, orange, pink or red hues or other warm-color hues, (2) a cosmetic tint of the device when viewed by a person not wearing the device due to incident light reflectance that is not neutral, but rather having a violet, blue, cyan, green or other cool-color hue, (3) a low amount of incident light filtering in the wavelength range of 380 to 520 nm, whether the filtering be achieved by attenuation (i.e. absorbance) or reflection. For example, for many commercially-available lenses, the maximum peak filtering at 420 nm is less than 50% or the maximum peak filtering at 430 nm is less than 40%.

Tint of the device due to incident light absorbance by the OD has two varieties: (1) via single-pass absorbance such that single-pass (SP) tint is perceived by a person viewing a scene through the device such as a device wearer (e.g. in the case that the device is incorporated into eye glasses or contact lenses), and (2) via double-pass absorbance such that double-pass (DP) cosmetic tint is perceived by a different or external viewer. It is commonly, but not necessarily the case, that double-pass tint is more chromatic. Furthermore, hues of a double-pass tint can be different than those of a single-pass tint. An OD can suffer noticeable non-white coloration in the OD's single-pass and/or double-pass tints.

The term "color neutralization" as used in the present specification refers to at least reducing the white point shift (WPS) of the tints in respect to single-pass tint of the OD. The spectra and colorimetric performance of color neutralized lenses based on existing color neutralizing methods suffer from two drawbacks: (1) excessive reduction of the lightness of the OD's tint(s), and (2) color inconstancy of the tints of the OD under different lighting conditions. Note that the excessive reduction of the lightness of an OD is directly correlated with the excessive reduction of the photopic luminous transmittance (Tv) of the same OD. Excessive reduction means reduction of an OD's photometric and/or colorimetric parameter values, e.g. lightness and Tv, significantly beyond the levels of those reductions created by the invention described herein.

Both the excessive reduction of lightness and the color inconstancy associated with existing color neutralization methods are undesirable in a variety of applications, such as in ophthalmic lenses, contact lenses (CLs), intraocular lenses (IOLs), transparent windows and screens, where achieving high transparency and color neutrality in devices are key factors.

FIG. 47 is a graph including plots of spectral transmission for prior art blue blocking lenses and FIG. 48 includes Table 16 including photometric indices (PIs) and colorimetric indices (CIs) of prior art blue blocking lenses for which the plots of spectral transmission are shown in FIG. 47. The graph in FIG. 47 and the table in FIG. 48 show the transmission spectrum, PIs and CIs of 3 lenses on the market: (1) Blutech Blue Light Filter, (2) Essilor Blue Light Filter A (Crizal Prevencia), and (3) Essilor Blue Light Filter B (Crizal Orma). The graph in FIG. 47 and the table in FIG. 48 relate to lenses that filter blue light within at least one of the following ranges: (1) 380 nm to 520 nm, (2) 380 nm to 500 nm, (3) 380 nm to 450 nm, and (4) 450 nm to 500 nm. The figure and table also show either (1) significant inhibition (Peak Inhibition Percentage, PIP>45%) of blue light within at least one of the described ranges, resulting in at least one of: a noticeable yellowness quantified by a yellowness index (YI, defined hereinbelow), single-pass lens tint or double-pass lens tint, such as shown by BluTech lens and Essilor Lens A, or (2) insignificant inhibition (PIP<45%) of blue light within all of the described ranges, and resulting in minor YI, single-pass lens tint or double-pass lens tint, such as shown by Essilor Lens B. Consequently, using existing methods of filtering blue light and color neutralization the amount of light filtering from 380 nm to 520 nm cannot achieve high levels, e.g. filtered amount is more than 45%, at any wavelength between 420 nm and 520 nm, without having the resulting undesirable tints and/or reduction in luminous transmittance (photopic and/or scotopic) of the device.

In this disclosure, color neutralization refers to low WPS of a perceived color from a neutral grey/white. This nomenclature of neutralization/neutrality does not refer to nor include lightness or Tv of OD. Nomenclature of lightness and Tv will be directly used when referring to those colorimetric characteristics of an OD.

Blue blocking optical devices (OD), such as ophthalmic and ophthalmological lenses, optical screen, windows and windshields, have been introduced as a hedge against possible deleterious exposure to short wavelength visible light, including blue light. However, the spectral transmission curves of existing blue blocking ODs have not necessarily been designed with a high level of attention to detail leading to several drawbacks.

In certain cases, an excessive broad attenuation has been designed into such blue blocking devices leading to a distinct yellowing of transmitted light that is perceptible to the user of such blue blocking devices, and to other persons viewing the blue blocking devices. In the latter case the deficiency is an aesthetic flaw. FIG. 49 shows an example of a transmittance spectrum of an ophthalmic lens that is purposely designed to filter blue light. The transmission spectrum shown in FIG. 49 corresponds to a lens made by Carl Zeiss Vision Care of Oberkochen, Germany. The transmission spectrum does not include any spectral plateaus, rather the transmission level continuously increases from about 400 nanometers (nm) to 780 nm (the nominal end of the visible spectrum which nominally starts at 380 nm). The Zeiss spectrum shows that in order to inhibit approximately 50% of blue light between 410 nm and 440 nm, the lens also unnecessarily inhibits even more blue light transmission at lower wavelengths than 440 nm, such as about 60% inhibition at 430 nm, 70% inhibition at 420 nm and 95% inhibition at 410 nm. Moreover, it also noticeably inhibits blue light transmission at higher wavelengths than 440 nm, such as about 45% inhibition at 460 nm, 40% inhibition at 470 nm and 30% inhibition at 500 nm. Therefore, this type of blue light filter over-blocks blue light. It also creates a more yellow optic.

Moreover, recent ophthalmological research suggest that light between 390 nm and 410 nm may be beneficial to reducing myopia progression in youth and adult humans (EBioMedicine Oct. 27, 2016. www.ebiomedicine.com "Violet light exposure can be a preventive strategy against myopia progression; Scientific Reports Mar. 9, 2017 "Violet light transmission is related to myopia progression in adult high myopia".) Therefore, over-blocking violet light may be medically problematic.

FIG. 50 shows a transmission spectrum of a second prior art optical device which partially filters blue light. In the case of the OD having the transmission spectrum shown in FIG. 50 there is an inhibition-band centered at 425 nm with 40% transmission or 60% inhibition (PIP). The spectrum in FIG. 50 shows that: (1) when attempting to create a blue light filter at about 60% transmission between 410 nm and 440 nm, the inhibition band centered at 425 nm significantly over-blocks certain portions of the 410-440 nm range (e.g., at 425 nm), and under-blocks other portions of the 410-440 nm range (e.g., wavelengths in the vicinity of 410 nm and 440 nm). Under-blocking blue light is contrary to the intended goal of the OD, which is to inhibit blue light.

The transmission spectrum in FIG. 51 is a variation of that in FIG. 50, in that there is a first inhibition band centered at 430 nm and a second inhibition band centered at 490 nm for blocking blue light. In this transmission spectrum, there are two pass-bands and two inhibition bands all centered between 400 nm and 490 nm. Moreover, the inhibition band centered at 430 nm is located between two adjacent pass-bands centered at about 410 nm and 460 nm. The pass-band centered at 460 nm is located between two adjacent inhibition bands centered at 430 nm and 490 nm. As in the case of the spectrum in FIG. 50, the blue filtering spectrum between 400 nm and 490 nm either (1) over blocks blue light at some wavelengths when attempting to filter blue light at around 40% due to the two inhibition bands, or (2) under blocks blue light at different wavelengths due to the two pass-bands.

It is desirable to provide an OD that filters blue light in a more consistent and controlled manner. Moreover, it is desirable to provide an OD that filters blue light in a more consistent and controlled manner while at the same time transmitting color balanced light under a variety of standard illuminants.

SUMMARY

New technical solutions to the technical challenges described above are provided by embodiments described hereinbelow. Embodiments described herein improve, performance and tints of optical devices by (1) reducing residual non-neutral single-pass and/or double-pass tints, (2) lessening the reduction in luminous transmittance of the OD compared to other color neutralization methods and devices, (3) reducing color inconstancy of the devices' tints under a variety of common lighting conditions, (4) increasing the original blocking amount of HEVL, (5) changing the original peak blocking wavelengths of HEVL to higher or lower wavelengths, and/or any combination of the above.

A system, method for creating an optical device, and a device to inhibit short- and medium-visible wavelengths and to color neutralize such device are disclosed. The device may include a substrate, one or more of colorants applied at least one of: (1) onto the substrate in one or more layers and (2) into the substrate, including dispersed in the substrate the colorant having colorant-specific attenuation (e.g., absorption) spectrum(a) as defined by selected concentrations, and/or one or more of thin film layers provided at least one of on the substrate and on the combination of substrate and colorant layer(s), the thin film layer(s) including material(s) creating thin film-specific transmission spectrum(a) based on a sequence of layers having predetermined thicknesses.

The method of creating the optical device includes creating colorant-specific attenuation spectrum(a) by selecting colorant(s), creating concentration(s) of the selected colorant(s), and creating one or more layers to contain the colorant(s), creating thin film-specific reflectance spectrum (a) by selecting one or more of materials each having their own respective refractive index, selecting the number of layers in the thin film, selecting the thickness of each layer and the sequence layers, creating each film layer, and constructing an optical device including the created one or more layers containing the colorant(s) and the created film layer(s).

Certain embodiments described hereinbelow increase attenuation between 380 nm and 520 nm while achieving improved neutralization compared to prior devices.

Certain embodiments of the invention provide an OD including at least one dye, the OD, comprised of ophthalmic and ophthalmological lenses, having a transmission spectrum that meets following criteria: the transmission spectrum includes a spectral plateau that has mean spectral transmittance between 10% (absolute) and 85% (absolute); the Spectral Plateau is centered between 400 nm and 630 nm; the width of the spectral plateau is between 20 nm and 110 nm; a lower wavelength bound of the Spectral Plateau denoted wavelength L is located between 390 nm and 480 nm; an upper wavelength bound of the Spectral Plateau denoted wavelength M is located between 410 nm and 500 nm; a thickness (maximum transmittance minus minimum transmittance) of the Spectral Plateau is less than 10% (absolute); the Spectral Plateau has a sample standard deviation less than 1.65% (absolute); the unweighted average transmittance of all transmission from 380 nm to Wavelength L is at least 5% (absolute) less than average transmittance of the Spectral Plateau; the unweighted average transmittance of all transmission from Wavelength M to 650 nm is at least 5% (absolute) more than average transmittance of the Spectral Plateau; the average photopic luminous transmittance when lit by the CIE F2, CIE F7, CIE F11, CIE A, CIE D65, LED-3000K, LED-4000K and LED-5000K illuminants is greater than 60%, preferably greater than 70%; and the average scotopic luminous transmittance when lit by the CIE F2, CIE F7, CIE F11, CIE A, CIE D65, LED-3000K, LED-4000K and LED-5000K illuminants is greater than 50%, preferably greater than 60%, and even more preferably greater than 70%.

According to another embodiment a transmission at wavelength L is between 10% (absolute) and 85% (absolute) and a corresponding transmission at wavelength M is between 10% (absolute) and 85% (absolute).

In certain embodiments the spectral plateau has a mean spectral transmittance between 15% (absolute) and 80% (absolute). In certain embodiments the spectral plateau has a mean spectral transmittance between 20% (absolute) and 75% (absolute). In certain embodiments the spectral plateau is centered between 400 nm and 490 nm. In certain embodiments the spectral plateau is centered between 400 nm and 460 nm. In certain embodiments the width of the spectral plateau is between 20 nm and 90 nm. In certain embodiments the width of the spectral plateau is between 20 nm and 80 nm. In certain embodiments wavelength L is between 390 nm and 460 nm. In certain embodiments wavelength L is between 390 nm and 440 nm. In certain embodiments the transmission at wavelength L, is between 15% (absolute) and 80% (absolute). In certain embodiments wavelength M is between 410 nm and 480 nm. In certain embodiments the transmission at wavelength M is between 15% (absolute) and 85% (absolute). In certain embodiments the unweighted average transmittance of all transmission from 380 nm to Wavelength L is at least 10% less than average transmittance of the Spectral Plateau. The unweighted average transmittance of all transmission from Wavelength M to 650 nm is at least 10% (absolute) more than the mean spectral transmittance of the Spectral Plateau. In certain embodiments over a set of illuminants including CIE F2, CIE F7, CIE F11, CIE A, CIE D65, LED-3000K, LED-4000K and LED-5000K filtered by the transmission spectrum the CIELAB single-pass a-values, for at least 3 of 8 illuminants, are all less than 5. In certain embodiments over a set of illuminants including CIE F2, CIE F7, CIE F11, CIE A, CIE D65, LED-3000K, LED-4000K and LED-5000K filtered by the transmission spectrum the CIELAB single-pass b-values, for at least 3 of 8 illuminants, are all more than 5. Certain embodiments have any subset of the above mentioned preferred attributes in combination.

BRIEF DESCRIPTION OF THE DRAWINGS

FIG. 32 includes Table 1 showing various photometric indices for 3 example SMVFs.

FIG. 33 includes Table 2 illustrating reference white (RW) tristimulus values for any OD, under 8 different lighting conditions of D65, F2, F7, F11, A, LED-3000K, LED-4000K and LED-5000K.

FIG. 34 includes Tables 3 illustrating normalized RW tristimulus values for any OD, under 8 different lighting conditions of D65, F2, F7, F11, A, LED-3000K, LED-4000K and LED-5000K.

FIG. 35*a* include the first three column of Table 4 which shows numerous PIs and CIs of the OD, whose transmission spectrum is illustrated in FIG. 7.

FIG. 35*b* includes the last three columns of Table 4

FIG. 36*a* includes the first three columns of Table 5 showing numerous PIs and CIs of the OD, whose transmission spectrum is illustrated in FIG. 9.

FIG. 36*b* includes the last three columns of Table 5;

FIG. 37*a* includes the first three columns of Table 6 showing numerous PIs and CIs of the OD, whose transmission spectrum is illustrated in FIG. 11.

FIG. 37*b* includes the last three columns of Table 6.

FIG. 38*a* includes the first three columns of Table 7 showing numerous PIs and CIs of the OD, whose transmission spectrum is illustrated in FIG. 13.

FIG. 38*b* includes the last three columns of Table 7.

FIG. 39*a* includes the first three columns of Table 8 showing numerous PIs and CIs of the OD, whose transmission spectrum is illustrated in FIG. 15.

FIG. 39*b* includes the last three columns of Table 8.

FIG. 40*a* includes the first three columns of Table 9 showing numerous PIs and CIs of the OD, whose transmission spectrum is illustrated in FIG. 17.

FIG. 40*b* includes the last three columns of Table 9.

FIG. 41*a* includes the first three columns of Table 10 showing numerous PIs and CIs of the OD, whose transmission spectrum is illustrated in FIG. 19.

FIG. 42*a* includes the first three columns of Table 11 showing numerous PIs and CIs of the OD, whose transmission spectrum is illustrated in FIG. 21.

FIG. 42*b* includes the last three columns of Table 21.

FIG. 43*a* includes the first three columns of Table 12 showing numerous PIs and CIs of the OD, whose transmission spectrum is illustrated in FIG. 23.

FIG. 43*b* includes the last three columns of Table 12.

FIG. 44*a* includes the first three columns of Table 13 showing numerous PIs and CIs of the OD, whose transmission spectrum is illustrated in FIG. 25.

FIG. 44*b* includes the last three columns of Table 13.

FIG. 45*a* includes the first three columns of Table 14 showing numerous PIs and CIs of the OD, whose transmission spectrum is illustrated in FIG. 27.

FIG. 45*b* includes the last three columns of Table 14.

FIG. 46 includes Table 15 showing the spectral variability determination, max value, sum total value, start wavelength and end wavelength for various Original Spectrums.

FIG. 48 includes Table 16 including PIs and C of prior art blue blocking lenses for which the plots of spectral transmission are shown in FIG. 47.

FIG. 53B is a table of photometric and colorimetric values for the transmission spectrum shown in FIG. 53A.

FIG. 54B is a table of photometric and colorimetric values for the transmission spectrum shown in FIG. 54A.

FIG. 55B is a table of photometric and colorimetric values for the transmission spectrum shown in FIG. 55A.

FIG. 56B is a table of photometric and colorimetric values for the transmission spectrum shown in FIG. 56A.

FIG. 57B is a table of photometric and colorimetric values for the transmission spectrum shown in FIG. 57A.

FIG. 58B is a table of photometric and colorimetric values for the transmission spectrum shown in FIG. 58A.

FIG. 59B is a table of photometric and colorimetric values for the transmission spectrum shown in FIG. 58A.

FIG. 60B is a table of photometric and colorimetric values for the transmission spectrum shown in FIG. 60A.

FIGS. 61-65 show polymerizable metallo-tetraazaporphyrins (PTAP) according to embodiments of the invention.

Figure 61:
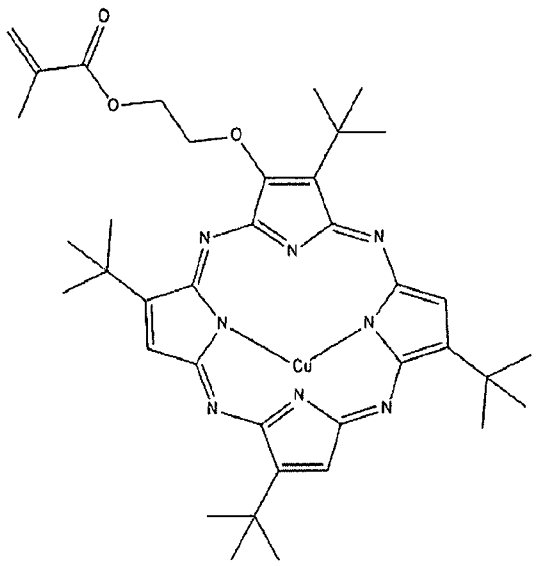
Figure 62:
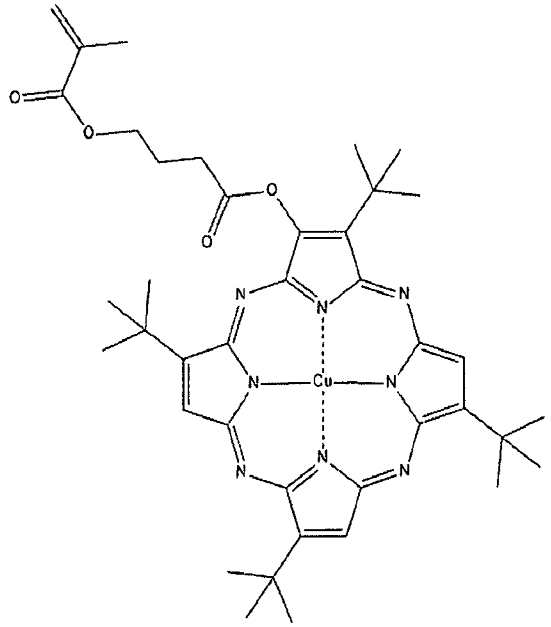
Figure 65:
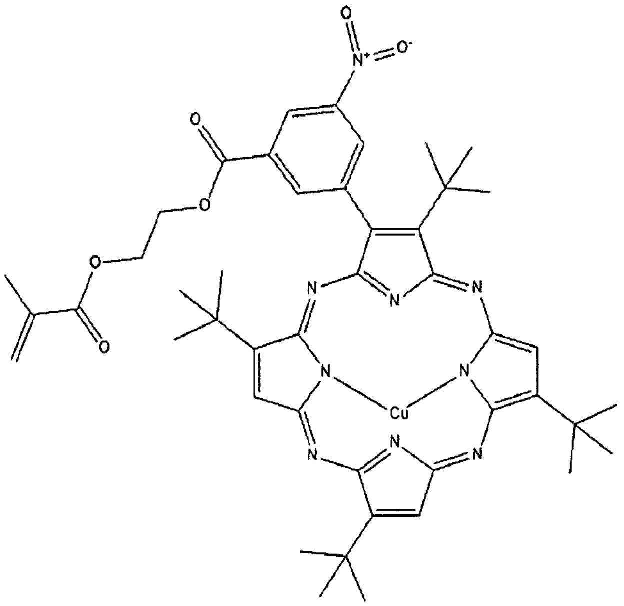
Figure 66:
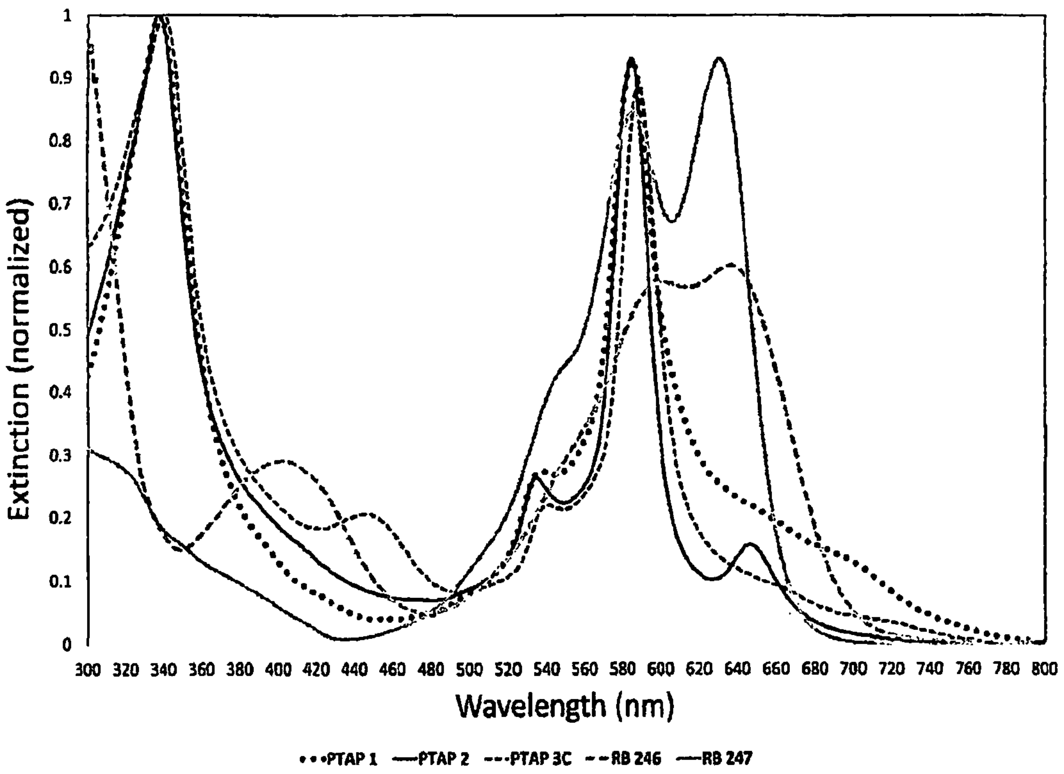

FIG. 66 The UV-VIS spectra, in SiHy, of the PTAPs shown in FIGS. 61, 62 and 65 PTAP 1, PTAP 2, and PTAP 3C, as well as known Reactive Blue 246 (RB 246, CAS #: 121888-69-5) and Reactive Blue 247 (RB 247, CAS #: 109561-07-1).

Figure 67:
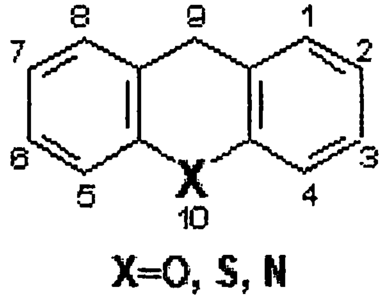

FIG. 67 indicates position labels for chromophore molecules xanthene, thioxanthene and acridine which are used in embodiments of the invention.

FIG. 68 shows three specific examples of polymerizable thioxanthene dyes that may be used in embodiments of the invention.

Figure 69:
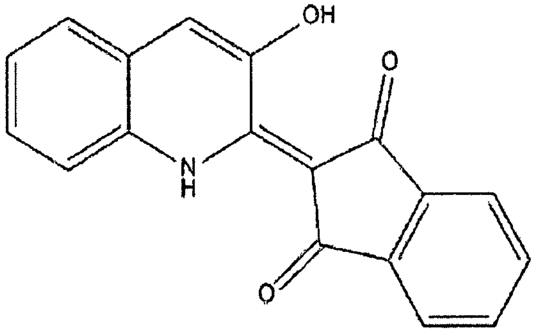

FIG. 69 shows the structure of disperse Yellow 54 quinoline dye that may be used in embodiments of the invention.

Figure 70:
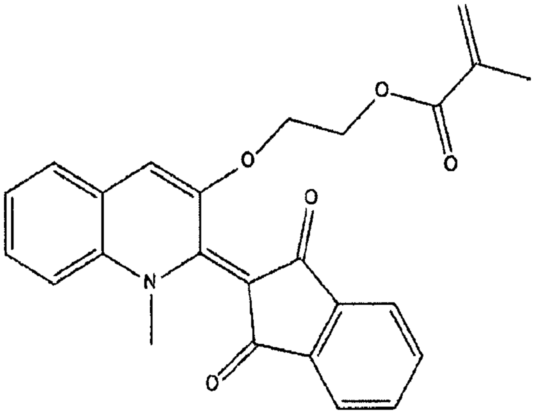

FIG. 70 shows a quinoline dye with (1) a polymerizable ether tether, and (2) a methyl group bonded to the nitrogen heteroatom according to an embodiment of the invention.

Figure 71:
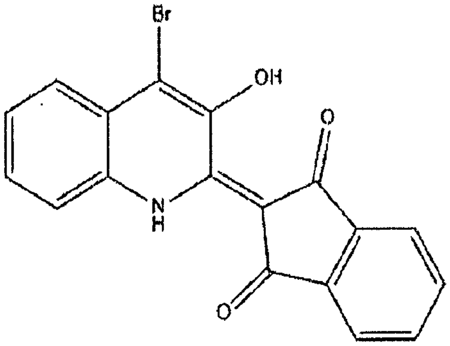

FIG. 71 shows the structure of disperse Yellow 64 quinoline dye that may be used in embodiments of the invention.

FIG. 72 shows one quinolone chromophore and two quinoline dyes that may be used in embodiments of the invention.

Figure 77:
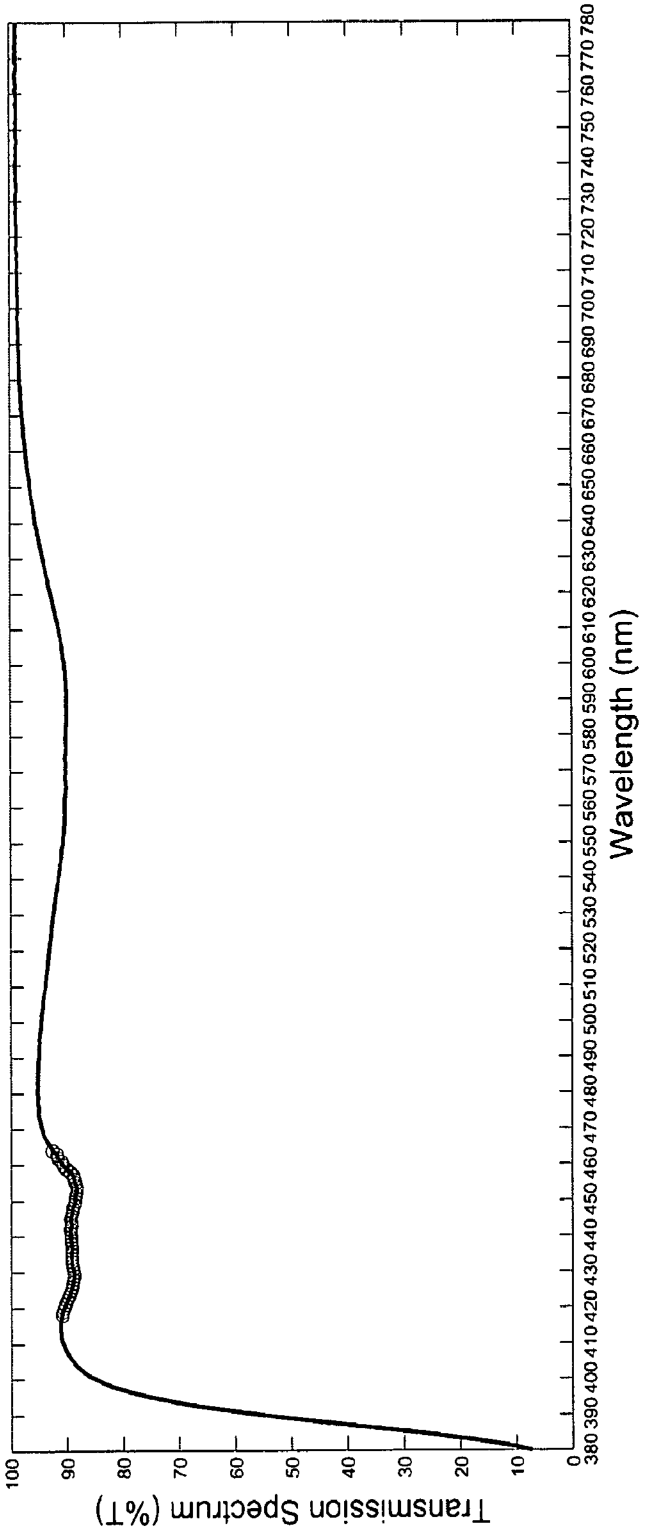

FIG. 77 is a graph including the spectral transmittance of an optical device according to an embodiment of the invention.

FIG. 78 is a table including colorimetric and photometric data for the optical device have the spectral transmittance shown in FIG. 77.

DETAILED DESCRIPTION

In the following description, numerous specific details are set forth, such as particular structures, components, materials, dimensions, processing steps, and techniques, in order to provide a thorough understanding of the present embodiments. However, it will be appreciated by one of ordinary skill of the art that the embodiments may be practiced without these specific details. In other instances, well-known structures or processing steps have not been described in detail in order to avoid obscuring the embodiments. It will be understood that when an element such as a layer, region, or substrate is referred to as being "on" or "over" another element, it can be directly on the other element or intervening elements may also be present. In contrast, when an element is referred to as being "directly on" or "directly" over another element, there are no intervening elements present. It will also be understood that when an element is referred to as being "beneath", "below", or "under" another element, it can be directly beneath or under the other element, or intervening elements may be present. In contrast, when an element is referred to as being "directly beneath" or "directly under" another element, there are no intervening elements present.

In the interest of not obscuring the presentation of embodiments in the following detailed description, some structures, components, materials, dimensions, processing steps, and techniques that are known in the art may have been combined together for presentation and for illustration purposes and in some instances may have not been described in detail. In other instances, some structures, components, materials, dimensions, processing steps and techniques that are known in the art may not be described at all. It should be understood that the following description is rather focused on the distinctive features or elements of various embodiments described herein.

In the present description a device that modifies the transmission spectra of visible light between 380 nm and 780 nm is termed "an optical device" or the equivalent "an optical system" that includes multiple devices with the same overall or effective modification on the visible transmission spectrum or the same effective performance on Colorimetric Indices (CIs) and Photometric Indices (PIs) as the device. The terms "device", "optical device", "optical system" and "lens" are used interchangeably in the present description.

The described embodiments provide the designs and constructions of optical devices with the desired transmission (TRMS, TRMS %) spectra, reflectance spectra, desired performance on Photometric Indices (PIs) and/or Colorimetric Indices (CIs) to enhance the filter wavelength blocking or inhibition performance and/or tints of ODs. Such an OD inhibits the transmission of incident visible light wavelengths between 380 nm and 520 nm. The term "inhibit" as used herein means at least partly blocking the transmission of light. An OD with such a spectral filter function impacts the short and medium wavelengths of visible light and will be termed Short- and Medium-Wavelength Visible Filter (SMVF). Transmission spectral inhibition is achieved by attenuation (i.e. absorption) and/or reflection of incident visible light.

Inhibition requires at least some amount of attenuation and/or reflection of light, and does not require the complete attenuation and/or reflection of light.

A SMVF is an optical device (OD), which may take the form of a single lens, multiple lenses used in a system, sunglasses and ophthalmic, glass, a contact lens, an optical filter, a screen, a windshield, an intraocular lens (IOL), a window, plastic and any other device or part of a device or system of devices capable of filtering, partially or completely, visible light between 380 nm and 520 nm.

A color-neutralized SMVF is capable of absorbing, reflecting, inhibiting or filtering, partially or completely, visible light between 380 nm and 780 nm.

An SMVF may have any optical power, curvature or other suitable characteristics, including geometric shapes, refractive indices, lengths, widths, radii, and thicknesses.

An SMVF may have any number of layers (e.g., substrate, dye layers, and/or thin film), used to provide optical, mechanical, chemical, and/or safety characteristics.

Absorbing colorants or optical thin films are used separately or in combination, and disposed in or on one or more physical substrates in order to construct a SMVF or system of SMVFs with the desired transmission spectra or effective desired transmission spectra, respectively.

In this disclosure, a system of ODs is treated the same as a single OD, where the effective transmission spectra of the system of ODs is the same or substantially similar to the transmission spectrum of a single OD.

Colorants include dyes and/or pigments that are applied on the surface of, infused into or dispersed into the substrate. Surface applications comprised of dipping the device into a liquid colorant bath, spray coated or spin coated with colorants. Dye integration inside the substrate includes dye compounding with a matrix and molding into a shape, such as a lens. Dye integration also can be from a lamination process where dyes are incorporated into one or more optical layers, which are then laminated with other layers or sandwiched between two or more layers. Dye integration also can be from an encasement process, where dyes are enveloped by surrounding material, and the optical device is the entire construction containing all of the ingredients in one or more material layers, including the substrate. Dyes can also be copolymerized with the device substrate during substrate polymerization process. Examples of such are dyes containing one or more chromophores and at least one polymerizable functional group. A polymerizable functional group is a carbon-carbon double bond group which can polymerize when subjected to radical polymerization initiation conditions. Examples of the polymerizable functional groups that can undergo radical polymerization comprised of acryloyl, methacryloyl, vinyl, styryl, N-vinyl lactam, vinyl and allyl ether groups. Such dye integration or dispersion mechanisms can be used to produce CLs, IOLs or other ODs with polymer substrates having the desired transmission or reflection spectra.

Deposited thin films include film layers, such as with high and low refractive indices stacked in one or more alternating layers, and deposited on the surface of an optical layer or substrate. One or more optical layer(s) and/or substrate(s) may contain one or more dyes.

Deposited thin films include rugate filters with continuously modulated indices of refraction. Thin films also include interference filters that reflect specific or broad wavelength ranges of light, and other thin films that give desired surface effects, such as anti-abrasion and hydrophobia. Thin films can also include anti-glare and anti-reflection coatings.

One or more of colorant(s) and/or one or more of thin film(s) are the primary optical components that produce the desired transmission spectra or reflectance spectra or both.

Substrates or matrices may include glass, polymers (such as acrylic, polycarbonate, Trivex, polyurethane, CR39, polyamide/nylon, acetate and hydrogel, including silicon hydrogel), crystals, quartz, fiber glass and other transparent or semi-transparent material suitable for optical use.

Figure 1:
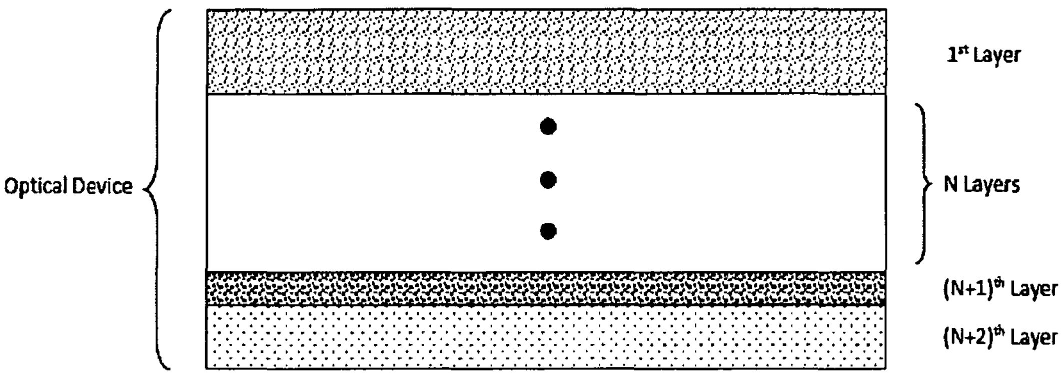
FIG. 1 illustrates the cross-section of an optical device (OD) with a plurality of layers for modifying transmitted light.

FIG. 1 illustrates the cross-section of an OD with at least 1 layer of dye(s) and/or thin film(s) modifying transmitted light. Dye or thin film layers can be any of one or more of the layers, including a $1^{st}$ layer, a last ($N^{th}$) layer or any other layer(s) in-between. A dyed layers can also be the same layer as that of the bulk matrix or substrate, which provides much of the mechanical and physical structure of the OD.

PIs are metrics that measure vital aspects of wavelength filtering in the OD's transmission or reflected spectra or both. PIs are comprised of (1) Transmission Valley Percentage (TVP) at one or more wavelengths within 380 nm and 780 nm, (2) Full-Width-At-Half-Maximum of the TVP (FWHM of TVP), (3) Total Transmission Inhibition Percentage-780 ($TTIP_{780}$) is the percent filtered or inhibited of all wavelengths between 380 nm and 780 nm in 1-nm increment, (4) Total Transmission Inhibition Percentage-520 ($TTIP_{520}$) is the percent filtered of all wavelengths between 380 nm and 520 nm in 1-nm increment, and (4) Total Transmittance Percentage (TTP) is non-weighted average of the transmittance percentage of the optical device between 380 nm and 780 nm.

Figure 2:
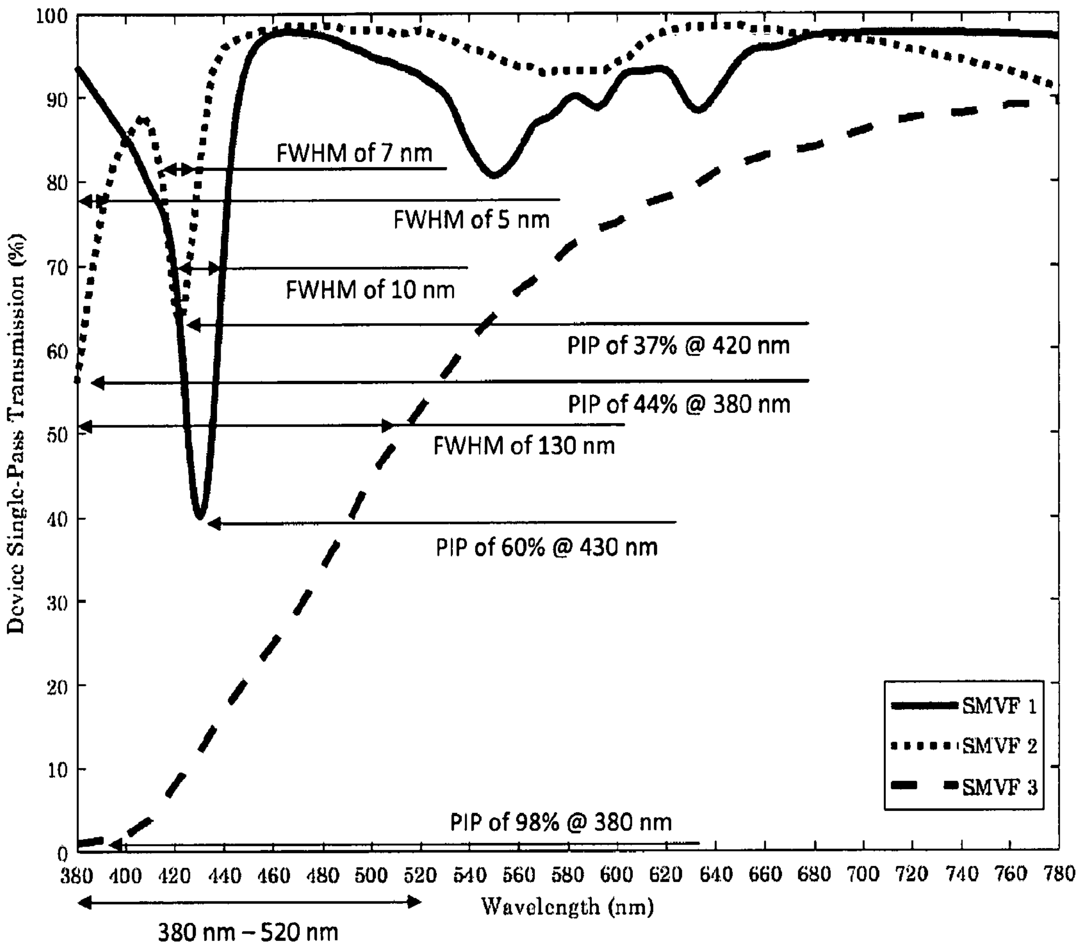
FIG. 2 is a graph illustrating the application of Peak-Inhibition Percentage (PIP) and Full-Width-At-Half-Max (FWHM) of PIP to three example devices' single-pass transmission spectra, designated SMVF 1, SMVF 2 and SMVF 3.

The Peak-Inhibition Percentage (PIP) is equal to 100% minus the transmittance at the minimum transmittance point of an inhibition band (see FIG. 2).

TVP is the lowest or valley transmission percentage, which is equivalent to the 100% minus peak inhibition percentage (100%–PIP) of an OD's transmission spectrum, due to attenuation and/or reflection, at one or more wavelengths between 380 nm and 780 nm, inclusively. FWHM applies to attenuation bands associated with a PIP as well ("FWHM of PIP").

All PIs apply to an OD's spectra locally and globally. For example, PIP may apply to the globally-lowest TVP between 380 nm and 780 nm. PIP may also apply to locally-lowest TVP between any range of wavelengths smaller than between 380 nm and 780 nm. In each case the wavelength range for which the PIP is defined will be stated.

A SMVF's TVP, PIP, FWHM of TVP and FWHM of PIP are applied to one or more inhibition peaks within 380 nm and 780 nm.

$TTIP_{780}$, $TTIP_{520}$ and TTP are calculated using Equations 1, 2 and 3, respectively.

$$TTIP_{780} = 100 * \frac{\sum_{380nm}^{780nm}(100 - TRMS\ \%)}{\sum_{380nm}^{780nm}100} = 100 * \left(1 - \sum_{380nm}^{780nm}\frac{TRMS\ \%}{40100}\right) \quad \text{Equation 1}$$

$$TTIP_{520} = 100 * \frac{\sum_{380nm}^{520nm}(100 - TRMS\ \%)}{\sum_{380nm}^{520nm}100} = 100 * \left(1 - \sum_{380nm}^{520nm}\frac{TRMS\ \%}{14100}\right) \quad \text{Equation 2}$$

$$TTP = 100 * \frac{\sum_{380nm}^{780nm}TRMS\ \%}{\sum_{380nm}^{780nm}100} = 100 * \sum_{380nm}^{780nm}\frac{TRMS\ \%}{40100} = 100 - TTIP_{780} \quad \text{Equation 3}$$

where TRMS % is the single-pass transmission percent of a SMVF at 1 nm wavelength resolution.

The Total Transmission Filtered Percentage-AB ($TTIP_{AB}$) is the percent filtered of all wavelengths between any A nm and any B nm in 1-nm increment. For example, A or B can be any wavelength from 380 nm to 780 nm, including 380 nm, 385 nm, 390 nm, 395 nm, 400 nm, 405 nm, 410 nm, 415 nm, 420 nm, 425 nm, 430 nm, 435 nm, 440 nm, 445 nm, 450 nm, 455 nm, 460 nm, 465 nm, 470 nm, 475 nm, 480 nm, 485 nm, 490 nm, 495 nm, 500 nm, 505 nm, 510 nm, 515 nm, and 520 nm.

Equation 4 shows $TTIP_{AB}$.

EQU. 4

$$TTIP_{AB} = 100 * \frac{\sum_{A\,nm}^{B\,nm}(100 - TRMS\ \%)}{\sum_{A\,nm}^{B\,nm}100} = 100 * \left(1 - \sum_{A\,nm}^{B\,nm}\frac{TRMS\ \%}{100(B - A + 1)}\right) \quad \text{Equation 4}$$

FIG. 2 illustrates the PIP and FWHM of the spectral band associated with the PIP for 3 example devices' single-pass transmission spectra, corresponding to SMVF 1, SMVF 2 and SMVF 3.

FIG. 32 includes Table 1 which shows the corresponding photometric indices for the 3 SMVFs having the single-pass transmission spectra shown in FIG. 2. Referring to Table 1 it is evident that, SMVF 3 is the strongest HEVL filter, SMVF 1 is the medium strength HEVL filter, and SMVF 2 is the weakest HEVL filter, according to TTIP. The TTP is in reverse order, with SMVF 2 being the highest, SMVF 1 being the medium, and SMVF 3 being the lowest. This is even though SMVF 2 has two transmission valleys whereas SMVF 1 and SMVF 3 have only one transmission valley each.

There are different ways to manufacture SMVF 1. For example, SMVF 1 can be made of a polycarbonate (PC) optical substrate with a thickness of 0.8 mm and diameter of 75 mm. A notch absorbance dye (e.g. FWHM of spectral band associated with $1^{st}$ PIP of 10 nm) with peak attenuation at 430 nm (e.g. $1^{st}$ PIP @ 430 nm) is added into the PC via compounding and molding. For example, Exciton (2150 Bixby Road, Lockbourne, OH 43137) has the ABS 549 dye that will substantially create the inhibition band at around 430 nm, with a dye loading of 0.5 mg to 100 mg per 3 lb of PC resin.

There are several ways to manufacture SMVF 2. For example, SMVF 2 can be made of a CR39 optical substrate with a thickness of 2 mm and diameter of 70 mm. A notch absorbance dye (e.g. FWHM of spectral band associated with $1^{st}$ PIP of 7 nm) with peak attenuation at 420 nm (e.g. $1^{st}$ PIP @ 420 nm) is added onto the plastic disk via spray coating, which absorbs approximately 37% of transmission spectrum (e.g. $1^{st}$ PIP). Another UV-VIS absorbing dye is added onto the substrate matrix, which absorbs about 44% of OD's transmission at 380 nm (e.g. $2^{nd}$ PIP @ 380 nm). For example, Exciton has the ABS 420 dye that will substantially create the inhibition band at around 420 nm, with a dye loading of 0.5 mg to 100 mg per 3 lb of CR39 material.

There are several ways to manufacture SMVF 3. For example, SMVF 3 can be made of a silicone hydrogel substrate with a center thickness of 0.10 mm and a diameter of 14 mm. A broad-spectrum UV-VIS attenuation dye is incorporated into hydrogel via copolymerization. Copolymerization may require dye chromophores to be functionalized with suitable chemical groups, such as acrylate, styrene, or to maintain reactive double bond(s). Imbibing the dyes into device substrate is also possible. Suspending or encasing dyes in the OD substrate matrix without dye copolymerization is also possible. The dye absorbs UV and significant percentage of the visible spectrum from 380 nm to 780 nm. The amount of attenuation monotonically decreases from 380 nm to 780 nm. Epolin (358-364 Adams Street, Newark, New Jersey 07105) has the Epolight 5663 dye that will substantially create the spectrum, with a dye loading of 10 mg to 200 mg per 3 lb of hydrogel material.

In this disclosure, the presence of an inhibition band, transmission valley, absorbance peak, reflectance peak or inhibition peak means the transmission spectrum of the OD contains a locally lowest point, whose transmission value is at least 4% lower than the transmission value of each of the two immediately adjacent local transmission peaks-one centered at a shorter wavelength and another centered at a longer wavelength than the center of the inhibition band.

In an edge case, an inhibition band being centered at 380 nm means a local minimum transmission at 380 nm (considering only the restricted wavelength range 380 nm to 780 nm) and there need only be one immediately adjacent local transmission peak located at a longer wavelength than the center of the inhibition band, whose locally lowest transmission value is at least 4% lower than the transmission value of the immediately adjacent local transmission peak.

In another edge case, an inhibition band being centered at 780 nm means a local minimum transmission at 780 nm (considering only the restricted wavelength range 380 nm to 780 nm) and there need only be one immediately adjacent local transmission peak located at a shorter wavelength than the center of the inhibition band, whose locally lowest transmission value is at least 4% lower than the transmission value of the immediately adjacent local transmission peak.

In this disclosure, the presence of a pass-band, transmission peak, absorbance valley, reflectance valley or inhibition valley means that the transmission spectrum of the OD contains a locally highest point, whose transmission value is at least 4% higher than the transmission value of each of the two immediately adjacent local transmission valleys-one centered at a shorter wavelength and another centered at a longer wavelength than the center of the pass-band.

In an edge case, a pass-band being centered at 380 nm means a local peak transmission at 380 nm (considering only the restricted wavelength range 380 nm to 780 nm) and there need be only one immediately adjacent local transmission valley located at a longer wavelength than the center of the pass-band, whose locally highest transmission value is at least 4% higher than the transmission value of the immediately adjacent local transmission valley.

In another edge case, a pass-band being centered at 780 nm means a local peak transmission at 780 nm (considering only the restricted wavelength range 380 nm to 780 nm) and there need be only one immediately adjacent local transmission valley located at a shorter wavelength than the center of the pass-band, whose locally highest transmission value is at least 4% higher than the transmission value of the immediately adjacent local transmission valley.

Figure 3:
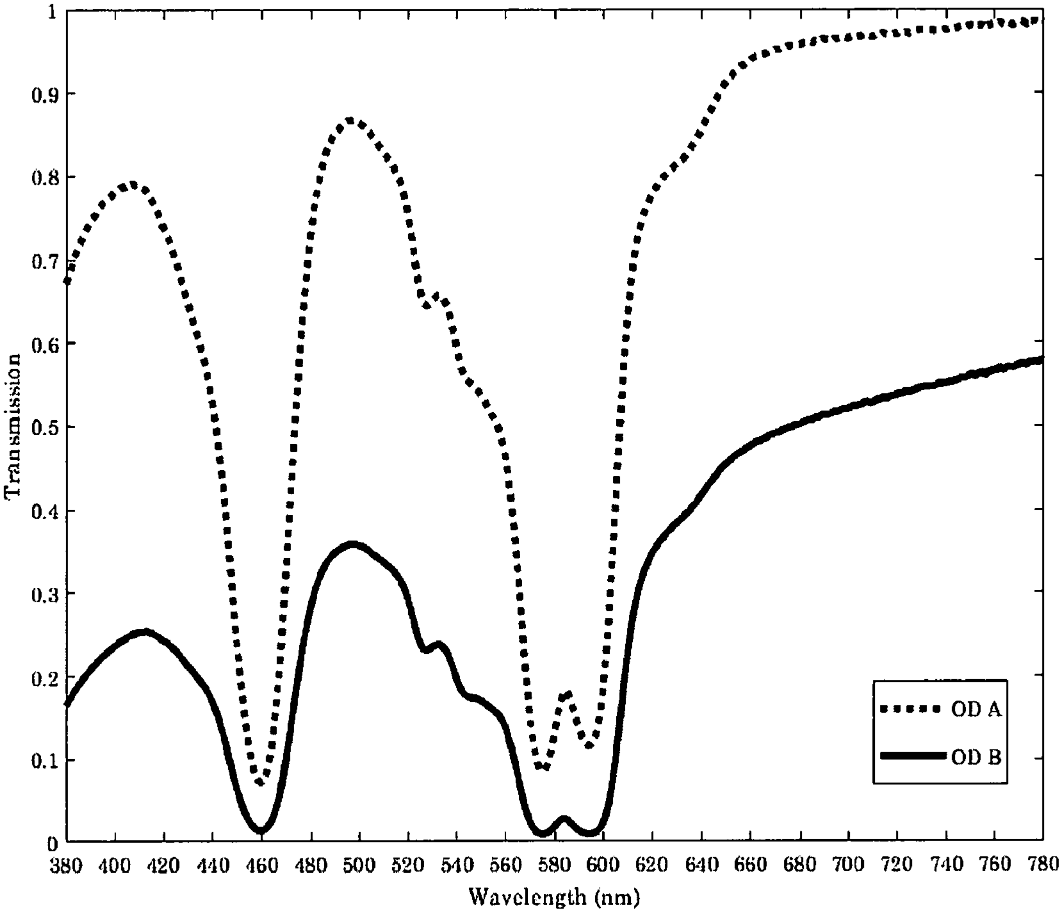
FIG. 3 is a graph including plots of the transmission spectra of two optical devices designated OD A and OD B according to embodiments of the invention.

FIG. 3 discloses the transmission spectra of two optical devices, OD A and OD B. FIG. 3 has inhibition bands substantially centered at 380 nm, 460 nm, 575 nm and 595 nm for OD A. It is equivalent to state that the inhibition bands are centered, peaked or have inhibition peaks at specified wavelengths.

FIG. 3 has pass-bands substantially centered at 410 nm, 500 nm, 585 nm and 780 nm for OD A. It is equivalent to state that the pass-bands are centered, peaked or have transmission peaks at specified wavelengths.

According to certain embodiments, an OD's transmission spectrum has at least one inhibition band centered between 380 nm and 525 nm, and at least one inhibition band centered between 540 nm and 625 nm.

The wavelength corresponding to the peak transmission of a pass-band is considered the "center" wavelength of the pass-band. The wavelength corresponding to the valley minimum transmission of an inhibition band is considered the "center" wavelength of the inhibition band.

A inhibition band or pass-band "centered between", "between", "centered at" or "at" two wavelengths means such inhibition band or pass-band has a wavelength of peak inhibition located within the two wavelengths, inclusively.

A inhibition band or pass-band "centered at" or "at" a wavelength means such inhibition band or pass-band has a wavelength of peak inhibition located at the indicated wavelength.

A inhibition band or pass-band "centered before" or "before" a wavelength means such inhibition band or passband has a wavelength of peak inhibition located at a wavelength that is shorter than the indicated wavelength.

A inhibition band or pass-band "centered after" or "after" a wavelength means such inhibition band or pass-band has a wavelength of peak inhibition located at a wavelength that is longer than the indicated wavelength.

An OD may have a fixed or non-chromic transmission spectrum in visible light wavelengths from 380 nm to 780 nm.

An OD may have a chromic transmission spectrum in visible light wavelengths from 380 nm to 780 nm. A chromic spectrum refers to changing visible transmission spectrum of the OD due to the use of one or more activatable chromic dyes, including photochromic, thermochromic, electrochromic, solvatochromic and cathodochromic dyes.

Tints

The color tint of a SMVF optical device can be different depending on whether the incident light is inhibited by the device once in SP or twice in DP.

The tint of the OD due to light passing through the device once is called a single-pass tint or single-pass filtration or simply "single-pass" (SP).

A single-pass tint can be perceived in many settings, including a person wearing the optical device in front of or external to the eye, such as in the form of eyewear; wearing or placing the OD on top of or in contact with the outer surface of the eye or cornea, such as in the form of a contact lens or eye drop; a person with a surgical implant inside the eye, such as in the form of a intraocular lens (IOL); a person viewing an external OD that is not in contact with the person, such as in the form of a glass, window, screen or windshield.

A SP tint can affect the white point of the color vision of the viewer or device wearer when seeing through the OD.

Figure 4A:
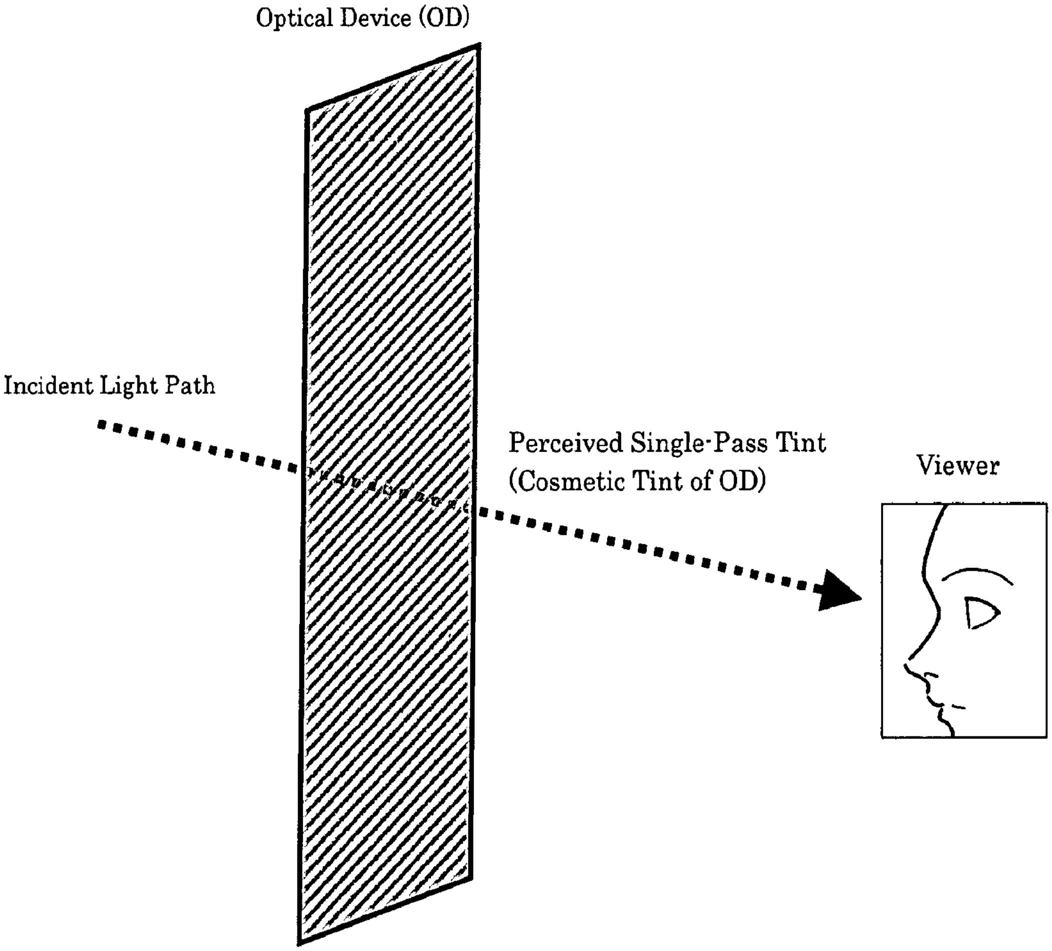
FIG. 4*a* schematically illustrates incident light transmit through an externally positioned OD and is filtered by the OD only once before reaching the viewer.

FIG. 4*a* illustrates an example of an externally positioned OD. Incident light is transmitted through the OD and is filtered by the OD only once before reaching the viewer. This is a generalized set up of an OD perceived to have a single-pass tint. The incoming light may also be partially reflected by the OD before reaching the wearer or receiver.

Figure 4B:
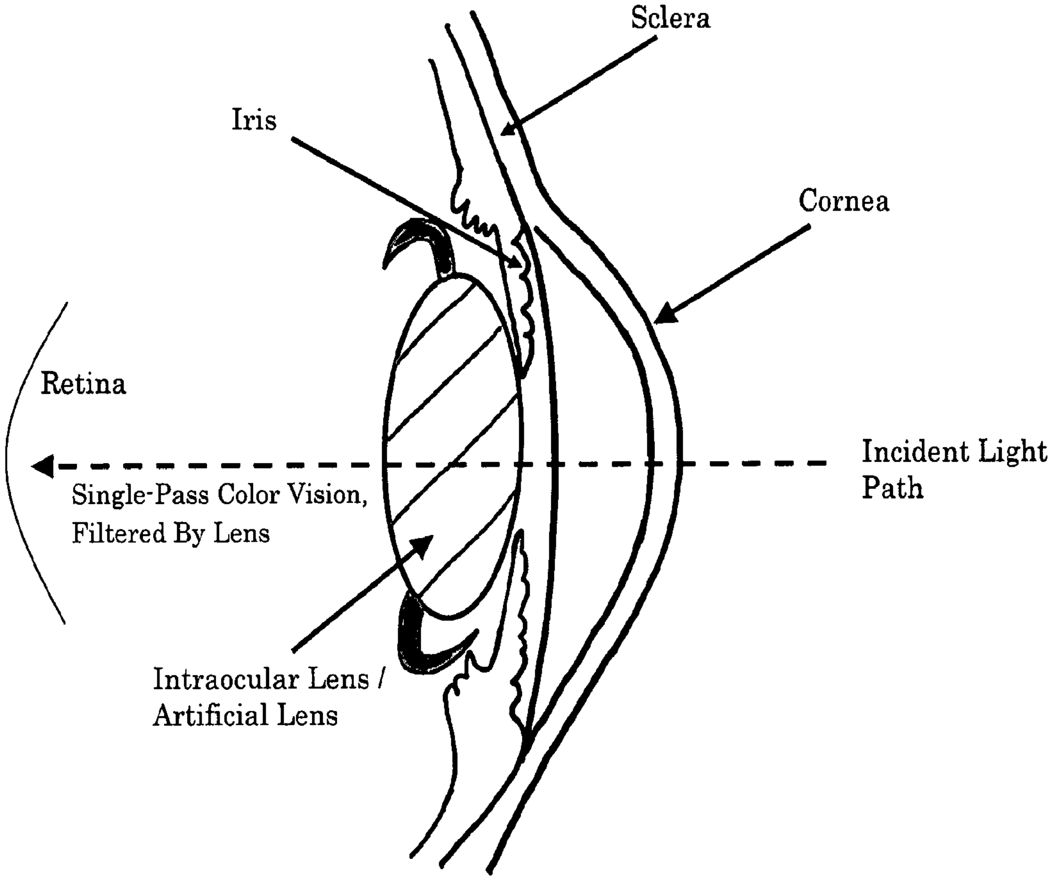
FIG. 4*b* schematically illustrates an intraocular lens (IOL) application with single-pass tint and light transmission.

FIG. 4*b* illustrates another example of an application with single-pass tint and light transmission. Incident light passes through the intraocular lens (IOL) or another type of artificial lens inside the eye once or once before reaching the retina. This transmission of incident light ignores any light reflection and/or refraction internal to artificial lens.

Figure 4C:
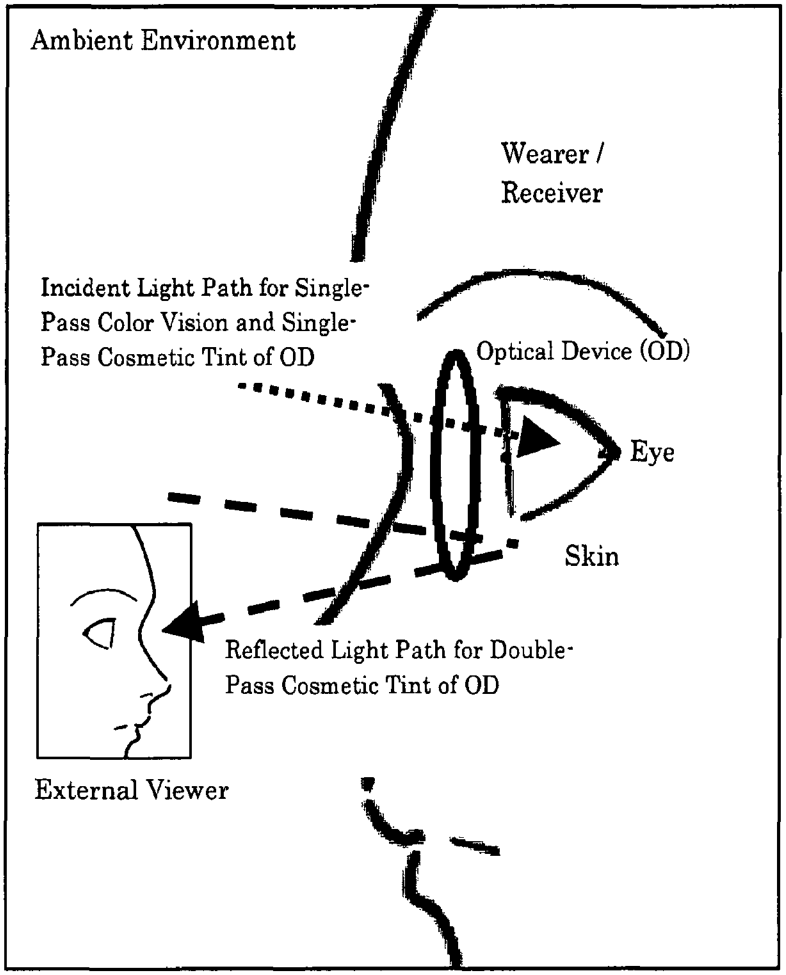
FIG. 4*c* schematically illustrates both single-pass and double-pass ray paths in the case of an eye glasses embodiment.

FIG. 4*c* schematically illustrates both single-pass and double-pass ray paths in the case of an eye glasses embodiment. The single-pass occurs where incident light is filtered once by an external optical lens before entering the eye of the viewer. Double-pass occurs when light passes once through the external optical lens before being reflected by the periocular region and then passes again through the external optical lens. The optical lens can be generalized into any transmissive optical device. The improved photometric and colorimetric performance of embodiments of the invention in relation to single-pass and double-pass transmission can be realized in a variety of applications not limited to ophthalmic devices, for example office windows, sunglasses, windshields, screens.

Figure 4D:
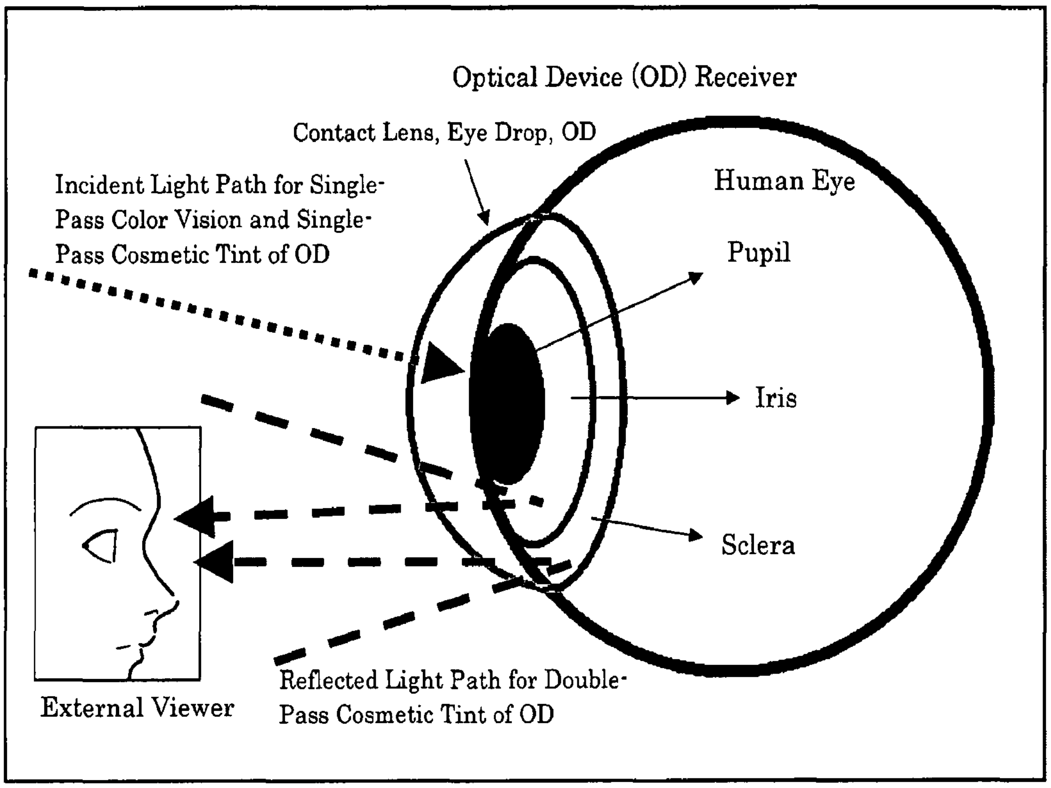
FIG. 4*d* illustrates both single-pass and double-pass transmission in the case of a tinted contact lens embodiment or tinted eye drop embodiment.

FIG. 4*d* illustrates both single-pass and double-pass transmission in the case of a tinted contact lens embodiment or tinted eye drop embodiment. The single-pass transmission occurs where incident light is filtered once by a contact lens before entering the eye of the viewer. Double-pass transmission occurs when incident light is filtered by the contact lens before being reflected by the iris and/or sclera and then filtered again by the contact lens before reaching an external viewer. The optical lens can be readily generalized into any transmissive optical device that contacts the eye. Such optical device may also include fluid film, such as an eye drop, that covers the pupil.

Figure 4E:
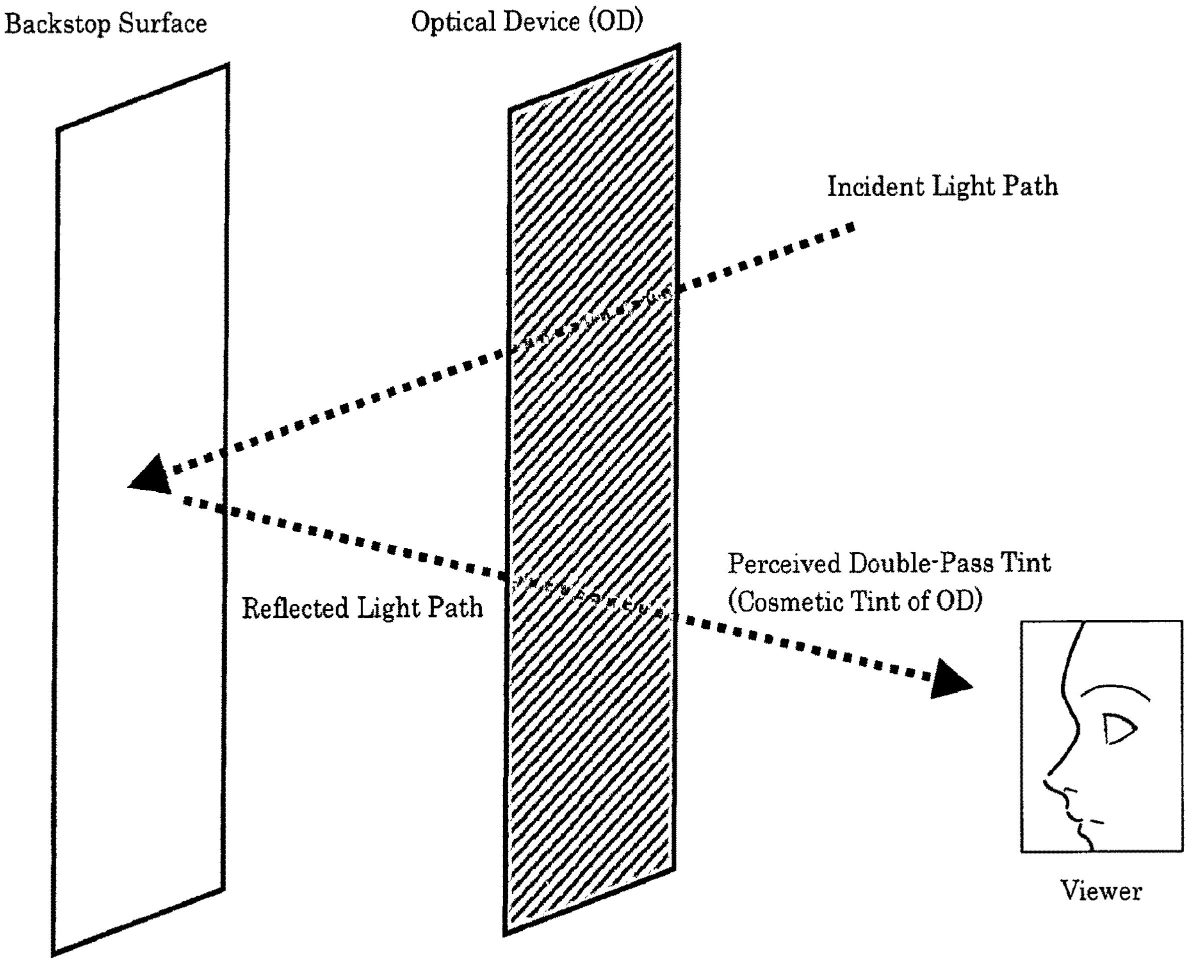
FIG. 4*e* schematically illustrates light ray paths resulting in double-pass tint of an OD as seen by an external viewer.

The cosmetic color tint of an OD perceived by the device wearer or single-pass receiver can be different than that perceived by a double-pass external viewer. As illustrated in FIGS. 4*c*, 4*d* and 4*e*, the double-pass tint of the OD as seen by an external viewer is associated with light with a reflected path, which is twice filtered by the OD before being perceived by an external viewer. The reflected light path includes incidence of external light on one surface of OD, filtering a first time by the OD as the light is transmitted through the OD, reflection or partial reflection off a backstop surface, e.g. mirror, white paper, wearer's skin, iris or sclera of the wearer's eyes, propagation back through the OD while being filtered a second time by the OD, and finally propagation to the external viewer. In this configuration, the OD is acting as a double-pass filter. In this invention, such cosmetic tint of OD is called double-pass tint or externally-viewed tint or double-pass filtration or simply "double-pass" (DP).

FIG. 4*c* shows the side view of an optical device, e.g. a lens, worn on a face, in front of an eye of a person. FIG. 4*d* shows the side view of an optical device which may take the form of. a contact lens worn on the eye. In both FIGS. 4*c* and 4*d*, 2 categories of device color are present: (1) single-pass tint of the OD, and (2) double-pass cosmetic tint of the OD. Wearer in this context has the same meaning as that of a receiver of SP light filtered by the OD, and is thus the two terms used interchangeably.

Additional perceived OD tint discoloration may vary between different illuminants (i.e. color inconstancy), and between different skin or sclera colors. Such variation may be effectively controlled via modifying the transmission spectrum of the OD to compensate. Certain control methods and results are disclosed herein.

The ODs disclosed herein modify the transmission, attenuation and/or reflection spectrum of an SMVF between 380 nm and 780 nm. CIs and PIs based on one or more of these spectra specify the performance of an OD in inhibiting incident light, including HEVL, as well as the single-pass and double-pass cosmetic tints of the same OD. Technical solutions disclosed herein improve existing devices, by (1) reducing residual non-neutral single-pass and/or double-pass tints, (2) lessening the reduction in luminous transmittance of the OD compared to other color neutralization methods and designs, (3) reducing color inconstancy of the device's tints under a variety of different lighting conditions, (4) increasing the original blocking amount of HEVL, (5) changing the original peak blocking wavelengths of HEVL to higher or lower wavelengths, and/or (6) any combination of the above.

Color Appearance Model and Reference White

Single-pass and double-pass tints are evaluated in CIE LAB, with reference white (RW) being the illuminated, unfiltered ambient environment or a white surface observed by the naked eye.

Color appearance models (CAMs) may be used to quantitatively model color perception. Standard CAMs include those established by the Commission internationale de l'Eclairage (CIE), such as the CIE 1931 XYZ, CIE 1931 xyY, CIE 1976 LUV and CIE 1976 LAB. Adhering to the CIE 1976 LAB CAM definitions, color in the instant specification is defined by its three (3) components of hue, chroma and lightness.

The system and methods disclosed herein below are described in with reference to colorimetric variables in 1976 LAB CAM format, unless specifically stated otherwise. The default color space coordinates are (L,a,b). "L" represents lightness, "a" loosely represents the amount of green or red in a color, and "b" loosely represents the amount of blue or yellow in a color.

The 1931 CIE 2-Degree Standard Observer (2D SO) with its color matching functions (CMFs) is used in defining performance metrics of devices described herein.

The photopic luminosity function (V) referred to herein is the 2005 function from Sharpe, et al.

The scotopic luminosity function (V) referred to in the present specification is the standard function adopted by the CIE in 1951.

In the present specification, white point (WP) of the single-pass tint of an OD refers to the cosmetic color of the OD against an ambient RW, unfiltered by an OD, and lit by a light source, such as CIE D65, CIE F2, CIE F7, CIE F11, CIE A, LED 3000K, LED 4000K and LED 5000K. Such WP can be calculated in CIE LAB. Light sources' SPDs are normalized to have a peak value of 1.

In a single-pass and double-pass cosmetic tint evaluation of an OD as an object in the ambient environment, RW is the ambient parameter, unfiltered by the OD.

A WP without L metric includes only the <a, b> values in CIE LAB, without lightness.

WP per se includes <L, a, b> values in CIE LAB.

RW is used in the 1976 CIE LAB color appearance model to determine the CIs of optical devices via their transmission and/or reflectance spectra.

RW is used in calculating an optical device's cosmetic color tint, via single-pass and double-pass, when lit by one or more illuminants, against a reference perceptual environment (RPE).

An RPE is comprised of at least one of an ambient and/or background environment used to contrast colors in focus or in the foreground. Examples of such environment include the ambient, white surface and/or mirror surface.

Under the same illuminant or same combination of illuminants, an optical device's single-pass tint and double-pass cosmetic tint have the same RW when both tints have the same RPE. Two different optical devices with different transmission or reflection spectra have the same RW when both devices have the same RPE. Any RW of an ambient environment is independent of the transmission spectrum of an OD. RW of the ambient environment changes when the light source changes.

The tint of a RW is described by a set of tristimulus values, $X_{RW,tint}$, $Y_{RW,tint}$ and $Z_{RW,tint}$, where {X,Y,Z} denote tristimulus, and "tint" denotes application to optical device's tints-both single-pass and double-pass. The aforementioned set of tristinulus values is collectively referred to as $RW_{tint}$.

Equation 5 describes the formulas for calculating the tristimulus values of $RW_{tint}$.

Equation 5

$$RW_{tint} = \begin{cases} X_{RW,tint} = \sum_{\lambda=380\,nm}^{\lambda=780\,nm} [\text{Illuminant}(\lambda)\bar{x}(\lambda)] \\ Y_{RW,tint} = \sum_{\lambda=380\,nm}^{\lambda=780\,nm} [\text{Illuminant}(\lambda)\bar{y}(\lambda)] \\ Z_{RW,tint} = \sum_{\lambda=380\,nm}^{\lambda=780\,nm} [\text{Illuminant}(\lambda)\bar{z}(\lambda)] \end{cases}$$

where Illuminant(λ) denotes a CIE standard illuminant, any other single light source or any combination of light sources as a function of wavelength, λ (e.g. SPD). Wavelength resolution is 1 nm. $\{\bar{x}(\lambda), \bar{y}(\lambda), \bar{z}(\lambda)\}$ is the set of CMFs.

Referring to FIG. 33 the top section of Table 2 lists RW tristimulus values applicable to any OD, under 8 different lighting conditions of D65, F2, F7, F11, A, LED-3000K, LED-4000K and LED-5000K. All of the $RW_{tint}$ values shown in the top section of Table 2 are evaluated using Equation 5.

As shown in Table 2, the RWs' tristimulus values are high for D65 and LED 4000K; medium for F2, F7, LED 3000K and LED 5000K; low for F11 and A.

The photopic and scotopic luminous transmittances of the ambient are each set at 100% by definition.

The bottom portion of Table 2, shows photopic and scotopic luminous transmittance for OD A for each of the set of illuminants CIE D65, CIE F2, CIE F7, CIE F11, CIE A, LED-3000K, LED-4000K, LED-5000K.

According to certain embodiments, the maximum variation between of photopic luminous transmittance of an OD's (including OD A's see FIG. 3), is less than 30%, when illuminated by any 2 or more illuminants in the set of CIE D 65, CIE F2, CIE F7, CIE F11, CIE A, LED-3000K, LED-4000K and LED-5000K.

According to certain embodiments, the maximum variation of scotopic luminous transmittance of an OD's (including OD A's see FIG. 3), is less than 30%, when illuminated by any 2 or more illuminants in the set of CIE D65, CIE F2, CIE F7, CIE F11, CIE A, LED-3000K, LED-4000K, LED-5000K.

For example, Table 2 shows a max variation of 10.8% between the photopic luminous transmittances of OD A when illuminated by CIE F2 versus CIE F11 and Table 2 shows a max variation of 8.2% between the scotopic luminous transmittances of OD A when illuminated by CIE A versus LED-5000K.

Equation 6 includes formulas for evaluating the tristimulus values of an OD for its single-pass (SP) tint, against an ambient RPE lit by the same light source(s) as that (those) used to evaluate the corresponding RW. T(λ) is the transmission spectrum of the optical device. Note that any transmission spectrum is for single-pass transmission, unless otherwise indicated.

Equation 6

$$\text{Tristimulus Values}_{OD,SP} = \begin{cases} X_{OD,SP} = \sum_{\lambda=380\,nm}^{\lambda=780\,nm} [\text{Illuminant}(\lambda)T(\lambda)\bar{x}(\lambda)] \\ Y_{OD,SP} = \sum_{\lambda=380\,nm}^{\lambda=780\,nm} [\text{Illuminant}(\lambda)T(\lambda)\bar{y}(\lambda)] \\ Z_{OD,SP} = \sum_{\lambda=380\,nm}^{\lambda=780\,nm} [\text{Illuminant}(\lambda)T(\lambda)\bar{z}(\lambda)] \end{cases}$$

Equation 7 includes formulas for evaluating the tristimulus values of an OD for double-pass (DP) cosmetic tint, against an ambient RPE lit by the same light source(s) as that (those) used to evaluate the corresponding RW.

Equation 7

$$\text{Tristimulus Values}_{OD,DP} = \begin{cases} X_{OD,DP} = \sum_{\lambda=380\,nm}^{\lambda=780\,nm} [\text{Illuminant}(\lambda) T^2(\lambda) \bar{x}(\lambda)] \\ Y_{OD,DP} = \sum_{\lambda=380\,nm}^{\lambda=780\,nm} [\text{Illuminant}(\lambda) T^2(\lambda) \bar{y}(\lambda)] \\ Z_{OD,DP} = \sum_{\lambda=380\,nm}^{\lambda=780\,nm} [\text{Illuminant}(\lambda) T^2(\lambda) \bar{z}(\lambda)] \end{cases}$$

Equation 8 defines white point shift (WPS) from neutral (i.e. a=b=0).

Equation 8

$$\begin{cases} WPS_{SP} = \sqrt{a_{OD,SP}^2 + b_{OD,SP}^2}, & \text{for } SP \text{ Tint of } OD \\ WPS_{DP} = \sqrt{a_{OD,DP}^2 + b_{OD,DP}^2}, & \text{for } DP \text{ Tint of } OD \end{cases}$$

where, $a_{OD,SP}$ is the CIE LAB a* value for the optical device for single-pass;

$b_{OD,SP}$ is the CIE LAB b* value for the optical device for single-pass;

$a_{OD,DP}$ is the CIE LAB a* value for the optical device for double-pass; and $b_{OD,DP}$ is the CIE LAB b* value for the optical device for double-pass.

The CIE LAB values $a_{OD,SP}$, $b_{OD,SP}$, $a_{OD,DP}$, $b_{OD,DP}$ are obtained from the tristimulus values given by equations 5, 6, 7 by known transformation equations that define the CIE LAB or CIE L*a*b* system.

Yellowness Index (YI) is a Cl often used to measure the perceived yellow discoloration of a product, material or surface. ASTM International, specifies a method to evaluate the YI of an object via ASTM Method E313. Equation 9 calculates YIs for single-pass and double-pass cosmetic tints of an OD.

Equation 9

$$\begin{cases} YI_{SP} = 100\dfrac{C_X X_{OD,SP} - C_Z Z_{OD,SP}}{Y_{OD,SP}}, & \text{for single pass } (SP) \text{ cosmetic tint of } OD \\ YI_{DP} = 100\dfrac{C_X X_{OD,DP} - C_Z Z_{OD,DP}}{Y_{OD,DP}} & \text{for double pass } (DP) \text{ cosmetic tint of } OD \end{cases}$$

where $C_X$=1.2985, and $C_Z$=1.1335, and CIE D65 illuminant is used with the 2-Degree Standard Observer.

In evaluation of CIs where red, green, blue and/or yellow colors are used, including evaluations of an OD's red-green color difference and blue-yellow color difference, (1) the green color set used is from the Munsell Color system with the following Munsell designations: 5G 5/4, 10GY 5/4, 5GY 5/4, (2) the red color set used is from the Munsell Color system with the following Munsell designations: 2.5YR 5/4, 7.5R 5/4, 10RP 5/4, (3) the blue color set used is from the Munsell Color system with the following Munsell designations: 10B 5/4, 5B 5/4, 10PB 5/4, and (4) the yellow color set used is from the Munsell Color system with the following Munsell designations: 10Y 5/4, 10YR 5/4, 5Y 5/4.

$RG_{LI}$ Color Difference Percent measures the percentage difference between (1) and (2), with (1) being the lightness-independent (LI) color difference of red and green ($RG_{LI}$) color sets as seen through an OD, and (2) being the lightness-independent color difference of the same red and green color sets as seen with only the naked eye. Equation 10 describes this metric.

Equation 10

$$RG_{LI}\text{Color Difference Percent} = 100\left(\frac{RG_{LI}\text{Color Difference Seen Through } OD}{RG_{LI}\text{Color Difference With Naked Eye}} - 1\right) = 100\left(\frac{\sqrt{(a_{OD,red} - a_{OD,green})^2 + (b_{OD,red} - b_{OD,green})^2}}{\sqrt{(a_{naked\ eye,red} - a_{naked\ eye,green})^2 + (b_{naked\ eye,red} - b_{naked\ eye,green})^2}} - 1\right)$$

$BY_{LI}$ Color Difference Percent measures the percentage difference between (1) and (2), with (1) being the lightness-independent (LI) color difference of blue and yellow ($BY_{LI}$) color sets as seen through an OD, and (2) being the lightness-independent color difference of blue and yellow color sets as seen with only the naked eye. Equation 11 describes this metric.

Equation 11

$$BY_{LI}\text{Color Difference Percent} = 100\left(\frac{BY_{LI}\text{Color Difference Seen Through } OD}{BY_{LI}\text{Color Difference With Naked Eye}} - 1\right) = 100\left(\frac{\sqrt{(a_{OD,blue} - a_{OD,yellow})^2 + (b_{OD,blue} - b_{OD,yellow})^2}}{\sqrt{(a_{naked\ eye,blue} - a_{naked\ eye,yellow})^2 + (b_{naked\ eye,blue} - b_{naked\ eye,yellow})^2}} - 1\right)$$

"$a_{green}$" is the average value of the "a" values of all individual green colors in the Munsell green color set, i.e. $a_{green}$=average $\{a_{green\ color\ 1}, \ldots, a_{green\ color\ n}\}$. "$b_{green}$" is the average value of the "b" values of all individual green colors in the Munsell green color set.

"$a_{red}$" is the average value of the "a" values of all individual red colors in the Munsell red color set. "$b_{red}$" is the average value of the "b" values of all individual red colors in the Munsell red color set.

"$a_{blue}$" is the average value of the "a" values of all individual blue colors in the Munsell blue color set. "$b_{blue}$" is the average value of the "b" values of all individual blue colors in the Munsell blue color set.

"$a_{yellow}$" is the average value of the "a" values of all individual yellow colors in the Munsell yellow color set. "$b_{yellow}$" is the average value of the "b" values of all individual yellow colors in the Munsell yellow color set.

"$a_{OD,blue}$" denotes "$a_{blue}$" seen through an OD, and "$a_{naked\ eye,blue}$" denotes "$a_{blue}$" seen with only the naked eye. The same subscript convention is applied to "b" values as well as other colors.

According to certain embodiments ODs are provided for which the $RG_{LI}$ Color Difference Percent is between −4% and 25%, preferably between −4% and 7%, for Original Spectrum (OS).

According to certain embodiments ODs are provided for which the $BY_{LI}$ Color Difference Percent is between −9% and 3% for OS.

Color Inconstancy

The optical devices described herein are designed and constructed to work in multiple lighting environments.

Color inconstancy is a significant and complex color phenomenon that is explicitly accounted for and intentionally controlled through the careful design and construction of ODs' transmission spectra in this invention. Controlling color inconstancy is at best poorly addressed in prior optical devices Color inconstancy is the inconstancy in the color appearance of an object or surface illuminated in two or more different lighting environments. For example, a lens may appear to have a single-pass tint of saturated red under F11 illuminant, simultaneously have a single-pass tint of pastel blue under F2 illuminant, and simultaneously have a near-neutral single-pass tint under D65 illuminant. This phenomenon can cause great difficulty in simultaneously color neutralizing an OD under multiple and separate lighting conditions. For example, modifications to the transmission spectrum of an OD may reduce or neutralize its tint from blue to neutral under F2 illuminant, but exacerbate its tint from neutral to red under F11 illuminant and/or re-color the OD's tint from neutral to yellow under D65 illuminant, despite the objective being to reduce or neutralize tint under all three illuminant types.

The challenge of mitigating color inconstancy can be compounded by the need to color neutralize the OD for at least one of (1) single-pass tint under different illuminant environments, and (2) double-pass cosmetic tint under the same set of illuminant environments as that in (1). For example, in certain embodiments all SP and DP tints of the OD under D65, F11, F2, F7, A, LED 3000K, LED 4000K and LED 5000K are reduced or neutralized under any illuminant. The non-color neutralized OD may have a WPS above 10 units in CIE LAB, and by only modifying the OD's transmission spectrum from 380 nm to 780 nm using at least one of one or more dyes and one or more thin films, the WPS is below 10 units.

For an OD, the simultaneous neutralization of the colors of its single-pass and double-pass tints as well as controlling their color inconstancy under a set of lighting sources must be explicitly and directly incorporated in the design and construction of the SMVF via modifying its single-pass transmission spectra. Without such complex color neutralization, an OD's tints may be unacceptably colored in at least one illuminant.

Light sources are comprised of natural lighting, such as daylight, overcast, and artificial lighting, such as fluorescent lights, incandescent lights, LEDs (light-emitting diodes) and metal halide lights. CIE standard illuminants are comprised of D65 for natural daylight, a set {F2, F7, F11} to exemplify fluorescent lights, and A for incandescent light. LED 3000K, LED 4000K and LED 5000K are typical LEDs with corresponding color temperatures producing warm-, neutral- and cool-colored light, respectively. CIE standard illuminants have well-known SPDs and CIs, and LED SPDs have generally invariant normalized shapes.

Figure 5:
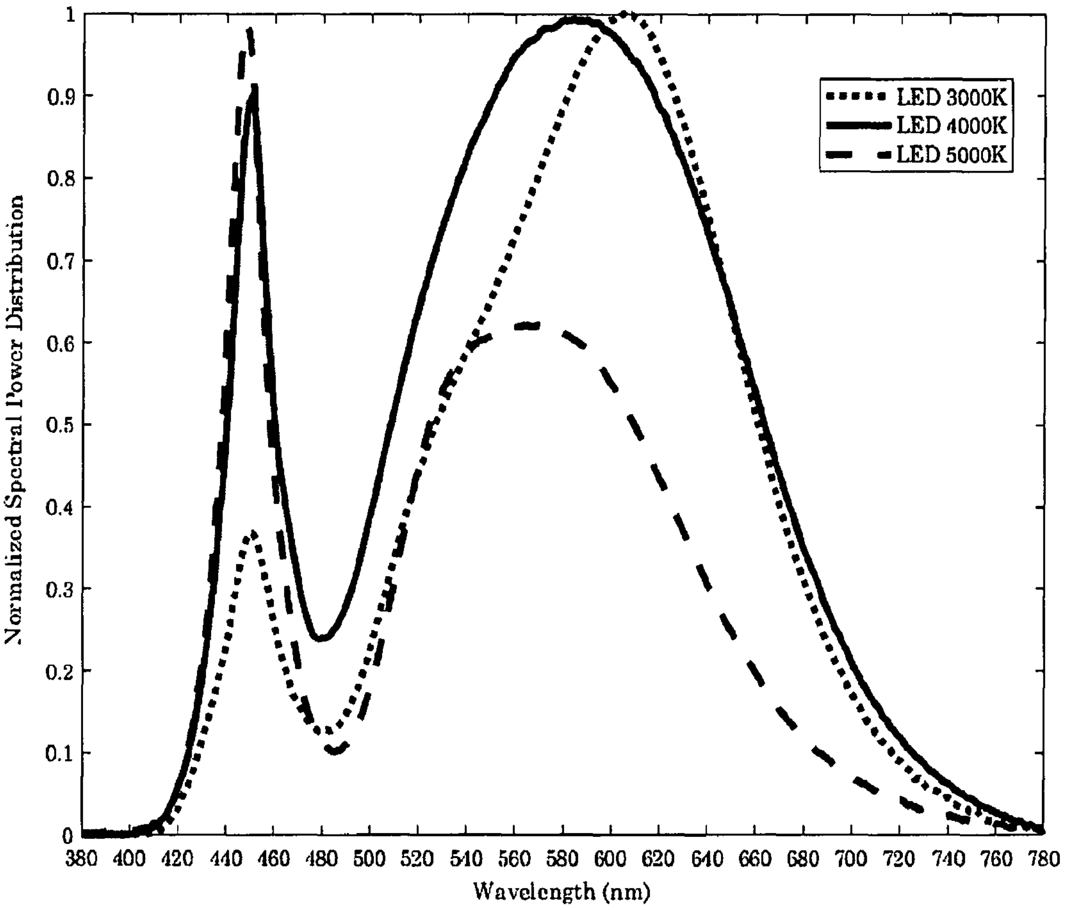
FIG. 5 shows normalized spectral power distributions (SPDs) for three common LEDs having correlated color temperatures of 3000K, 4000K and 5000K respectively.

FIG. 5 shows normalized SPDs for common LED 3000K, LED 4000K and LED 5000K. The LED 3000K has a yellow WP, industry named "warm white", and is characterized by proportionally low output in the blue and cyan wavelengths of less than 470 nm with greatly reduced output at about 480 nm, and proportionally high output of green, yellow and red wavelengths between 520 nm and 670 nm, and proportionally low output between far red and near-infrared wavelengths in the range 671 nm to 780 nm. The LED 4000K has a pastel yellow to near white WP, industry named "natural white", and is characterized by proportionally high output in the blue wavelengths substantially centered at 450 nm, proportionally low output in the cyan wavelengths substantially centered at 480 nm, and proportionally high output of green, yellow and red wavelengths between 510 nm and 670 nm, and proportionally low output between far red and near-infrared wavelengths in the range 671 nm to 780 nm. The LED 5000K has a pastel blue to near white WP, industry named "day white", and is characterized by proportionally high output in the blue wavelengths substantially centered at 450 nm, proportionally minimal output in the cyan wavelengths substantially centered at 480 nm, and proportionally medium output of green, yellow and red wavelengths between 520 nm and 640 nm, and proportionally low output between far red and near-infrared wavelengths in the range 641 nm to 780 nm.

Photometrically, these 3 SPDs represent nearly all LED SPDs with the following characteristics: (1) at least one local peak emission between 420 nm and 480 nm, and often between 440 nm and 460 nm ("blue peak"), (2) at least one local valley emission between 460 nm and 520 nm, and often between 470 nm and 500 nm ("blue valley"), and (3) at least one local peak emission between 520 nm and 640 nm ("yellow peak"). Modifying the relative emissions of the blue peak, yellow peak and blue valley result in the desired LED color temperatures. For warm-colored LEDs, the yellow peak is substantially higher than blue peak, by at least 0.25 (25%) in normalized SPD; for neutral-colored LED, the yellow peak is substantially the same as blue peak, difference within 0.24 (24%) in normalized SPD; for cool-colored LED, the yellow peak is substantially lower than blue peak, by at least 0.15 (15%) in normalized SPD.

Figure 6:
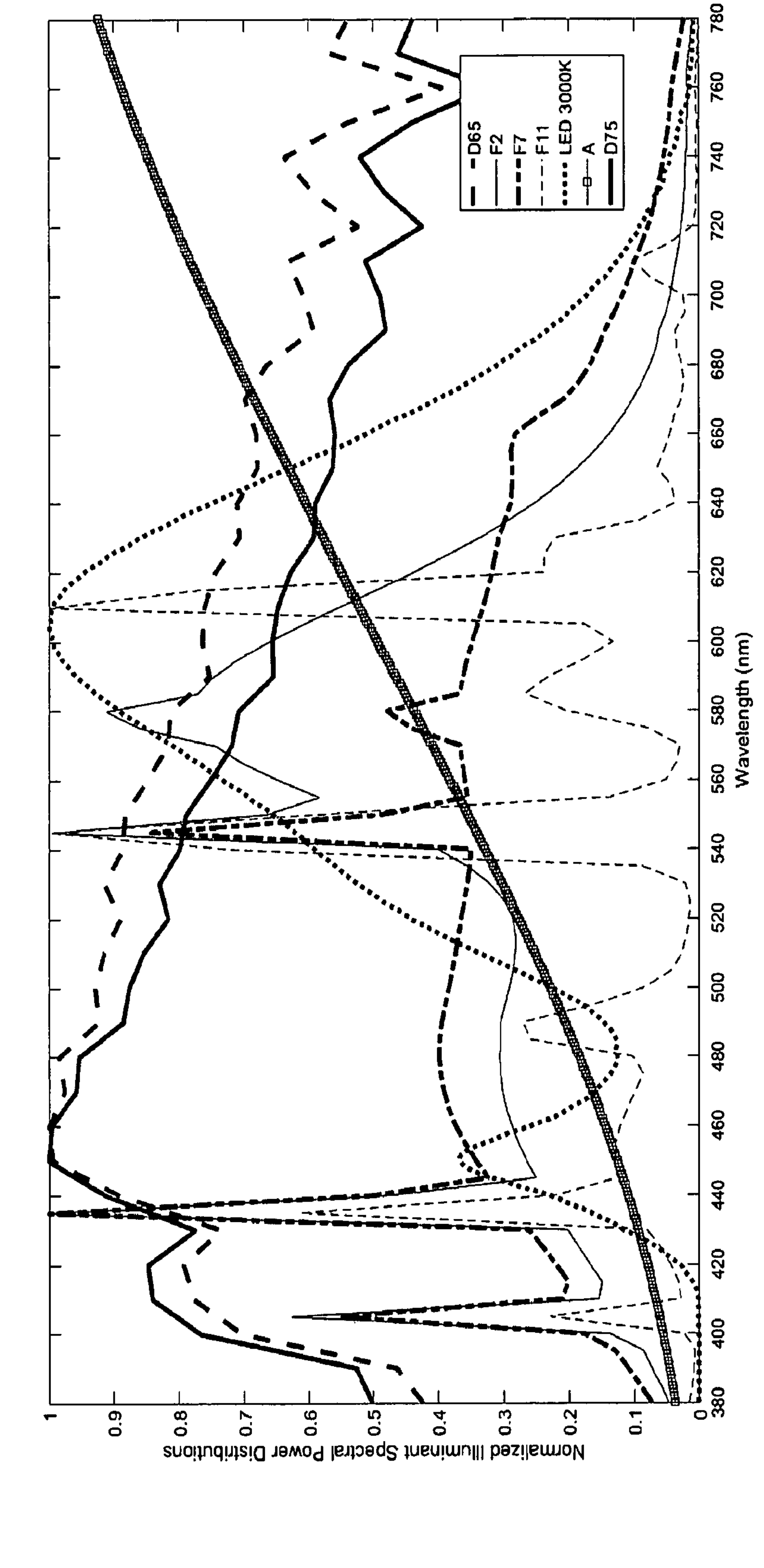
FIG. 6 illustrates SPDs of 7 illuminants, including incandescent (A), fluorescent (F2, F7, F11), daylight (D65, D75) and LED 3000K.

As seen in FIG. 6, common illuminants have extremely varied SPDs. This variation is a large source of the color inconstancy in OD's single-pass and double-pass tints. FIG. 6 illustrates SPDs of 7 illuminants, including incandescent (λ), fluorescent (F2, F7, F11), daylight (D65, D75) and LED 3000K.

For example, the SPD of illuminant A is unlike any other SPD illustrated, where it smoothly and monotonically increases in emission from 380 nm to 780 nm. In contrast, the SPDs of D65 (noon daylight) and D75 (northern sky daylight) are approximately triangular in shape, with both SPDs peak at around 460 nm, and D65 outputs less light at lower wavelengths, but more light at higher wavelengths than D75. The SPD of F2 peaks at around 540 nm and peaks again at around 580 nm, with a generally much higher output between 540 nm and 620 nm. The SPD of F7 has a near constant output between 450 nm and 640 nm (excluding the peak at around 540 nm), unlike that of F2. The SPD of F11 is substantially a tri-band waveform, with high outputs at the 440 nm, 540 nm and 610 nm regions. The SPD of LED 3000K has high output between 510 nm and 680, peaking at around 600 nm, with low output below 500 nm and above 690 nm, with a small peak at around 450 nm.

A lighting source may include any blend of two or more of individual lighting types. The blending of individual lighting types can be appropriate for a lighting environment lit with multiple types of light sources at the same time, such as a blend of daylight and fluorescent lighting in an office space with windows. Equation 12 is used to calculate the normalized SPD of a blended illuminant.

$$\text{Blended Illuminant}=\Sigma_{i\in I}c_i*\text{Illuminant}_i$$

$$\text{with } \Sigma c_i=1, c_i\geq 0 \qquad \text{Equation 12}$$

where, Index i specifies two or more of the *set* of illuminants {D65, D75, F2, F11, F7, A, LED 3000K, LED 4000K, LED 5000*K*} and {$c_i$} is the set of constants that weigh the contributions of each illuminant type in the blended illuminant according to each type of illuminant's corresponding amount of illumination.

For example, a blended illuminant is 60% D55 daylight and 40% F2 fluorescent light. Another blended illuminant may be 30% D65 daylight, 50% LED 4000K and 20% F7 fluorescent light.

The SPDs of light sources are normalized with max value equal to 1.

Table 3 shows the tristimulus values of the WP of each of the 8 disclosed light sources, i.e. illuminants, normalized to have an Xwp value equal to Xwp,D65 (i.e. X tristimulus value of the WP of D65). Table 3 showcases the large variation between the WPs' normalized tristimulus parameters of the different light sources caused by their different photometric SPDs. These heterogeneous tristimulus values are a major cause of color inconstancy in the tints of certain ODs. Furthermore, even when the WPs of some illuminants are similar, such as within the set of CIE {A, F4, F12}, within the set of CIE {D65, F7} and within the set of CIE {F1, F5}, color inconstancy of OD's tints can still readily be present when under different illuminants within these sets. This is due to the noticeable difference between their SPDs.

D65 has a pastel cool-tone hue (e.g. blue or cyan) due to slightly higher Z-tristimulus value compared to its X- and Y-tristimulus values, though is overall near-white. F2 has a warm-tone hue (e.g. yellow or orange) due to noticeably lower Z-tristimulus value compared to its X- and Y-tristimulus values. F7 has a pastel cool-color hue, though also near-white. F11 has similar tristimulus proportions to that of F2, and thus has a similar warm hue. Proportionally, A and LED 3000K have the lowest Z-tristimulus values, and thus both have the warmest hues. LED 4000K has a warmer hue than those of F2 and F11 due to proportionally lower Z-tristimulus values. LED 5000K has a pastel warm hue, and closer to neutral than those of F2 and F11 due to its Z-tristimulus value mildly below its X- and Y-tristimulus values and above those of F2 and F11.

Color Neutralization

Spectral

Inhibition between 380 nm and 520 nm of an OD's transmission spectrum may increase TTIP and/or PIP, and/or decrease TTP and/or TVP, i.e. may increase the photometric performance of SMVF.

Inhibition between 380 nm and 500 nm may increase the chroma(s) of the tint(s) of a SMVF, and impart a green, yellow or orange hue to the OD.

Inhibition between 500 nm and 780 nm may decrease the chroma(s) of the tint(s) of a SMVF.

Compare to Neutral

Default illuminants are: CIE D65, CIE F11, CIE F2, CIE F7, CIE A, LED-3000K, LED-4000K and LED-5000K.

According to certain embodiments a color neutralized SMVF OD has a WPS of its single-pass or double-pass tint of between 0 and 18 when illuminated by at least one default illuminant.

According to certain embodiments a color neutralized SMVF OD has a WPS of its single-pass and double-pass tint of between 0 and 18 when illuminated by at least one default illuminant.

According to certain embodiments a color neutralized SMVF OD has an "a" value of its single-pass or double-pass tint of between −10 and +10 when illuminated by at least one default illuminant.

According to certain embodiments a color neutralized SMVF OD has an "a" value of its single-pass and double-pass tint of between −10 and +10 when illuminated by at least one default illuminant.

According to certain embodiments a color neutralized SMVF OD has an "b" value of its single-pass or double-pass tint of between −5 and +18 when illuminated by at least one default illuminant.

According to certain embodiments a color neutralized SMVF OD has an "b" value of its single-pass and double-pass tint of between −5 and +18 when illuminated by at least one default illuminant.

According to certain embodiments a color neutralized SMVF OD has a YI of its single-pass or double-pass tint of between −5 and +30, preferably between −5 and 15.

According to certain embodiments a color neutralized SMVF OD has a YI of its single-pass and double-pass tint of between −5 and +30, preferably between −5 and 15.

Compare to Original

For any single-pass transmission spectrum, a comparative baseline spectrum is established to compare between the color of an OD's transmission spectrum ("Original Spectrum") and the color of its deconstructed spectrum ("Deconstructed Spectrum").

The Original Spectrum (OS) may be a photometrically measured or designed transmission spectrum of an OD from 380 nm to 780 nm.

The Deconstructed Spectrum may be a computed spectrum derived from the Original Spectrum.

One method of establishing one type of Deconstructed Spectrum is to first compute the Arithmetic Mean of the Original Spectrum between a Wavelength A and a Wavelength B, at 1-nm resolution. The transmission value at every wavelength of the Deconstructed Spectrum between wavelength A and wavelength B is equal to the Arithmetic Mean, for all wavelengths between Wavelength A and Wavelength B of the Original Spectrum. The transmission value at every wavelength of the Deconstructed Spectrum is equal to the transmission value at the same wavelength of the Original Spectrum, for all wavelengths (1) between 380 nm and Wavelength A, and separately (2) between Wavelength B and 780 nm. This method constructs the Arithmetically Deconstructed Spectrum (ADS).

Wavelength A is determined by the following method: (1) find the inhibition band centered between 490 nm and 710 nm (inclusive) that is centered closest to 490 nm, denoted inhibition band-490, and (2) find the pass-band centered immediately adjacent to inhibition band-490 that is centered at a shorter wavelength than that of inhibition band-490, denoted pass-band-490. Then Wavelength AAA is (1) the wavelength whose percent transmission is 2% lower than the peak transmission percent of pass-band-490, and (2) located between the centers of pass-band-490 and inhibition band-490, inclusive. Moreover, if Wavelength AAA is divisible (i.e. evenly divisible) by 10, then Wavelength AA is equal to Wavelength AAA; if not divisible, then Wavelength AA is equal to the nearest wavelength to Wavelength AAA that is (1) divisible by 10, and (2) shorter than Wavelength AAA. Then, Wavelength A is either (1) equal to Wavelength AA if Wavelength AA is more than 470 nm, or (2) equal to Wavelength AA plus 5 nm if Wavelength AA is less than or equal to 470 nm. Additionally, Wavelength A is (1) set at 465 nm if calculated to be at a shorter wavelength by the aforementioned method, or (2) set at 550 nm if calculated to be at a longer wavelength by the aforementioned method. Finally, Wavelength A is the wavelength closest to the center of inhibition band-490 if there are two or more wavelengths resulting from the aforementioned method. Wavelength B is determined by the following method: (1) find the inhibition band centered between 490 nm and 710 nm, inclusive, that is centered closest to 710 nm, denoted inhibition band-710, and (2) find the pass-band centered immediately adjacent to inhibition band-710 that is centered at a longer wavelength than that of inhibition band-710, denoted pass-band-710. Then Wavelength BBB is the wavelength whose percent transmission is 2% lower than either (1) the peak transmission percent of pass-band-710 if pass-band-710 is centered at 730 nm or less, or (2) the transmission percent at 730 nm if pass-band-710 is centered at 731 nm or more. Furthermore, Wavelength BBB is located between the centers of inhibition band-710 and pass-band-710, inclusive. Moreover, if Wavelength BBB is divisible by 5, then Wavelength BB is equal to Wavelength BBB; if not divisible, then Wavelength BB is equal to the nearest wavelength to Wavelength BBB that is (1) divisible by 5, and (2) longer than Wavelength BBB. Then, Wavelength B is either (1) equal to Wavelength BB if Wavelength BB is more than 610 nm, or (2) equal to Wavelength BB plus 5 nm if Wavelength BB is less than or equal to 610 nm. Additionally, Wavelength B is (1) set at 590 nm if calculated to be at a shorter wavelength by the aforementioned method, or (2) set at 730 nm if calculated to be at a longer wavelength by the aforementioned method. Finally, Wavelength B is the wavelength closest to the center of inhibition band-710 if there are two or more wavelengths resulting from the aforementioned method.

Calculations of Wavelength A and Wavelength B use 1-nm wavelength resolution and 0.1% transmission resolution data of the OS from 380 nm to 780 nm.

Equation 13 defines the Arithmetic Mean of the Original Spectrum between Wavelength A and Wavelength B.

$$\text{Arithmetic Mean} = \frac{\sum_{\lambda=\text{Wavelength } A}^{\text{Wavelength } B} \text{Original Spectrum}_\lambda}{\sum_{\lambda=\text{Wavelength } A}^{\text{Wavelength } B} 1} = \frac{\sum_{\lambda=\text{Wavelength } A}^{\text{Wavelength } B} \text{Original Spectrum } \%_\lambda}{\sum_{\lambda=\text{Wavelength } A}^{\text{Wavelength } B} 100\%} \qquad \text{Equation 13}$$

Equation 14 defines ADS.

$$\text{Arithmetically Deconstructed Spectrum} = \begin{cases} \text{Original Spectrum}, & \text{for } 380 \text{ nm} \leq \lambda < \text{Wavelength } A \\ \text{Arithmetic Mean}, & \text{for Wavelength } A \leq \lambda \leq \text{Wavelength } B \\ \text{Original Spectrum}, & \text{for Wavelength } B < \lambda \leq 780 \text{ nm} \end{cases} \qquad \text{Equation 14}$$

One method of establishing another type of Deconstructed Spectrum is to first compute the Photopic Mean of the Original Spectrum between Wavelength A to Wavelength B, in 1-nm resolution. The transmission value at every wavelength of the Deconstructed Spectrum is equal to the Photopic Mean, for all wavelengths between Wavelength A and Wavelength B of the Original Spectrum. The transmission value at every wavelength of the Deconstructed Spectrum is equal to the transmission value at the same wavelength of the Original Spectrum, for all wavelengths (1) between 380 nm and Wavelength A, and separately (2) between Wavelength B and 780 nm. This method calculates the Photopically Deconstructed Spectrum (PDS).

Photopic Mean is the Photopic Luminous Transmittance of the Original Spectrum between Wavelength A and Wavelength B. Equation 15 defines the Photopic Mean of the Original Spectrum between Wavelength A and Wavelength B.

$$\text{Photopic Mean} = \frac{\sum_{\lambda=\text{Wavelength } A}^{\text{Wavelength } B} \text{Illuminant}_\lambda * \text{Original Spectrum}_\lambda * V_\lambda}{\sum_{\lambda=\text{Wavelength } A}^{\text{Wavelength } B} \text{Illuminant}_\lambda * V_\lambda} \qquad \text{Equation 15}$$

where V is the photopic luminosity function, and A denotes wavelength index, and is the index of summation.

Equation 16 defines PDS.

$$\text{Photopically Deconstructed Spectrum} = \begin{cases} \text{Original Spectrum}, & \text{for } 380 \text{ nm} \leq \lambda < \text{Wavelength } A \\ \text{Photopic Mean}, & \text{for Wavelength } A \leq \lambda \leq \text{Wavelength } B \\ \text{Original Spectrum}, & \text{for Wavelength } B < \lambda \leq 780 \text{ nm} \end{cases} \qquad \text{Equation 16}$$

One method of establishing another type of Deconstructed Spectrum is to first compute the Max Blue Transmission of the Original Spectrum between 380 nm and Wavelength A, in 1-nm resolution. The transmission value at every wavelength of the Deconstructed Spectrum is equal to the Max Blue Transmission, for all wavelengths between Wavelength A and Wavelength B. The transmission value at every wavelength of the Deconstructed Spectrum is equal to the transmission value at the same wavelength of the Original Spectrum, for all wavelengths (1) between 380 nm and Wavelength A, and separately (2) between Wavelength B and 780 nm. This method calculates the Max Blue Deconstructed Spectrum (MBDS).

Max Blue Transmission is the maximum transmission value of the Original Spectrum between 380 nm and Wavelength A. Equation 17 defines the Max Blue Transmission.

$$\text{Max Blue Transmission} = \max_{380 \text{ nm} \leq \lambda \leq \text{Wavelength } A} \{\text{Original Spectrum}_\lambda\}$$

Equation 18 defines MBDS.

$$\text{Max Blue Deconstructed Spectrum} = \begin{cases} \text{Original Spectrum}, & \text{for } 380 \text{ nm} \leq \lambda < \text{Wavelength } A \\ \text{Max Blue Transmission}, & \text{for Wavelength } A \leq \lambda \leq \text{Wavelength } B \\ \text{Original Spectrum}, & \text{for Wavelength } B < \lambda \leq 780 \text{ nm} \end{cases} \qquad \text{Equation 18}$$

The 90-Deconstructed Spectrum (90DS) is defined as: the transmission value at every wavelength of the Deconstructed Spectrum is equal to 90%, for all wavelengths between Wavelength A and Wavelength B; the transmission value at every wavelength of the Deconstructed Spectrum is equal to the transmission value at the same wavelength of the Original Spectrum, for all wavelengths (1) between 380 nm and Wavelength A, and separately (2) between Wavelength B and 780 nm.

Equation 19 defines 90DS.

Equation 19

$$\text{90-Deconstructed Spectrum} = \begin{cases} \text{Original Spectrum}, & \text{for } 380\text{ nm} \le \lambda < \text{Wavelength } A \\ 90\%, & \text{for Wavelength } A \le \lambda \le \text{Wavelength } B \\ \text{Original Spectrum}, & \text{for Wavelength } B < \lambda \le 780\text{ nm} \end{cases}$$

OS is an intentionally constructed transmission spectrum of the OD to exhibit desired optical characteristics disclosed herein, and ADS, PDS, 90DS and MBDS are derivative spectra of the OS.

Embodiments

Figure 7:
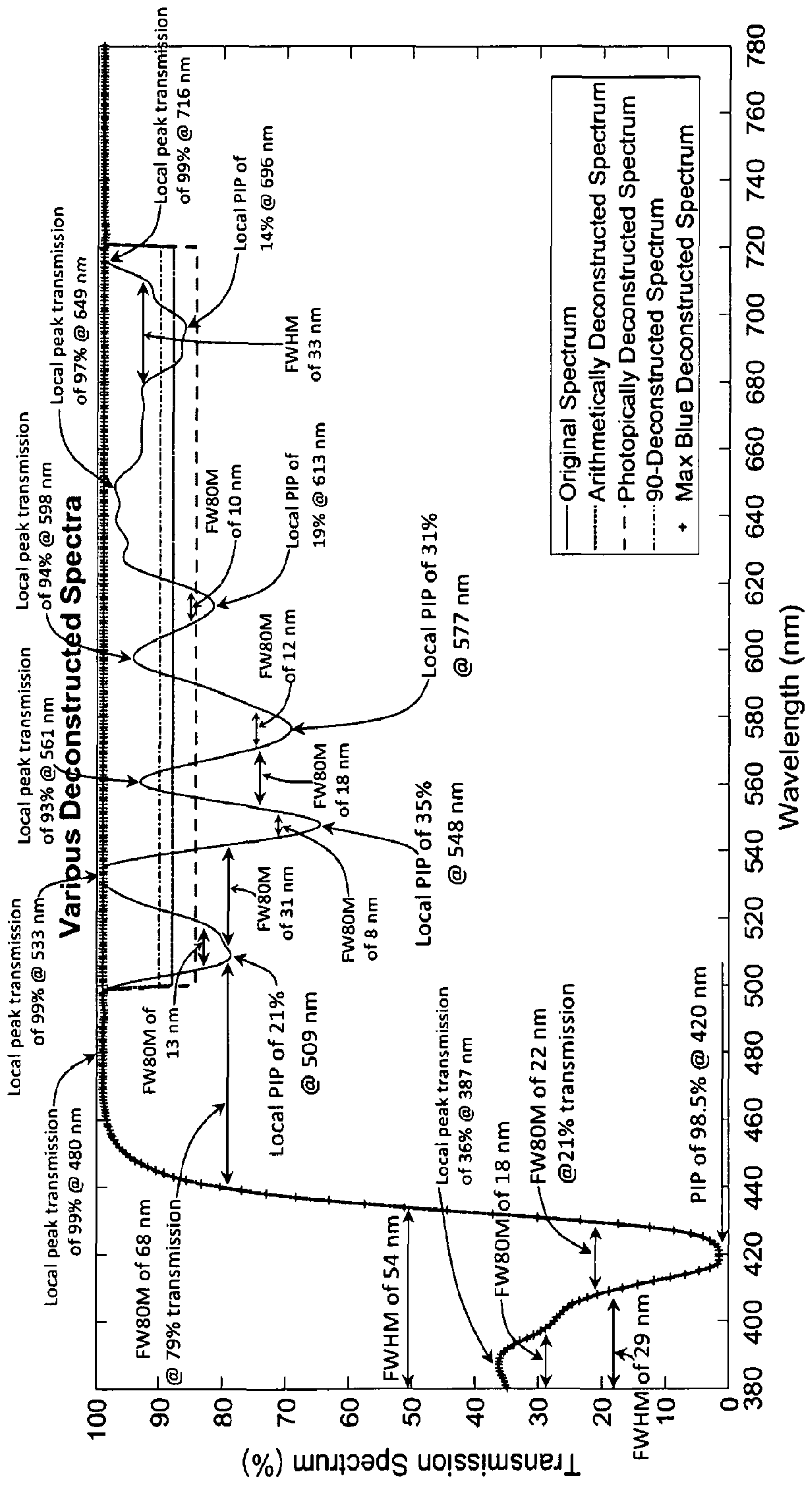
FIG. 7 illustrates the Original Spectrum of an optical device (OD), its Arithmetically Deconstructed Spectrum (ADS), Photopically Deconstructed Spectrum (PDS), Max Blue Deconstructed Spectrum (MBDS) and 90-Deconstructed Spectrum (90DS).

FIG. 7 illustrates the Original Spectrum of an OD, its ADS, PDS, MBDS and 90DS. Wavelength A is 500 nm, and Wavelength B is 720 nm. The corresponding Arithmetic Mean is 88% which is above 50%, Photopic Mean is 84% which is above 50%, and Max Blue Transmission is 99% which is above 50%. According to certain embodiments an OD has an OS for which at least one of the following applies: the Arithmetic Mean is above 50%, the Photopic Man is above 50% and/or the Max Blue Transmission is above 50%.

According to certain embodiments an OD has an OD that has at least one inhibition peak between 380 nm and 520 nm (preferably between 380 nm and 500 nm) inhibits at least 10% and such inhibition band FWHM of at least 10 nm and FW80M of at least 5 nm. An OD having the OS shown in FIG. 7 meets the aforementioned criteria and as shown has an inhibition peak at 420 nm that inhibits 98.5% of the incident light, and has a FWHM of 54 nm and a FW80M of 22 nm.

According to certain embodiments an OD exhibits an OS that has at least 1 inhibition-band, and at least 1 pass-band between 460 nm and 720 nm; the FWHM of at least 1 such inhibition band is at least 8 nm and at most 100 nm; and the FW80M of at least 1 such inhibition band is at least 5 nm and at most 80 nm. FIG. 7 shows an Original Spectrum of an OD that meets the foregoing preferences by having 5 inhibition bands, and 4 pass-bands between 460 nm and 720 nm. The FWHM of at least 1 such inhibition band is at least 8 nm and at most 100 nm.

FW80M denotes full width at 80% of maximum, and has similar definition as FWHM, with the only change being 80% of maximum for FW80M instead of 50% of maximum for FWHM. In other words, FW80M measures the full width of a spectral feature (e.g. inhibition band and pass-band) in nm at 80% of the maximum inhibition for a inhibition band or 80% of maximum transmission for a pass-band.

In certain embodiments, there is at least one inhibition band centered between 500 nm and 545 nm preferably between 500 nm and 540 nm. The PIP of at least one of such inhibition band is 21% or at least 5% with a FW80M of 13 nm or between 5 nm and 80 nm.

In certain embodiments one or more inhibition bands of OS are centered between 540 nm and 600 nm, and each of such inhibition band has a FW80M of at most 65 nm. The PIP of each of such inhibition band is 35% or between 5% and 50%. An OD having the OS shown in FIG. 7 meets the foregoing preferred characteristic by having an inhibition band centered at 548 nm that has a FW80M of 8 nm. The PIP of each of such inhibition band is 35%. For clarity, an example of determining FW80M: 80% of 35% inhibition is 28% inhibition or 72% transmission. Finally, at 72% transmission level, the inhibition band has a full width of 8 nm.

Similarly, FW10M denotes full width at 10% of maximum, and has similar definition as FWHM, with the only change being 10% of maximum for FW10M instead of 50% of maximum for FWHM. In other words, FW10M measures the full width of a spectral feature in nm at 10% of the maximum inhibition for a inhibition band or 10% of maximum transmission for a pass-band.

In certain embodiments one or more inhibition bands of OS are centered at between 540 nm and 600 nm, and each of such inhibition band has a FW80M at most 60 nm. Furthermore, each of such inhibition band has a PIP between 5% and 50%. An OD having the OS shown in FIG. 7 meets the foregoing preferred characteristic by having an inhibition band of OS centered at 577 which has a FW80M of 12 nm and a PIP of 31%.

For all inhibition bands or pass-bands of OS, the FW10M is larger than FWHM, and the latter is larger than FW80M. According to certain embodiments, the difference between FW10M and FWHM is at least 5 nm for all bands, and the difference between FWHM and FW80M is at least 5 nm for all bands.

In certain embodiments one or more inhibition bands of OS are centered between 600 nm and 700 nm, and each of such inhibition band has a FW80M of at most 60 nm. Furthermore, each of such band has a PIP of at most 60%. An OD having the OS shown in FIG. 7 meets the foregoing preferred characteristic by having an inhibition band of OS centered at 613 nm has a FW80M of 10 nm and a PIP of 19%.

In certain embodiments one or more inhibition bands of OS are centered between 600 nm and 780 nm, and each of such inhibition band has a FWHM of at least 8 nm. Moreover, the PIP of each of such inhibition band is at most 60%. An OD having the OS shown in FIG. 7 meets the foregoing preferred characteristic by having an inhibition band of OS centered at 696 nm which has a FWHM of 33 nm and a PIP of 14%.

According to certain embodiments, the largest PIP of any inhibition band of OS centered between 500 nm and 720 nm is at least 5% and in certain embodiments at least 10%.

In certain embodiments there is at least one inhibition band of OS centered between 540 nm and 640 nm, and its maximum inhibition between 540 nm and 640 nm is larger than or equal to 5%, i.e. the lowest transmission value between 540 nm and 640 nm is smaller than or equal to 95%.

According to certain embodiments, an OS has a pass-band with a peak transmission of 36% or more than 5% at 387 nm or less than 420 nm. The FWHM of this pass-band is 29 nm or at least 5 nm. The FW80M of this pass-band is 18 nm or at least 3 nm.

According to certain embodiments exemplified by FIG. 7, there is at least one pass-band of OS centered between 420 nm and 520 nm, with a FW80M of 68 nm or at least 10 nm.; the peak transmission of this pass-band is at least 20%; and the FWHM of this pass-band is at least 20 nm.

In certain embodiments one or more pass-bands of OS are centered between 510 nm and 545 nm, and each of such pass-band has (1) a peak transmission of 99% or at least 70%, and (2) a FW80M of 31 nm or at least 10 nm.

In certain embodiments one or more pass-bands of OS are centered between 550 nm and 575 nm, and each of such pass-band has (1) a peak transmission of 93% or at least 70%, and (2) a FW80M of 18 nm or at least 10 nm.

For certain embodiments exemplified by an OD having the OS spectrum shown in FIG. 7, there is at least one pass-band centered between 580 nm and 780 nm whose peak transmission is above 65%.

For certain embodiments exemplified by an OD having the OS shown in FIG. 7 there is at least one pass-band of OS centered between 420 nm and 540 nm and at least one such pass-band has a peak transmission value that is at least 5% higher than the valley transmission of at least one inhibition band centered between 540 nm and 640 nm.

For certain embodiments exemplified by an OD having the OS shown in FIG. 7 there are at least two inhibition bands centered between 380 nm and 680 nm whose valley transmissions are within 35% (35% being relative to the full 100% transmission scale as opposed to being relative to one of the valley transmissions, i.e. 35% absolute) of each other.

According to certain embodiments an OD has an OS that includes at least four spectrally selective transmission inhibitors establishing: (1) a first inhibition band having an inhibition peak between 380 and 500 nanometers, (2) at least one inhibition band centered between 500 and 550 nanometers, (3) at least one inhibition band centered between 550 and 600 nanometers, and (4) at least one inhibition band centered between 600 and 700 nanometers. Additional inhibition bands may be present.

Each spectral inhibition band of OS may be created by (1) dispersing one or more dyes into or onto at least one layer, including substrate, of the OD. One dye may create one or more inhibition bands, or (2) depositing one or more interference thin films on the surface of at least one layer, including substrate, of the OD. An interference thin film filter contains at least two materials stacked in a predetermined sequence. One interference thin film filter may create one or more inhibition bands or (3) a combination of at least one of (1) and at least one of (2).

Each spectral pass-band of OS may be created by (1) dispersing one or more dyes into or onto at least one layer, including substrate, of the OD. One dye may create one or more pass-bands or (2) depositing one or more interference thin films on the surface of at least one layer, including substrate, of the OD. An interference thin film filter contains at least two materials stacked in a predetermined sequence. One interference thin film may create one or more pass-bands or (3) a combination of at least one of (1) and at least one of (2).

At least two dyes are used to create the OS of an OD in certain embodiments and in particular in the embodiment disclosed in FIG. 7. At least one dye creates one or more inhibition bands centered between 500 nm and 560 nm, and at least one other dye creates one or more inhibition bands centered between 561 nm and 720 nm.

For example, for the spectrum in FIG. 7, 6 dyes are dispersed into a 2 mm-thick, round polycarbonate (PC) ophthalmic lens of 68 mm in diameter via mixing with PC resin and injection molding into lens shape. Exciton (2150 Bixby Road, Lockbourne, OH 43137) has (1) the ABS 420 dye that will substantially create the inhibition band at around 420 nm, with a dye loading of 5 mg to 150 mg per 3 lb of PC resin, (2) the ABS 510 dye that will substantially create the inhibition band at around 509 nm, with a dye loading of 0.5 mg to 50 mg per 3 lb of PC resin, (3) the ABS 549 dye that will substantially create the inhibition band at around 548 nm, with a dye loading of 0.5 mg to 50 mg per 3 lb of PC resin, (4) the ABS 574 dye that will substantially create the inhibition band at around 577 nm, with a dye loading of 0.5 mg to 50 mg per 3 lb of PC resin, and (5) the ABS 691 dye that will substantially create the inhibition band at around 696 nm, with a dye loading of 0.5 mg to 50 mg per 3 lb of PC resin. Epolin (358-364 Adams Street, Newark, New Jersey 07105) has the Epolight 5397 dye or the Epolight 5411 dye that will substantially create the inhibition band at around 613 nm, with either dye having a loading of 0.5 mg to 50 mg per 3 lb of PC resin. Crysta-lyn (6 Emma Street, Binghamton, NY 13905) has the DLS 605B dye that can also substantially create the inhibition band at around 613 nm, with a dye loading of 0.5 mg to 50 mg per 3 lb of PC resin. In the instant specification the statement that a dye "will substantially create" a particular inhibition band is used to signal that the example being discussed is a prophetic example. For the embodiment of FIG. 7, at least one dye is needed to create each of the described inhibition bands. A person of ordinary skill in the art can select the amount of each dye to be used by routine trial an error. Due to batch to batch variations in dyestuff quality as well host matrix effects on the dye spectrum it is appropriate to tune the dye loading for each batch of dyestuff. For the embodiment described above and for other embodiments described herein below, a test batch may be first made with an arbitrary amount dye and then based on a transmittance measurement the molar extinction of the dye within the host matrix may be calculated and a corrected amount of dye may be determined in order to attain a transmittance matching the values shown in the figures. The process may be repeated for each dye used in an OD.

According to certain embodiments color neutralized SMVF OD has a WPS of its single-pass and/or double-pass tint of between 0 and 16 when illuminated by at least one default illuminant.

A thin film coating can be used to replace or augment a dye to create the desired OS of OD. For example, a thin film constructed of alternating layers of one or more low index materials, e.g. $SiO_2$, and one or more high index materials, e.g. $TiO_2$ and/or tantalum oxide. In certain embodiments each thin film material layer may be between 50 nm and 800 nm in physical thickness. In certain embodiments, there may be between 3 to 30 layers of material in a thin film.

Dye(s) and/or thin film(s) are used to produce the OS (i.e. transmission spectrum of a SMVF as scanned by a spectrophotometer) between Wavelength A and Wavelength B such that the SP and/or DP of the tints of the OS are less chromatic (as measured by WPS) than those of the MBDS (i.e. same or substantially similar SMVF without the particular color neutralizing spectral inhibition between Wavelength A and B).

The photopic and/or scotopic luminous transmittance of the OS may be lower than those of the MBDS.

One method to determine the average photopic efficiency ($E_V$) of YI neutralization ($E_{V,YI}$), i.e. reduced YI at the sacrifice of reduced V of OD, is via Equation 20.

Equation 20

$$\begin{cases} E_{V,YI,SP} = \dfrac{\Delta YI_{SP}}{\Delta V} = \dfrac{YI_{SP,TSUE} - YI_{SP,MBDS}}{V_{TSUE} - V_{MBDS}}, & \text{for single pass } YI \text{ of } OD \\ E_{V,YI,DP} = \dfrac{\Delta YI_{DP}}{\Delta V} = \dfrac{YI_{DP,TSUE} - YI_{DP,MBDS}}{V_{TSUE} - V_{MBDS}}, & \text{for double pass } YI \text{ of } OD \end{cases}$$

where $E_{V,YI,SP}$ and $E_{V,YI,DP}$ are the average photopic efficiency of YI neutralization in single-pass YI ($YI_{SP}$) and double-pass YI ($YI_{DP}$), respectively. TSUE is the Transmission Spectrum Under Evaluation, which can be any one of OS, ADS, PDS, and 90DS. MBDS is the reference transmission spectrum used for comparison.

One method to determine the average scotopic efficiency ($E_{V'}$) of YI neutralization ($E_{V',YI}$), i.e. reduced YI at the sacrifice of reduced V' of OD, is via Equation 21.

Equation 21

$$\begin{cases} E_{V',YI,SP} = \frac{\Delta YI_{SP}}{\Delta V'} = \frac{YI_{SP,TSUE} - YI_{SP,MBDS}}{V'_{TSUE} - V'_{MBDS}}, & \text{for single pass } YI \text{ of } OD \\ E_{V',YI,DP} = \frac{\Delta YI_{DP}}{\Delta V'} = \frac{YI_{DP,TSUE} - YI_{DP,MBDS}}{V'_{TSUE} - V'_{MBDS}}, & \text{for double pass } YI \text{ of } OD \end{cases}$$

where $E_{V',YI,SP}$ and $E_{V',YI,DP}$ are the average scotopic efficiency of YI neutralization in single-pass YI and double-pass YI, respectively.

All formulations incorporating YI use the CIE D65 illuminant.

One method to determine the average photopic efficiency of WPS neutralization ($E_{V,WPS}$), i.e. reduced WPS at the sacrifice of reduced V of OD, is via Equation 22.

Equation 22

$$\begin{cases} E_{V,WPS,SP} = \frac{\Delta WPS_{SP}}{\Delta V} = \frac{WPS_{SP,TSUE} - WPS_{SP,MBDS}}{V_{TSUE} - V_{MBDS}}, & \text{for single pass } WPS \text{ of } OD \\ E_{V,WPS,DP} = \frac{\Delta WPS_{DP}}{\Delta V} = \frac{WPS_{DP,TSUE} - WPS_{DP,MBDS}}{V_{TSUE} - V_{MBDS}}, & \text{for double pass } WPS \text{ of } OD \end{cases}$$

where $E_{V,WPS,SP}$ and $E_{V,WPS,DP}$ are the average photopic efficiency of WPS neutralization in single-pass WPS ($WPS_{SP}$) and double-pass WPS ($WPS_{DP}$), respectively.

One method to determine the average scotopic efficiency of WPS neutralization ($E_{V',WPS}$), i.e. reduced WPS at the sacrifice of reduced V' of OD, is via Equation 23.

Equation 23

$$\begin{cases} E_{V',WPS,SP} = \frac{\Delta WPS_{SP}}{\Delta V'} = \frac{WPS_{SP,TSUE} - WPS_{SP,MBDS}}{V'_{TSUE} - V'_{MBDS}}, & \text{for single pass } WPS \text{ of } OD \\ E_{V',WPS,DP} = \frac{\Delta WPS_{DP}}{\Delta V'} = \frac{WPS_{DP,TSUE} - WPS_{DP,MBDS}}{V'_{TSUE} - V'_{MBDS}}, & \text{for double pass } WPS \text{ of } OD \end{cases}$$

where $E_{V',WPS,SP}$ and $E_{V',WPS,DP}$ are the average scotopic efficiency of WPS neutralization in single-pass WPS and double-pass WPS, respectively.

WPS, V and V' generally change when illuminant changes.

According to certain embodiments of the invention, for at least two illuminants in the set CIE D65, CIE F2, CIE F7, CIE F11, CIE A, LED-3000K, LED-4000K and LED-5000K. The $E_{V,WPS,DP}$ value is at least 0.7, the $E_{V',WPS,DP}$ value is at least 1.0, the $E_{V,WPS,SP}$ value is at least 0.7, and the $E_{V',WPS,SP}$ value is at least 1.0.

Figure 8A:
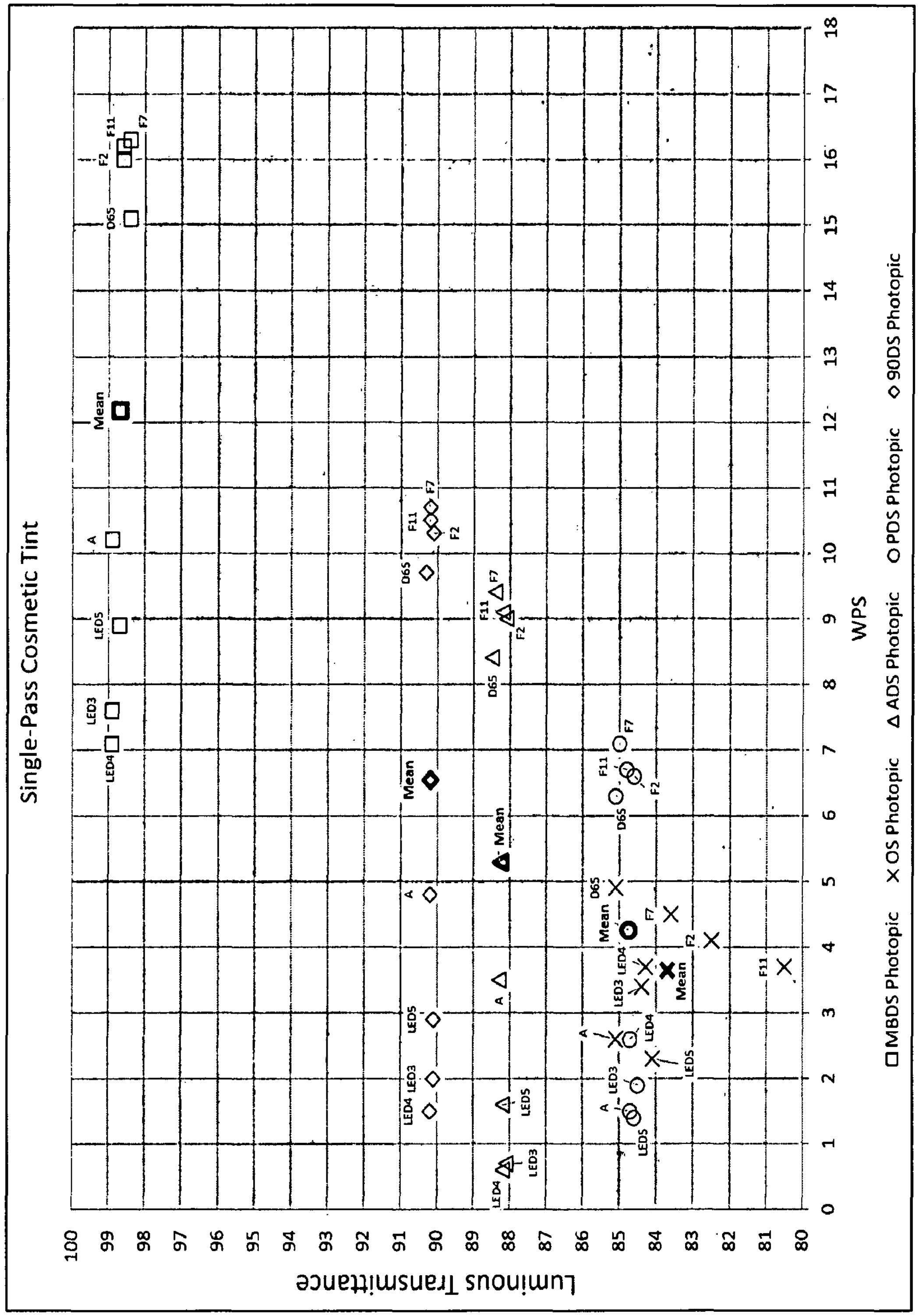
FIG. 8A is a scatter plot of the photopic luminous transmittance and single-pass white point shift (WPS) values, including mean values, of the MfBDS, OS, ADS, PDS and 90DS of the SPDs of FIG. 7, under 8 major lighting conditions.
Figure 8B:
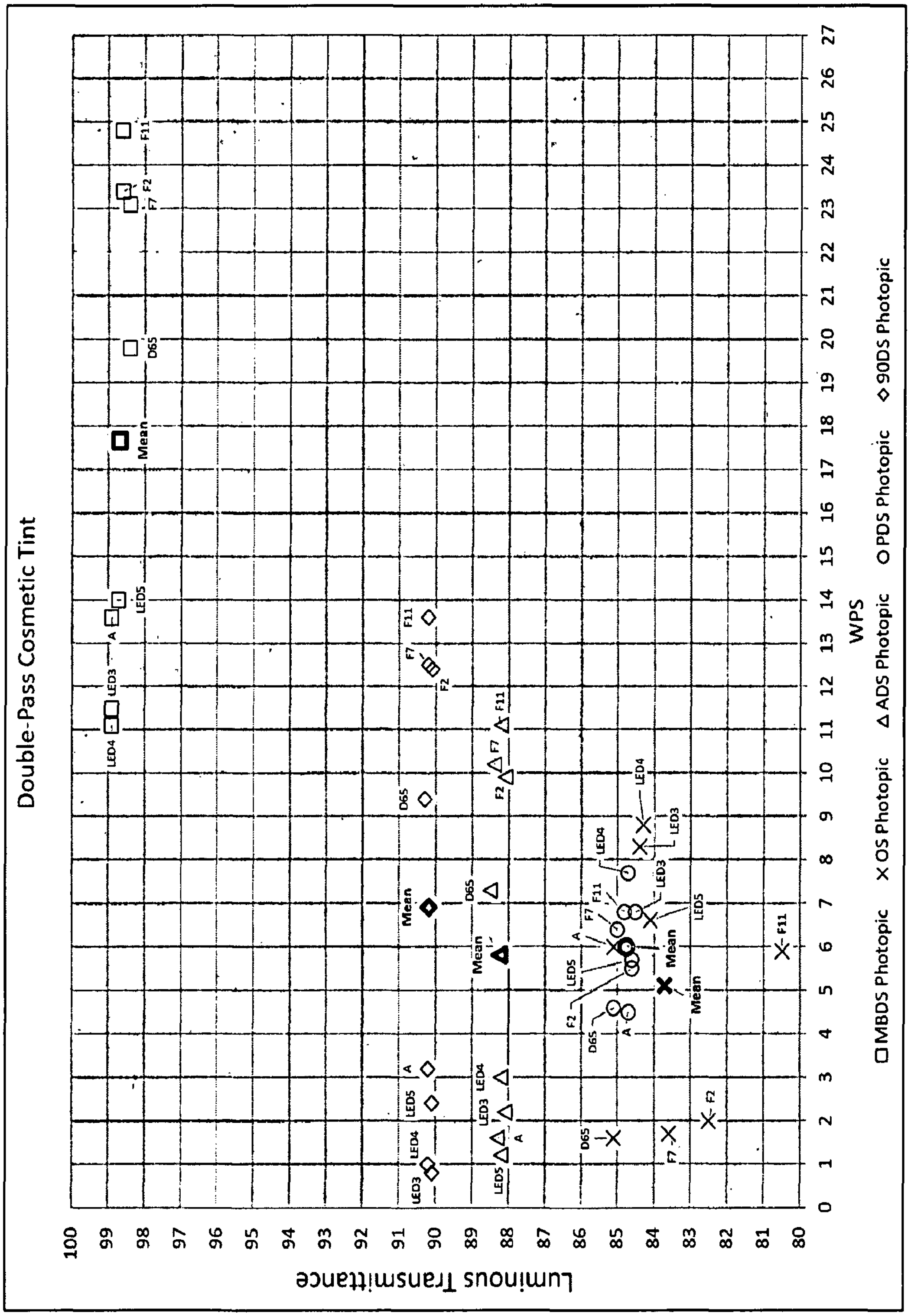
FIG. 8B is a scatter plot of the photopic luminous transmittance and double-pass WPS values, including mean values, of the MBDS, OS, ADS, PDS and 90DS of the SPDs of FIG. 7, under 8 major lighting conditions.

Table 4 shows numerous PIs and CIs of the OD, whose transmission spectrum is illustrated in FIG. 7. Table 4 shows numerous PIs and CIs of the OD, whose transmission spectrum (i.e. OS) is illustrated in FIG. 7 and FIGS. 8A-8B are scatter plots of luminous transmittance vs. WPS for the OS shown in FIG. 7 and for deconstructed transmission spectra based on the OS. The column on the left side of the table shows the categories of CIs and PIs, which include: PIP, PIP @ nm, FWHM of PIP (nm), FW80M of PIP (nm), $TTIP_{380-450}$, $TTIP_{450-500}$, $TTIP_{520}$, $TTIP_{780}$, TTP, Photopic Luminous Transmittance (V) CIE D65, Scotopic Luminous Transmittance (V') CIE D65, $RG_{LI}$ Color Difference Percent CIE D65, $BY_{LI}$ Color Difference Percent CIE D65. Moreover, under an OD's Single-Pass Tint, the CIs and PIs include, <Yellowness Index (YI), $E_{V,YI}$, $E_{V',YI}$>, CIE D65: <a, b, WPS, $E_{V,WPS}$, $E_{V',WPS}$>, CIE F11: <a, b, WPS, $E_{V,WPS}$, $E_{V',WPS}$>, CIE F7: <a, b, WPS, $E_{V,WPS}$, $E_{V',WPS}$>, CIE F2: <a, b, WPS, $E_{V,WPS}$, $E_{V',WPS}$>, CIE A: <a, b, WPS, $E_{V,WPS}$, $E_{V',WPS}$>, LED-3000K: <a, b, WPS, $E_{V,WPS}$, $E_{V',WPS}$>, LED-4000K: <a, b, WPS, $E_{V,WPS}$, $E_{V',WPS}$>, LED-5000K: <a, b, WPS, $E_{V,WPS}$, $E_{V',WPS}$>, <avg(a), avg(b), avg(WPS), avg(|a|), avg(|b|)>, <STD(a), STD(b), STD(WPS), STD(|a|), STD(|b|)>. Moreover, under an OD's Double-Pass Tint, the CIs and PIs include, <Yellowness Index (YI), $E_{V,YI}$, $E_{V,YI}$>, CIE D65: <a, b, WPS, $E_{V,WPS}$, $E_{V',WPS}$>, CIE F11: <a, b, WPS, $E_{V,WPS}$, $E_{V',WPS}$>, CIE F7: <a, b, WPS, $E_{V,WPS}$, $E_{V',WPS}$>, CIE F2: <a, b, WPS, $E_{V,WPS}$, $E_{V,WPS}$>, CIE A: <a, b, WPS, $E_{V,WPS}$, $E_{V',WPS}$>, LED-3000K: <a, b, WPS, $E_{V,WPS}$, $E_{V',WPS}$>, LED-4000K: <a, b, WPS, $E_{V,WPS}$, $E_{V',WPS}$>, LED-5000K: <a, b, WPS, $E_{V,WPS}$, $E_{V',WPS}$>, <avg(a), avg(b), avg(WPS), avg(|a|), avg(|b|)>, <STD(a), STD(b), STD(WPS), STD(|a|), STD(|b|)>.

In "Single-Pass Tint" and "Double-Pass Tint" sections of the table, each row of the table shows the CIs of the OD, categorized by OD's MBDS, OS, ADS, PDS and 90DS, and are illuminated by the designated illuminant.

"a" and "b" designate the OD's tint in CIE LAB color space.

"avg" designate an average over all corresponding values of the designated Cl illuminated by the 8 illuminants separately. For example, avg(a) determines the average value of 8 "a" values, with each "a" value caused by the illuminant D65, F11, F7, F2, A, LED-3000K, LED-4000K or LED-5000K.

"| |" designate absolute value of a Cl. For example, "avg(|b|)" determines the average value of 8 absolute values of the "b" values, with each "b" value caused by one of the illuminants in the set D65, F11, F7, F2, A, LED-3000K, LED-4000K or LED-5000K.

"STD" designates the population standard deviation of all corresponding values of the Cl illuminated by the 8 illuminants separately. For example, STD(WPS) determines the population standard deviation of 8 WPS values, with each WPS value caused by the illuminant D65, F11, F7, F2, A, LED-3000K, LED-4000K or LED-5000K.

The 5 columns under the headings of MBDS, OS, ADS, PDS and 90DS each denote the corresponding spectrum of OD, whose CIs and PIs are listed in their respective column.

For each E value, including $E_{V,YI}$, $E_{V',YI}$ $E_{V,WPS}$ and $E_{V',WPS}$, in the table, the relevant TSUE is the spectrum of the column heading, i.e. OS, ADS, PDS and 90DS. E value is not defined when MBDS is the TSUE, and hence marked with "NA".

For example, 63.9% listed under the column label of OS and right of row label of TTIP 380-450 means that OS (Original Spectrum)'s TTIP 380-450 is 63.9%.

For example, <8.1, 0.98, 1.69> listed under the column label of ADS and right of row label of Single-Pass Tint's <Yellowness Index (YI), $E_{V,YI}$, $E_{V',YI}$> means that ADS's Single-Pass Tint's YI is 8.1, ADS's Single-Pass Tint's $E_{V,YI}$ is 0.98, and ADS's Single-Pass Tint's $E_{V',YI}$ is 1.69.

For example, <−0.1, −6.8, 6.8, 0.32, 0.42> listed under the column label of PDS and right of row label of Double-Pass Tint's LED-3000K: <a, b, WPS, $E_{V,WPS}$, $E_{V',WPS}$> means that PDS's Double-Pass Tint's "a" value under LED-3000K is −0.1, PDS's Double-Pass Tint's "b" value under LED-3000K is −6.8, PDS's Double-Pass Tint's WPS under LED- 3000K is 6.8, PDS's Double-Pass Tint's $E_{V,WPS}$ under LED-3000K is 0.32, and PDS's Double-Pass Tint's $E_{V',WPS}$ under LED-3000K is 0.42.

All Cl and PI values in Table 4 and other similar tables are formatted with the above pattern.

According to certain embodiments the minimum values for all single-pass values and statistics, excluding E values, can be as low as 5 units less than the listed values in all Tables and Figures with the proviso that the minimum value limit of 0 is set for the values of WPS, avg(WPS), avg(|a|), avg(|b|), and all standard deviations if the minimum value derived from subtracting 5 units is less than 0. For example in Table 4, the minimum a value of OS in single-pass in CIE A is 2.4-5=−2.6.

According to certain embodiments the maximum values for all single-pass values and statistics, excluding E values, are each 5 units more than the listed values in all Tables and Figures. For example in Table 5, the maximum YI value of MBDS in single-pass is 8.7+5=13.7.

According to certain embodiments, the minimum values for all double-pass values and statistics, excluding E values, are each 8 units less than the listed values in all Tables and Figures with the proviso that the minimum value limit of 0 is set for the values of WPS, avg(WPS), avg(|a|), avg(|b|), and all standard deviations if the minimum value derived from subtracting 8 units is less than 0.

According to certain embodiments the maximum values for all double-pass values and statistics, excluding E values, are each 8 units more than the listed values in all Tables and Figures.

According to certain embodiments the minimum values for all single-pass and double-pass E values are each 30% (relative) less than the listed values in all Tables. For example in Table 5, the minimum $E_{V,WPS}$ value of OS in double-pass in CIE F11 is 0.72-0.72*30%=0.50.

According to certain embodiments the maximum values for all single-pass and double-pass E values are each 30% (relative) more than the listed values in all Tables.

In all Tables, all PIP, 1$^{st}$ PIP and the related wavelength, FWHM and FW80M value ranges are those stated in the text.

For all TTIP, TTP, photopic luminous transmittance and scotopic luminous transmittance values in all Tables and Figures, according to certain embodiments each minimum value is 5% (absolute) less than the listed value, bounded by 0%.

According to certain embodiments, for all TTIP, TTP, photopic luminous transmittance and scotopic luminous transmittance values in all Tables and Figures, each maximum value is 5% (absolute) more than the listed value, bounded by 100%.

According to certain embodiments, for all $RG_{LI}$ and $BY_{LI}$ Color Difference Percent, CIE D65 values, each minimum is 3% (absolute) lower than the listed value.

According to certain embodiments, for all $RG_{LI}$ and $BY_{LI}$ Color Difference Percent, CIE D65 values, each maximum is 3% (absolute) higher than the listed value.

According to certain embodiments, for at least three illuminants in the set of illuminants of CIE D65, CIE F11, CIE F7, CIE F2, CIE A, LED-3000K, LED-4000K and LED-5000K, the single-pass a-value of the OS, in absolute value magnitude, is at least one of (1) less than 5, and (2) less than 50% of the absolute value of the single-pass a-value of the MBDS.

According to certain embodiments, for at least three illuminants in the set of illuminants of CIE D65, CIE F11, CIE F7, CIE F2, CIE A, LED-3000K, LED-4000K and LED-5000K, the single-pass b-value of the OS, in absolute value magnitude, is at least one of (1) less than 7, and (2) less than 50% of the absolute value of the single-pass b-value of the MBDS.

According to certain embodiments, the single-pass YI of the OS is at least one of (1) less than 6, and (2) less than 50% of the single-pass YI of the MBDS.

According to certain embodiments, for at least three illuminants in the set of illuminants of CIE D65, CIE F11, CIE F7, CIE F2, CIE A, LED-3000K, LED-4000K and LED-5000K, the single-pass WPS of the OS is at least one of (1) less than 8, and (2) less than 50% of the single-pass WPS of the MBDS.

According to certain embodiments, for at least three illuminants in the set of illuminants of CIE D65, CIE F11, CIE F7, CIE F2, CIE A, LED-3000K, LED-4000K and LED-5000K, the double-pass a-value of the OS, in absolute value magnitude, is at least one of (1) less than 6, and (2) less than 50% of the absolute value of the double-pass a-value of the MBDS.

According to certain embodiments, for at least three illuminants in the set of illuminants of CIE D65, CIE F11, CIE F7, CIE F2, CIE A, LED-3000K, LED-4000K and LED-5000K, the double-pass b-value of the OS, in absolute value magnitude, is at least one of (1) less than 8, and (2) less than 50% of the absolute value of the double-pass b-value of the MBDS.

According to certain embodiments, the double-pass YI of the OS is at least one of (1) less than 7, and (2) less than 50% of double-pass YI of the MBDS.

According to certain embodiments, for at least three illuminants in the set of illuminants of CIE D65, CIE F11, CIE F7, CIE F2, CIE A, LED-3000K, LED-4000K and LED-5000K, the double-pass WPS of the OS is at least one of (1) less than 9, and (2) less than 50% of the double-pass WPS of the MBDS.

According to certain embodiments, for at least two illuminants in the set of illuminants of CIE D65, CIE F11, CIE F7, CIE F2, CIE A, LED-3000K, LED-4000K and LED-5000K, the absolute value difference between double-pass a-value and single-pass a-value of OS is within 5.

According to certain embodiments, for at least two illuminants in the set of illuminants of CIE D65, CIE F11, CIE F7, CIE F2, CIE A, LED-3000K, LED-4000K and LED-5000K, the absolute value difference between double-pass b-value and single-pass b-value of OS is within 5.

According to certain embodiments, the absolute value difference between double-pass YI and single-pass YI of OS is within 5.

According to certain embodiments, for at least two illuminants in the set of illuminants of CIE D65, CIE F11, CIE F7, CIE F2, CIE A, LED-3000K, LED-4000K and LED-5000K, the absolute value difference between double-pass WPS and single-pass WPS of OS is within 5.

According to certain embodiments, for at least two illuminants in the set of illuminants of CIE D65, CIE F11, CIE F7, CIE F2, CIE A, LED-3000K, LED-4000K and LED-5000K, the photopic luminous transmittance the OS is at least one of (1) above 75%, and (2) lower than that of the MBDS by less than 15%.

According to certain embodiments, for at least two illuminants in the set of illuminants of CIE D65, CIE F11, CIE F7, CIE F2, CIE A, LED-3000K, LED-4000K and LED-5000K, the scotopic luminous transmittance the OS is at least one of (1) above 70%, and (2) lower than that of the MBDS by less than 15%.

The physical, definitional or consensus limit for PIP is 0% for min and 100% for max; that for PIP @ nm is 380 nm for min and 780 nm for max; that for FWHM, FW80M and FW10M are 0 nm for min and 400 nm for max; that for all TTIP related values are 0% for min and 100% for max; that for TTP is 0% for min and 100% for max; that for both photopic and scotopic luminous transmittance are 0% for min and 100% for max; no max and min range limit for all color difference percentages; no max and min range limit for YI; no max and min range limit for all E values; that for WPS is 0 for min and no max limit; no max and min range limit for all "a" values; no max and min range limit for all "b" values; no max and min range limit for all average values; that for "STD" values are 0 for min limit and no max limit.

FIG. 8A discloses the photopic luminous transmittance and single-pass WPS values, including mean values, of the MBDS, OS, ADS, PDS and 90DS under 8 major lighting conditions.

FIG. 8B discloses the photopic luminous transmittance and double-pass WPS values, including mean values, of the MBDS, OS, ADS, PDS and 90DS under 8 major lighting conditions.

Figure 8C:
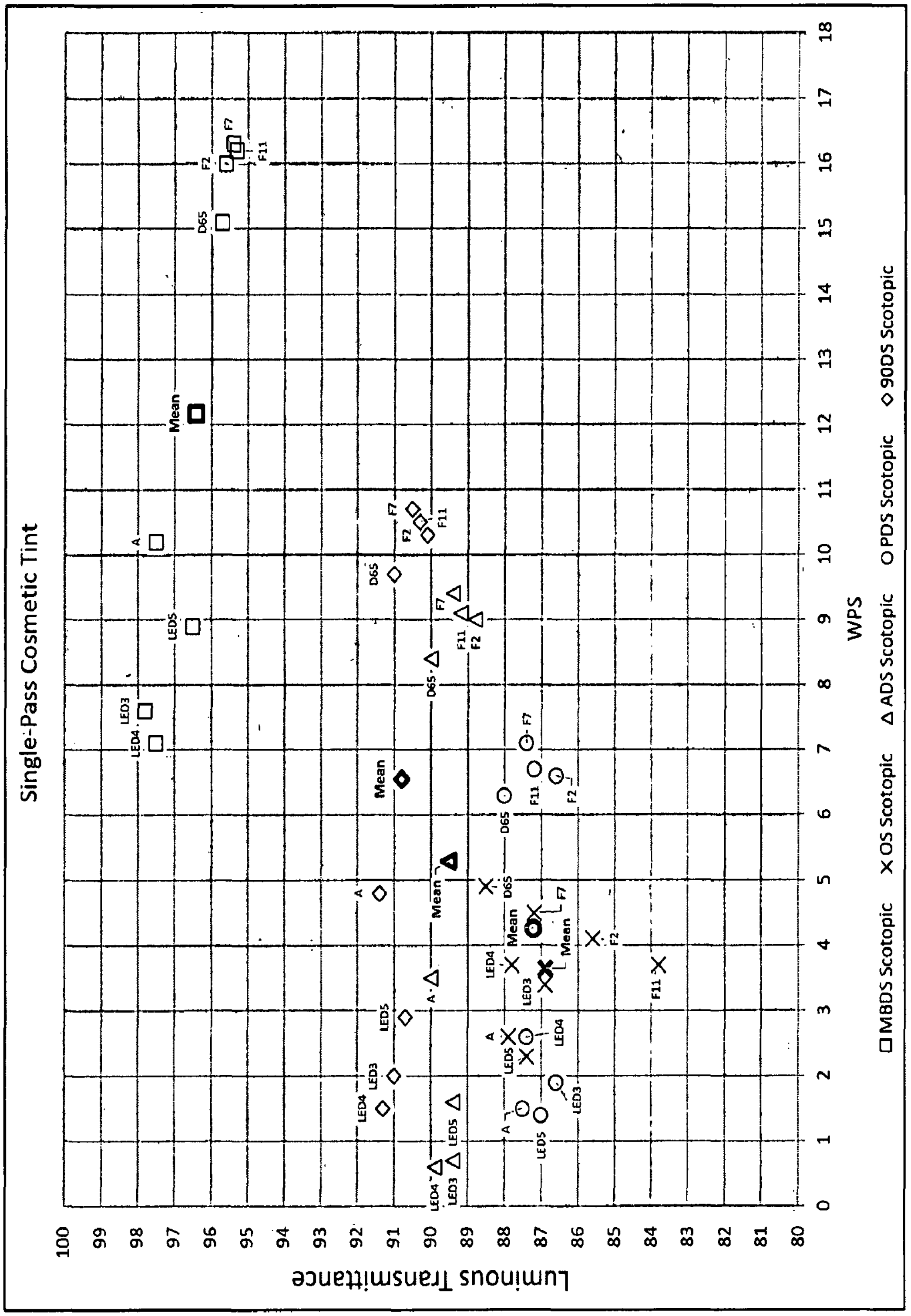
FIG. 8C is a scatter plot of the scotopic luminous transmittance and single-pass WPS values, including mean values, of the MBDS, OS, ADS, PDS and 90DS of the SPDs of FIG. 7, under 8 major lighting conditions.

FIG. 8C discloses the scotopic luminous transmittance and single-pass WPS values, including mean values, of the MBDS, OS, ADS, PDS and 90DS under 8 major lighting conditions.

Figure 8D:
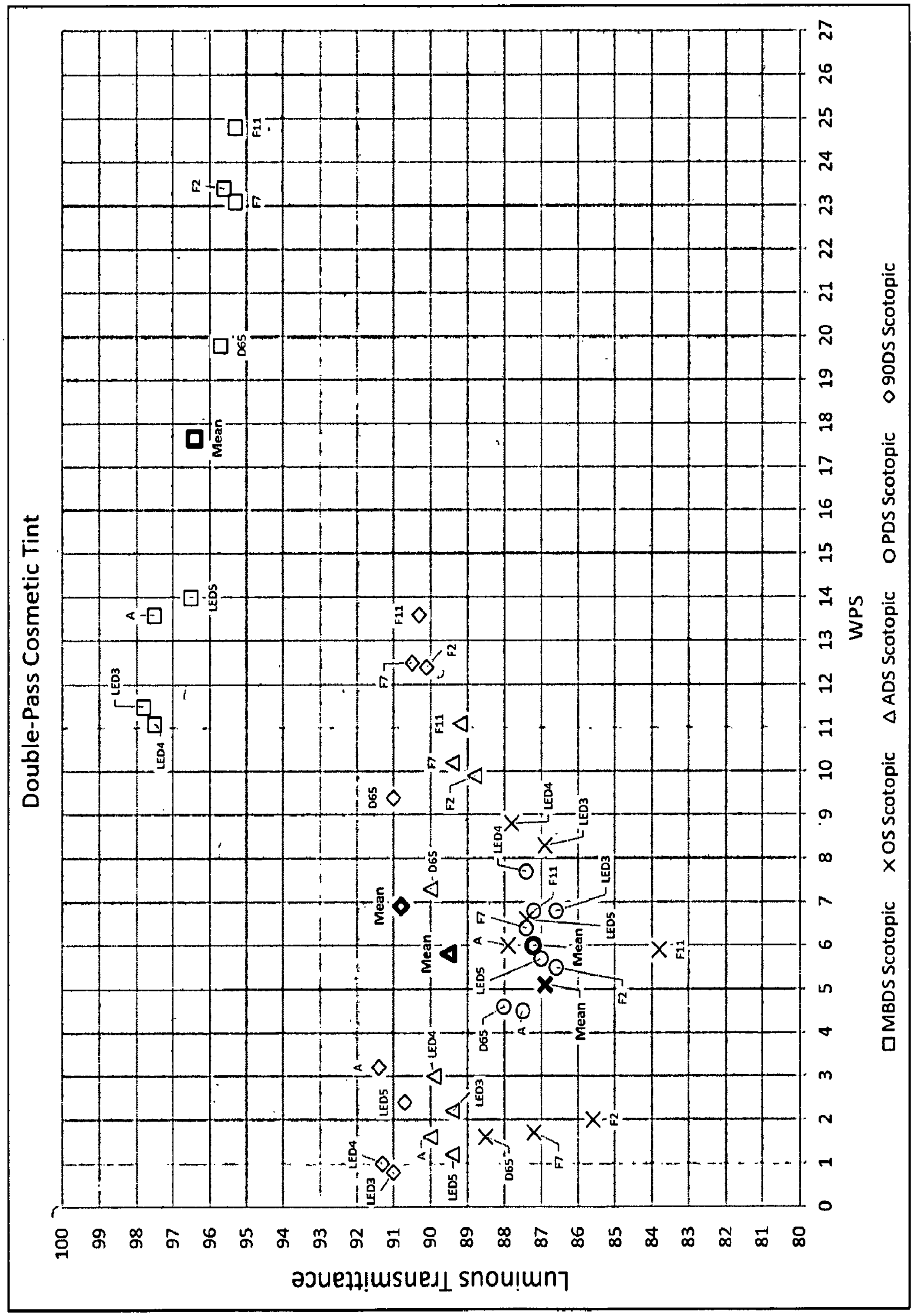
FIG. 8D is a scatter plot of the scotopic luminous transmittance and double-pass WPS values, including mean values, of the MBDS, OS, ADS, PDS and 90DS of the SPDs of FIG. 7, under 8 major lighting conditions.

FIG. 8D discloses the scotopic luminous transmittance and double-pass WPS values, including mean values, of the MBDS, OS, ADS, PDS and 90DS under 8 major lighting conditions.

FIGS. 8A-8D show that at least one of OS, ADS, PDS and 90DS reduces WPS and at least one of photopic and scotopic luminous transmittance of the OD, as compared to the WPS and luminous transmittance of MBDS.

The figures and tables show that specified modifications of the transmission spectrum of the OD between Wavelength A and Wavelength B as exhibited by at least one of the OD's OS, ADS, PDS and 90DS reduce at least one of the OD's a-value, b-value, WPS and luminous transmittance as compared to the corresponding values of the OD's MBDS, under at least one illuminant chosen from the set of 8 illuminants of D65, F2, F11, F7, A, LED-3000K (denoted LED3), LED-4000K (denoted LED4) and LED-5000K (denoted LED5). a, b and WPS values may correspond to either single-pass tint, double-pass tint or both. Luminous transmittance only corresponds to single-pass light transmission.

In all figures of luminous transmittance versus WPS, all luminous transmittance values displayed, including mean values, are centroidal values. The explicit minimum value for each listed luminous transmittance value is its centroidal value minus 30% of the absolute value of that centroidal value. The explicit maximum value for each listed luminous transmittance value is its centroidal value plus 30% of the absolute value of that centroidal value. In each case, such calculated maximum value may be limited by 100. Similarly, such calculated minimum value may be limited by 0.

In all figures of luminous transmittance (photopic and scotopic) versus WPS, all WPS values displayed, including mean values, are centroidal values. The explicit minimum value for each listed WPS value is its centroidal value minus 50% of the absolute value of that centroidal value. The explicit maximum value for each listed WPS value is its centroidal value plus 100% of the absolute value of that centroidal value. In each case, such calculated maximum value may be unlimited. However, such calculated minimum value may be limited by 0.

For example, in FIG. 8D, MBDS has a mean double-pass WPS of about 17.7 and scotopic luminous transmittance of approximately 96.5%. The minimum and maximum of such WPS range is about 8.9 and 35.4, respectively. The minimum and maximum of such luminous transmittance range is about 67.6 and 100, respectively. Such min and max values of ranges can be determined for every data point in figures containing WPS vs. Luminous Transmittance.

FIGS. 8A, B, C, D and Table 4 show that mean WPS (single-pass and/or double-pass), including centroidal value, of OS is lower by 0.1 or more, than that of at least one of MBDS, ADS, PDS and 90DS. A low mean WPS in this embodiment and in embodiments described hereinbelow indicates the beneficial attribute of less undesirable tint when viewing the world through an OD with the OS.

FIGS. 8A, B, C, D and Table 4 show that the STD of WPS (single-pass and/or double-pass) of OS is lower by 0.1 or more, than that of at least one of MBDS, ADS, PDS, and 90DS. A low STD of WPS in this embodiment and in embodiments described hereinbelow indicates the beneficial attribute of lower variation in performance under different ambient lighting conditions.

FIGS. 8A, B, C, D show one or more WPS values of OS when lit by one or more corresponding illuminants selected from the set of CIE F2, F7 and F11 illuminants is lower than (i) by 0.1 or more, where (i) is one or more WPS values of at least one of MBDS, ADS, PDS and 90DS when lit by the same illuminant(s) as those selected for the OS. WPSs can be from single-pass and/or double-pass.

FIGS. 8A, B, C, D show one or more WPS values of OS when lit by one or more corresponding illuminants selected from the set of LED-3000K, LED-4000K and LED-5000K illuminants is lower than (i) by 0.1 or more, where (i) is one or more WPS values of at least one of MBDS, ADS, PDS and 90DS when lit by the same illuminant(s) as those selected for the OS.

FIGS. 8A, B, C, D show one or more WPS values of OS when lit by one or more corresponding illuminants selected from the set of CIE A and D65 illuminants is lower than (i) by 0.1 or more, where (i) is one or more WPS values of at least one of MBDS, ADS, PDS and 90DS when lit by the same illuminant(s) as those selected for the OS.

FIGS. 8A, B, C, D show that the WPS of OS is less than 13 when the illuminant is at least one of CIE F2, CIE F7, CIE F11, CIE A, CIE D65, LED-3000K, LED-4000K and LED-5000K.

FIGS. 8A, B, C, D show the photopic luminous transmittance of OS is at least 70% when lit by at least one illuminant selected from the set of illuminants of CIE F2, CIE F7, CIE F11, CIE A, CIE D65, LED-3000K, LED-4000K and LED-5000K.

The OD has a photopic luminous transmittance between 70% and 95% in CIE D65 illuminant.

The OD has a scotopic luminous transmittance between 75% and 95% in CIE D65 illuminant.

FIGS. 8A, B, C, D show that mean luminous transmittance (photopic and/or scotopic), including centroidal value, of OS is lower by at least 0.5%, than that of at least one of MBDS, ADS and 90DS.

FIGS. 8A, B, C, D show that mean luminous transmittance (photopic and/or scotopic), including centroidal value, of OS is within 5% of that of PDS.

FIGS. 8A, B, C, D show the set of luminous transmittances (photopic and/or scotopic) of OS, when illuminated by the corresponding illuminants of CIE F2, CIE F7, CIE F11, CIE A, CIE D65, LED-3000K, LED-4000K and LED-5000K, has a range (i.e. difference between max and min values) of less than 10%. Moreover, this range of OS is larger by at least 0.5%, than such range of corresponding luminous transmittances of at least one of MBDS, ADS, PDS and 90DS within each figure.

FIGS. 8A, B, C, D show, within each figure, one or more luminous transmittance values of OS when lit by one or more corresponding illuminants selected from the set of CIE F2, F7 and F11 illuminants is lower than (i) by 0.3% or more, where (i) is one or more luminous transmittance values of at least one of MBDS, ADS, PDS and 90DS when lit by the same illuminant(s) as those selected for the OS. Luminous transmittance can be photopic or scotopic.

FIGS. 8A, B, C, D show, within each figure, one or more luminous transmittance values of OS when lit by one or more corresponding illuminants selected from the set of LED-3000K, LED-4000K and LED-5000K illuminants is lower than (i) by 0.3% or more, where (i) is one or more luminous transmittance values of at least one of MBDS, ADS, PDS and 90DS when lit by the same illuminant(s) as those selected for the OS.

FIGS. 8A, B, C, D show, within each figure, one or more luminous transmittance values of OS when lit by one or more corresponding illuminants selected from the set of CIE A and D65 illuminants is lower than (i) by 0.3% or more, where (i) is one or more luminous transmittance values of at least one of MBDS, ADS, PDS and 90DS when lit by the same illuminant(s) as those selected for the OS.

For single-pass tint, Table 4 shows two or more photopic E values of OS when lit by the corresponding two or more illuminants selected from the set of CIE F2, F11, F7, A, D65, LED-3000K, LED-4000K and LED-5000K illuminants is higher than (i) by at least 0.02, where (i) is the corresponding photopic E values of at least one of ADS, PDS and 90DS when lit by the same illuminant(s). Photopic E values include $E_{V,\ WPS}$ and $E_{V,\ YI}$ categories.

For single-pass tint, Table 4 shows two or more scotopic E values of OS when lit by the corresponding two or more illuminants selected from the set of CIE F2, F11, F7, A, D65, LED-3000K, LED-4000K and LED-5000K illuminants is higher than (i) by at least 0.02, where (i) is the corresponding scotopic E values of at least one of ADS, PDS and 90DS when lit by the same illuminant(s). Scotopic E values include $E_{V',WPS}$ and $E_{V',YI}$ categories.

For double-pass tint, Table 4 shows two or more photopic E values of OS when lit by the corresponding two or more illuminants selected from the set of CIE F2, F11, F7, A, D65, LED-3000K, LED-4000K and LED-5000K illuminants is higher than (i) by at least 0.02, where (i) is the corresponding photopic E values of at least one of ADS, PDS and 90DS when lit by the same illuminant(s).

For double-pass tint, Table 4 shows two or more scotopic E values of OS when lit by the corresponding two or more illuminants selected from the set of CIE F2, F11, F7, A, D65, LED-3000K, LED-4000K and LED-5000K illuminants is higher than (i) by at least 0.02, where (i) is the corresponding scotopic E values of at least one of ADS, PDS and 90DS when lit by the same illuminant(s).

Figure 9:
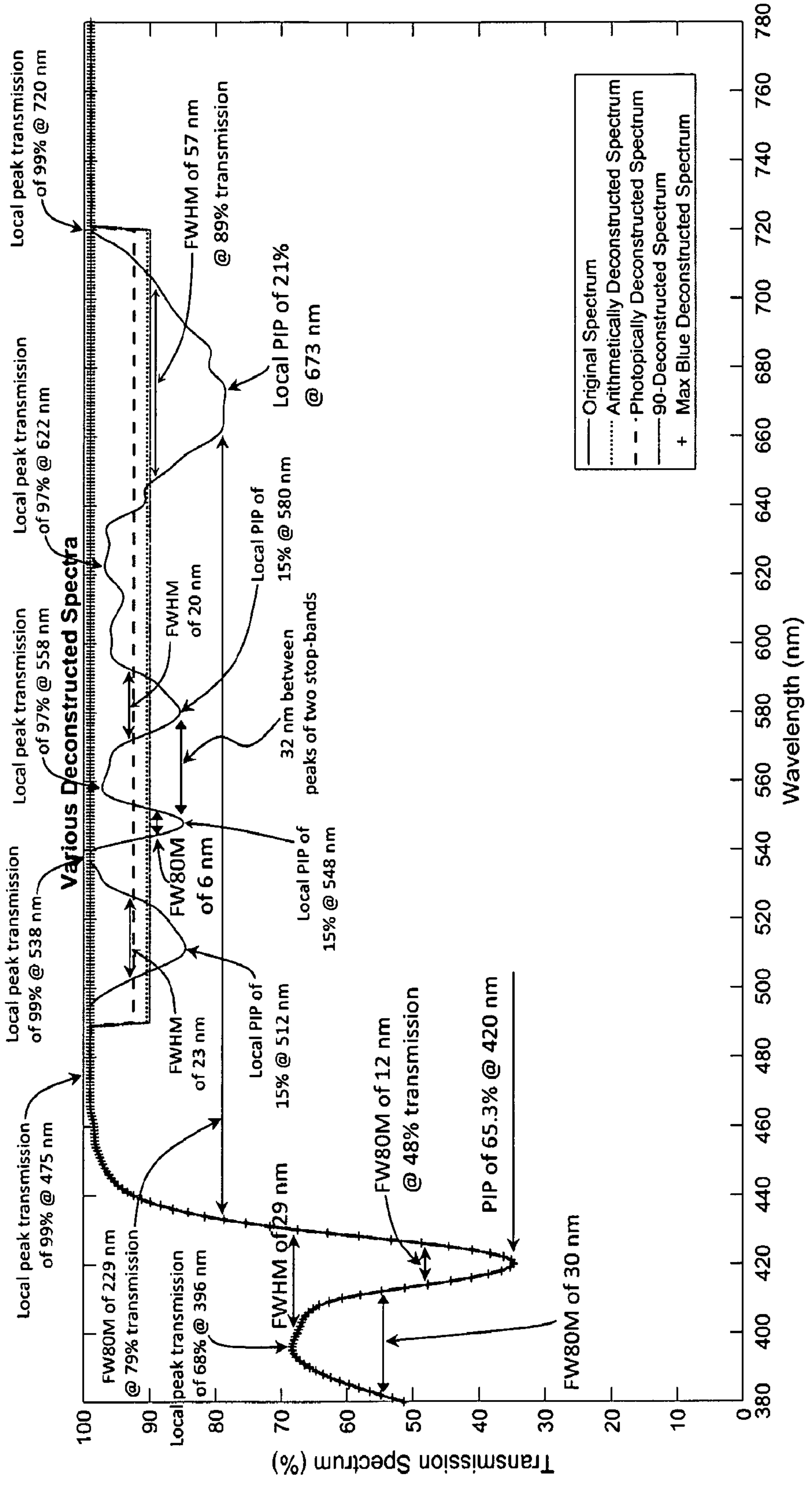
FIG. 9 is a graph including a plot of the original spectrum of an OD, its ADS, PDS, MBDS and 90DS.

FIG. 9 illustrates the Original Spectrum of an OD, and the ADS, PDS, MBDS and 90DS according to another embodiment. Wavelength A is 490 nm, and Wavelength B is 720 nm. The corresponding Arithmetic Mean is 90%, Photopic Mean is 92%, and Max Blue Transmission is 99%. The OD having the OS shown in FIG. 9 is an example of a class of embodiments that have an Arithmetic Mean, Photopic Mean and Max Blue Transmission above 70%.

According to certain embodiments there is at least one inhibition peak at 420 nm or between 380 nm and 500 nm, that inhibits 65.3% of the incident light, i.e. a PIP of 65.3% or at least 30% is seen in FIG. 9. Such inhibition band has a FWHM of 29 nm or at least 10 nm. The inhibition band has a FW80M of 12 nm or at least 5 nm. The $TTIP_{380-450}$ is at least 20%, preferably at least 30%.

FIG. 9 shows that the Original Spectrum of an OD has 4 inhibition bands, and 5 pass-bands between 460 nm and 780 nm. The OS of the OD shown in FIG. 9 is an example of a class of embodiments that has at least 1 inhibition band, and at least 2 pass-bands between 460 nm and 780 nm. The FW80M of at least 1 such pass-band is at least 20 nm and at most 300 nm.

In certain embodiments one or more inhibition bands of OS are centered between 480 nm and 545 nm and (1) the PIP of at least one of such inhibition band is between 5% and 50%, and (2) FWHM of the same inhibition band is between 5 nm and 60 nm.

In certain embodiments one or more inhibition bands of OS are centered between 546 nm and 575 nm and (1) the PIP of at least one of such inhibition band is between 5% and 40%, and (2) the FW80M of the same inhibition band is at most 60 nm.

In certain embodiments one or more inhibition bands of OS are centered between 576 nm and 670 nm and (1) the PIP of at least one of such inhibition band is between 5% and 50%, and (2) the FWHM of the same inhibition band is at most 100 nm.

In certain embodiments one or more inhibition bands of OS are centered between 671 nm and 780 nm and (1) the PIP of at least one of such inhibition band is between 5% and 60%, and (2) the FWHM of the same inhibition band is at least 8 nm.

In certain embodiments, there are at least two inhibition bands centered between 480 nm and 680 nm, and at least two dyes are used to construct at least two such inhibition bands.

The OS shown in FIG. 9 has a pass-band with a peak transmission of 68% at 396 nm and a FW80M of 30 nm. The OS shown in FIG. 9 is an example of a class of embodiments that have a pass-band with a peak transmission of more than 10% at a wavelength less than 420 nm and a FW80M between 5 nm and 65 nm.

In OS shown in FIG. 9, there is at least one pass-band centered between 420 nm and 509 nm, with a FW80M at least 30 nm. The peak transmission of this pass-band is 99% or at least 40% at 475 nm. The FW80M of this pass-band is longer than FWHM of at least one inhibition band centered between 505 nm and 640 nm. Furthermore, at least one such pass-band has a peak transmission value that is at least 5% higher than the valley (i.e. lowest) transmission value of at least one inhibition band centered between 510 nm and 680 nm.

In certain embodiments one or more pass-bands of OS are centered between 510 nm and 545 nm and have peak transmission of at least 65%.

In certain embodiments one or more pass-bands of OS are centered between 550 nm and 580 nm and at least one of such pass-band (1) has a peak transmission of at least 65%, and (2) has two adjacent inhibition bands with a wavelength distance of at least 15 nm between the wavelengths of their inhibition peaks. For example referring to FIG. 9, the pass-band centered at 558 nm has a peak transmission of 97% and the two adjacent inhibition bands have a wavelength distance of 32 nm.

"Wavelength distance" has the meaning of the shortest wavelength difference between two spectral features, e.g. (1) between the wavelengths of the valley-transmissions of two inhibition bands, (2) between the wavelengths of the peak-transmissions of two pass-bands, (3) between the wavelengths of the valley-transmission of a inhibition band and the peak-transmission of a pass-band or (4) between any other two wavelengths with each wavelength corresponding to a spectral feature.

In certain embodiments one or more pass-bands of OS are centered between 585 nm and 670 nm and the peak transmission of at least one such pass-band is above 65%.

In certain embodiments, there are at least three inhibition bands centered between 380 nm and 680 nm, and (1) for at least two such inhibition bands, the maximum difference between their valley transmissions is between 20% and 90%, preferably between 30% and 80% and (2) for at least two such inhibition bands, the maximum difference between their valley transmissions is between 0% and 30%.

At least 3 dyes are used to create the OS disclosed in FIG. 9. At least one dye with one peak inhibition between 380 nm and 480 nm is used, and at least two dyes with peak inhibitions between 500 nm and 680 nm are used.

For example, for the spectrum in FIG. 9, 5 dyes are dispersed into a 0.2 mm-thick, round silicone hydrogel (SHG) contact lens of 11 mm in diameter via mixing with monomer, polymerizing or copolymerizing. Exciton has (1) the ABS 420 dye that will substantially create the inhibition band at around 420 nm, with a dye loading of 5 mg to 300 mg per 3 lb of SHG monomer, (2) the ABS 510 dye that will substantially create the inhibition band at around 512 nm, with a dye loading of 5 mg to 150 mg per 3 lb of SHG monomer, (3) the ABS 549 dye that will substantially create the inhibition band at around 548 nm, with a dye loading of 5 mg to 150 mg per 3 lb of SHG monomer, (4) the ABS 574 dye that will substantially create the inhibition band at around 580 nm, with a dye loading of 5 mg to 150 mg per 3 lb of SHG monomer, and (5) the ABS 670T dye that will substantially create the inhibition band at around 673 nm, with a dye loading of 5 mg to 150 mg per 3 lb of SHG monomer. Epolin has the Epolight 5636 dye that also will substantially create the inhibition band at around 673 nm, with a dye loading of 5 mg to 150 mg per 3 lb of SHG monomer. Crysta-lyn has the DLS 675D dye that can also substantially create the inhibition band at around 673 nm, with a dye loading of 5 mg to 150 mg per 3 lb of SHG material. For the embodiment of FIG. 9, at least one dye may be used to create each of the described inhibition band. A dye can generally have different attenuation spectra in different materials, such as PC vs. SHG. A dye can be functionalized to copolymerize with SHG. Many dyes exist from each of the listed companies and other unlisted companies to implement the spectral transmission spectrum of an OD according to the teachings provided herein with reference to various embodiments.

Table 5 shows numerous PIs and CIs of the OD, whose transmission spectrum (OS) is illustrated in FIG. 9 along with PIs and CIs of deconstructed spectra derived from the OS shown in FIG. 9. FIGS. 10A-10D also show data derived from the OS shown in FIG. 9.

Figure 10A:
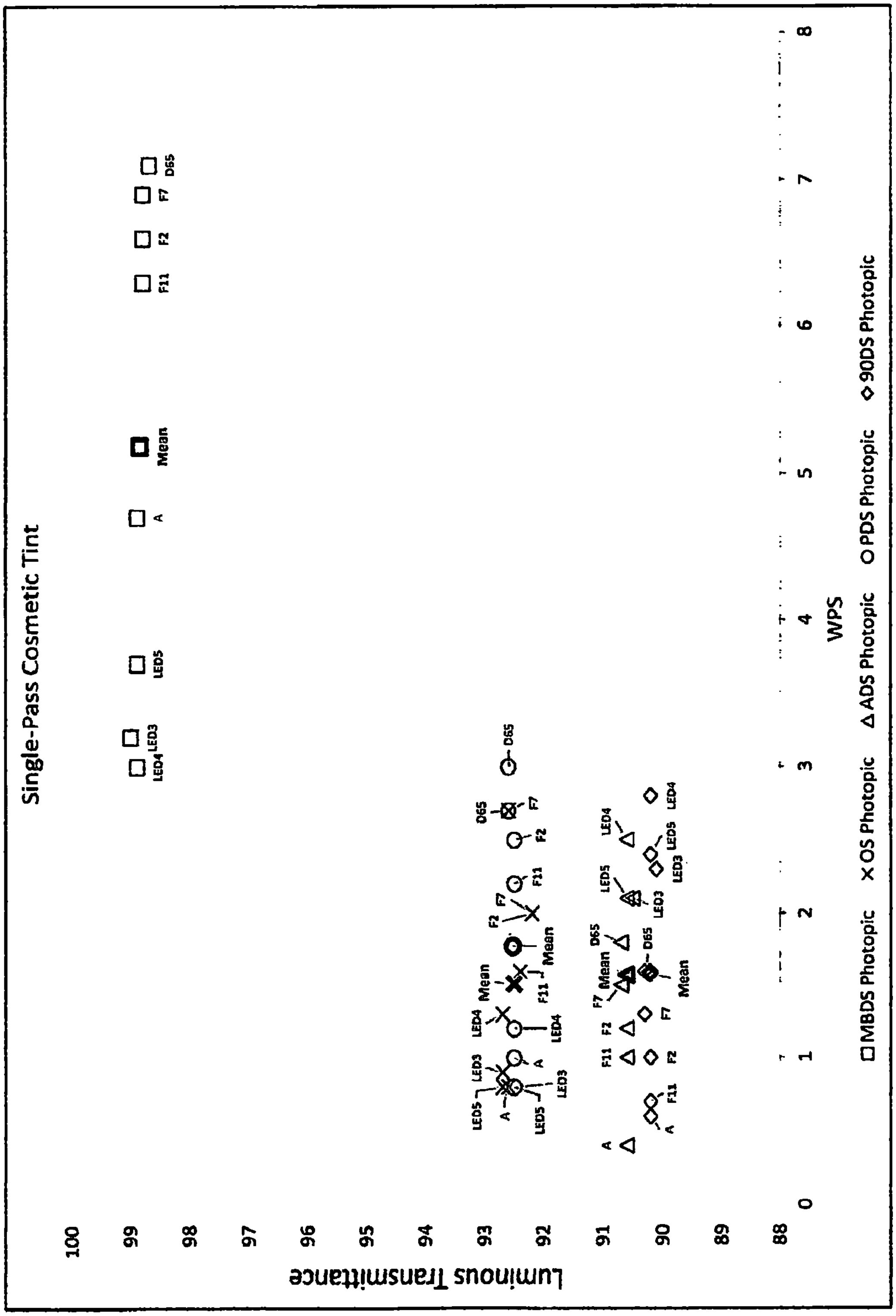
FIG. 10A is a scatter plot of the photopic luminous transmittance and single-pass WPS values, including mean values, of the MBDS, OS, ADS, PDS and 90DS of the SPDs of FIG. 9, under 8 major lighting conditions.

FIG. 10A is a scatter plot of the photopic luminous transmittance and single-pass WPS values, including mean values, of the MBDS, OS, ADS, PDS and 90DS under 8 major lighting conditions.

Figure 10B:
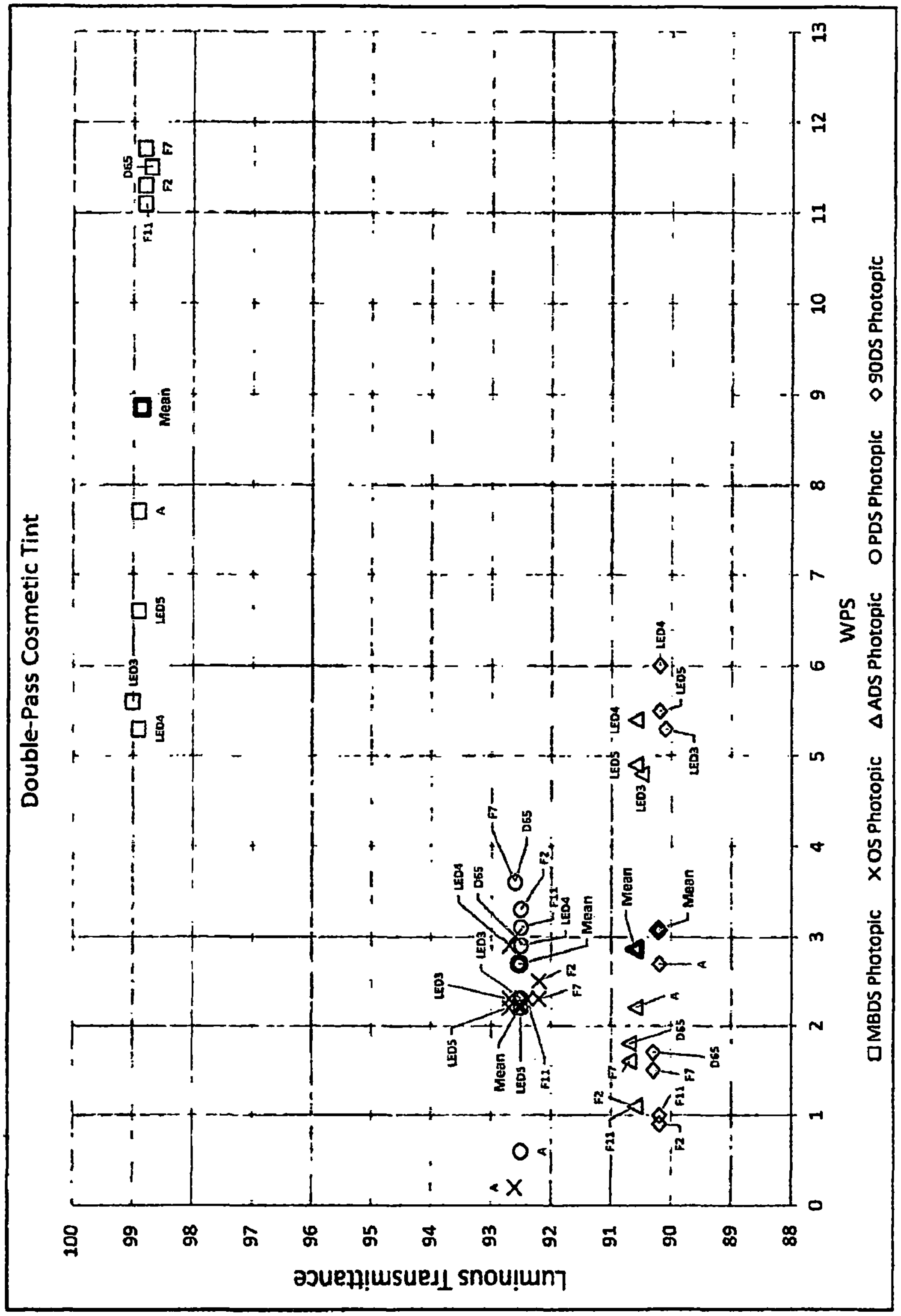
FIG. 10B is a scatter of the photopic luminous transmittance and double-pass WPS values, including mean values, of the MBDS, OS, ADS, PDS and 90DS of the SPDs of FIG. 9, under 8 major lighting conditions.

FIG. 10B is a scatter plot of the photopic luminous transmittance and double-pass WPS values, including mean values, of the MBDS, OS, ADS, PDS and 90DS under 8 major lighting conditions.

Figure 10C:
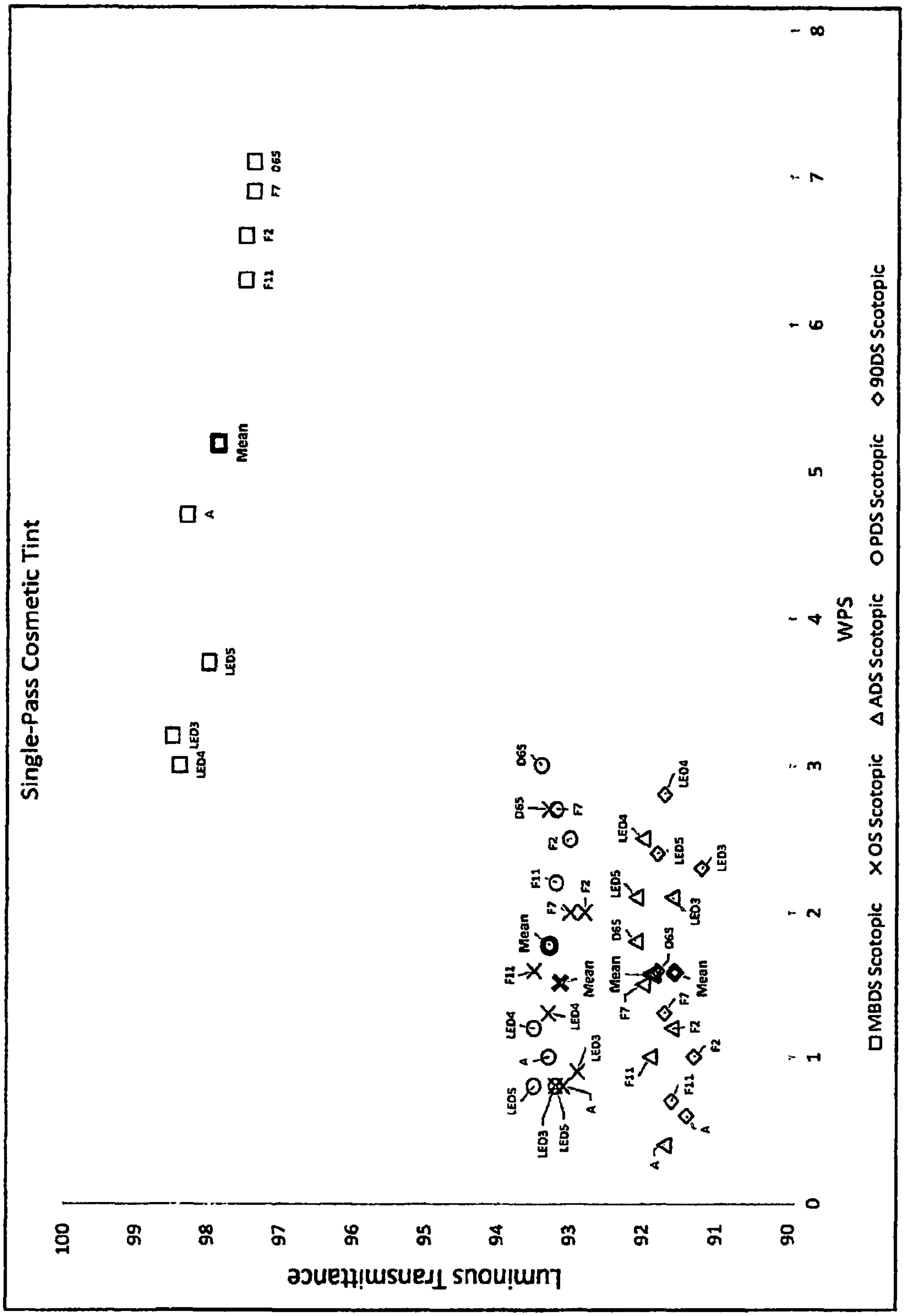
FIG. 10C is a scatter plot of the scotopic luminous transmittance and single-pass WPS values, including mean values, of the MBDS, OS, ADS, PDS and 90DS of the SPDs of FIG. 9, under 8 major lighting conditions.

FIG. 10C is a scatter plot of the scotopic luminous transmittance and single-pass WPS values, including mean values, of the MBDS, OS, ADS, PDS and 90DS under 8 major lighting conditions.

Figure 10D:
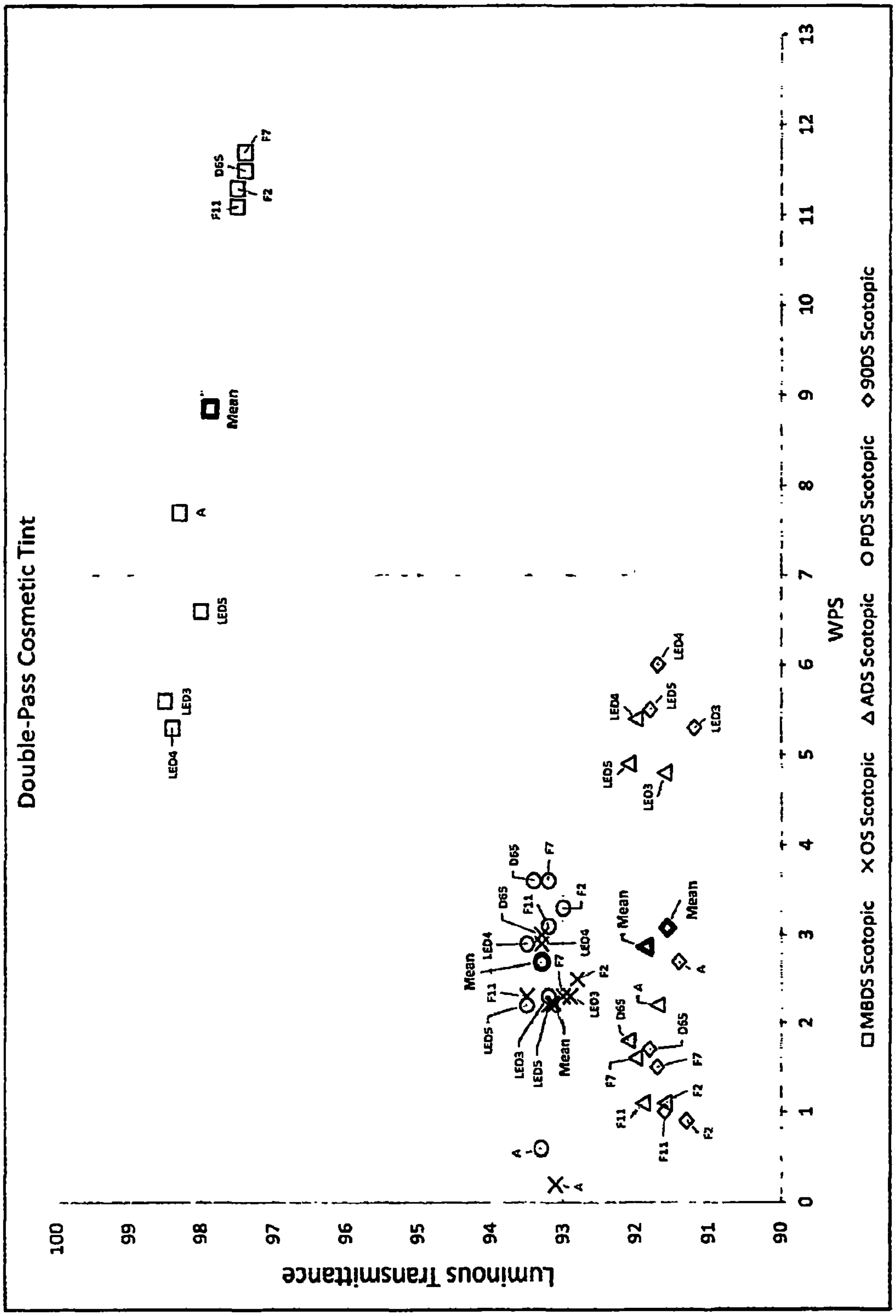
FIG. 10D is a scatter plot of the scotopic luminous transmittance and double-pass WPS values, including mean values, of the MBDS, OS, ADS, PDS and 90DS of the SPDs of FIG. 9, under 8 major lighting conditions.

FIG. 10D is a scatter plot of the scotopic luminous transmittance and double-pass WPS values, including mean values, of the MBDS, OS, ADS, PDS and 90DS under 8 major lighting conditions.

FIGS. 10A, B, C, D and Table 5 show that mean WPS (single-pass and/or double-pass) of OS is (1) lower by 2.5 or less than that of at least one of ADS, PDS, 90DS, and MBDS.

FIGS. 10A, B, C, D and Table 5 show that the STD of WPS (single-pass and/or double-pass) of OS is (1) lower by 0.1 or more than that of at least one of ADS, PDS and 90DS, and is (2) lower by 0.4 or more than that of MBDS.

FIGS. 10A, B, C, D show one or more WPS values of OS when lit by one or more corresponding illuminants selected from the set of CIE F2, F7 and F11 illuminants is (1) lower than (i) by 0.2 or more, and (2) lower than (ii) by 2 or more where (i) is one or more WPS values of at least one of ADS, PDS and 90DS, and (ii) is one or more WPS values of MBDS. WPS values in both (i) and (ii) are lit by any illuminant(s) selected from the same set of illuminants of CIE F2, F7 and F11. WPSs can be from single-pass and/or double-pass.

FIGS. 10A, B, C, D show one or more WPS values of OS when lit by one or more corresponding illuminants selected from the set of LED-3000K, LED-4000K and LED-5000K illuminants is (1) lower than (i) by 0.2 or more, and (2) lower than (ii) by 2 or more. (i) is one or more WPS values of at least one of ADS, PDS and 90DS, and (ii) is one or more WPS values of MBDS. WPS values in both (i) and (ii) are lit by any illuminant(s) selected from the same set of illuminants of LED-3000K, LED-4000K and LED-5000K.

FIGS. 10A, B, C, D show one or more WPS values of the OS when lit by one or more corresponding illuminants selected from the set of CIE A and D65 illuminants is (1) lower than (i) by 0.2 or more, and (2) lower than (ii) by 2 or more. (i) is one or more WPS values of at least one of ADS, PDS and 90DS, and (ii) is one or more WPS values of MBDS. WPS values in both (i) and (ii) are lit by any illuminant(s) selected from the same set of illuminants of CIE A and D65.

FIGS. 10A, B, C, D show that the WPS of OS is less than 9 when the illuminant is at least one of CIE F2, CIE F7, CIE F11, CIE A, CIE D65, LED-3000K, LED-4000K and LED-5000K.

FIGS. 10A, B, C, D show the photopic luminous transmittance of OS is at least 75% when lit by at least one illuminant selected from the set of illuminants of CIE F2, CIE F7, CIE F11, CIE A, CIE D65, LED-3000K, LED-4000K and LED-5000K.

FIGS. 10A, B, C, D show that mean luminous transmittance (photopic and/or scotopic) of OS is higher by at least 0.5% than that of at least one of ADS and 90DS.

FIGS. 10A, B, C, D show that mean luminous transmittance (photopic and/or scotopic) of OS is lower by at least 1.5% than that of MBDS.

FIGS. 10A, B, C, D show the set of luminous transmittances (photopic and/or scotopic) of OS, when illuminated by the corresponding illuminants of CIE F2, CIE F7, CIE F11, CIE A, CIE D65, LED-3000K, LED-4000K and LED-5000K, has a range of less than 6%. The range of a set of values is the positive difference between the maximum value and the minimum value in the set.

FIGS. 10A, B, C, D show within each figure, one or more luminous transmittance values of OS when lit by one or more corresponding illuminants selected from the set of CIE F2, F7 and F11 illuminants is (1) higher than (i) by 0.1% or more, and (2) lower than (ii) by 1% or more. (i) is one or more luminous transmittance values of at least one of ADS, PDS and 90DS, and (ii) is one or more luminous transmittance values of MBDS. Luminous transmittance values in both (i) and (ii) are lit by any illuminant(s) selected from the same set of illuminants of CIE F2, F7 and F11. Luminous transmittance can be photopic or scotopic.

FIGS. 10A, B, C, D show within each figure, one or more luminous transmittance values of OS when lit by one or more corresponding illuminants selected from the set of LED-3000K, LED-4000K and LED-5000K illuminants is (1) higher than (i) by 0.1% or more, and (2) lower than (ii) by 1% or more. (i) is one or more luminous transmittance values of at least one of ADS, PDS and 90DS, and (ii) is one or more luminous transmittance values of MBDS. Luminous transmittance values in both (i) and (ii) are independently lit by any illuminant(s) selected from the same set of illuminants of LED-3000K, LED-4000K and LED-5000K. By way of an example only, this means that we may compare an OS lit by LED-3000K to the associated ADS independently lit by LED-4000K, and to the associated MBDS independently lit by LED-5000K. That is, the comparisons are between any illuminant chosen from the set illuminants of LED-3000K, LED-4000K and LED-5000K illuminants OS, and any independent illuminant chosen from the same set of illuminants of LED-3000K, LED-4000K and LED-5000K illuminants the indicated deconstructed spectra. This understanding applies to all similarly worded comparisons, unless otherwise stated.

FIGS. 10A, B, C, D show within each figure, one or more luminous transmittance values of OS when lit by one or more corresponding illuminants selected from the set of CIE A and D65 illuminants is (1) higher than (i) by 0.1% or more, and (2) lower than (ii) by 1% or more. (i) is one or more luminous transmittance values of at least one of ADS, PDS and 90DS, and (ii) is one or more luminous transmittance values of MBDS. Luminous transmittance values in both (i) and (ii) are lit by any illuminant(s) selected from the same set of illuminants of CIE A and D65.

For single-pass tint, Table 5 shows two or more photopic E values of OS when lit by the corresponding two or more illuminants selected from the set of CIE F2, F11, F7, A, D65, LED-3000K, LED-4000K and LED-5000K illuminants is higher than (i) by at least 0.03, where (i) is the corresponding photopic E values of at least one of ADS, PDS and 90DS when lit by the same illuminant(s).

For single-pass tint, Table 5 shows two or more scotopic E values of OS when lit by the corresponding two or more illuminants selected from the set of CIE F2, F11, F7, A, D65, LED-3000K, LED-4000K and LED-5000K illuminants is higher than (i) by at least 0.03, where (i) is the corresponding scotopic E values of at least one of ADS, PDS and 90DS when lit by the same illuminant(s).

For double-pass tint, Table 5 shows two or more photopic E values of OS when lit by the corresponding two or more illuminants selected from the set of CIE F2, F11, F7, A, D65, LED-3000K, LED-4000K and LED-5000K illuminants is higher than (i) by at least 0.03, where (i) is the corresponding photopic E values of at least one of ADS, PDS and 90DS when lit by the same illuminant(s).

For double-pass tint, Table 5 shows two or more scotopic E values of OS when lit by the corresponding two or more illuminants selected from the set of CIE F2, F11, F7, A, D65, LED-3000K, LED-4000K and LED-5000K illuminants is higher than (i) by at least 0.03, where (i) is the corresponding scotopic E values of at least one of ADS, PDS and 90DS when lit by the same illuminant(s).

Figure 11:
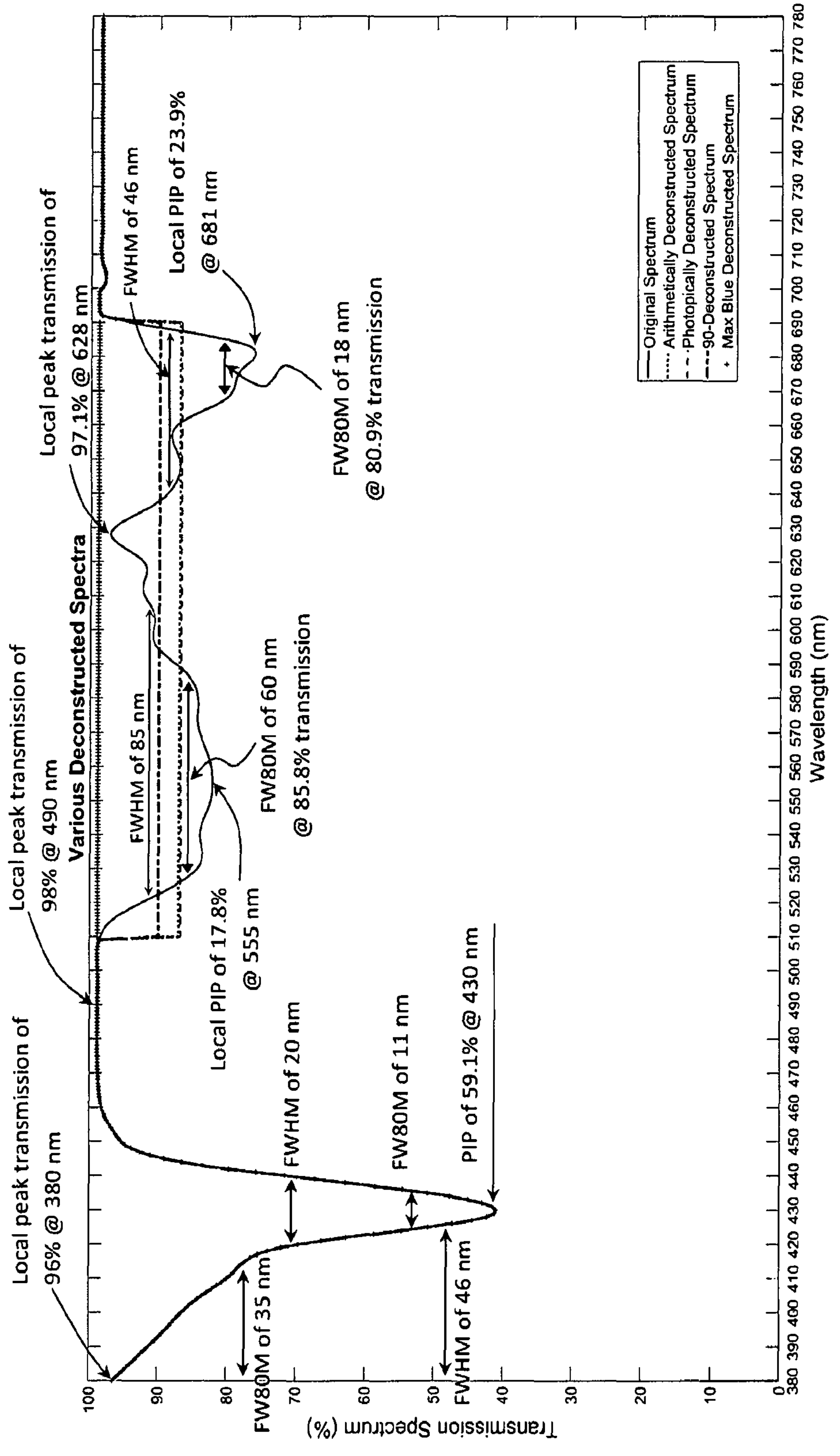
FIG. 11 is a graph including a plot the Original Spectrum of an OD, its ADS, PDS, MBDS and 90DS.

FIG. 11 illustrates the Original Spectrum of an OD, the OS's ADS, PDS, MBDS and 90DS. Wavelength A is 510 nm, and Wavelength B is 690 nm. The corresponding Arithmetic Mean is 87%, Photopic Mean is 87%, and Max Blue Transmission is 98%. FIG. 11 is an example of a class of embodiments for which the Arithmetic Mean, Photopic Mean, and Max Blue Transmission are above 70%.

Referring to FIG. 11, there an inhibition peak at 430 nm, that inhibits 59% of the incident light, i.e. a PIP of 59%. The aforementioned inhibition band has a FWHM of 20 nm and a FW80M of 11 nm. Inhibiting transmission of HEVL in the range 415 nanometers to 465 nanometers reduces the phototoxicity of light for the human eye. FIG. 11 is an example of a class of embodiments in which there is at least one inhibition peak between 380 nm and 490 nm, that inhibits at least 15% and has a FWHM of at least 8 nm and a FW80M of at least 5 nm.

FIG. 11 shows that the Original Spectrum of the represented OD has 2 inhibition bands, and 3 pass-bands centered between 455 nm and 730 nm. FIG. 11 is representative of a class of embodiments that has at least 1 inhibition band, and at least 2 pass-bands centered between 455 nm and 730 nm. The FW80M of at least 1 such inhibition band is at least 10 nm and at most 80 nm, and is at a transmission level of between 65% and 96%. FWHM of at least 1 such inhibition band is at least 30 nm and at most 100 nm, and is at a transmission level which is at least 5% higher than that for the FW80M of the same inhibition band.

According to certain embodiments, there is at least one inhibition band centered between 510 nm and 600 nm. The PIP of the at least one of such inhibition band is 18% or at least 5% with a FW80M that is at least 10 nm shorter than the FWHM of the same inhibition band. There is at least one inhibition band centered between 600 nm and 730 nm. The PIP of at least one of such inhibition band is 24% or at least 5% with a FW80M that is at least 10 nm shorter than the FWHM of the same inhibition band. Furthermore, the transmission level corresponding to FW80M is at least 5% lower than that of the respective FWHM. According to certain embodiments the largest PIP of any inhibition band of OS centered between 490 nm and 650 nm is at most 40%.

In certain embodiments, if one or more pass-bands of OS are centered between 380 nm and 430 nm, then at least one such pass-band has a peak transmission of more than 10%. The FW80M of this pass-band is at least 10 nm, and the FWHM is at least 20 nm.

In certain embodiments there is at least one pass-band of OS centered between 430 nm and 510 nm with a FW80M of at least 30 nm. The peak transmission of this pass-band is at least 40% (for example 98%). The peak transmission of such pass-band is higher, by at least 2%, than the peak transmission(s) of all pass-bands centered at lower wavelength(s).

In certain embodiments, one or more pass-bands of OS centered between 560 nm and 660 nm have a peak transmission of at least 70%. The two adjacent inhibition bands to such a pass-band have a wavelength distance of at least 50 nm between the wavelengths of their inhibition peaks.

In certain embodiments the valley (i.e. lowest) transmission(s) of one or more inhibition bands of OS centered between 490 nm and 700 nm is between 5% and 35% lower than the peak transmission of an immediately adjacent pass-band. Such pass-band is centered at a longer wavelength than the inhibition band.

At least two dyes are used to construct at least two inhibition bands centered between 490 nm and 730 nm of OS shown in FIG. 11. At least 3 dyes are used to create the OS from 380 nm to 780 nm.

For example, for to achieve the spectrum in FIG. 11, 3 dyes may be dispersed into a 3 mm-center thickness, round Trivex ophthalmic lens of 72 mm in diameter via mixing with one part of the monomer, polymerizing with another part of the monomer with initiator and then grinding/polishing lens into desired shape. Dyes survive the two-part monomer polymerization process. Exciton has the ABS 549 dye that will substantially create the inhibition band at around 430 nm, with a dye loading of 0.5 mg to 200 mg per 2 lb of one part of Trivex monomer. Epolin has (1) the Epolight 5821 dye that will substantially create the inhibition band at around 555 nm, with a dye loading of 0.5 mg to 200 mg per 2 lb of one part of Trivex monomer, and (2) the Epolight 5636 dye that will substantially create the inhibition band at around 681 nm, with a dye loading of 0.5 mg to 200 mg per 2 lb of one part of Trivex monomer. Crysta-lyn has the DLS 550F dye that can also substantially create the inhibition band at around 555 nm, with a dye loading of 0.5 mg to 200 mg per 2 lb of one part of Trivex monomer. For the embodiment of FIG. 11, at least one dye is needed to create each of the described inhibition bands. For example, one or more of Epolight 5636 dye and DLS 550F dye can be used to create the inhibition band centered around 555 nm. An anti-reflective (AR) film coating may be applied to the lens surface. One or more, including all necessary, dyes are (1) dispersed into one or more layers of the optical material, including the substrate, (2) coated onto one or more surfaces of the optical material, including substrate, or (3) a combination of (1) and (2). For example, all 3 dyes in the embodiment of FIG. 11 may be dispersed into one part of the Trivex monomer before polymerization, such that all dyes are dispersed into one layer, e.g. substrate, of the Trivex lens after polymerization.

Figure 12A:
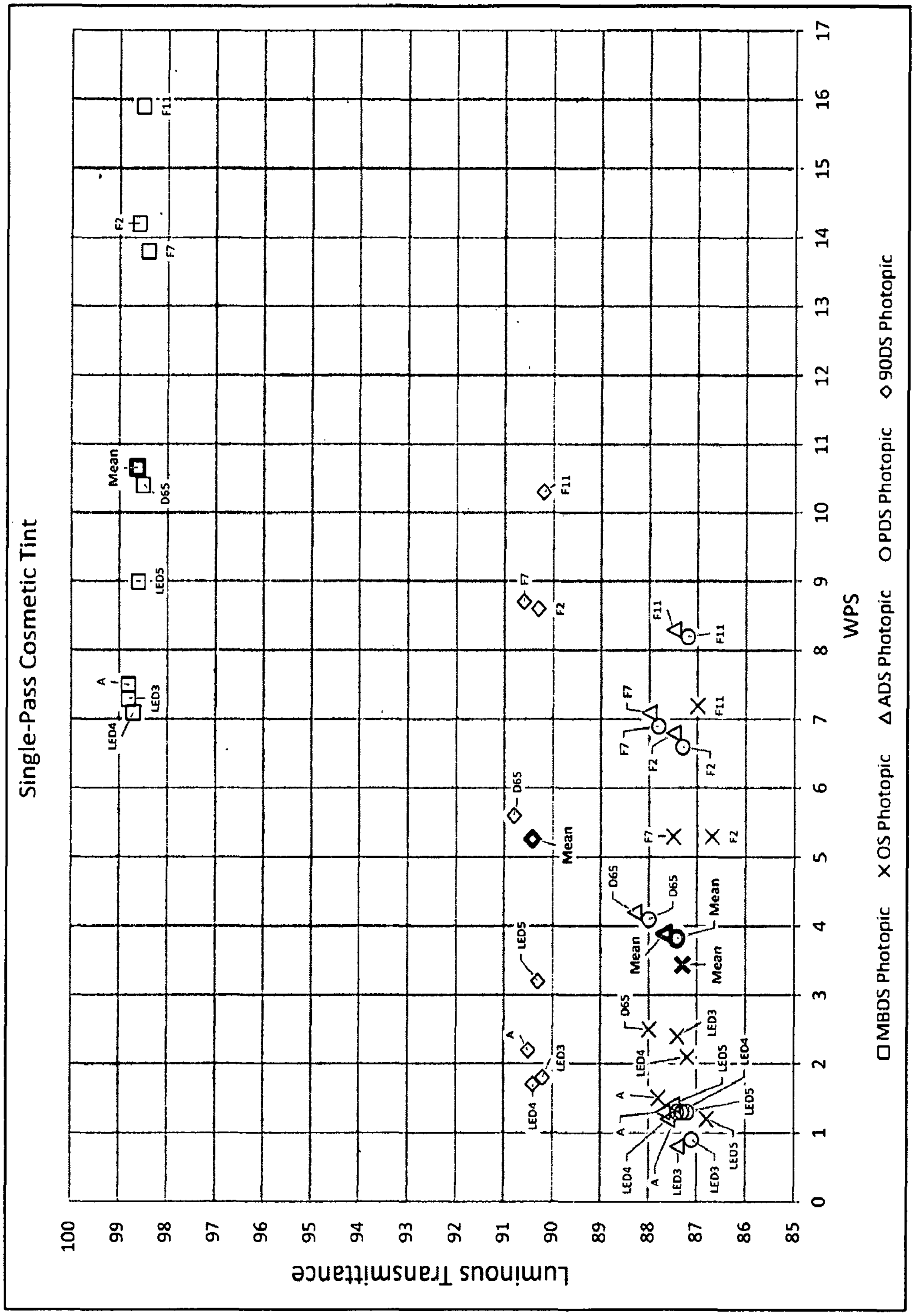
FIG. 12A is a scatter plot of the photopic luminous transmittance and single-pass WPS values, including mean values, of the MBDS, OS, ADS, PDS and 90DS of the SPDs of FIG. 11, under 8 major lighting conditions.
Figure 12B:
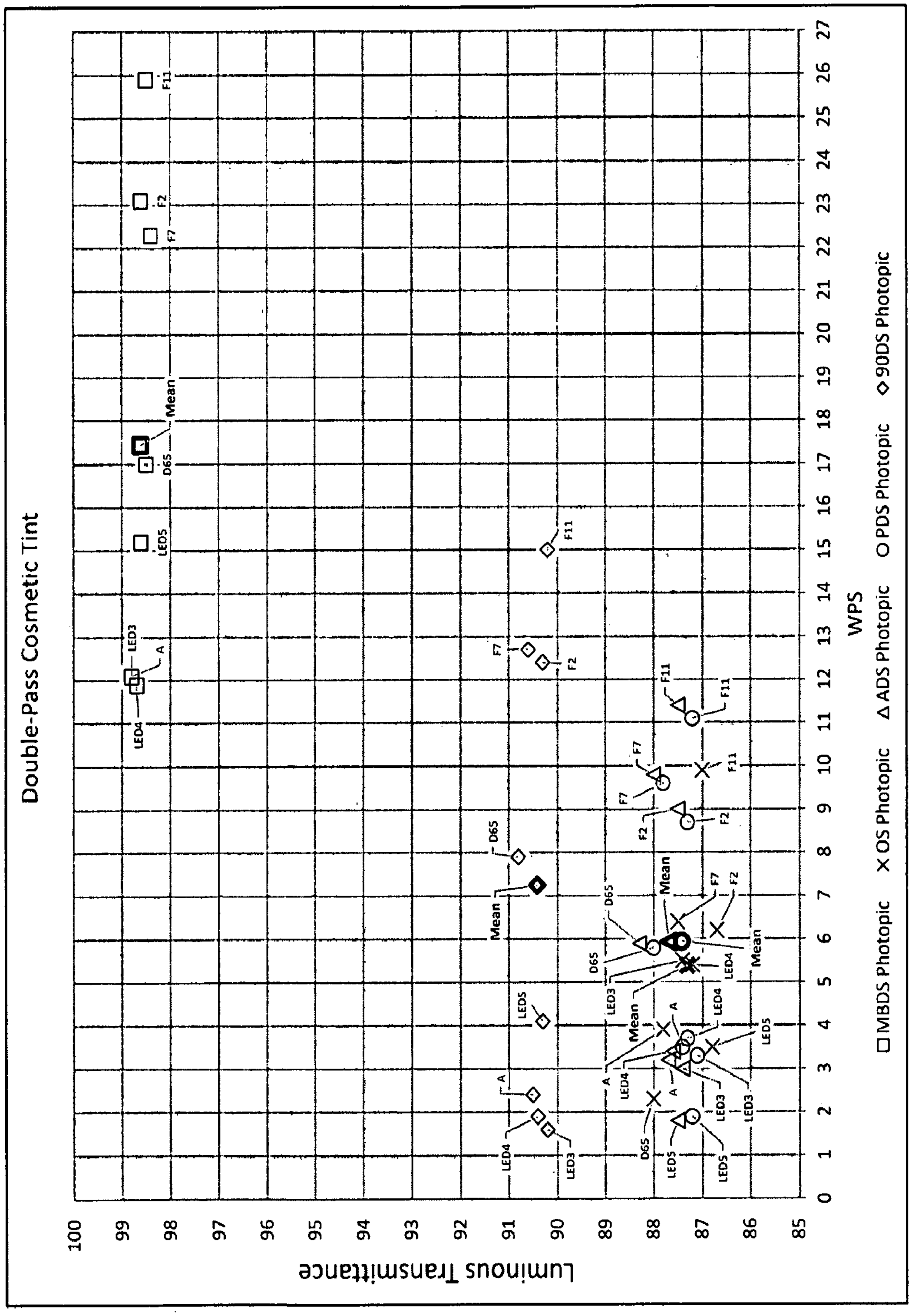
FIG. 12B is a scatter plot of the photopic luminous transmittance and double-pass WPS values, including mean values, of the MBDS, OS, ADS, PDS and 90DS of the SPDs of FIG. 11, under 8 major lighting conditions.

Table 6 shows numerous PIs and CIs of the OD, whose transmission spectrum (i.e. OS) is illustrated in FIG. 11 and FIGS. 12A-12B are scatter plots of luminous transmittance vs. WPS for the OS shown in FIG. 11 and for deconstructed transmission spectra based on the OS.

FIG. 12A is a scatter plot the photopic luminous transmittance and single-pass WPS values, including mean values, of the MBDS, OS, ADS, PDS and 90DS under 8 major lighting conditions.

FIG. 12B is a scatter plot of the photopic luminous transmittance and double-pass WPS values, including mean values, of the MBDS, OS, ADS, PDS and 90DS under 8 major lighting conditions.

Figure 12C:
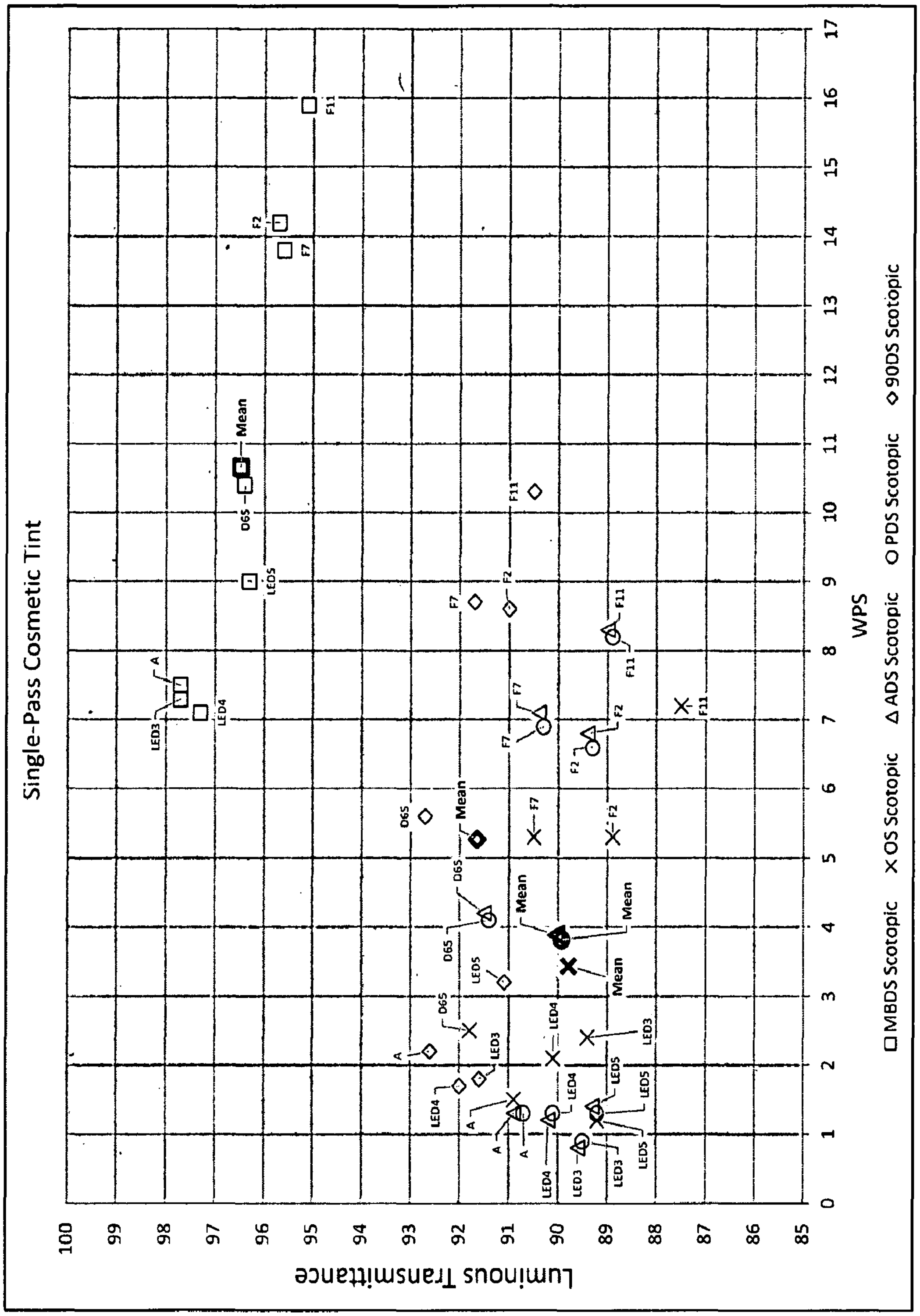
FIG. 12C is a scatter plot of the scotopic luminous transmittance and single-pass WPS values, including mean values, of the MBDS, OS, ADS, PDS and 90DS of the SPDs of FIG. 11, under 8 major lighting conditions.

FIG. 12C is a scatter plot of the scotopic luminous transmittance and single-pass WPS values, including mean values, of the MBDS, OS, ADS, PDS and 90DS under 8 major lighting conditions.

Figure 12D:
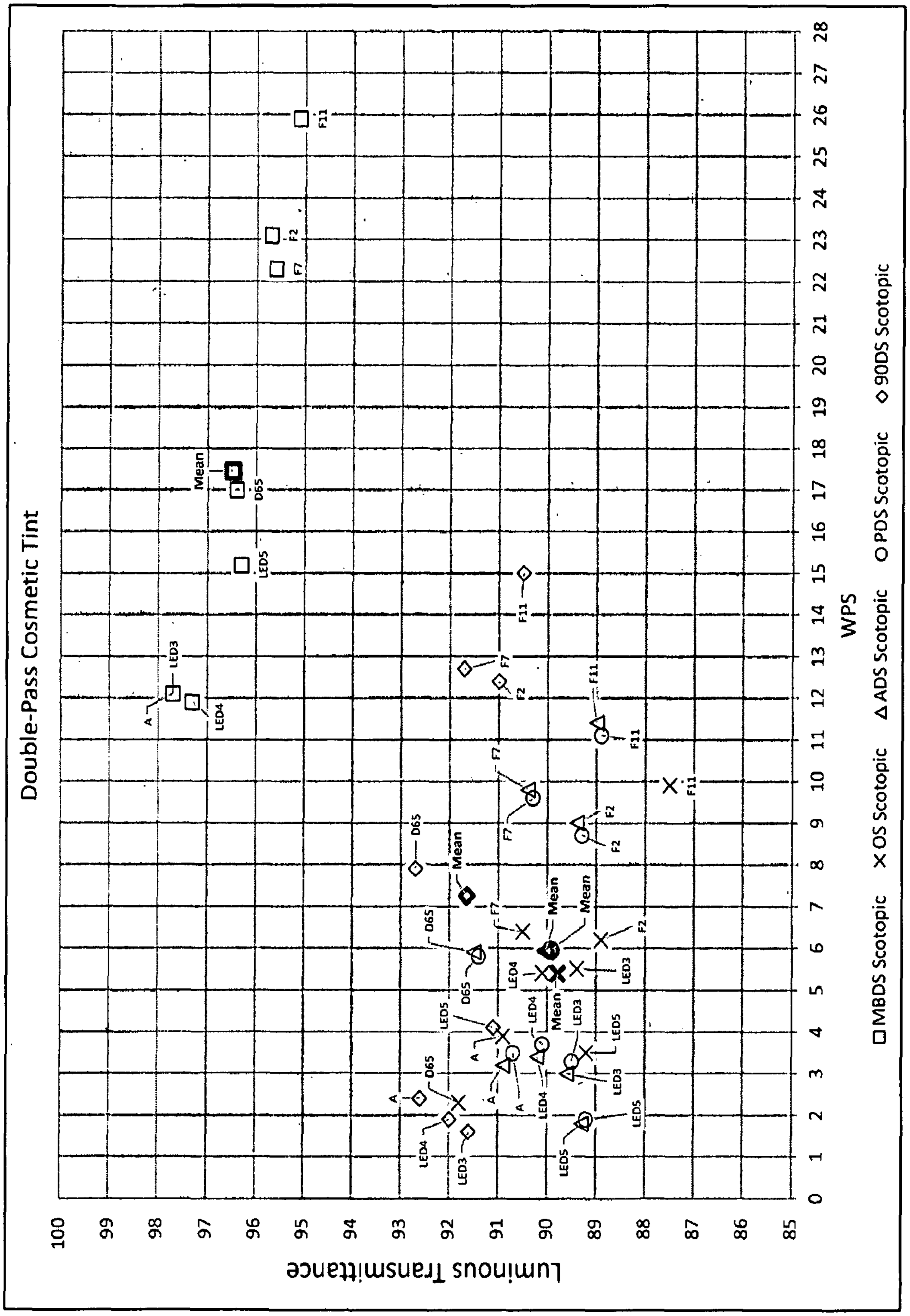
FIG. 12D is a scatter plot of the scotopic luminous transmittance and double-pass WPS values, including mean values, of the MBDS, OS, ADS, PDS and 90DS of the SPDs of FIG. 11, under 8 major lighting conditions.

FIG. 12D is a scatter plot of the scotopic luminous transmittance and double-pass WPS values, including mean values, of the MBDS, OS, ADS, PDS and 90DS under 8 major lighting conditions.

FIGS. 12A, B, C, D and Table 6 show that mean WPS (single-pass and/or double-pass) of OS is (1) lower by 4.5 or less than that (those) of at least one of ADS, PDS and 90DS, and is (2) lower by 4.5 or more than that (those) of MBDS.

FIGS. 12A, B, C, D and Table 6 show that the STD of WPS (single-pass and/or double-pass) of OS is (1) lower by 0.3 or more than that (those) of at least one of ADS, PDS and 90DS, and is (2) lower by 0.5 or more than that (those) of MBDS.

FIGS. 12A, B, C, D show one or more WPS values of OS when lit by one or more corresponding illuminants selected from the set of CIE F2, F7 and F11 illuminants is (1) lower than (i) by 0.5 or more, and (2) lower than (ii) by 3 or more. (i) is one or more WPS values of at least one of ADS, PDS and 90DS, and (ii) is one or more WPS values of MBDS. WPS values in both (i) and (ii) are lit by any illuminant(s) selected from the same set of illuminants of CIE F2, F7 and F11.

FIGS. 12A, B, C, D show one or more WPS values of OS when lit by one or more corresponding illuminants selected from the set of LED-3000K, LED-4000K and LED-5000K illuminants is (1) lower than (i) by 0.5 or more, and (2) lower than (ii) by 3 or more. (i) is one or more WPS values of at least one of ADS, PDS and 90DS, and (ii) is one or more WPS values of MBDS. WPS values in both (i) and (ii) are lit by any illuminant(s) selected from the same set of illuminants of LED-3000K, LED-4000K and LED-5000K.

FIGS. 12A, B, C, D show one or more WPS values of OS when lit by one or more corresponding illuminants selected from the set of CIE A and D65 illuminants is (1) lower than (i) by 0.4 or more, and (2) lower than (ii) by 3 or more. (i) is one or more WPS values of at least one of ADS, PDS and 90DS, and (ii) is one or more WPS values of MBDS. WPS values in both (i) and (ii) are lit by any illuminant(s) selected from the same set of illuminants of CIE A and D65.

FIGS. 12A, B, C, D show that the WPS of OS is less than 11 when the illuminant is at least one of CIE F2, CIE F7, CIE F11, CIE A, CIE D65, LED-3000K, LED-4000K and LED-5000K.

FIGS. 12A, B, C, D show the photopic luminous transmittance of OS is at least 75% when lit by at least one illuminant selected from the set of illuminants of CIE F2, CIE F7, CIE F11, CIE A, CIE D65, LED-3000K, LED-4000K and LED-5000K.

FIGS. 12A, B, C, D show that mean luminous transmittance (photopic and/or scotopic) of OS is lower by at most 3%, than that (those) of at least one of ADS, PDS and 90DS.

FIGS. 12A, B, C, D show that mean luminous transmittance (photopic and/or scotopic) of OS is lower by at least 4%, than that (those) of MBDS.

FIGS. 12A, B, C, D show the set of luminous transmittances (photopic and/or scotopic) of OS, when illuminated by the corresponding illuminants of CIE F2, CIE F7, CIE F11, CIE A, CIE D65, LED-3000K, LED-4000K and LED-5000K, has a range of less than 7%.

FIGS. 12A, B, C, D show within each figure, one or more luminous transmittance values of OS when lit by one or more corresponding illuminants selected from the set of CIE F2, F7 and F11 illuminants is (1) lower than (i) by 0.5% or more, and (2) lower than (ii) by 3% or more. (i) is one or more luminous transmittance values of at least one of ADS, PDS and 90DS, and (ii) is one or more luminous transmittance values of MBDS. Luminous transmittance values in both (i) and (ii) are lit by any illuminant(s) selected from the same set of illuminants of CIE F2, F7 and F11.

FIGS. 12A, B, C, D show within each figure, one or more luminous transmittance values of OS when lit by one or more corresponding illuminants selected from the set of LED-3000K, LED-4000K and LED-5000K illuminants is (1) lower than (i) by 0.5% or more, and (2) lower than (ii) by 3% or more. (i) is one or more luminous transmittance values of at least one of ADS, PDS and 90DS, and (ii) is one or more luminous transmittance values of MBDS. Luminous transmittance values in both (i) and (ii) are lit by any illuminant(s) selected from the same set of illuminants of LED-3000K, LED-4000K and LED-5000K.

FIGS. 12A, B, C, D show within each figure, one or more luminous transmittance values of OS when lit by one or more corresponding illuminants selected from the set of CIE A and D65 illuminants is (1) lower than (i) by 0.5% or more, and (2) lower than (ii) by 3% or more. (i) is one or more luminous transmittance values of at least one of ADS, PDS and 90DS, and (ii) is one or more luminous transmittance values of MBDS. Luminous transmittance values in both (i) and (ii) are lit by any illuminant(s) selected from the same set of illuminants of CIE A and D65.

For single-pass tint and/or double-pass tint, Table 6 shows two or more photopic E values of OS when lit by the corresponding two or more illuminants selected from the set of CIE F2, F11, F7, A, D65, LED-3000K, LED-4000K and LED-5000K illuminants is higher than (i) by at least 0.05, where (i) is the corresponding photopic E values of at least one of ADS, PDS and 90DS when lit by the same illuminants.

For single-pass tint and/or double-pass tint, Table 6 shows two or more scotopic E values of OS when lit by the corresponding two or more illuminants selected from the set of CIE F2, F11, F7, A, D65, LED-3000K, LED-4000K and LED-5000K illuminants is higher than (i) by at least 0.05, where (i) is the corresponding scotopic E values of at least one of ADS, PDS and 90DS when lit by the same illuminants.

Figure 13:
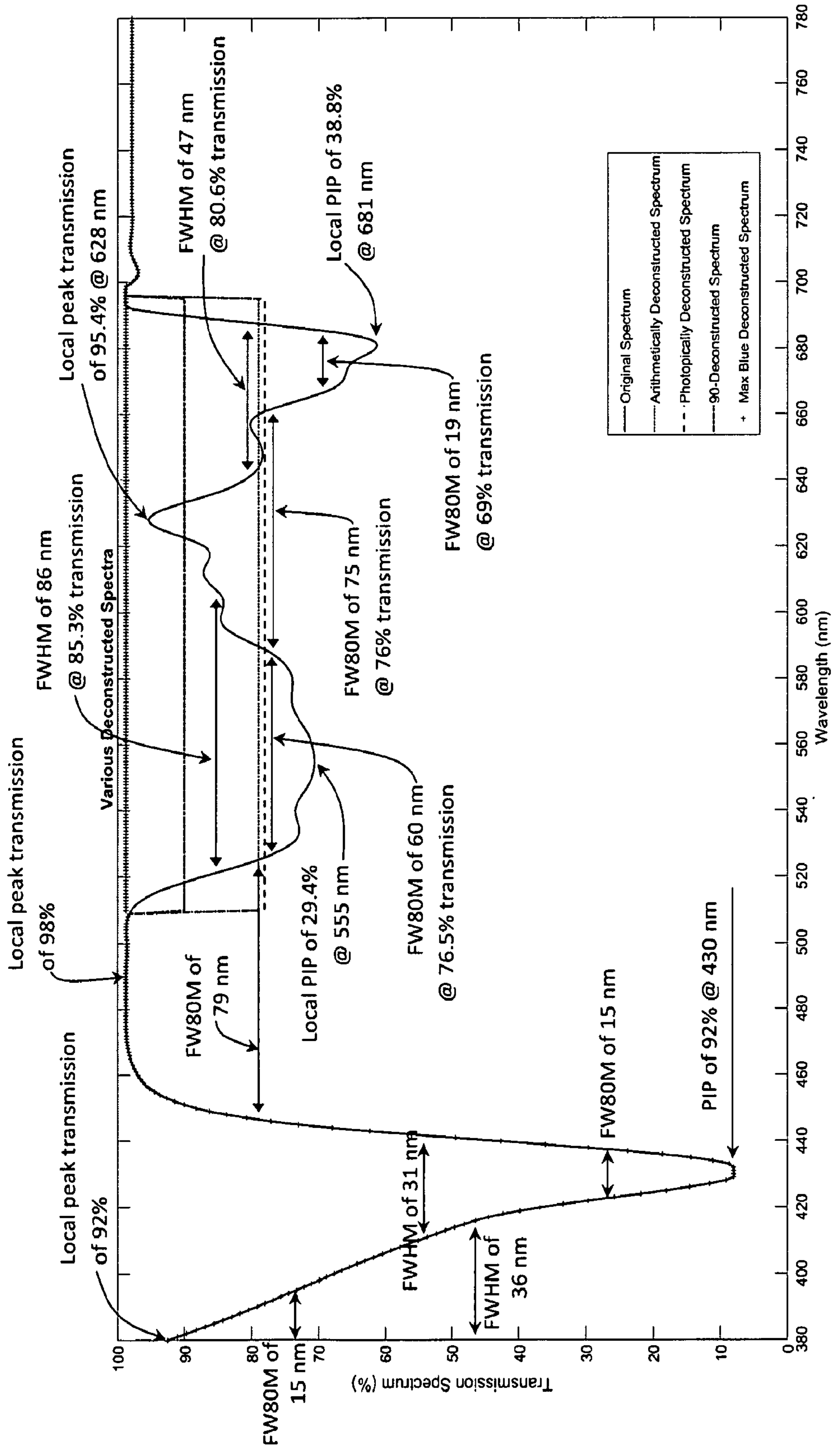
FIG. 13 is a graph including a plot of the Original Spectrum of an OD, its ADS, PDS, MBDS and 90DS.

FIG. 13 illustrates the Original Spectrum of an OD, its ADS, PDS, MBDS and 90DS. Wavelength A is 510 nm, and Wavelength B is 695 nm. The corresponding Arithmetic Mean is 79% or above 60%, Photopic Mean is 78% or above 60%, and Max Blue Transmission is 98% or above 70%.

In the OS, there is at least one inhibition peak at 430 nm or between 380 nm and 500 nm, that inhibits 92% of the incident light, i.e. a PIP of 92% or at least 25% is seen in FIG. 13. Such inhibition band has a FWHM of 31 nm or at least 15 nm. The inhibition band has a FW80M of 15 nm or at least 8 nm.

FIG. 13 shows that the Original Spectrum of an OD has 2 inhibition bands, and 3 pass-bands between 455 nm and 720 nm according to another embodiment. FIG. 13 is an example of class of embodiment in which the OS of an OD has at least 1 inhibition band, and at least 2 pass-bands between 455 nm and 720 nm; and the FW80M of at least 1 such inhibition band is at least 15 nm and at most 100 nm, and is at a transmission level of between 55% and 90%. FWHM of at least 1 such inhibition band is at least 35 nm and at most 120 nm, and is at a transmission level which is at least 5% higher than that for the FW80M of the same inhibition band.

There is at least one inhibition band of OS centered between 520 nm and 600 nm in OS. The PIP of at least one of such inhibition band is 29% or at least 10% with a FW80M that is at least 15 nm shorter than the corresponding FWHM.

There is at least one inhibition band of OS centered between 640 nm and 710 nm. The PIP of at least one of such inhibition band is 39% or at least 10% with a FW80M that is at least 15 nm shorter than the corresponding FWHM. Moreover, the transmission level corresponding to FW80M is at least 5% lower than that of the FWHM of the same inhibition band.

The largest PIP of any inhibition band of OS centered between 520 nm and 600 nm is at most 45%, and the largest PIP of any inhibition band centered between 620 nm and 700 nm is at most 55%.

The OS shown in FIG. 13 has a pass-band with a peak transmission of 92% or more than 10% at any wavelength between 380 nm and 430 nm. The FW80M of this pass-band is at least 10 nm, and the FWHM is at least 20 nm.

There is at least one pass-band of OS centered between 430 nm and 510 nm, with a FW80M of at least 50 nm. The peak transmission of this pass-band is 98% or at least 40%. The peak transmission of such pass-band is higher, by at least 4%, than the peak transmission(s) of all pass-bands whose peak transmission(s) is located at lower wavelength(s).

One or more pass-bands of OS centered between 580 nm and 650 nm has a peak transmission of 95% or at least 70%, and a FW80M of 75 nm or at least 40 nm. The two adjacent inhibition bands to such pass-band has a wavelength distance of at least 60 nm between their inhibition peaks.

The valley transmission of every inhibition band of OS centered between 500 nm and 700 nm is between 10% and 60% lower than the peak transmission of an immediately adjacent pass-band, when the latter is centered at a longer wavelength than the center (peak inhibition) of such inhibition band.

At least two dyes are used to construct all inhibition bands of OS centered between 500 nm and 700 nm. At least 3 dyes are used to create the transmission spectrum of the OS disclosed in FIG. 13.

For example, to attain the spectrum shown in FIG. 13, 3 dyes may be dispersed into a 2 mm center-thickness, round CR39 ophthalmic lens of 75 mm in diameter via mixing with the monomer. (Mixing may be improved with the use of an organic dye solvent, such as methanol). The monomer is then polymerized using a dye-suitable initiator, such as 1,1-Bis(tert-butylperoxy)cyclohexane (a peroxyketal) or tert-butyl peroxy 2-ethylhexyl carbonate (a peroxyester), and then polymer is ground and/or polished into desired shape. Exciton has the ABS 549 dye that will substantially create the inhibition band at around 430 nm, with a dye loading of 0.5 mg to 200 mg per 2 lb of CR39 monomer. Epolin has (1) the Epolight 5821 dye that will substantially create the inhibition band at around 555 nm, with a dye loading of 0.5 mg to 200 mg per 2 lb of CR39 monomer, and (2) the Epolight 5636 dye that will substantially create the inhibition band at around 681 nm, with a dye loading of 0.5 mg to 200 mg per 2 lb of CR39 monomer. Crysta-lyn has the DLS 550F dye that can also substantially create the inhibition band at around 555 nm, with a dye loading of 0.5 mg to 200 mg per 2 lb of CR39 monomer. For the embodiment of FIG. 13, at least one dye may be used to create each of the described inhibition band.

Table 7 shows numerous PIs and CIs of the OD, whose transmission spectrum is illustrated in FIG. 13.

Figure 14A:
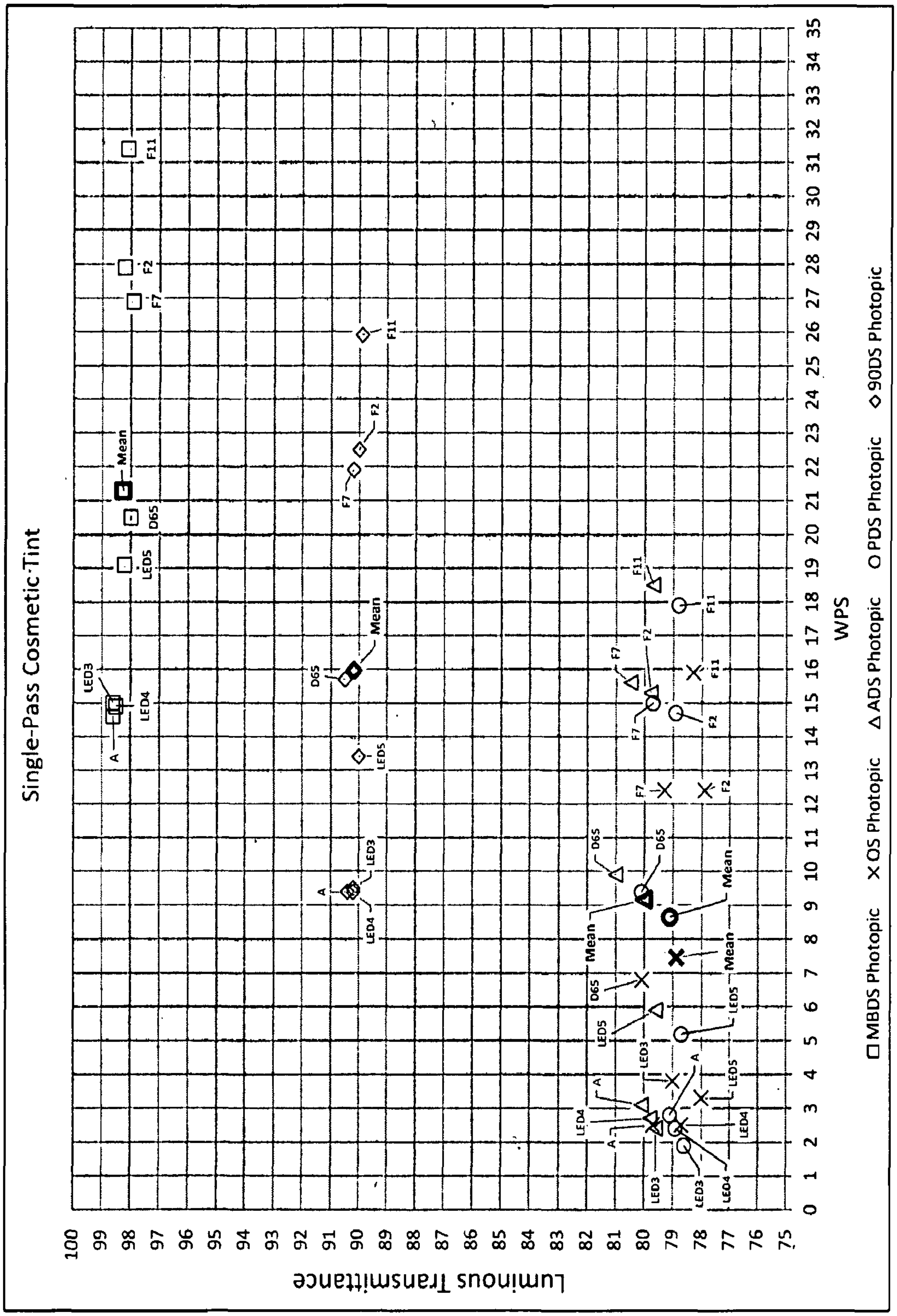
FIG. 14A is a scatter plot of the photopic luminous transmittance and single-pass WPS values, including mean values, of the MBDS, OS, ADS, PDS and 90DS of the SPDs of FIG. 13, under 8 major lighting conditions.

FIG. 14A is a scatter plot of the photopic luminous transmittance and single-pass WPS values, including mean values, of the MBDS, OS, ADS, PDS and 90DS under 8 major lighting conditions.

Figure 14B:
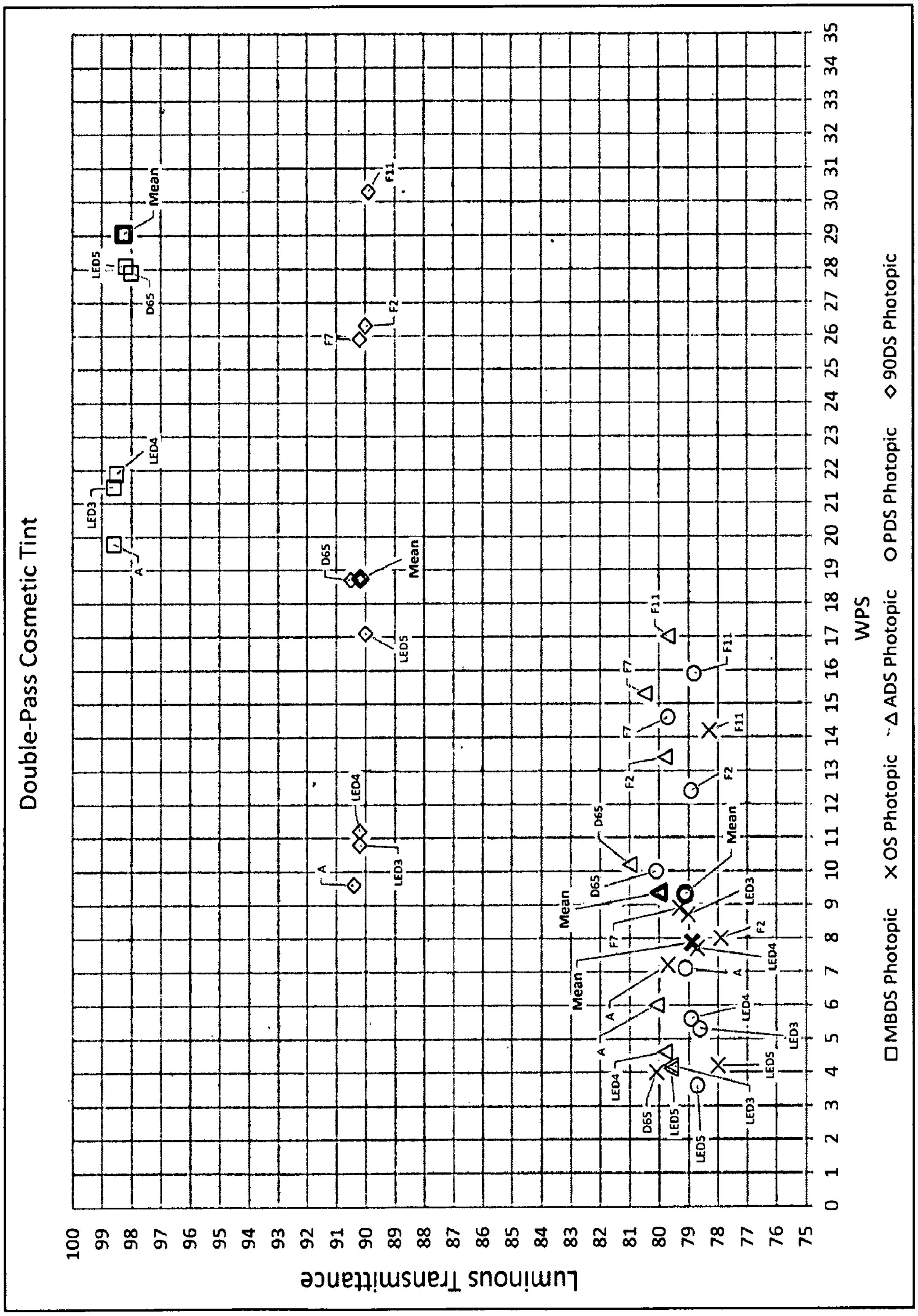
FIG. 14B is a scatter plot of the photopic luminous transmittance and double-pass WPS values, including mean values, of the MBDS, OS, ADS, PDS and 90DS of the SPDs of FIG. 13, under 8 major lighting conditions.

FIG. 14B is a scatter plot of the photopic luminous transmittance and double-pass WPS values, including mean values, of the MBDS, OS, ADS, PDS and 90DS under 8 major lighting conditions.

Figure 14C:
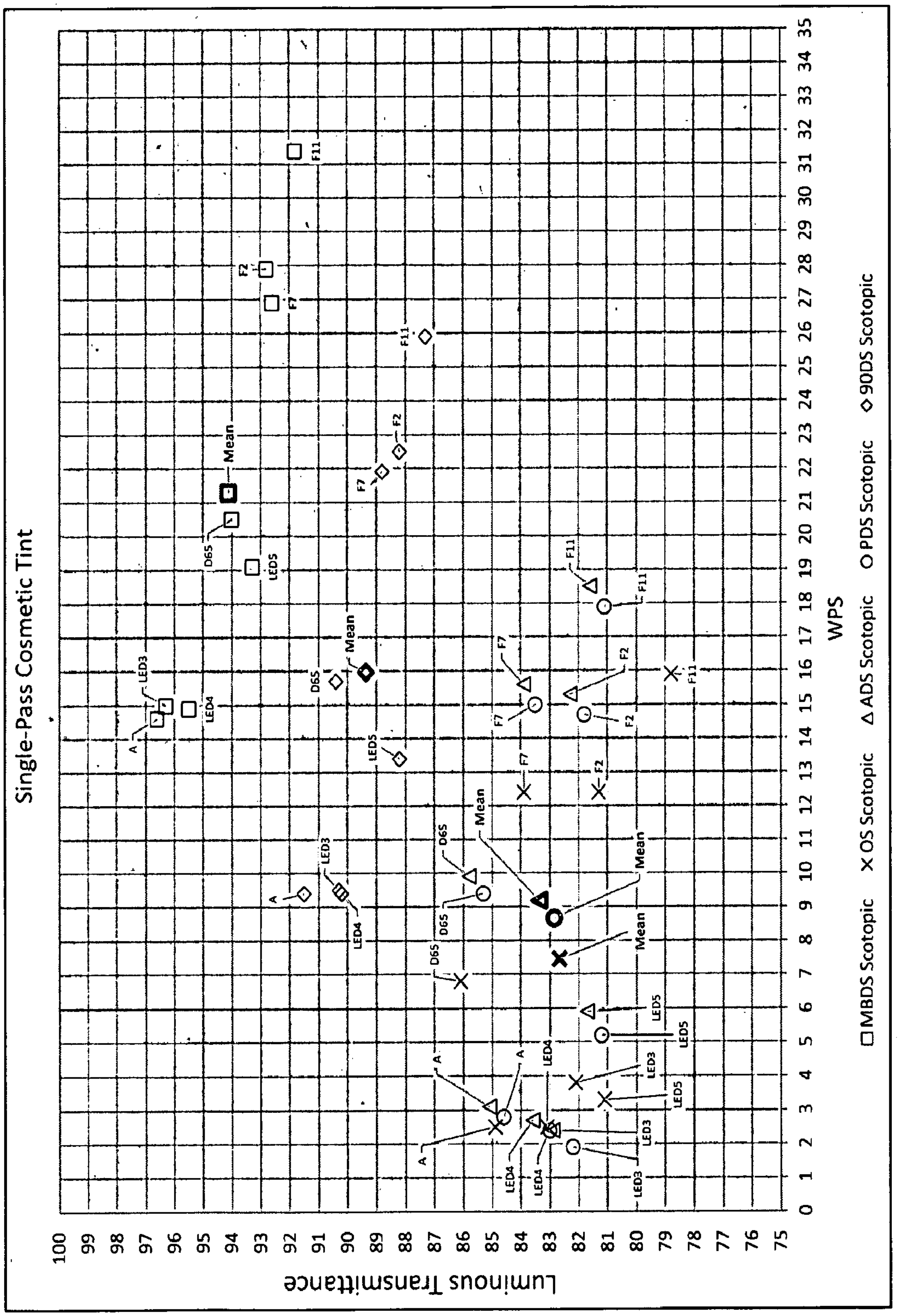
FIG. 14C is a scatter plot of the scotopic luminous transmittance and single-pass WPS values, including mean values, of the MBDS, OS, ADS, PDS and 90DS of the SPDs of FIG. 13, under 8 major lighting conditions.

FIG. 14C is a scatter plot of the scotopic luminous transmittance and single-pass WPS values, including mean values, of the MBDS, OS, ADS, PDS and 90DS under 8 major lighting conditions.

Figure 14D:
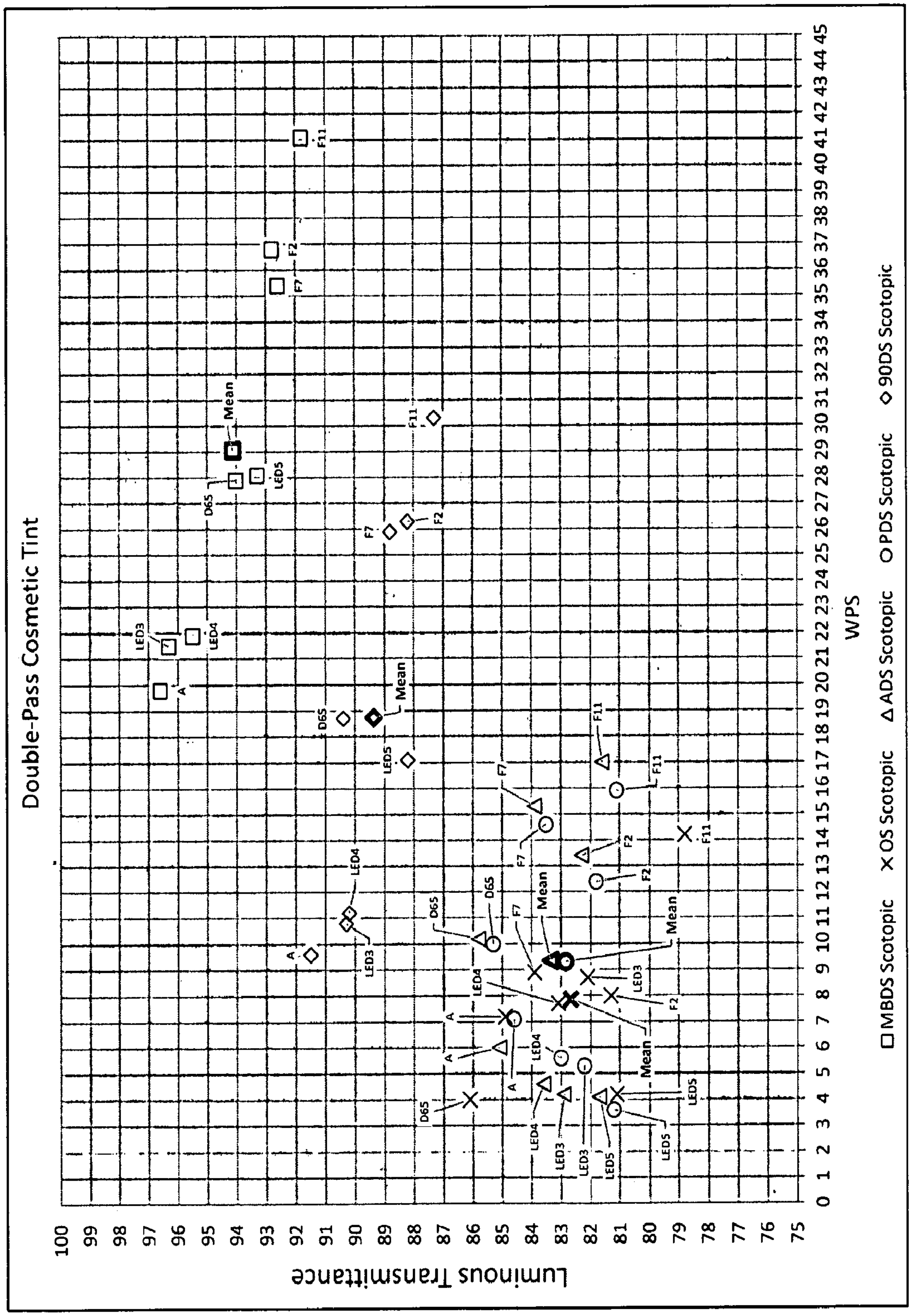
FIG. 14D is a scatter plot of the scotopic luminous transmittance and double-pass WPS values, including mean values, of the MBDS, OS, ADS, PDS and 90DS of the SPDs of FIG. 13, under 8 major lighting conditions.

FIG. 14D is a scatter plot of the scotopic luminous transmittance and double-pass WPS values, including mean values, of the MBDS, OS, ADS, PDS and 90DS under 8 major lighting conditions.

FIGS. 14A, B, C, D and Table 7 show that mean WPS (single-pass and/or double-pass) of OS is (1) lower by 5 or less than that (those) of at least one of ADS and PDS, and is (2) lower by 5 or more than that (those) of at least one of MBDS and 90DS.

FIGS. 14A, B, C, D and Table 7 show that the STD of WPS (single-pass and/or double-pass) of OS is lower by 0.5 or more than that (those) of at least one of ADS, PDS, 90DS and MBDS.

FIGS. 14A, B, C, D show one or more WPS values of OS when lit by one or more corresponding illuminants selected from the set of CIE F2, F7 and F11 illuminants is (1) lower than (i) by 1.0 or more, and (2) lower than (ii) by 4.0 or more. (i) is one or more WPS values of at least one of ADS and PDS, and (ii) is one or more WPS values of at least one of MBDS and 90DS. WPS values in both (i) and (ii) are lit by any illuminant(s) selected from the same set of illuminants of CIE F2, F7 and F11.

FIGS. 14A, B, C, D show one or more WPS values of OS when lit by one or more corresponding illuminants selected from the set of LED-3000K, LED-4000K and LED-5000K illuminants is (1) different than (i) by 0.5 or more, and (2) lower than (ii) by 3.0 or more. (i) is one or more WPS values of at least one of ADS and PDS, and (ii) is one or more WPS values of at least one of MBDS and 90DS. WPS values in both (i) and (ii) are lit by any illuminant(s) selected from the same set of illuminants of LED-3000K, LED-4000K and LED-5000K.

FIGS. 14A, B, C, D show one or more WPS values of OS when lit by one or more corresponding illuminants selected from the set of CIE A and D65 illuminants is (1) lower than (i) by at least 0.5, and (2) lower than (ii) by at least 4.0. (i) is one or more WPS values of at least one of ADS and PDS, and (ii) is one or more WPS values of at least one of MBDS and 90DS. WPS values in both (i) and (ii) are lit by any illuminant(s) selected from the same set of illuminants of CIE A and D65.

FIGS. 14A, B, C, D show that the WPS of OS is less than 18 when the illuminant is at least one of CIE F2, CIE F7, CIE F11, CIE A, CIE D65, LED-3000K, LED-4000K and LED-5000K.

FIGS. 14A, B, C, D show the photopic luminous transmittance of OS is at least 70% when lit by at least one illuminant selected from the set of illuminants of CIE F2, CIE F7, CIE F11, CIE A, CIE D65, LED-3000K, LED-4000K and LED-5000K.

FIGS. 14A, B, C, D show that mean luminous transmittance (photopic and/or scotopic) of OS is lower by at most 5%, than that (those) of at least one of ADS and PDS.

FIGS. 14A, B, C, D show that mean luminous transmittance (photopic and/or scotopic) of OS is lower by at least 6%, than that (those) of MBDS.

FIGS. 14A, B, C, D show the set of luminous transmittances (photopic and/or scotopic) of OS, when illuminated by the corresponding illuminants of CIE F2, CIE F7, CIE F11, CIE A, CIE D65, LED-3000K, LED-4000K and LED-5000K, has a range of less than 10%.

FIGS. 14A, B, C, D show within each figure, one or more luminous transmittance values of OS when lit by one or more corresponding illuminants selected from the set of CIE F2, F7 and F11 illuminants is (1) lower than (i) by 5% or less, and (2) lower than (ii) by 5% or more. (i) is one or more luminous transmittance values of at least one of ADS and PDS, and (ii) is one or more luminous transmittance values of at least one of MBDS and 90DS. Luminous transmittance values in both (i) and (ii) are lit by any illuminant(s) selected from the same set of illuminants of CIE F2, F7 and F11. Luminous transmittance can be photopic or scotopic.

FIGS. 14A, B, C, D show within each figure, one or more luminous transmittance values of OS when lit by one or more corresponding illuminants selected from the set of LED-3000K, LED-4000K and LED-5000K illuminants is (1) lower than (i) by 5% or less, and (2) lower than (ii) by 5% or more. (i) is one or more luminous transmittance values of at least one of ADS and PDS, and (ii) is one or more luminous transmittance values of at least one of MBDS and 90DS. Luminous transmittance values in both (i) and (ii) are lit by any illuminant(s) selected from the same set of illuminants of LED-3000K, LED-4000K and LED-5000K.

FIGS. 14A, B, C, D show within each figure, one or more luminous transmittance values of OS when lit by one or more corresponding illuminants selected from the set of CIE A and D65 illuminants is (1) different than (i) by 4% or less, and (2) lower than (ii) by 3% or more. (i) is one or more luminous transmittance values of at least one of ADS and PDS, and (ii) is one or more luminous transmittance values of at least one of MBDS and 90DS. Luminous transmittance values in both (i) and (ii) are lit by any illuminant(s) selected from the same set of illuminants of CIE A and D65.

For single-pass tint and/or double-pass tint, Table 7 shows two or more photopic E values of OS when lit by the corresponding two or more illuminants selected from the set of CIE F2, F11, F7, A, D65, LED-3000K, LED-4000K and LED-5000K illuminants are higher than (i) by at least 0.05, where (i) is the corresponding photopic E values of at least one of ADS, PDS and 90DS when lit by the same illuminant(s). For example, in single-pass tint, OS has a photopic E value of 0.77, or at least 0.7, for WPS under D65 lighting, which is more than 0.05 higher than (1) 0.62, the photopic E value of ADS with WPS under D65 lighting, (2) 0.62, the photopic E value of PDS with WPS under D65 lighting, and (3) 0.64, the photopic E value of 90DS with WPS under D65 lighting. This condition for single-pass is also satisfied when illuminant is CIE F11. For example, in double-pass tint, OS has a photopic E value of 1.33, or at least 0.7, for WPS under D65 lighting, which is more than 0.05 higher than (1) 1.03, the photopic E value of ADS with WPS under D65 lighting, (2) 1.00, the photopic E value of PDS with WPS under D65 lighting, and (3) 1.21, the photopic E value of 90DS with WPS under D65 lighting. This condition for double-pass is also satisfied when illuminant is CIE F2.

For single-pass tint and/or double-pass tint, Table 7 shows two or more scotopic E values of OS when lit by the corresponding two or more illuminants selected from the set of CIE F2, F11, F7, A, D65, LED-3000K, LED-4000K and LED-5000K illuminants are higher than (i) by at least 0.05, where (i) is the corresponding scotopic E values of at least one of ADS, PDS and 90DS when lit by the same illuminant (s). For example, in single-pass tint, OS has a scotopic E value of 1.35, or at least 1.0, for WPS under F2 lighting, which is more than 0.05 higher than (1) 1.2, the scotopic E value of ADS with WPS under F2 lighting, (2) 1.2, the scotopic E value of PDS with WPS under F2 lighting, and (3) 1.16, the scotopic E value of 90DS with WPS under F2 lighting. This condition for single-pass is also satisfied when illuminant is LED-5000K. For example, in double-pass tint, OS has a scotopic E value of 2.5, or at least 1.0, for WPS under F2 lighting, which is more than 0.05 higher than (1) 2.23, the scotopic E value of ADS with WPS under F2 lighting, (2) 2.22, the scotopic E value of PDS with WPS under F2 lighting, and (3) 2.26, the scotopic E value of 90DS with WPS under F2 lighting. This condition for double-pass is also satisfied when illuminant is D65.

Figure 15:
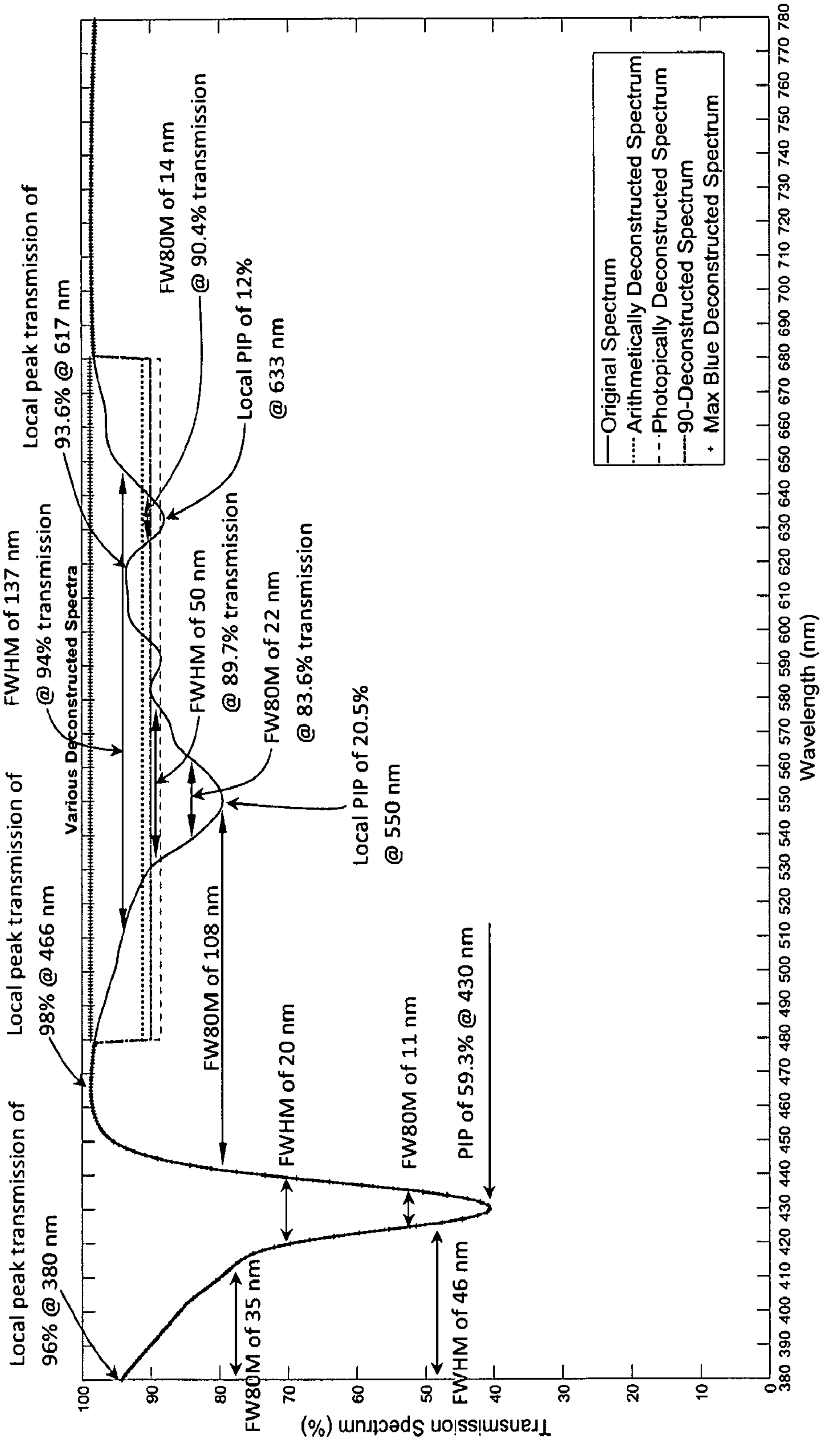
FIG. 15 is a graph including a plot of an Original Spectrum of another SMVF (OD), its ADS, PDS, MBDS and 90DS.

FIG. 15 illustrates the Original Spectrum of another SMVF (OD), its ADS, PDS, MBDS and 90DS. Wavelength A is 480 nm, and Wavelength B is 680 nm. The corresponding Arithmetic Mean is 91% or above 65%, Photopic Mean is 88% or above 65%, and Max Blue Transmission is 98% or above 65%.

There is at least one inhibition peak at 430 nm or between 380 nm and 470 nm inhibits 59% of the incident light, i.e. a PIP of 59% or at least 25% is seen in FIG. 15. The inhibition band has a FWHM of 20 nm or at least 15 nm. The inhibition band has a FW80M of 11 nm or at least 8 nm.

FIG. 15 shows that the Original Spectrum of an OD has 2 inhibition bands, and 3 pass-bands centered between 450 nm and 680 nm according to another embodiment. FIG. 15 is representative of a class of embodiments in which the OS of an OD has at least 1 inhibition band, and at least 2 pass-bands centered between 450 nm and 680 nm. The FW80M of at least 1 such inhibition band is at least 10 nm and at most 70 nm, and is at a transmission level of between 70% and 95%. FWHM of at least 1 such inhibition band is at least 35 nm and at most 100 nm, and is at a transmission level which is between 3% and 17% higher than that for the FW80M of the same inhibition band.

There is at least one inhibition band of OS centered between 500 nm and 585 nm. The PIP of at least one of such inhibition band is 20% or at least 10% with a FW80M that is at least 15 nm shorter than the corresponding FWHM of the same inhibition band.

There is at least one inhibition band of OS centered between 600 nm and 680 nm. The PIP of at least one of such inhibition band is 12% or between 5% and 35% with a FW80M that is at least 10 nm shorter than the corresponding FWHM of the same inhibition band. The transmission level corresponding to FW80M is at least 3% lower than that of the corresponding FWHM.

The largest PIP of any inhibition band of OS centered between 500 nm and 585 nm is at most 35%, and the largest PIP of any inhibition band of OS centered between 600 nm and 680 nm is at most 35%.

At least two dyes are used to construct all inhibition bands of OS centered between 500 nm and 680 nm. At least three dyes are used to create the OS of the OD disclosed in FIG. 15.

At least one inhibition band centered between 380 nm and 470 nm has a PIP that is at least 10% larger than the PIP of any other inhibition band centered between 500 nm and 680 nm.

At least one inhibition band centered between 500 nm and 585 nm has a PIP that is at least 5% larger than any other inhibition band centered between 600 nm and 680 nm.

The OS shown in FIG. 15 has a pass-band with a peak transmission of 96% or more than 10% at any wavelength between 380 nm and 430 nm.

There is at least one pass-band of OS centered between 440 nm and 510 nm with a FW80M of at least 60 nm. The peak transmission of this pass-band is 98% or at least 60%. The peak transmission of such pass-band is higher, by at least 3%, than the peak transmission(s) of all other pass-bands whose peak transmission(s) is located between 380 nm and 590 nm. Moreover, the magnitude of the difference between (1) the peak transmission of such pass-band, and (2) the peak transmission of OS between 380 nm and 680 nm is within 15%, including 0%.

For the OS spectrum, one or more pass-bands centered between 560 nm and 630 nm has a peak transmission of 93% or at least 70%, which is at least 5% higher than the valley transmission of at least one immediately adjacent inhibition band. The peak transmission wavelength of one or more such pass-band is at least 30 nm longer than that of an immediately adjacent pass-band.

For all inhibition bands centered between 500 nm and 700 nm, the valley transmission of every inhibition band is between 8% and 60% lower than the peak transmission of its immediately adjacent pass-band, provided the pass-band is centered at a longer wavelength than the center of the inhibition band.

Wavelength A is less than 40 nm away from the midpoint wavelength between (i) and (ii), where (i) is the wavelength of peak inhibition of a inhibition band with the largest PIP between 410 and 485, and (ii) is the wavelength of peak inhibition of a inhibition band with the largest PIP between 510 nm and 590 nm.

Wavelength B is between 5 nm and 50 nm, inclusive, longer than the wavelength of peak inhibition of a inhibition band with the smallest PIP between 600 nm and 680 nm.

For example, to attain the spectrum in FIG. 15, 3 dyes are dispersed into a 4 mm thick, 1 m by 2 m, rectangular polyamide (PA) windowpane. One suitable PA resin is the Grilamid TR XE 3805, supplied by EMS-GRIVORY (Via Innovativa 1, 7013 Domat/Ems, Switzerland). The dyed, transmissive optical device is constructed via (1) mix all 3 dyes with methanol or ethanol (or another suitable organic solvent), then mix with PA polymer pellets, and (2) the dyed polymer is then made into shape, e.g. via injection molding. Additional grinding, polishing, temperature treatments and/or surface treatments may be performed on the shaped polymer. Exciton has (1) the ABS 549 dye that will substantially create the inhibition band at around 430 nm, with a dye loading of 0.5 mg to 200 mg per 2 lb of PA polymer, and (2) the ABS 626 dye that will substantially create the inhibition band at around 633 nm, with a dye loading of 0.5 mg to 100 mg per 2 lb of PA polymer. Epolin has the Epolight 5391 dye that will substantially create the inhibition band at around 550 nm, with a dye loading of 0.5 mg to 200 mg per 2 lb of PA polymer. Crysta-lyn has the DLS 550B dye, as an alternative, that can also substantially create the inhibition band at around 550 nm, with a dye loading of 0.5 mg to 200 mg per 2 lb of PA polymer. For the embodiment of FIG. 15, at least one dye is needed to create each of the described inhibition band.

Table 8 shows numerous PIs and CIs of the OD, whose transmission spectrum is illustrated in FIG. 15.

Figure 16A:
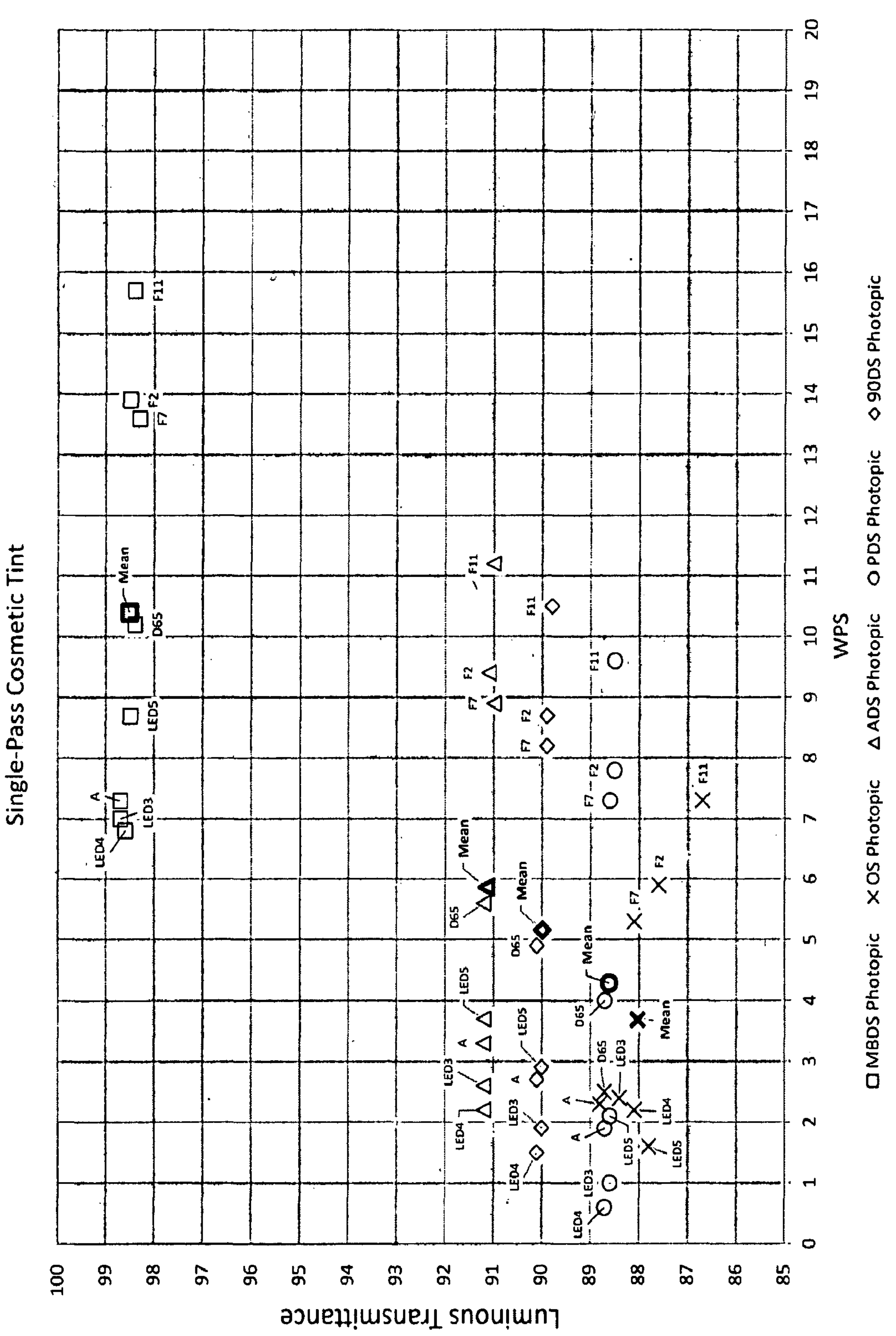
FIG. 16A is a scatter plot of the photopic luminous transmittance and single-pass WPS values, including mean values, of the MBDS, OS, ADS, PDS and 90DS of the SPDs of FIG. 15, under 8 major lighting conditions.

FIG. 16A is a scatter plot of the photopic luminous transmittance and single-pass WPS values, including mean values, of the MBDS, OS, ADS, PDS and 90DS under 8 major lighting conditions.

Figure 16B:
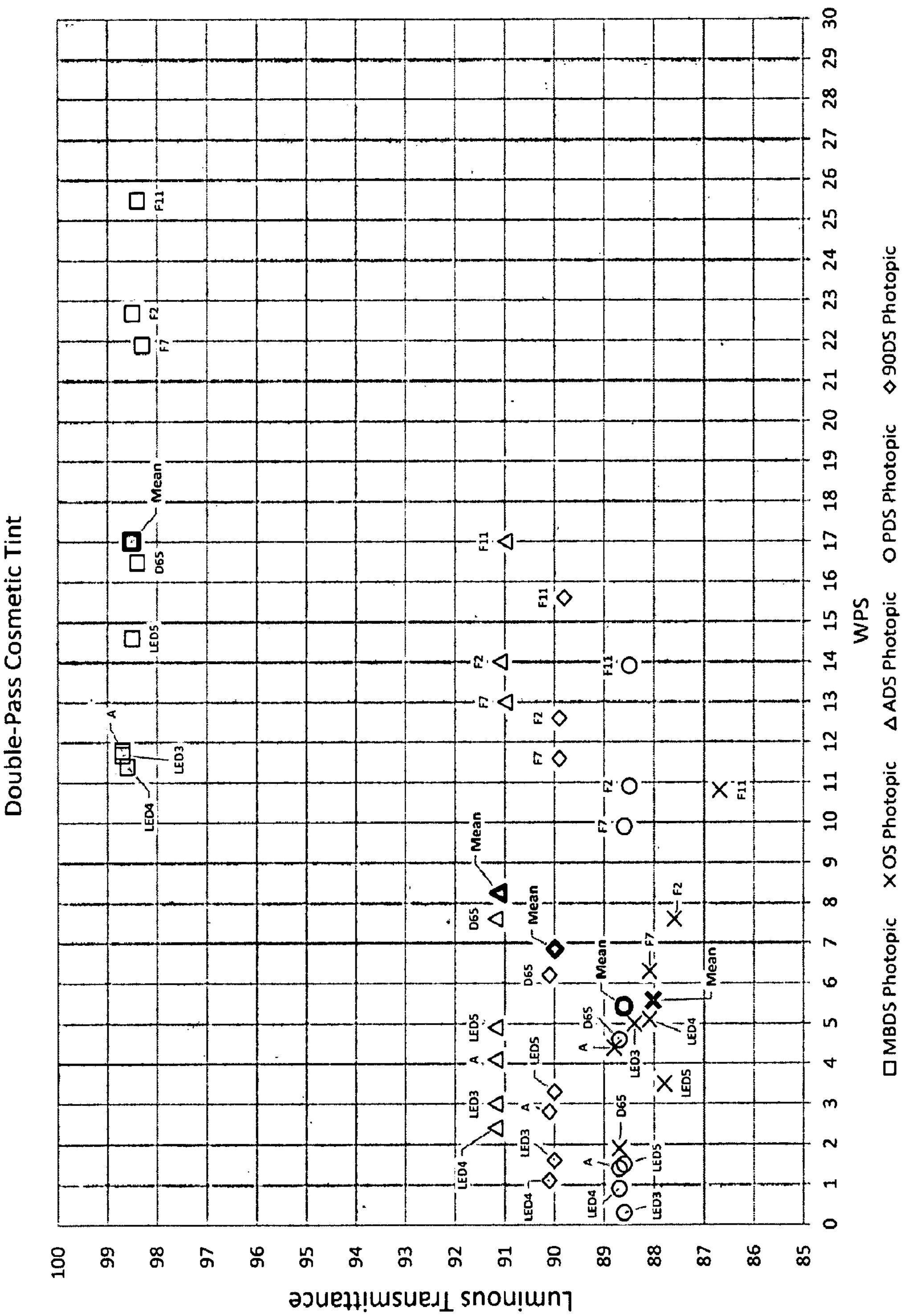
FIG. 16B is a scatter plot of the photopic luminous transmittance and double-pass WPS values, including mean values, of the MBDS, OS, ADS, PDS and 90DS of the SPDs of FIG. 15, under 8 major lighting conditions.

FIG. 16B is a scatter plot of the photopic luminous transmittance and double-pass WPS values, including mean values, of the MBDS, OS, ADS, PDS and 90DS under 8 major lighting conditions.

Figure 16C:
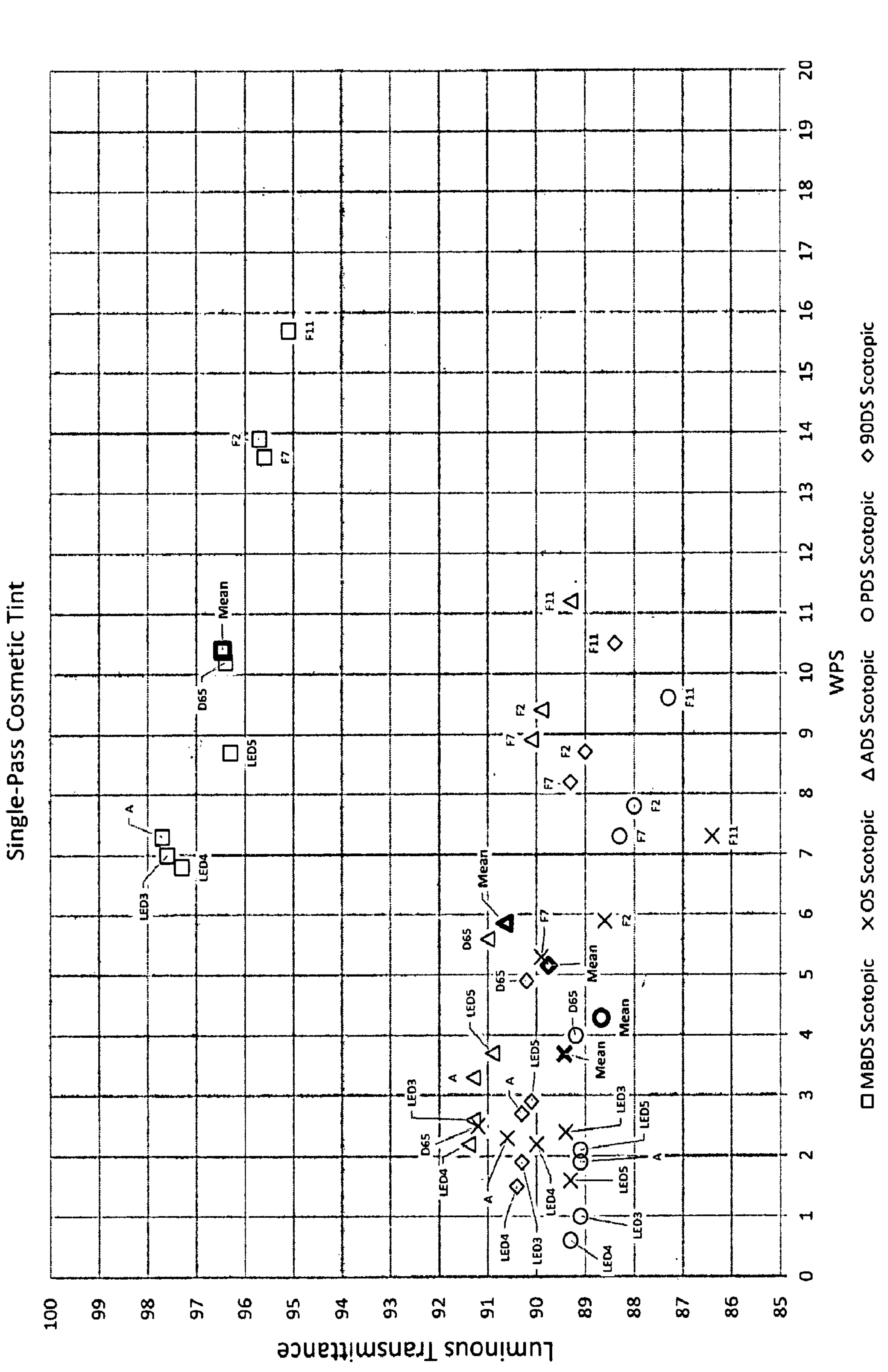
FIG. 16C is a scatter plot of the scotopic luminous transmittance and single-pass WPS values, including mean values, of the MBDS, OS, ADS, PDS and 90DS of the SPDs of FIG. 15, under 8 major lighting conditions.

FIG. 16C is a scatter plot of the scotopic luminous transmittance and single-pass WPS values, including mean values, of the MBDS, OS, ADS, PDS and 90DS under 8 major lighting conditions.

Figure 16D:
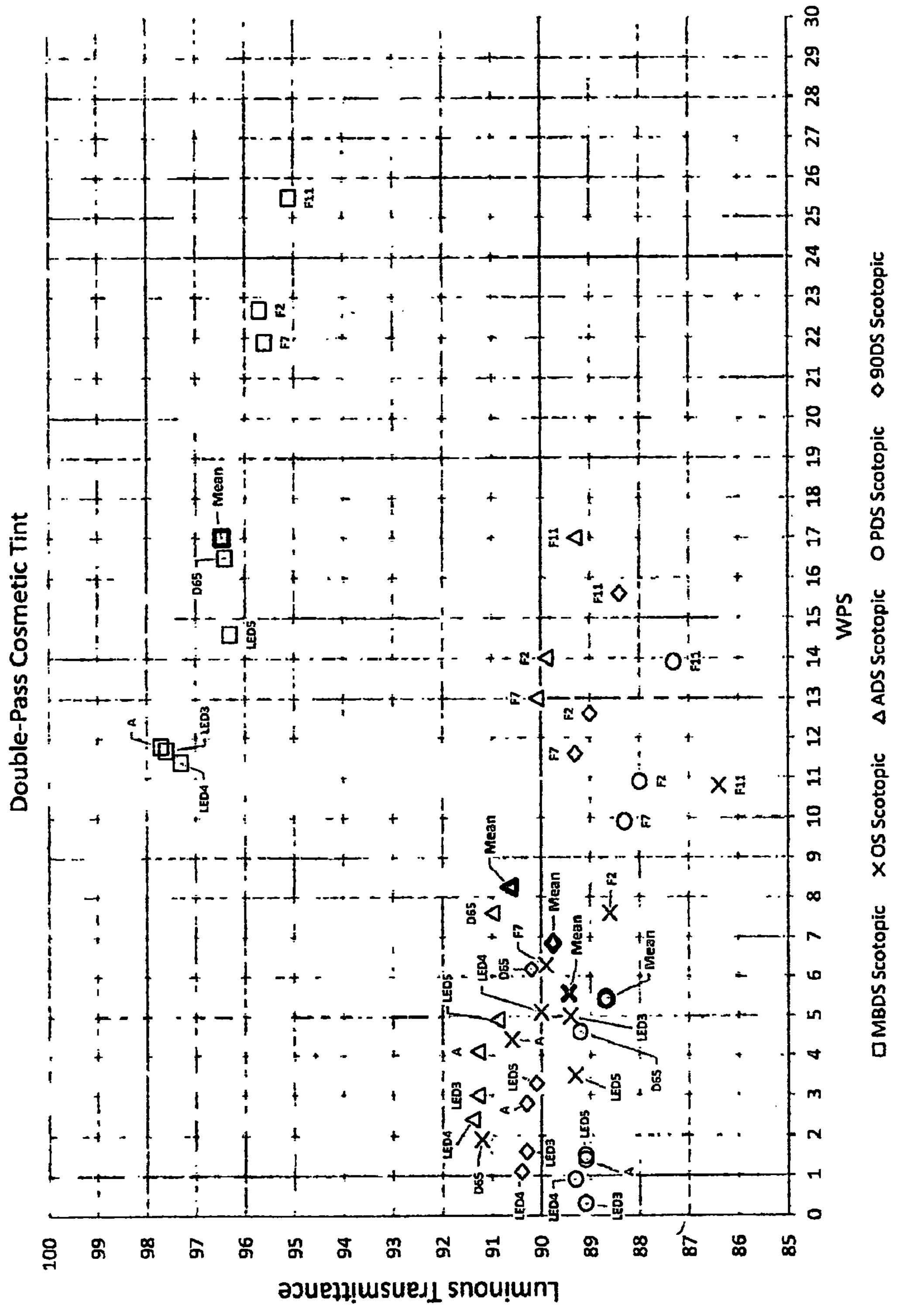
FIG. 16D is a scatter plot of the scotopic luminous transmittance and double-pass WPS values, including mean values, of the MBDS, OS, ADS, PDS and 90DS of the SPDs of FIG. 15, under 8 major lighting conditions.

FIG. 16D is a scatter plot of the scotopic luminous transmittance and double-pass WPS values, including mean values, of the MBDS, OS, ADS, PDS and 90DS under 8 major lighting conditions.

FIGS. 16A, B, C, D and Table 8 show that mean WPS (single-pass and/or double-pass) of OS is (1) lower by 6 or less than that (those) of at least one of ADS, PDS and 90DS, and is (2) lower by 6 or more than that (those) of MBDS.

FIGS. 16A, B, C, D and Table 8 show that the STD of WPS (single-pass and/or double-pass) of OS is lower by 5.0 or less than that (those) of at least one of ADS, PDS, 90DS and MBDS.

FIGS. 16A, B, C, D show one or more WPS values of OS when lit by one or more corresponding illuminants selected from the set of CIE F2, F7 and F11 illuminants is (1) lower than (i) by 1.5 or more, and (2) lower than (ii) by 5.0 or more. (i) is one or more WPS values of at least one of ADS, PDS and 90DS, and (ii) is one or more WPS values of MBDS. WPS values in both (i) and (ii) are lit by any illuminant(s) selected from the same set of illuminants of CIE F2, F7 and F11. WPS values can be from single-pass and/or double-pass.

FIGS. 16A, B, C, D show one or more WPS values of OS when lit by one or more corresponding illuminants selected from the set of LED-3000K, LED-4000K and LED-5000K illuminants is (1) different than (i) by 4.5 or less, and (2) lower than (ii) by 4.5 or more. (i) is one or more WPS values of at least one of ADS, PDS and 90DS, and (ii) is one or more WPS values of MBDS. WPS values in both (i) and (ii) are lit by any illuminant(s) selected from the same set of illuminants of LED-3000K, LED-4000K and LED-5000K.

FIGS. 16A, B, C, D show one or more WPS values of OS when lit by one or more corresponding illuminants selected from the set of CIE A and D65 illuminants is (1) lower than (i) by 1.0 or more, and (2) lower than (ii) by 4.0 or more. (i) is one or more WPS values of at least one of ADS, PDS and 90DS, and (ii) is one or more WPS values of MBDS. WPS values in both (i) and (ii) are lit by any illuminant(s) selected from the same set of illuminants of CIE A and D65.

FIGS. 16A, B, C, D show that the WPS of OS is less than 14 when the illuminant is at least one of CIE F2, CIE F7, CIE F11, CIE A, CIE D65, LED-3000K, LED-4000K and LED-5000K.

FIGS. 16A, B, C, D show the photopic luminous transmittance of OS is at least 75% when lit by at least one illuminant selected from the set of illuminants of CIE F2, CIE F7, CIE F11, CIE A, CIE D65, LED-3000K, LED-4000K and LED-5000K.

FIGS. 16A, B, C, D show that mean luminous transmittance (photopic and/or scotopic) of OS is lower by at most 6%, than that (those) of at least one of ADS, PDS and 90DS.

FIGS. 16A, B, C, D show that mean luminous transmittance (photopic and/or scotopic) of OS is lower by at least 6%, than that (those) of MBDS.

FIGS. 16A, B, C, D show the sets of luminous transmittances (photopic and/or scotopic) of OS, ADS and PDS, when illuminated by the corresponding illuminants of CIE F2, CIE F7, CIE F11, CIE A, CIE D65, LED-3000K, LED-4000K and LED-5000K, have range of less than 10% for each spectrum.

FIGS. 16A, B, C, D show within each figure, three or more luminous transmittance values of OS when lit by three or more corresponding illuminants selected from the set of CIE F2, CIE F7, CIE F11, CIE A, CIE D65, LED-3000K, LED-4000K and LED-5000K illuminants are (1) lower than (i) by 6% or less, and/or (2) lower than (ii) by 6% or more. (i) is three or more corresponding luminous transmittance values of at least one of ADS, PDS and 90DS, and (ii) is three or more corresponding luminous transmittance values of MBDS. Luminous transmittance can be photopic and/or scotopic.

For single-pass tint and/or double-pass tint, Table 8 shows two or more photopic E values of OS when lit by the corresponding two or more illuminants selected from the set of CIE F2, F11, F7, A, D65, LED-3000K, LED-4000K and LED-5000K illuminants is higher than (i) by at least 0.08, where (i) is the corresponding photopic E values of at least one of ADS, PDS and 90DS when lit by the same illuminant(s).

For single-pass tint and/or double-pass tint, Table 8 shows two or more scotopic E values of OS when lit by the corresponding two or more illuminants selected from the set of CIE F2, F11, F7, A, D65, LED-3000K, LED-4000K and LED-5000K illuminants is higher than (i) by at least 0.15, where (i) is the corresponding scotopic E values of at least one of ADS, PDS and 90DS when lit by the same illuminant(s).

Figure 17:
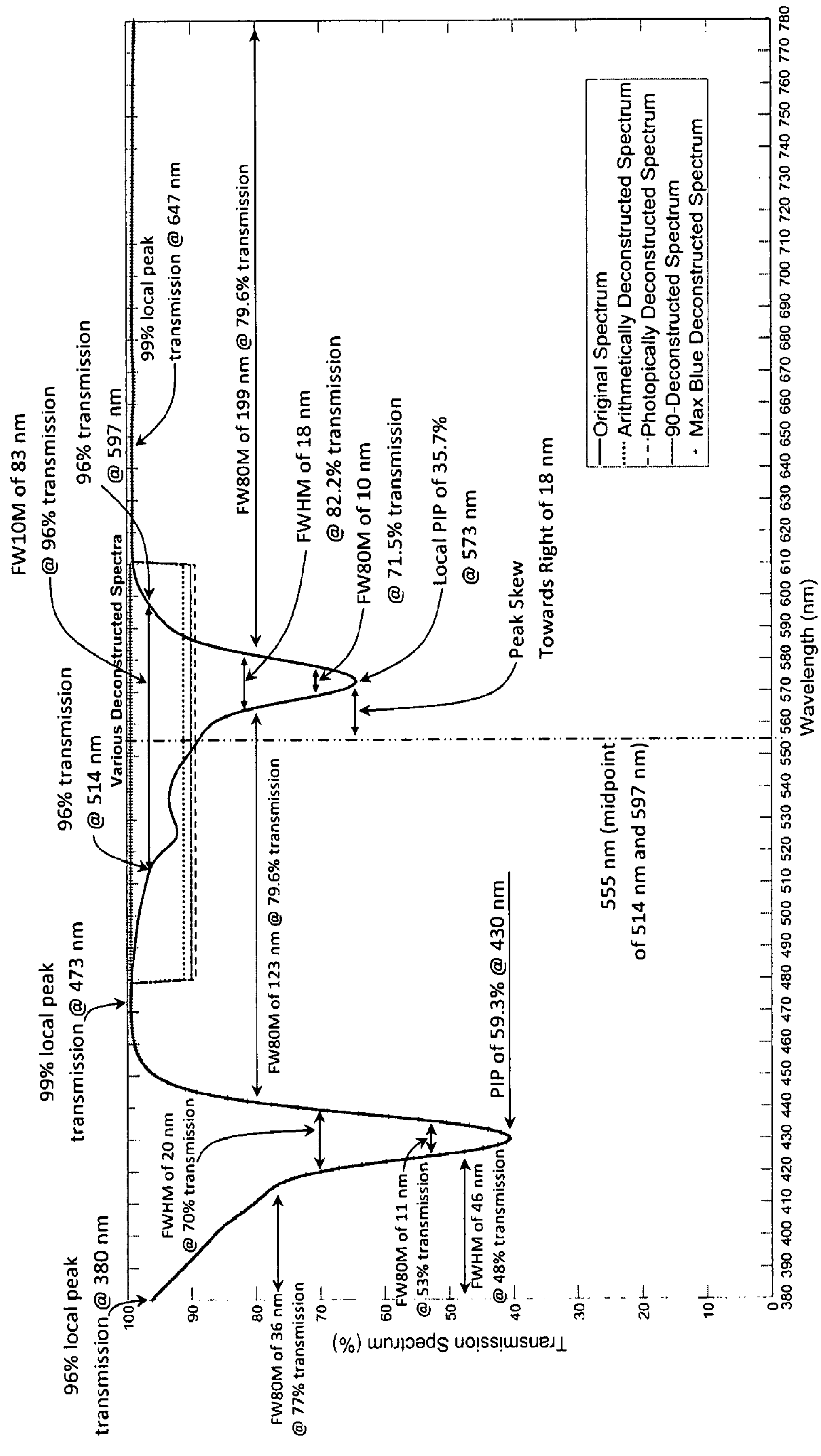
FIG. 17 is a graph including a plot of the Original Spectrum of another SMVF (OD), its ADS, PDS, MBDS and 90DS.

FIG. 17 illustrates the Original Spectrum of another SMVF (OD), its ADS, PDS, MBDS and 90DS. Wavelength A is 480 nm, and Wavelength B is 610 nm. The corresponding Arithmetic Mean is 91% or above 70%, Photopic Mean is 89%, and Max Blue Transmission is 99%. The OD having the OS shown in FIG. 17 is representative of a class of embodiments having a Photopic Mean above 70% and a Max Blue Transmission above 75%.

There is at least one inhibition peak at 430 nm that has a peak inhibition of 59% as seen in FIG. 17. The inhibition band of OS centered at 430 nm has a FWHM of 20 nm and a FW80M of 11 nm. The OD having the OD shown in FIG. 17 is representative of a class of embodiments having an inhibition peak between 380 nm and 500 nm that has a PIP of at least 25%; a FWHM of at least 15 nm and a FW80M of at least 7 nm.

FIG. 17 shows that the Original Spectrum of an OD has at least 1 inhibition band, and at least 2 pass-bands centered between 450 nm and 700 nm. The FW80M of at least 1 such inhibition band is at least 7 nm and at most 50 nm, and is at a transmission level of between 55% and 90%. FWHM of at least 1 such inhibition band is at least 13 nm and at most 80 nm, and is at a transmission level which is at least 5% higher than that of the FW80M of the same inhibition band. FW10M of at least 1 such inhibition band is at least 40 nm and at most 150 nm, and is at a transmission level of between 75% and 97%.

There is at least one inhibition band of OS centered between 540 nm and 600 nm. The PIP of at least one of such inhibition band is 35% or at least 15% and at most 50% with a FW80M that is at least 5 nm shorter than the corresponding FWHM of the same inhibition band. For the two end-point wavelengths used to determine FW10M of the inhibition band, (1) the shorter end-point wavelength is at 514 nm in the particular case of FIG. 17 or more generally between 480 nm and 540 nm, and (2) the longer end-point wavelength is in the particular case of FIG. 17 at 597 nm or more generally between 570 nm and 630 nm. The midpoint of such two end-point wavelengths is between 525 nm and 585 nm. The inhibition band has a Peak Skew Towards Right of 18 nm in the particular case of FIG. 17 or more generally between 10 nm and 50 nm. The spectral skew can be created by at least one of dye(s) and/or interference thin film(s) via spectral modifications.

Peak Skew is the wavelength difference between (1) and (2), where (1) is the wavelength of the peak inhibition or peak transmission of a spectral feature, e.g. inhibition band or pass-band, respectively, and (2) is the midpoint wavelength of two end-point wavelengths used to determine the FW10M of the spectral feature. Peak Skew Towards Right is used when (1) is larger than (2). Peak Skew Towards Left is used when (2) is larger than (1). See FIG. 17 for example.

The largest PIP of any inhibition band of OS centered between 380 nm and 500 nm is at least 15% larger than the largest PIP of any inhibition band of OS centered between 501 nm and 700 nm.

The Width-To-Peak ratio of (FW80M+FWHM+FW10M)/PIP for any inhibition band of OS centered within 420 nm and 650 nm is at least 1.0. For example, in FIG. 17, the inhibition band of OS centered at 573 nm has a Width-To-Peak ratio of (10+18+83)/36=3.1.

The OS shown in FIG. 17 has a pass-band centered between 380 nm and 430 nm with a peak transmission of more than 10%. The FW80M of this pass-band is at least 7 nm, and the FWHM is at least 15 nm.

There is at least one pass-band of OS centered between 430 nm and 570 nm with a FW80M of at least 60 nm. The peak transmission of this pass-band is 99% or at least 60%. FW80M of such pass-band is longer, by at least 5 nm, than the FWHM of an adjacent inhibition band.

One or more pass-bands of OS centered between 575 nm and 780 nm has a peak transmission of 99% or at least 70%, and a FW80M of 199 nm or at least 60 nm. FW80M of such pass-band is at least 1.5 times the width of FWHM of the inhibition band with the largest PIP between 380 nm and 500 nm. FW80M of such pass-band is at least 25 nm longer than the FW80M of any other pass-band in OS.

For example, for the spectrum in FIG. 17, 2 dyes are dispersed into an 1 mm center thickness, 12 mm in diameter, round intraocular lens (IOL) of PMMA material, e.g. acrylic. The dyed IOL is constructed via (1) mixing all 2 dyes with methanol or ethanol (or another suitable organic solvent), then mixing with PMMA pellets, and (2) the dyed polymer is then formed into shape, e.g. via injection molding. Additional cutting, grinding, polishing, temperature treatments and/or surface treatments may be applied to the OD. Exciton has (1) the ABS 549 dye that will substantially create the inhibition band at around 430 nm, with a dye loading of 0.5 mg to 200 mg per 2 lb of PMMA polymer, and (2) the ABS 574 dye that will substantially create the inhibition band at around 573 nm, with a dye loading of 0.5 mg to 200 mg per 2 lb of PMMA polymer. Epolin has (1) the Epolight 5822 dye that will substantially create the inhibition band at around 573 nm, with a dye loading of 0.5 mg to 200 mg per 2 lb of PMMA polymer, and (2) the Epolight 5851 dye that will substantially create the inhibition band at around 430 nm, with a dye loading of 0.5 mg to 200 mg per 2 lb of PMMA polymer. For the embodiment of FIG. 17, at least one dye is needed to create each of the described inhibition band. The listing of multiple dyes for an inhibition band show illustrate the possibility of dye substitutions or dye supplementations. Even in the case of listing a single example dye for an inhibition band, many dye substitutions or supplementations exist, as exemplified by the commercial availability of numerous dyes attenuating any desired wavelength. Furthermore, many dyes can be tuned to attenuate any desired wavelength with desired shapes, such as a dye's FWHM, which further increases the capability to substitute or supplement one dye with another.

Table 9 shows numerous PIs and CIs of the OD, whose transmission spectrum is illustrated in FIG. 17.

The OD inhibits transmission of at least 50%, preferably at least 58%, at one or more wavelengths between 420 nanometers to 465 nanometers.

As shown in FIG. 17 and Table 9, the transmission spectrum of the OD creates red-green color enhancement/contrast when (1) the PIP of at least one inhibition band centered between 560 nm and 610 nm is more than 20%, and (2) the RGLI Color Difference Percent, CIE D65 is at least 4.0%.

Figure 18A:
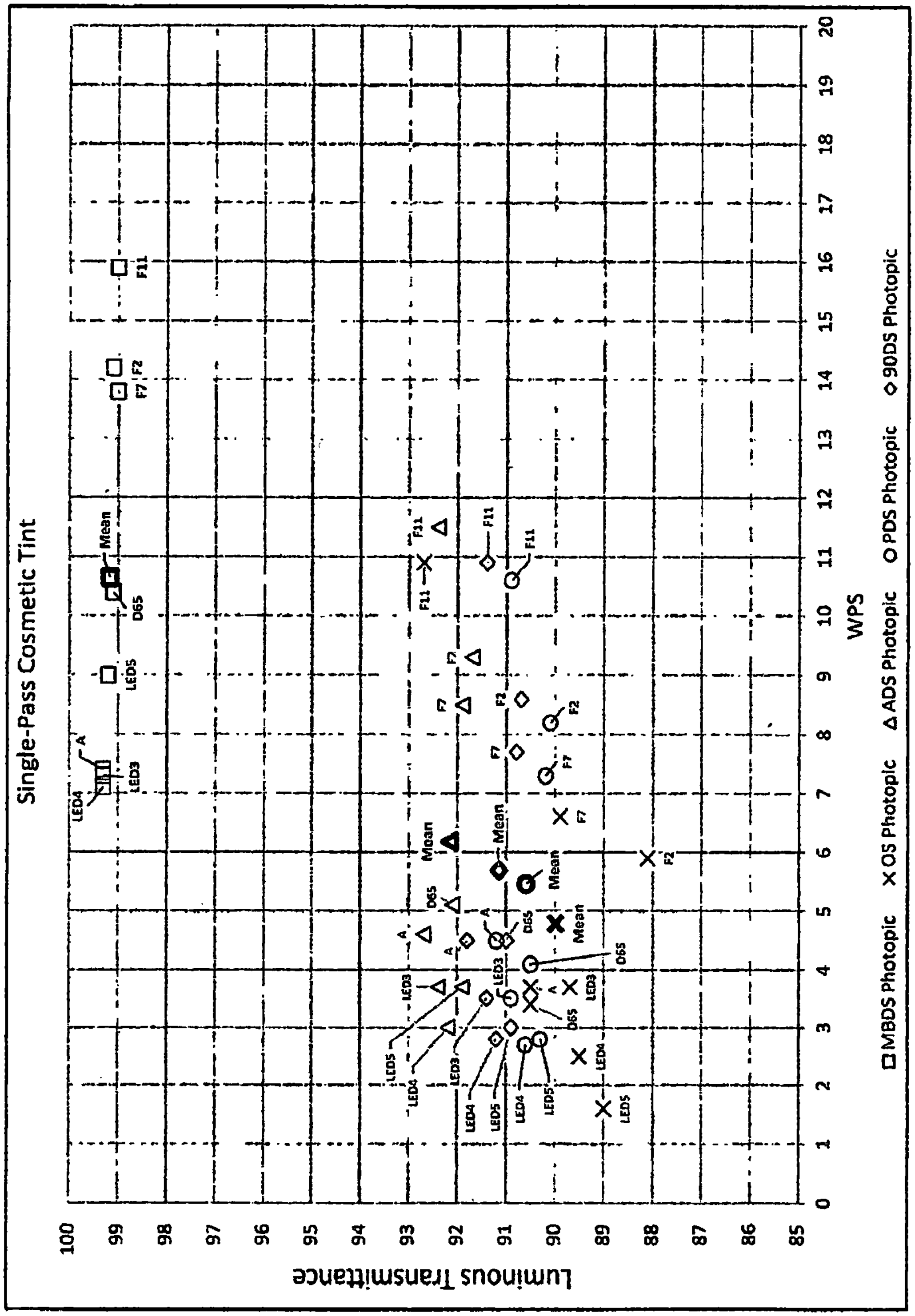
FIG. 18A is a scatter plot of the photopic luminous transmittance and single-pass WPS values, including mean values, of the MBDS, OS, ADS, PDS and 90DS of the SPDs of FIG. 17, under 8 major lighting conditions.

FIG. 18A is a scatter plot of the photopic luminous transmittance and single-pass WPS values, including mean values, of the MBDS, OS, ADS, PDS and 90DS under 8 major lighting conditions.

Figure 18B:
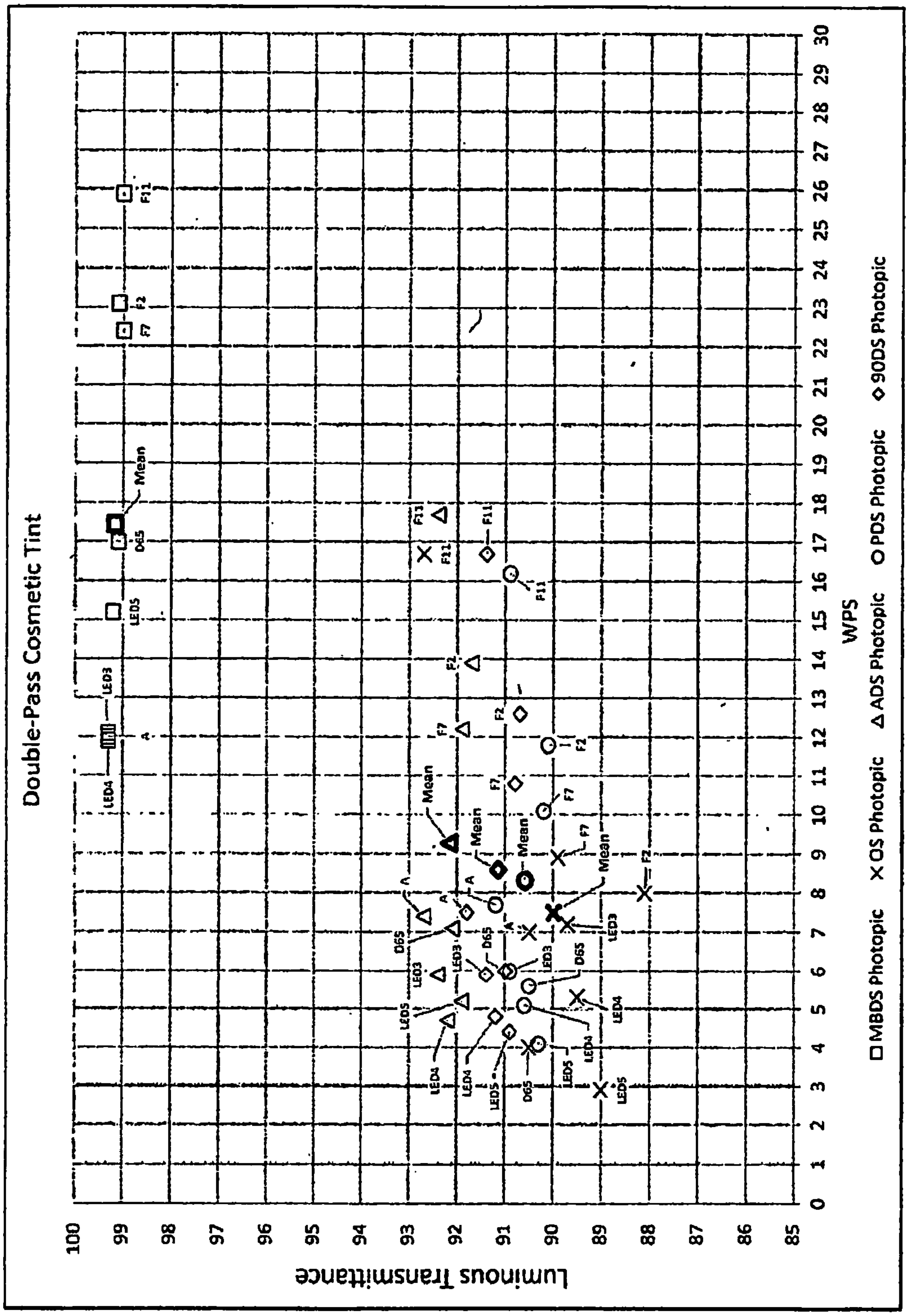
FIG. 18B is a scatter plot of the photopic luminous transmittance and double-pass WPS values, including mean values, of the MBDS, OS, ADS, PDS and 90DS of the SPDs of FIG. 17, under 8 major lighting conditions.

FIG. 18B is a scatter plot of the photopic luminous transmittance and double-pass WPS values, including mean values, of the MBDS, OS, ADS, PDS and 90DS under 8 major lighting conditions.

Figure 18C:
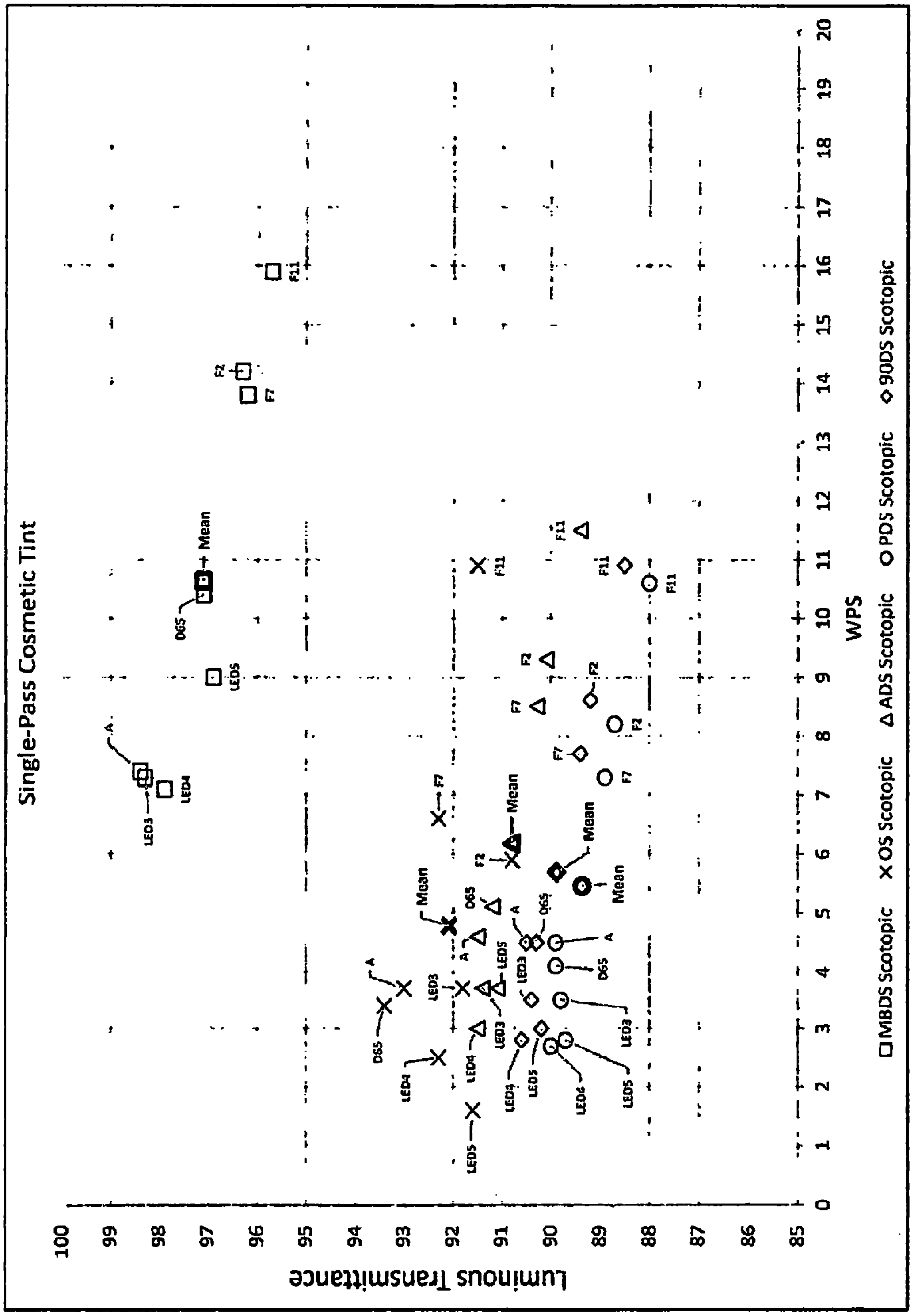
FIG. 18C is a scatter plot of the scotopic luminous transmittance and single-pass WPS values, including mean values, of the MBDS, OS, ADS, PDS and 90DS of the SPDs of FIG. 17, under 8 major lighting conditions.

FIG. 18C is a scatter plot of the scotopic luminous transmittance and single-pass WPS values, including mean values, of the MBDS, OS, ADS, PDS and 90DS under 8 major lighting conditions.

Figure 18D:
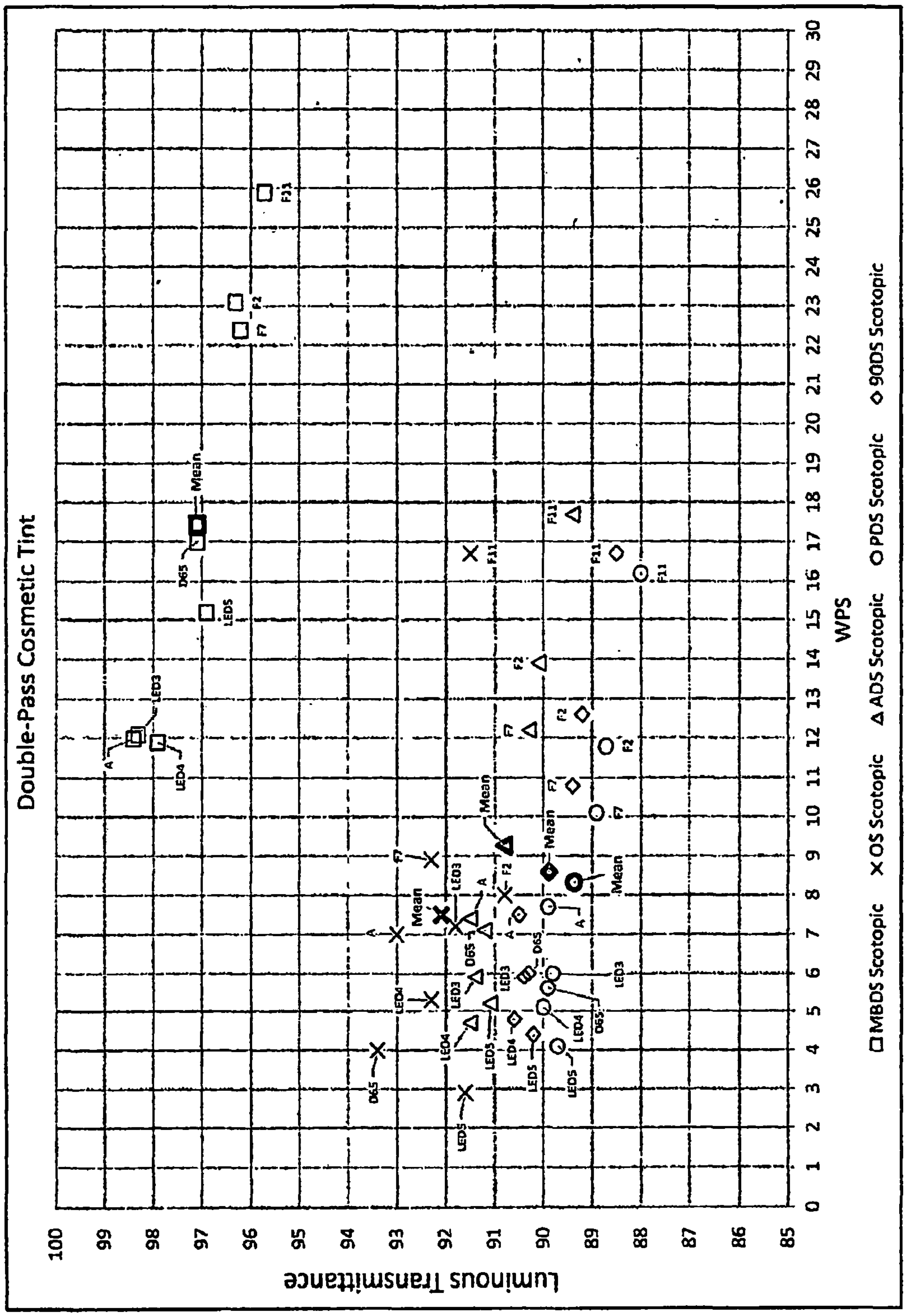
FIG. 18D is a scatter plot the scotopic luminous transmittance and double-pass WPS values, including mean values, of the MBDS, OS, ADS, PDS and 90DS of the SPDs of FIG. 17, under 8 major lighting conditions.

FIG. 18D is a scatter plot of the scotopic luminous transmittance and double-pass WPS values, including mean values, of the MBDS, OS, ADS, PDS and 90DS under 8 major lighting conditions.

FIGS. 18A, B, C, D and Table 9 show that mean WPS (single-pass and/or double-pass) of OS is (1) lower by 4 or less than that (those) of at least one of ADS, PDS and 90DS, and is (2) lower by 4 or more than that (those) of MBDS.

FIGS. 18A, B, C, D and Table 9 show that the STD of WPS (single-pass and/or double-pass) of OS is lower by 0.4 or more than that (those) of at least one of ADS, PDS, 90DS and MBDS.

FIGS. 18A, B, C, D show one or more WPS values of OS when lit by one or more corresponding illuminants selected from the set of CIE F2, F7 and F11 illuminants is (1) lower than (i) by 1.0 or more, and (2) lower than (ii) by 5.0 or more. (i) is one or more WPS values of at least one of ADS, PDS and 90DS, and (ii) is one or more WPS values of MBDS. WPS values in both (i) and (ii) are lit by any illuminant(s) selected from the same set of illuminants of CIE F2, F7 and F11.

FIGS. 18A, B, C, D show one or more WPS values of OS when lit by one or more corresponding illuminants selected from the set of LED-3000K, LED-4000K and LED-5000K illuminants is (1) different than (i) by 0.5 or more, and (2) lower than (ii) by 3.0 or more. (i) is one or more WPS values of at least one of ADS, PDS and 90DS, and (ii) is one or more WPS values of MBDS. WPS values in both (i) and (ii) are lit by any illuminant(s) selected from the same set of illuminants of LED-3000K, LED-4000K and LED-5000K.

FIGS. 18A, B, C, D show one or more WPS values of OS when lit by one or more corresponding illuminants selected from the set of CIE A and D65 illuminants is (1) lower than (i) by 0.5 or more, and (2) lower than (ii) by 3.0 or more. (i) is one or more WPS values of at least one of ADS, PDS and 90DS, and (ii) is one or more WPS values of MBDS. WPS values in both (i) and (ii) are lit by any illuminant(s) selected from the same set of illuminants of CIE A and D65.

FIGS. 18A, B, C, D show that the WPS of OS is less than 12 when the illuminant is at least one of CIE F2, CIE F7, CIE F11, CIE A, CIE D65, LED-3000K, LED-4000K and LED-5000K. WPS may be single-pass and/or double-pass.

FIGS. 18A, B, C, D show the photopic luminous transmittance of OS is at least 78% when lit by at least one illuminant selected from the set of illuminants of CIE F2, CIE F7, CIE F11, CIE A, CIE D65, LED-3000K, LED-4000K and LED-5000K.

FIGS. 18A, B show that mean photopic luminous transmittance of OS is lower by at most 5%, than that of at least one of ADS, PDS and 90DS.

FIGS. 18C, D show that mean scotopic luminous transmittance of OS is higher by at most 6%, than that of at least one of ADS, PDS and 90DS.

Statistical values, including mean, standard deviation (STD) and range, describe CIs lit by designated illuminants. The default designated illuminants, including if undesignated, are CIE F2, CIE F7, CIE F11, CIE A, CIE D65, LED-3000K, LED-4000K and LED-5000K.

FIGS. 18A, B, C, D show that mean luminous transmittance (photopic and/or scotopic) of OS is lower by at least 4%, than that (those) of MBDS.

FIGS. 18A, C show, within each figure, the set of luminous transmittances (photopic and/or scotopic) of OS, when illuminated by the corresponding illuminants of CIE F2, CIE F7, CIE F11, CIE A, CIE D65, LED-3000K, LED-4000K and LED-5000K, has a range of less than 10%.

FIGS. 18A, B show, within each figure, two or more photopic luminous transmittances of OS when lit by two or more corresponding illuminants selected from the set of CIE F2, CIE F7, CIE F11, CIE A, CIE D65, LED-3000K, LED-4000K and LED-5000K illuminants are (1) lower than (i) by 6% or less, and (2) lower than (ii) by 4% or more. (i) is two or more luminous transmittance values of at least one of ADS, PDS and 90DS, and (ii) is two or more luminous transmittance values of MBDS. Luminous transmittance values in both (i) and (ii) are lit by any two or more illuminants selected from the same set of illuminants of CIE F2, CIE F7, CIE F11, CIE A, CIE D65, LED-3000K, LED-4000K and LED-5000K.

Note that CIs when lit by two or more illuminants are illuminated separately-creates separate lighting environments with each environment lit by single type of light. Unless specifically noted otherwise, Cl values disclosed are not caused by two or more illuminants blended together in a single environment.

FIGS. 18C, D show, within each figure, two or more scotopic luminous transmittance values of OS when lit by two or more corresponding illuminants selected from the set of CIE F2, CIE F7, CIE F11, CIE A, CIE D65, LED-3000K, LED-4000K and LED-5000K illuminants are (1) higher than (i) by 7% or less, and (2) lower than (ii) by 2% or more. (i) is two or more luminous transmittances of at least one of ADS, PDS and 90DS, and (ii) is two or more luminous transmittance values of MBDS. Luminous transmittance values in both (i) and (ii) are lit by any two or more illuminants selected from the same set of illuminants of CIE F2, CIE F7, CIE F11, CIE A, CIE D65, LED-3000K, LED-4000K and LED-5000K. Individual illuminant(s) selected for luminous transmittance(s) and/or WPS(s) of OS may not necessarily be the same illuminant(s) selected for luminous transmittance(s) and/or WPS(s) of ADS, PDS, 90DS and/or MBDS. However, all illuminant(s) are selected from the same designated set of illuminants.

For single-pass tint and/or double-pass tint, Table 9 shows two or more photopic E values of OS when lit by the corresponding two or more illuminants selected from the set of CIE F2, F11, F7, A, D65, LED-3000K, LED-4000K and LED-5000K illuminants is higher than (i) by at least 0.08, where (i) is the corresponding photopic E values of at least one of ADS, PDS and 90DS when lit by the same illuminants.

For single-pass tint and/or double-pass tint, Table 9 shows two or more scotopic E values of OS when lit by the corresponding two or more illuminants selected from the set of CIE F2, F11, F7, A, D65, LED-3000K, LED-4000K and LED-5000K illuminants is higher than (i) by at least 0.1, where (i) is the corresponding scotopic E values of at least one of ADS, PDS and 90DS when lit by the same illuminants.

Figure 19:
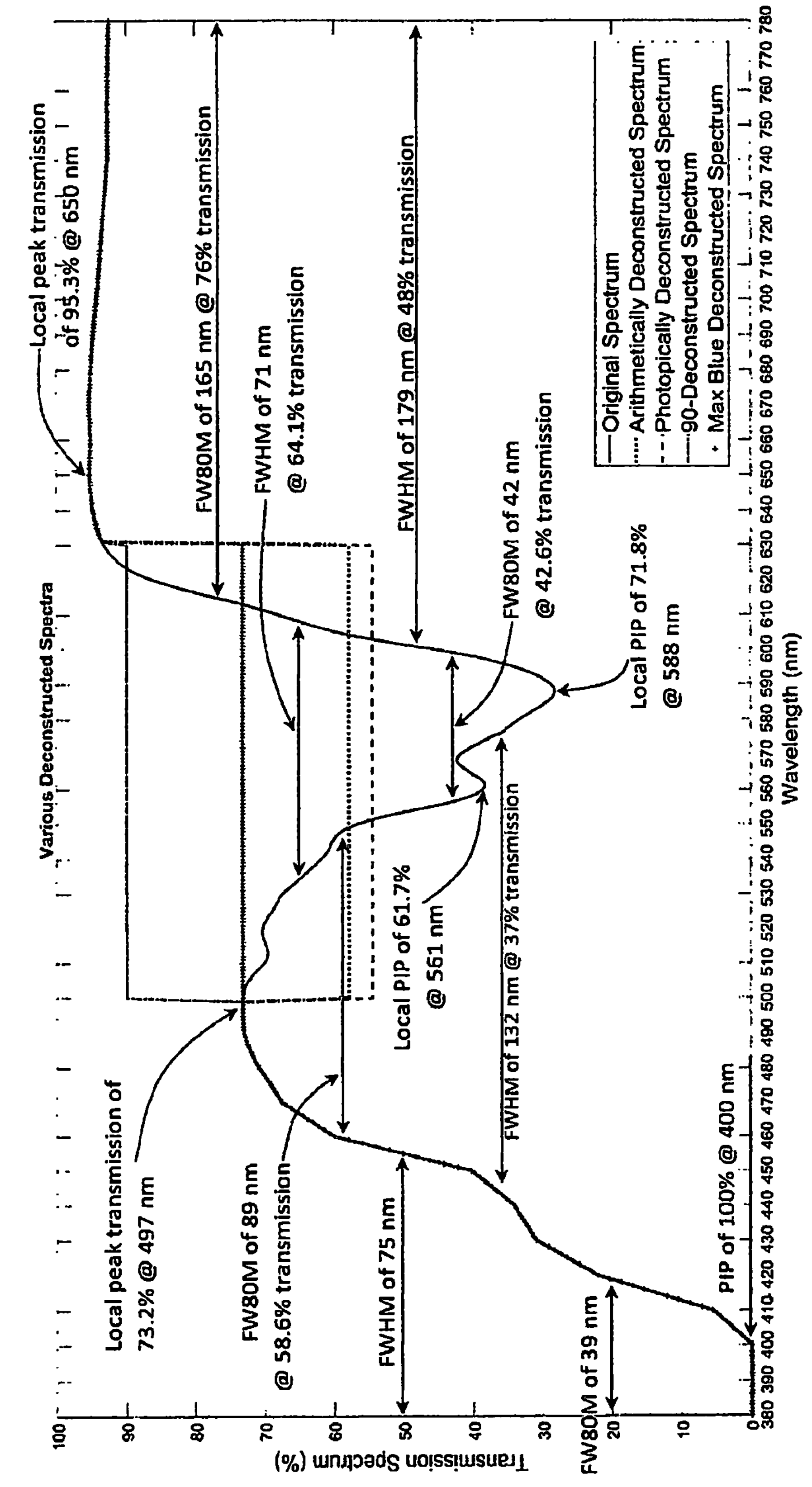
FIG. 19 is a graph including a plot of the Original Spectrum of another SMVF (OD), its ADS, PDS, MBDS and 90DS.

FIG. 19 illustrates the Original Spectrum of another SMVF (OD), its ADS, PDS, MBDS and 90DS. Wavelength A is 500 nm, and Wavelength B is 630 nm. The corresponding Arithmetic Mean is 58%, Photopic Mean is 55%, and Max Blue Transmission is 73%. There is an inhibition peak of OS at 400 nm that inhibits 100% of the incident light. The inhibition band has a FWHM of 75 nm. The inhibition band has a FW80M of 39 nm.

The OD having the OS shown in FIG. 19 is representative of a class of embodiments for which the Arithmetic Mean is above 45%, the Photopic Mean is above 45%, the Max Blue Transmission is above 60%, there is at least one inhibition peak of OS between 380 nm and 500 nm that inhibits at least 50%, the inhibition band has a FWHM of at least 30 nm, and the inhibition band has a FW80M of at least 15 nm FIG. 19 shows that the OS has at least 1 inhibition band, and at least 2 pass-bands centered between 455 nm and 680 nm. The FW80M of at least 1 such inhibition band is at least 10 nm and at most 60 nm, and is at a transmission level of between 40% and 85%. FWHM of at least 1 such inhibition band is at least 20 nm and at most 100 nm, and is at a transmission level which is at least 10% higher than that of the FW80M of the same inhibition band.

There is at least one inhibition band of OS centered between 540 nm and 600 nm. The PIP of such inhibition band is 72% or at least 20% and at most 80%. The inhibition band has a FW80M that is at least 10 nm shorter than the corresponding FWHM of the same inhibition band.

The largest PIP of any inhibition band of OS centered between 380 nm and 500 nm is at least 20% larger than the largest PIP of any inhibition band of OS centered between 501 nm and 700 nm.

The Pseudo Width-To-Peak ratio of (FW80M+FWHM)/PIP for any inhibition band of OS centered within 420 nm and 650 nm is at least 0.75. For example, in FIG. 19, the inhibition band of OS centered at 588 nm has a Pseudo Width-To-Peak ratio of (42+71)/72=1.6.

To ensure a low color inconstancy of OS of the SMVF in single-pass tints and/or double-pass tints when lit separately by three or more illuminants selected from CIE F2, CIE F7, CIE F11, CIE A, CIE D65, LED-3000K, LED-4000K and LED-5000K illuminants, for every inhibition band in the OS that satisfies (1) whose PIP is at least 10% and (2) is centered between 510 nm and 610 nm, that inhibition band must have a Width-To-Peak ratio of at least 1.0 and/or a Pseudo Width-To-Peak ratio of at least 0.75.

A low color inconstancy in single-pass tints of OS under the designated illuminants is defined by achieving at least three of the following four conditions: (1) the range of single-pass WPSs of OS is less than 8, (2) the standard deviation of single-pass WPSs of OS is less than 5, (3) the range of single-pass photopic luminous transmittances of OS is less than 8%, and (4) the range of single-pass scotopic luminous transmittances of the OS is less than 8%.

A low color inconstancy in double-pass tints of OS under the designated illuminants is defined by achieving at least three of the following four conditions: (1) the range of double-pass WPSs of OS is less than 10, (2) the standard deviation of double-pass WPSs of OS is less than 6, (3) the range of single-pass photopic luminous transmittances of OS is less than 8%, and (4) the range of single-pass scotopic luminous transmittances of the OS is less than 8%.

The default transmission spectrum in this disclosure is the OS, and not ADS, PDS, 90DS or MBDS, unless otherwise stated.

For all single-pass tints and all double-pass tints of an OS, the following two conditions are met: (1) all a-values are between −15 and 10, and all b-values are between −5 and 25 in 1976 CIE LAB color space, when the SMVF is lit separately by three or more illuminants selected from CIE F2, CIE F7, CIE F11, CIE A, CIE D65, LED-3000K, LED-4000K and LED-5000K illuminants, and (2) Yellowness-Index is less than 20.

The OS shown in FIG. 19 has at least one pass-band centered between 380 nm and 560 nm, whose peak transmission is 73% or more than 50%. The FW80M of this pass-band is 89 nm or at least 25 nm, and the FWHM is 132 nm or at least 40 nm. FW80M of such pass-band is longer, by at least 5 nm, than the FWHM of an adjacent inhibition band.

One or more pass-bands of OS centered between 590 nm and 780 nm has a peak transmission of 95% or at least 70%, and a FW80M of 165 nm or at least 70 nm. FW80M of such pass-band is (1) at least 1.5 times the width of FW80M of the inhibition band with the largest PIP between 380 nm and 500 nm, and (2) at least 1.75 times the width of FW80M of the inhibition band with the largest PIP between 501 nm and 630 nm. FW80M of this pass-band is at least 20 nm longer than the FW80M of any other pass-band in OS.

Certain embodiments of optical devices such as illustrated in FIG. 19 have spectral transmission that monotonically increases from 380 nanometers to a first passband peak at a wavelength between 380 nanometers and 560 nanometers, preferably between 460 nm and 520 nm.

For example, for the spectrum in FIG. 19, 2 dyes are dispersed into a 0.15 mm center thickness, 12 mm in diameter, round soft contact lens of hydrogel (HG) material. The dyed contact lens is constructed by (1) mixing all 2 dyes with HG monomer, (2) copolymerizing the dyes with the polymerization of HG monomer, and (3) cut, grind, polish or otherwise process the dyed HG polymer into desired shape. A dye can be functionalized with one or more reactive double-bonds, e.g. acrylate functionalization, without modifying the core chromophore, in order to copolymerize with the HG monomer. Epolin has the Epolight 5663 dye that will substantially create the inhibition band at around 400 nm, with a dye loading of 1 mg to 300 mg per 3 lb of HG monomer. Crysta-lyn has the DLS 588A dye that will substantially create the inhibition band at around 588 nm with another peak attenuation at around 561 nm, with a dye loading of 1 mg to 250 mg per 3 lb of HG material.

Table 10 shows numerous PIs and CIs of the OD, whose transmission spectrum is illustrated in FIG. 19.

Figure 20A:
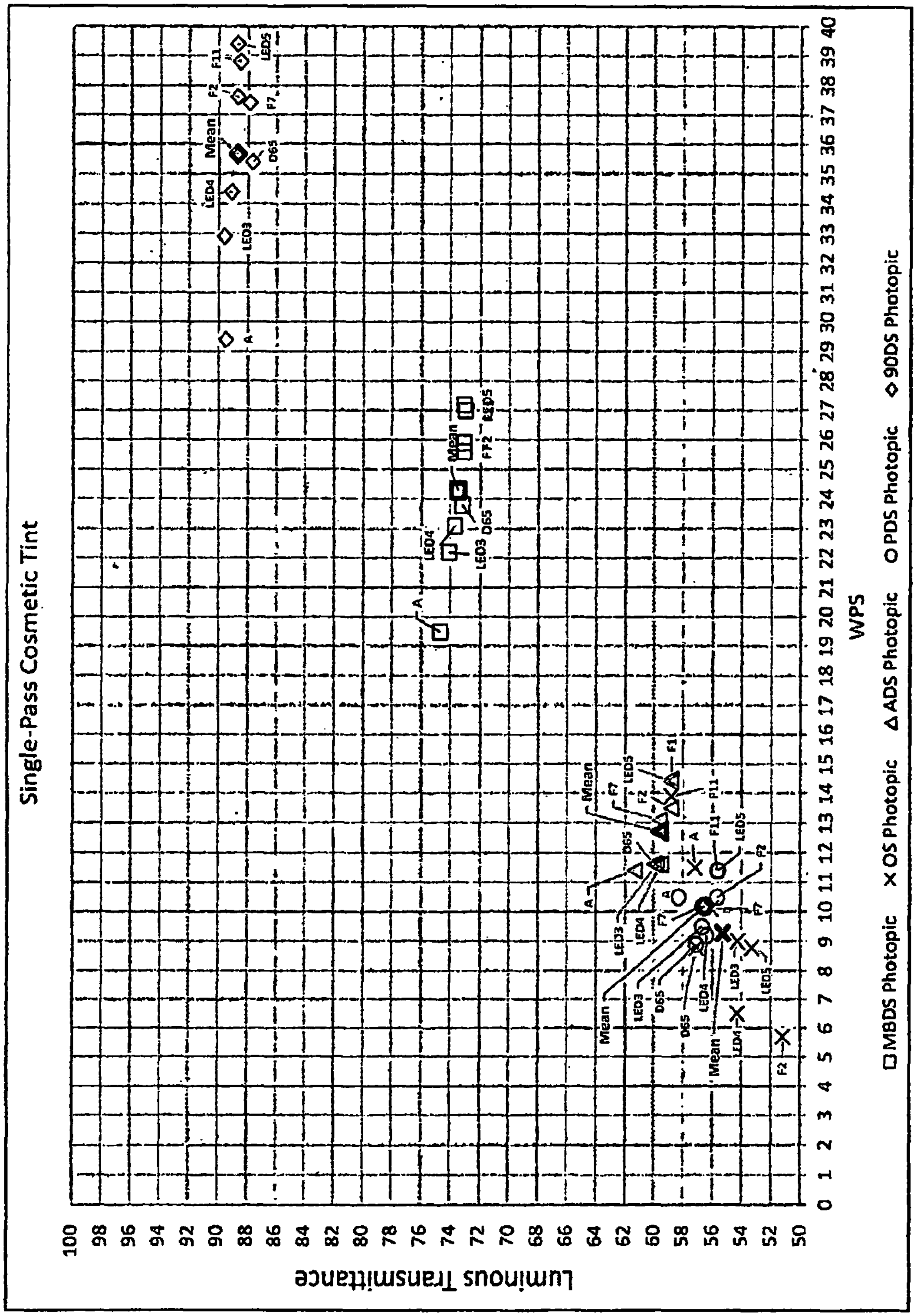
FIG. 20A is a scatter plot of the photopic luminous transmittance and single-pass WPS values, including mean values, of the MBDS, OS, ADS, PDS and 90DS of the SPDs of FIG. 19, under 8 major lighting conditions.

FIG. 20A is a scatter plot of the photopic luminous transmittance and single-pass WPS values, including mean values, of the MBDS, OS, ADS, PDS and 90DS under 8 major lighting conditions.

Figure 20B:
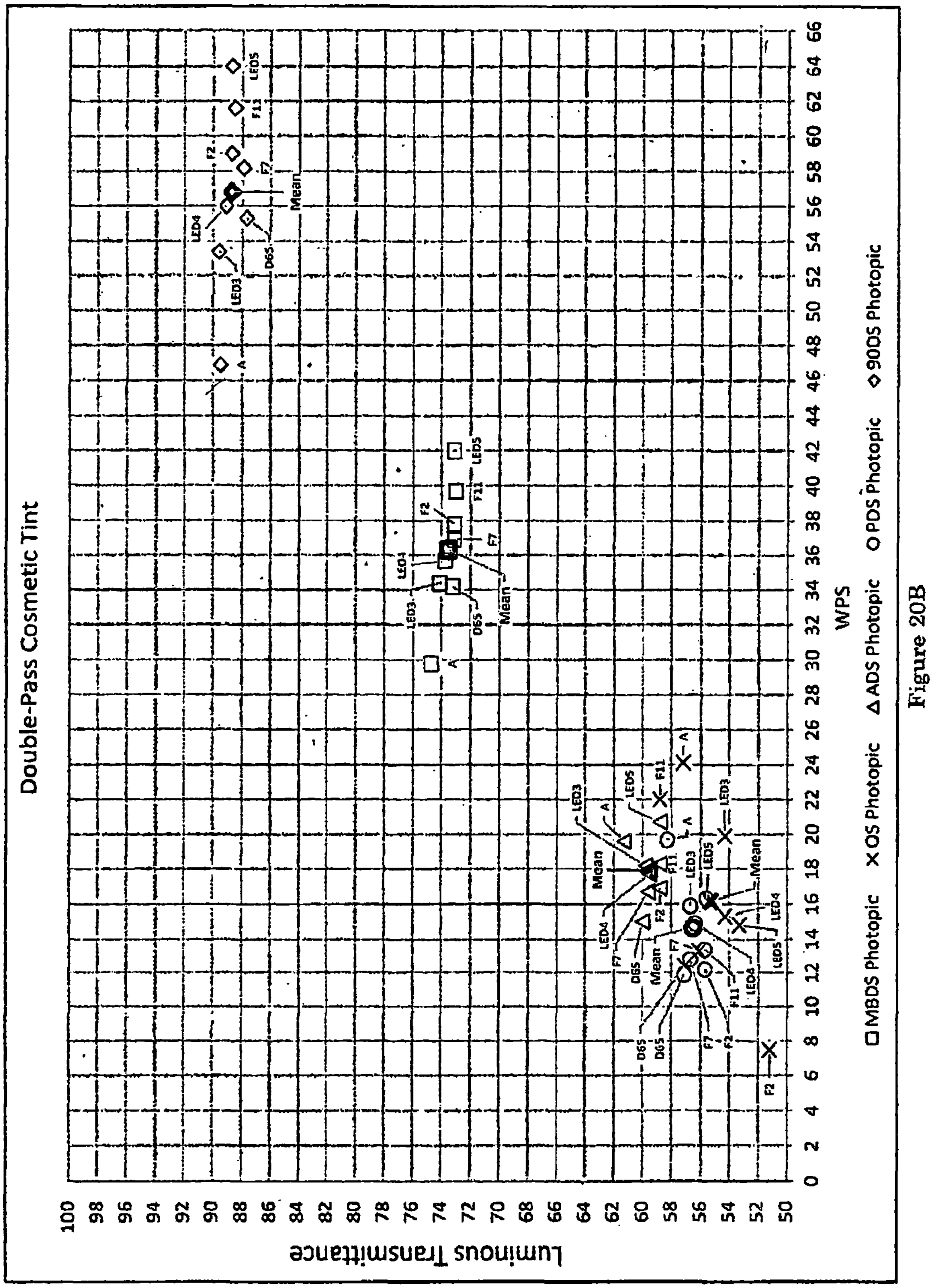
FIG. 20B is a scatter plot of the photopic luminous transmittance and double-pass WPS values, including mean values, of the MBDS, OS, ADS, PDS and 90DS of the SPDs of FIG. 19, under 8 major lighting conditions.

FIG. 20B is a scatter plot of the photopic luminous transmittance and double-pass WPS values, including mean values, of the MBDS, OS, ADS, PDS and 90DS under 8 major lighting conditions.

Figure 20C:
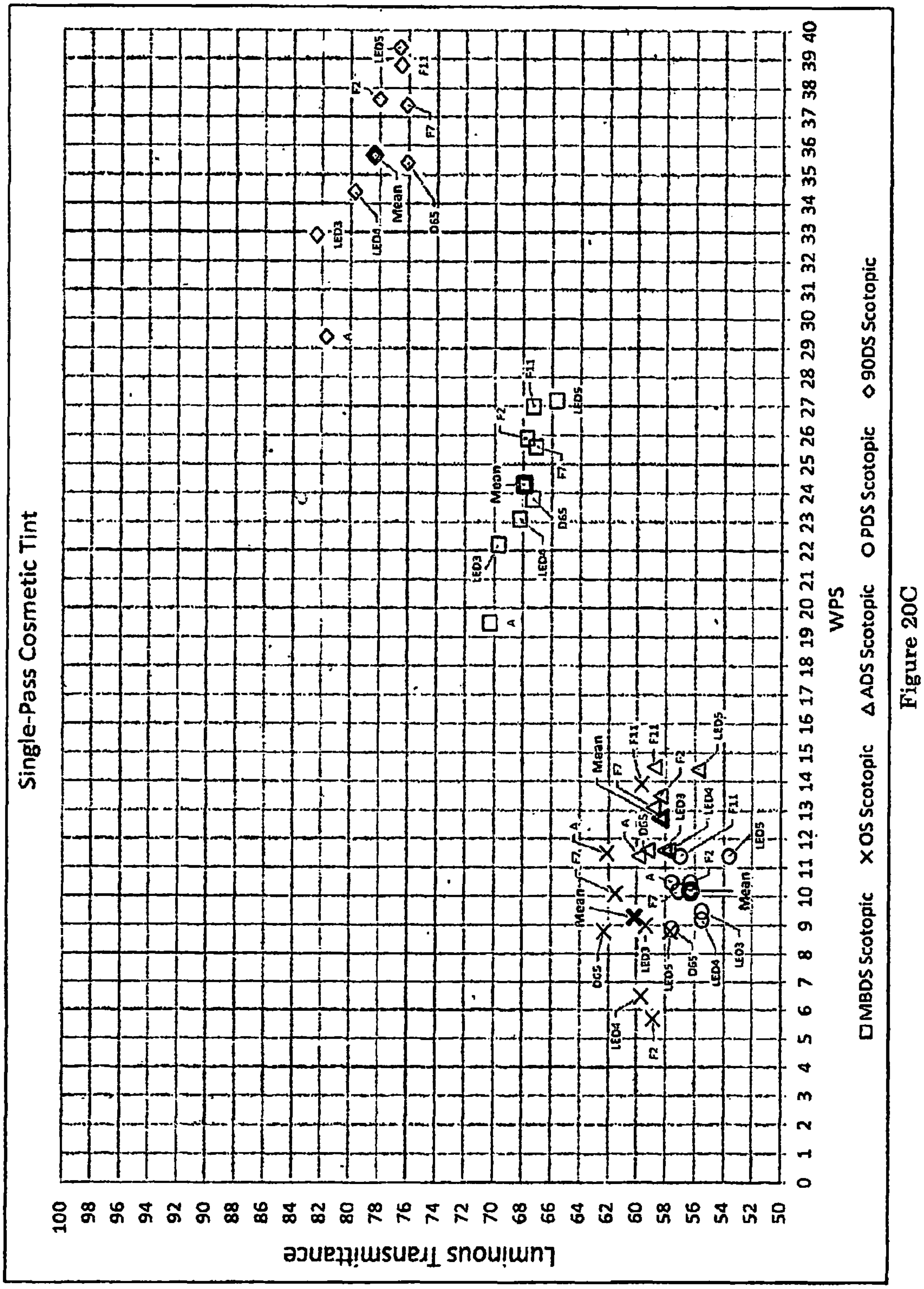
FIG. 20C is a scatter plot of the scotopic luminous transmittance and single-pass WPS values, including mean values, of the MBDS, OS, ADS, PDS and 90DS of the SPDs of FIG. 19, under 8 major lighting conditions.

FIG. 20C is a scatter plot of the scotopic luminous transmittance and single-pass WPS values, including mean values, of the MBDS, OS, ADS, PDS and 90DS under 8 major lighting conditions.

Figure 20D:
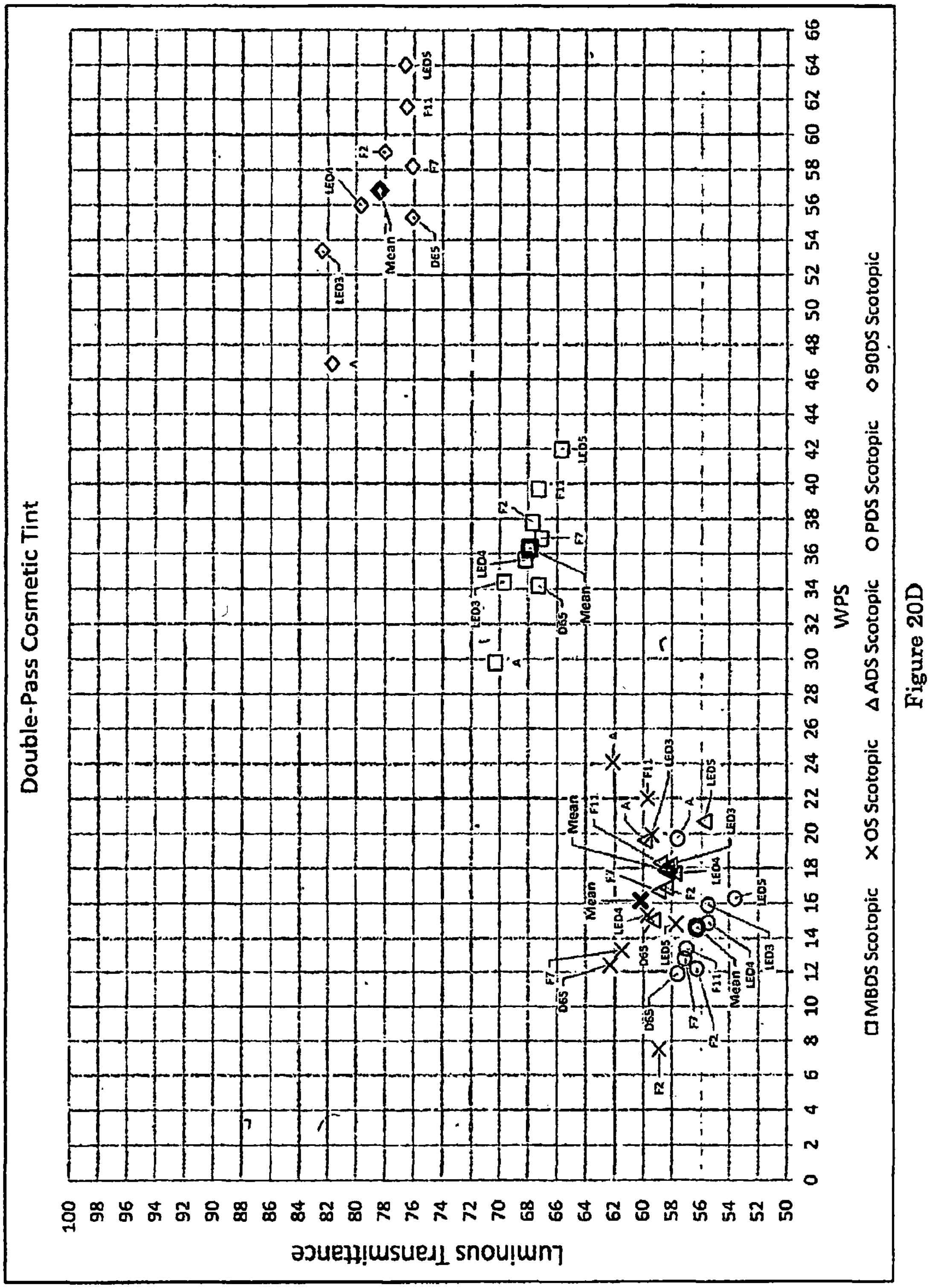
FIG. 20D is a scatter plot of the scotopic luminous transmittance and double-pass WPS values, including mean values, of the MBDS, OS, ADS, PDS and 90DS of the SPDs of FIG. 19, under 8 major lighting conditions.

FIG. 20D is a scatter plot of the scotopic luminous transmittance and double-pass WPS values, including mean values, of the MBDS, OS, ADS, PDS and 90DS under 8 major lighting conditions.

FIGS. 20A, B, C, D and Table 10 show that mean WPS (single-pass and/or double-pass) of OS is (1) lower by 7 or less than that (those) of at least one of ADS, PDS and 90DS, and is (2) lower by 7 or more than that (those) of MBDS.

FIGS. 20A, B, C, D and Table 10 show that the STD of WPS (single-pass and/or double-pass) of OS is lower by 0.3 or more than that (those) of at least one of ADS, PDS, 90DS and MBDS.

FIGS. 20A, B, C, D show three or more WPS values of OS when lit by three or more corresponding illuminants selected from the set of CIE F2, CIE F7, CIE F11, CIE A, CIE D65, LED-3000K, LED-4000K and LED-5000K illuminants are (1) lower than (i) by 1.0 or more, and (2) lower than (ii) by 5.0 or more. (i) is three or more WPS values of at least one of ADS, PDS and 90DS, and (ii) is three or more WPS values of MBDS. WPS values in both (i) and (ii) are lit by any illuminant(s) selected from the same set of illuminants of CIE F2, CIE F7, CIE F11, CIE A, CIE D65, LED-3000K, LED-4000K and LED-5000K illuminants.

FIGS. 20A, B, C, D show that the WPS of OS is less than 16 when the illuminant is at least one of CIE F2, CIE F7, CIE F11, CIE A, CIE D65, LED-3000K, LED-4000K and LED-5000K.

FIGS. 20A, B, C, D show the photopic luminous transmittance of OS is at least 50% when lit by at least one illuminant selected from the set of illuminants of CIE F2, CIE F7, CIE F11, CIE A, CIE D65, LED-3000K, LED-4000K and LED-5000K.

FIGS. 20A, B show that mean photopic luminous transmittance of OS is lower by at most 7%, than that of at least one of ADS, PDS and 90DS.

FIGS. 20C, D show that mean scotopic luminous transmittance of OS is higher by at most 7%, than that of at least one of ADS, PDS and 90DS.

FIGS. 20A, B, C, D show that mean luminous transmittance (photopic and/or scotopic) of OS is lower by at least 5%, than that of MBDS.

FIGS. 20A, B, C, D show the set of luminous transmittances (photopic and/or scotopic) of OS, when illuminated by the corresponding illuminants of CIE F2, CIE F7, CIE F11, CIE A, CIE D65, LED-3000K, LED-4000K and LED-5000K, has a range of less than 12%.

FIGS. 20A, B show, within each figure, three or more photopic luminous transmittance values of OS when lit by three or more corresponding illuminants selected from the set of CIE F2, CIE F7, CIE F11, CIE A, CIE D65, LED-3000K, LED-4000K and LED-5000K illuminants are (1) lower than (i) by 7% or less, and (2) lower than (ii) by 7% or more. (i) is three or more luminous transmittance values of at least one of ADS, PDS and 90DS, and (ii) is three or more luminous transmittance values of MBDS. Luminous transmittance values in both (i) and (ii) are lit by any three or more illuminants selected from the same set of illuminants of CIE F2, CIE F7, CIE F11, CIE A, CIE D65, LED-3000K, LED-4000K and LED-5000K.

FIGS. 20C, D show, within each figure, three or more scotopic luminous transmittance values of OS when lit by three or more corresponding illuminants selected from the set of CIE F2, CIE F7, CIE F11, CIE A, CIE D65, LED-3000K, LED-4000K and LED-5000K illuminants are (1) higher than (i) by 7% or less, and (2) lower than (ii) by 3% or more. (i) is three or more luminous transmittance values of at least one of ADS, PDS and 90DS, and (ii) is three or more luminous transmittance values of MBDS. Luminous transmittance values in both (i) and (ii) are lit by any three or more illuminants selected from the same set of illuminants of CIE F2, CIE F7, CIE F11, CIE A, CIE D65, LED-3000K, LED-4000K and LED-5000K.

For single-pass tint and/or double-pass tint, Table 10 shows two or more photopic E values of OS when lit by the corresponding two or more illuminants selected from the set of CIE F2, F11, F7, A, D65, LED-3000K, LED-4000K and LED-5000K illuminants are higher than (i) by at least 0.04, where (i) is the corresponding photopic E values of at least one of ADS, PDS and 90DS when lit by the same illuminants.

For single-pass tint and/or double-pass tint, Table 10 shows two or more scotopic E values of OS when lit by the corresponding two or more illuminants selected from the set of CIE F2, F11, F7, A, D65, LED-3000K, LED-4000K and LED-5000K illuminants are higher than (i) by at least 0.15, where (i) is the corresponding scotopic E values of at least one of ADS, PDS and 90DS when lit by the same illuminants.

Figure 21:
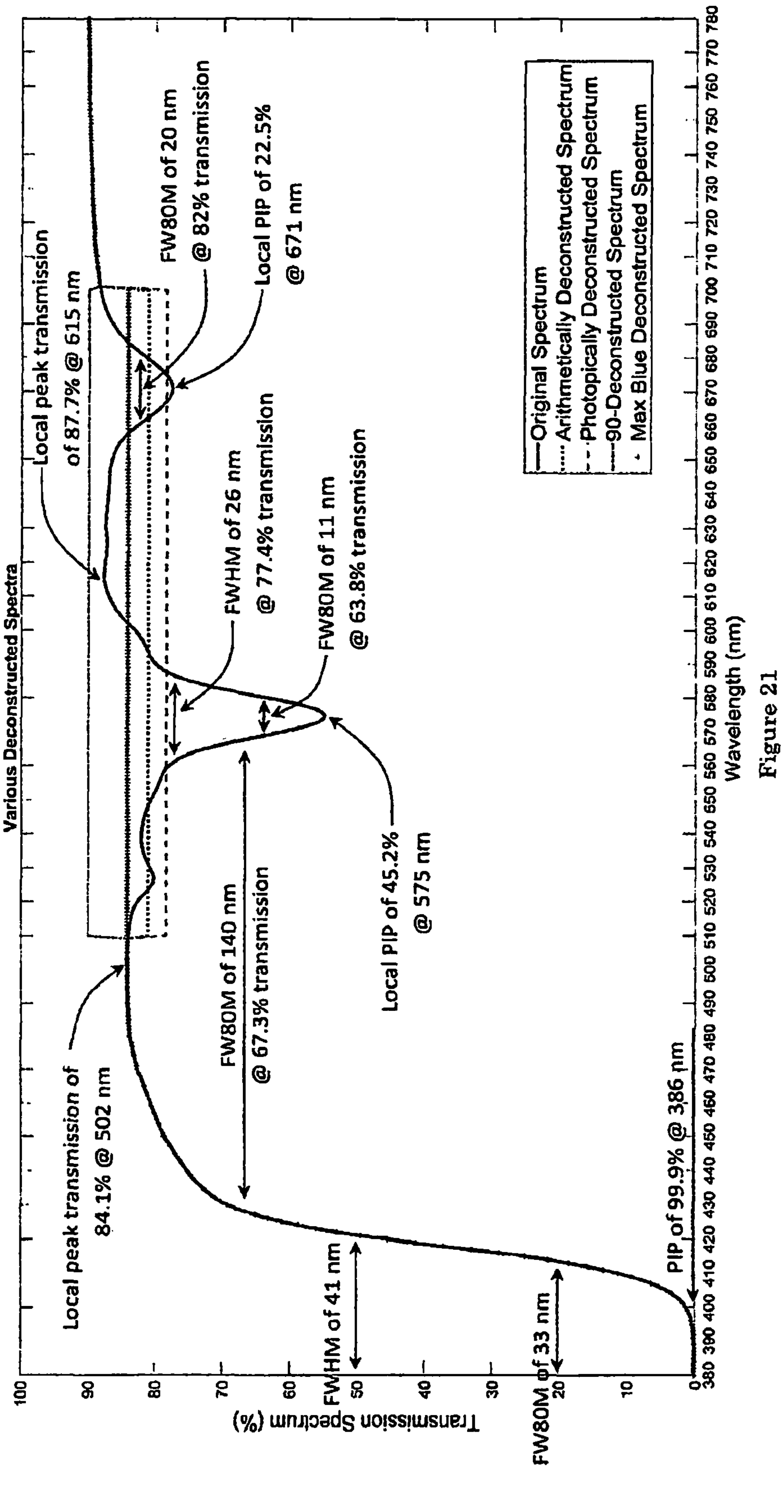
FIG. 21 is a graph including a plot of the Original Spectrum of another SMVF (OD), its ADS, PDS, MBDS and 90DS.

FIG. 21 illustrates the Original Spectrum of another SMVF (OD), its ADS, PDS, MBDS and 90DS. Wavelength A is 510 nm, and Wavelength B is 700 nm. The corresponding Arithmetic Mean is 81% or above 60%, Photopic Mean is 78% or above 60%, and Max Blue Transmission is 84% or above 65%.

There is at least one inhibition peak of OS at 386 nm or between 380 nm and 500 nm inhibits 100% or at least 60% of the incident light. This inhibition band has a FWHM of 41 nm or at least 30 nm. The inhibition band has a FW80M of 33 nm or at least 20 nm.

FIG. 21 shows that the OS has at least 2 inhibition bands and at least 3 pass-bands centered between 460 nm and 700 nm. For at least 2 such inhibition bands, the FW80M of each inhibition band is between 7 nm and 55 nm, and each band is at a transmission level of between 45% and 90%. FWHM of at least 1 such inhibition band is between 15 nm and 100 nm, and is at a transmission level which is at least 5% higher than that for the FW80M of the same inhibition band.

There is at least one inhibition band of OS centered between 530 nm and 600 nm. The PIP of at least one of such inhibition band is 45% or between 15% and 60% with a FW80M of at least 8 nm, and is at least 10 nm shorter than the corresponding FWHM.

There is at least one inhibition band of OS centered between 605 nm and 700 nm. The PIP of at least one of such inhibition band is 23% or between 10% and 40% with a FW80M of at least 10 nm. The transmission level of the FW80M of at least one such inhibition band is at least 3% higher than that of the valley transmission of the inhibition band.

At least one inhibition band centered between 380 nm and 500 nm has a PIP that is at least 20% larger than the largest PIP value of all inhibition band(s) centered between 530 nm and 600 nm, and the latter PIP is at least 5% larger than the largest PIP value of all inhibition band(s) centered between 605 nm and 700 nm.

In FIG. 21, at least one pass-band of OS is centered between 460 nm and 540 nm, with a FW80M of 140 nm or at least 50 nm. The peak transmission of this pass-band is 84% or at least 50%. FW80M of such pass-band is longer, by at least 20 nm, than the FW80M of an adjacent inhibition band. Moreover, if the wavelength of peak transmission of this pass-band is the shortest of those of all other pass-bands, then the peak transmission of this pass-band is lower, by at least 3%, than the peak transmission of at least one other pass-band centered between 570 nm and 780 nm.

One or more pass-bands of OS centered between 570 nm and 670 nm has a peak transmission of 88% or at least 70%, which is at least 5% higher than the valley transmission of at least one immediately adjacent inhibition band. The peak transmission wavelength of one or more of such pass-band is at least 40 nm longer than that of an immediately adjacent pass-band.

One or more pass-bands of OS centered between 675 nm and 780 nm has a peak transmission of at least 70%, whose peak transmission wavelength is at least 30 nm longer than that of an immediately adjacent pass-band.

The lowest valley transmission value of all inhibition band(s) centered between 460 nm and 700 nm is between 10% and 60% lower than the highest peak transmission value of all pass-band(s) centered between 460 nm and 700 nm.

The positive difference between (1) the highest valley transmission value of all inhibition band(s) centered between 460 nm and 700 nm, and (2) the lowest peak transmission value of all pass-band(s) centered between 460 nm and 700 nm, is 3% to 30%.

The largest FW80M value of all pass-bands of OS centered between 380 nm and 780 nm is at least 1.5 times the largest FWHM value of all inhibition bands of OS centered between 380 nm and 780 nm.

FW80M, FWHM and FW10M are less than or equal to 400 nm, because one end-point wavelength is 380 nm or longer, and the other end-point wavelength is 780 nm or shorter.

The Pseudo Width-To-Peak ratios of all inhibition bands of OS centered between 460 nm and 650 nm are 0.82 or more.

At least two dyes are used to construct the inhibition bands centered between 510 nm and 700 nm.

At least one dye and/or thin film is used to construct the inhibition band(s) centered between 380 nm and 500 nm.

For example, for the spectrum in FIG. 21, 3 dyes are dispersed into a 2.5 mm center thickness, 70 mm in diameter, round ophthalmic lens of PC material. The dyed lens is constructed via (1) mix all 3 dyes with PC polymer pellets, and (2) the dyed polymer is then made into shape, e.g. via injection molding. Additional cutting, grinding, polishing, temperature treatments and/or surface treatments may be applied to the OD. Exciton has (1) the ABS 668 dye that will substantially create the inhibition band at around 671 nm, with a dye loading of 0.3 mg to 60 mg per 3 lb of PC polymer, and (2) the ABS 574 dye that will substantially create the inhibition band at around 575 nm, with a dye loading of 0.5 mg to 200 mg per 3 lb of PC material. Crysta-lyn has the DLS 386A dye that will substantially create the inhibition band at around 386 nm, with a dye loading of 5 mg to 400 mg per 3 lb of PC polymer. For the embodiment of FIG. 21, at least one dye is needed to create each of the described inhibition band.

Table 11 shows numerous PIs and CIs of the OD, whose transmission spectrum is illustrated in FIG. 21.

Figure 22A:
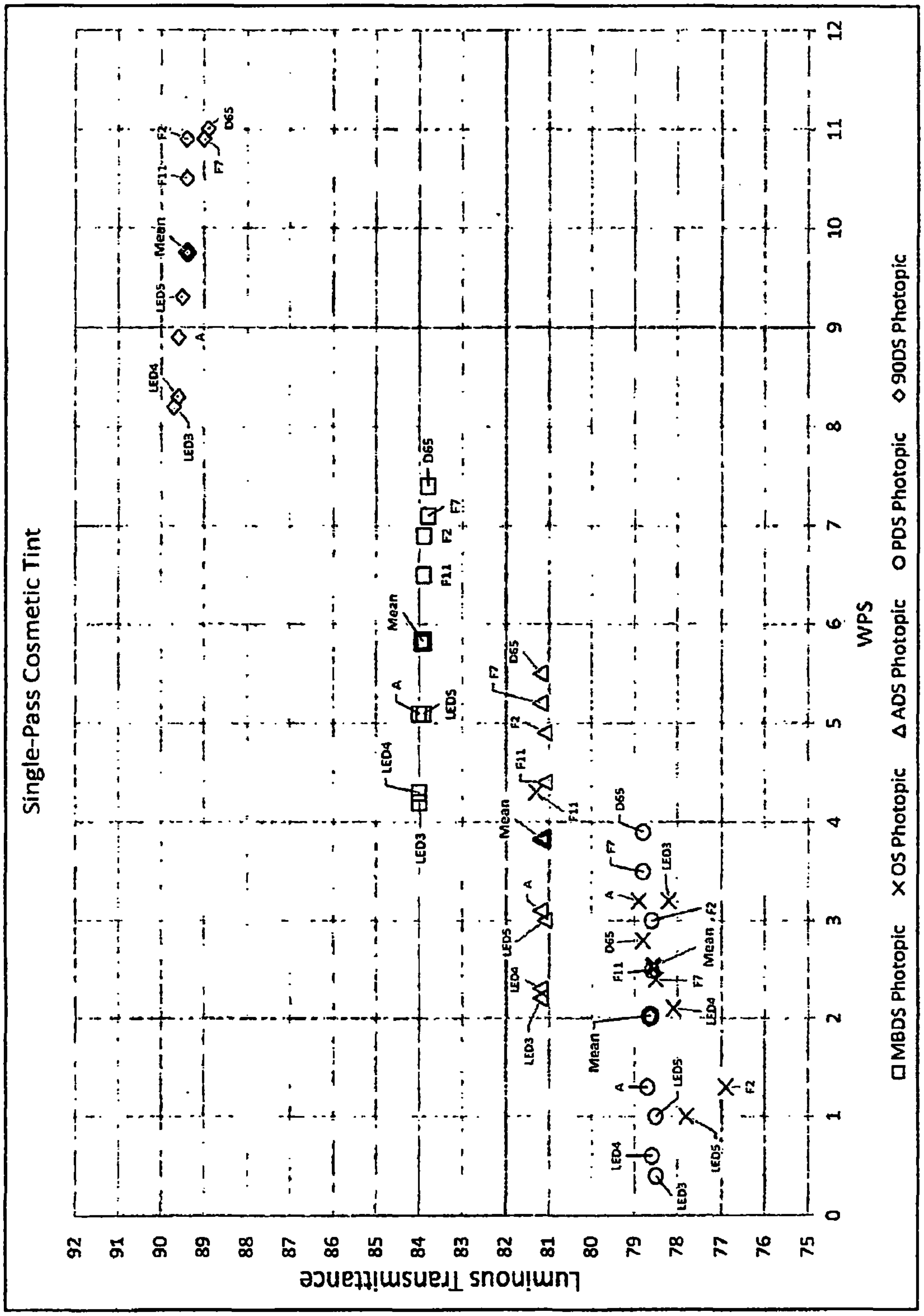
FIG. 22A is a scatter plot the photopic luminous transmittance and single-pass WPS values, including mean values, of the MBDS, OS, ADS, PDS and 90DS of the SPDs of FIG. 21, under 8 major lighting conditions.

FIG. 22A is a scatter plot of the photopic luminous transmittance and single-pass WPS values, including mean values, of the MBDS, OS, ADS, PDS and 90DS under 8 major lighting conditions.

Figure 22B:
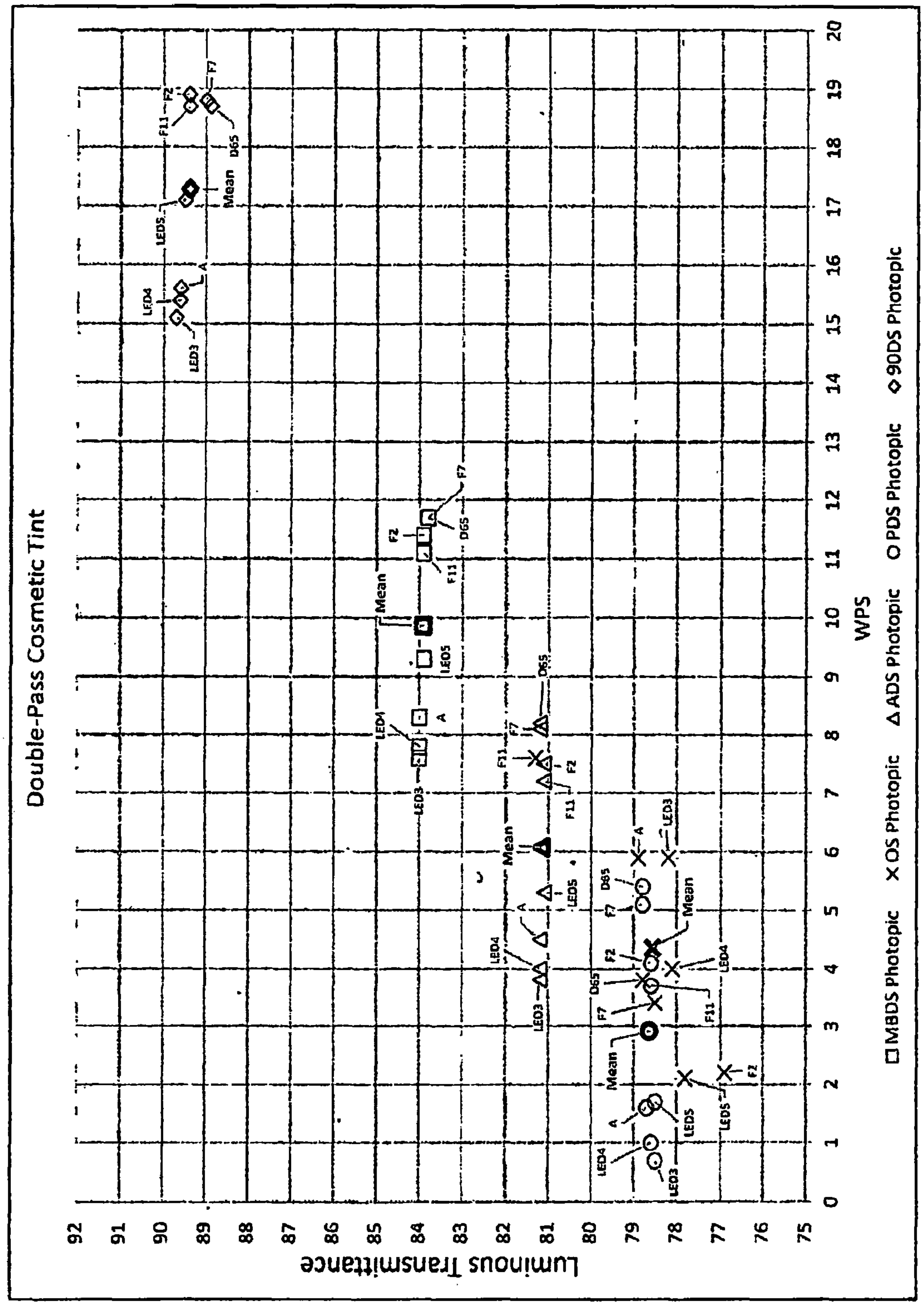
FIG. 22B is a scatter plot the photopic luminous transmittance and double-pass WPS values, including mean values, of the MBDS, OS, ADS, PDS and 90DS of the SPDs of FIG. 21, under 8 major lighting conditions.

FIG. 22B is a scatter plot of the photopic luminous transmittance and double-pass WPS values, including mean values, of the MBDS, OS, ADS, PDS and 90DS under 8 major lighting conditions.

Figure 22C:
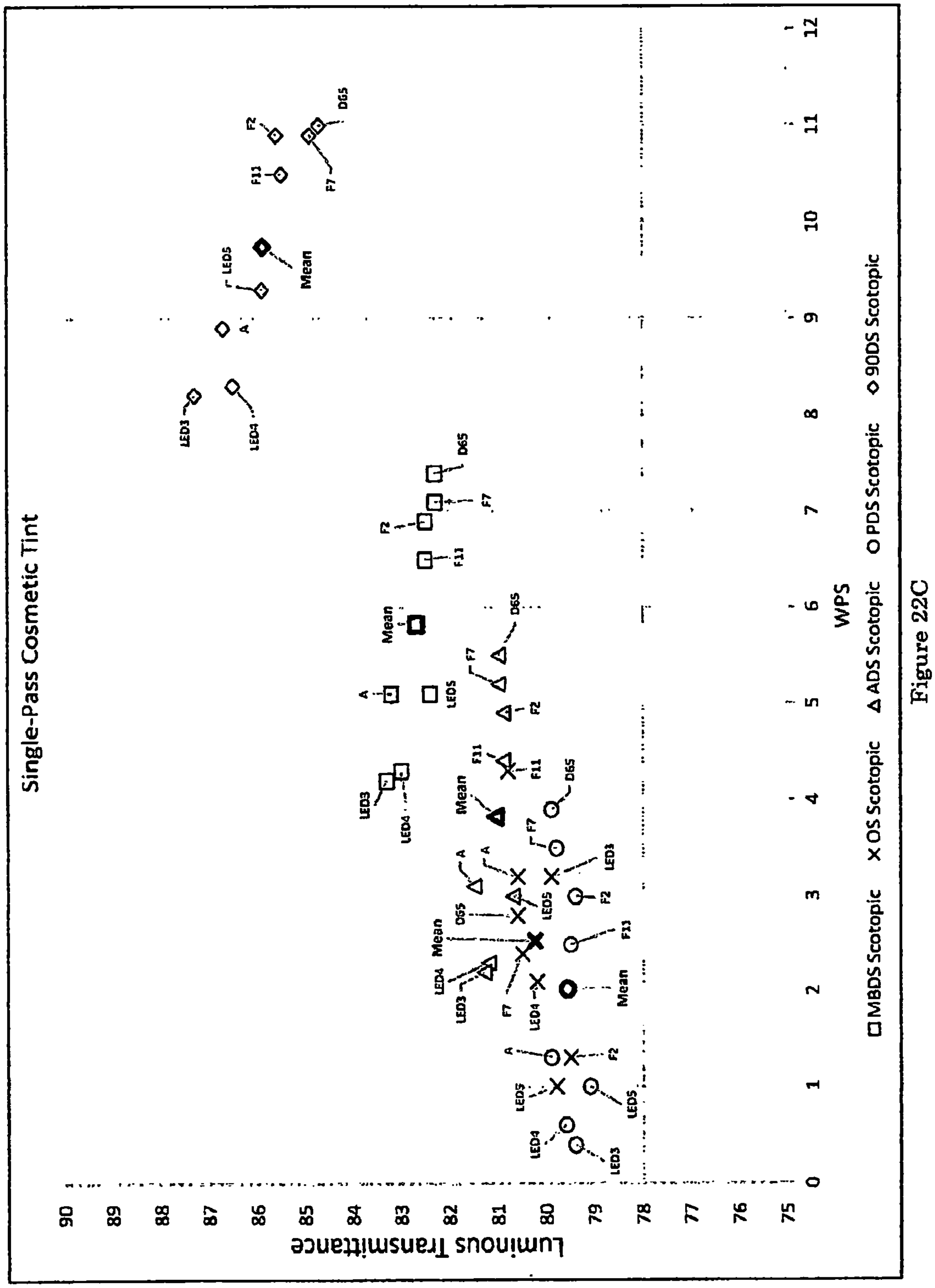
FIG. 22C is a scatter plot of the scotopic luminous transmittance and single-pass WPS values, including mean values, of the MBDS, OS, ADS, PDS and 90DS of the SPDs of FIG. 21, under 8 major lighting conditions.

FIG. 22C is a scatter plot of the scotopic luminous transmittance and single-pass WPS values, including mean values, of the MBDS, OS, ADS, PDS and 90DS under 8 major lighting conditions.

Figure 22D:
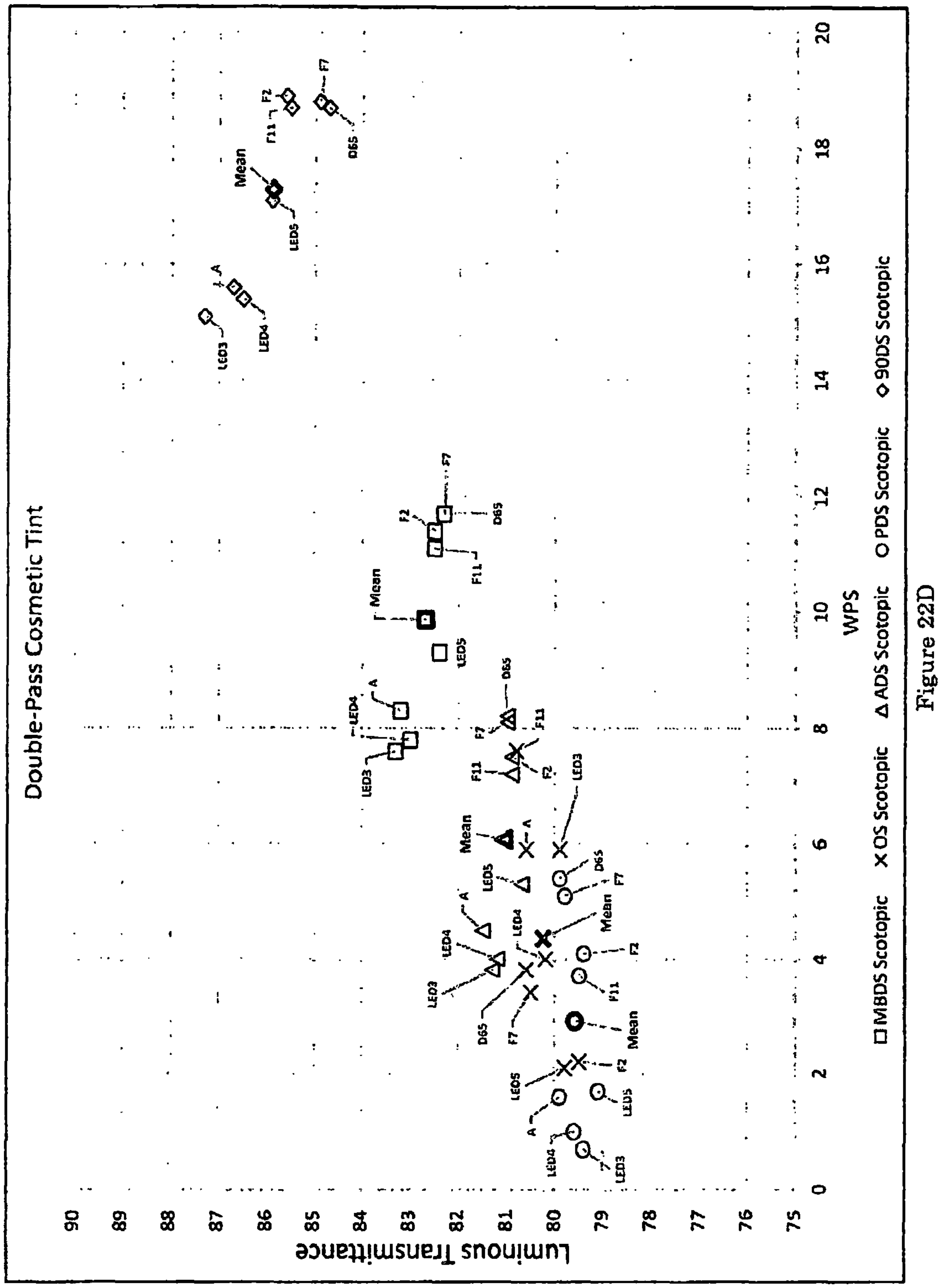
FIG. 22D is a scatter plot of the scotopic luminous transmittance and double-pass WPS values, including mean values, of the MBDS, OS, ADS, PDS and 90DS of the SPDs of FIG. 21, under 8 major lighting conditions.

FIG. 22D is a scatter plot of the scotopic luminous transmittance and double-pass WPS values, including mean values, of the MBDS, OS, ADS, PDS and 90DS under 8 major lighting conditions.

FIGS. 22A, B, C, D and Table 11 show that mean WPS (single-pass and/or double-pass) of OS is (1) lower by 7 or less than that (those) of at least one of ADS, PDS and 90DS, and is (2) lower by 5 or more than that (those) of MBDS.

FIGS. 22A, B, C, D and Table 11 show that the STD of WPS (single-pass and/or double-pass) of OS is within 0.5 or less than that (those) of at least one of ADS, PDS, 90DS and MBDS.

FIGS. 22A, B, C, D show two or more WPS values of OS when lit by two or more corresponding illuminants selected from the set of CIE F2, CIE F7, CIE F11, CIE A, CIE D65, LED-3000K, LED-4000K and LED-5000K illuminants are (1) lower than (i) by 1.0 or more, and (2) lower than (ii) by 4.0 or more. (i) is two or more WPS values of at least one of ADS, PDS and 90DS, and (ii) is two or more WPS values of MBDS. WPS values in both (i) and (ii) are lit by any illuminant(s) selected from the same set of illuminants of CIE F2, CIE F7, CIE F11, CIE A, CIE D65, LED-3000K, LED-4000K and LED-5000K illuminants.

FIGS. 22A, B, C, D show that the WPS of OS is less than 10 when the illuminant is at least one of CIE F2, CIE F7, CIE F11, CIE A, CIE D65, LED-3000K, LED-4000K and LED-5000K.

FIGS. 22A, B, C, D show the photopic luminous transmittance of OS is at least 70% when lit by at least one illuminant selected from the set of illuminants of CIE F2, CIE F7, CIE F11, CIE A, CIE D65, LED-3000K, LED-4000K and LED-5000K.

FIGS. 22A, B show that mean photopic luminous transmittance of OS is lower by (1) at most 7% than that of at least one of ADS, PDS and 90DS, and (2) at most 12% than that of MBDS.

FIGS. 22C, D show that mean scotopic luminous transmittance of OS is lower by (1) at most 7% than that of at least one of ADS, PDS and 90DS, and (2) at most 12% than that of MBDS.

FIGS. 22A, B, C, D show, within each figure, the set of luminous transmittances of OS when illuminated by the corresponding illuminants of CIE F2, CIE F7, CIE F11, CIE A, CIE D65, LED-3000K, LED-4000K and LED-5000K, has a range of less than 10%.

FIGS. 22A, B show within each figure, two or more photopic luminous transmittance values of OS when lit by two or more corresponding illuminants selected from the set of CIE F2, CIE F7, CIE F11, CIE A, CIE D65, LED-3000K, LED-4000K and LED-5000K illuminants are (1) lower than (i) by 5% or less, and (2) lower than (ii) by 5% or more. (i) is two or more luminous transmittance values of at least one of ADS, PDS and 90DS, and (ii) is two or more luminous transmittance values of MBDS. Luminous transmittance values in both (i) and (ii) are lit by any two or more illuminants selected from the same set of illuminants of CIE F2, CIE F7, CIE F11, CIE A, CIE D65, LED-3000K, LED-4000K and LED-5000K.

FIGS. 22C, D show within each figure, two or more scotopic luminous transmittance values of OS when lit by two or more corresponding illuminants selected from the set of CIE F2, CIE F7, CIE F11, CIE A, CIE D65, LED-3000K, LED-4000K and LED-5000K illuminants are (1) higher than (i) by 5% or less, and (2) lower than (ii) by 2% or more. (i) is two or more luminous transmittance values of at least one of ADS, PDS and 90DS, and (ii) is two or more luminous transmittance values of MBDS. Luminous transmittance values in both (i) and (ii) are lit by any two or more illuminants selected from the same set of illuminants of CIE F2, CIE F7, CIE F11, CIE A, CIE D65, LED-3000K, LED-4000K and LED-5000K.

For single-pass tint and/or double-pass tint, Table 11 shows two or more photopic E values of OS when lit by the corresponding two or more illuminants selected from the set of CIE F2, F11, F7, A, D65, LED-3000K, LED-4000K and LED-5000K illuminants is higher than (i) by at least 0.06, where (i) is the corresponding photopic E values of at least one of ADS, PDS and 90DS when lit by the same illuminants.

For single-pass tint and/or double-pass tint, Table 11 shows two or more scotopic E values of OS when lit by the corresponding two or more illuminants selected from the set of CIE F2, F11, F7, A, D65, LED-3000K, LED-4000K and LED-5000K illuminants is higher than (i) by at least 0.2, where (i) is the corresponding scotopic E values of at least one of ADS, PDS and 90DS when lit by the same illuminants.

Figure 23:
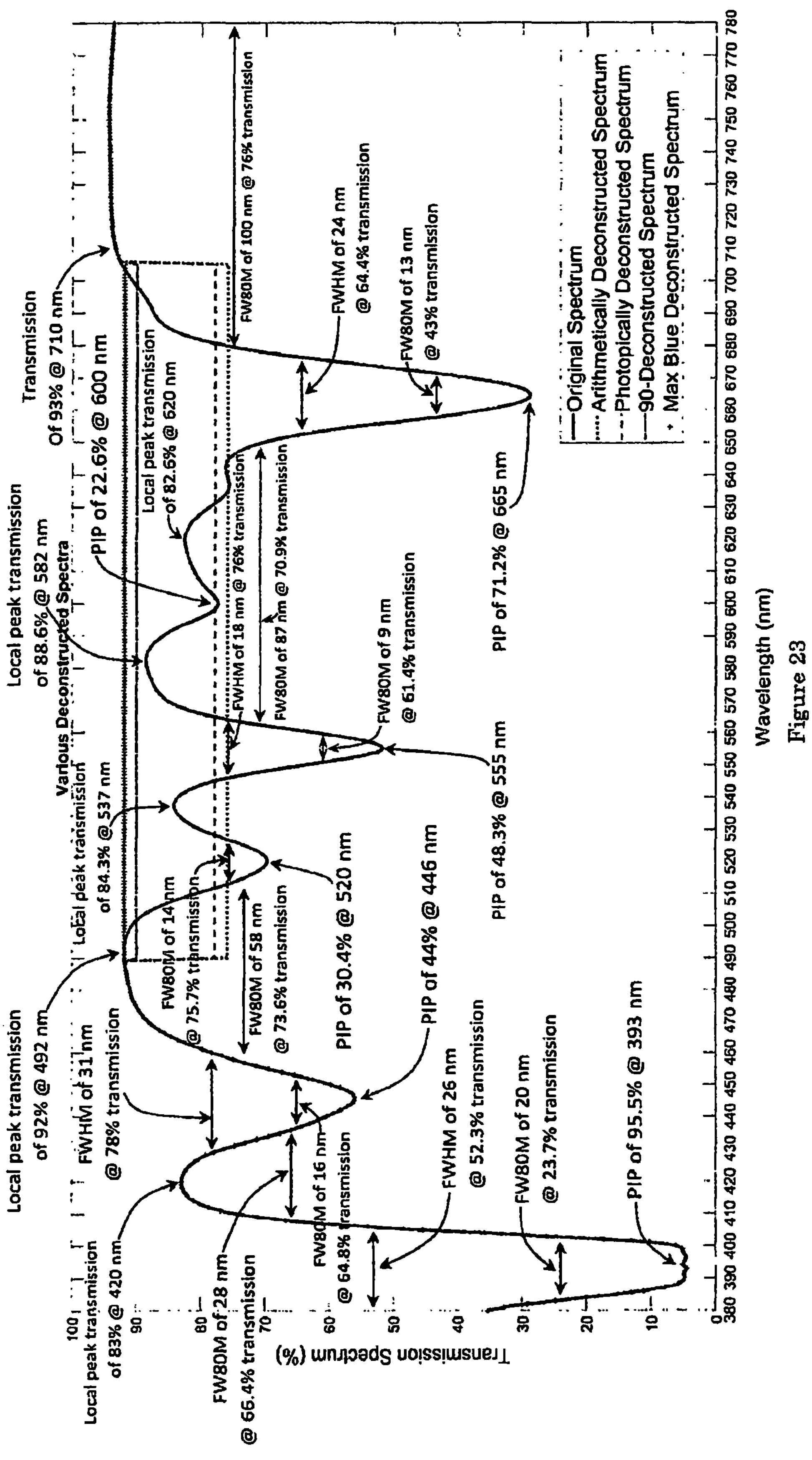
FIG. 23 is a graph including a plot of the Original Spectrum of another SMVF (OD), its ADS, PDS, MBDS and 90DS.

FIG. 23 illustrates the Original Spectrum of another SMVF (OD), its ADS, PDS, MBDS and 90DS. Wavelength A is 490 nm, and Wavelength B is 705 nm. The corresponding Arithmetic Mean is 76% or above 70%, Photopic Mean is 78% or above 70%, and Max Blue Transmission is 92.5% or above 70%.

As seen in FIG. 23, there are at least two inhibition bands and at least one pass-band centered between 380 nm and 485 nm that inhibit and transmit the OS, respectively. For example: (1) an inhibition peak at 393 nm or between 380 nm and 430 nm inhibits 96% of the incident light, i.e. a PIP of 96%, or at least 60%; the inhibition band has a FWHM of 26 nm or at least 15 nm, and has a FW80M of 20 nm or at least 10 nm, (2) a inhibition band centered at 446 nm or between 431 nm and 485 nm has a PIP of 44% or at most 70%; the inhibition band has a FWHM of 31 nm or at least 15 nm, and has a FW80M of 16 nm or at least 10 nm, and (3) a pass-band centered at 420 nm or between 405 nm and 440 nm with a peak transmission of 83% or at least 20%, and has a FW80M of 28 nm or at least 15 nm.

FIG. 23 shows that the Original Spectrum of an OD has (1) 4 inhibition bands or at least 2 inhibition bands centered between 485 nm and 780 nm, (2) 5 pass-bands or at least 3 pass-bands centered between 485 nm and 780 nm, and (3) 3 inhibition bands or at least 2 inhibition bands centered between 500 nm and 650 nm. Furthermore, if there is any inhibition band of OS centered between:

(i) 510 nm and 530 nm, then band has a PIP of 30% or at most 50%, and
(ii) 545 nm and 565 nm, then band has a PIP of 48% or at most 60%, and
(iii) 590 nm and 610 nm, then band has a PIP of 23% or at most 50%, and
(iv) 640 nm and 700 nm, then band has a PIP of 71% or at most 85%.

Moreover, if there is any pass-band of OS centered between:

(i) 485 nm and 510 nm, then band has a peak transmission of 92% or at least 60%, and
(ii) 530 nm and 545 nm, then band has a peak transmission of 84% or at least 60%, and
(iii) 565 nm and 590 nm, then band has a peak transmission of 89% or at least 60%, and
(iv) 610 nm and 640 nm, then band has a peak transmission of 83% or at least 50%, and
(v) 700 nm and 780 nm, then band has a peak transmission of 93% or at least 50%.

For at least two inhibition bands of OS, the FW80M of each inhibition band is between 7 nm and 50 nm, and each band has a PIP of between 10% and 70%.

There is at least one inhibition band of OS with a FW80M of at least 8 nm, the FW80M is at least 8 nm shorter than the corresponding FWHM of the same inhibition band, and the transmission level corresponding to the FW80M is at least 4% higher than that of the valley transmission of the same inhibition band.

At least one inhibition band centered between 600 nm and 700 nm has a PIP that is at least 5% larger than the PIP of any other inhibition band centered between 500 nm and 600 nm.

In the OS, for any pass-band(s) centered between 485 nm and 780 nm, (1) at least one pass-band has a FW80M of between 40 nm and 75 nm, (2) at least one pass-band has a FW80M of between 75 nm and 140 nm, and (3) at least two pass-bands have the transmission levels of their FW80Ms be within 20% of each other, e.g. 70.9% and 76% transmission as marked in FIG. 23.

For the OS, one or more pass-bands centered between 485 nm and 780 nm has a peak transmission of at least 70%, whose wavelength of peak transmission is at least 20 nm longer than that of an immediately adjacent inhibition band.

For the OS between 380 nm and 780 nm, the number of pass-bands satisfying (i) is larger than 2N/3, where N is the number of inhibition bands in the OS. (i) is a pass-band with its peak transmission larger, by between 5% and 30%, than the valley transmission of one or more of the pass-band's immediately adjacent inhibition band.

Between 500 nm and 780 nm, where N is the number of inhibition bands in the OS, there are at least (1) N/2 number of dyes used to produce the OS, if N is even, or (2) (N+1)/2 number of dyes used to produce the OS, if N is odd.

For example, for the spectrum in FIG. 23, 3 dyes are dispersed into a 2.5 mm center thickness, 62 mm in diameter, round ophthalmic lens of CR39 or another similar allyl diglycol carbonate (ADC) material. The dyed lens is constructed via (1) mix all 3 dyes with ADC monomer, and (2) the monomer is then polymerized using a dye-suitable initiator, such as 1,1-Bis(tert-butylperoxy)cyclohexane (a peroxyketal) or tert-butyl peroxy 2-ethylhexyl carbonate (a peroxyester). Additional cutting, grinding, polishing, temperature treatments and/or surface treatments may be applied to the OD. Dye mixing with ADC monomer may be aided by mixing the dye(s) with an organic solvent, such as methanol, prior to or during mixing with monomer. Exciton has (1) the ABS 668 dye that will substantially create the inhibition band at around 665 nm and another inhibition band at around 600 nm, with a dye loading of 0.5 mg to 100 mg per 3 lb of ADC monomer, (2) the ABS 556 dye that will substantially create the inhibition band at around 555 nm, another inhibition band at around 520 nm and a third inhibition band at around 393 nm, with a dye loading of 0.5 mg to 200 mg per 3 lb of ADC material, and (3) the ABS 439 dye that will substantially create the inhibition band at around 446 nm, with a dye loading of 0.5 mg to 100 mg per 3 lb of ADC monomer. Epolin has the Epolight 5852 dye that can also substantially create the inhibition band at around 446 nm, with a dye loading of 0.5 mg to 100 mg per 3 lb of ADC monomer.

Table 12 shows numerous PIs and CIs of the OD, whose transmission spectrum is illustrated in FIG. 23.

Figure 24A:
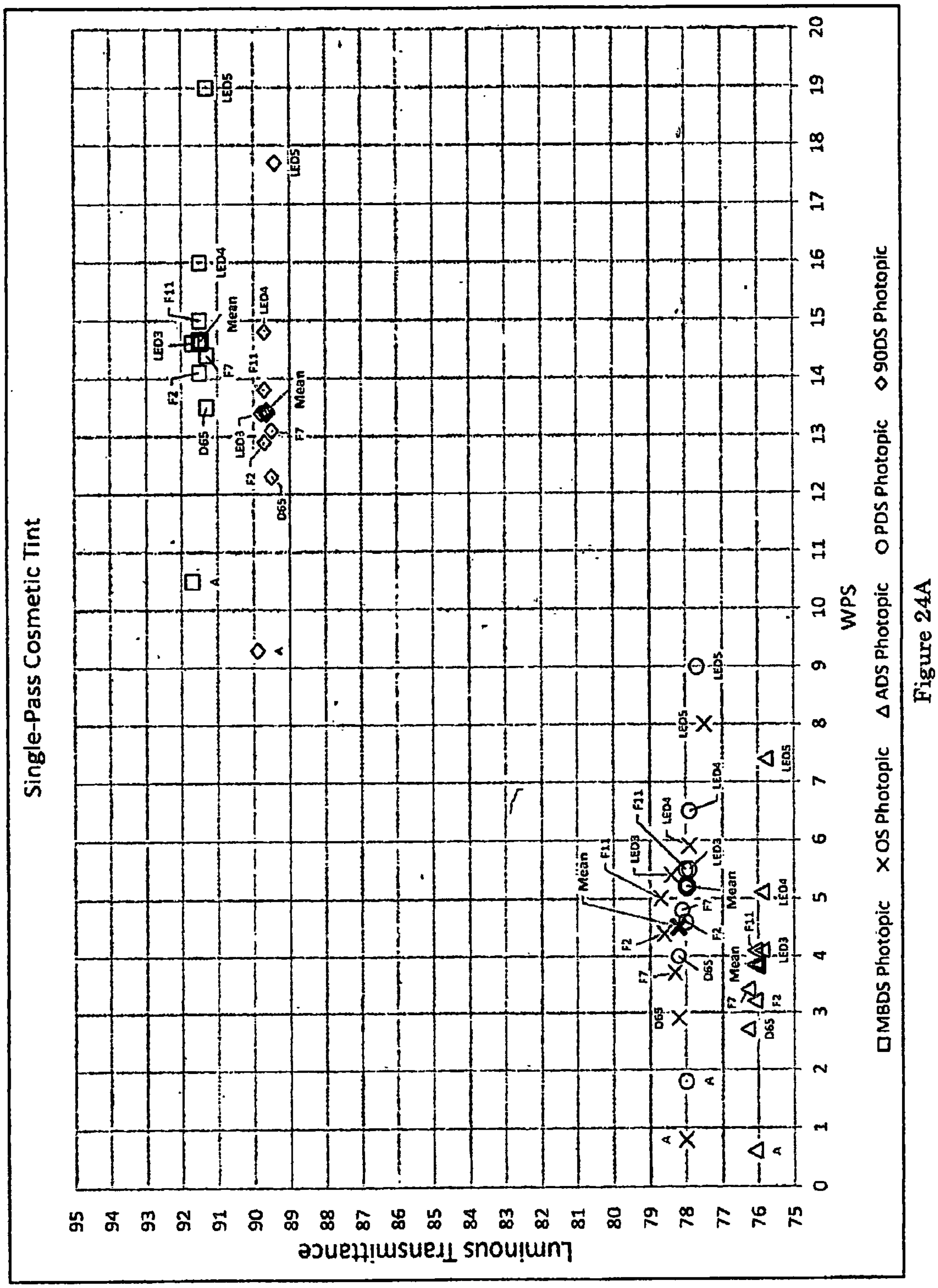
FIG. 24A is a scatter plot of the photopic luminous transmittance and single-pass WPS values, including mean values, of the MBDS, OS, ADS, PDS and 90DS of the SPDs of FIG. 23, under 8 major lighting conditions.

FIG. 24A is a scatter plot of the photopic luminous transmittance and single-pass WPS values, including mean values, of the MBDS, OS, ADS, PDS and 90DS under 8 major lighting conditions.

Figure 24B:
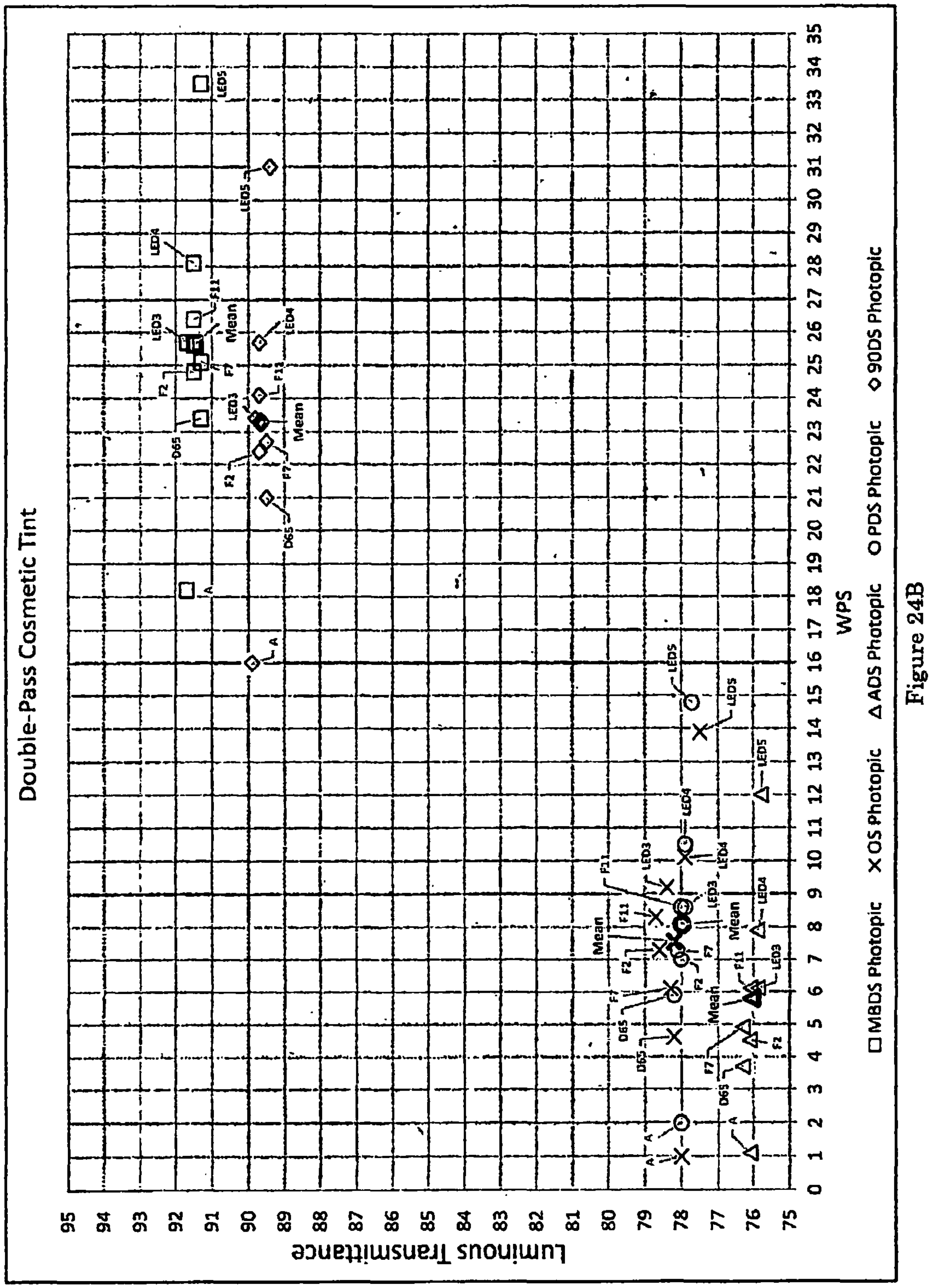
FIG. 24B is a scatter plot of the photopic luminous transmittance and double-pass WPS values, including mean values, of the MBDS, OS, ADS, PDS and 90DS of the SPDs of FIG. 23, under 8 major lighting conditions.

FIG. 24B is a scatter plot of the photopic luminous transmittance and double-pass WPS values, including mean values, of the MBDS, OS, ADS, PDS and 90DS under 8 major lighting conditions.

Figure 24C:
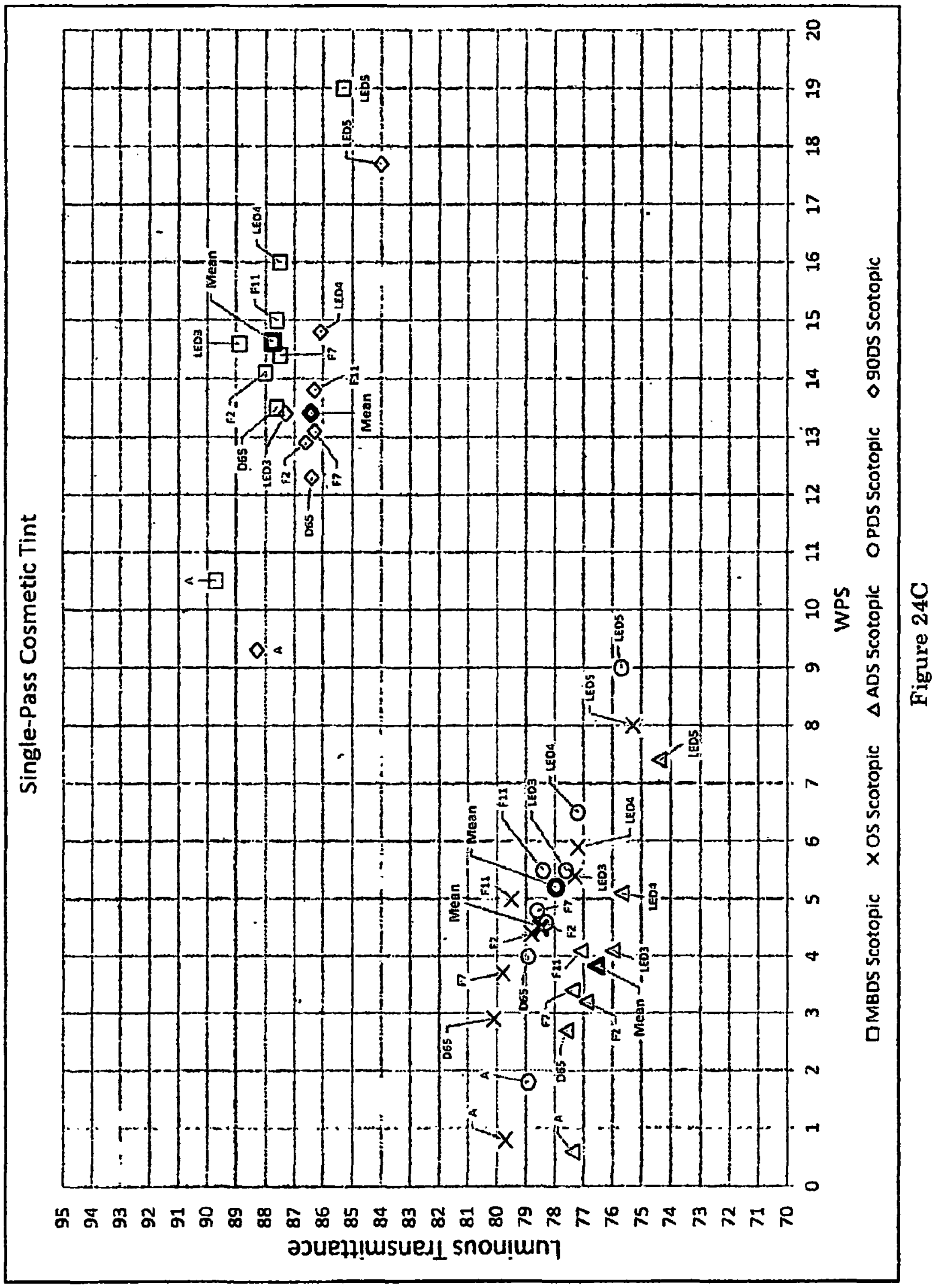
FIG. 24C is a scatter plot of the scotopic luminous transmittance and single-pass WPS values, including mean values, of the MBDS, OS, ADS, PDS and 90DS of the SPDs of FIG. 23, under 8 major lighting conditions.

FIG. 24C is a scatter plot of the scotopic luminous transmittance and single-pass WPS values, including mean values, of the MBDS, OS, ADS, PDS and 90DS under 8 major lighting conditions.

Figure 24D:
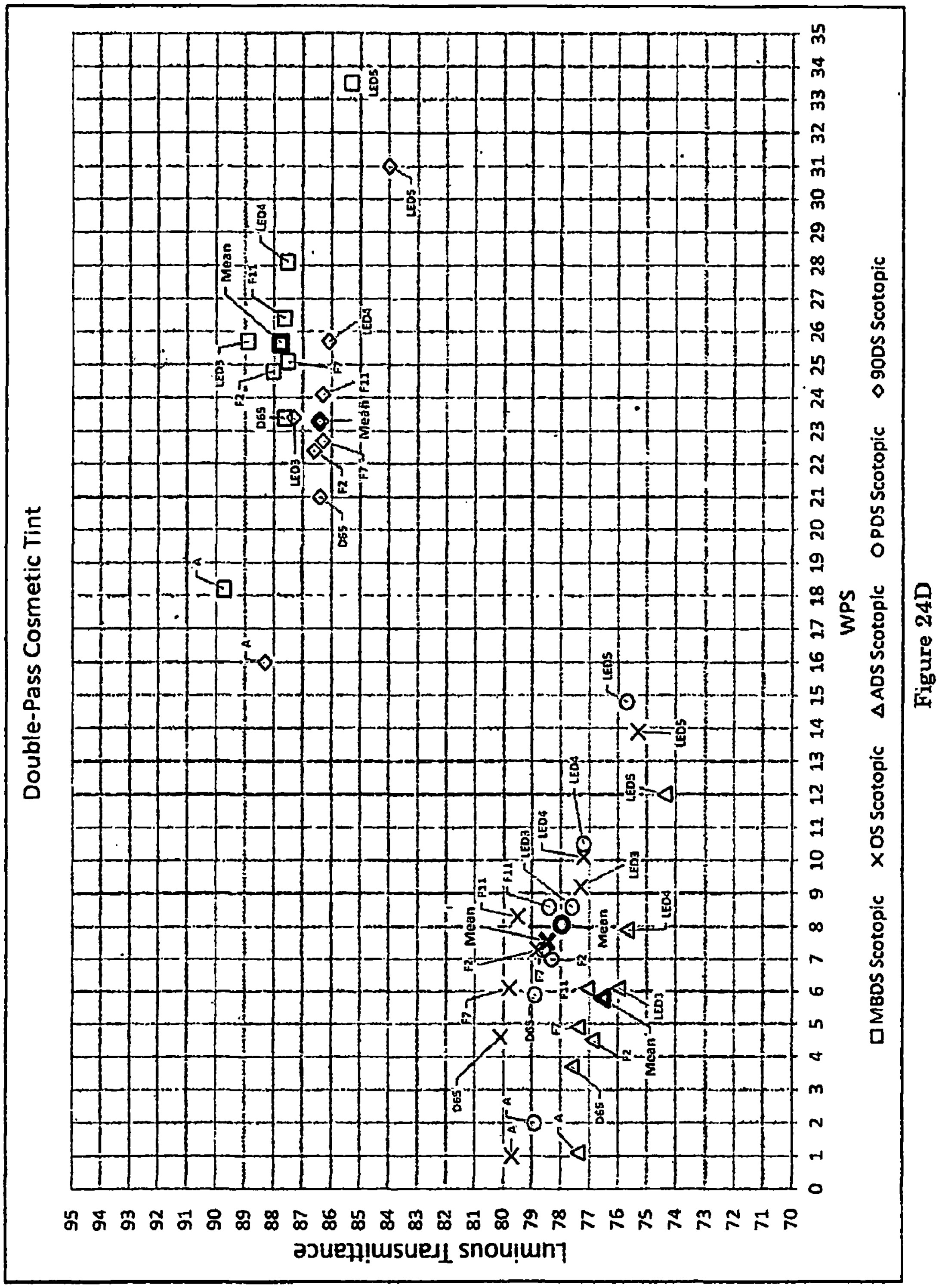
FIG. 24D is a scatter plot of the scotopic luminous transmittance and double-pass WPS values, including mean values, of the MBDS, OS, ADS, PDS and 90DS of the SPDs of FIG. 23, under 8 major lighting conditions.

FIG. 24D is a scatter plot of the scotopic luminous transmittance and double-pass WPS values, including mean values, of the MBDS, OS, ADS, PDS and 90DS under 8 major lighting conditions.

FIGS. 24A, B, C, D and Table 12 show that mean WPS (single-pass and/or double-pass) of OS is (1) lower by 7 or less than that (those) of at least one of ADS and PDS, and is (2) lower by 7 or more than that of at least one of MBDS and 90DS.

FIGS. 24A, B, C, D show two or more WPS values of OS when lit by two or more corresponding illuminants selected from the set of CIE F2, CIE F7, CIE F11, CIE A, CIE D65, LED-3000K, LED-4000K and LED-5000K illuminants are (1) lower than (i) by 1.0 or more, and (2) lower than (ii) by 5.0 or more. (i) is two or more WPS values of at least one of ADS and PDS, and (ii) is two or more WPS values of at least one of MBDS and 90DS. WPS values in both (i) and (ii) are lit by any illuminant(s) selected from the same set of illuminants of CIE F2, CIE F7, CIE F11, CIE A, CIE D65, LED-3000K, LED-4000K and LED-5000K illuminants. As is in other embodiments, this type of lighting description requires only that the lighting condition(s) for OS, ADS, PDS, 90DS and MBDS be selected from the same set of lighting conditions, but does not require the actual chosen lighting conditions be the same from one spectrum to another, e.g. from OS to ADS.

FIGS. 24A, B show, within each figure, that at least two WPSs of OS are each less than 10 when the corresponding illuminants are at least two of (i.e. two selections from the set of) CIE F2, CIE F7, CIE F11, CIE A, CIE D65, LED-3000K, LED-4000K and LED-5000K.

FIGS. 24A, B show, within each figure, at least two photopic luminous transmittances of OS are each at least 75% when lit by at least two corresponding illuminants selected from the set of illuminants of CIE F2, CIE F7, CIE F11, CIE A, CIE D65, LED-3000K, LED-4000K and LED-5000K.

FIGS. 24C, D show, within each figure, at least two scotopic luminous transmittances of OS are each at least 75% when lit by at least two corresponding illuminants selected from the set of illuminants of CIE F2, CIE F7, CIE F11, CIE A, CIE D65, LED-3000K, LED-4000K and LED-5000K.

FIGS. 24A, B, C, D show that mean photopic and/or scotopic luminous transmittance of OS is (1) lower by at least 3% than that (those) of at least one of 90DS and MBDS, and (2) higher by at most 7%, than that (those) of at least one of ADS and PDS.

FIGS. 24A, B, C, D show that mean luminous transmittance (photopic and/or scotopic) of OS is lower by at most 17% than that of MBDS.

FIGS. 24A, B, C, D show the set of luminous transmittances (photopic and/or scotopic) of OS, when illuminated by the corresponding illuminants of CIE F2, CIE F7, CIE F11, CIE A, CIE D65, LED-3000K, LED-4000K and LED-5000K, has a range of less than 10%.

FIGS. 24A, B show within each figure, two or more photopic luminous transmittance values of OS when lit by two or more corresponding illuminants selected from the set of CIE F2, CIE F7, CIE F11, CIE A, CIE D65, LED-3000K, LED-4000K and LED-5000K illuminants are (1) higher than (i) by 7% or less, and (2) lower than (ii) by 3% or more. (i) is two or more luminous transmittance values of at least one of ADS and PDS, and (ii) is two or more luminous transmittance values of at least one of MBDS and 90DS. Luminous transmittance values in both (i) and (ii) are lit by any two or more illuminants selected from the same set of illuminants of CIE F2, CIE F7, CIE F11, CIE A, CIE D65, LED-3000K, LED-4000K and LED-5000K.

FIGS. 24C, D show within each figure, two or more scotopic luminous transmittance values of OS when lit by two or more corresponding illuminants selected from the set of CIE F2, CIE F7, CIE F11, CIE A, CIE D65, LED-3000K, LED-4000K and LED-5000K illuminants are (1) higher than (i) by 7% or less, and (2) lower than (ii) by 3% or more. (i) is two or more luminous transmittance values of at least one of ADS and PDS, and (ii) is two or more luminous transmittance values of at least one of MBDS and 90DS. Luminous transmittance values in both (i) and (ii) are lit by any two or more illuminants selected from the same set of illuminants of CIE F2, CIE F7, CIE F11, CIE A, CIE D65, LED-3000K, LED-4000K and LED-5000K.

For single-pass tint and/or double-pass tint, Table 12 shows three or more photopic E values of OS when lit by the corresponding three or more illuminants selected from the set of CIE F2, F11, F7, A, D65, LED-3000K, LED-4000K and LED-5000K illuminants is higher than (i) by at least 0.06, where (i) is the corresponding photopic E values of at least one of ADS, PDS and 90DS when lit by the same illuminants.

For single-pass tint and/or double-pass tint, Table 12 shows three or more scotopic E values of OS when lit by the corresponding three or more illuminants selected from the set of CIE F2, F11, F7, A, D65, LED-3000K, LED-4000K and LED-5000K illuminants is higher than (i) by at least 0.1, where (i) is the corresponding scotopic E values of at least one of ADS, PDS and 90DS when lit by the same illuminants.

Figure 25:
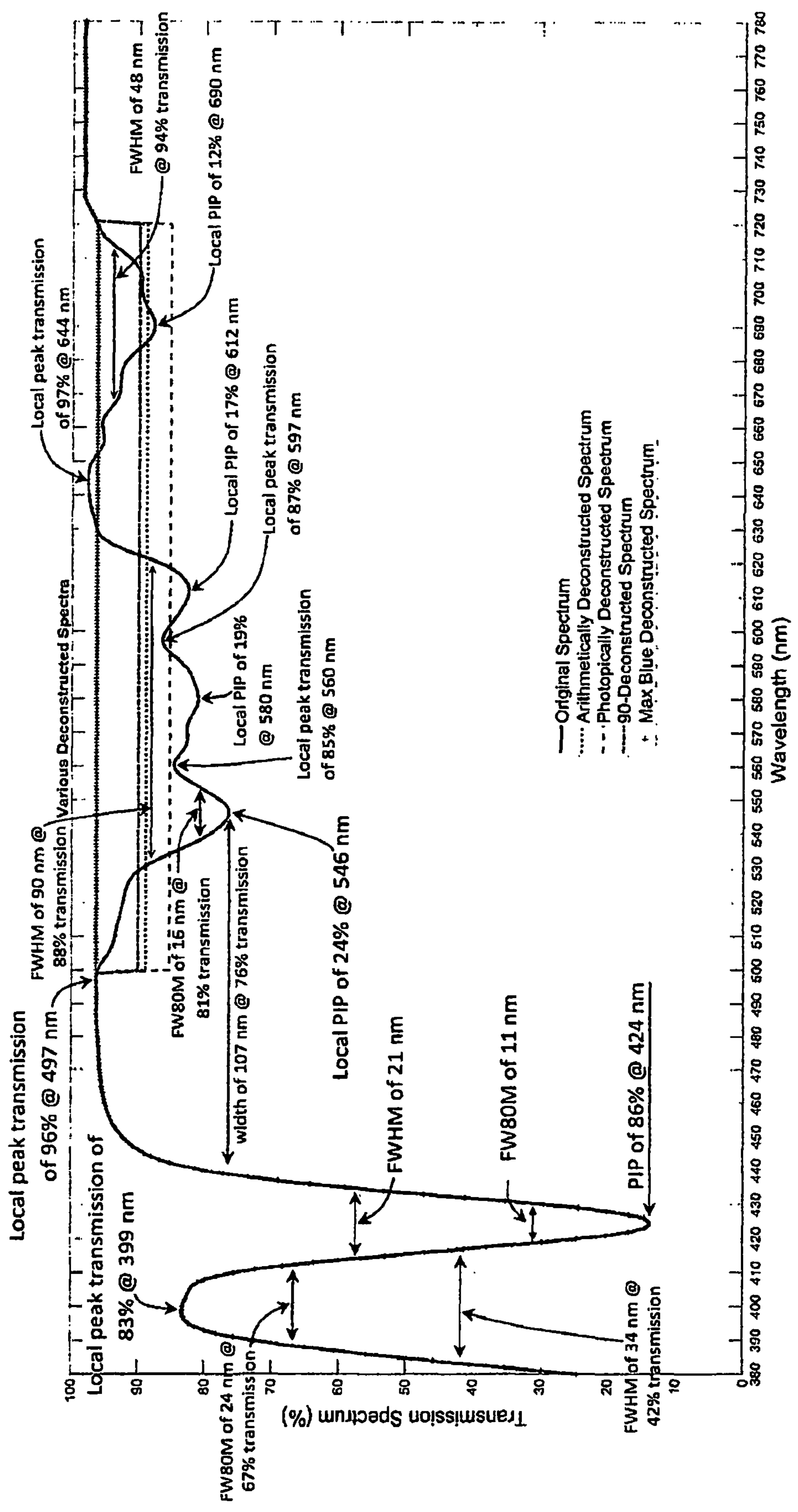
FIG. 25 is a graph including a plot of the Original Spectrum of another SMVF (OD), its ADS, PDS, MBDS and 90DS.

FIG. 25 illustrates the Original Spectrum of another SMVF (OD), its ADS, PDS, MBDS and 90DS. Wavelength A is 500 nm, and Wavelength B is 720 nm. The corresponding Arithmetic Mean is 89%, Photopic Mean is 85% and Max Blue Transmission is 96%

As seen in FIG. 25, there is one inhibition peak at 424 nm that, inhibits 86% the incident light; the inhibition band has a FWHM of 21 nm, and has a FW80M of 11 nm, and (2) one pass-band centered at 399 nm, has a peak transmission of 83%, with a FW80M of 24 nm, and a FWHM of 34 nm The OD having the OS shown in FIG. 25 is representative of a class of embodiments that have an Arithmetic Mean above 70%, Photopic Mean above 70%, and Max Blue Transmission above 70%, at least one inhibition band and one pass-band centered between 380 nm and 500 nm that inhibit and transmit the spectrum, respectively. For example: (1) at least one inhibition peak between 380 nm and 500 nm that inhibits at least 50% of the incident light has a FWHM of at least 15 nm, and has a FW80M of at least 8 nm, and (2) at least one pass-band centered between 380 nm and 440 nm, has a peak transmission of at least 20%, with a FW80M of at least 8 nm, and a FWHM of at least 15 nm.

FIG. 25 shows that the OS has (1) 4 inhibition bands or at least 2 inhibition bands centered between 501 nm and 720 nm, (2) 5 pass-bands or at least 3 pass-bands centered between 460 nm and 720 nm, and (3) 3 inhibition bands or at least 1 inhibition band centered between 520 nm and 620 nm. For at least 2 such inhibition bands, the FWHM of each inhibition band is between 20 nm and 120 nm, and each of such band has a PIP of between 5% and 40%.

Furthermore, if there is any inhibition band of OS centered between:

(i) 520 nm and 550 nm, then band has a PIP of 24% or at most 50%, and (ii) 570 nm and 590 nm, then band has a PIP of 19% or at most 50%, and (iii) 600 nm and 625 nm, then band has a PIP of 17% or at most 50%, and (iv) 660 nm and 710 nm, then band has a PIP of 12% or at most 50%.

Moreover, if there is any pass-band of OS centered between:

(i) 485 nm and 520 nm, then its peak transmission is at least 60%, and (ii) 550 nm and 570 nm, then its peak transmission is at least 60%, and (iii) 590 nm and 610 nm, then its peak transmission is at least 60%, and (iv) 625 nm and 660 nm, then its peak transmission is at least 60%, and (v) 710 nm and 780 nm, then its peak transmission is at least 25%.

In the OS, there is at least one inhibition band centered between 501 nm and 720 nm with a FW80M of at least 8 nm, with the FW80M being at least 10 nm shorter than the corresponding FWHM of the same inhibition band, and the transmission level corresponding to FW80M is at least 5% lower than that corresponding to FWHM of the inhibition band.

In the OS, the lowest valley transmission of all inhibition band(s) centered between 380 nm and 500 nm is at least 30% lower than the lowest valley transmission of all inhibition band(s) centered between 501 nm and 620 nm.

In the OS between 500 nm and 630 nm, there exists (1) a inhibition band centered closest to 500 nm, denoted inhibition band-500, and (2) a inhibition band centered closest to 630 nm, denoted inhibition band-630.

In the OS between 380 nm and 485 nm, there exists a inhibition band centered closest to 485 nm, denoted inhibition band-485.

"Centered closest" has the meaning of the wavelength of the valley-transmission of a inhibition band (or peak-transmission of a pass-band) is closest to a designated wavelength.

The following conditions apply to the described inhibition band(s) in OS:

(i) Wavelength distance between inhibition band-500 and inhibition band-485 is between 35 nm and 140 nm, and (ii) Wavelength distance between inhibition band-500 and the right-side of inhibition band-485 at the same transmission level as that of the valley-transmission of inhibition band-500 is between 30 nm and 130 nm, e.g. 107 nm in FIG. 25, and (iii) Wavelength distance between inhibition band-500 and inhibition band-630 is between 35 nm and 120 nm, and (iv) The difference in the PIPs of any two inhibition bands centered between 485 nm and 630 nm is less than 30%, and (v) If there is one or more inhibition bands centered between 630 nm and 720 nm, then (1) such inhibition band with the largest PIP is denoted inhibition band-NIR, (2) the wavelength distance between inhibition band-630 and inhibition band-NIR is between 35 nm and 100 nm, and (3) FWHM of inhibition band-NIR is between 15 nm and 70 nm.

In the OS between 485 nm and 720 nm, there exists at least 3 pass-bands, (1) the pass-band centered closest to 485 nm is denoted pass-band-485, (2) the pass-band centered closest to inhibition band-500 while being centered between inhibition band-500 and inhibition band-630 is denoted pass-band-500, and (3) the pass-band centered closest to inhibition band-630, and whose wavelength of peak transmission is larger than 630 nm is denoted pass-band-630.

The following conditions apply to the described pass-bands and inhibition bands in OS:

(i) Peak transmissions of pass-band-485, pass-band-500 and pass-band-630 are 65% or more, and (ii) Peak transmissions of pass-band-485 and pass-band-630 are both higher than that of pass-band-500 by at least 5%, and (iii) Peak transmissions of pass-band-485 and pass-band-630 are within 30% of each other, and (iv) Peak transmission of pass-band-500 is higher than the valley transmission of inhibition band-500 by at least 6%, and (v) Wavelength distance between pass-band-485 and inhibition band-500 is between 20 nm and 85 nm, and (vi) Wavelength distance between pass-band-630 and inhibition band-630 is between 15 nm and 95 nm.

The OS has at least three spectrally selective transmission inhibitors, the at least three spectrally selective inhibitors establishing: (1) a first inhibition band centered between 380 and 500 nanometer having a peak inhibition percentage of at least 50%, (2) at least two inhibition bands each centered between 520 and 625 nanometers and each having a peak inhibition percentage of at most 50%, and (3) an inhibition band centered between 660 and 710 nanometers having a peak inhibition percentage of at most 50%.

The OS contains at least three spectrally selective transmission inhibitors establish: (1) a first pass-band centered between 485 and 520 nanometers having a peak transmission of at least 60%, (2) at least one pass-band centered between 520 and 625 nanometers having a peak transmission of at least 60%, (3) a pass-band centered between 625 and 660 nanometers having a peak transmission of at least 60%, and (4) a pass-band centered between 710 and 780 nanometers having a peak transmission of at least 25%.

For example, to make an OD with the spectrum in FIG. 25, 3 dyes are dispersed into a 2.5 mm center thickness, 68 mm in diameter, round lens of 1.67 high refractive index plastic (e.g. MR-7 1.67 Plastic by Mitsui Chemicals, Inc, Japan). The dyed lens is constructed via (1) mix all 3 dyes with monomer component A or B, (2) mix monomer components A and B together with additional additives supplied by manufacturer, then degas the mixture, (3) fill a lens mold with mixture, (4) place the mold into oven(s), where it undergoes one or more heat-cycle, turning into a polymer lens. Additional cutting, grinding, polishing, temperature treatments and/or surface treatments, such as an anti-reflective (AR) coating, may be applied to the OD. Dye mixing with monomer component A or B may be aided by mixing the dye(s) with a solvent, such as methanol, prior to or during mixing with monomer component. Exciton has the ABS 420 dye that will substantially create the inhibition band at around 424 nm and another inhibition band at around 546 nm, with a dye loading of 1 mg to 150 mg per 3 lb of monomer component A or B. Adam Gates Company, LLC (249 Homestead Rd. Building 5 Unit 2, Hillsborough, NJ 08844) has (1) the VIS 578 dye that will substantially create the inhibition bands at around 580 nm and 612 nm, with a dye loading of 0.5 mg to 100 mg per 3 lb of monomer component A or B, and (2) the VIS 682 dye that will substantially create the inhibition band at around 690 nm, with a dye loading of 0.5 mg to 50 mg per 3 lb of monomer component A or B.

Table 13 shows numerous PIs and CIs of the OD, whose transmission spectrum is illustrated in FIG. 25.

Figure 26A:
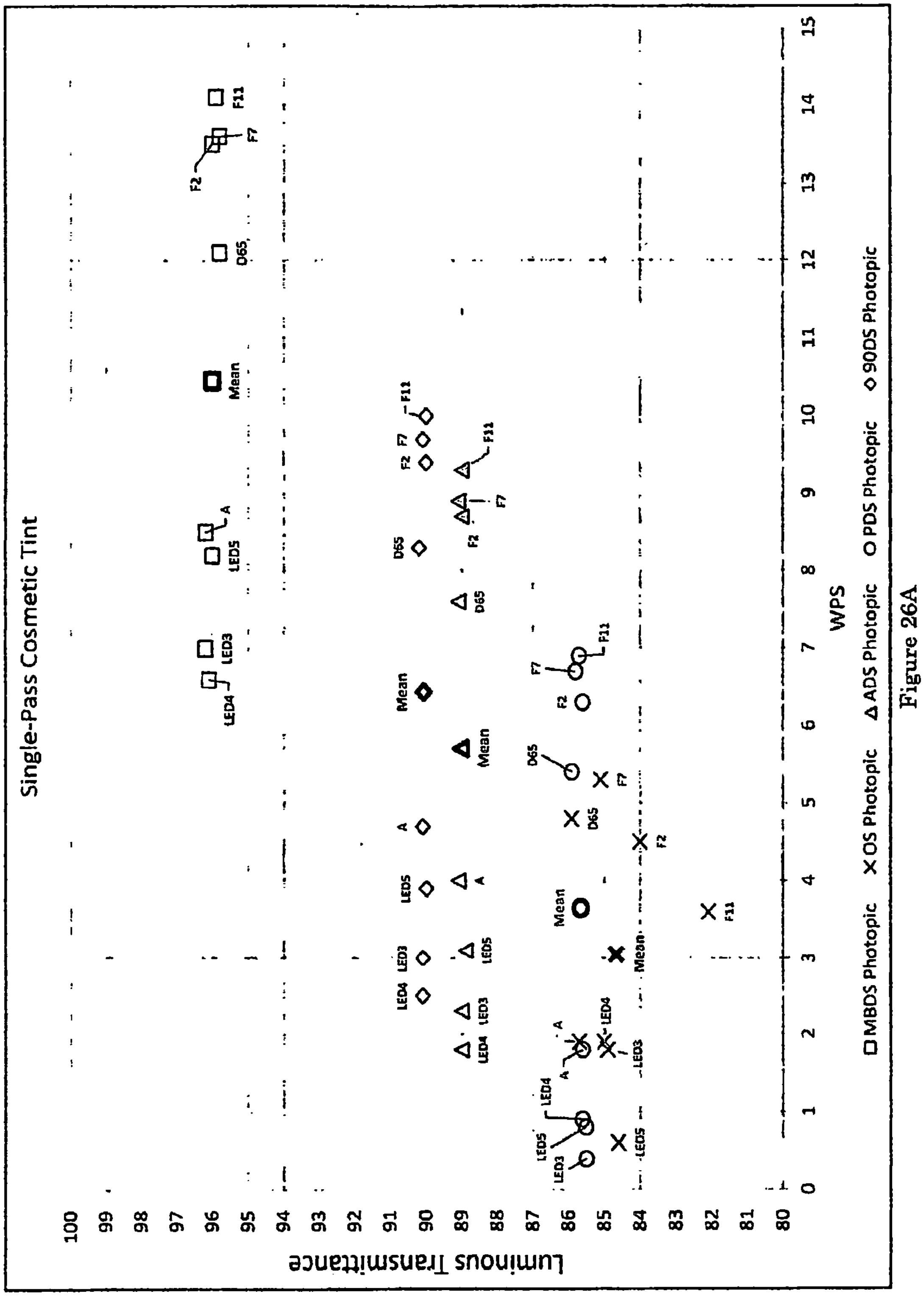
FIG. 26A is a scatter plot of the photopic luminous transmittance and single-pass WPS values, including mean values, of the MBDS, OS, ADS, PDS and 90DS of the SPDs of FIG. 25, under 8 major lighting conditions.

FIG. 26A is a scatter plot of the photopic luminous transmittance and single-pass WPS values, including mean values, of the MBDS, OS, ADS, PDS and 90DS of the OS shown in FIG. 25 under 8 major lighting conditions.

Figure 26B:
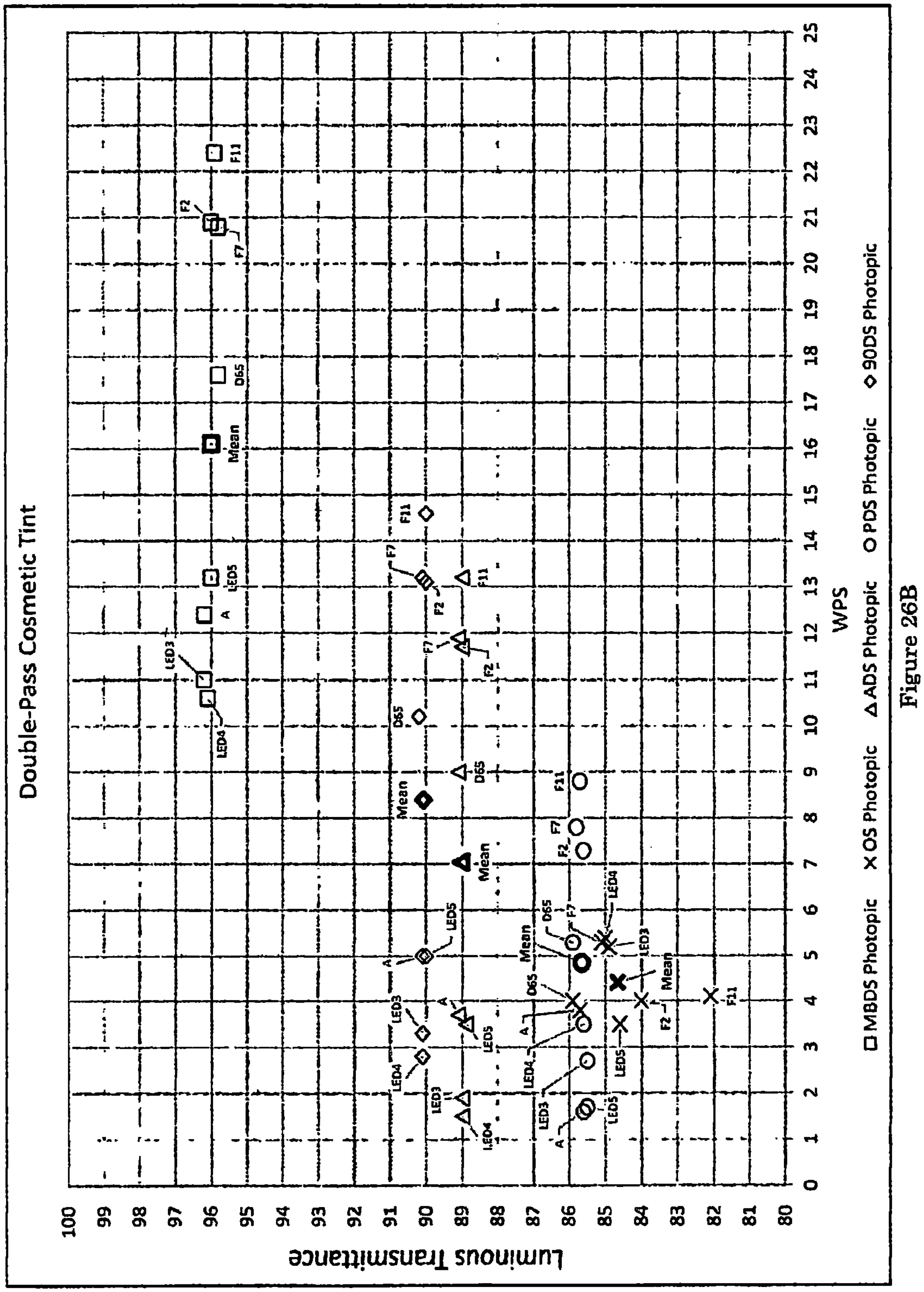
FIG. 26B is a scatter plot of the photopic luminous transmittance and double-pass WPS values, including mean values, of the MBDS, OS, ADS, PDS and 90DS of the SPDs of FIG. 25, under 8 major lighting conditions.

FIG. 26B is a scatter plot of the photopic luminous transmittance and double-pass WPS values, including mean values, of the MBDS, OS, ADS, PDS and 90DS of the OS shown in FIG. 25 under 8 major lighting conditions.

Figure 26C:
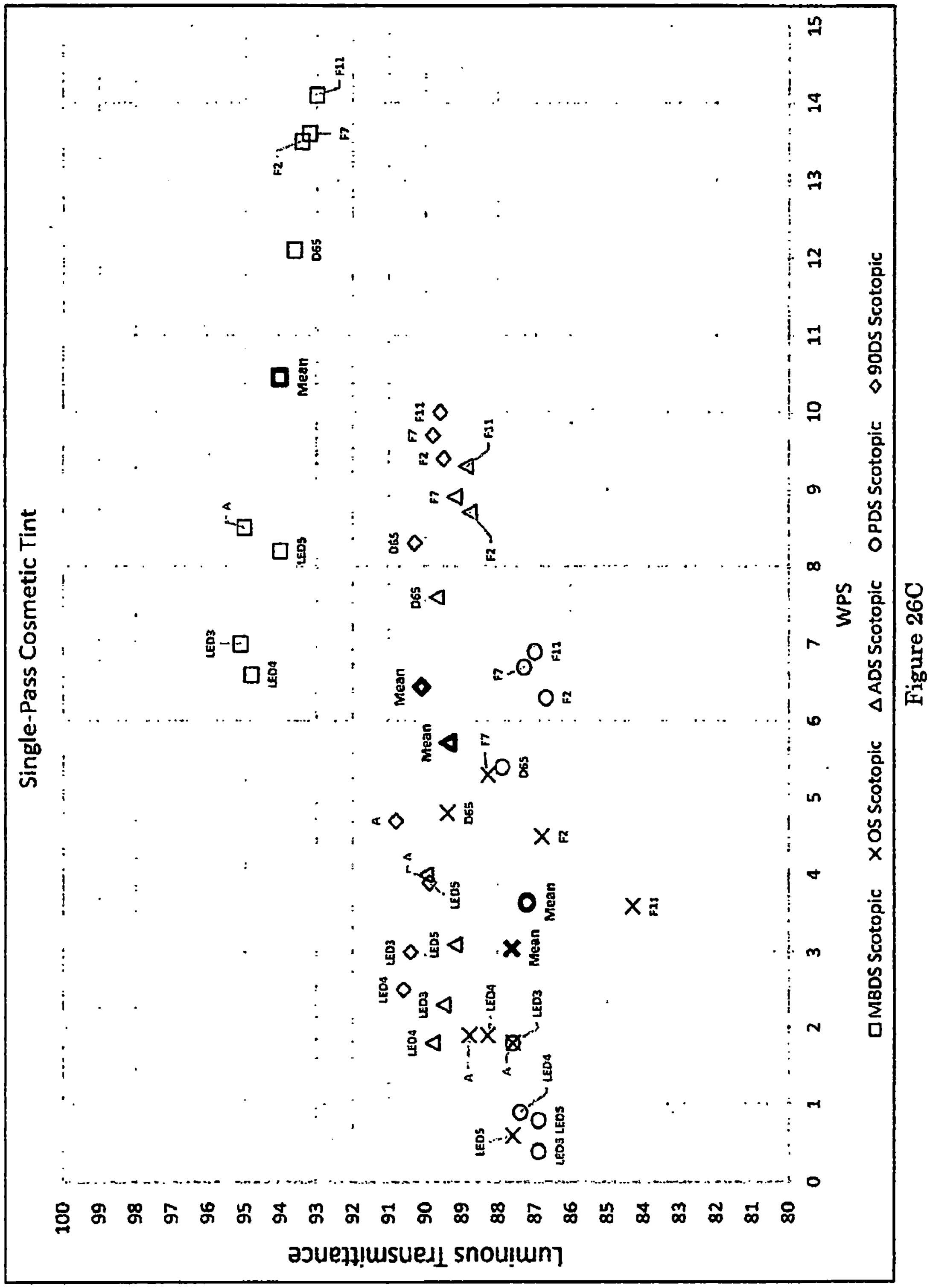
FIG. 26C is a scatter plot of the scotopic luminous transmittance and single-pass WPS values, including mean values, of the MBDS, OS, ADS, PDS and 90DS of the SPDs of FIG. 25, under 8 major lighting conditions.

FIG. 26C is a scatter plot of the scotopic luminous transmittance and single-pass WPS values, including mean values, of the MBDS, OS, ADS, PDS and 90DS of the OS shown in FIG. 25 under 8 major lighting conditions.

Figure 26D:
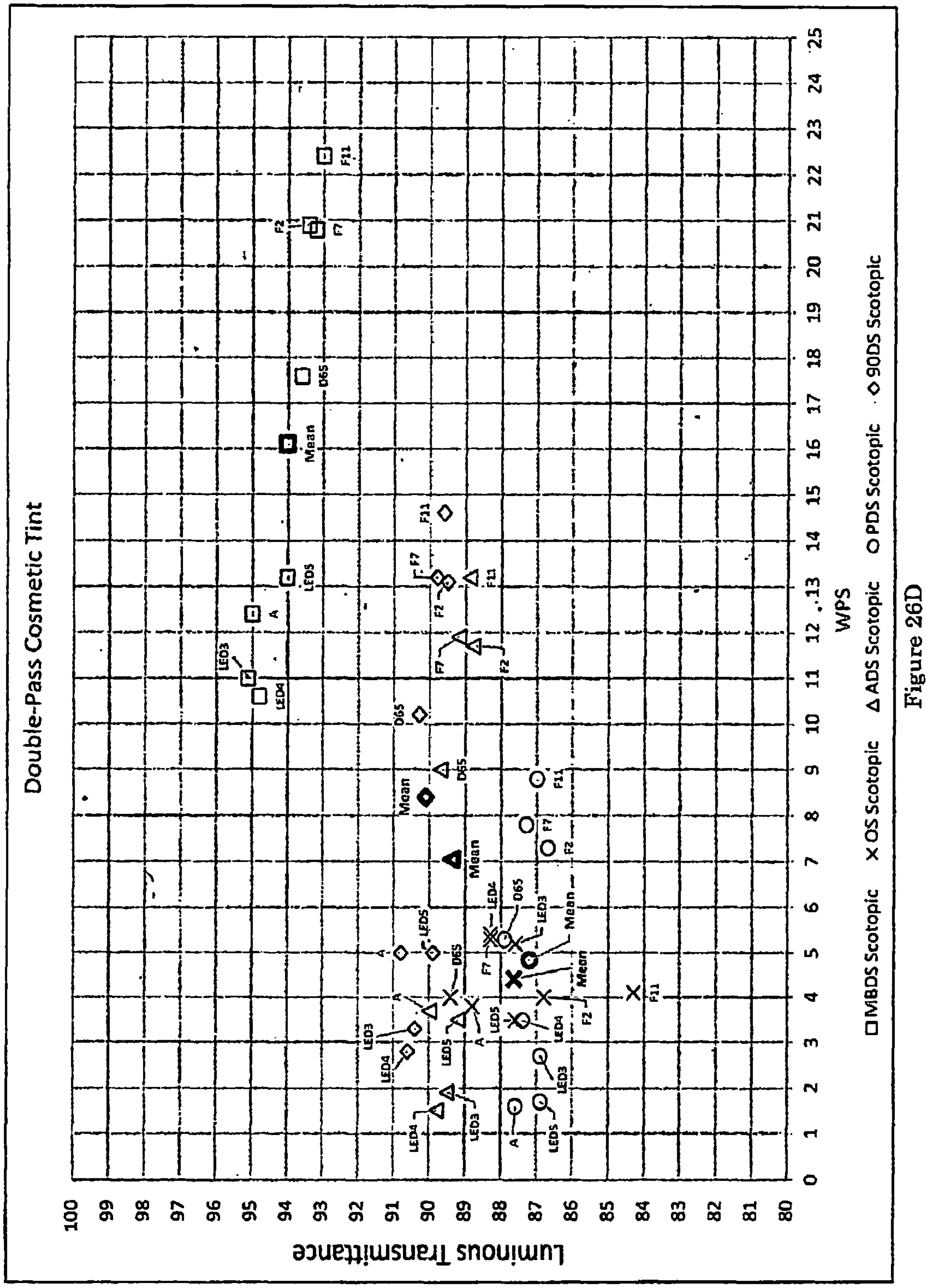
FIG. 26D is a scatter plot of the scotopic luminous transmittance and double-pass WPS values, including mean values, of the MBDS, OS, ADS, PDS and 90DS of the SPDs of FIG. 25, under 8 major lighting conditions.

FIG. 26D is a scatter plot of the scotopic luminous transmittance and double-pass WPS values, including mean values, of the MBDS, OS, ADS, PDS and 90DS of the OS shown in FIG. 25 under 8 major lighting conditions.

FIGS. 26A, B, C, D and Table 13 show that mean WPS (single-pass and/or double-pass) of OS is (1) lower by 8 or less than that of at least one of ADS, PDS and 90DS, and is (2) lower by 8 or more than that of MBDS.

FIGS. 26A, B, C, D show three or more WPS values of OS when lit by three or more corresponding illuminants selected from the set of CIE F2, CIE F7, CIE F11, CIE A, CIE D65, LED-3000K, LED-4000K and LED-5000K illuminants are (1) lower than (i) by between 1.0 and 12.0, and (2) lower than (ii) by between 3.0 and 20.0. (i) is three or more WPS values of at least one of ADS, PDS and 90DS, and (ii) is three or more WPS values of MBDS. WPS values in both (i) and (ii) are lit by any illuminant(s) selected from the same set of illuminants of CIE F2, CIE F7, CIE F11, CIE A, CIE D65, LED-3000K, LED-4000K and LED-5000K illuminants.

FIGS. 26A, B, C, D show at least three WPSs of OS are each less than 10 when the corresponding illuminants are at least three of CIE F2, CIE F7, CIE F11, CIE A, CIE D65, LED-3000K, LED-4000K and LED-5000K.

FIGS. 26A, B, C, D and Table 13 show that, for single-pass and/or double-pass WPSs, the range of WPSs of OS is at least 1.5 units less than that of at least one of ADS, PDS, 90DS and MBDS.

Table 13 show, for single-pass and/or double-pass CIs of OS, lit individually by CIE F2, CIE F7, CIE F11, CIE A, CIE D65, LED-3000K, LED-4000K and LED-5000K, the following conditions apply to OS, its:

(i) average absolute a-value, denoted avg(|a|), is at least 1.0 less than that of at least one of ADS, PDS, 90DS and MBDS, and (ii) average absolute b-value, denoted avg(|b|), is at least 2.0 less than that of at least one of ADS, PDS, 90DS and MBDS, and (iii) STD of b-values, denoted STD(b), is at least 0.3 less than that of at least one of ADS, PDS, 90DS and MBDS, and (iv) a-values, for at least 5 of 8 illuminants, are all less than 6.0, and (v) b-values, for at least 5 of 8 illuminants, are all more than −6.0, and (vi) STD of WPSs is at least 1.0 units less than that of at least one of ADS, PDS, 90DS and MBDS, and (vii) minimum a-value is closer to 0, by 1.0 or more, than the minimum a-value for at least one of ADS, PDS, 90DS and MBDS, and (viii) maximum b-value is closer to 0, by 2.0 or more, than the maximum b-value for at least one of ADS, PDS, 90DS and MBDS, and (ix) YI, defined for D65 only, is less, by at least 2.0, than that for at least one of ADS, PDS, 90DS and MBDS.

FIGS. 26A, B show at least three photopic luminous transmittances of OS are each at least 80% when lit by at least three corresponding illuminants selected from the set of illuminants of CIE F2, CIE F7, CIE F11, CIE A, CIE D65, LED-3000K, LED-4000K and LED-5000K.

FIGS. 26C, D show at least three scotopic luminous transmittances of OS are each at least 80% when lit by at least three corresponding illuminants selected from the set of illuminants of CIE F2, CIE F7, CIE F11, CIE A, CIE D65, LED-3000K, LED-4000K and LED-5000K.

FIGS. 26A, B show that mean photopic luminous transmittance of OS is (1) lower by at most 7% than that of at least one of ADS, PDS and 90DS, and (2) lower by at least 5% than that of MBDS.

FIGS. 26C, D show that mean scotopic luminous transmittance of OS is (1) lower by at most 6% than that of at least one of ADS, PDS and 90DS, and (2) lower by at least 4% than that of MBDS.

FIGS. 26A, B, C, D show the set of luminous transmittances (photopic and/or scotopic) of OS, when illuminated by the corresponding illuminants of CIE F2, CIE F7, CIE F11, CIE A, CIE D65, LED-3000K, LED-4000K and LED-5000K, has a range of less than 7.0%.

FIGS. 26A, B show within each figure, two or more photopic luminous transmittance values of OS when lit by two or more corresponding illuminants selected from the set of CIE F2, CIE F7, CIE F11, CIE A, CIE D65, LED-3000K, LED-4000K and LED-5000K illuminants are (1) lower than (i) by 6% or less, and (2) lower than (ii) by 5% or more. (i) is two or more luminous transmittance values of at least one of ADS, PDS and 90DS, and (ii) is two or more luminous transmittance values of MBDS. Luminous transmittance values in both (i) and (ii) are lit by any two or more illuminants selected from the same set of illuminants of CIE F2, CIE F7, CIE F11, CIE A, CIE D65, LED-3000K, LED-4000K and LED-5000K.

FIGS. 26C, D show within each figure, two or more scotopic luminous transmittance values of OS when lit by two or more corresponding illuminants selected from the set of CIE F2, CIE F7, CIE F11, CIE A, CIE D65, LED-3000K, LED-4000K and LED-5000K illuminants are (1) lower than (i) by 5% or less, and (2) lower than (ii) by 5% or more. (i) is two or more luminous transmittance values of at least one of ADS, PDS and 90DS, and (ii) is two or more luminous transmittance values of MBDS. Luminous transmittance values in both (i) and (ii) are lit by any two or more illuminants selected from the same set of illuminants of CIE F2, CIE F7, CIE F11, CIE A, CIE D65, LED-3000K, LED-4000K and LED-5000K.

For single-pass tint and/or double-pass tint, Table 13 shows two or more photopic E values of OS when lit by the corresponding two or more illuminants selected from the set of CIE F2, F11, F7, A, D65, LED-3000K, LED-4000K and LED-5000K illuminants are higher than (i) by at least 0.06, where (i) is the corresponding photopic E values of at least one of ADS, PDS and 90DS when lit by the same illuminants.

For single-pass tint and/or double-pass tint, Table 13 shows two or more scotopic E values of OS when lit by the corresponding two or more illuminants selected from the set of CIE F2, F11, F7, A, D65, LED-3000K, LED-4000K and LED-5000K illuminants are higher than (i) by at least 0.15, where (i) is the corresponding scotopic E values of at least one of ADS, PDS and 90DS when lit by the same illuminants.

Figure 27:
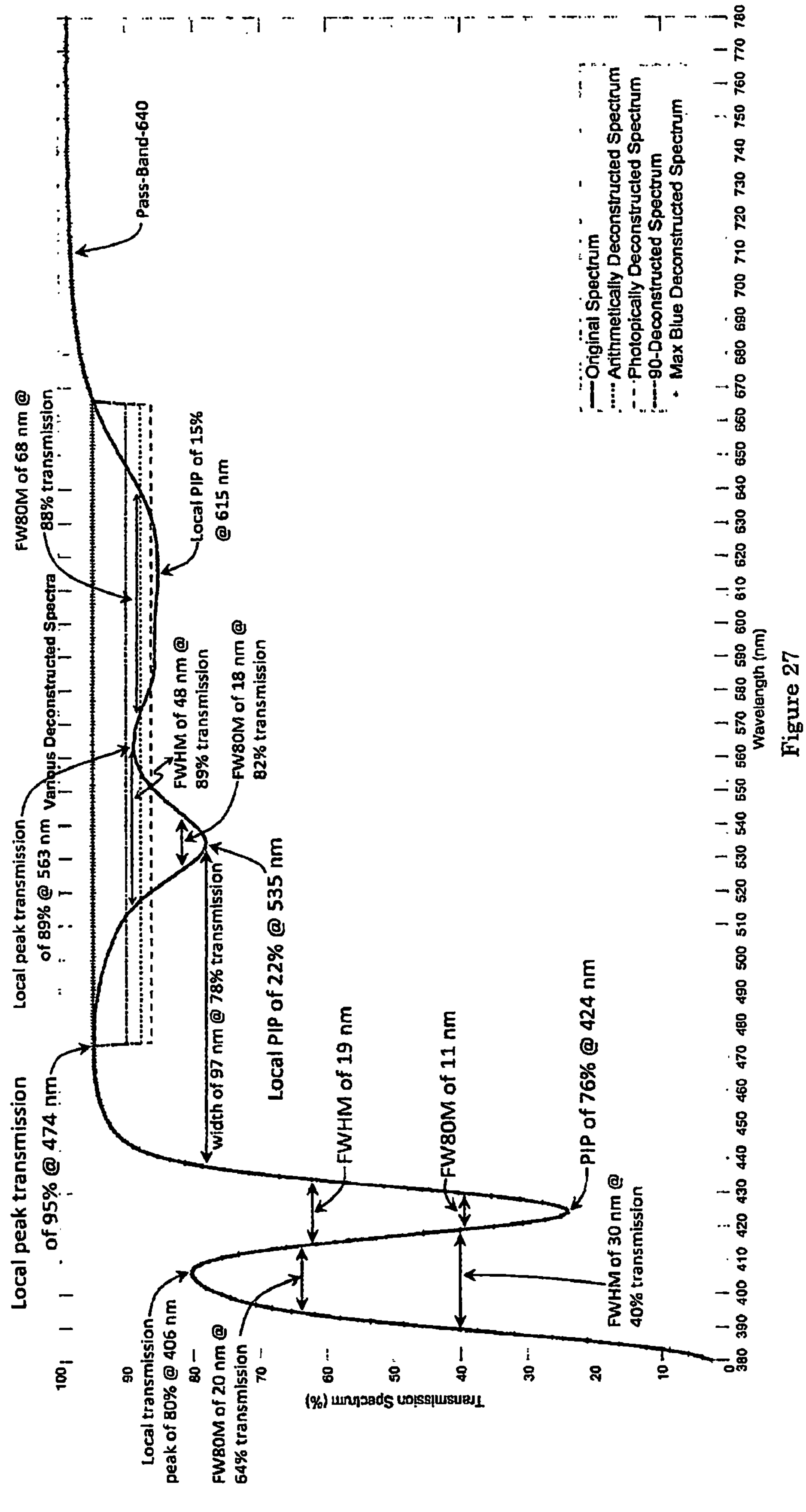
FIG. 27 is a graph including a plot of the Original Spectrum of another SMVF (OD), its ADS, PDS, MBDS and 90DS.

FIG. 27 illustrates the Original Spectrum of another SMVF (OD), its ADS, PDS, MBDS and 90DS. Wavelength A is 475 nm, and Wavelength B is 665 nm. The corresponding Arithmetic Mean is 88%, Photopic Mean is 86%, and Max Blue Transmission is 95%.

As seen in FIG. 27, there is one inhibition peak at 424 nm that inhibits 76%, the inhibition band has a FWHM of 19 nm, and has a FW80M of 11 nm, and (2) at least one pass-band centered at 406 nm, has a peak transmission of 80%, with a FW80M of 20 nm, and a FWHM of 30 nm.

FIG. 27 is an example of a class of embodiments that have an Arithmetic Mean above 70%, a Photopic Mean above 70%, and Max Blue Transmission above 70%, at least one inhibition band and one pass-band centered between 380 nm and 500 nm that inhibit and transmit the OS, respectively: (1) at least one inhibition peak between 380 nm and 500 nm inhibits at least 50% of the incident light, the inhibition band has a FWHM at least 15 nm, and has a FW80M of at least 8 nm, and (2) at least one pass-band centered at between 380 nm and 440 nm, has a peak transmission of at least 20%, with a FW80M of at least 8 nm, and a FWHM of at least 15 nm; at least 1 inhibition band centered between 500 nm and 720 nm, and at least 2 pass-bands centered between 460 nm and 780 nm.

FIG. 27 is an example of a type of embodiment in which the OS has (1) at least 1 inhibition band centered between 500 nm and 720 nm, (2) at least 2 pass-bands centered between 460 nm and 780 nm, and (3) at least 1 inhibition band centered between 500 nm and 560 nm. For at least one such inhibition band, its FW80M is between 10 nm and 90 nm, and such band has a PIP of between 8% and 50%.

Furthermore, if one or more inhibition bands is centered between:

(i) 500 nm and 560 nm, then the band has a PIP of at most 45%

(ii) 590 nm and 640 nm, then the band has a PIP of at most 45%

Moreover, if one or more pass-bands is centered between:

(i) 465 nm and 520 nm, then the band's peak transmission is at least 60%

(ii) 540 nm and 590 nm, then the band's peak transmission is at least 60%

(iii) 630 nm and 780 nm, then the band's peak transmission is at least 70%

For the OS, there is at least one pass-band, preferably two pass-bands, centered between 400 and 520 nanometers having a peak transmission of at least 60% for at least one such pass-band.

For the OS, there is at least one inhibition band centered between 500 nm and 580 nm with a FW80M of at least 8 nm, the FW80M is at least 15 nm shorter than the corresponding FWHM of the same inhibition band, and the transmission level corresponding to FW80M is at least 5% lower than that corresponding to FWHM of the same inhibition band.

In the OS between 500 nm and 640 nm, there exists (1) a inhibition band centered closest to 500 nm, denoted inhibition band-500, and (2) a inhibition band centered closest to 640 nm, denoted inhibition band-640.

In the OS between 380 nm and 465 nm, there exists an inhibition band centered closest to 465 nm, denoted inhibition band-465.

The following conditions apply to the described inhibition band(s) in OS:

(i) Wavelength distance between inhibition band-500 and inhibition band-465 is between 45 nm and 150 nm, and (ii) Wavelength distance between inhibition band-500 and the right-side of inhibition band-465 at the same transmission level as that of the valley-transmission of inhibition band-500 is between 40 nm and 140 nm, e.g. 97 nm in FIG. 27, and (iii) Wavelength distance between inhibition band-500 and inhibition band-640 is between 45 nm and 130 nm, and (iv) The difference in the PIPs of any two inhibition bands centered between 500 nm and 640 nm is less than 30%, and (v) FW80M of inhibition band-640 is between 30 nm and 100 nm.

In the OS between 465 nm and 780 nm, there exists at least 3 pass-bands, (1) the pass-band centered closest to 465 nm is denoted pass-band-465, (2) the pass-band centered closest to inhibition band-500, and is centered between inhibition band-500 and inhibition band-640 is denoted pass-band-500, and (3) the pass-band centered closest to inhibition band-640, and is centered at a longer wavelength than that of inhibition band-640 is denoted pass-band-640.

The following conditions apply to the described pass-bands and inhibition bands in OS:

(i) Peak transmissions of pass-band-465, pass-band-500 and pass-band-640 are all 70% or more, and (ii) Peak transmissions of pass-band-465 and pass-band-640 are both higher than that of pass-band-500 by at least 5%, and (iii) Peak transmissions of pass-band-465 and pass-band-640 are within 30% of each other, and (iv) Peak transmission of pass-band-500 is higher than the valley transmission of inhibition band-640 by at least 4%, and (v) Wavelength distance between pass-band-465 and inhibition band-500 is between 30 nm and 100 nm, and (vi) Wavelength distance between pass-band-465 and pass-band-500 is between 50 nm and 130 nm.

(vii)

For example, to make an OD with the spectrum in FIG. 27, 3 dyes are dispersed into a 2 mm center thickness, 75 mm in diameter, round lens of PC material. The dyed lens is constructed via (1) mix all 3 dyes into uncolored PC polymer pellets via compounding, and (2) injection molding the dyed PC pellets into lens shape. Additional cutting, grinding, polishing, tinting, temperature treatments and/or surface treatments, such as an anti-reflective (AR) coating, may be applied to the OD. Dye mixing with PC pellets may be aided by mixing the dye(s) with a solvent, such as methanol, prior to or during mixing with polymer. Exciton has the ABS 420 dye that will substantially create the inhibition band at around 424 nm, with a dye loading of 1 mg to 150 mg per 3 lb of PC polymer. Epolin has (1) the Epolight 5838 dye that will substantially create the inhibition band at around 535 nm, with a dye loading of 0.3 mg to 60 mg per 3 lb of PC material, and (2) the Epolight 5411 dye that will substantially create the inhibition band at around 615 nm, with a dye loading of 0.3 mg to 60 mg per 3 lb of PC material.

Table 14 shows numerous PIs and CIs of the OD, whose transmission spectrum is illustrated in FIG. 27.

Figure 28A:
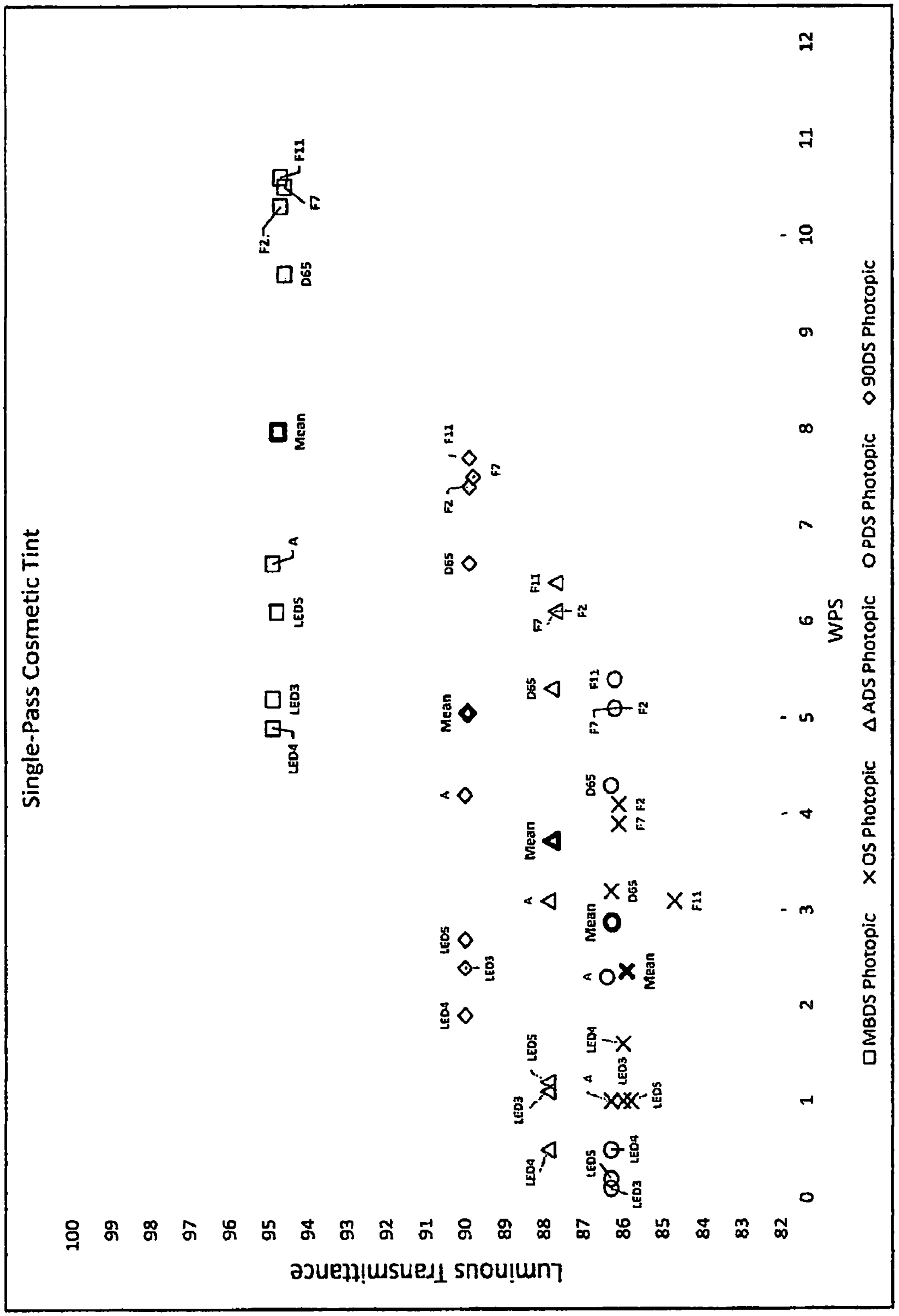
FIG. 28A is a scatter plot of the photopic luminous transmittance and single-pass WPS values, including mean values, of the MBDS, OS, ADS, PDS and 90DS of the SPDs of FIG. 27, under 8 major lighting conditions.

FIG. 28A shows the photopic luminous transmittance and single-pass WPS values, including mean values, of the MBDS, OS, ADS, PDS and 90DS under 8 major lighting conditions.

Figure 28B:
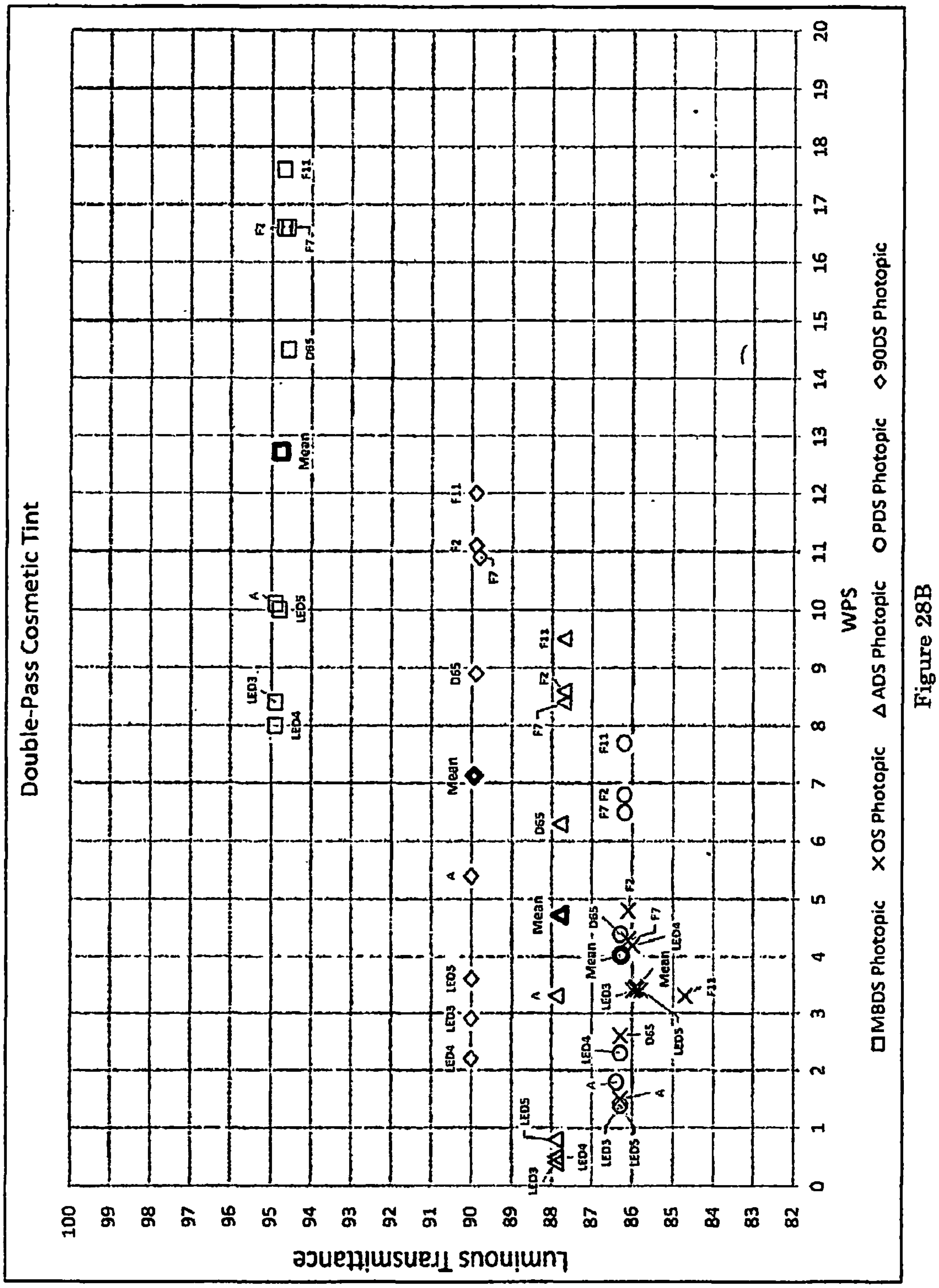
FIG. 28B is a scatter plot of the photopic luminous transmittance and double-pass WPS values, including mean values, of the MBDS, OS, ADS, PDS and 90DS of the SPDs of FIG. 27, under 8 major lighting conditions.

FIG. 28B shows the photopic luminous transmittance and double-pass WPS values, including mean values, of the MBDS, OS, ADS, PDS and 90DS under 8 major lighting conditions.

Figure 28C:
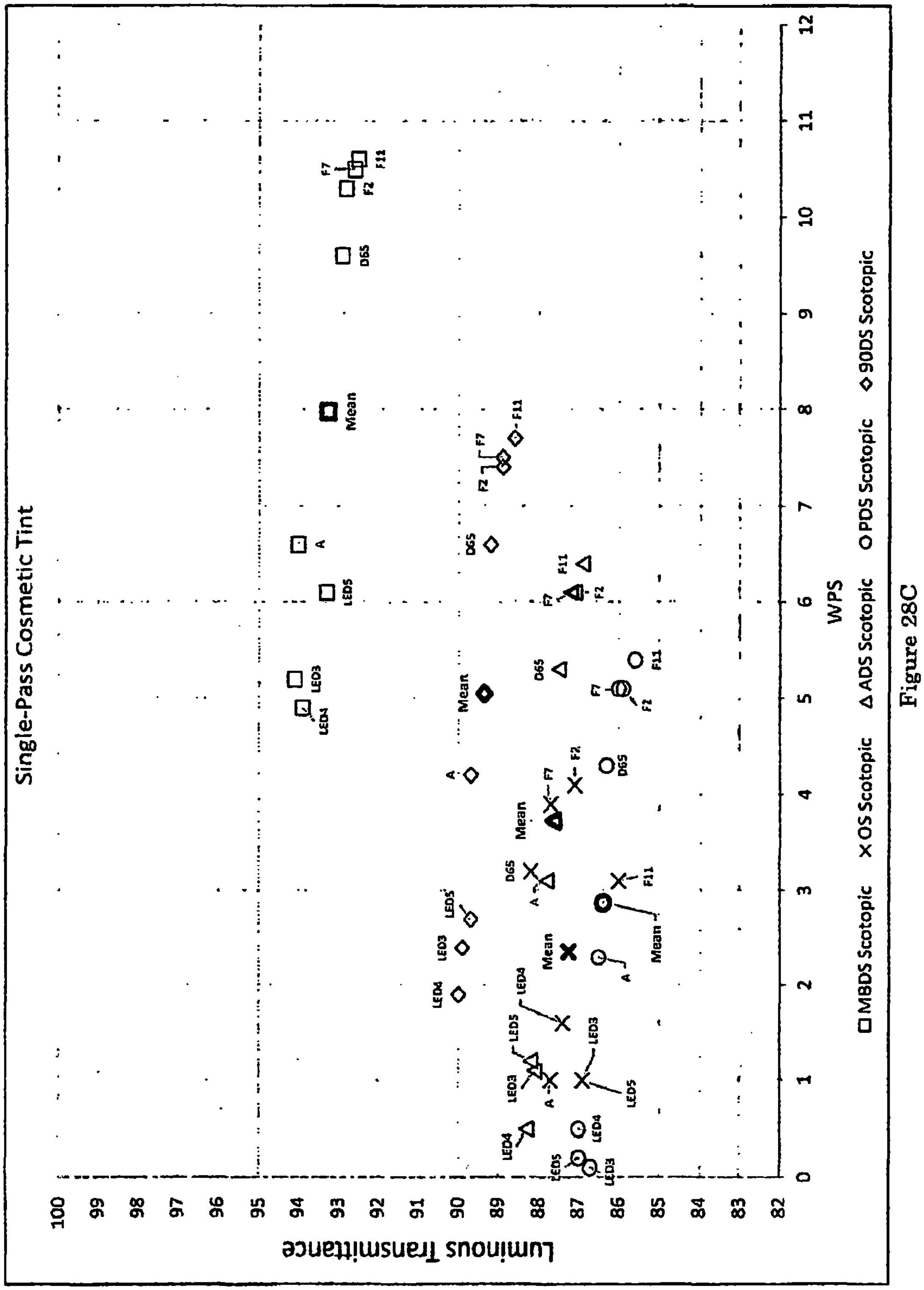
FIG. 28C is a scatter plot of the scotopic luminous transmittance and single-pass WPS values, including mean values, of the MBDS, OS, ADS, PDS and 90DS of the SPDs of FIG. 27, under 8 major lighting conditions.

FIG. 28C shows the scotopic luminous transmittance and single-pass WPS values, including mean values, of the MBDS, OS, ADS, PDS and 90DS under 8 major lighting conditions.

Figure 28D:
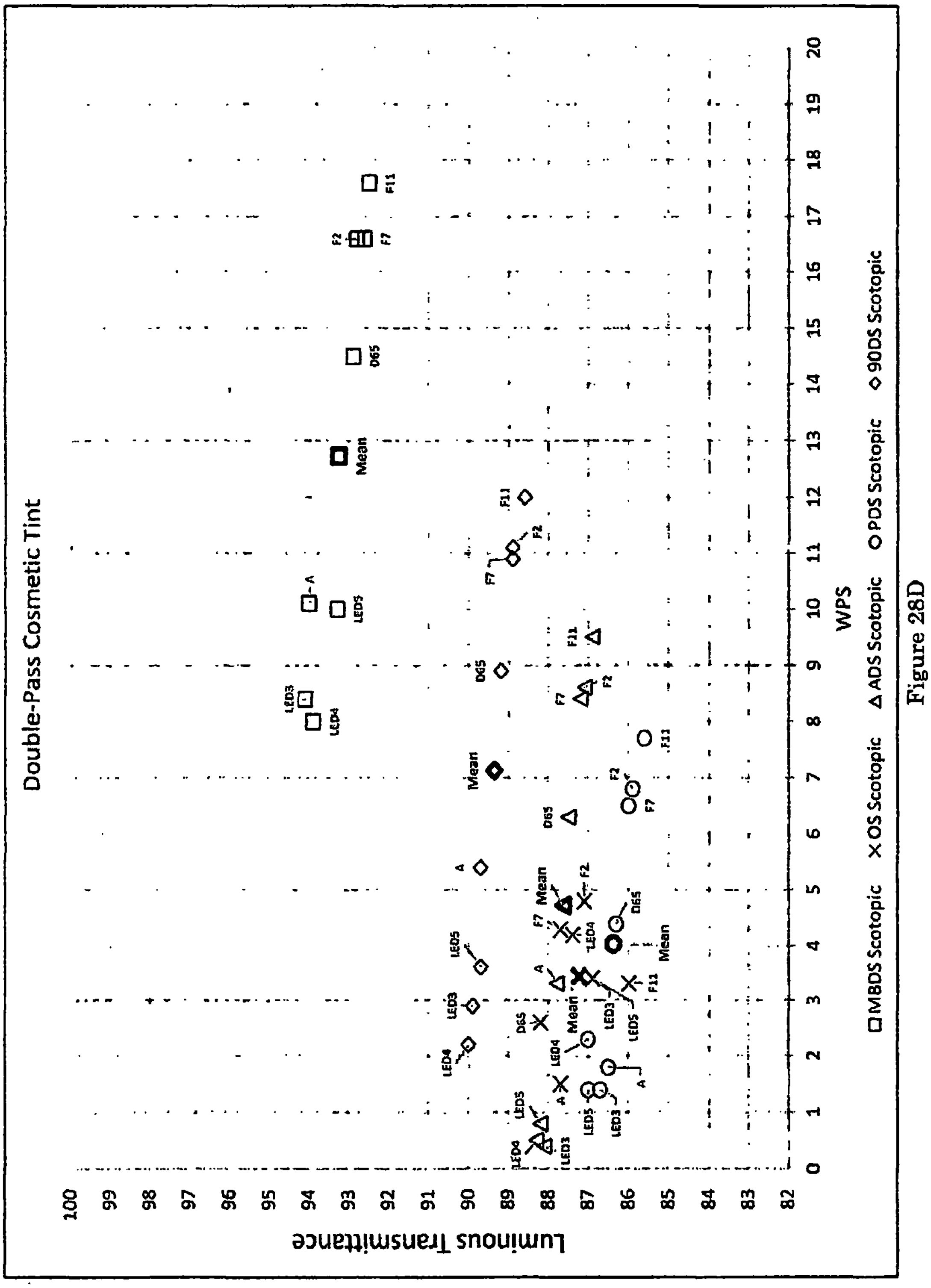
FIG. 28D is a scatter plot of the scotopic luminous transmittance and double-pass WPS values, including mean values, of the MBDS, OS, ADS, PDS and 90DS of the SPDs of FIG. 27, under 8 major lighting conditions.

FIG. 28D shows the scotopic luminous transmittance and double-pass WPS values, including mean values, of the MBDS, OS, ADS, PDS and 90DS under 8 major lighting conditions.

FIGS. 28A, B, C, D and Table 14 show that mean WPS (single-pass and/or double-pass) of OS is (1) lower by 6 or less than that (those) of at least one of ADS, PDS and 90DS, and is (2) lower by 4 or more than that (those) of MBDS.

FIGS. 28A, B, C, D show three or more WPS values of OS when lit by three or more corresponding illuminants selected from the set of CIE F2, CIE F7, CIE F11, CIE A, CIE D65, LED-3000K, LED-4000K and LED-5000K illuminants are (1) lower than (i) by between 1.0 and 14.0, and (2) lower than (ii) by between 3.0 and 18.0. (i) is three or more WPS values of at least one of ADS, PDS and 90DS, and (ii) is three or more WPS values of MBDS. WPS values in both (i) and (ii) are lit by any illuminant(s) selected from the same set of illuminants of CIE F2, CIE F7, CIE F11, CIE A, CIE D65, LED-3000K, LED-4000K and LED-5000K illuminants.

FIGS. 28A, B show within each figure, at least three WPSs of OS are each less than 10 when the corresponding illuminants are at least three of CIE F2, CIE F7, CIE F11, CIE A, CIE D65, LED-3000K, LED-4000K and LED-5000K.

FIGS. 28A, B, C, D and Table 14 show that, for single-pass and/or double-pass WPSs, the range of WPSs of OS is at least 2 units less than that of at least one of ADS, PDS, 90DS and MBDS.

Table 14 show, for single-pass and/or double-pass CIs of OS, lit individually by CIE F2, CIE F7, CIE F11, CIE A, CIE D65, LED-3000K, LED-4000K and LED-5000K, the following conditions apply to OS:

(i) its average absolute a-value, denoted avg(|a|), is at least 1.5 less than that of MBDS, and (ii) its average absolute b-value, denoted avg(|b|), is at least 4.0 less than that of MBDS, and (iii) at least one of: (1) its range of a-values is at least 1.0 less than that of MBDS, and (2) its range of b-values is at least 0.2 less than that of MBDS, and (iv) its a-values, for at least 6 of 8 illuminants, are all less than 7.0, and (v) its b-values, for at least 6 of 8 illuminants, are all more than −7.0, and (vi) its STD of WPSs is at least 1.0 less than that of MBDS, and (vii) its minimum a-value is closer to 0, by 1.5 or more, than the minimum a-value for MBDS, and (viii) its maximum b-value is closer to 0, by 3.5 or more, than the maximum b-value for MBDS, and (ix) YI is less, by at least 5.0, than that for MBDS.

FIGS. 28A, B show at least four photopic luminous transmittances of OS are each at least 75% when lit by at least four corresponding illuminants selected from the set of illuminants of CIE F2, CIE F7, CIE F11, CIE A, CIE D65, LED-3000K, LED-4000K and LED-5000K.

FIGS. 28C, D show at least four scotopic luminous transmittances of OS are each at least 75% when lit by at least four corresponding illuminants selected from the set of illuminants of CIE F2, CIE F7, CIE F11, CIE A, CIE D65, LED-3000K, LED-4000K and LED-5000K.

FIGS. 28A, B show that mean photopic luminous transmittance of OS is (1) lower, by at most 7%, than that of at least one of ADS, PDS and 90DS, and (2) lower, by at least 5%, than that of MBDS.

FIGS. 28C, D show that mean scotopic luminous transmittance of OS is (1) lower, by at most 6%, than that of at least one of ADS, PDS and 90DS, and (2) lower, by at least 3%, than that of MBDS.

FIGS. 28A, B, C, D show the set of luminous transmittances (photopic and/or scotopic) of OS, when illuminated by the corresponding illuminants of CIE F2, CIE F7, CIE F11, CIE A, CIE D65, LED-3000K, LED-4000K and LED-5000K, has a range of less than 5.0%.

FIGS. 28A, B show within each figure, three or more photopic luminous transmittance values of OS when lit by three or more corresponding illuminants selected from the set of CIE F2, CIE F7, CIE F11, CIE A, CIE D65, LED-3000K, LED-4000K and LED-5000K illuminants are (1) lower than (i) by 6% or less, and (2) lower than (ii) by 5% or more. (i) is three or more luminous transmittance values of at least one of ADS, PDS and 90DS, and (ii) is three or more luminous transmittance values of MBDS. Luminous transmittance values in both (i) and (ii) are lit by any three or more illuminants selected from the same set of illuminants of CIE F2, CIE F7, CIE F11, CIE A, CIE D65, LED-3000K, LED-4000K and LED-5000K.

FIGS. 28C, D show within each figure, three or more scotopic luminous transmittance values of OS when lit by three or more corresponding illuminants selected from the set of CIE F2, CIE F7, CIE F11, CIE A, CIE D65, LED-3000K, LED-4000K and LED-5000K illuminants are (1) lower than (i) by 6% or less, and (2) lower than (ii) by 5% or more. (i) is three or more luminous transmittance values of at least one of ADS, PDS and 90DS, and (ii) is three or more luminous transmittance values of MBDS. Luminous transmittance values in both (i) and (ii) are lit by any three or more illuminants selected from the same set of illuminants of CIE F2, CIE F7, CIE F11, CIE A, CIE D65, LED-3000K, LED-4000K and LED-5000K.

For single-pass tint and/or double-pass tint, Table 14 shows three or more photopic E values of OS when lit by the corresponding three or more illuminants selected from the set of CIE F2, F11, F7, A, D65, LED-3000K, LED-4000K and LED-5000K illuminants are higher than (i) by at least 0.06, where (i) is the corresponding photopic E values of at least one of ADS, PDS and 90DS when lit by the same illuminants.

For single-pass tint and/or double-pass tint, Table 14 shows three or more scotopic E values of OS when lit by the corresponding three or more illuminants selected from the set of CIE F2, F11, F7, A, D65, LED-3000K, LED-4000K and LED-5000K illuminants are higher than (i) by at least 0.1, where (i) is the corresponding scotopic E values of at least one of ADS, PDS and 90DS when lit by the same illuminants.

Figure 29:
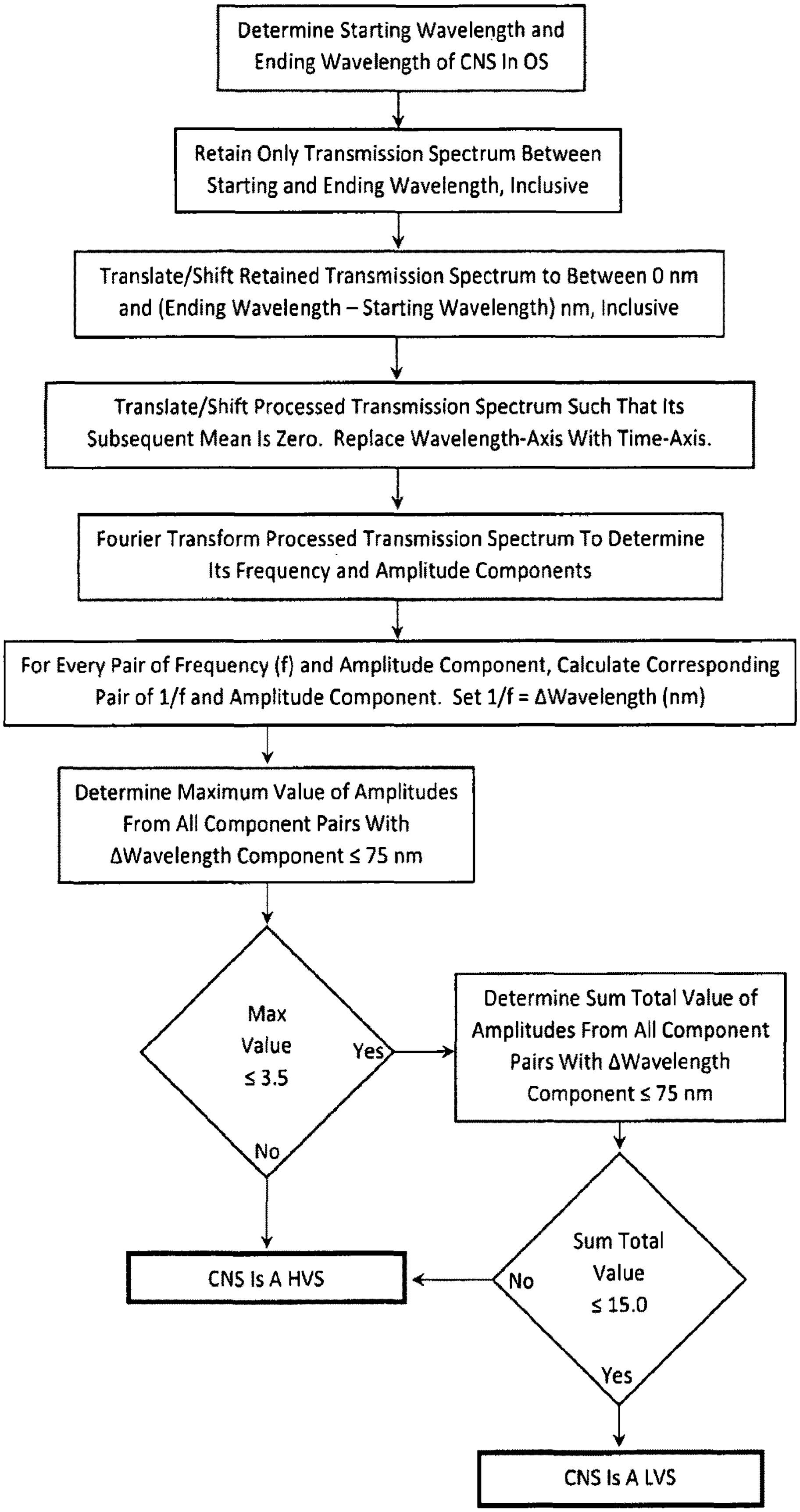
FIG. 29 is a flowchart of a process used to determine if the color-neutralization region of the transmission spectrum of the OS is a High Variability Spectrum (HVS) or a Low Variability Spectrum (LVS).

FIG. 29 describes the process used to determine if the color-neutralization region of the OS, i.e. color neutralization spectrum (CNS), is a High Variability Spectrum (HVS) or a Low Variability Spectrum (LVS). LVS is preferred over HVS due to (1) its better color constancy of SP- and DP-tints of OD, (2) having less dye loadings, and (3) being more robust against manufacturing tolerances on the spectrum. Less dye loading includes one or more of: (1) less usage of the amount of at least one dye, and (2) a lower number of dyes.

Figure 30:
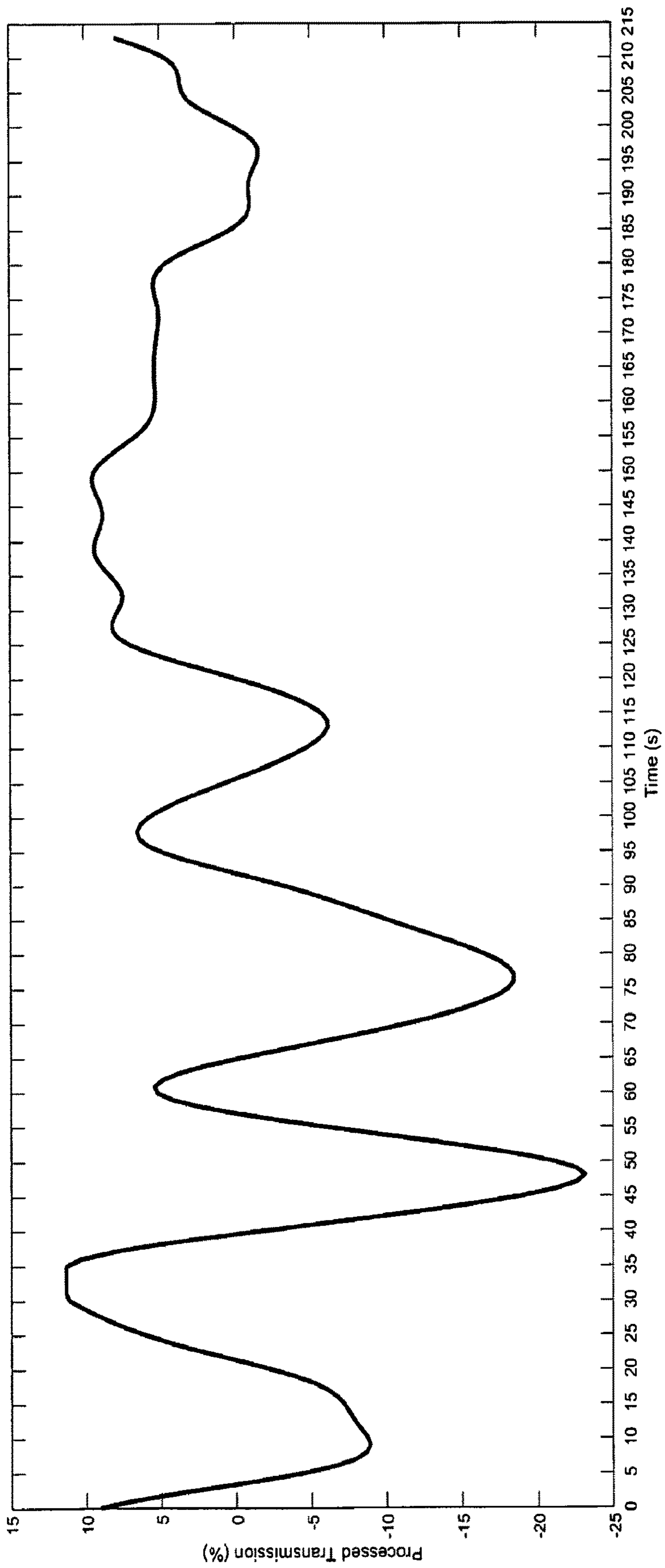
FIG. 30 illustrates the processed transmission spectrum of an OD.

The process to determine spectral variability:

1. Determine the starting wavelength and the ending wavelength of CNS in OS.
   a. For the starting wavelength, (1) find the inhibition band centered between 490 nm and 710 nm, and centered closest to 490 nm, denoted inhibition band-490, (2) find the pass-band centered immediately adjacent to inhibition band-490 that is centered at a shorter wavelength than the inhibition band-490, denoted pass-band-490, (3) the starting wavelength is (a) the wavelength whose transmission percent is 3% lower than the peak transmission % of pass-band-490, and (b) located between the centers of pass-band-490 and inhibition band-490. Starting wavelength is the wavelength closest to the center wavelength of inhibition band-490 if there are two or more wavelengths resulting from the aforementioned method.
   b. For the ending wavelength, (1) find the inhibition band centered between 490 nm and 710 nm that is centered closest to 710 nm, denoted inhibition band-710, (2) find the pass-band centered immediately adjacent to inhibition band-710 that is centered at a longer wavelength than the of inhibition band-710, denoted pass-band-710, (3) the ending wavelength is (a) the wavelength whose transmission % is 3% lower than the peak transmission % of pass-band-710, and (b) located between the centers of inhibition band-710 and pass-band-710. Ending wavelength is the wavelength closest to the center wavelength of inhibition band-710 if there are two or more wavelengths resulting from the aforementioned method. Table 15 shows the starting and ending wavelengths for the listed OSs and their corresponding figure numbers.
2. Retain only the transmission spectrum of OS between the starting and ending wavelengths, inclusive. This section of the OS is the CNS to be analyzed for spectral variability.
3. Mathematically translate the above retained spectrum from between {starting wavelength, ending wavelength} to between {0, ending wavelength—starting wavelength}, i.e. left shift the retained spectrum such that the CNS starts at 0 nm.
4. Mathematically translate the spectrum from (3) such that its subsequent average is 0, i.e. subtract average of the spectrum from (3) from the spectrum itself for every nm between {0, ending wavelength—starting wavelength}.
5. Relabel the wavelength-axis (nm) of the processed spectrum from (4) as the time-axis (second), such that the processed spectrum becomes a time-dependent signal. No mathematical calculation from wavelength to time is performed here. "Axis" is equivalent to "component". FIG. 30 illustrates an example result from this step, with the OS being that in FIG. 7.
6. Perform the Discreet Fourier Transform on the signal from (5) in order to determine its variability in terms of frequency components and their associated amplitudes (magnitudes). (The phases of the frequency components are not utilized)
7. For every frequency component (f) with its associated amplitude, calculate corresponding pair of 1/f value. For each frequency component assign the 1/f value to a variable delta wavelength (Δwavelength) component (nm), i.e. relabel the 1/f axis as the Δwavelength-axis.

8. Retain only Δwavelength and amplitude value pairs for which the Δwavelength component is between 0 nm and 75 nm, inclusive. (This is therefore a band limited Discrete Fourier Transform) FIGS. 31A, B, C show plots of amplitude versus Δwavelength components of the OSs from FIGS. 7, 9, 11, 13, 15, 17, 19, 21, 23, 25 and 27.
9. Determine maximum value of the amplitude among the retained set of frequency components from (8).
10. Sum the amplitudes of the retained set of frequency components from (8).
11. If an OS whose value in (9) is less than or equal to 3.5, and in (10) is less than or equal to 15.0, then such CNS is an LVS. If both conditions are not met, then such CNS is an HVS.

According to certain embodiments, and OD is provided with one or more dyes and/or thin film coatings that provide an OS having LVS transmission curves.

Table 15 shows the spectral variability determination, max value, sum total value, starting wavelength and ending wavelength for the CNSs of OSs, with the OSs in listed FIGs. For example, the OS in FIG. 11 is an LVS, due to a 2.3 in max value of amplitude and a 14.4 in sum total value of amplitude, with starting and ending wavelengths being 516 nm and 689 nm, respectively. Of the listed figures, the CNSs in FIGS. 11, 15, 25 and 27 are LVSs, while the CNSs in FIGS. 7, 9, 13, 17, 19, 21 and 23 are HVSs.

Figure 31A:
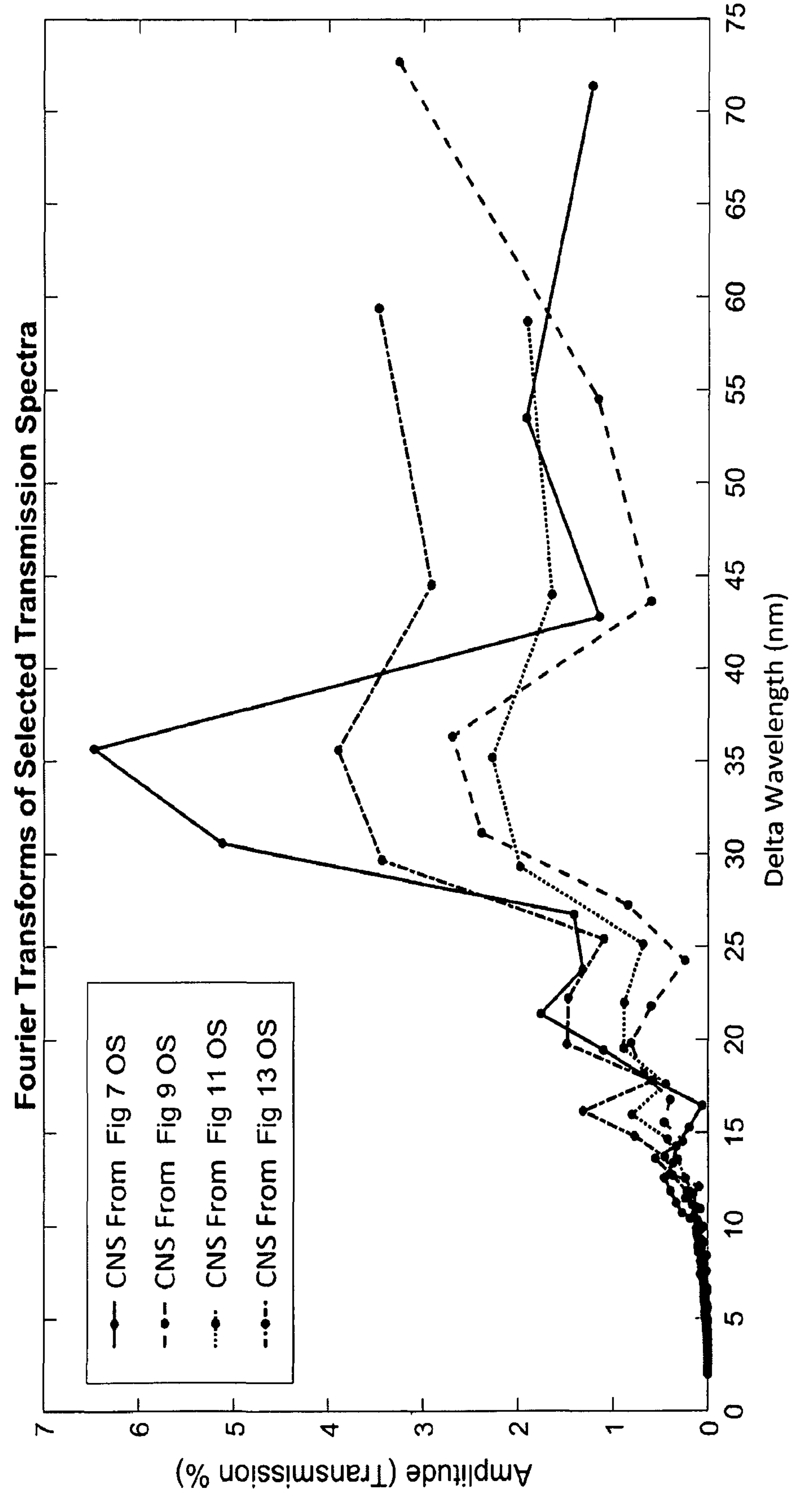
FIG. 31A, B, C show the resulting amplitude versus Δwavelength components of various OSs after Discreet Fourier Transform.
Figure 31B:
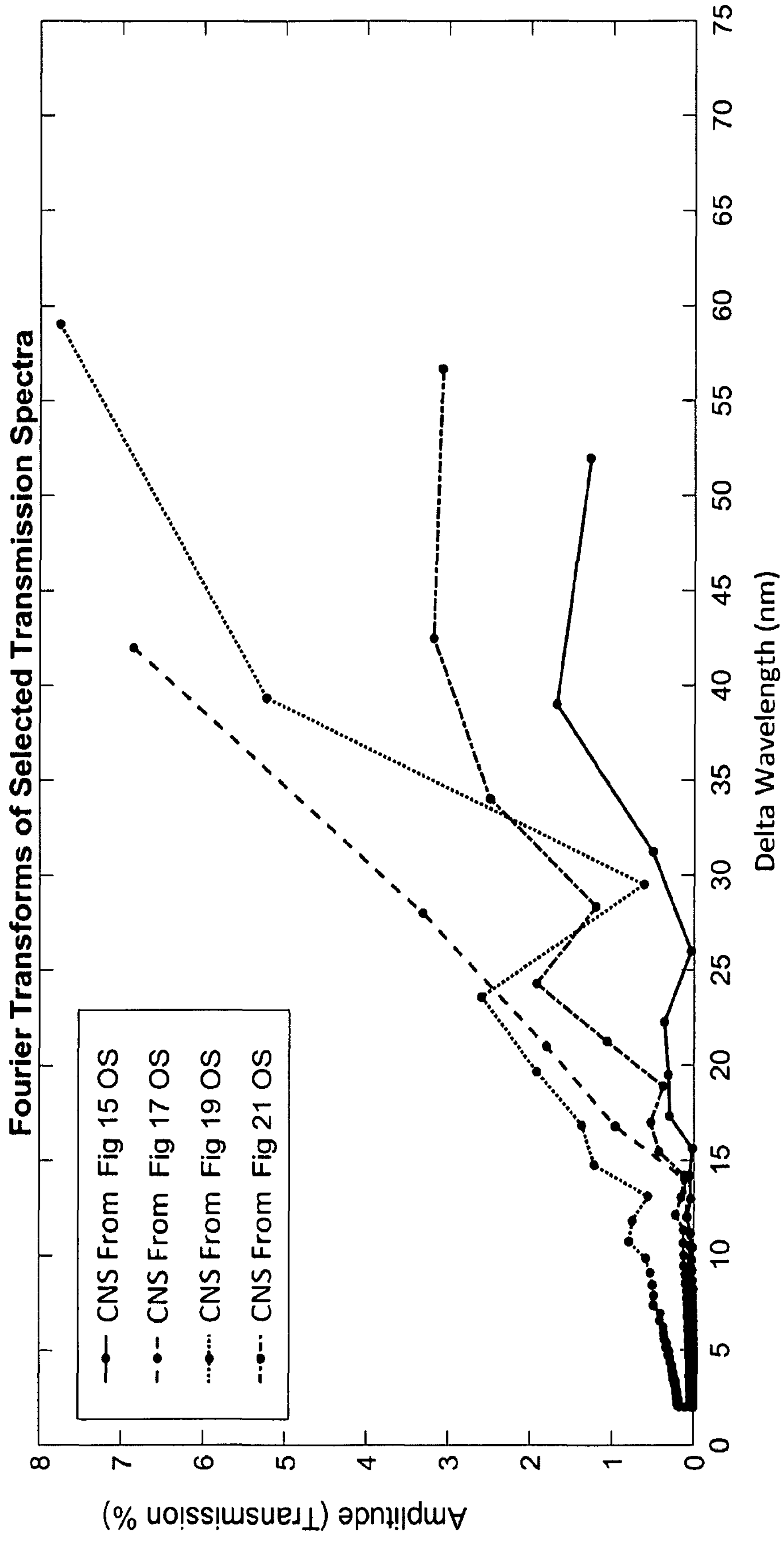
Figure 31C:
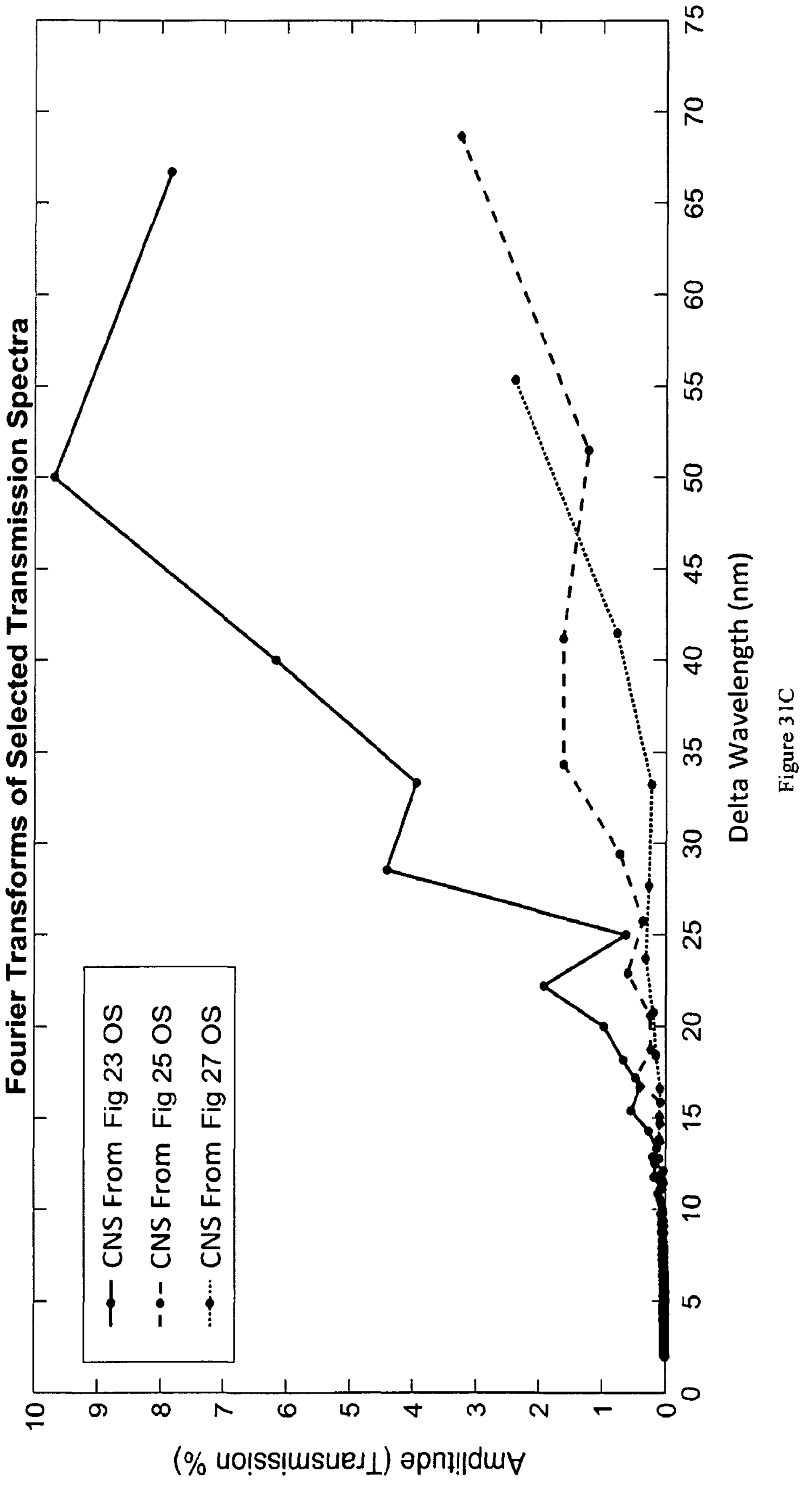
Figure 47:
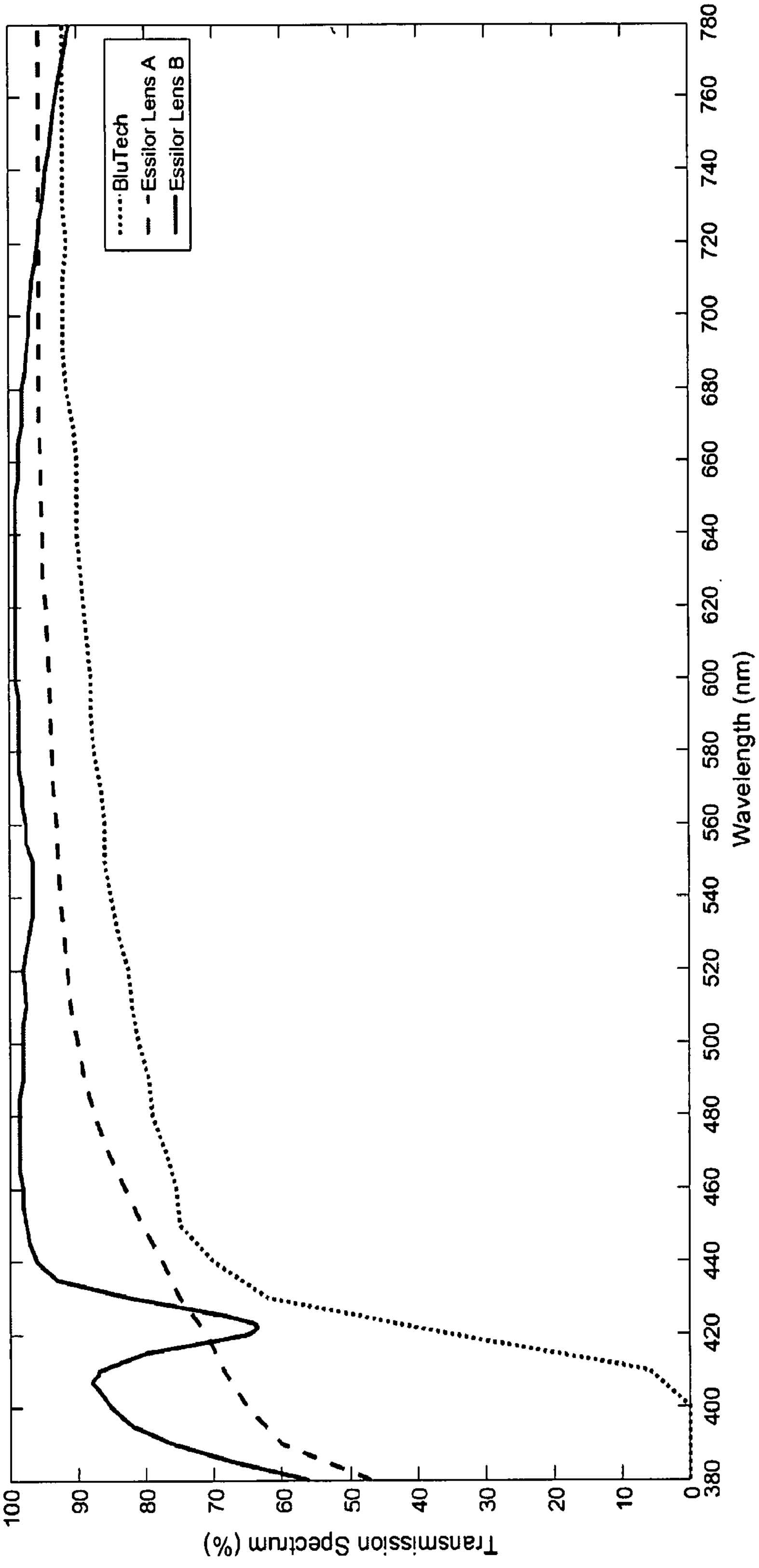
FIG. 47 is a graph including plots of spectral transmission for prior art blue blocking lenses.
Figure 49:
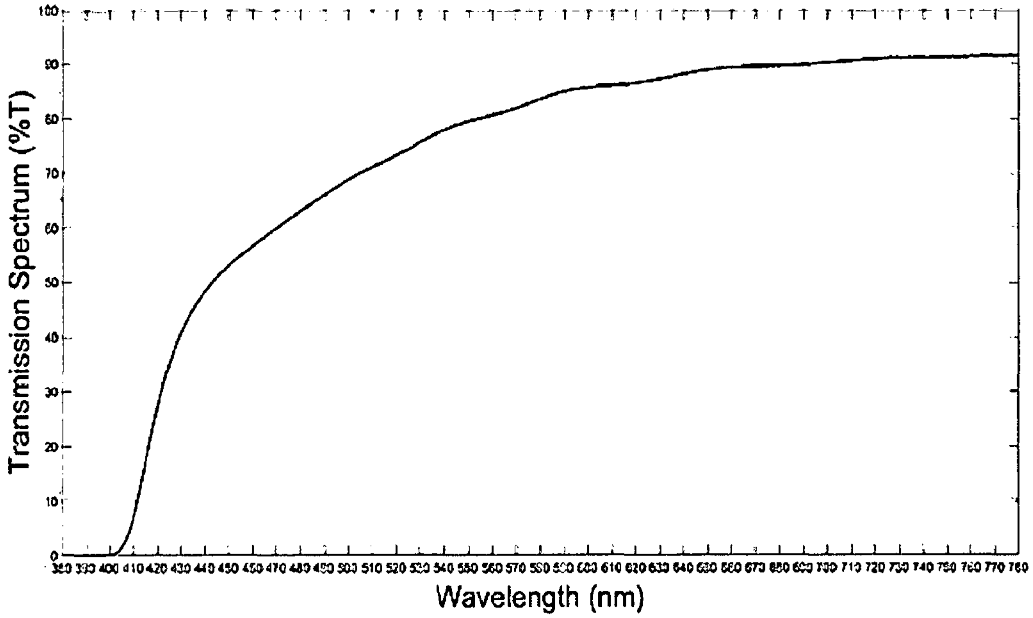
FIG. 49 is a graph including a transmission spectrum plot for a first prior art optical device.
Figure 50:
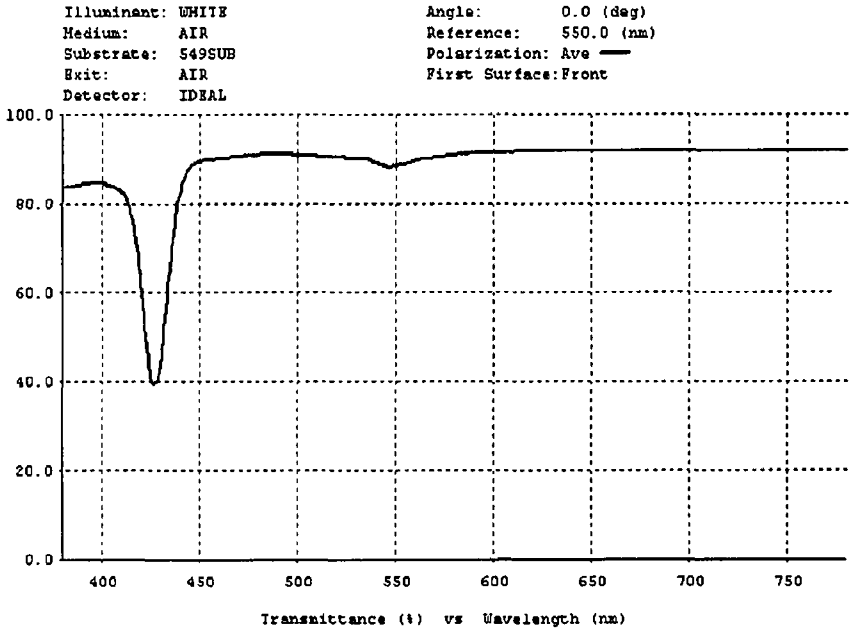
FIG. 50 is a graph including a transmission spectrum for a second prior art optical device.
Figure 51:
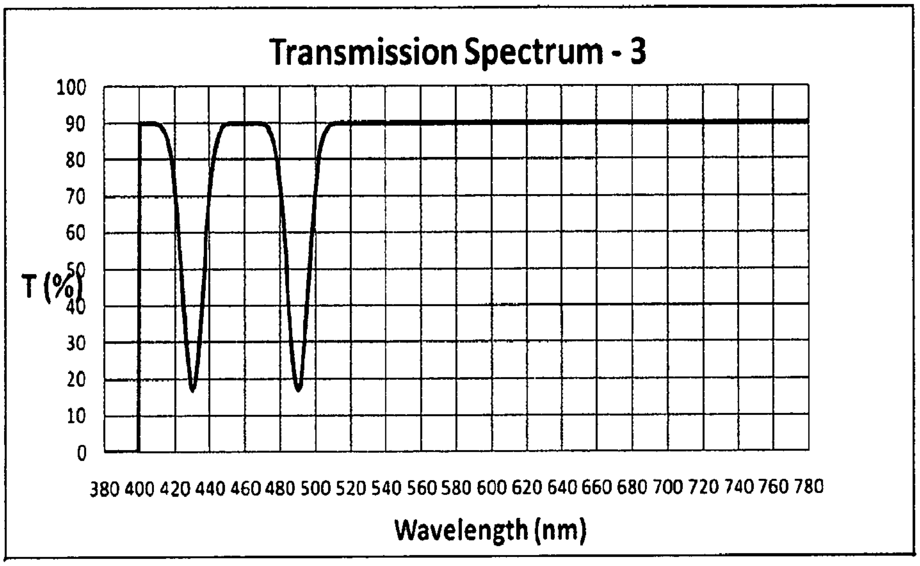
FIG. 51 is a graph including a transmission spectrum for a third prior art optical device.

FIGS. 31A, B and C show that the maximum amplitude of OS when the Δwavelength components are between 0 nm and 20 nm (1) is 2.5% or less, and (2) is at least 1% lower than the maximum amplitude of OS when the Δwavelength components are between 21 nm and 75 nm.

FIGS. 31A, B and C show that the Pearson's correlation coefficient of amplitude and Δwavelength is positive, i.e. corr(amplitude, Δwavelength)>0, when Δwavelength components are between 0 nm and 75 nm.

The PI of OS is larger than that of its MBDS, by at least 3%, in one or more of the following PI categories: (1) $TTIP_{380-450}$, (2) $TTIP_{450-500}$, (3) $TTIP_{520}$, and (4) $TTIP_{780}$.

CNS from Wavelength A to Wavelength B never absorbs any visible wavelength at a higher optical density than the SMVF's largest PIP.

WPS in double-pass and WPS in single-pass are within 15 units of each other under at least 2 disclosed illuminants.

The transmission spectra illustrated in FIG. 7, FIG. 9, FIG. 11, FIG. 13, FIG. 15, FIG. 17, FIG. 21, FIG. 23, FIG. 25, and FIG. 27 show a $RG_{LI}$ Color Difference Percent of between −4% and 7%.

The transmission spectrum illustrated in FIG. 19 shows a $RG_{LI}$ Color Difference Percent of between 7% and 25%.

The OS of an OD has a $RG_{LI}$ Color Difference Percent of between −4% and 25%, preferably between −4% and 7%.

The transmission spectra illustrated in FIG. 7, FIG. 9, FIG. 11, FIG. 13, FIG. 15, FIG. 17, FIG. 19, FIG. 21, FIG. 23, FIG. 25, and FIG. 27 show a $BY_{LI}$ Color Difference Percent of between −9% and 3%.

Dyes

The desired transmission spectrum of an OD, i.e. OS, is constructed using at least one of (1) one or more absorbing dyes, and (2) one or more reflective thin film in order to color neutralize the OD's SP- and/or DP-tint and reduce color inconstancy of tint(s) when lit by a variety of illuminants.

OD A and OD B, whose transmission spectra are shown in FIG. 3, are constructed of dyes compounded into a plastic matrix, e.g. polycarbonate (PC), and molded into optical lenses, e.g. have a plano prescription, thickness of 2 mm and a diameter of 75 mm. OD A is an ophthalmic lens for general indoor and outdoor applications. OD B attenuates more incident light than OD A. Four lightfast and thermally-stable dyes are used to produce both optical devices with their illustrated transmission spectra. The dyes have individual attenuation peaks at 460 nm, 575 nm, 595 nm and 636 nm. They are of rhodamine and cyanine family of dyes. The dyes have their respective concentration loading in the plastic matrix.

Dyes with wavelength-dependent attenuation (i.e. inhibition) peaks can create corresponding local or global peak inhibitions in the OD's transmission spectrum.

Dyes can be added into or onto ODs, such as contact lenses and IOLs. These dyes can be copolymerized with substrate matrix, such as hydrogel, silicone hydrogel, acrylic, ionic or non-ionic polymers or other suitable materials. Copolymerization may require dye chromophores to be functionalized with suitable chemical groups, such as acrylate, styrene, or to maintain reactive double bond(s). Imbibing the dyes into device substrate is also possible. Suspending or encasing dyes in the OD substrate matrix without dye copolymerization is also possible.

Many dye suppliers are available to provide off-the-shelf dyes or proprietary dyes. Examples are: Exciton, located in Lockbourne, OH; Epolin, located in Newark, New Jersey; Crysta-lyn, located in Binghamton, New York; Strem Chemicals, located in Newburyport, Massachusetts; Yamada Chemical Co, located in Kyoto, Japan.

For example, visible narrow band absorber dyes from Exciton are suitable. Exciton's ABS 455 has a peak absorbance at 461 nm in PC; ABS 574 has a peak absorbance at 578 nm in PC; ABS 594 has a peak absorbance at 598 nm in PC. Similarly, Epolight visible light-absorbing dyes from Epolin are also suitable. Epolight 5822 has a peak absorbance at 576 nm in PC; Epolight 5819 has a peak absorbance at 590 nm in PC; Epolight 5843 has a peak absorbance at 453 nm in PC.

Suitable dye chemistries in terms of functional groups are numerous. Examples dye classes include metal complex, cyanine, rhodamine, coumarin, squarylium, squaraine (based on a four-membered aryl substituted ring), BODIPY (boron dipyrromethene), dipyrromethene-complex, phthalocyanines, and porphyrin.

OD A was constructed using 11.3 mg or between 10 mg to 30 mg of Exciton's ABS 455 dye, 18.1 mg or between 15 mg to 30 mg of Exciton's ABS 574 dye, 23.9 mg or between 15 mg to 35 mg of Exciton's ABS 594 dye, and 1.6 mg or between 1 mg to 10 mg of Exciton's ABS 626 dye. Dyes were compounded into 3 lbs of polycarbonate resin and molded into lens form in order to match OD A's transmission spectrum.

OD B was constructed using 25.6 mg or between 20 mg to 40 mg of Exciton's ABS 455 dye, 38.2 mg or between 30 mg to 60 mg of Exciton's ABS 574 dye, 42.3 mg or between 35 mg to 75 mg of Exciton's ABS 594 dye, and 3.1 mg or between 1 mg to 10 mg of Exciton's ABS 626 dye. Dyes were dispersed into one or more urethane matrix, then polymerized and shaped into device form in order to match OD B's transmission spectrum.

Dyes other than those listed may be suitable substitutes, provided they have desired attenuation spectra in an OD's substrate, are chemically-compatible with substrate, thermally and mechanically stable during processing, e.g. polymer resin compounding and molding, and retain lightfastness, e.g. according ISO 12312 standards.

Substrates other than PC may be substitutes. These substrates include CR 39, Trivex, polyamide (PA), mid-index and high-index optical plastics, PMMA (acrylic), polyurethane and any other optically suitable material, such as plastics and glass.

Suitable chromophores or colorants encompass a wide variety of chemical forms and derivatives, such as cyanine, triarylmethane, coumarin, rhodamine, xanthene, oxazine, pryrene, fluorescein, metal-complex and perylene.

Additional suitable colorants include chorophylls, carotenoids, flavonoids, betalains, Lutein, Zeaxanthin, lycopene, carotene, Chlorophyll a, Chlorophyll b, Tyrian purple, erythrosine (FD&C Red #3), brilliant blue (FD&C Blue #1) and fast green (FD&C Green #3), acryloxyethyl thiocarbamoyl Rhodamine B, Rhodamine-B-acrylate (i.e. acrylate functionalized form of Rhodamine B), sulforhodamine B, Atto 565, acridine yellow.

Additional colorants include metal oxide rich inorganic pigments, such as manganese violet, cobalt violet, Han purple, Prussian blue, cobalt aluminum blue, Egyptian blue, Han blue, Azurite, YInMn Blue, Nickel antimony titanate, chrome antimony titanium buff, chrome yellow, Goethite, Akaganeite, Lepidochrocite, yellow iron oxide, aureolin-cobalt yellow, nickel antimony titanium yellow.

More suitable colorants include metal sulfide rich inorganic pigments, such as orpiment, cadmium yellow, and Mosaic gold.

More suitable colorants include synthetic organics. Note "PY" means Pigment Yellow. Synthetic organics include Monoarylide yellows of PY1(Hansa G), PY3 (Hansa 10G), PY65, PY73, PY74, PY75, PY97, PY98, PY116; diarylide yellows of AAA Yellow, MX Yellow, OT Yellow, Yellow NCG, OA Yellow, PT Yellow, Yellow H10G, Yellow HR, Yellow GGR, Yellow H19GL, Yellow G3R, Yellow DGR, Yellow GRL, Yellow YR; benzimidazolone yellows of Yellow H2G, Yellow H4G, Yellow H3G, Yellow HLR, Yellow H6G; heterocyclic yellows, azo condensation yellows of tetrachloro Isoindolinone Yellow, Tetrachloroisoindolinone yellow, azomethine yellow, Quinophthalone Yellow, Nickel Dioxine Yellow, Azo Condensation Yellow, Isoindolone Yellow, Triazinyl yellow; copper Phthalocyanine blue of Phthalocyanine Blue BN; Indanthrone Blue; Carbazole Violet.

More suitable colorants include near infra-red (NIR) dyes, fluorescent dyes, optical brighteners, ultraviolet (UV) Dyes, laser dyes, polymethine dye family, including cyanine dyes, dicarbocyanine and tricarbocyanine.

Colorants are often dissolved in a solvent to mix or bond with the optical material. Solvents can be polar or nonpolar, organic or inorganic. Solvents include acetone, acetonitrile, dimethylformamide (DMF), methanol, MEK, xylene, cyclohexanone, DMAC, THF, ethyl acetate, isopropanol (IPA), methylene chloride, chloroform, hexane, toluene, ethanol, cyclopentanone, methyl ethyl ketone, ether, ethylene glycol butyl ether, diethylene glycol butyl ether, tetrahydrofuran, 1-butanol, and other derivative solvents with polarity, non-polarity, organic or inorganic.

Colorants have at least one absorbance peak centered between 380 nm and 780 nm and have its FWHM attenuation range from 5 nm to 150 nm, when applied to an optical substrate material.

Partial list of suitable Exciton dyes include, (1) ABS dyes: 400, 407, 415, 425, 430, 439, 454, 454F, 455, 456, 462, 473, 490, 510, 511, 526N, 527, 546, 549, 551, 556, 561, 562, 574, 584, 594, 626, 642, 643, 647, 654, 658, 659, 665, 668, 670T, 674, 691, 694, 699, (2) P dye 491, and (3) IRA dyes: 677, 693N. Many of these dyes are metal complex dyes, including metals such as copper and nickel.

Partial list of suitable Epolin dyes include, (1) Epolight dyes for thermoplastics: 5663, 5851, 7830, 5852, 5853, 5854, 5010, 5843, 7829, 5675, 5841, 5532, 5396, 5838, 5821, 5391, 5840, 5822, 5819, 5824, 5397, 5411, 5394, 5845, 5262, 5839, 6661, 6158, 5636, 6084, 6698, 4101, 4037, 6860, 9151, 5847, 3079, 4016, and (2) Epolight dyes for solvent borne coatings: 5820, 5843, 5396, 5393, 5391, 5397, 5411, 5394, 5845, 5262, 5839, 6661, 6084, 6818, 4037, 5548.

Partial list of suitable Crysta-Lyn dyes include, DLS dyes: 381B, 381C, 382A, 386A, 403A, 404A, 405A, 405C, 406A, 423A, 424C, 424G, 425A, 433A, 435A, 440A, 441A, 441B, 461A, 461B, 465A, 464A, 467A, 467B, 468A, 471A, 472B, 472A, 477A, 478A, 478B, 478C, 480B, 480C, 480D, 482A, 484D, 484E, 484F, 485B, 485C, 486A, 486C, 486E, 486F, 484C, 487A, 487B, 488A, 492A, 493A, 496B, 494A, 497A, 490B, 496A, 499A, 500B, 501B, 503A, 504C, 504E, 505A, 506A, 506B, 513B, 513C, 514A, 518A, 519A, 519C, 523A, 523B, 523C, 524B, 524C, 525A, 526A, 529A, 532A, 534A, 534B, 534C, 537A, 541A, 542B, 544A, 544B, 545A, 545D, 546A, 547A, 547B, 547D, 548A, 548B, 548C, 548D, 548E, 548F, 550B, 550A, 550D, 550F, 551A, 552A, 553A, 558A, 558B, 559A, 559C, 560A, 560C, 562A, 562B, 564A, 564B, 568A, 565A, 568B, 570A, 571A, 572A, 573B, 576B, 579A, 579B, 580A, 587A, 587B, 588A, 588B, 588C, 588D, 590A, 593B, 593C, 598A, 598B, 599A, 599B, 599C, 599D, 603A, 605A, 605B, 626A, 637B, 641B, 642A, 642B, 643B, 645A, 648A, 648B, 651B, 651D, 654B, 654C, 654D, 655A, 655C, 655B, 660A, 660B, 660C, 661A, 675A, 675B, 675C, 675D, 675E, 676A, 680A, 680B, 680C, 680D, 681A, 681C, 681D, 682A, 686A, 691A, 699A, 700B, 700A, 705A, 714A, 716A, 716B, 725A, 728A, 728B, 730A, 729A, 733A, 734B, 736A, 740A, 740B, 740C, 740D, 740E, 743B, 744A, 745B, 746B, 757A, 758A, 758B, 759A, 759B, 766A, 768D, 771A, 774A, 774B, 774C, 775A, 775B, 776A, 779B, 780A, 780C, 780D, 780F, 780G.

Derivative dye chemistries, with substantially similar chemical functional groups or in the same dye families or maintain the same chromophores, are also suitable colorants.

The numbers of layers in an optical device which contain one or more colorants is between 1 and 80 layers, inclusively, with the thickness of each layer between 10 nm and 50 mm. The concentration of each colorant is between 0.0001 and 10000 micro-mol.

Additional coating layers can be applied onto an OD to provide additional performance characteristics, such as anti-reflection (AR) coating, anti-scratch (AS) resin coating, hydrophobic and other coatings.

A first aspect of the invention is a transmissive optical device including at least a first spectrally selective transmission inhibitor, the at least first spectrally selective transmission inhibitor exhibiting a first transmission inhibition band having a first peak wavelength between 380 nanometers and 465 nanometers, a second transmission inhibition band having a second peak wavelength between 500 and 780 nanometers and a third transmission inhibition band having a third peak wavelength between 500 and 780 nanometers. The at least first spectrally selective inhibitor may inhibit transmission such that the total transmission inhibition percentage (TTIP) for the range 380 nanometers to 450 nanometers is at least 20%. The first spectrally selective inhibitor may inhibit transmission such that the total transmission inhibition percentage (TTIP) for the range 380 nanometers to 450 nanometers is at least 30%. The first spectrally selective inhibitor may inhibit transmission of at least 50% at at least one wavelength in the range 420 nanometers to 465 nanometers. The at least first spectrally selective inhibitor may inhibit transmission of at least 58% at at least one wavelength in the range 420 to 465 nanometers.

The transmissive optical device may have a body and a surface, and the first spectrally selective transmission inhibitor may include at least one dye that is incorporated into the device in at least one manner selected from the following modalities (1) dispersed into the body of the device, (2) coated onto the surface of the device, and (3) dispersed into a laminated layer of the device. The transmissive optical device may include a copolymerized material and the copolymerized material may include the first spectrally selective transmissive material in the form of a dye included in said copolymerized material by copolymerization.

The aforementioned dye may include a polymerizable functional group, selected from among vinyl, acryloyl and methacryloyl groups. The transmissive optical device may include a second spectrally selective transmission inhibitor, wherein the first spectrally selective transmission inhibitor exhibits the first transmission inhibition band and the second spectrally selective transmission inhibitor exhibits the second transmission inhibition band. The first spectrally selective transmission inhibitor may include a first dye and the second spectrally selective transmission inhibitor may include a second dye and the first dye and the second dye may be incorporated into the device in at least one manner selected from the following modalities: (1) dispersed into a substrate of the device, (2) surface coated onto an outer layer of the device, and (3) dispersed into a laminated layer of the device. Both the first dye and the second dye may be incorporated into the optical device in the same manner selected from among the following modalities (1) dispersed into a substrate of the device, (2) surface coated onto an outer layer of the device, and (3) dispersed into a laminated layer of the device.

The transmissive optical device may include a copolymerized material, the first spectrally selective transmission inhibitor may include a first dye, the second spectrally selective transmission inhibitor may include a second dye, and the first dye and the second dye may be included in the copolymerized material. The second spectrally selective transmission inhibitor may also exhibit the third transmission inhibition band. Alternatively, the transmissive optical device may include a third spectrally selective transmission inhibitor, and the third spectrally selective transmission inhibitor may exhibit the third transmission inhibition band. The first spectrally selective transmission inhibitor may include a first dye, the second spectrally selective transmission inhibitor may include a second dye, and the third spectrally selective transmission inhibitor may include a third dye and the first dye, the second dye and the third dye may each incorporated into the device in at least one manner selected from the following modalities (1) dispersed into a body of the device, (2) surface coated onto an surface of the device, and (3) dispersed into a laminated layer of the device. The first dye, the second dye and the third dye may be incorporated into the optical device in the same manner selected from the group consisting of: (1) dispersed into a substrate of the device, (2) surface coated onto an outer layer of the device, and (3) dispersed into a laminated layer of the device.

The transmissive optical device may include a copolymerized material, the first spectrally selective transmission inhibitor may include a first dye, the second spectrally selective transmission inhibitor may include a second dye, and the third spectrally selective transmission inhibitor may include a third dye and the first dye, the second dye and the third dye may be included in the copolymerized material.

The transmissive optical device may exhibit a fourth transmission inhibition band having a fourth peak wavelength between 500 nanometers and 780 nanometers. The transmissive optical device may include a second spectrally selective inhibitor and a third spectrally selective inhibitor, and the first spectrally selective transmission inhibitor may establish the first transmission inhibition band, the second spectrally selective inhibitor may establish the second transmission inhibition band and the third transmission inhibition band, and the third spectrally selective inhibitor may establish the fourth transmission inhibition band. The first spectrally selective inhibitor may include a first dye, the second spectrally selective inhibitor may include a second dye and the third spectrally selective inhibitor may include a third dye, and the first dye, the second dye and the third dye may be incorporated into the optical device by a common method selected from the group consisting of: (1) dispersed into a substrate of the device, (2) surface coated onto an outer layer of the device, and (3) dispersed into a laminated layer of the device.

The transmissive optical device may exhibit, for single-pass light transmission, a yellowness index between −5 and 15. The transmissive optical device may exhibit, for double-pass light transmission, a yellowness index between −5 and 30. The transmissive optical device may have a transmission spectrum wherein relative to a maximum blue deconstructed spectrum (MBDS) based on the transmission spectrum, the transmissive optical device has a yellowness index that is less than that of the maximum blue deconstructed spectrum (MBDS).

The transmissive optical device may have a transmission spectrum (OS) and for at least three illuminants in a set of illuminants: CIE D65, CIE F11, CIE F7, CIE F2, CIE A, LED-3000K, LED-4000K and LED-5000K, a single-pass CIELAB a-value of the OS, in absolute value magnitude, is at least one of: (1) less than 5, and (2) less than 50% of an absolute value of a single-pass CIELAB a-value of a Maximum Blue Deconstructed Spectrum (MBDS) based on the OS. The transmissive optical device may have a transmission spectrum (OS) and for at least three illuminants in a set of illuminants: CIE D65, CIE F11, CIE F7, CIE F2, CIE A, LED-3000K, LED-4000K and LED-5000K, a single-pass CIELAB b-value of the OS, in absolute value magnitude, is at least one of (1) less than 7, and (2) less than 50% of an absolute value of a single-pass CIELAB b-value of the a Maximum Blue Deconstructed Spectrum (MBDS) based on the OS.

The transmissive optical device may have a transmission spectrum (OS) such that a single-pass Yellowness Index (YI) of the OS that is at least one of: (1) less than 6, and (2) less than 50% of a single-pass YI of a Maximum Blue Deconstructed Spectrum (MBDS) based on the OS.

The transmissive optical device may have a transmission spectrum (OS) such that for at least three illuminants in a set of illuminants: CIE D65, CIE F11, CIE F7, CIE F2, CIE A, LED-3000K, LED-4000K and LED-5000K, a single-pass White Point Shift (WPS) of the OS is at least one of (1) less than 8, and (2) less than 50% of a single-pass WPS of a Maximum Blue Deconstructed Spectrum (MBDS) based on the OS. The transmissive optical device may have a transmission spectrum (OS) such that for at least three illuminants in a set of illuminants: of CIE D65, CIE F11, CIE F7, CIE F2, CIE A, LED-3000K, LED-4000K and LED-5000K, a double-pass a-value of the OS, in absolute value magnitude, is at least one of (1) less than 6, and (2) less than 50% of the absolute value of the double-pass a-value of a Maximum Blue Deconstructed Spectrum (MBDS) based on the OS. The transmissive optical device may have a transmission spectrum (OS) and such that for at least three illuminants in the set of illuminants of CIE D65, CIE F11, CIE F7, CIE F2, CIE A, LED-3000K, LED-4000K and LED-5000K, a double-pass b-value of the OS, in absolute value magnitude, is at least one of (1) less than 8, and (2) less than 50% of the absolute value of a double-pass b-value of a Maximum Blue Deconstructed Spectrum (MBDS) based on the OS.

The transmissive optical device may have a transmission spectrum (OS) such that a double-pass YI of the OS is at least one of (1) less than 7, and (2) less than 50% of double-pass YI of a Maximum Blue Deconstructed Spectrum (MBDS) based on the OS.

The transmissive optical device may have a transmission spectrum (OS) such that for at least three illuminants in a set of illuminants: CIE D65, CIE F11, CIE F7, CIE F2, CIE A, LED-3000K, LED-4000K and LED-5000K, the double-pass WPS of the OS is at least one of (1) less than 9, and (2) less than 50% of a double-pass WPS of a Maximum Blue Deconstructed Spectrum (MBDS) based on the OS.

The transmissive optical device may have a transmission spectrum (OS) and such that for at least two illuminants in a set of illuminants: CIE D65, CIE F11, CIE F7, CIE F2, CIE A, LED-3000K, LED-4000K and LED-5000K, an absolute value difference between double-pass CIELAB a-value and single-pass CIELAB a-value of OS is within 5. The transmissive optical device may have a transmission spectrum (OS) such that for at least two illuminants in the set of illuminants: CIE D65, CIE F11, CIE F7, CIE F2, CIE A, LED-3000K, LED-4000K and LED-5000K, the absolute value difference between double-pass CIELAB b-value and single-pass CIELAB b-value of OS is within 5.

The transmissive optical device may have a transmission spectrum (OS) such that an absolute value difference between double-pass Yellowness Index (YI) and single-pass YI of OS is within 5. The transmissive optical device may have a transmission spectrum (OS) such that for at least two illuminants in a set of illuminants of CIE D65, CIE F11, CIE F7, CIE F2, CIE A, LED-3000K, LED-4000K and LED-5000K, an absolute value difference between double-pass White Point Shift (WPS) and single-pass WPS of OS is within 5.

The transmissive optical device may have a transmission spectrum (OS) such that for at least two illuminants in a set of illuminants: CIE D65, CIE F11, CIE F7, CIE F2, CIE A, LED-3000K, LED-4000K and LED-5000K, a photopic luminous transmittance the OS is at least one of (1) above 75%, and (2) lower than that of a Maximum Blue Deconstructed Spectrum (MBDS) based on the OS by less than 15%.

The transmissive optical device may have a transmission spectrum (OS) and such that for at least two illuminants in a set of illuminants of CIE D65, CIE F11, CIE F7, CIE F2, CIE A, LED-3000K, LED-4000K and LED-5000K, the scotopic luminous transmittance of the OS is at least one of (1) above 70%, and (2) lower than that of a Maximum Blue Deconstructed Spectrum (MBDS) based on the OS by less than 15%. The transmissive optical device may exhibit a photopic luminous transmittance variation of less than 30% over the set of standard illuminants: CIE D65, CIE F2, CIE F7, CIE F11, CIE A, LED-3000K, LED-4000K and LED-5000K. The transmissive optical device may exhibit a scotopic luminous transmittance variation of less than 30% over the set of standard illuminants: CIE D65, CIE F2, CIE F7, CIE F11, CIE A, LED-3000K, LED-4000K and LED-5000K. The transmissive optical device may exhibit a scotopic luminous transmittance variation of less than 30% over the set of standard illuminants: CIE D65, CIE F2, CIE F7, CIE F11, CIE A, LED-3000K, LED-4000K and LED-5000K.

The transmissive optical device may have a spectral transmission curve which for double-pass transmission yields a CIELAB a* coordinate in the range from −10 to 10, a CIELAB b* coordinate in the range −5 to 18 for at least two illuminants in the set CIE D65, CIE F2, CIE F7, CIE F11, CIE A, LED-3000K, LED-4000K and LED-5000K. The transmissive optical device may have a spectral transmission curve which for single-pass transmission and double-pass transmission yields a white point shift between 0 and 18 for at least one illuminant in the set CIE D65, CIE F2, CIE F7, CIE F11, CIE A, LED-3000K, LED-4000K and LED-5000K.

The transmissive optical device may have, for at least two illuminants in the set CIE D65, CIE F2, CIE F7, CIE F11, CIE A, LED-3000K, LED-4000K and LED-5000K, a double-pass photopic efficiency of WPS neutralization given by:

$$E_{V,WPS,DP} = \frac{WPS_{DP,OS} - WPS_{DP,MBDS}}{V_{OS} - V_{MBDS}}$$

of at least 0.7, where, $WPS_{DP,OS}$ is the white point shift of the optical device for after double-pass transmission for the transmissive optical device, $WPS_{DP,MBDS}$ is a white point shift after double-pass transmission for a max blue deconstructed spectrum (MBDS) based on the transmissive optical device;

$V_{OS}$ is the photopic luminous transmittance of the transmissive optical device; and $V_{MBDS}$ is the photopic luminous transmittance of the max blue deconstructed spectrum based on the transmissive optical device.

The transmissive optical device may have, for at least two illuminants in the set CIE D65, CIE F2, CIE F7, CIE F11, CIE A, LED-3000K, LED-4000K and LED-5000K, a double-pass scotopic efficiency of WPS neutralization given by:

$$E_{V\prime,WPS,DP} = \frac{WPS_{DP,OS} - WPS_{DP,MBDS}}{V'_{OS} - V'_{MBDS}}$$

of at least 1.0, where, $WPS_{DP,OS}$ is the white point shift of the optical device for after double-pass transmission for the transmissive optical device, $WPS_{DP,MBDS}$ is a white point shift after double-pass transmission for a max blue deconstructed spectrum (MBDS) based on the transmissive optical device;

$V'_{OS}$ is the scotopic luminous transmittance of the transmissive optical device; and $V'_{MBDS}$ is the scotopic luminous transmittance of the max blue deconstructed spectrum based on the transmissive optical device.

The transmissive optical device may have, for at least two illuminants in the set CIE D65, CIE F2, CIE F7, CIE F11, CIE A, LED-3000K, LED-4000K and LED-5000K, a single-pass photopic efficiency of WPS neutralization given by:

$$E_{V,WPS,SP} = \frac{WPS_{SP,OS} - WPS_{SP,MBDS}}{V_{OS} - V_{MBDS}}$$

of at least 0.7 where, $WPS_{SP,OS}$ is the white point shift of the optical device for after single-pass transmission for the transmissive optical device, $WPS_{SP,MBDS}$ is a white point shift after single-pass transmission for a max blue deconstructed spectrum (MBDS) based on the transmissive optical device;

$V_{OS}$ is the photopic luminous transmittance of the transmissive optical device; and $V_{MBDS}$ is the photopic luminous transmittance of the max blue deconstructed spectrum based on the transmissive optical device.

The transmissive optical device may have, for at least two illuminants in the set CIE D65, CIE F2, CIE F7, CIE F11, CIE A, LED-3000K, LED-4000K and LED-5000K, a single-pass scotopic efficiency of WPS neutralization given by:

$$E_{V',WPS,SP} = \frac{WPS_{SP,OS} - WPS_{SP,MBDS}}{V'_{OS} - V'_{MBDS}}$$

of at least 1.0, where, $WPS_{SP,OS}$ is the white point shift of the optical device for after single-pass transmission for the transmissive optical device, $WPS_{SP,MBDS}$ is a white point shift after single-pass transmission for a max blue deconstructed spectrum (MBDS) based on the transmissive optical device;

$V'_{OS}$ is the scotopic luminous transmittance of the transmissive optical device; and $V'_{MBDS}$ is the scotopic luminous transmittance of the max blue deconstructed spectrum based on the transmissive optical device.

The transmissive optical device may have a transmission spectrum having a color neutralizing spectrum portion, the color neutralizing spectrum portion having a band limited Discrete Fourier Transform that has a maximum frequency component amplitude of less than 3.5 and a sum of frequency components' amplitudes less than 15.0, where maximum frequency component amplitude and the sum of frequency components' amplitudes components are obtained by:

identifying a starting wavelength by finding a inhibition-band centered between 490 nm and 710 nm, and centered closest to 490 nm, denoted inhibition-band-490, finding a pass-band centered immediately adjacent to inhibition-band-490 that is centered at a shorter wavelength than the inhibition-band-490, denoted pass-band-490, identifying the starting wavelength as the wavelength whose transmission percent is 3% lower than the peak transmission % of pass-band-490, and located between the centers of pass-band-490 and inhibition-band-490, wherein the starting wavelength is the wavelength closest to the center wavelength of inhibition band-490 if there are two or more wavelengths resulting from the aforementioned selection criteria;

identifying an ending wavelength by finding a inhibition-band centered between 490 nm and 710 nm that is centered closest to 710 nm, denoted inhibition-band-710, finding a pass-band centered immediately adjacent to inhibition-band-710 that is centered at a longer wavelength than the of inhibition-band-710, denoted pass-band-710, identifying the ending wavelength as the wavelength whose transmission % is 3% lower than the peak transmission % of pass-band-710, and located between the centers of inhibition-band-710 and pass-band-710, wherein the ending wavelength is the wavelength closest to the center wavelength of inhibition band-710 if there are two or more wavelengths resulting from the aforementioned selection criteria;

identifying the color neutralizing spectrum as a portion of the transmission spectrum between the starting wavelength and the ending wavelength, wherein the transmission spectrum includes a value for each one nanometer wide wavelength band;

left shifting the color neutralizing spectrum so that the starting wavelength is shifted to zero, mathematically vertically translating the spectrum such that its average after translation is 0, applying the Discrete Fourier Transform on the spectrum in order to determine its variability in terms of frequency components and associated amplitude values;

for every frequency component, calculating a corresponding 1/f value;

retaining a set of frequency and amplitude component pairs with 1/f between 0 nm and 75 nm, inclusive;

identifying the maximum frequency component amplitude in the retained set; and summing amplitudes of all the frequency components in the retained set.

The transmissive optical device may include an antireflection coating.

The transmissive optical device may have a transmission spectrum including a color neutralizing portion that includes the second transmission inhibition band and the third transmission inhibition band, wherein an arithmetically deconstructed spectrum (ADS) that is based on the transmission spectrum and includes a flat transmission substantially corresponding to an average transmission of the color neutralizing portion has a transmission level above 60%. The arithmetically deconstructed spectrum may have a transmission level above 70%.

The transmissive optical device may have a photopic luminous transmittance between 70% and 95% in CIE D65 illuminant. The transmissive optical device may have a scotopic luminous transmittance between 75% and 95% in CIE D65 illuminant.

The transmissive optical device may exhibiting $RG_{LI}$ Color Difference Percent between −4% and 25% where the $RG_{LI}$ Color Difference is given by:

$$RG_{LI}Color\ \text{Difference Percent} = 100\left(\frac{\sqrt{(a_{OD,red} - a_{OD,green})^2 + (b_{OD,red} - b_{OD,green})^2}}{\sqrt{(a_{naked\ eye,red} - a_{naked\ eye,green})^2 + (b_{naked\ eye,red} - b_{naked\ eye,green})}} - 1\right)$$

where, $a_{OD,red}$ is an average CIELAB a value of a set of red color samples seen through the optical device;

$a_{OD,green}$ is an average CIELAB a value of a set of green color samples seen through the optical device;

$b_{OD,red}$ is an average CIELAB b value of the set of red color samples seen through the optical device;

$b_{OD,green}$ is an average CIELAB b value of the set of green color samples seen through the optical device;

$a_{naked,red}$ is an average CIELAB a value of the set of red color samples seen with the naked eye;

$a_{naked,green}$ is an average CIELAB a value of the set of green color samples seen with the naked eye;

$b_{naked,red}$ is an average CIELAB b value of the set of red color samples seen with the naked eye;

$b_{naked,green}$ is an average CIELAB b value of the set of green color samples seen with the naked eye;

the set of red color samples is a set of Munsell samples: 2.5YR 5/4, 7.5R 5/4, and 10RP 5/4; and the set of green color samples is a set if Mansell samples: 5G 5/4, 10GY 5/4, and 5GY 5/4.

The $RG_{LI}$ Color Difference Percent may be between −4% and 7%.

The transmissive optical device may exhibit a $BY_{LI}$ Color Difference Percent is between −9% and 3%, where the $BY_{LI}$ Color Difference Percent is given by:

$$BY_{LI}Color\ \text{Difference Percent} =$$

$$100\left(\frac{BY_{LI}Color\ \text{Difference Seen Through } OD}{BY_{LI}Color\ \text{Difference With Naked Eye}} - 1\right) =$$

$$100\left(\frac{\sqrt{(a_{OD,blue} - a_{OD,yellow})^2 + (b_{OD,blue} - b_{OD,yellow})^2}}{\sqrt{\begin{array}{l}(a_{naked\ eye,blue} - a_{naked\ eye,yellow})^2 + \\ (b_{naked\ eye,blue} - b_{naked\ eye,yellow})\end{array}}} - 1\right)$$

where, $A_{OD,blue}$ is an average CIELAB a value of a set of blue color samples seen through the optical device;

$a_{OD,yellow}$ is an average CIELAB a value of a set of yellow color samples seen through the optical device;

$b_{OD,blue}$ is an average CIELAB b value of the set of blue color samples seen through the optical device;

$b_{OD,yellow}$ is an average CIELAB b value of the set of yellow color samples seen through the optical device;

$a_{naked,blue}$ is an average CIELAB a value of the set of blue color samples seen with the naked eye;

$a_{naked,yellow}$ is an average CIELAB a value of the set of yellow color samples seen with the naked eye;

$b_{naked,blue}$ is an average CIELAB b value of the set of blue color samples seen with the naked eye;

$b_{naked,yellow}$ is an average CIELAB b value of the set of yellow color samples seen with the naked eye;

the set of blue color samples is a set of Munsell samples: 10B 5/4, 5B 5/4, 10PB 5/4; and the set of yellow color samples is as set of Mansell samples: 10Y 5/4, 10YR 5/4, 5Y 5/4.

In some embodiments, the TTP of the OS of an OD is less than 90%. This is illustrated in the embodiment where the OD's transmission spectrum is shown in FIG. 27, and the corresponding PIs and CIs are shown in FIG. 45.

Certain embodiments of the invention include an optical device, which may take the form of (1) an ophthalmic lens, such as contact lens, an eyeglass lens, an intraocular lens or a corneal inlay, or (2) a window, windshield or other optical screens, that includes at least one dye to establish a spectral transmission that includes a spectral plateau which satisfies the following identification criteria:

(1) The spectral window (SW) covers a closed interval [L,M] from a lower wavelength denoted L to a higher wavelength M, and (2) the mean spectral transmittance of the spectral plateau over the domain [L,M] is between 10% (absolute) and 85% (absolute), and (3) the sample standard deviation of the transmittance over the domain [L,M] is no more than 1.65% (absolute), and (4) wavelength L is in the closed interval 390 nanometers (nm) to 480 nm, and (5) wavelength M is less than 501 nm, and (6) the width of the spectral plateau which is equal to M minus L is at least 20 nm, and (7) the difference between maximum and minimum transmittances in the closed interval [L,M] is less than 10%. (The term "thickness" as used in the present specification in the discussing the spectral plateau, means difference between the maximum transmittance of the plateau and the minimum transmittance of the plateau.)

The above enumerated criteria (1)-(7) (and modifications thereof in the case of alternative embodiments discussed below) is referred to herein as the "Spectral Window Success Criteria" (SWSC).

The resolution of the transmission spectrum, and all photometric values, are denominated by 1 nm. That is, the resolution of all photometric values is 1 nm.

Center of a Spectral Plateau is the midpoint wavelength of that Spectral Plateau, rounded to the nearest whole number. Mathematically, $$\text{Spectral Plateau Center} = \text{round}\left(\frac{\text{Wavelength } L + \text{Wavelength } M}{2}\right).$$

The width of a Spectral Plateau is the wavelength range of the Spectral Plateau. Mathematically, Spectral Plateau Width=Wavelength M−Wavelength L, where [L, M] are the starting and ending wavelengths of the Spectral Plateau.

The width of a SW is the wavelength range of the SW. Mathematically, Spectral Window Width=Wavelength M−Wavelength L, where [L,M] are the starting and ending wavelengths of the spectral window.

The thickness of a Spectral Plateau is the spectral transmission range of the Spectral Plateau. Mathematically, Spectral Plateau Thickness=max(transmission)−min(transmission) calculated using all transmission values, i.e. transmittance, in the Spectral Plateau.

In certain embodiments aforementioned, average transmittance bound component (item number 2 of the above enumerated list) of the SWSC meets stricter limits with respect to the average transmittance, namely that the average transmittance is between 15% (absolute) and 80% (absolute). In certain preferred embodiments the aforementioned, the average transmittance of SWSC meets still stricter limits with respect to the average transmittance, in particular that the average transmittance is between 35% (absolute) and 75% (absolute).

The following steps may be used to identify certain (however not necessarily all) spectral plateaus meeting the SWSC. These steps are applied to candidate transmission spectra. For the candidate optical device transmission spectrum:

1. Starting from 390 nm, an initial SW of 20 nm is evaluated using SWSC.
2. Any SW that passes the SWSC, is called a Successful SW. All Successful SWs are saved in memory.
3. For a Successful SW, the wavelength M+1 and the corresponding spectral transmission at wavelength M+1, where wavelength M is the upper bound wavelength of Successful SW, is added into the Successful SW to generate a new SW (NSW). In this particular case, the NSW is 1-nm longer than current Successful SW. In general, a NSW is any new SW.

4. The NSW is evaluated using SWSC.
5. If the NSW passes SWSC, it is the new Successful SW, and Steps 2 through 5 are repeated for each NSW until the next NSW does not pass SWSC.
6. For any NSW, having a width that is 21 nm or longer, that does not pass SWSC, then a Spectral Plateau is the immediately previous Successful SW. In this case the next NSW for evaluation begins will have a new lower bound that is 1 nm longer than the higher bound of the previously identified Spectral Plateau, and will have a new upper bound is 20 nm longer than its own new lower bound, and so has a SW width of 20 nm.
7. For any SW, whose width is 20 nm, that does not pass SWSC, then the NSW for evaluation begins with a NSW whose new lower bound is 1 nm longer than the lower bound of the immediately previous SW that failed the SWSC, and whose new upper bound is 20 nm longer than its own new lower bound, and therefore has a SW width of 20 nm.
8. The algorithm repeats Steps 2-7 until any of the following termination conditions are met:
   A. If the NSW contains a lower bound wavelength (Wavelength L) greater than 480 nm, and/or
   B. If the NSW contains an upper bound wavelength (Wavelength M) greater than 500 nm.

Figure 52:
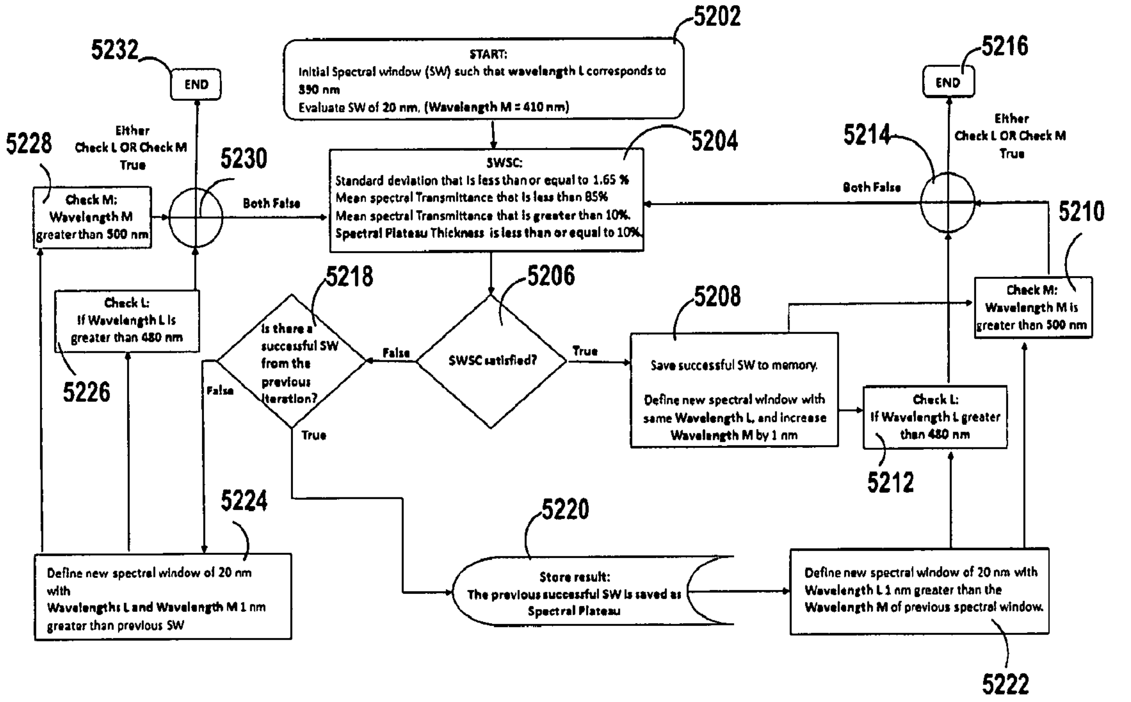
FIG. 52 is a flowchart of a method of identifying at least certain transmission spectra that meet Spectral Window Success Criteria that define certain embodiments of the invention.

FIG. 52 is a flowchart 5200 of a method of identifying at least some transmission spectra that meet Spectral Window Success Criteria that define certain embodiments of the invention. Referring to FIG. 52, in block 5202 an initial SW covering the wavelength range 390 nm to 410 nm is established by setting a wavelength L variable that is a lower SW bound to 390 nm and setting a wavelength variable M that is an upper SW bound to 410 nm. Next in block 5204 the SWSC are evaluated. The initial execution of block 5204 evaluates the SWSC for the SW established in block 5202. Rather than applying the SWSC explicitly listed in block 5204, according to an alternative embodiment the alteration of the SWSC described hereinabove may be applied. The method then executes decision block 5206 the outcome of which depends on whether the SWSC have been satisfied. If the outcome of decision block 5206 is true, then the flowchart 5200 branches to block 5208 in which the SW that met the SWSC (as determined in blocks 5204 and 5206) is stored in memory (and optionally output to a user). Additionally in block 5208 a NSW is defined which has the same lower bound wavelength L but has an upper bound wavelength M that is incremented by 1 relative to the previously established value of M. Next the flowchart executes both block 5210 and block 5212. Block 5210 checks in the wavelength variable M is greater than 500 nm and block 5212 checks if the wavelength variable L is greater than 480 nm. Blocks 5210 and block 5212 have Boolean output and feed into logical OR gate 5214. If the checks of both blocks 5210 and 5212 are false then the OR gate 5214 triggers reexecution of block 5204 which is discussed above. Or, on the other hand, if either block 5210 or 5212 have affirmative (true) output as determined at OR gate 5214 then the flowchart branches to termination block 5216.

Referring again to decision block 5206, in the case that the SWSC is false, then the flowchart 5200 branches to decision block 5218 the outcome of which depends on whether the immediately prior SW evaluated by block 5204 met the SWSC (True) or not (False). (Note: If there is not an immediately prior SW, such as in the first iteration of the flowchart 5200, then it is equivalent to a False outcome.) If the outcome of decision block 5218 is negative (False) then in block 5224 a NSW is defined with wavelength variable L and M (the bounds of the SW) having values incremented by 1 relative to preceding values. After block 5224 both block 5226 and block 5228 are executed. Block 5226 tests if wavelength L is greater than 480 nm and block 5228 tests if wavelength M is greater than 500 nm. Both blocks 5226 and 5228 produce Boolean valued output which is input to logical OR gate 5230. If the result of both blocks 5226 and 5228 is negative then logical OR gate 5230 triggers reexecution of block 5204 with the NSW defined in block 5224. If at least one of the tests performed in blocks 5226, 5228 is positive then the flowchart branches from logical OR gate 5230 to termination block 5232.

Referring again to decision block 5218, in the case that the outcome decision block 5218 is true, then the flowchart 5200 branches to block 5220 in which the previously successful SW is saved as a Spectral Plateau. After executing block 5220, in block 5222 a NSW of 20-nm width for which wavelength L and wavelength M are incremented by 20 nanometers relative to their previous values. Thereafter blocks 5210 and 5212 (described hereinabove) are executed.

Certain embodiments take the form of an optical device that have the following characteristics:

the spectral transmission includes a spectral plateau that has a mean spectral transmittance between 10% (absolute) and 85% (absolute), preferably between 15% (absolute) and 80% (absolute), more preferably between 20% (absolute) and 75% (absolute);

the Spectral Plateau is centered between 400 nm and 630 nm, preferably between 400 nm and 490 nm, and more preferably between 400 nm and 470 nm; the width of the spectral plateau is between 20 nm and 110 nm, preferably between 20 nm and 90, and more preferably between 20 nm and 80 nm;

wavelength L or lower bound of the Spectral Plateau is preferably located between 390 nm and 480 nm, preferably between 390 nm and 460 nm, and even more preferably between 390 nm and 440 nm;

the corresponding transmission of wavelength L is preferably between 10% (absolute) and 85% (absolute), preferably between 15% (absolute) and 80% (absolute);

wavelength M the upper bound of the Spectral Plateau is preferably between 410 nm and 500 nm, and even more preferably between 410 nm and 480 nm;

the corresponding transmission of wavelength M is preferably between 10% (absolute) and 85% (absolute), and more preferably between 15% (absolute) and 85% (absolute);

the thickness of the Spectral Plateau is preferably less than 10% (absolute);

the Spectral Plateau preferably has a sample standard deviation less than 1.65%;

the unweighted average transmittance of all transmission from 380 nm to Wavelength L is at least 5% (absolute) and preferably at least 10% less than average transmittance of the closest centered Spectral Plateau (in cases that there are more than one Spectral Plateau);

the unweighted average transmittance of all transmission from Wavelength M to 650 nm is at least 5% (absolute) and preferably at least 10% more than average transmittance of the closest centered Spectral Plateau;

The average Photopic luminous transmittance when lit by the CIE F2, CIE F7, CIE F11, CIE A, CIE D65, LED-3000K, LED-4000K and LED-5000K illuminants is greater than 60%, preferably greater than 70%; and The average Scotopic luminous transmittance when lit by the CIE F2, CIE F7, CIE F11, CIE A, CIE D65, LED-3000K, LED-4000K and LED-5000K illuminants is greater than 50%, preferably greater than 60%.

Figures 53A, 53C:
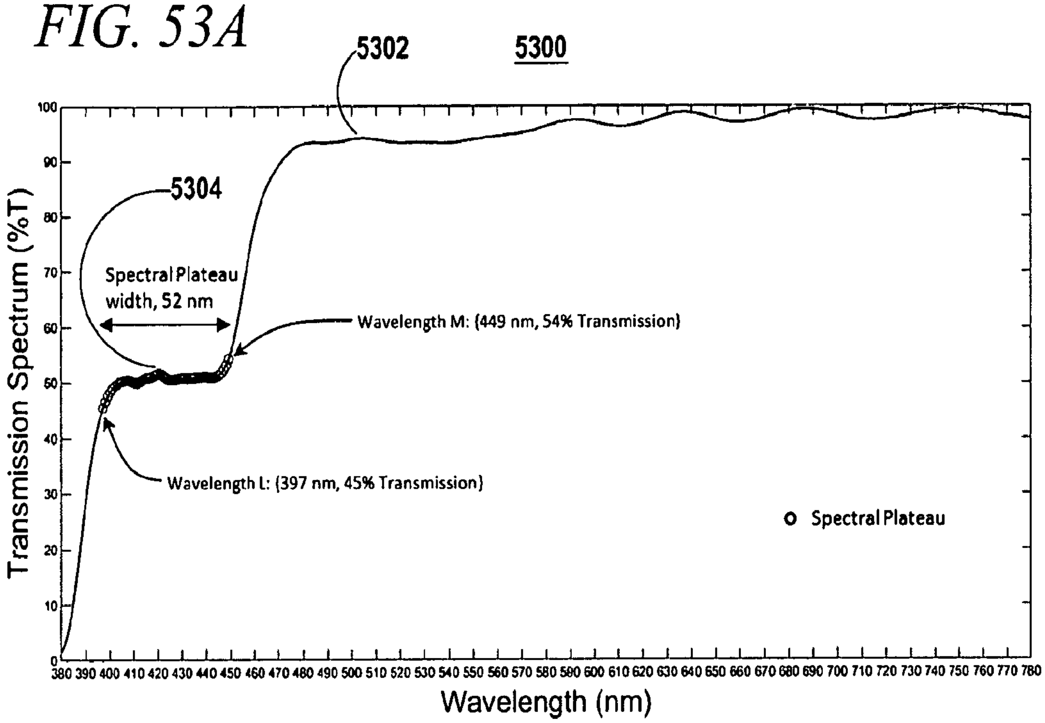
FIG. 53A is a graph including a transmission spectrum for optical device that includes a spectral plateau that meets the Spectral Window Success Criteria defined in FIG. 52 according to one particular embodiment of the invention.
FIG. 53C is a table of photopic and scotopic values for luminous transmittance of the optical device having the transmittance spectrum shown in FIG. 53A when evaluated with a set of 8 standard illuminants, along with average and standard deviation values.

FIG. 53A is a graph 5300 including a transmission spectrum 5302 for an OD that includes a spectral plateau 5304 that meets the SWSC defined in FIG. 52 according to one particular embodiment of the invention. The abscissa of the graph 5300 gives the wavelength in nanometers and the ordinate gives percent transmission. The transmission spectrum 5302 includes an antireflection coating (or other treatment) on both optical surfaces of the OD. The transmission spectrum 5302 includes a Spectral Plateau that satisfies the SWSC.

Referring to FIG. 53A, the spectral plateau 5304 serves to inhibit 50% blue light transmission between 400 nm and 450 nm. The Spectral Plateau is centered at 423 nm. The width of the Spectral Plateau is 52 nm. The thickness of the Spectral Plateau is 9% (absolute). Wavelength L or lower bound of the Spectral Plateau is centered at 397 nm. The corresponding transmission of wavelength L is 45% (absolute). Wavelength M the upper bound of the Spectral Plateau is centered at 449 nm. The corresponding transmission of wavelength M is 54% (absolute). The Spectral Plateau has a sample standard deviation of 1.4%.

The transmission spectrum, along with the Spectral Plateau, as shown in FIG. 53A is created using a mixture of the following dyes: (1) EP5853, which can be purchased from Epolin (Newark, New Jersey, USA), (2) ABS 549, ABS 420, ABS 439 and ABS 415, which can be purchased from Exciton (Lockbourne, OH, USA), and (3) 7,7,8,8-Tetracyanoquinodimethane (TCNQ), which can be purchased from Millipore Sigma (St. Louis, MO, USA). According to certain embodiments, the dye concentrations are: between 0.07 mg/L and 9 mg/L of Epolin's EP5853 dye, between 0.2 mg/L and 30 g/L of Exciton's ABS 549 dye, between 0.003 mg/L and 1 mg/L of Exciton's ABS 420 dye, between 0.02 mg/L and 6 mg/L of Exciton's ABS 439 dye, between 0.005 mg/L and 0.9 mg/L of Exciton's ABS 415 dye, and between 0.04 mg/L and 7 mg/L of TCNQ.

According to one prophetic example, the dye concentrations are: 0.9 mg/L of Epolin's EP5853 dye, 3 mg/L of Exciton's ABS 549 dye, 0.1 mg/L of Exciton's ABS 420 dye, 0.6 mg/L of Exciton's ABS 439 dye, 0.09 mg/L of Exciton's ABS 415 dye, and 0.72 mg/L of TCNQ.

For an OD of different thickness, the spectral absorbance is maintained while the physical length changes, and therefore the concentration must change according to the Beer-Lambert law. A=εc I, where A is the absorbance, ε is the molar attenuation c is the concentration of absorbing species and I is the optical path length. The concentration is proportional to the absorbance divided by physical length. A standard antireflective coating is applied to both optical surfaces of the device (e.g. lens).

In relation to various embodiments described herein having beneficial transmission spectra shown in the figures, the type of polymer matrix used to form an optical device that includes such dyes can change the absorbance of a particular dye, however the loading of the dye can be altered to compensate for the effect of the polymer matrix in order to attain the desired transmission spectrum in accordance with the teachings provided herein. The amount of dye to be used may be determined by making a lens with a trial amount, measuring the absorbance, and adjusting the concentration for a second prototype based on Beer's law to attain a desired amount of absorbance. Such testing is called for because of at least batch-to-batch variability of dye quality, and variability in the effect of polymer matrix material of the lens on the dye absorbance, neither of which are necessarily known in advance of making a lens.

There are many types of polymers used in optical devices, including of polycarbonate (PC), CR39, polyurethanes (e.g. Trivex, Hi-vex), triacetate cellulose, mid- and high-index materials of refractive index of 1.55 and above.

Dye loadings or concentrations can vary in a defined range due to several factors, such as substrate material, dye-dye interactions, dye-UV additive interactions, dye impurities, optical or material thickness.

FIG. 53B is a table of photometric and colorimetric values for the transmission spectrum shown in FIG. 53A. FIG. 53B show, for single-pass and/or double-pass CIs of OS, lit individually by CIE F2, CIE F7, CIE F11, CIE A, CIE D65, LED-3000K, LED-4000K and LED-5000K, the following conditions apply to OS: (i) the a-values, for at least 3 of 8 illuminants, are all less than 5, and (ii) the b-values, for at least 3 of 8 illuminants, are all more than 5. FIG. 53B also manifest a preference for certain embodiments of the invention that at least three single-pass WPSs of OS are each less than 40, preferably less than 35, when the corresponding illuminants are at least three of CIE F2, CIE F7, CIE F11, CIE A, CIE D65, LED-3000K, LED-4000K and LED-5000K. FIG. 53B shows a YI for both single-pass and double-pass lit by CIE D65 illuminant. Lit by CIE D65 illuminant, the YI for single-pass is less than 30, and the YI for double-pass is less than 40, which are preferred limits for certain embodiments of the invention. FIG. 53B shows that there are differences in a-value, b-value and WPS for both single-pass and double-pass when lit by different illuminants. For example, the single-pass a-value when lit by CIE D65 is −7.2, whereas the single-pass a value when lit by CIE LED-5000K is −6.5. FIG. 53B shows, that for single-pass and/or double-pass CIs of OS, lit individually by CIE F2, CIE F7, CIE F11, CIE A, CIE D65, LED-3000K, LED-4000K and LED-5000K, the following conditions apply to OS: (i) The standard deviation of the a-values is less than 9; (ii) The standard deviation of the b-values is less than 9, and (iii) The standard deviation of the WPS values is less than 9.

FIG. 53C shows various Scotopic and Photopic luminous transmittances for the CIE F2, CIE F7, CIE F11, CIE A, CIE D65, LED-3000K, LED-4000K and LED-5000K illuminants. Lit by CIE D65 illuminant, the photopic luminous transmittance of OS is 94% which is within a preferred range of this value of between 60% and 98%. Lit by CIE D65 illuminant, the scotopic luminous transmittance of OS is 88% which is within a preferred range of this value which is between 55% and 95%.

FIG. 54 shows the transmission spectrum of an OD which is an example of a class of embodiments that have the following characteristics: a spectral plateau centered between 400 nm and 480 nm; wavelength L the lower bound of the spectral plateau is between 390 nm and 450 nm; the transmission at wavelength L is between 20% absolute and 85% absolute; wavelength M the upper bound of the spectral plateau is between 410 nm and 490 nm; the transmission at wavelength M is between 20% (absolute) and 85% (absolute); the unweighted average transmittance of all transmission from 380 nm to Wavelength L is at least 10% (absolute) less than average transmittance of the closest centered Spectral Plateau; the unweighted average transmittance of all transmission from Wavelength M to 650 nm is at least 10% (absolute) more than average transmittance of the closest centered Spectral Plateau. Other than a range of 20% to 85%, a more preferred range is 30% to 75%, and an even more preferred range is 35% to 70%.

FIG. 54 is the transmission spectrum of another OD with a Spectral Plateau. (Alternative embodiments may have more than one Spectral Plateau.) It is designed to inhibit 67% blue light transmission between 405 nm and 450 nm. The average transmittance of the Spectral Plateau is 67% (absolute). The Spectral Plateau is centered at 423 nm. The width of the Spectral Plateau is 45 nm. The thickness of the Spectral Plateau is 8% (absolute). Wavelength L of the Spectral Plateau is centered at 406 nm. The corresponding transmission of wavelength L is 63% (absolute). Wavelength M of the Spectral Plateau is centered at 451 nm. The corresponding transmission of wavelength M is 71% (absolute. The Spectral Plateau has a sample standard deviation of 1.6%.

Figures 54A, 54C:
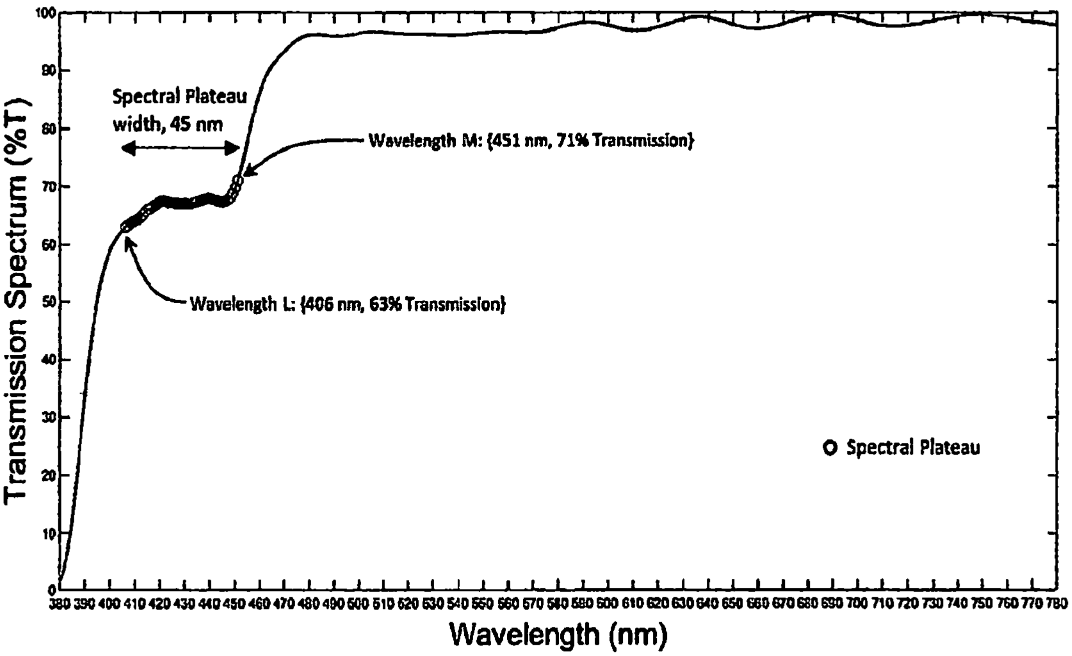
FIG. 54A is a graph including a transmission spectrum for the optical device that includes a spectral plateau that meets the Spectral Window Success Criteria defined in FIG. 52 according to another particular embodiment of the invention.
FIG. 54C is a table of photopic and scotopic values for luminous transmittance of the optical device having the transmittance spectrum shown in FIG. 54A when evaluated with a set of 8 standard illuminants, along with average and standard deviation values.

According to certain embodiments an optical device with a class of transmission spectra of which that shown in FIG. 54A is an example is created using a mixture of the dyes: (1) EP5853, (2) ABS 549, ABS 420, ABS 439 and ABS 415, and (3) TCNQ. According to certain embodiments, the dye concentrations are: between 0.07 mg/L and 7 mg/L of Epolin's EP5853 dye, between 0.2 mg/L and 20 g/L of Exciton's ABS 549 dye, between 0.003 mg/L and 0.3 mg/L of Exciton's ABS 420 dye, between 0.02 mg/L and 2 mg/L of Exciton's ABS 439 dye, between 0.005 mg/L and 0.5 mg/L of Exciton's ABS 415 dye, and between 0.04 mg/L and 5 mg/L of TCNQ. The transmission spectrum shown in FIG. 54 is takes into account that a standard antireflective coating is be applied to both optical surfaces of the optical device, such as an ophthalmological lens.

According to one prophetic example the dye concentrations are: 0.7 mg/L of Epolin's EP5853 dye, 2 mg/L of Exciton's ABS 549 dye, 0.03 mg/L of Exciton's ABS 420 dye, 0.2 mg/L of Exciton's ABS 439 dye, 0.048 mg/L of Exciton's ABS 415 dye, and 0.45 mg/L of TCNQ.

FIG. 54B shows numerous PIs and CIs of the OD, whose transmission spectrum is illustrated in FIG. 54A. FIG. 54B shows that for single-pass and/or double-pass CIs of OS, lit individually by CIE F2, CIE F7, CIE F11, CIE A, CIE D65, LED-3000K, LED-4000K and LED-5000K, the following conditions apply to OS: (i) the a-values, for at least 3 of 8 illuminants, are all less than 4, and (ii) the b-values, for at least 3 of 8 illuminants, are all more than 8. FIG. 54B shows that at least three WPSs of OS are each less than 50, preferably less than 40, when the corresponding illuminants are at least three of CIE F2, CIE F7, CIE F11, CIE A, CIE D65, LED-3000K, LED-4000K and LED-5000K. FIG. 54B shows a YI for both single-pass and double-pass lit by CIE D65 illuminant. Lit by CIE D65 illuminant, the YI for single-pass is less than 30, and the YI for double-pass is less than 40. FIG. 54B shows that there are differences in a-value, b-value and WPS for both single-pass and double-pass when lit by different illuminants. For example, the single-pass a-value when lit by CIE D65 is −5.3, whereas the single-pass a value when lit by CIE LED-5000K is −4.7. FIG. 54B shows, for single-pass and/or double-pass CIs of OS, lit individually by CIE F2, CIE F7, CIE F11, CIE A, CIE D65, LED-3000K, LED-4000K and LED-5000K, the following conditions apply to OS: (i) The standard deviation of the a-values is less than 7, and (ii) The standard deviation of the b-values is less than 7, and (iii) The standard deviation of the WPS values is less than 7. FIG. 54C shows various Scotopic and Photopic luminous transmittances for the CIE F2, CIE F7, CIE F11, CIE A, CIE D65, LED-3000K, LED-4000K and LED-5000K illuminants. Lit by CIE D65 illuminant, the photopic luminous transmittance of OS is 96% or between 65% and 98%. Lit by CIE D65 illuminant, the scotopic luminous transmittance of OS is 92% or between 60% and 95%. The average photopic luminous transmittance when lit by the CIE F2, CIE F7, CIE F11, CIE A, CIE D65, LED-3000K, LED-4000K and LED-5000K illuminants is greater than 60%, preferably greater than 70%. The average Scotopic luminous transmittance when lit by the CIE F2, CIE F7, CIE F11, CIE A, CIE D65, LED-3000K, LED-4000K and LED-5000K illuminants is greater than 50%, preferably greater than 60%.

Figures 55A, 55C:
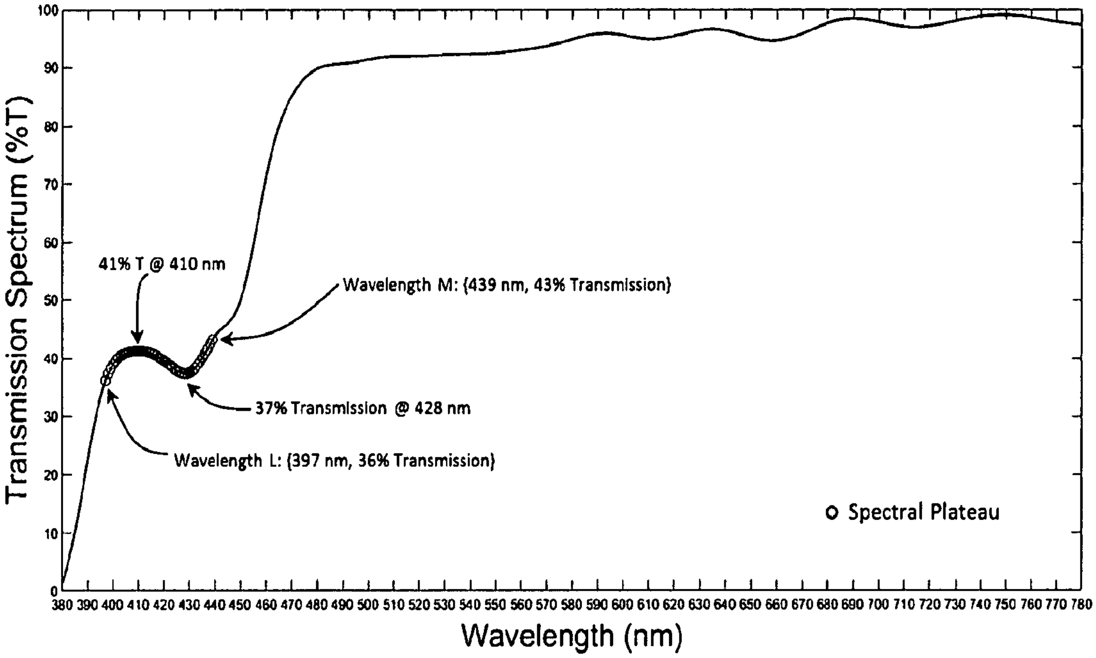
FIG. 55A is a graph including a transmission spectrum for the optical device that includes a spectral plateau that meets the Spectral Window Success Criteria defined in FIG. 52 according to yet another particular embodiment of the invention.
FIG. 55C is a table of photopic and scotopic values for luminous transmittance of the optical device having the transmittance spectrum shown in FIG. 55A when evaluated with a set of 8 standard illuminants, along with average and standard deviation values.

FIG. 55A is a graph including a transmission spectrum for optical device that includes a spectral plateau that meets the Spectral Window Success Criteria defined in FIG. 52 according to yet another particular embodiment of the invention. The transmission spectrum shown in FIG. 55A has an acceptable level of spectral undulation. It is designed to inhibit 60% blue light transmission between 400 nm and 440 nm. The average transmittance of the Spectral Plateau is 40% (absolute). The Spectral Plateau is centered at 418 nm. The width of the Spectral Plateau is 42 nm or between 20 nm and 80 nm. The thickness of the Spectral Plateau is 7% (absolute). Wavelength L of the Spectral Plateau is centered at 397 nm. The corresponding transmission of wavelength L is 36% (absolute). Wavelength M of the Spectral Plateau is centered at 439 nm. The corresponding transmission of wavelength M is 43% (absolute). The Spectral Plateau has a sample standard deviation of 1.6%. The Spectral Plateau contains a local maximum transmission at 410 nm (between wavelength L and wavelength M), with the corresponding spectral transmittance at 41%. The Spectral Plateau contains at least one local minimum transmission at 428 nm or between wavelength L and wavelength M, with the corresponding spectral transmittance at 37%.

The transmission spectrum, along with the Spectral Plateau, as shown in FIG. 55A is created using a mixture of the dyes: (1) EP5853, which can be purchased from Epolin (Newark, New Jersey, USA), (2) ABS 549, ABS 425, which can be purchased from Exciton (Lockbourne, OH, USA), and (3) Hematin, which can be purchased from Millipore Sigma (St. Louis, MO, USA). According to certain embodiments including the embodiment having the transmission spectrum shown in FIG. 55A the dye concentrations are: between 0.01 mg/L and 15 mg/L of Epolin's EP5853 dye, between 0.02 mg/L and 20 g/L of Exciton's ABS 549 dye, between 0.001 mg/L and 2 mg/L of Exciton's ABS 425 dye, between 0.01 mg/L and 15 mg/L of Hematin. According to one prophetic example the dye concentrations are: 1.5 mg/L of Epolin's EP5853 dye, 1.8 mg/L of Exciton's ABS 549 dye, 0.2 mg/L of Exciton's ABS 425 dye, and 1.5 mg/L of Hematin. The transmission spectrum shown in FIG. 55A is takes into account that a standard antireflective coating is applied to both optical surfaces of the device (e.g. ophthalmological lens).

FIG. 55B shows numerous PIs and CIs of the OD, whose transmission spectrum is illustrated in FIG. 55A. FIG. 55B shows, for single-pass and/or double-pass CIs of OS, lit individually by CIE F2, CIE F7, CIE F11, CIE A, CIE D65, LED-3000K, LED-4000K and LED-5000K, the transmission spectrum shown in FIG. 55A exemplifies the following characteristics that are common to a class of embodiments: (i) the a-values, for at least 3 of 8 illuminants, are all less than 3, and (ii) the b-values, for at least 3 of 8 illuminants, are all more than 15; at least three WPSs of OS are each less than 30, preferably less than 25, when the corresponding illuminants are at least three of CIE F2, CIE F7, CIE F11, CIE A, CIE D65, LED-3000K, LED-4000K and LED-5000K; a YI for both single-pass and double-pass lit by CIE D65 illuminant; when lit by the CIE D65 illuminant, the YI for single-pass is less than 40, and the YI for double-pass is less than 60. FIG. 55B shows that there are differences in a-value, b-value and WPS for both single-pass and double-pass when lit by different illuminants. For example, the single-pass a-value when lit by CIE D65 is −9.1, whereas the single-pass a value when lit by CIE LED-5000K is −7.9.

FIG. 55B shows, for single-pass and/or double-pass CIs of OS, lit individually by CIE F2, CIE F7, CIE F11, CIE A, CIE D65, LED-3000K, LED-4000K and LED-5000K, the transmission spectrum shown in FIG. 55A exemplifies the following characteristics that are common to a class of embodiments: (i) the standard deviation of the a-values is less than 12, and (ii) the standard deviation of the b-values is less than 12, and (iii) the standard deviation of the WPS values is less than 12.

FIG. 55C shows various Scotopic and Photopic luminous transmittances for the CIE F2, CIE F7, CIE F11, CIE A, CIE D65, LED-3000K, LED-4000K and LED-5000K illuminants.

FIG. 55B shows that the transmission spectrum shown in FIG. 55A exemplifies the following characteristics that are common to a class of embodiments: the spectral plateau is centered between 400 nm and 490 nm, (in a more restricted class of embodiments the spectral plateau is centered between 400 nm and 470 nm); the Spectral Plateau has a local maximum transmission of between 15% (absolute) and 85% (absolute); the Spectral Plateau has at least one local minimum transmission of between 15% (absolute) and 85% (absolute); when lit by the CIE D65 illuminant, the photopic luminous transmittance of OS is between 60% and 96%; when lit by CIE D65 illuminant, the scotopic luminous transmittance of OS is between 45% and 95%; the average photopic luminous transmittance when lit by the CIE F2, CIE F7, CIE F11, CIE A, CIE D65, LED-3000K, LED-4000K and LED-5000K illuminants is greater than 60%, preferably greater than 70%; and the average Scotopic luminous transmittance when lit by the CIE F2, CIE F7, CIE F11, CIE A, CIE D65, LED-3000K, LED-4000K and LED-5000K illuminants is greater than 50%, preferably greater than 60%.

Figures 56A, 56C:
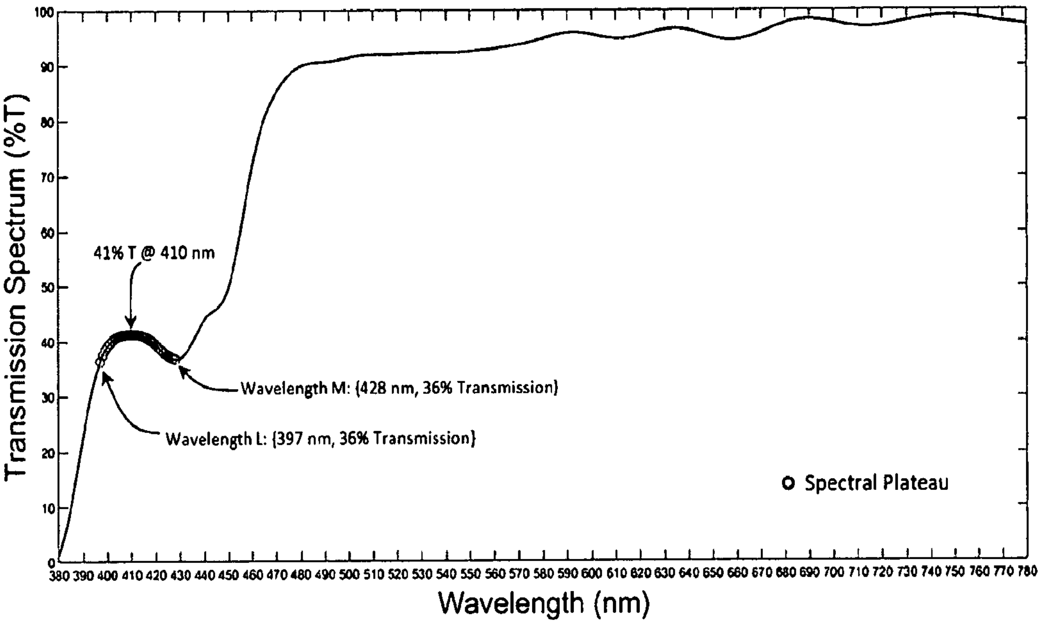
FIG. 56A is a graph including a transmission spectrum for the optical device that includes a spectral plateau that meets the Spectral Window Success Criteria defined in FIG. 52 according to yet another particular embodiment of the invention.
FIG. 56C is a table of photopic and scotopic values for luminous transmittance of the optical device having the transmittance spectrum shown in FIG. 56A when evaluated with a set of 8 standard illuminants, along with average and standard deviation values.

FIG. 56A is a graph including a transmission spectrum for optical device that includes a spectral plateau that meets the Spectral Window Success Criteria defined in FIG. 52 according to yet another particular embodiment of the invention. The difference between the BLF spectrum in FIG. 55A and FIG. 56A is that in FIG. 56A the ABS 425 dye is loaded slightly more to create a local minimum transmission of 35.5% at 429 nm instead of a local minimum transmission of 37% at 428 nm in FIG. 55A. If the lower minimum transmission point in FIG. 56A is included in the Spectral Plateau, the point would increase the sample standard deviation of the entire Spectral Plateau to above 1.65%, which unacceptable. Therefore, the Spectral Plateau in FIG. 56A stops at a Wavelength M of 428 nm with transmission of 36%. This embodiment illustrates the small deviations allowable in the transmission values of the Spectral Plateau.

FIG. 56B shows numerous PIs and CIs of the OD, whose transmission spectrum is illustrated in FIG. 56A. FIG. 56B shows that the transmission spectrum shown in FIG. 56A exemplifies the following characteristics that are common to a class of embodiments: for single-pass and/or double-pass CIs of OS, lit individually by CIE F2, CIE F7, CIE F11, CIE A, CIE D65, LED-3000K, LED-4000K and LED-5000K, the following conditions apply to OS: (i) its a-values, for at least 3 of 8 illuminants, are all less than 1, and (ii) its b-values, for at least 3 of 8 illuminants, are all more than 20.

FIG. 56B shows that the transmission spectrum shown in FIG. 56A exemplifies the following characteristics that are common to a class of embodiments: at least three WPSs of OS are each less than 30, preferably less than 25, when the corresponding illuminants are at least three of CIE F2, CIE F7, CIE F11, CIE A, CIE D65, LED-3000K, LED-4000K and LED-5000K.

FIG. 56B shows that the transmission spectrum shown in FIG. 56A exemplifies the following characteristics that are common to a class of embodiments: lit by the CIE D65 illuminant, the YI for single-pass is less than 50, and the YI for double-pass is less than 70.

FIG. 56B also shows that there are differences in a-value, b-value and WPS for both single-pass and double-pass when lit by different illuminants. For example, the single-pass a-value when lit by CIE D65 is −9.1 whereas the single-pass a value when lit by CIE LED-5000K is −7.9.

FIG. 56B shows that the transmission spectrum shown in FIG. 56A exemplifies the following characteristics that are common to a class of embodiments: for single-pass and/or double-pass CIs of OS, lit individually by CIE F2, CIE F7, CIE F11, CIE A, CIE D65, LED-3000K, LED-4000K and LED-5000K, the following conditions apply to OS: (i) the standard deviation of the a-values is less than 11, (ii) the standard deviation of the b-values is less than 11, and (iii) the standard deviation of the WPS values is less than 11.

FIG. 56C shows various Scotopic and Photopic luminous transmittances for the CIE F2, CIE F7, CIE F11, CIE A, CIE D65, LED-3000K, LED-4000K and LED-5000K illuminants. FIG. 56C shows that the transmission spectrum shown in FIG. 55A exemplifies the following characteristics that are common to a class of embodiments: lit by CIE D65 illuminant, the photopic luminous transmittance of OS is between 60% and 98%; lit by CIE D65 illuminant, the scotopic luminous transmittance of OS is between 55% and 95%; the average Photopic luminous transmittance when lit by the CIE F2, CIE F7, CIE F11, CIE A, CIE D65, LED-3000K, LED-4000K and LED-5000K illuminants is greater than 60%, preferably greater than 70%; the average Scotopic luminous transmittance when lit by the CIE F2, CIE F7, CIE F11, CIE A, CIE D65, LED-3000K, LED-4000K and LED-5000K illuminants is greater than 50%, preferably greater than 60%.

Figure 57A:
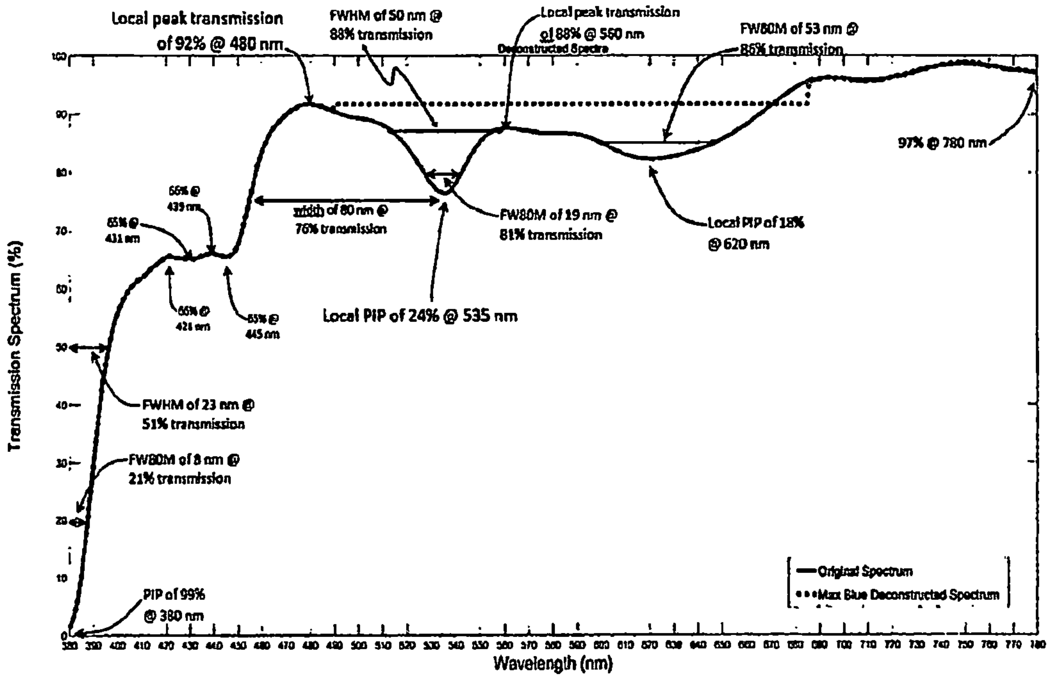
FIG. 57A is a graph including a transmission spectrum for the optical device that includes a spectral plateau that meets the Spectral Window Success Criteria defined in FIG. 52 according to yet another particular embodiment of the invention.

FIG. 57A illustrates the Original Spectrum of another SMVF (OD) and its MBDS. Wavelength A is 490 nm, and Wavelength B is 685 nm. The corresponding Max Blue Transmission is 92%.

All modifications to an OD's transmission spectrum between 400 nm and 500 nm from 100% transmission constitute a blue-light filter, thus termed Blue-Light Filter (BLF). BLF region is between 400 nm and 500 nm.

All modifications to an OD's transmission spectrum between 380 nm and 400 nm from 100% transmission constitute a violet-light filter, thus termed Violet-Light Filter (VLF). VLF region is between 380 nm and 400 nm.

According to certain embodiments transmission at 400 nm is preferably at least 5% absolute and more preferably at least 10% absolute and the transmission in the VLF region is at least 10% preferably at least 20%.

All modifications to an OD's transmission spectrum between 500 nm and 780 nm from 100% transmission constitute a color balancing filter for the whole OD from 380 nm to 780 nm, thus termed Color Balancing Filter (CBF). CBF region is between 500 nm and 780 nm.

As seen in FIG. 57A, there is at least one inhibition band and one Spectral Plateau centered between 380 nm and 500 nm that modify the transmission spectrum of the OD, respectively: (1) at least one inhibition peak at 380 nm or between 380 nm and 500 nm, inclusive, inhibits 99% or at least 40% of the incident light; the inhibition band has a FWHM of 23 nm or at least 10 nm, and has a FW80M of 8 nm or at least 5 nm, and (2) at least one Spectral Plateau centered at 428 nm or between 400 nm and 470 nm, has an average transmittance of 65% or between 30% and 92%, with a width of 45 nm or at least 20 nm.

Specifically in FIG. 57A, there is one inhibition band and one Spectral Plateau centered between 380 nm and 480 nm. There are two pass-bands centered between 450 nm and 620 nm.

The Spectral Plateau has a thickness of 8% transmission. There may be one or more "spectral ripples" in a Spectral Plateau, such as at 421 nm with 66% transmission, at 431 nm with 65% transmission, at 439 nm with 66% transmission, and at 445 nm with 65% transmission. The existence of, or lack thereof, spectral ripples in a Spectral Plateau is acceptable.

The OS has at least one pass-band centered at 480 nm or between 430 nm and 510 nm, has a peak transmission of 92% or at least 80% and a Pass-band Width of 80 nm, at 76% transmission; in general, such pass-band width is at least 40 nm. Pass-band Width is defined as the wavelength difference between (1) and (2), where (1) is the wavelength of the transmission valley of the inhibition-band immediately adjacent to and at a longer wavelength than the center of pass-band, and (2) is the longest wavelength which is still shorter than (1), and its corresponding transmission is the same as the transmission corresponding to (1). {00878-} FIG. 57A shows that the OS has (1) two inhibition bands, or at least one inhibition band, centered between 500 nm and 720 nm, and at least one inhibition band centered between 510 nm and 610 nm, and (2) 3 pass-bands, or at least two pass-bands, centered between 460 nm and 780 nm, inclusive.

For the OS, the unweighted average transmittance in the VLF region is 29%.

For the spectrum in FIG. 57A, 8 dyes, are dispersed into a 2 mm center thickness, 72 mm in diameter, round lens of PC material. The dyed lens is constructed by (1) mixing all dyes into uncolored PC polymer pellets via compounding, and (2) injection molding the dyed PC pellets into lens mold. Additional cutting, grinding, polishing, tinting, temperature treatments and/or surface treatments, such as an anti-reflective (AR) coating, may be applied to the OD. Dye compounding may be aided by mixing the dyes with a solvent, such as methanol or dichloromethane, prior to or during mixing with polymer.

Epolin sells (1) the Epolight 5838 dye that will substantially create the inhibition band centered around 535 nm, with a dye loading of 0.3 mg to 60 mg per 3 lb of PC material, and (2) the Epolight 5411 dye that will substantially create the inhibition band at around 620 nm, with a dye loading of 0.3 mg to 60 mg per 3 lb of PC material. To create the VLF and BLF in FIG. 57A, the following dyes are used: between 0.07 mg/L and 7 mg/L of Epolin's EP5853 dye, between 0.2 mg/L and 20 g/L of Exciton's ABS 549 dye, between 0.003 mg/L and 0.3 mg/L of Exciton's ABS 420 dye, between 0.02 mg/L and 2 mg/L of Exciton's ABS 439 dye, between 0.005 mg/L and 0.5 mg/L of Exciton's ABS 415 dye, and between 0.04 mg/L and 5 mg/L of TCNQ (7,7,8,8-tetracyanoquinodimethane). Millipore Sigma (St. Louis, MO, USA) is one of many suppliers of TCNQ. According to a specific prophetic example to create the VLF and BLF in FIG. 57A, the following dyes are used: 0.7 mg/L of Epolin's EP5853 dye, 2 mg/L of Exciton's ABS 549 dye, 0.03 mg/L of Exciton's ABS 420 dye, 0.2 mg/L of Exciton's ABS 439 dye, 0.048 mg/L of Exciton's ABS 415 dye, and 0.45 mg/L of TCNQ (7,7,8,8-tetracyanoquinodimethane).

An optical device having the transmission spectrum shown in FIG. 57A exemplifies a class of embodiments that have the following characteristics: (1) there is at least one inhibition band, preferably at least two inhibition bands, centered between 500 nm and 720 nm, and (2) at least two pass-bands centered between 460 nm and 780 nm, inclusive. For at least one such inhibition band, its FW80M is between 8 nm and 100 nm, and such band has a PIP of between 5% and 50%.

Furthermore, if one or more inhibition bands is centered between: (i) 500 nm and 560 nm, then the band has a PIP of at most 50%, (ii) 590 nm and 640 nm, then the band has a PIP of at most 50%

If one or more pass-bands is centered between: (i) 465 nm and 520 nm, then the band's peak transmission is at least 60%; (i) 530 nm and 600 nm, then the band's peak transmission is at least 60% (ii) 620 nm and 780 nm, then the band's peak transmission is at least 60%.

The center of at least one Spectral Plateau is (1) at a shorter wavelength than that of the center of at least one pass-band, and shorter by at least 5 nm, and (2) at a longer wavelength than that of the center of at least one inhibition band, and longer by at least 5 nm.

The average transmittance of at least one Spectral Plateau is (1) lower than peak transmission of at least one pass-band, and lower by at least 5% (absolute), and (2) higher than valley transmission of at least one inhibition band, and higher by at least 5% (absolute).

For the OS, the unweighted average transmittance in the VLF region is at least 5% (absolute) less than average transmittance of at least one Spectral Plateau in the BLF region.

For the OS, there is at least one pass-band centered within the BLF region and such pass-band has a peak transmission of at least 60%, preferably at least 65%, more preferably at least 70%, and even more preferably at least 75%.

For the OS, there is at least one inhibition band centered within CBF region, preferably centered between 515 nm and 615 nm, with a FW80M between 8 nm and 100 nm. The transmission level corresponding to such FW80M is at least 2% lower, preferably at least 5% lower, than peak transmission of at least one pass-band centered at a shorter wavelength than that of the inhibition band.

In the CBF region, there exists (1) an inhibition band centered closest to and longer than 500 nm, denoted inhibition band-500, and (2) an inhibition band centered closest to 640 nm, denoted inhibition band-640. In alternative embodiments it is possible to have one band that serves as inhibition band-500 and inhibition band-640 be the same inhibition band. Such a single inhibition band may be established by added Epolight 5824 made by Epolin to an optical device.

In the BLF region, there exists one Spectral Plateau centered closest to 470 nm, denoted Spectral Plateau-470.

The following conditions apply to the inhibition band-500, inhibition band-640 and Spectral Plateau-470: (i) Wavelength distance between center of inhibition band-500 and center of Spectral Plateau-470 is between 50 nm and 170 nm; (ii) Wavelength distance between center of inhibition band-500 and center of inhibition band-640 is between 50 nm and 150 nm; (iii) The difference in the PIPs of inhibition band-500 and inhibition band 640 is less than 30% (absolute), including 0% (absolute); and (iv) The width of the Spectral Plateau-470 is at least 15 nm shorter than (i).

For an OS having at least 2 pass-bands centered between 465 nm and 780 nm, inclusive, there exists, (1) the pass-band centered closest to 465 nm is denoted pass-band-465, and (2) the pass-band centered closest to inhibition band-500, and is centered between inhibition band-500 and inhibition band-640 is denoted pass-band-500.

The following conditions apply to the described pass-bands, inhibition bands, and Spectral Plateau-470 in OS of OD:

(viii) Peak transmissions of pass-band-465 and pass-band-500 are all 60% or more, preferably at least 65% and more preferably at least 70%, and (ix) The lowest peak transmission of the peak transmissions of pass-band-465 and pass-band-500 is higher than the average transmittance of Spectral Plateau-470 by at least 3%, preferably at least 6%, and (x) Peak transmissions of pass-band-465 and pass-band-500 are within 30%, preferably within 20%, of each other, and (xi) Wavelength distance between center of pass-band-465 and center of Spectral Plateau-470 is between 30 nm and 110 nm, and (xii) Wavelength distance between center of pass-band-465 and center of pass-band-500 is at least 40 nm.

Figure 58A:
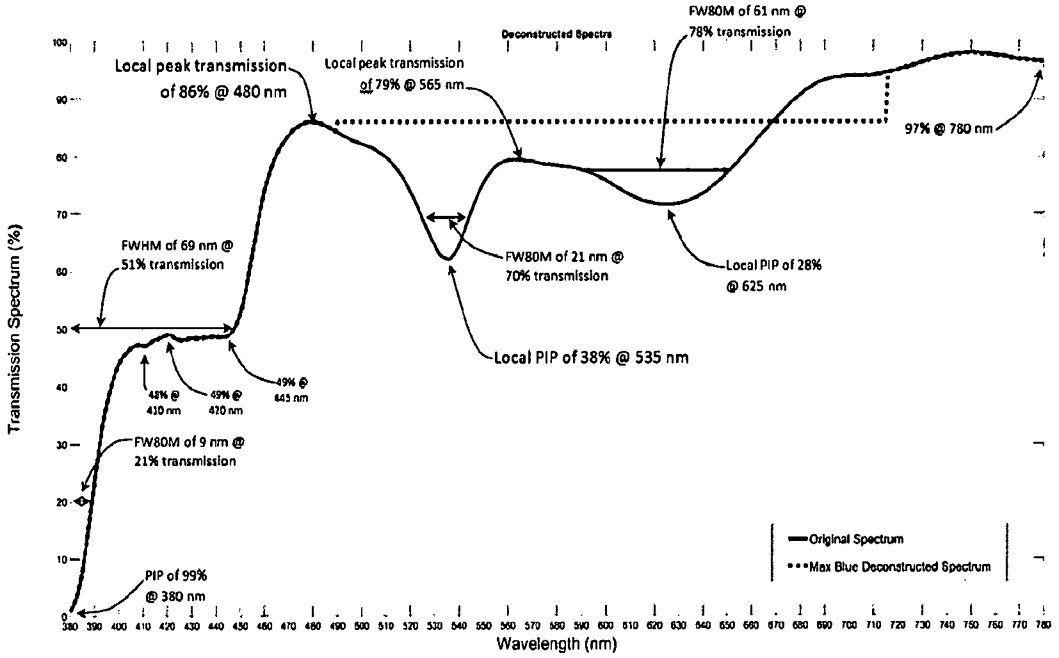
FIG. 58A is a graph including a transmission spectrum for the optical device that includes a spectral plateau that meets the Spectral Window Success Criteria defined in FIG. 52 according to yet another particular embodiment of the invention.

FIG. 58A illustrates the Original Spectrum of yet another OS of an OD and its MBDS. Wavelength A is 490 nm, and Wavelength B is 715 nm. The corresponding Max Blue Transmission is 86%.

As seen in FIG. 58A, there is one inhibition band and one Spectral Plateau centered between 380 nm and 500 nm that modifies the transmission spectrum of the OD, in particular: (1) one inhibition peak at 380 nm, inhibits 99% of the incident light; the inhibition band has a FWHM of 69 nm, and has a FW80M of 9 nm, and (2) at least one Spectral Plateau centered at 423 nm, has an average transmittance of 48%, with a width of 53 nm.

The Spectral Plateau has a thickness of 10% transmission. There are "spectral ripples" in a Spectral Plateau, such as at 410 nm with 48% transmission, at 420 nm with 49% transmission, and at 445 nm with 49% transmission. The existence of these spectral ripples or undulations are acceptable in a Spectral Plateau.

The CBF portion of the transmission spectrum of the OD, as shown in FIG. 58A, obeys the same limitations or requirements as the CBF portion of the transmission spectrum of the OD shown in FIG. 57A.

For the spectrum in FIG. 58A, 8 dyes, are dispersed into a 2 mm center thickness, 75 mm in diameter, round lens of PC material. The dyed lens is constructed by (1) mixing all dyes into uncolored PC polymer pellets via compounding, and (2) injection molding the dyed PC pellets into lens mold. Additional cutting, grinding, polishing, tinting, temperature treatments and/or surface treatments, such as an anti-reflective (AR) coating, may be applied to the OD.

Epolin has (1) the Epolight 5838 dye that will substantially create the inhibition band centered around 535 nm, with a dye loading of 0.3 mg to 60 mg per 3 lb of PC material, and (2) the Epolight 5411 dye that will substantially create the inhibition band at around 625 nm, with a dye loading of 0.3 mg to 60 mg per 3 lb of PC material. To create the VLF and BLF in FIG. 58A, the following dyes are used: between 0.07 mg/L and 9 mg/L of Epolin's EP5853 dye, between 0.2 mg/L and 30 g/L of Exciton's ABS 549 dye, between 0.003 mg/L and 1 mg/L of Exciton's ABS 420 dye, between 0.02 mg/L and 6 mg/L of Exciton's ABS 439 dye, between 0.005 mg/L and 0.9 mg/L of Exciton's ABS 415 dye, and between 0.04 mg/L and 7 mg/L of TCNQ. According to a prophetic example, to create the VLF and BLF in FIG. 58A, the aforementioned dyes are used in the following amounts: 0.9 mg/L of Epolin's EP5853 dye, 3 mg/L of Exciton's ABS 549 dye, 0.1 mg/L of Exciton's ABS 420 dye, 0.6 mg/L of Exciton's ABS 439 dye, 0.09 mg/L of Exciton's ABS 415 dye, and 0.72 mg/L of TCNQ.

FIG. 58B shows numerous PIs and CIs of the OD, having the transmission spectrum is illustrated in FIG. 58A. FIG. 58B show three or more WPS values of OS when lit by three or more corresponding illuminants selected from the set of CIE F2, CIE F7, CIE F11, CIE A, CIE D65, LED-3000K, LED-4000K and LED-5000K illuminants are (1) lower than (i) by between 3 and 30, preferably between 4 and 25. (i) is three or more WPS values of MBDS. WPS values are lit by any illuminant(s) selected from the same set of illuminants of CIE F2, CIE F7, CIE F11, CIE A, CIE D65, LED-3000K, LED-4000K and LED-5000K illuminants.

Lit by CIE D65 illuminant, the photopic luminous transmittance of OS is 75%, and that of MBDS is 85%. The difference between photopic luminous transmittances of OS and MBDS is 10%.

Lit by CIE D65 illuminant, the scotopic luminous transmittance of OS is 75%, and that of MBDS is 81%. The difference between scotopic luminous transmittances of OS and MBDS is 6%.

Figure 59A:
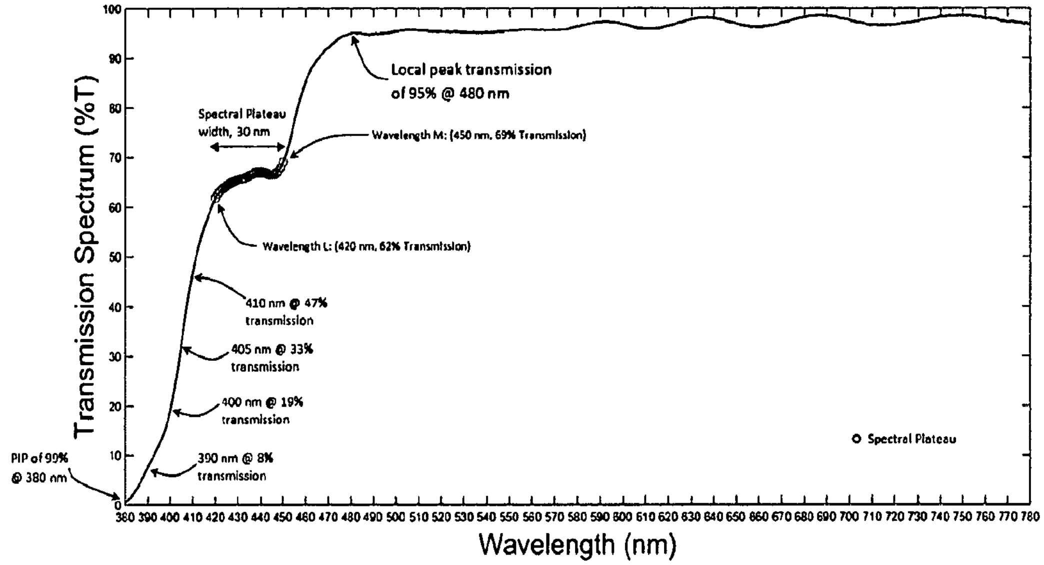
FIG. 59A is a graph including a transmission spectrum for the optical device that includes a spectral plateau that meets the Spectral Window Success Criteria defined in FIG. 52 according to yet another particular embodiment of the invention.

An optical device having the transmission spectrum shown in FIG. 58A exemplifies a class of embodiments that have the following characteristics: The corresponding Max Blue Transmission is above 70%; there is at least one inhibition band and one Spectral Plateau centered between 380 nm and 500 nm that modifies the transmission spectrum of the OD, respectively: (1) at least one inhibition peak at 380 nm or between 380 nm and 500 nm, inclusive, inhibits at least 60% of the incident light; the inhibition band has a FWHM of at most 90 nm, and has a FW80M of at least 5 nm, and (2) at least one Spectral Plateau centered between 400 nm and 470 nm, has an average transmittance between 20% and 80%, with a width of at least 20 nm; the Spectral Plateau has a thickness no more than 10% transmission (absolute); there may be one or more "spectral ripples" in a Spectral Plateau; three or more WPS values of OS when lit by three or more corresponding illuminants selected from the set of CIE F2, CIE F7, CIE F11, CIE A, CIE D65, LED-3000K, LED-4000K and LED-5000K illuminants are (1) lower than (i) by between 3 and 30, preferably between 4 and 25. (i) is three or more WPS values of MBDS. WPS values are lit by any illuminant(s) selected from the same set of illuminants of CIE F2, CIE F7, CIE F11, CIE A, CIE D65, LED-3000K, LED-4000K and LED-5000K illuminants; at least three WPSs of OS are each less than 25, preferably less than 20, when the corresponding illuminants are at least three of CIE F2, CIE F7, CIE F11, CIE A, CIE D65, LED-3000K, LED-4000K and LED-5000K; for single-pass and/or double-pass WPSs, the range of WPSs of OS is at least 0.5 units, preferably at least 1 unit, less than that of MBDS; lit by CIE D65 illuminant, the photopic luminous transmittance of OS is between 60% and 95%, and that of MBDS is between 60% and 95%; the difference between photopic luminous transmittances of OS and MBDS is less than 25%; lit by CIE D65 illuminant, the scotopic luminous transmittance of OS is between 60% and 95%, and that of MBDS is between 60% and 95%.; the difference between scotopic luminous transmittances of OS and MBDS is less than 20%; under D65 illuminant, (i) is larger than (ii) by at least 1%, where (i) is the difference between photopic luminous transmittances of OS and MBDS, and (ii) is the difference between scotopic luminous transmittances of OS and MBDS. FIG. 59A is the transmission spectrum of another OD with a Spectral Plateau. It is designed to inhibit 66% blue light transmission between 420 nm and 450 nm. The average transmittance of the Spectral Plateau is 66% (absolute). The Spectral Plateau is centered at 435 nm. The width of the Spectral Plateau is 30 nm. The thickness of the Spectral Plateau is 7% (absolute). Wavelength L of the Spectral Plateau is centered at 420 nm. The corresponding transmission of wavelength L is 62% (absolute). Wavelength M of the Spectral Plateau is centered at 450 nm. The corresponding transmission of wavelength M is 69% (absolute). The Spectral Plateau has a sample standard deviation of 1.58%

The transmittance of the OD at 380 nm, 390 nm, 400 nm, 405 nm, 410 nm and 420 nm are 1%, 8%, 19%, 33%, 47% and 62%.

For the spectrum in FIG. 59A, at least 1 dye, is dispersed into the material of the OD. For example, the OD is a 2 mm center thickness, 68 mm in diameter, round lens of PC material. The dyed lens is constructed by (1) mixing all dyes into uncolored PC polymer pellets via compounding, and (2) injection molding the dyed PC pellets into lens mold. Additional cutting, grinding, polishing, tinting, temperature treatments and/or surface treatments, such as an anti-reflective (AR) coating, may be applied to the OD.

According to one prophetic example, the transmission spectrum, along with the Spectral Plateau, as shown in FIG. 59A is created using a mixture of the dyes: (1) EP5853, (2) ABS 549, ABS 420, ABS 439 and ABS 415, and (3) TCNQ. The dye concentrations are: 0.7 mg/L of Epolin's EP5853 dye, 2 mg/L of Exciton's ABS 549 dye, 0.03 mg/L of Exciton's ABS 420 dye, 0.2 mg/L of Exciton's ABS 439 dye, 0.048 mg/L of Exciton's ABS 415 dye, 0.45 mg/L of TCNQ, and 1.1 mg/L of Crysta-lyn's DLS 386A dye (Crysta-lyn Chemical Company, 6 Emma St. Binghamton, NY 13905). A standard antireflective coating was applied to both optical surfaces of the device (lens).

FIG. 59B shows numerous PIs and CIs of the OD, whose transmission spectrum is illustrated in FIG. 59A.

FIG. 59B show, for single-pass and/or double-pass CIs of OS, lit individually by CIE F2, CIE F7, CIE F11, CIE A, CIE D65, LED-3000K, LED-4000K and LED-5000K, the following conditions apply to OS:

(i) the a-values, for at least 3 of 8 illuminants, are all less than 5, and (ii) the b-values, for at least 3 of 8 illuminants, are all more than 5.

FIG. 59B shows at least two WPSs of OS are each less than 45, preferably less than 35, when the corresponding illuminants are at least two of CIE F2, CIE F7, CIE F11, CIE A, CIE D65, LED-3000K, LED-4000K and LED-5000K.

Lit by CIE D65 illuminant, the YI for single-pass is less than 30, and the YI for double-pass is less than 45.

FIG. 59B shows that there are differences in a-value, b-value and WPS for both single-pass and double-pass when lit by different illuminants. For example, the single-pass a-value when lit by CIE D65 is −5.6, whereas the single-pass a value when lit by CIE LED-4000K is −2.2; the double-pass b-value when lit by CIE A is 19.4, whereas the double-pass b-value when lit by CIE LED-5000K is −29.1.

FIG. 59B show, for single-pass and/or double-pass CIs of OS, lit individually by CIE F2, CIE F7, CIE F11, CIE A, CIE D65, LED-3000K, LED-4000K and LED-5000K, the following conditions apply to OS:

(i) The standard deviation of the a-values is less than 8, and (ii) The standard deviation of the b-values is less than 8, and (iii) The standard deviation of the WPS values is less than 8.

FIG. 59B shows various scotopic and photopic luminous transmittances for the CIE F2, CIE F7, CIE F11, CIE A, CIE D65, LED-3000K, LED-4000K and LED-5000K illuminants.

Lit by CIE D65 illuminant, the photopic luminous transmittance of OS is 95%.

Lit by CIE D65 illuminant, the scotopic luminous transmittance of OS is 91%.

FIG. 59A is an exemplar of a class of embodiments that have characteristics described below. The average transmittance of the Spectral Plateau between 15% and 80%. The Spectral Plateau is centered between 400 nm and 480 nm. The width of the Spectral Plateau is between 20 nm and 80 nm. The thickness of the Spectral Plateau is less than 10% (absolute). Wavelength L of the Spectral Plateau is centered between 390 nm and 450 nm. The corresponding transmission of wavelength L is between 20% (absolute) and 85% (absolute). Wavelength M of the Spectral Plateau is centered between 420 nm and 490 nm. The corresponding transmission of wavelength M is between 20% (absolute) and 85% (absolute). The Spectral Plateau has a sample standard deviation of less than 1.65%.

The unweighted average transmittance of all transmission from 380 nm, preferably from 400 nm, to Wavelength L is at least 10% (absolute) less than average transmittance of the closest centered Spectral Plateau.

The unweighted average transmittance of all transmission from Wavelength M to 650 nm is at least 5% (absolute), preferably at least 10% (absolute), more than average transmittance of the closest centered Spectral Plateau.

St least one of maximum transmittance or average transmittance of OD between 380 nm and 400 nm is less than 50%, preferably less than 40%, more preferably less than 30% and even more preferably less than 20%. At least one of minimum transmittance or average transmittance of OD between 400 nm and 410 nm is less than 50%, preferably less than 40%, and more preferably less than 30%.

In some instances, it is acceptable for average transmittance between 380 nm and 400 nm, and preferably between 400 nm and 405 nm to be 0% or less than 10%.

The transmission spectrum, along with the Spectral Plateau, as shown in FIG. 59A is created using a mixture of the dyes: (1) EP5853, (2) ABS 549, ABS 420, ABS 439 and ABS 415, and (3) TCNQ. The dye concentrations may be between 0.07 mg/L and 7 mg/L of Epolin's EP5853 dye, between 0.2 mg/L and 20 g/L of Exciton's ABS 549 dye, between 0.003 mg/L and 0.3 mg/L of Exciton's ABS 420 dye, between 0.02 mg/L and 2 mg/L of Exciton's ABS 439 dye, between 0.005 mg/L and 0.5 mg/L of Exciton's ABS 415 dye, between 0.04 mg/L and 5 mg/L of TCNQ, and between 0.1 mg/L and 10 mg/L of Crysta-lyn's DLS 386A dye (Crysta-lyn Chemical Company, 6 Emma St. Binghamton, NY 13905). A standard antireflective coating was applied to both optical surfaces of the device (lens).

FIG. 59B shows numerous PIs and CIs of the OD, whose transmission spectrum is illustrated in FIG. 59A.

FIG. 59B shows at least two WPSs of OS are each less than 45, preferably less than 35, when the corresponding illuminants are at least two of CIE F2, CIE F7, CIE F11, CIE A, CIE D65, LED-3000K, LED-4000K and LED-5000K.

Lit by CIE D65 illuminant, the YI for single-pass is less than 30, and the YI for double-pass is less than 45.

FIG. 59B show, for single-pass and/or double-pass CIs of OS, lit individually by CIE F2, CIE F7, CIE F11, CIE A, CIE D65, LED-3000K, LED-4000K and LED-5000K, the following conditions apply to OS:

(iv) The standard deviation of the a-values is less than 8, and (v) The standard deviation of the b-values is less than 8, and (vi) The standard deviation of the WPS values is less than 8.

FIG. 59B shows various scotopic and photopic luminous transmittances for the CIE F2, CIE F7, CIE F11, CIE A, CIE D65, LED-3000K, LED-4000K and LED-5000K illuminants.

Lit by CIE D65 illuminant, the photopic luminous transmittance of OS is between 70% and 98%.

Lit by CIE D65 illuminant, the scotopic luminous transmittance of OS is between 70% and 98%.

The average photopic luminous transmittance when lit by the CIE F2, CIE F7, CIE F11, CIE A, CIE D65, LED-3000K, LED-4000K and LED-5000K illuminants is greater than 75%, preferably greater than 80%.

The average scotopic luminous transmittance when lit by the CIE F2, CIE F7, CIE F11, CIE A, CIE D65, LED-3000K, LED-4000K and LED-5000K illuminants is greater than 70%, preferably greater than 75%.

The standard deviation of the photopic luminous transmittances of an OD when lit by the CIE F2, CIE F7, CIE F11, CIE A, CIE D65, LED-3000K, LED-4000K and LED-5000K illuminants is less than 10%, preferably less than 6%.

The standard deviation of the scotopic luminous transmittances of an OD when lit by the CIE F2, CIE F7, CIE F11, CIE A, CIE D65, LED-3000K, LED-4000K and LED-5000K illuminants is less than 10%, preferably less than 6%.

Figure 60A:
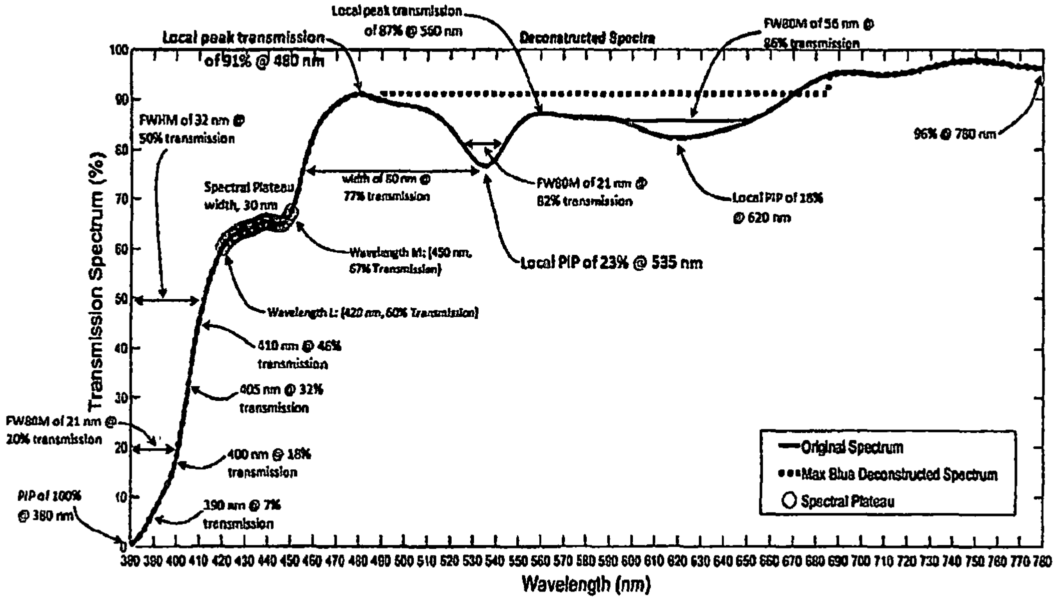
FIG. 60A is a graph including a transmission spectrum for the optical device that includes a spectral plateau that meets the Spectral Window Success Criteria defined in FIG. 52 according to yet another particular embodiment of the invention.

FIG. 60A illustrates the Original Spectrum of an OD and its MBDS. Wavelength A is 490 nm, and Wavelength B is 685 nm. The corresponding Max Blue Transmission is 91%.

The spectrum contains a Spectral Plateau partially filtering blue light and a color balancing spectrum that reduces the cosmetic colors of the optical device. In the embodiment shown in FIG. 60A, the spectrum is essentially the product of the CBF shown in FIG. 57A and the spectrum of the OD shown in FIG. 59A.

The transmittance of the OD at 380 nm, 390 nm, 400 nm, 405 nm, 410 nm and 420 nm are 0%, 7%, 18%, 32%, 46% and 60%, respectively.

As seen in FIG. 60A, there is one inhibition peak at 380 nm that inhibits 100% of the incident light; the inhibition band has a FWHM of 32 nm, and has a FW80M of 21 nm, and one Spectral Plateau centered at 435 nm that has an average transmittance of 64% with a width of 30 nm.

The Spectral Plateau has a thickness of 7% transmission (absolute).

The OS has one pass-band centered at 480 nm, has a peak transmission of 91%, and a Pass-Band Width of 80 nm, at 77% transmission.

For the OS, the unweighted average transmittance in the VLF region is 7% less than average transmittance of at least one Spectral Plateau in the BLF region.

For the spectrum in FIG. 60A, at least 2 dyes, are dispersed into the material of the OD. For example, the OD is a 2 mm center thickness, 72 mm in diameter, round lens of PC material. The dyed lens is constructed via (1) mix all dyes into uncolored PC polymer pellets via compounding, and (2) injection molding the dyed PC pellets into lens shape. Additional cutting, grinding, polishing, tinting, temperature treatments and/or surface treatments, such as an anti-reflective (AR) coating, may be applied to the OD.

Epolin has (1) the Epolight 5838 dye that will substantially create the inhibition band centered around 535 nm, with a dye loading of 0.3 mg to 60 mg per 3 lb of PC material, and (2) the Epolight 5411 dye that will substantially create the inhibition band at around 620 nm, with a dye loading of 0.3 mg to 60 mg per 3 lb of PC material. To create the spectrum FIG. 60A, the following dyes are used in PC: between 0.07 mg/L and 7 mg/L of Epolin's EP5853 dye, between 0.2 mg/L and 20 g/L of Exciton's ABS 549 dye, between 0.003 mg/L and 0.3 mg/L of Exciton's ABS 420 dye, between 0.02 mg/L and 2 mg/L of Exciton's ABS 439 dye, between 0.005 mg/L and 0.5 mg/L of Exciton's ABS 415 dye, between 0.04 mg/L and 5 mg/L of TCNQ, and between 0.1 mg/L and 10 mg/L of Crysta-lyn's DLS 386A dye.

According to one prophetic example to create the spectrum FIG. 60A, the following dyes are used in PC: 0.7 mg/L of Epolin's EP5853 dye, 2 mg/L of Exciton's ABS 549 dye, 0.03 mg/L of Exciton's ABS 420 dye, 0.2 mg/L of Exciton's ABS 439 dye, 0.048 mg/L of Exciton's ABS 415 dye, 0.45 mg/L of TCNQ, and 1.1 mg/L of Crysta-lyn's DLS 386A dye.

FIG. 60A and FIG. 60B represent an embodiment that is an exemplar of embodiments that have the characteristics described below. FIG. 60A illustrates the Original Spectrum of an OD and its MBDS. The corresponding Max Blue Transmission is above 70%.

At least one of maximum transmittance or average transmittance of OD between 380 nm and 400 nm is less than 50%, preferably less than 35%, and more preferably less than 25%. At least one of minimum transmittance or average transmittance of OD between 400 nm and 410 nm is less than 50%, preferably less than 40%, and more preferably less than 30%.

In some instances, it is acceptable for average transmittance between 380 nm and 400 nm, and preferably between 400 nm and 405 nm to be 0% or less than 10%.

As seen in FIG. 60A, there are at least one inhibition band and one Spectral Plateau centered between 380 nm and 500 nm that modify the transmission spectrum of the OD, respectively: (1) at least one inhibition peak at 380 nm or between 380 nm and 500 nm (preferably between 380 nm and 470 nm), inclusive, inhibits 100% or at least 55% of the incident light; the inhibition band has a FWHM at least 15 nm, and has a FW80M of at least 10 nm, and (2) at least one Spectral Plateau centered at between 400 nm and 470 nm, has a mean spectral transmittance of between 10% and 85% (absolute), preferably between 25% and 85% (absolute), and more preferably between 40% and 85% (absolute), with a width of at least 20 nm.

The Spectral Plateau has a thickness of no more than 10% transmission (absolute).

The OS has at least one pass-band centered between 430 nm and 510 nm, has a peak transmission of at least 50%, and a Pass-Band Width of at least 40 nm, at above 50% transmission.

FIG. 60A shows that the OS has (1) at least one inhibition band centered between 520 nm and 650 nm, and (2) at least 2 pass-bands centered between 460 nm and 780 nm, inclusive. For at least one such inhibition band, its FW80M is between 10 nm and 90 nm.

The PIP of any inhibition band centered within the wavelength region of the CBF is less than 55%, preferably less than 45%.

The peak transmission of any pass-band centered within the CBF is at least 65%, preferably at least 75%.

The center of at least one Spectral Plateau is (1) at a shorter wavelength than that of the center of at least one pass-band, and shorter by at least 10 nm, and (2) at a longer wavelength than that of the center of at least one inhibition band, and longer by at least 10 nm.

The average transmittance of at least one Spectral Plateau is (1) lower than peak transmission of at least one pass-band, and lower by at least 10% (absolute), and (2) higher than valley transmission of at least one inhibition band, and higher by at least 10% (absolute).

For the OS, the unweighted average transmittance in the VLF region is at least 10% (absolute) less than average transmittance of at least one Spectral Plateau in the BLF region.

For the OS, there is at least one pass-band centered within BLF region and such pass-band has a peak transmission of at least 60%, and preferably at least 70%.

For the OS, there is at least one inhibition band centered within CBF region, preferably centered between 500 nm and 580 nm, with a FW80M of at least 10 nm. The transmission level corresponding to such FW80M is at least 5% lower than peak transmission of at least one pass-band centered at a shorter wavelength than that of the inhibition band.

In the CBF region, there exists (1) an inhibition band centered closest to and longer than 500 nm, denoted inhibition band-500, and (2) an inhibition band centered closest to 640 nm, denoted inhibition band-640.

In the BLF region, there exists one Spectral Plateau centered closest to 470 nm, denoted Spectral Plateau-470.

The following conditions apply to the inhibition band-500, inhibition band-640 and Spectral Plateau-470:

(vi) Wavelength distance between center of inhibition band-500 and center of Spectral Plateau-470 is between 50 nm and 200 nm (preferably 60 nm and 150 nm), and (vii) The difference in the PIPs of inhibition band-500 and inhibition band 640 is less than 30% (absolute), and (viii) The width of the Spectral Plateau-470 is at least 15 nm shorter than (i).

In some instances, the wavelength distance between center of inhibition band-500 and center of inhibition band-640 is between 50 nm and 150 nm.

In the OS between 465 nm and 780 nm, there exists at least 3 pass-bands, (1) the pass-band centered closest to 465 nm is denoted pass-band-465, (2) the pass-band centered closest to inhibition band-500, and is centered between inhibition band-500 and inhibition band-640 is denoted pass-band-500, and (3) the pass-band centered closest to inhibition band-640, and is centered at a longer wavelength than that of inhibition band-640 is denoted pass-band-640.

The following conditions apply to the described pass-bands, inhibition bands, and Spectral Plateau-470 in OS of OD:

(xiii) Peak transmissions of pass-band-465, pass-band-500 and pass-band-640 are all at least 65%, preferably at least 75%, and (xiv) The lowest peak transmission of the peak transmissions of pass-band-465, pass-band-500 and pass-band-640 is higher than the average transmittance of Spectral Plateau-470 by at least 5%, and (xv) Peak transmissions of pass-band-465 and pass-band-500 are within 30%, preferably within 20%, of each other, and (xvi) Wavelength distance between center of pass-band-465 and center of Spectral Plateau-470 is between 30 nm and 130 nm, and (xvii) Wavelength distance between center of pass-band-465 and center of pass-band-500 is between 40 nm and 140 nm.

For the spectrum in FIG. 60A, at least 2 dyes, are dispersed into the material of the OD. For example, the OD is a 2 mm center thickness, 72 mm in diameter, round lens of PC material. The dyed lens is constructed via (1) mix all dyes into uncolored PC polymer pellets via compounding, and (2) injection molding the dyed PC pellets into lens shape. Additional cutting, grinding, polishing, tinting, temperature treatments and/or surface treatments, such as an anti-reflective (AR) coating, may be applied to the OD.

FIG. 60B shows that mean WPS of single-pass and double-pass of OS is (2) lower than those of MBDS's by 3 or more.

FIG. 60B show three or more WPS values of OS when lit by three or more corresponding illuminants selected from the set of CIE F2, CIE F7, CIE F11, CIE A, CIE D65, LED-3000K, LED-4000K and LED-5000K illuminants are (1) lower than (i) by between 3 and 20. (i) is three or more WPS values of MBDS. WPS values are lit by any illuminant(s) selected from the same set of illuminants of CIE F2, CIE F7, CIE F11, CIE A, CIE D65, LED-3000K, LED-4000K and LED-5000K illuminants.

For single-pass tint, FIG. 60B show at least three WPSs of OS are less than 15, preferably less than 12, when the corresponding illuminants are at least three of CIE F2, CIE F7, CIE F11, CIE A, CIE D65, LED-3000K, LED-4000K and LED-5000K.

For double-pass tint, FIG. 60B show at least three WPSs of OS are less than 25, preferably less than 20, when the corresponding illuminants are at least three of CIE F2, CIE F7, CIE F11, CIE A, CIE D65, LED-3000K, LED-4000K and LED-5000K.

FIG. 60B show, for single-pass and/or double-pass CIs of OS, lit individually by CIE F2, CIE F7, CIE F11, CIE A, CIE D65, LED-3000K, LED-4000K and LED-5000K, the following conditions apply to OS:

(i) its average absolute a-value is at least 1 less than that of MBDS, and (ii) its average absolute b-value is at least 3 less than that of MBDS, and (iii) for at least 3 of 8 illuminants, its a-values are all less than 5, and (iv) for at least 3 of 8 illuminants, its b-values are all more than 0, and (v) at least one of the standard deviations of a-values, b-values and/or WPS values is at least 0.2 less than that of MBDS, and (vi) its maximum b-value is closer to 0, by 3 or more, than the maximum b-value for MBDS, and (vii) YI is less, by at least 4, than that for MBDS.

Lit by CIE D65 illuminant, the photopic luminous transmittance of OS is 84% or between 65% and 95%, and that of MBDS is 90% or between 65% and 95%. The difference between photopic luminous transmittances of OS and MBDS is 6% or less than 20%.

Lit by CIE D65 illuminant, the scotopic luminous transmittance of OS is 84% or between 65% and 95%, and that of MBDS is 87% or between 65% and 95%. The difference between scotopic luminous transmittances of OS and MBDS is 3% or less than 20%.

For single-pass tint and/or double-pass tint, FIG. 60B shows three or more photopic E values of OS are between 0.3 and 2 when lit by the corresponding three or more illuminants selected from the set of CIE F2, F11, F7, A, D65, LED-3000K, LED-4000K and LED-5000K illuminants.

For single-pass tint and/or double-pass tint, FIG. 60B shows three or more scotopic E values of OS are between 0.5 and 3 when lit by the corresponding three or more illuminants selected from the set of CIE F2, F11, F7, A, D65, LED-3000K, LED-4000K and LED-5000K illuminants.

Certain embodiments of the invention include a soft contact lens (SCL) that includes blue light filtering (BLF). According to certain embodiments a SCL is made of a silicone hydrogel (SiHy) material, created from the polymerization of one or more methacrylate monomers, and with a water content that is between 10% to and 70%. One or more dyes containing one or more polymerizable linkers with a terminal methacrylate and/or acrylate group may be used to co-polymerize the dye with the dry and/or wet SiHy material through photo-polymerization or thermal-polymerization.

In the BLF SCL application, one or more BLF dyes are incorporated into the SCL's SiHy matrix through polymerization, co-polymerization, physical mixing (without polymerization or copolymerization) or other forms of dispersion with the monomers. In terms of the transmission spectra (um) of the SCL, the SCL with the BLF dye(s) has a spectral absorbance feature in the wavelength range from 380 nm to 480 nm, preferably from 405 nm to 455 nm, even more preferably from 415 nm to 455 nm, such that the simple average attenuation within this wavelength range is at least 5%, preferably by at least 10%. Passing light in the wavelength range 380 nm to 400 nm is believed to be beneficial for reducing myopia progression.

Without appropriate recoloring dye(s), when a SCL absorbs the described blue light wavelengths, the color of the BLF SCL will be yellow or yellow-green when lit by the illuminants of CIE D65, CIE F11, CIE F7, CIE F2, CIE A, LED-3000K, LED-4000K and LED-5000K. In 1976 CIE L*a*b* color space, for both single-pass and double-pass lens colors, the b* value of the BLF SCL will be positive, the a* value of the BLF SCL will be negative, and the magnitude of b* value will be larger than magnitude of the a* value for at least 3 separately lit illuminants in the set of illuminants of CIE D65, CIE F11, CIE F7, CIE F2, CIE A, LED-3000K, LED-4000K and LED-5000K.

It is desirable for the color of the BLF SCL to be green, green-blue, cyan, blue-green, blue and/or blue-purple when lit by the illuminants of CIE D65, CIE F11, CIE F7, CIE F2, CIE A, LED-3000K, LED-4000K and LED-5000K. What is needed is a recolored BLF SCL. According to certain embodiments described hereinbelow one or more dyes are polymerized, co-polymerized, simply mixed or otherwise dispersed inside the SiHy matrix of the BLF SCL in order to recolor the naturally yellow or yellow green BLF SCL. According to certain embodiments the BLF SCL has a single-pass yellowness index value of less than 5, preferably less than 3, and a double-pass yellowness index value of less than 10, preferably less than 5.

According to certain embodiments, for at least 3 separately lit illuminants in the set of illuminants of CIE D65, CIE F11, CIE F7, CIE F2, CIE A, LED-3000K, LED-4000K and LED-5000K, a recolored BLF SCL in single-pass light transmission has the following characteristics:

a negative b* value, and an a* value less than 5, preferably less than 1, and the absolute value of b* value minus the absolute value of the a* value is larger than −4.0, and a Yellowness Index (YI) less than −1.

A recolored BLF SCL maintains color constancy, such that the maximum color difference (ΔE) of the single-pass a* and b* values (excluding L* values) of the SCL illuminated by any two illuminants selected from the set of illuminants of CIE D65, CIE F11, CIE F7, CIE F2, CIE A, LED-3000K, LED-4000K and LED-5000K is within 10, preferably within 8, more preferably within 6, with $$\Delta E = \sqrt{(a^*_{illuminant\,1} - a^*_{illuminant\,2}) + (b^*_{illuminant\,1} - b^*_{illuminant\,2})}.$$

For at least 3 separately lit illuminants in the set of illuminants of CIE D65, CIE F11, CIE F7, CIE F2, CIE A, LED-3000K, LED-4000K and LED-5000K, a recolored BLF SCL in double-pass light transmission has the following characteristics:

a negative b* value, and an a* value less than 5, preferably less than 1, and the magnitude of b* value minus the magnitude of the a* value be larger than −6, and a Yellowness Index (YI) less than −2.

According to certain embodiments for all of the single-pass a* and b* values of a recolored BLF SCL separately lit by the illuminants of CIE D65, CIE F11, CIE F7, CIE F2, CIE A, LED-3000K, LED-4000K and LED-5000K, their average a*value is less than 0, their average b* value is less than 0.

According to certain embodiments for all of the double-pass a* and b* values of a recolored BLF SCL separately lit by the illuminants of CIE D65, CIE F11, CIE F7, CIE F2, CIE A, LED-3000K, LED-4000K and LED-5000K, their average a*value is less than 0, their average b* value is less than 0. Furthermore, their average double-pass b* value is less (i.e. more negative) than their average single-pass b* value by at least 0.2 color units, preferably by at least 0.5 color units and more preferably by at least 1.0 color unit.

According to other embodiments, in addition to the above stated characteristics for at least 3 separately lit illuminants in the set of illuminants of CIE D65, CIE F11, CIE F7, CIE F2, CIE A, LED-3000K, LED-4000K and LED-5000K, a recolored BLF SCL in single-pass and double-pass light transmission has hue angle defined in the CIE L*C*h* color space between 200° to 340° and more preferably between 200° and 330° and even more preferably between 200° and 310°.

A recolored BLF SCL maintains color constancy, such that the maximum color difference (ΔE) of the double-pass a* and b* values (excluding L* values) of the SCL illuminated by any two illuminants selected from the set of illuminants of CIE D65, CIE F11, CIE F7, CIE F2, CIE A, LED-3000K, LED-4000K and LED-5000K is within 10, preferably within 8, more preferably within 6.

In single-pass, simple average transmittance of an undyed SiHy SCL is about 98% between 400 nm and 700 nm, with a luminous transmittance of also approximately 98%. For a recolored BLF SCL, the simple average transmittance between 380 nm and 780 nm, preferably between 400 nm and 700 nm, is above 75%, preferably above 80%, and more preferably above 85%. For a recolored BLF SCL, its photopic luminous transmittance is above 75%, preferably above 80%, and more preferably above 85%, for all illuminants of CIE D65, CIE F11, CIE F7, CIE F2, CIE A, LED-3000K, LED-4000K and LED-5000K, when separately lit. For a recolored BLF SCL, its scotopic luminous transmittance is above 75%, preferably above 80%, and more preferably above 85%, for all illuminants of CIE D65, CIE F11, CIE F7, CIE F2, CIE A, LED-3000K, LED-4000K and LED-5000K, when separately lit.

Within the visible wavelengths of 400 nm and 700 nm, the peak absorbance of at least one recoloring dye is between 530 nm and 630 nm, preferably between 545 nm and 615 nm, and even more preferably between 565 nm and 605 nm. Such a coloring dye may for example comprise a polymerizable metallo-tetraazaporphyrins (PTAP), by way of non-limiting example PTAP-1, PTAP-2 and PTAP-3A, PTAP-3B and PTAP-3C described hereinbelow.

For at least one recoloring dye (by way of nonlimiting example a PTAP dye), its average molar extinction in the wavelength region between 565 nm and 605 nm is larger than its average molar extinction in the wavelength region between 540 nm and 565 nm. The latter average molar extinction is larger than the dye's average molar extinction in the wavelength region between 625 nm and 660 nm. In certain embodiments the ratio of the average molar extinction in the range between 565 nm and 605 nm to the average molar extinction in the range between 540 nm and 565 nm is at least 1.1 (Extinction Ratio YG); and the ratio of the average molar extinction in the range between 540 nm and 565 nm to the average molar extinction in the range between 625 nm and 660 is at least 1.1 (Extinction Ratio GR).

The family of PTAP is a dye family applicable for recoloring dye(s) according to certain embodiments of the invention. In some embodiments, the metal centers are comprised of Cu(II), Pd(II), VO(IV), Zn(II) or Pt(II). Substituents are covalently attached to the R-pyrrole positions, and are either H, a halogen, a linear or branched alkyl, such as a tert-butyl, a phenyl, a naphthyl, a cyclohexyl, or a polymerizable tether.

A polymerizable tether is comprised of an ether, ester, amide, amine, phenyl or another header group covalently bonded to one or more R-pyrrole position(s) and/or covalently bonded to one or more substituents. According to certain embodiments the polymerizable tethers are terminated with a methacrylate and/or an acrylate group.

A tether, linker, chemical tether, chemical linker, substituent linker or substituent tether, or substituent linker are used interchangeably in the context of the present invention and is further defined in terms of the present invention as a substituent that it is covalently linked to a R-pyrrolic carbon, and that either can be, or is, covalently bonded to at least one material component of an optical filter. A polymerizable tether is a tether which contains one or more polymerizable functional groups.

More preferably, the tether contains at least L-P, where L is null or a linker, and P is one of acryloyl, methacryloyl, aminoacryloyl, aminomethacryloyl, thiolacryloyl, thiolmethacryloyl, vinyl, phenyl vinyl, acrylate, methacrylate, acrylamide, methacrylamide, thioacrylate, thiomethacrylate, ketone, aldehyde, carboxylic acid, ester, amine, amide, thiol, thiocarboxylic acid, thioester, thioketone, thioaldehyde, sulfoxide, fluoro, chloro, bromo, iodo, azide, hydroxy, epoxide, isocyanate, aldehyde, acyl chloride, acyl halide, aryl, heteroaryl, aryl halide, heteroaryl halide, silane, siloxane, boronic acid, boric acid, stannane, ferrocene, isocyanate, isothiocyanate, phosphate, alkenyl, or alkynyl.

More preferably, the chemical tether is comprised of a branched or linear chain, covalently linked to a R-pyrrolic carbon, and contains one or more terminal, or non-terminal functional groups, that can covalently bonded to at least one component of the optical filter material, and which contains between 2 to 30 carbon atoms. More preferably, the tether contains 2-20 carbon atoms.

The tether may further impart additional solubility to the dye in organic solvent, improve dye dispersibility in one or more optical filter material, and modify optoelectronic properties of the dye. The chemical tether can also contain one or more functional groups comprised of methyl, ethyl, propyl, t-butyl, phenyl, ether, thioether, ester, thioester, amine, amide, carboxylate, carboxylic acid, hydroxy, fluoro, chloro, bromo, iodo, nitrile, nitro or thiol to improve solubility.

In some embodiments, Cu(II) 2,7,12,17-Tetra-tert-butyl-5,10,15,20-tetraazaporphrin, and regioisomers thereof, herein referred to in this specification as PTAP 1, has a polymerizable tether covalently bound to the R-pyrolle position through an ether functional group, as shown in FIG. 61, is used as a recoloring dye in the SCL.

In some embodiments, Cu(II) 2,7,12,17-Tetra-tert-butyl-5,10,15,20-tetraazaporphyrin, and regioisomers thereof, herein referred to in this specification as PTAP 2, has a polymerizable tether covalently bound to the R-pyrolle position through an ester functional group, as shown in FIG. 62, is used as a recoloring dye in the SCL.

Figure 63:
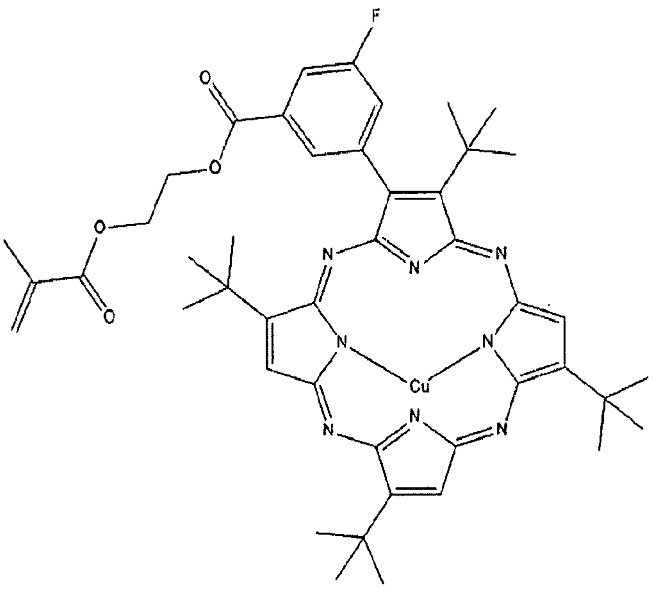
Figure 64:
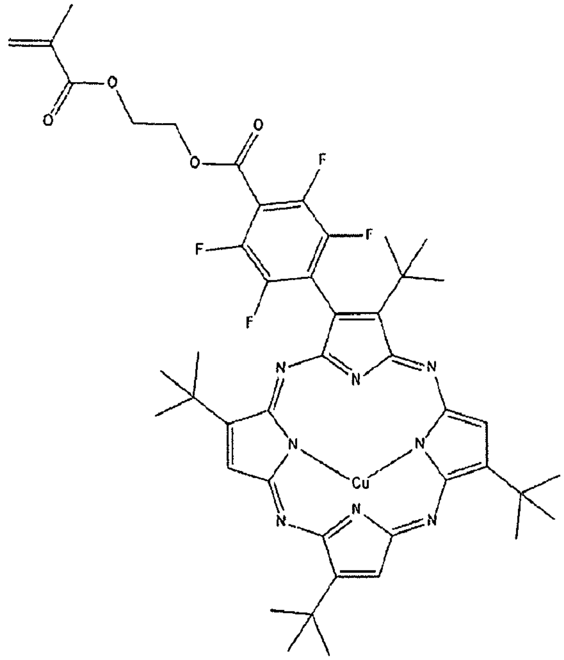

In some embodiments, PTAP 3 or regioisomers thereof, such as exemplified by PTAP 3A in FIG. 63, by PTAP 3B in FIG. 64 and by PTAP 3C in FIG. 65, is used as a recoloring dye in a SCL. PTAP 3 is a Cu(II) 2,7,12,17-Tetra-tert-butyl-5,10,15,20-tetraazaporphyrin, that has one or more substituent phenyls bonded at one or more beta position(s) on the pyrrolic ring, and has one or more polymerizable tether(s) bonded to one or more substituent phenyls. Preferably, one or more substituents or non-hydrogen atoms is bonded to one or more substituent phenyls in addition to one or more polymerizable tether(s) for the purpose of increasing compound solubility in SiHy. PTAP 3A and PTAP 3B have one or more fluorine substituents on one or more phenyl substituents, and PTAP 3C has one or more nitro substituents on one or more phenyl substituent.

The UV-VIS spectra, in SiHy, of PTAP 1, PTAP 2, and PTAP 3C, along with the well-known dyes of Reactive Blue 246 (RB 246, CAS #: 121888-69-5) and Reactive Blue 247 (RB 247, CAS #: 109561-07-1) are shown in FIG. 66. The normalized peak absorbances, i.e., normalized molar extinctions or normalized extinction, of PTAP 1, PTAP 2 and PTAP 3C are between 580 nm and 595 nm. The average normalized extinction between 565 nm and 605 nm for PTAP 1, PTAP 2 and PTAP 3C are 0.66, 0.57 and 0.57, respectively. The average extinction between 540 nm and 565 nm for PTAP 1, PTAP 2 and PTAP 3C are 0.30, 0.24 and 0.23, respectively. The average extinction between 625 nm and 660 nm for PTAP 1, PTAP 2 and PTAP 3C are 0.23, 0.13 and 0.12, respectively. More generally according to certain embodiments a SCL includes at least one PTAP dye that establishes a inhibition band that has a center wavelength between 530 nm and 630 nm, preferably between 545 nm and 615 nm, and even more preferably between 565 nm and 605 nm, a FW80M in the range of 7 nm and 107 nm, and a valley transmission in the range of 60% to 90% absolute. The ratio of absorbances is equivalent to the ratio of extinctions which is also equivalent to the ratio of molar extinctions.

In contrast, the normalized peak absorbances of RB 246 and RB 247 are between 630 nm and 640 nm. Furthermore, the average normalized extinction between 565 nm and 605 nm for RB 246 and RB 247 are 0.50, and 0.74, respectively. The average molar extinction between 540 nm and 565 nm for RB 246 and RB 247 are 0.31, and 0.46, respectively. The average molar extinction between 625 nm and 660 nm for RB 246 and RB 247 are 0.56, and 0.63, respectively. Therefore, these two compounds do not satisfy the above mentioned Extinction Ratio YG and Extinction Ratio GR that are satisfied by embodiments discussed hereinabove that include the PTAP dyes.

In the SiHy matrix of a SCL, a number of BLF dyes can be used to absorb one or more wavelengths in the wavelength range of 380 nm to 480 nm, preferably between 405 nm and 455 nm, even more preferably between 415 nm and 455 nm, by at least 5%, preferably by at least 10%.

Polymerizable xanthene, thioxanthene and acridine dyes are suitable BLF dyes. In this invention, dyes belonging to these three dyes families may have at least one polymerizable tether attached to the 1, 2, 3, 4, 5, 6, 7 and/or 8 position (See FIG. 67 for position numbering). The polymerizable tether serves to reduce dye leaching out of a dyed SCL during usage. Certain embodiments may not include a polymerizable tether. The polymerizable tether is terminated in a methacrylate. Moreover, a polar substituent is introduced at the 9 position through an alkene bond. The polar substituent has three purposes: (1) to impart additional solubility in the SiHy matrix, (2) to quench or reduce fluorescence or phosphorescence of the xanthene, thioxanthene or acridine dye, and (3) to keep the peak absorbance of the dye between 405 nm and 455 nm, preferably between 415 nm and 455 nm. Three specific examples of polymerizable thioxanthene dyes are shown in FIG. 68. These dyes have a methacrylate terminated polymerizable tether attached at the 2 position, and a polar substituent, which is comprised of a nitrile substituent and a methyl ester substituent linked to the 9 position through an alkene bond. Attachment of a polymerizable tether to a polar group can limit design and functionality of the polar group to increase dye polarity which can limit the solubility of dye in a silicone hydrogel SCL. Hence in certain embodiments a polymerizable tether and a polar group are attached at separate positions to a core chromophore. The latter preference may be implemented by, for example attaching a polar group at the 9th position of a core chromophore (e.g., xanthene, thioxanthene and acridine) and attaching a polymerizable tether at a position other than the 9th position.

Disperse Yellow 54 is an example of a quinoline dye with peak absorbance between 415 nm and 455 nm in SiHy. FIG. 69 shows its structure. This structure can be made polymerizable through the addition of a methacrylate-terminated polymerizable tether through covalent attachment to the hydroxyl substituent of Disperse Yellow 54. Preferably, the nitrogen heteroatom is covalently bonded with to a substituent that is not H. FIG. 70 shows a quinoline dye with (1) a polymerizable ether tether, and (2) a methyl group bonded to the nitrogen heteroatom.

Disperse Yellow 64 is another example of a quinoline dye with peak absorbance between 420 nm and 455 nm in SiHy. FIG. 71 shows its structure. It differs from Disperse Yellow 54 by having an additional Br atom on one of the fused benzene rings. An additional synthetic flexibility of the Disperse Yellow 64 chromophore is the ability to attach a polar group, R, which is a polar group chosen from among fluorine, nitrile, $CF_3$ and $OCF_3$ or another suitable polar functional group. FIG. 72 shows one quinolone chromophore and two quinoline dyes with (1) a polymerizable ether tether, (2) a methyl bonded to the nitrogen heteroatom, and (3) a polar group, R, which is a polar group chosen from among fluorine, nitrile, $CF_3$ and others. One or more polar groups R may be attached at any of positions 1-11 shown in FIG. 72. Similarly one or more polymerizable tether may be attached at any of the remaining positions 1-11. Isomers are possible, such as the two compounds, PD 2A and PD 2B.

One or more acridine dyes, such as the Acridine 1 compound in FIG. 73, can be incorporated into SiHy material via physical mixing into monomer mixture prior to matrix polymerization. This compound has a peak absorbance of 435 nm in SiHy.

Additional BLF dye(s) are available commercially, such as from the dye supplier Epolin. In some embodiments, one or more dyes of Epolight 5851, Epolight 7830, Epolight 5852, Epolight 5854, Epolight 5010, and Epolight 5843 are used to absorb blue light wavelengths between 415 nm and 455 nm.

The molar extinction of a BLF dye is between 5,000 $M^{-1}$ $cm^{-1}$ to 500,000 $M^{-1}$ $cm^{-1}$. The molar extinction of a recoloring dye is between 5,000 $M^{-1}$ $cm^{-1}$ to 500,000 $M^{-1}$ $cm^{-1}$. A BLF dye loading is between 0.0001 mg to 0.1 mg, preferably between 0.001 mg and 0.02 mg per SCL. A recoloring dye loading is between 0.0001 mg to 0.1 mg preferably between 0.001 mg and 0.02 mg per SCL.

A SiHy SCL can have a thickness between 0.01 mm and 1 mm, and a diameter between 0.5 cm to 2.5 cm, preferably between 0.6 and 1.8 cm.

Spectrally, an ophthalmic lens, such as a BLF SCL or a recolored BLF SCL, has at least one inhibition band centered between 405 nm and 455 nm, preferably between 410 nm and 455 nm and more preferably between 415 nm and 455 nm, with a valley transmission of between 70% and 92%. The FWHM of this inhibition band is between 20 nm and 120 nm. Such a inhibition band is called a Blue Inhibition Band (BIB). The simple average of the attenuation of a BIB is between 5% and 35% in the wavelength range from 415 nm to 455 nm.

An ophthalmic lens, such as a recolored BLF SCL, has at least one inhibition band centered between 510 nm and 625 nm, preferably between 510 nm and 610 nm and more preferably between 565 nm and 605 nm with a valley transmission of between 60% and 90%. The FW80M of this inhibition band is between 7 nm and 107 nm inclusive. Such an inhibition band is called a Recoloring Inhibition band (RIB). In addition to meeting the aforementioned FW80M criteria in certain embodiments the FWHM of the RIB is between 18 nm and 158 nm.

The magnitude of the difference between the valley transmission of a BIB and the valley transmission of an RIB is 0% to 35% (absolute). The wavelength distance between the center of a BIB and the center of an RIB is between 85 nm and 215 nm, preferably between 115 nm and 195 nm to achieve a hue angle of lens tint (single-pass and double-pass) between 200° and 340°, more preferably between 200° and 310°, which is desired for certain applications.

F 74 shows 5 spectra of dyed and undyed SCLs, each of a uniform thickness of 0.09 mm and a diameter of 1.2 cm. For the Clear SCL Undyed, it is the native, undyed spectrum of the SCL. For the SCL with only Acridine 1 dye, the loading of the dye is about 0.01 mg. For the SCL with both Acridine 1 dye and PTAP 1 dye, where the lens color is green or light green in CIE D65 illuminant, the Acridine 1 loading is about 0.01 mg, and the PTAP 1 loading is about 0.0013 mg. In a broader class of embodiments that includes the latter as an exemplar, a PTAP dye may be present in the amount of 0.0003-0.005 mg per SCL and a hetero-anthracene dye (e.g., Acridine, xanthene, and thioxanthene) may be present in the amount of 0.005-0.08 mg per SCL. Alternatively disperse yellow may be used in lieu of a hetero-anthracene. For the SCL with both Acridine 1 dye and PTAP 1 dye, where the lens color is cyan or light cyan in CIE D65 illuminant, the Acridine 1 loading is about 0.01 mg, and the PTAP 1 loading is about 0.002 mg. For the SCL with both Acridine 1 dye and RB 246 dye, where the lens color is green in CIE D65 illuminant, the Acridine 1 loading is about 0.01 mg, and the RB 246 loading is about 0.01 mg.

For the 4 dyed SCL embodiments shown in FIG. 74, the centers of their BIBs are between 415 nm and 455 nm, with valley transmissions between 85% and 90%. In a broader class of embodiments the BIB valley transmission is between 70% and 92%. The simple average attenuations of the BIBs are between 12% to 13% (absolute) in the wavelength range from 415 nm to 455 nm for the 4 dyed SCL embodiments shown in FIG. 74. In a broader class of embodiments that include at least one dye selected from the group including hetero-anthracene and disperse yellow, in the wavelength range from 415 nm to 455 nm the simple average attenuation of the BIB is at least 5%.For the 2 SCL embodiments shown in FIG. 74 containing the PTAP 1 dye, each SCL's transmission spectrum has an RIB centered between 580 nm and 590 nm. The valley transmission and FWHM of the RIB of the RIB represented by the heavy dotted line is at around 80% and 45 nm, respectively. The valley transmission and FWHM of the RIB represented by the thick gray line is at around 73% and 45 nm, respectively. According to certain embodiments that include at least one PTAP dye to establish the RIB the RIB valley transmittance is between 60% and 90% and the FWHM of the RIB is preferably between 20 nm and 100 nm and more preferably between 30 nm and 90 nm. For the SCL with lesser PTAP 1 dye loading, the magnitude of the difference between the valley transmission of its BIB and the valley transmission of its RIB is 7% (absolute). For the SCL with greater PTAP 1 dye loading, the magnitude of the difference between the valley transmission of its BIB and the valley transmission of its RIB is 14% (absolute). According to certain embodiments that include at least one PTAP dye to establish the RIB, the magnitude of the difference between the valley transmission of its BIB and the valley transmission of its RIB is 0% to 35% absolute. For each recolored BLF SCL depicted in FIG. 74, the wavelength distance between the center of its BIB and the center of its RIB is about 150 nm. According to certain embodiments that include at least one PTAP dye the wavelength distance between the center of its BIB and the center of its RIB is between 85 nm and 215 nm.

FIG. 75 shows, from 380 nm to 780 nm, photopic and scotopic luminous transmittance % when lit by 8 major illuminants, and the simple average transmittance %. For BLF SCL with only the Acridine 1 dye, the photopic luminous transmittances are between 97% and 98%, and the scotopic luminous transmittances are between 95% and 97%, with the simple average transmittance being 96%. For the recolored BLF SCL with Acridine 1 and PTAP 1 dyes and a green lens color in D65 (appended with "(Green)" in label), the photopic luminous transmittances are between 88% and 91%, and the scotopic luminous transmittances are between 91% and 93%, with the simple average transmittance being 92%. For the recolored BLF SCL with Acridine 1 and PTAP 1 dyes and a cyan lens color in D65 (appended with "(Cyan)" in label), the photopic luminous transmittances are between 85% and 88%, and the scotopic luminous transmittances are between 90% and 93%, with the simple average transmittance being 91%. For the recolored BLF SCL with Acridine 1 and RB 246 dyes and a green lens color in D65 (appended with "(Green)" in label), the photopic luminous transmittances are between 88% and 91%, and the scotopic luminous transmittances are between 92% and 94%, with the simple average transmittance being 92%. The photopic and scotopic luminous transmittances are separately lit with CIE D65, CIE F11, CIE F7, CIE F2, CIE A, LED-3000K, LED-4000K or LED-5000K.

For a class of embodiments SCLs that include at least one PTAP dye to establish at least one RIB and at least one dye selected from the group including hetero-anthracene and disperse yellow to establish at least one BIB, the SCL has a simple average transmittance, photopic luminous transmittance and scotopic luminous transmittance above 75%, preferably above 80% and more preferably above 85%.

FIG. 76 shows the colorimetric data for the 4 SCL embodiments. The BLF SCL with Acridine 1 dye is only a BLF lens without recoloring to green, green-blue, cyan, blue-green, blue or blue-purple for at least one lighting condition. Its single-pass b* value ranges from 4 (lower bound) to 6 (upper bound), with an average of 5. The b* value is larger than a* value for at least the illuminants of D65, F11, A and LED-4000K. The single-pass and double-pass colors of the SCL is yellow to yellow-green.

For the recolored BLF SCL with Acridine 1 dye and PTAP 1 dye with a green lens color in D65: (1) the single-pass lens coloration is pastel green for most listed illuminants, except for a pastel cyan color under CIE A, and (2) double-pass lens coloration is green for most listed illuminants, except for pastel cyan colors under CIE A and LED-3000K.

For the recolored BLF SCL with Acridine 1 dye and PTAP 1 dye with a cyan lens color in D65: (1) the single-pass lens coloration is pastel cyan for all listed illuminants, and (2) the double-pass lens coloration is cyan for all listed illuminants. The hue angle of the embodiment is between 200° and 340°, preferably between 200° and 310°, for single-pass and double-pass transmission. For example, in CIE D65, the hue angles are 215° for single-pass transmission, and 213° for double-pass transmission; in CIE F11, the hue angles are 219° for single-pass transmission, and 219° for double-pass transmission; in CIE A, the hue angles are 245° for single-pass transmission, and 244° for double-pass transmission; in LED-4000K, the hue angles are 229° for single-pass transmission, and 228° for double-pass transmission; in LED-3000K, the hue angles are 242° for single-pass transmission, and 241° for double-pass transmission. For at least two illuminants selected from the set of illuminants of CIE D65, CIE F11, CIE F2, CIE F7, CIE A, LED-3000K, LED-4000K and LED-5000K, the magnitude of the difference between a hue angle for single-pass transmission and a hue angle for double-pass transmission is less than 450.

For the recolored BLF SCL with Acridine 1 dye and RB 246 dye with a green lens color in D65: (1) the single-pass lens coloration is green for all listed illuminants, and (2) the double-pass lens coloration is green for most listed illuminants, except for a green-blue or cyan color under CIE A and LED-3000K.

For the recolored BLF SCL with Acridine 1 dye and PTAP 1 dye with a green lens color in D65: under CIE F2, CIE A, and LED-3000K, the SCL in single-pass has (1) b* values between −1.2 and −0.7, (2) a* values between −2.5 and −1.3, (3) the magnitude of b* minus magnitude of a* be −1.8 or larger, and (4) a Yellowness Index of −2.4. Moreover, in single-pass the max ΔE is less than 3. Furthermore, over all illuminants, the average a* is −2.3 and the average b* value is −0.3.

For the recolored BLF SCL with Acridine 1 dye and PTAP 1 dye with a cyan lens color in D65: under CIE D65, CIE F11, and LED-3000K, the SCL in single-pass has (1) b* values between −3.4 and −1.8, (2) a* values between −3.1 and −1.8, (3) the magnitude of b* minus magnitude of a* be −0.9 or larger, and (4) a Yellowness Index of −6.6. This is the most preferred embodiment as lens color is cyan or blue-green as having a blue-ish tint in a SCL is desirable. Moreover, in single-pass the max AE is less than 3. Furthermore, over all illuminants, the average a* is −2.5 and the average b* value is −2.7.

For the recolored BLF SCL with Acridine 1 dye and RB 246 dye with a green lens color in D65: under CIE F11, CIE F2, and LED-3000K, the SCL in single-pass has (1) b* values between −1.4 and −0.3, (2) a* values between −4.3 and −3.6, (3) the magnitude of b* minus magnitude of a* be −4.0 or larger, and (4) a Yellowness Index of −4.3. Moreover, in single-pass the max AE is less than 3. Furthermore, over all illuminants, the average a* is −4.2 and the average b* value is −0.7. This is not a preferred embodiment as the SCL tint is noticeably green.

For the recolored BLF SCL with Acridine 1 dye and PTAP 1 dye with a green lens color in D65: under CIE F2, CIE A, and LED-3000K, the SCL in double-pass has (1) b* values between −2.2 and −1.2, (2) a* values between −4.9 and −2.5, (3) the magnitude of b* minus magnitude of a* be −3.7 or larger, and (4) a Yellowness Index of −4.6. Moreover, in double-pass the max AE is less than 5. Furthermore, over all illuminants, the average a* is −4.4 and the average b* value is −0.5. Lastly, the average double-pass b* value is less (i.e. more negative) than the SCL's average single-pass b* value by 0.2 color units.

For the recolored BLF SCL with Acridine 1 dye and PTAP 1 dye with a cyan lens color in D65: under CIE D65, CIE F11, and LED-3000K, the SCL in double-pass has (1) b* values between −6.3 and −3.4, (2) a* values between −6 and −3.5, (3) the magnitude of b* minus magnitude of a* be −2.1 or larger, and (4) a Yellowness Index of −12.9. This is the most preferred embodiment as lens color is cyan or blue-green as having a blue-ish tint in a SCL is desirable. Moreover, in double-pass the max AE is less than 5. Furthermore, over all illuminants, the average a* is −4.8 and the average b* value is −4.9. Lastly, the average double-pass b* value is less (i.e. more negative) than the SCL's average single-pass b* value by 2.2 color units.

For the recolored BLF SCL with Acridine 1 dye and RB 246 dye with a green lens color in D65: under CIE F11, CIE F2, and LED-3000K, the SCL in double-pass has (1) b* values between −2.8 and −0.6, (2) a* values between −8.3 and −7, (3) the magnitude of b* minus magnitude of a* be −7.7 or larger, and (4) a Yellowness Index of −8.6. Moreover, in double-pass the max AE is less than 5. Furthermore, over all illuminants, the average a* is −8 and the average b* value is −1.4. Lastly, the average double-pass b* value is less (i.e. more negative) than the SCL's average single-pass b* value by 0.7 color units. This is not a preferred embodiment as the SCL tint is noticeably green.

For all non-SiHy substrates, the molar extinction of a dye can be measured in the solvent DCM (dichloromethane) unless another solvent or substrate is specifically listed for the molar extinction values.

For a SiHy substrate, the molar extinction of a dye can be measured in the solvent MeOH (methanol) unless SiHy substrate or another substrate or solvent is specifically listed for the molar extinction values.

According to certain preferred embodiments an OD includes a porphyrin dye that has a ratio of its peak molar extinction within the wavelength range between 400 nm and 499 nm to its peak molar extinction within the wavelength range between 500 nm and 650 nm that is less than 5.0, and more preferably is less than 3.0.

One aspect of the invention is a contact lens including a silicone hydrogel matrix and at least one dye, the contact lens having a visible spectral transmission having a peak transmission in the wavelength range from 380 nm to 780 nm, the visible spectral transmission having an average transmission over the range from 415 nm to 455 nm that is at least 5% lower than the peak transmission in the wavelength range from 380 nm to 780 nm, at least one inhibition band centered between 510 nm and 610 nm, preferably centered between 530 nm and 610 nm and more preferably centered between 550 nm and 605 nm; and for at least 3 illuminants in the set of illuminants including CIE F2, CIE F7, CIE F11, CIE A, CIE D65, LED-3000K, LED-4000K and LED-5000K, the visible spectral transmission producing for both single-pass and double-pass lens tint having a hue angle defined in the 1976 CIE L*C*h° color space between 200° and 340°, preferably between 200° and 310°, and the contact lens has a simple average transmittance over the wavelength range from 380 nm to 780 nm of at least 80%, preferably at least 85%, a photopic luminous transmittance of at least 80%, preferably at least 85%, and a scotopic luminous transmittance of at least 80%, preferably at least 85%. Additionally, the visible spectral transmission may exhibit a ratio of an average molar extinction in a range between 565 nm and 605 nm to an average molar extinction in a range between 540 nm and 565 nm is at least 1.1; and a ratio of an average molar extinction in a range between 540 nm and 565 nm to an average molar extinction in a range between 625 nm and 660 nm is at least 1.1. Additionally the visible spectral transmission may be such that the contact lens maintains color constancy, such that a maximum color difference (AE) for single-pass transmission of the contact lens when illuminated by any two illuminants selected from the set of illuminants of CIE D65, CIE F 11, CIE F7, CIE F2, CIE A, LED-3000K, LED-4000K and LED-5000K is within 8, where the color difference is given by:

$$\Delta E = \sqrt{(a^*_{illuminant\,1} - a^*_{illuminant\,2}) + (b^*_{illuminant\,1} - b^*_{illuminant\,2})}$$

where a* and b* values are defined by the 1976 CIE L* a* b* color space. The contact lens according to claim 3 including a dye with a polymerizable tether that establishes the inhibition band centered between 510 nm and 610 nm. The contact lens may include a porphyrin dye that establishes the inhibition band centered between 510 nm and 610 nm. The contact lens may include a hetero-anthracene dye that includes a polar group substituted at a 9th position:

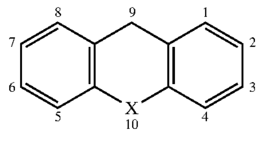

X = O, S, N

The hetero-anthracene dye may include a polymerizable tether substituted at a position selected from

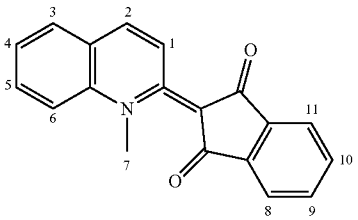

Quinoline positions 1 to 8.

The contact lens may include a quinoline dye having a polymerizable tether at a position and the polymerizable tether may be terminated with a methacrylate group.

Another aspect of the invention is an ophthalmic lens having at least one dye and having a spectral transmission that includes: a spectral plateau that has a mean spectral transmittance between 10% (absolute) and 85% (absolute) and which is centered between 400 nm and 490 nm; has a width between 20 nm and 90 nm; a thickness is less than 10% (absolute); a sample standard deviation less than 1.65%; and an average photopic luminous transmittance of the ophthalmic lens when separately lit by each illuminant CIE F2, CIE F7, CIE F11, CIE A, CIE D65, LED-3000K, LED-4000K and LED-5000K is greater than 70%; and the ophthalmic lens includes at least one dye that establishes at least one inhibition band in the spectral transmission centered between 510 nm and 610 nm; the ophthalmic lens has a single-pass yellowness index value of less than 5 and the ophthalmic lens has a double-pass yellowness index value of less than 10. Additionally the ophthalmic lens may have a simple average transmittance over the range 380 nm to 400 nm of at least 10%. Additionally the ophthalmic lens for double-pass transmission, for at least 3 separately lit illuminants selected from a set of illuminants: CIE F2, CIE F7, CIE F 11, CIE A, CIE D65, LED-3000K, LED-4000K and LED-5000K, a-values may be less than 5 and b-values may be more than 0 where the a-values and the b-values are defined by the 1976 CIE L* a* b* color space. Additionally, the standard deviations of a-values, b-values and WPS values may be at least 0.2 less than those of a Max Blue Deconstructed Spectrum based on a double-pass spectral transmission of the ophthalmic lens. Additionally, The ophthalmic lens the spectral transmission for the ophthalmological lens may have at least one inhibition band centered between 520 nm and 650 nm, at least 2 pass-bands centered between 460 nm and 780 nm inclusive, and for at least one such inhibition band a corresponding FW80M may be between 10 nm and 90 nm.

Another aspect of the invention is ophthalmic lens having at least one dye and having a spectral transmission that includes: a spectral plateau that has a mean spectral transmittance between 85% (absolute) and 91% (absolute); an average attenuation in the range 425 nm to 455 nm of at least 9%; the spectral plateau is centered between 400 nm and 490 nm; a width of the spectral plateau is between 20 nm and 90 nm; a thickness of the spectral plateau is less than 10% (absolute); the spectral plateau has a sample standard deviation less than 1.65%; an average photopic luminous transmittance of the ophthalmic lens when separately lit by each illuminant CIE F2, CIE F7, CIE F11, CIE A, CIE D65, LED-3000K, LED-4000K and LED-5000K is greater than 85%; and the ophthalmic lens includes at least one dye that establishes at least one inhibition band in the spectral transmission centered between 510 nm and 610 nm; the ophthalmic lens has a single-pass yellowness index value of less than 5; and the ophthalmic lens has a double-pass yellowness index value of less than 10.

Yet another aspect of the invention is an ophthalmic lens having at least one dye and having a spectral transmission that has: a simple average attenuation of at least 9% in the range 430 nm to 455 nm, a maximum transmittance in the range 380 nm to 780 nm of at least 92%, a spectral plateau that has a mean spectral transmittance between 85% (absolute) and 91% (absolute), is centered between 400 nm and 460 nm, has a width is between 20 nm and 80 nm, has a thickness is less than 10% (absolute), has a sample standard deviation less than 1.65%, an average photopic luminous transmittance of the ophthalmic lens when separately lit by each illuminant CIE F2, CIE F7, CIE F11, CIE A, CIE D65, LED-3000K, LED-4000K and LED-5000K is greater than 85%, the at least one dye includes a dye that establishes at least one inhibition band in the spectral transmission centered between 510 nm and 610 nm, and the ophthalmic lens has a single-pass yellowness index value of less than 5; and the ophthalmic lens has a double-pass yellowness index value of less than 10. Additionally the ophthalmic lens may have a simple average transmittance over the range 380 nm to 400 nm of at least 35%. Additionally the ophthalmic lens the at least one dye includes up to three dyes. Additionally there may be only a single Recoloring Inhibition Band (RIB), and a smallest wavelength distance between a center of a spectral plateau and the center of a RIB is between 120 nm and 180 nm. Alternatively, there may be multiple Recoloring Inhibition Bands (RIBs), and a smallest wavelength distance between a center of a spectral plateau and a center of one of the RIBs is between 70 nm and 130 nm.

Another aspect of the invention is optical device including a lens material, the lens material including a substituted porphyrin with a polymerizable tether, the substituted porphyrin exhibiting a ratio of the average molar extinction in the range between 565 nm and 605 nm to the average molar extinction in the range between 540 nm and 565 nm of at least 1.1,a ratio of the average molar extinction in the range between 540 nm and 565 nm to the average molar extinction in the range between 625 nm and 660 of at least 1.1, and exhibits a ratio of its peak molar extinction within the wavelength range between 400 nm and 499 nm to its peak molar extinction within the wavelength range between 500 nm and 650 nm that is less than 3.0. Additionally, the optical device polymerizable tether may include a functional group selected from the group consisting of: acryloyl, methacryloyl, aminoacryloyl, aminomethacryloyl, thiolacryloyl, thiolmethacryloyl, vinyl, phenyl vinyl, acrylate, methacrylate, acrylamide, methacrylamide, thioacrylate, thiomethacrylate, ketone, aldehyde, carboxylic acid, ester, amine, amide, thiol, thiocarboxylic acid, thioester, thioketone, thioaldehyde, sulfoxide, fluoro, chloro, bromo, iodo, azide, hydroxy, epoxide, isocyanate, aldehyde, acyl chloride, acyl halide, aryl, heteroaryl, aryl halide, heteroaryl halide, silane, siloxane, boronic acid, boric acid, stannane, ferrocene, isocyanate, isothiocyanate, phosphate, alkenyl, or alkynyl. Furthermore, the polymerizable tether may include a methacrylate. Additionally, the substituted porphyrin may be a metallo-porphyrin. Additionally, the metallo-porphyrin may be a copper tetraazaporphyrin.

Certain embodiments of the above described BLF SCL have all above stated colorimetric and photometric attributes in combination.

According to an alternative embodiment an optical device includes at least one dye which establishes a transmission spectrum that includes a spectral plateau defined as discussed above except that the average transmittance level of the plateau is between 85% and 91% (assuming the inclusion of AR coatings on both surfaces of the optical device). The method shown in FIG. 52 may be modified by changing the mean spectral transmittance bounds of 10% and 85% used in block 5204 to 85% and 91% respectively in order to identify certain transmittance spectra in accordance with the aforementioned alternative embodiment.

Furthermore according to certain embodiments in addition to the revised transmittance level discussed in the preceding paragraph; photopic luminous transmittance greater than 85%, preferably greater than 89% for at least 3 illuminants in the set CIE D65, CIE F2, CIE F7, CIE F11, CIE A, LED-3000K, LED-4000K and LED-5000K; single-pass YI of no more than 5 (preferably no more than 4, more preferably no more than 3) and a double-pass YI no more than 10 (preferably no more than 7, more preferably no more than 5); a simple average attenuation of at least 9% in the range 425 nm to 455 nm, preferably in the range 430 nm to 455 nm; and a maximum transmittance in the range 380 nm to 780 nm of at least 92%, preferably at least 94%. Furthermore according to certain embodiments an average transmission over the range from 415 nm to 455 nm may be at least 5% lower than the peak transmission in the wavelength range from 380 nm to 780 nm.

FIG. 77 is a graph including the spectral transmittance of an optical device that satisfies the foregoing characteristics and FIG. 78 is a table including colorimetric and photometric data for the optical device having the spectral transmittance shown in FIG. 77.

The CBF portion of the transmittance spectrum shown in FIG. 77 is preferably achieved using no more than 3 dyes, more preferably using no more than 2 dyes, and even more preferably using a single dye. The actual CBF of the transmittance spectrum shown in FIG. 77 may be established using Epolight 5824 made by Epolin, which may added in an amount of 5 mg per kg of base optical polymer. The BLF region of the transmittance spectrum may be established using disperse yellow 64 dye which is added in an amount of about 1 mg per kg of base optical polymer. The bulk of the optical device may for example take the form of a 2 mm thick polycarbonate (or other optical material) lens blank. More generally the one or more dyes used to establish BLF may be present in a combined amount of 0.5 mg to 10 mg per kg and the one or more dyes used to establish the CBF may be present in a combined amount of 0.5 mg to 10 mg per kg.

In yet another embodiment in addition to the revised transmittance and the characteristics discussed in the preceding paragraph the optical device has a simple average violet (specifically 380 nm-400 nm) transmittance of greater than 10% preferably greater than 35%.

According to certain embodiments in which there is only a single RIB the smallest wavelength distance between the center of a spectral plateau and the center of a RIB is preferably between 80 nm and 185 nm and more preferably between 120 nm and 180 nm.

According to certain embodiments in which there are multiple RIBs, the smallest wavelength distance between the center of a spectral plateau and the center of a RIB is preferably between 55 nm and 160 nm and more preferably between 70 nm and 130 nm.

According to certain embodiments the magnitude of the difference between the mean spectral transmittance of a spectral plateau and the valley transmittance of a RIB is preferably less than 35% and more preferably less than 20%.

Another aspect of the invention is a transmissive optical device including at least a first spectrally selective transmission inhibitor, the at least first spectrally selective transmission inhibitor exhibiting a first transmission inhibition band having a first peak wavelength between 380 nanometers and 465 nanometers, a second transmission inhibition band, the second transmission inhibition band having a FW10M being between 40 and 150 nanometers, a shorter endpoint of the FW10M between 480 and 540 nanometers and a longer endpoint of the FW10M between 570 and 630 nanometers, the second transmission band having a rightward peak skew between 10 and 50 nanometers, wherein the peak skew is a difference between a peak inhibition wavelength of the second transmission inhibition band and a midpoint of the shorter endpoint and longer endpoint of the FW10M of the second transmission inhibition band.

Another aspect of the invention is transmissive optical device including at least a first spectrally selective light absorber, a second spectrally selective light absorber and a third spectrally selective light absorber, the first spectrally selective light absorber having at least a first absorption band having a first absorption band peak wavelength between 380 nanometers and 450 nanometers, the second spectrally selective light absorber having at least a second absorption band having a second absorption band peak wavelength between 500 nanometers and 780 nanometers, and the third spectrally selective light absorber having at least a third absorption band having a third absorption band peak wavelength between 500 nanometers and 780 nanometers.

Another aspect of the invention is a transmissive optical device including at least four spectrally selective transmission inhibitors establishing: a first inhibition band having an inhibition peak between 380 and 500 nanometers; a second inhibition band centered between 500 and 540 nanometers; a third inhibition band centered between 540 and 600 nanometers; and a fourth inhibition band centered between 600 and 700 nanometers. The first inhibition band may have a FWHM of at least 10 nanometers, a FW80M of at least 5 nm and a peak inhibition percentage of at least 10%; the second inhibition band may have a peak inhibition percentage of at least 5% and a FW80M between 5 and 80 nanometers; the third inhibition band may have a peak inhibition percentage between 5% and 50% and a FW80M of at most 65 nanometers; and the fourth inhibition band may have a peak inhibition percentage of at most 60% and a FW80M of at most 60 nanometers. The transmissive optical device according may have a maximum inhibition of at least 5% at an inhibition peak between 540 nm to 640 nm. At least two inhibition bands between 380 and 680 nanometers may have valley transmissions that are within 35% of full scale transmission of each other.

Another aspect of the invention is a transmissive optical device including at least two spectrally selective transmission inhibitors, the at least two spectrally selective transmission inhibitors establishing: a first inhibition band centered between 380 and 500 nanometers; a second inhibition band centered between 480 and 545 nanometers; a third inhibition band centered between 546 and 600 nanometers; and a fourth inhibition band centered between 601 and 700 nanometers. The at least two spectrally selective transmission inhibitors may establish a pass-band having a peak transmission of at least 10% at a wavelength less than 420 nanometers and a FW80M between 5 and 65 nanometers; and the first inhibition band may have a FWHM of at least 10 nanometers, a FW80M of at least 5 nanometers and a peak inhibition percentage of at least 30%; the second inhibition band may have a FWHM between 5 and 60 nanometers, and a peak inhibition percentage between 5% and 50%; and the third inhibition band may have a FW80M of at most 62 nanometers, and a peak inhibition percentage between 5% and 40%; and the fourth inhibition band may have a FWHM of at most 100 nanometers and a peak inhibition percentage between 5% and 50%. The at least two spectrally selective inhibitors of the transmissive optical device may include: a first dye that establishes the first transmission inhibition band; a second dye that establishes the second transmission inhibition band; a third dye that establishes the third transmission inhibition band; and a fourth dye that establishes the fourth transmission inhibition band.

Another aspect of the invention is a transmissive optical device including at least three spectrally selective inhibitors, the transmissive optical device having a transmission spectrum that includes three inhibition bands, and for at least two of the three inhibition bands a difference between their valley transmissions is between 320% and 80% and for at least two of the three inhibition bands a different between their valley transmissions is between 0% and 30%.

Another aspect of the invention is a transmissive optical device including at least two spectrally selective transmission inhibitors, the at least two spectrally selective transmission inhibitors establishing: a first inhibition band centered between 380 and 490 nanometers; a second inhibition band centered between 510 and 600 nanometers; and a third inhibition band centered between 600 and 730 nanometers. The first inhibition band may have a peak inhibition percentage of at least 15%; the second inhibition band may have peak inhibition percentage of at least 5%; the third inhibition band may have a peak inhibition percentage of at least 5%; and any inhibition band centered between 490 nm and 650 nm may have a peak inhibition percentage of at most 40%. The transmissive optical device may have a spectral transmission that includes: a first pass-band centered between 430 and 510 nanometers that has a peak transmission of at least 40%, and a second pass-band centered between 560 and 660 nanometers has a peak transmission of at least 70%.

Another aspect of the invention is a transmissive optical device including at least three spectrally selective transmission inhibitors, the at least three spectrally selective transmission inhibitors establishing: a first inhibition band centered between 380 and 500 nanometers; a second inhibition peak centered between 520 and 600 nanometers; and a third inhibition peak centered between 640 and 710 nanometers. The first inhibition band may have a peak inhibition percentage of at least 25%.; the second inhibition band has a peak inhibition percentage of at least 10%; the third inhibition band may have a peak inhibition percentage of at least 10%; the peak inhibition percentage in the range of 520 to 600 nanometers may be no more than 45%; and peak inhibition percentage in the range 620 to 700 nanometers may be no more than 55%. The transmissive optical device may have a spectral transmission that includes: a first pass-band centered between 380 and 430 nanometers having a peak transmission of at least 10% and a FWHM of at least 20 nanometers; a second pass-band centered between 430 and 510 nanometers having a peak transmission of at least 40% and a FW80M of at least 50 nanometers; and a third pass-band centered between 580 and 650 nanometers having a peak transmission of at least 70% and a FW80M of at least 40 nanometers.

Another aspect of the invention is a transmissive optical device including at least three spectrally selective transmission inhibitors, the at least three spectrally selective transmission inhibitors establishing: a first inhibition band centered between 380 and 470 nanometers; a second inhibition band centered between 500 and 585 nanometers; and a third inhibition band centered between 600 and 680 nanometers. The first inhibition band may have a peak inhibition percentage of at least 25%; the second inhibition band may have a peak inhibition percentage between 10% and 35%; and the third inhibition band may have a peak inhibition percentage between 5% and 35%. The at least three spectrally selective transmission inhibitors may include a first dye that establishes the first inhibition band, a second dye that establishes the second inhibition band and a third dye that establishes the third inhibition band. The at least three spectrally selective transmission inhibitors may establish: a first pass band centered between 380 and 430 nanometers having a peak transmission of at least 10%; a second pass band centered between 440 and 510 nanometers having a peak transmission of at least 60%; and a third pass band centered between 560 and 630 nanometers having a peak transmission of at least 70%.

Another aspect of the invention is a transmissive optical device including at least two spectrally selective transmission inhibitors, the at least two spectrally selective transmission inhibitors establishing: a first inhibition band centered between 380 and 500 nanometers; and a second inhibition band centered between 540 and 600 nanometers. The first inhibition band may have a peak inhibition percentage of at least 50% and a FWHM of at least 30 nanometers; and the second inhibition band may have a peak inhibition percentage of at least 20%. Each of the first inhibition band and the second inhibition band may have a Pseudo Width-To-Peak ratio of at least 0.75, where the Pseudo Width-To-Peak ratio is given by (FW80M+FWHM)/PIP, where FW80M is a full width at 80% max, FWHM is a full width at half max, and PIP is a peak inhibition percentage. The transmissive optical device may have a spectral transmission that monotonically increases from 380 nanometers to a first passband peak between 380 nanometers and 560 nanometers. The transmissive optical device may have a spectral transmission that monotonically increases from 380 nanometers to a first passband peak between 460 nanometers and 520 nanometers. At least two spectrally selective transmission inhibitors establish a first pass band centered between 380 and 560 nanometers having a peak transmission greater than 50% and a second pass band centered between 590 and 780 nanometers having a peak transmission of at least 70%. The at least two spectrally selective transmission inhibitors may include a first dye and a second dye.

Another aspect of the invention is a transmissive optical device including at least three spectrally selective transmission inhibitors, the at least three spectrally selective transmission inhibitors establishing: a first inhibition band centered between 380 and 470 nanometers; a second inhibition band centered between 530 and 600 nanometers; and a third inhibition band centered between 605 and 700 nanometers. The first inhibition band may have a peak inhibition percentage of at least 60%; the second inhibition band may have a peak inhibition percentage between 15% and 60%; and the third inhibition band may have a peak inhibition percentage between 10% and 40%.

Another aspect of the invention is a transmissive optical device including at least three spectrally selective transmission inhibitors, the at least three spectrally selective transmission inhibitors establishing: a first inhibition band centered between 510 and 530 nanometers having a peak inhibition percentage of at most 50%; a second inhibition band centered between 545 and 565 nanometers having peak inhibition percentage of at most 60%; a third inhibition band centered between 590 and 610 nanometers having a peak inhibition percentage of at most 50%; a fourth inhibition band centered between 640 and 700 nanometers having a peak inhibition percentage of at most 85%; and an inhibition peak between 380 and 430 nanometers having a peak inhibition percentage of at least 60%. The at least three spectrally selective transmission inhibitors may establish: a first pass-band centered between 485 and 510 nanometers having a peak transmission of at least 60%; a second pass-band centered between 530 and 545 nanometers having a peak transmission of at least 60%; a third pass-band centered between 565 and 590 nanometers having a peak transmission of at least 60%; a fourth pass-band centered between 610 and 640 nanometers having a peak transmission of at least 50%; and a fifth pass-band centered between 700 and 780 having a peak transmission of at least 50%.

Another aspect of the invention is a transmissive optical device including at least three spectrally selective transmission inhibitors, the at least three spectrally selective inhibitors establishing: an inhibition band centered between 380 and 500 nanometer having a peak inhibition percentage of at least 50%; at least two inhibition bands each centered between 520 and 625 nanometers and each having a peak inhibition percentage of at most 50%; and an inhibition band centered between 660 and 710 nanometers having a peak inhibition percentage of at most 50%. The at least three spectrally selective transmission inhibitors may establish: a pass-band centered between 485 and 520 nanometers having a peak transmission of at least 60%; at least one pass-band centered between 520 and 625 nanometers having a peak transmission of at least 60%; a pass-band centered between 625 and 660 nanometers having a peak transmission of at least 60%; and a pass-band centered between 710 and 780 nanometers having a peak transmission of at least 25%.

Another aspect of the invention is a transmissive optical device including at least three spectrally selective transmission inhibitors, the at least three spectrally selective inhibitors establishing: an inhibition band centered between 380 and 500 nanometers having an inhibition of at least 50% for at least one wavelength between 420 nm and 465 nm; an inhibition band centered between 500 and 560 nanometers having a peak inhibition percentage of at most 45%; and an inhibition band centered between 590 and 640 nanometers having a peak inhibition percentage of at most 45%. The at least three spectrally selective transmission inhibitors establish: at least one pass-band centered between 400 and 520 nanometers having a peak transmission of at least 60%; one pass-band centered between 540 and 590 nanometers having peak transmission of at least 60%; and one centered between 630 and 780 nanometers having a peak transmission of at least 70%.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A contact lens including a silicone hydrogel matrix and at least one dye, the contact lens having a visible spectral transmission having a peak transmission in the wavelength range from 380 nm to 780 nm, the visible spectral transmission having an average transmission over the range from 415 nm to 455 nm that is at least 5% lower than the peak transmission in the wavelength range from 380 nm to 780 nm, at least one inhibition band centered between 510 nm and 610 nm; and for at least 3 illuminants in the set of illuminants including CIE F2, CIE F7, CIE FI 1, CIE A, CIE D65, LED-3000K, LED-4000K and LED-5000K, the visible spectral transmission producing for both single-pass and double-pass lens tint having a hue angle defined in the 1976 CIE L*C*h° color space between 200° and 340° wherein the at least one dye comprise a metallo-tetraazaporphyrin with a polymerizable tether.

2. The contact lens according to claim 1 wherein the visible spectral transmission establishes an a* value and ab* value defined in 1976 CIE L*a*b* color space such that an absolute value of the b* value minus an absolute value of the a* value is more than-4.0 for both single-pass and double-pass transmission.

3. The contact lens according to claim 2, wherein the at least one dye exhibits a ratio of an average molar extinction in a range between 565 nm and 605 nm to an average molar extinction in a range between 540 nm and 565 nm is at least 1.1.

4. The contact lens according to claim 1, wherein the visible spectral transmission is such that the contact lens maintains color constancy, such that a maximum color difference (ΔE) for single-pass transmission of the contact lens when illuminated by any two illuminants selected from the set of illuminants of CIE D65, CIE F11, CIE F7, CIE F2, CIE A, LED-3000K, LED-4000K and LED-5000K is within 8, where the color difference is given by:

$$\Delta E = \sqrt{(a^*_{illuminant\,1} - a^*_{illuminant\,2}) + (b^*_{illuminant\,1} - b^*_{illuminant\,2})}.$$

where a* and b* values are defined by the 1976 CIE L*a*b* color space.

5. The contact lens according to claim 3, wherein the at least one dye further exhibits a ratio of an average molar extinction in a range between 540 nm and 565 nm to an average molar extinction in a range between 625 nm and 660 nm of at least 1.

6. The contact lens according to claim 1, including a hetero-anthracene dye that includes a polar group substituted at a 9th position and a polymerizable tether substituted at a position selected from positions 1 to 8 as shown below

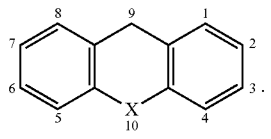

X = O, S, N

7. The contact lens according to claim 6, wherein the hetero-anthracene dye includes a polymerizable tether substituted at a position selected from positions 1 to 8.

8. The contact lens according to claim 1, including a quinoline dye having a polymerizable tether at a position selected from positions 1 to 11,

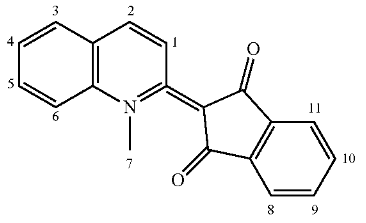

9. A contact lens having a visible spectral transmission having a peak transmission in the wavelength range from 380 nm to 780 nm;

the contact lens having at least one dye and having a spectral transmission that includes:

a spectral plateau that has a mean spectral transmittance between 10% (absolute) and 85% (absolute);

the spectral plateau is centered between 400 nm and 490 nm; a width of the spectral plateau is between 20 nm and 90 nm;

a transmission percent range of the spectral plateau is less than 10% (absolute);

the spectral plateau has a sample standard deviation less than 1.65%;

an average photopic luminous transmittance of the contact lens when separately lit by each illuminant CIE F2, CIE F7, CIE FI 1, CIE A, CIE D65, LED-3000K, LED-4000K and LED-5000K is greater than 70%;

and the contact lens includes at least one dye that establishes at least one inhibition band in the spectral transmission centered between 510 nm and 610 nm;

the contact lens has a single-pass yellowness index value of less than 5 and the contact lens has a double-pass yellowness index value of less than 10.

10. The contact lens according to claim 9, wherein having a simple average transmittance over the range 380 nm to 400 nm of at least 10% and from 415 nm to 455 nm that is at least 5% lower than the peak transmission in the wavelength range from 380 nm to 780 nm.

11. The contact lens according to claim 9, wherein for double-pass transmission, for at least 3 separately lit illuminants selected from a set of illuminants: CIE F2, CIE F7, CIE F 11, CIE A, CIE D65, LED-3000K, LED-4000K and LED-5000K, a-values are less than 5 where the a-values are defined by the 1976 CIE L*a*b* color space.

12. The contact lens according to claim 9, wherein the standard deviations of a-values, b-values and WPS values are at least 0.2 less than those of a Max Blue Deconstructed Spectrum based on a double-pass spectral transmission of the contact lens.

13. The contact lens according to claim 9, wherein the spectral transmission has at least one inhibition band centered between 520 nm and 650 nm, at least 2 pass-bands centered between 460 nm and 780 nm inclusive, for at least one such inhibition band a corresponding FW80M is between 10 nm and 90 nm.

14. The contact lens according to claim 9, in which there is only a single Recoloring Inhibition Band (RIB), and a smallest wavelength distance between a center of a spectral plateau and the center of a RIB is between 120 nm and 180 nm.

15. The contact lens according to claim 9, in which there are multiple Recoloring Inhibition Bands (RIBs), and a smallest wavelength distance between a center of a spectral plateau and a center of one of the RIBs is between 70 nm and 130 nm.

16. A contact lens including at least one dye, the contact lens having a visible spectral transmission having a peak transmission in the wavelength range from 380 nm to 780 nm, the visible spectral transmission having at least one inhibition band centered between 510 nm and 610 nm wherein the at least one dye comprises a metallo-tetraazaporphyrin with a polymerizable tether; and the contact lens including a lens material, the lens material including a substituted porphyrin with a polymerizable tether, the substituted porphyrin exhibiting a ratio of the average molar extinction in the range between 565 nm and 605 nm to the average molar extinction in the range between 540 nm and 565 nm of at least 1.1, a ratio of the average molar extinction in the range between 540 nm and 565 nm to the average molar extinction in the range between 625 nm and 660 nm of at least 1.1, and exhibits a ratio of its peak molar extinction within the wavelength range between 400 nm and 499 nm to its peak molar extinction within the wavelength range between 500 nm and 650 nm that is less than 3.0.

17. The contact lens according to claim 16, wherein the polymerizable tether includes a functional group selected from the group consisting of: acryloyl, methacryloyl, aminoacryloyl, aminomethacryloyl, thiolacryloyl, thiolmethacryloyl, vinyl, phenyl vinyl, acrylate, methacrylate, acrylamide, methacrylamide, thioacrylate, thiomethacrylate, ketone, aldehyde, carboxylic acid, ester, amine, amide, thiol, thiocarboxylic acid, thioester, thioketone, thioaldehyde, sulfoxide, fluoro, chloro, bromo, iodo, azide, hydroxy, epoxide, isocyanate, aldehyde, acyl chloride, acyl halide, aryl, heteroaryl, aryl halide, heteroaryl halide, silane, siloxane, boronic acid, boric acid, stannane, ferrocene, isocyanate, isothiocyanate, phosphate, alkenyl, or alkynyl.

18. The contact lens according to claim 17, wherein the polymerizable tether includes a methacrylate.

19. The contact lens according to claim 16, wherein the substituted porphyrin is a metallo-porphyrin.

20. The contact lens according to claim 19, wherein the metallo-porphyrin is a copper tetraazaporphyrin.

* * * * *